United States Patent
Zhu et al.

(10) Patent No.: US 8,761,128 B2
(45) Date of Patent: Jun. 24, 2014

(54) METHOD FOR SENDING A MIDDLE PILOT

(75) Inventors: Dengkui Zhu, Shenzhen (CN); Zirong Li, Shenzhen (CN); Ting Liang, Shenzhen (CN); Bo Sun, Shenzhen (CN); Changyin Sun, Shenzhen (CN); Zhaohua Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 220 days.

(21) Appl. No.: 13/382,102

(22) PCT Filed: Jun. 3, 2010

(86) PCT No.: PCT/CN2010/073517
§ 371 (c)(1), (2), (4) Date: Jan. 3, 2012

(87) PCT Pub. No.: WO2011/003312
PCT Pub. Date: Jan. 13, 2011

(65) Prior Publication Data
US 2012/0113974 A1    May 10, 2012

(30) Foreign Application Priority Data
Jul. 4, 2009    (CN) .......................... 2009 1 0159442

(51) Int. Cl.
H04B 7/216    (2006.01)
(52) U.S. Cl.
USPC ............................. 370/335; 370/342; 370/347
(58) Field of Classification Search
USPC .................. 370/252, 329, 335, 336, 342, 345
See application file for complete search history.

(56) References Cited

U.S. PATENT DOCUMENTS

| 8,400,908 B2 * | 3/2013 | Chun et al. .................... 370/210 |
| 2006/0245509 A1 | 11/2006 | Khan et al. |
| 2010/0165954 A1 * | 7/2010 | Lin et al. ....................... 370/335 |
| 2010/0246515 A1 * | 9/2010 | Tsai et al. ...................... 370/329 |

FOREIGN PATENT DOCUMENTS

| CN | 101005472 A | 7/2007 |
| CN | 1014132381 A | 2/2008 |
| CN | 101184073 A | 5/2008 |

* cited by examiner

Primary Examiner — Jeffrey M Rutkowski
Assistant Examiner — Harun Chowdhury
(74) Attorney, Agent, or Firm — McGarry Bair PC

(57) ABSTRACT

A method for sending a middle pilot is disclosed. The sending method comprises: selecting a middle pilot sequence set; creating a middle pilot subcarrier union; mapping by a base station a middle pilot sequence in the middle pilot sequence set after modulation through an OFDMA or OFDM symbol for transmitting the middle pilot onto a middle pilot subcarrier in a middle pilot subcarrier union corresponding to each transmission antenna, or, mapping by a base station a middle pilot sequence in the middle pilot sequence set through an OFDMA or OFDM symbol for transmitting the middle pilot onto a middle pilot subcarrier in a middle pilot subcarrier union corresponding to each transmission antenna and then performing modulation on the data at the subcarrier. By way of the present invention, the sending of middle pilot sequences is achieved, and the method reduces the periodicity of pilot symbols in the frequency domain and improves downlink performance of user data.

19 Claims, 4 Drawing Sheets middle pilot time domain OFDM symbol
Fig. 1
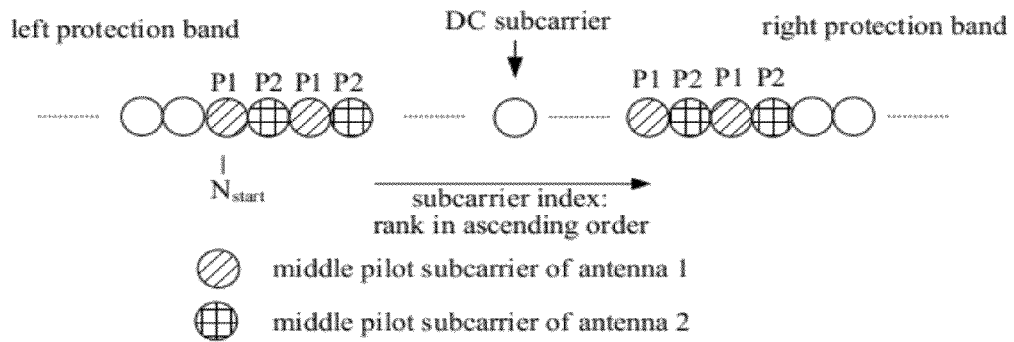
Fig. 2
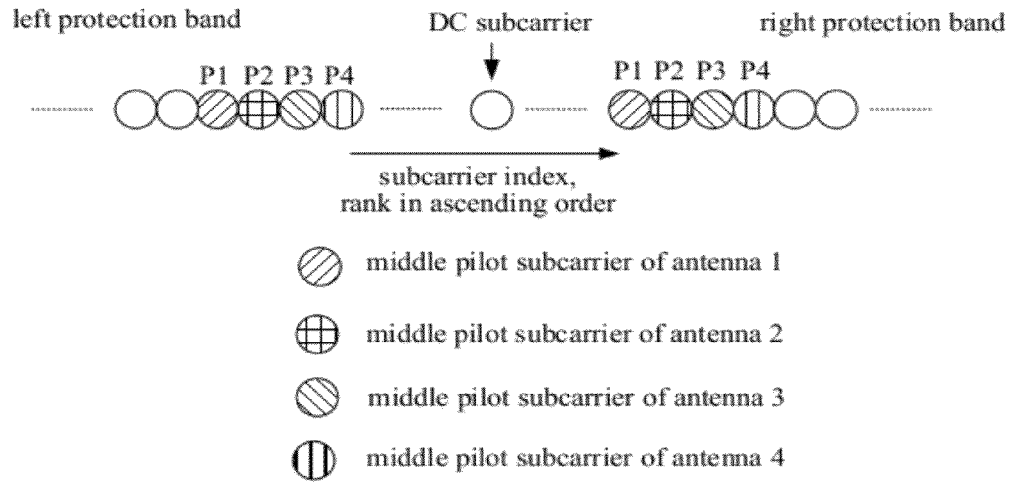
Fig. 3

METHOD FOR SENDING A MIDDLE PILOT

CROSS-REFERENCE TO RELATED APPLICATIONS

This application is a National Phase application of International Application No. PCT/CN2010/073517 filed on Jun. 3, 2010, which claims the benefit of Chinese Patent Application No. 200910159442.X, filed Jul. 4, 2009, both of which are incorporated herein by reference in their entirety.

FIELD OF THE INVENTION

The present invention relates to the communication field and in particular to a method for sending a middle pilot.

BACKGROUND OF THE INVENTION

In the wireless communication field, in order to improve system performance and meet the continuously increasing data service requirements of users, Orthogonal Frequency Division Multiplexing (abbreviated as OFDM) and Multiple-Input Multiple-Output (abbreviated as MIMO) are introduced.

During transmission, in order to further improve transmission quality, the data flow and pilot after MIMO encoding can be pre-coded and then mapped onto different antennae for transmitting. Thus, dedicated pilot appears. In an MIMO system which uses dedicated pilot mode, what is obtained by using channel estimation is an equivalent channel after pre-coding, and as to a system which needs to feed back real channel condition, the equivalent channel has to be converted to the real channel, while the process of converting the equivalent channel to the real channel is complicated and even cannot be achieved; in addition, as to a terminal which does not transmit any data, during a time period, it cannot obtain the real channel situation periodically. For this end, it needs to measure the current real channel condition to meet the requirements of system feedback.

Middle pilot sequence refers to inserting a specific pilot sequence on a specific OFDM symbol (FIG. 1) in a downlink wireless resource frame, and it is different from ordinary dedicated pilot and is not pre-coding processed so that the receiver carries out channel measurement. The middle pilot can be used to estimate the channels of all carrier locations on the entire symbol, so that it is convenient for the transmitter to rationally use highly efficient transmission strategy according to the current channel condition. In a wireless communication system, rationally using middle pilot to measure real channel condition, correctly feeding back channel quality information (abbreviated as CQI), pre-coding matrix index (abbreviated as PMI) and rank indication (abbreviated as RI) of the channel are very important for improving the transmission efficiency of the system.

Since the orthogonal frequency division system is a multi-carrier system, different sequences of frequency domain modulation will affect the maximum peak-to-average power ratio (PAPR) of its time domain symbol, thus affecting the efficiency of system power amplifier; if the PAPR corresponding to the modulated middle pilot is too big, it would cause the transmitter to carry out non-linear processing, thus affecting the channel estimation accuracy of the receiver, which will finally affect the downlink performance of the users. On the other hand, since the middle pilot sequence is sent through the same OFDM symbol of the same subframe of a plurality of adjacent cells, the interference maybe exist therebetween, which makes the terminal to receive middle pilot signals of the serving base station and adjacent base station simultaneously. As to any rational design and rationally sending the middle pilot sequence, there is still no effective solution currently.

During the implementation of the present invention, the inventors recognized that there are the following defects in the prior art: during the process of sending middle pilot, the pilot symbol has periodicity in the frequency domain, thus affecting the downlink performance of user data.

SUMMARY OF THE INVENTION

The present invention is proposed by considering that there is problem in relevant art of affecting the downlink performance of user data since the pilot symbol has periodicity in the frequency domain.

A method for sending a middle pilot is provided according to one aspect of the present invention. The method comprises: selecting a middle pilot sequence set; creating a middle pilot subcarrier union; mapping by a base station a middle pilot sequence in the middle pilot sequence set after modulation, through an OFDMA or OFDM symbol used for transmitting the middle pilot, onto a middle pilot subcarrier in a middle pilot subcarrier union corresponding to each transmission antenna, or, mapping by a base station a middle pilot sequence in the middle pilot sequence set, through an OFDMA or OFDM symbol used for transmitting the middle pilot, onto a middle pilot subcarrier in a middle pilot subcarrier union corresponding to each transmission antenna and then performing modulation on data at the subcarrier.

Preferably, the step of creating a middle pilot subcarrier union comprises: setting a subcarrier in the OFDMA or OFDM symbol, the index of which meets the following condition, as a union of the middle pilot subcarriers, for transmitting the middle pilot sequence, of all wireless communication networking units:

$$\left[N_{start}:1:N_{start}+f\left(\frac{N_{used}-1}{2}\right)-1,\right.$$
$$\left.N_{start}+f\left(\frac{N_{used}-1}{2}\right)+1:1:N_{start}+N_{used}-1\right]$$

the above formula represents that the index increases to $$N_{start}+f\left(\frac{N_{used}-1}{2}\right)-1$$

in the unit of 1 starting from $N_{start}$, and then increases to $N_{start}+N_{used}-1$ in the unit of 1 starting from $$N_{start}+f\left(\frac{N_{used}-1}{2}\right)+1,$$

wherein both $N_{start}$ and $N_{used}$ are positive integers, wherein $N_{used}$ is the number of the subcarriers other than protection band subcarriers in an OFDMA or OFDM system, and $$f\left(\frac{N_{used}-1}{2}\right)$$

represents the integral value by flooring the $$\frac{N_{used}-1}{2}.$$

Preferably, when $N_{used}$ is odd, $$f\left(\frac{N_{used}-1}{2}\right)=\frac{N_{used}-1}{2},$$

when $N_{used}$ is even, $$f\left(\frac{N_{used}-1}{2}\right)$$

is the minimum integer greater than $$\frac{N_{used}-1}{2}$$

or the maximum integer less than $$\frac{N_{used}-1}{2},$$

or the number obtained by rounding $$f\left(\frac{N_{used}-1}{2}\right).$$

Preferably, said middle pilot sequence is a binary sequence. The above method further comprises: if the middle pilot sequence is represented by hexadecimal, then the hexadecimal middle pilot sequence is converted into said binary middle pilot sequence to be transmitted.

Preferably, said modulation is to modulate element 0 in the sequence to be 1, modulate element 1 in the sequence to be −1, or modulate element 0 in the sequence to be −1 and modulate element 1 in the sequence to be 1.

Preferably, the middle pilot sequence $b_n b_{n-1} \ldots b_0$ which have been modulated or not are successively mapped, in an order from the highest valid element $b_n$ to the lowest valid element $b_0$, onto middle pilot subcarriers ranked in ascending order corresponding to each transmission antenna, wherein $b_n$ is mapped onto a middle pilot subcarrier with the minimum index or onto a middle pilot subcarrier with the maximum index.

Preferably, during the mapping, the middle pilot subcarrier, the index of which meets the following condition, in $N_{used}$ subcarriers is regarded as the middle pilot subcarrier used by a middle pilot symbol corresponding to the transmission antenna n:

$$\left[N_{start}+\text{offset}+n:\Delta:N_{start}+\text{offset}+n+\left(\frac{P}{2}-1\right)*\Delta,\right.$$

-continued $$N_{start}+\text{offset}+\frac{N_{used}-1}{2}+n+$$
$$1:\Delta:N_{start}+\text{offset}+\frac{N_{used}-1}{2}+n+1+\left(\frac{P}{2}-1\right)*\Delta\right]$$

representing that it increase to $$N_{start}+\text{offset}+n+\left(\frac{P}{2}-1\right)*\Delta$$

by the interval of $\Delta$ starting from $N_{start}$+offset+n, and then increase to $$N_{start}+\text{offset}+\frac{N_{used}-1}{2}+n+1+\left(\frac{P}{2}-1\right)*\Delta$$

by the interval of $\Delta$ starting from $$N_{start}+\text{offset}+\frac{N_{used}-1}{2}+n+1,$$

wherein $0 \leq n \leq N_{Tx}-1$, $\Delta$ is the interval between adjacent middle pilot subcarriers in each transmission antenna, $N_{Tx}$ is the number of transmission antennae, P is the number of middle pilot subcarriers used by each transmission antenna through the middle pilot symbol, offset is the number of specific offset subcarriers corresponding to the wireless communication networking unit and is an integer; and $N_{used}$ is the number of subcarriers other than the protection band subcarrier in the OFDMA or OFDM system; wherein offset is determined by at least one of the following: the index of the wireless communication networking unit and a frequency division multiplexing factor.

Preferably, the middle pilot sequence set to which the binary middle pilot sequence corresponding to the wireless communication networking unit belongs is determined at least one of the following factors: the number of transmission antennae corresponding to the wireless communication networking unit, system bandwidth, the number of subcarriers of the system, the number of discrete Fourier transform points, and the index of the wireless communication networking unit; and the following factors determine the index of the binary middle pilot sequence in the middle pilot sequence set to which the binary middle pilot sequence belongs, with the binary middle pilot sequence being the one to be transmitted and corresponding to the wireless communication networking unit: the index of the wireless communication networking unit, the number of part or all of sequences contained in a predetermined sequence set to which the middle pilot sequence corresponding to the index of the wireless communication networking unit belongs.

Preferably, said wireless communication networking unit comprises at least one of the following: a cell, a base station, a sector, and a segment.

Preferably, the index I of said middle pilot sequence to be transmitted in the middle pilot sequence set to which said middle pilot sequence belongs is one of the following:

$I=f(\text{BSID},\text{CellID},\text{MaxSeqNum}),$ $I=f(\text{BSID},\text{SegmentID},\text{MaxSeqNum})$ I=f(CellID,MaxSeqNum)

I=f(SegmentID,MaxSeqNum)I=f(CellID,SegmentID, MaxSeqNum)

I=f(SectorID,SegmentID,MaxSeqNum)

I=f(CellID,SectorID,MaxSeqNum)

I=f(CellID,SectorID)

I=f(CellID,SegmentID)

wherein MaxSeqNum+1 is the number of part or all of sequences contained in the middle pilot sequence set to which the base station or cell or sector belongs.

Preferably, after the modulation and the mapping are completed, the data at the subcarrier of an OFDMA symbol corresponding to n-th transmission antenna are:

$$P_{CellID,n}(k) = \begin{cases} 1 - 2q_{CellId}(m), & \text{if } k = m*\Delta + N_{start} + \\ & \text{offset} + n + \left\lfloor \frac{m*\Delta}{\frac{N_{used}-1}{2}} \right\rfloor \\ 0, & \text{otherwise} \end{cases}$$

wherein $$k = N_{start}, N_{start}+1, \ldots N_{start} + N_{used} + 1, k \neq N_{start} + \frac{N_{used}-1}{2},$$

m=0, 1, . . . , P−1, $q_{CellID}$ is a middle pilot sequence with the index of CellID and corresponding to the wireless communication networking unit; Δ is the interval between adjacent middle pilots of each antenna, and offset is the offset of the specific subcarrier corresponding to the wireless communication networking unit.

Preferably, the middle pilot sequence set is generated via at least one of the following operations:
  selecting a natural number n for a middle pilot sequence set which contains S sequences, wherein n is the minimum natural number which meets $$2^n \geq \frac{m}{2} \text{ or } (2^n \geq m),$$

and in is the length of each sequence in the middle pilot sequence set, and S is a natural number;
  or generating n middle sequences $x_i(k)$, wherein 1≤i≤n and 1≤k≤$2^n$, the length of each middle sequence is $2^n$, wherein the i (1≤i≤n)th middle sequence is $x_i$=(1,1, . . . 1,0,0, . . . 0, . . . 1,0,0, . . . 0), wherein the number of the consecutive 1s or consecutive 0s is $2^n/2^i$;
  or generating S' permutation sequences of sequence [1, 2, . . . n] or S' different arrangements of sequence [1, 2, . . . n], wherein S'≥S and S is the number of sequences in said middle pilot sequence set;
  or generating S'' Golay complementary sequence pairs of $a_i$ and $b_i$ with the length of $2^n$, wherein 1≤i≤S'; wherein, $$a_i = \sum_{l=1}^{n-1} x_{\pi_i(l)} x_{\pi_i(l+1)}, \; b_i = \sum_{l=1}^{n-1} x_{\pi_i(l)} x_{\pi_i(l+1)} + x_{\pi_i(1)},$$

and $\pi_i(l)$ represents the l-th element of i-th sequence in S' permutation sequences;
  or selecting M index sequences $I_j=[i_1^j, i_2^j, \ldots i_m^j]$, wherein 1≤j≤M, and any two elements in each index sequences are different and each element belongs to an interval [1, $2^n$];
  or in the generated S' Golay complementary sequence pairs, selecting for each sequence $a_i$ and/or $b_i$ elements corresponding to index $I_j$ to construct a new sequence and totally construct S'M new sequences, wherein when n is the minimum natural number which meets $$2^n \geq \frac{m}{2},$$

the generated new sequence is [$a_i(I_j)$, $b_i(I_j)$] (1≤i≤S', 1≤j≤M), and when n is the minimum natural number which meets $2^n$≥m, the generated new sequence is $a_i(I_j)$ or $b_i(I_j)$ (1≤i≤S', 1≤j≤M);
  wherein $a_i(I_j)$ represents to select the elements with the index of $I_j$ in $a_i$ to generate a new sequence, and [$a_i(I_j)$, $b_i(I_j)$] represents to cascade the two new sequences $a_i(I_j)$ and $b_i(I_j)$ to form one sequence;
  selecting, from said S'M new sequences, S sequences which meet a predetermined condition to construct a middle pilot sequence set, wherein said predetermined condition is: the maximum peak-to-average power ratios of said S sequences are all less than a first threshold value and the correlation coefficient between any two sequences is less than a second threshold value; and
  selecting a middle pilot sequence in the generated middle pilot sequence set.

Preferably, the peak-to-average power ratio is obtained by: mapping said S'M new sequences onto m subcarriers in $N_{FFT}$ carriers according to a specific mode, setting the remaining $N_{FFT}$−m carriers as zero, forming a sequence F of $N_{FFT}$, and then obtaining a sequence T by performing the discrete Fourier transform of $N_{FFT}$ points on sequence F, with the peak-to-average power ratio being:

$$PAPR = 10*\log10\left(\frac{N_{FFT}*\max(T \otimes conj(T))}{\sum_{i=1}^{N_{FFT}} |T(i)|^2}\right)$$

wherein '⊗' represents that corresponding elements of the sequence multiply with each other, and conj(T) represents to take conjugation on each element of sequence T; said correlation coefficient between any two sequences is:

$$R_{kl}(\tau) = \frac{\sum_{i=1}^{N_{FFT}} T_k(i) * conj(T_l(\mod(i+\tau, N_{FFT})))}{m},$$

$$\tau = 0, 1, \ldots N_{FFT}-1$$

wherein $T_k$ represents the k-th sequence obtained according to the above method.

Preferably; the middle pilot sequence set is generated via at least one of the following operations:
  generating n middle sequences $x_i(k)$, wherein 1≤i≤n and 1≤k≤$2^n$, and the length of each middle sequence is $2^n$, wherein the i (1≤i≤n)th middle sequence is:

$x_i = (1, 1, \ldots 1, 0, 0, \ldots 0, \ldots 1, 1, \ldots 1, 0, 0, \ldots 0)$, wherein the number of the consecutive 1s or consecutive 0s is $2^n/2^i$;

generating S' permutation sequences $\pi_i$ (i=1, 2, ... S') of sequence [1, 2, ... n] or S' different arrangements $\pi_i$ (i=1, 2, ... S') of [1, 2, ... n], wherein S'≥S and S is the number of sequences in said middle pilot sequence set;

generating $A_1$ different binary Golay sequences $P_i$, i=1, 2, ... $A_1$, with the length of $2^N$, wherein $A_1 \geq A$ and A is the number of middle pilot sequences in said middle pilot sequence set;

said $$P_i = \sum_{l=1}^{n-1} x_{\pi_i(l)} x_{\pi(l+1)} + \sum_{l=1}^{n} c_l x_l + c, \ c_l$$

and c are any binary numbers (0 or 1); and inserting into each generated binary Golay sequence $P_i$ a binary sequence a with the length of $M-2^N$ to obtain a sequence $S_i$ with the length of M, wherein the j ($1 \leq j \leq M-2^N$)th element of binary sequence a is the (9*j)th element of sequence $S_i$, wherein $1 \leq j \leq M-1^N$;

wherein said binary sequence a meets: a is a sequence, which enables Si to have the maximum peak-to-average power ratio, in all $2^{M-2^N}$ binary sequences with the length of $M-2^N$.

Preferably, other $N-N_{used}$ subcarriers in N subcarriers are set to be in idle state, wherein N is the number of subcarriers of the system or the number of discrete Fourier transform points.

Preferably, said method further comprises performing a power/amplitude boosting operation on the modulated sequence.

Preferably, said step of selecting a middle pilot sequence set comprises:

selecting a middle pilot sequence set from a plurality of preset middle pilot sequence sets according to a first preset factor, wherein said first preset factor includes at least one of the following: the number of transmission antennas of the wireless communication networking unit, system bandwidth used by the system, the number of subcarriers of the system, the number of discrete Fourier transform points of the system, and the index of the wireless communication networking unit; and selecting said middle pilot sequence to be transmitted from said selected middle pilot sequence set according to a second preset factor, wherein said second preset factor includes at least one of the following: the index of the wireless communication networking unit, and the number of part or all of sequences contained in a preset sequence set to which a middle pilot sequence corresponding to the wireless communication networking unit belongs;

wherein said wireless communication networking unit includes at least one of the following: a cell, a base station, a sector, and a segment.

Preferably, the index I of said middle pilot sequence to be transmitted comprises one of the following:

$I = f(BSID, CellID, MaxSeqNum)$, $I = f(BSID, SegmentID, MaxSeqNum)$, $I = f(CellID, MaxSeqNum)$, $I = f(SegmentID, MaxSeqNum)$, $I = f(CellID, SegmentID, MaxSeqNum)$ wherein MaxSeqNum+1 is the number of part or all of sequences contained in the middle pilot sequence set to which the wireless communication networking unit belongs, BSID is the index of a base station, and Cell ID or Segment ID is cell index or sector index.

Preferably, the step of selecting a middle pilot sequence set comprises:

at least one of the following factors determining the middle pilot sequence set to which the middle pilot sequence to be transmitted and corresponding to the wireless communication networking unit belongs: the number of transmission antennae corresponding to the wireless communication networking unit, system bandwidth, the number of subcarriers of the system, the number of discrete Fourier transform points of the system; and the following factors determining the index of the middle pilot sequence in the middle pilot sequence set to which the middle pilot sequence belongs, with the middle pilot sequence being the one to be transmitted and corresponding to the wireless communication networking unit: the index of the wireless communication networking unit, and the number of part or all of sequences contained in a predetermined sequence set to which the middle pilot sequence corresponding to the wireless communication networking unit belongs;

wherein said wireless communication networking unit includes at least one of the following: a cell, a base station, a sector, and a segment.

Preferably, the middle pilot sequence set is generated via the following operations:

choosing a natural number N and enabling N to be the maximum integer which meets $2^N \leq M$, wherein M is the length of the middle pilot sequence in the middle pilot sequence set;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1, 1, \ldots 1, 0, 0, \ldots 0, \ldots 1, 1, \ldots 1, 0, 0, \ldots 0)$, wherein the number of consecutive 1s or consecutive 0s is $2^n/2^i$;

generating S' permutation sequences $\pi_i$, i=1, 2, ... S', of sequence [1, 2, ... n] or S' different arrangements $\pi_i$, i=1, 2, ... S', of [1, 2, ... n], wherein S'≥S and S is the number of sequences in said middle pilot sequence set;

generating $A_1$, different binary Golay sequences $P_i$, i=1, 2, ... $A_1$, with the length of $2^N$, wherein $A_1 \geq A$ and A is the number of middle pilot sequences in said middle pilot sequence set;

said $$P_i = \sum_{l=1}^{n-1} x_{\pi_i(l)} x_{\pi(l+1)} + \sum_{l=1}^{n} c_l x_l + c, \ c_l$$

and c are any binary numbers (0 or 1); and inserting into each generated binary Golay sequence $P_i$ a binary sequence a with the length of $M-2^N$ to obtain a sequence $S_i$ with the length of M, wherein the j ($1 \leq j \leq M-2^N$)th element of binary sequence a is the (9*j)th element of sequence $S_i$, wherein $1 \leq j \leq M-2^N$;

wherein said binary sequence a meets: a is a sequence, which enables $S_i$ to have the maximum peak-to-average power ratio, in $2^{M-2^N}$ binary sequences with the length of $M-2^N$.

Preferably, the middle pilot sequence set is generated via at least one of the following operations:

selecting, for a middle pilot sequence set which contains S sequences, a natural number n, wherein n is the minimum natural number which meets $$2^n \geq \frac{m}{2}$$

or ($2^n \geq m$), m in is the length of each sequence in the middle pilot sequence set, and S is a natural number;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1,1, \ldots 1,0,0, \ldots 0, \ldots 1,1, \ldots 1,0,0, \ldots 0)$, wherein the number of consecutive 1s or consecutive 0s is $2^n/2^i$;

generating S' permutation sequences of sequence $[1, 2, \ldots n]$ or S' different arrangements of $[1, 2, \ldots n]$, wherein $S' \geq S$ and S is the number of sequences in said middle pilot sequence set;

generating S' Golay complementary sequence pairs of $a_i$ and $b_i$ with the length of $2^n$, wherein $1 \leq i \leq S'$;

wherein, $$a_i = \sum_{l=1}^{n} x_{\pi_i(l)} x_{\pi_i(l+1)}, \quad b_i = \sum_{l=1}^{n} x_{\pi_i(l)} x_{\pi(l+1)} + x_{\pi_i(1)},$$

and $\pi_i(l)$ represents the l-th element of i-th sequence in S' permutation sequences;

selecting M index sequences $I_j = [i_1^j, i_2^j, \ldots i_m^j]$, wherein $1 \leq j \leq M$, and any two elements in each index sequence are different and each element belongs to an interval $[1, 2^n]$; and in the generated S' Golay complementary sequence pairs, selecting, for each sequence $a_i$ and/or $b_i$, elements corresponding to index $I_j$ to construct a new sequence and totally construct S'M new sequences, wherein when n is the minimum natural number which meets $$2^n \geq \frac{m}{2},$$

the generated new sequence is $[a_i(I_j), b_i(I_j)]$ ($1 \leq i \leq S'$, $1 \leq j \leq M$), and when n is the minimum natural number which meets $2^n \geq m$, the generated new sequence is $a_i(I_j)$ or $b_i(I_j)$ ($1 \leq i \leq S'$, $1 \leq j \leq M$);

wherein $a_i(I_j)$ represents to select elements with the index of $I_j$ in $a_i$ to generate a new sequence, and $[a_i(I_j), b_i(I_j)]$ represents to cascade the two new sequences $a_i(I_j)$ and $b_i(I_j)$ to form one sequence; and selecting, from said S'M new sequences, S sequences meeting a predetermined condition, to construct said middle pilot sequence set, wherein said predetermined condition is: the maximum peak-to-average power ratios of said S sequences are all less than a first threshold value and the correlation coefficient between any two sequences is less than a second threshold value.

Preferably, the method of generating the middle pilot sequence set comprises at least one of the following operations:

selecting, for a middle pilot sequence set which contains S sequences, a natural number n, wherein n is the minimum natural number which meets $$2^n \geq \frac{m}{2}$$

or ($2^n \geq m$), m is the length of each sequence in the middle pilot sequence set, and S is a natural number;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1,1, \ldots 1,0,0, \ldots 0, \ldots 1,1, \ldots 1,0,0, \ldots 0)$, wherein the number of consecutive 1s or consecutive 0s is $2^n/2^i$;

generating S' permutation sequences of sequence $[1, 2, \ldots n]$ or S' different arrangements of $[1, 2, \ldots n]$, wherein $S' \geq S$ and S is the number of sequences in said middle pilot sequence set;

generating S' Golay complementary sequence pairs of $a_i$ and $b_i$ with the length of $2^n$, wherein $1 \leq i \leq S'$;

wherein, $$a_i = \sum_{l=1}^{n} x_{\pi_i(l)} x_{\pi_i(l+1)}, \quad b_i = \sum_{l=1}^{n} x_{\pi_i(l)} x_{\pi(l+1)} + x_{\pi_i(1)},$$

and $\pi_i(l)$ represents the l-th element of i-th sequence in S' permutation sequences;

selecting M index sequences $I_j = [i_1^j, i_2^j, \ldots i_m^j]$, wherein $1 \leq j \leq M$, and any two elements in each index sequence are different and each element belongs to an interval $[1, 2^n]$; and in the generated S' Golay complementary sequence pairs, selecting, for each sequence $a_i$ and/or $b_i$, elements corresponding to index $I_j$ to construct a new sequence and totally construct S'M new sequences, wherein when n is the minimum natural number which meets $$2^n \geq \frac{m}{2},$$

the generated new sequence is $[a_i(I_j), b_i(I_j)]$ ($1 \leq i \leq S'$, $1 \leq j \leq M$), and when n is the minimum natural number which meets $2^n \geq m$, the generated new sequence is $a_i(I_j)$ or $b_i(I_j)$ ($1 \leq i \leq S'$, $1 \leq j \leq M$);

wherein $a_i(I_j)$ represents to select elements with the index of $I_j$ in $a_i$ to generate a new sequence, and $[a_i(I_j), b_i(I_j)]$ represents to cascade the two new sequences $a_i(I_j)$ and $b_i(I_j)$ to form one sequence; and selecting, from said S'M new sequences, S sequences meeting a predetermined condition, to construct said middle pilot sequence set, wherein said predetermined condition is: the maximum peak-to-average power ratios of said S sequences are all less than a first threshold value and the correlation coefficient between any two sequences is less than a second threshold value.

A method for generating a middle pilot sequence set is further provided according to another aspect of the present invention, which comprises at least one of the following operations:

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is: $x_i = (1,1, \ldots 1,0, 0, \ldots 0, \ldots 1,1, \ldots 1,0,0, \ldots 0)$, wherein the number of consecutive 1s or consecutive 0s is $2^n/2^i$; generating S' permutation sequences $\pi_i$ (i=1, 2, \ldots S') of sequence $[1, 2, \ldots n]$ or S' different arrangements $\pi_i$, i=1, 2, \ldots S' of $[1, 2, \ldots n]$, wherein S'≥S and S is the number of sequences in the middle pilot sequence set; generating $A_1$ different binary Golay sequences $P_i$ (i=1, 2, ... $A_1$) with the length of $2^N$, wherein $A_1 > A$ and A is the number of middle pilot sequences in the middle pilot sequence set;

$$P_i = \sum_{l=1}^{n-1} x_{\pi_i(l)} x_{\pi_i(l+1)} + \sum_{l=1}^{n} c_l x_l + c, \ c_l$$

and c are any binary numbers (0 or 1);

as to each generated binary Golay sequence $P_i$, inserting a binary sequence a with the length of $M-2^N$ to obtain a sequence $S_i$ with the length of M, wherein the j ($1 \le j \le M-2^N$)th element of binary sequence a is the (9*j)th element of sequence $S_i$, wherein $1 \le j \le M-2^N$; wherein binary sequence a meets following requirement: a is a sequence in $2^{M-2^N}$ binary sequences with the length of $M-2^N$ which enables $S_i$ to have the maximum peak-to-average power ratio.

By way of the method of the embodiments of the present invention, the correlation of pilot symbol in frequency domain can be avoided, thus improving downlink performance. In addition, in conjunction with the method for generating a middle pilot sequence set and the method for determining the same of the present invention, the middle pilot sequence has relatively low maximum peak-to-average power ratio and negative correlation and the cell interference can be reduced and the accuracy of the channel estimation can be improved by setting part of available subcarriers which meet the condition of the present invention to transmit a middle pilot sequence.

Other features and advantages of the present invention will be described in the following description and partly become obvious from the description, or be understood by implementing the present invention. The objects and other advantages of the present invention can be realized and obtained through the structures specially indicated by the description, claims, and drawings.

BRIEF DESCRIPTION OF THE ACCOMPANYING DRAWINGS

The drawings herein are used to provide a further understanding of the present invention and form a part of the specification, which are used to explain the present invention together with the embodiments of the present invention without unduly limiting the scope of the present invention. In the drawings:

FIG. 1 is a structural schematic diagram of a middle pilot time domain symbol according to relevant art;

FIG. 2 is a first schematic diagram of a subcarrier of a middle pilot symbol of 2 transmission antennas in the frequency domain according to the embodiments of the present invention;

FIG. 3 is a schematic diagram of a subcarrier of a middle pilot symbol of 4 transmission antennae in the frequency domain according to the embodiments of the present invention;

Figure 4:
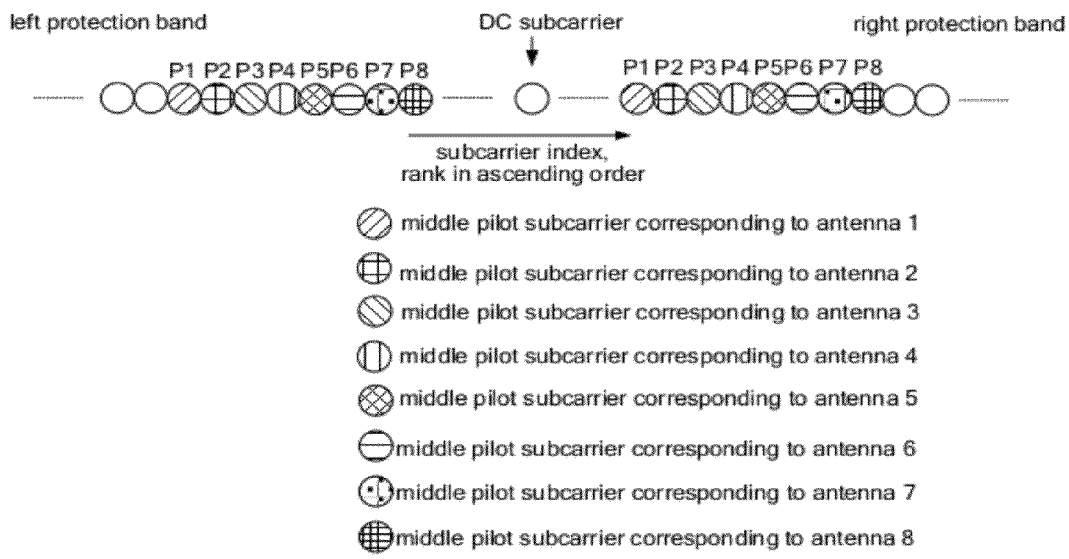
FIG. 4 is a schematic diagram of a subcarrier of a middle pilot symbol of 8 transmission antennae in the frequency domain according to the embodiments of the present invention.

In order to meet the format requirements of statement, the corresponding labels of specification and accompanying drawings are as follows:

"$N_{start}$" in the specification corresponds to "$N_{start}$" in the accompanying drawings; and "Offset" in the specification corresponds to "offset" in the accompanying drawings.

DETAILED DESCRIPTION OF THE EMBODIMENTS

The preferred embodiments of the invention will be described in conjunction with the accompanying drawings, and it shall be understood that the preferred embodiments described here are only for the purpose of illustration and not to limit the present invention.

The embodiments of the present invention provide a design solution for a middle pilot sequence and a method for sending a middle pilot sequence, which enables an OFDM symbol of each antenna, port at the transmitter to have a very small PAPR value in the time domain, thus system power can be saved and the channel estimation accuracy of the terminal can be improved; in addition, in the embodiments of the present invention, as to each cell or sector or base station using $N_{used}-1$ carriers to transmit all the corresponding middle pilot sequences, adjacent cells or base stations or sectors use different middle pilot sequences, and the correlation coefficient of their corresponding middle pilot symbols (i.e. including symbols of middle pilot subcarriers which are used by the user to send middle pilot sequences) are maintained at a relatively low level in the time domain, thus interference between adjacent cells can be reduced and the channel estimation accuracy is improved. As to each cell or sector or base station using $$\frac{N_{used} - 1}{3}$$

carriers to transmit all the corresponding middle pilot sequences, their corresponding middle pilot symbols (i.e. including symbols of middle pilot subcarriers which are used by the user to send middle pilot sequences) has relatively low peak-to-average power ratio values.

In the embodiments of the present invention, middle pilot symbol refers to a specific OFDM symbol in the downlink wireless frame structure and is used for transmitting middle pilot sequences, and this OFDM symbol is not used for transmitting data, and at the same time this pilot data is not processed by pre-coding. Middle pilot carriers are distributed through the entire OFDM symbol. The middle pilot is used for the terminal to carry out channel measurement so as to obtain a downlink channel coefficient, and in open loop MIMO (Multi Input Multi Output), the middle pilot can be used for channel quality indication (abbreviated as CQI) estimation, and in closed loop MIMO, the middle pilot can be used for the calculation of pre-coding matrix index (PMI).

Provided is a method for sending a middle pilot. The method comprises: selecting a middle pilot sequence set; creating a middle pilot subcarrier union; mapping by a base station a middle pilot sequence in the middle pilot sequence set after modulation through an OFDMA or OFDM symbol for transmitting the middle pilot onto a middle pilot subcarrier in a middle pilot subcarrier union corresponding to each transmission antenna, or, mapping by a base station a middle pilot sequence in the middle pilot sequence set through an OFDMA or OFDM symbol for transmitting the middle pilot onto a middle pilot subcarrier in a middle pilot subcarrier union corresponding to each transmission antenna and then performing modulation on the data through the subcarrier. By way of corresponding to the middle pilot subcarriers which correspond to each transmission antenna on different pilot sequences, correlation of pilot symbols in the frequency domain is avoided and downlink performance is improved. The steps of each embodiment will be described in detail hereinafter.

Method for Generating a Middle Pilot Sequence Set

The middle pilot sequence used in the embodiments of the present invention is preferably selected from a preset middle pilot sequence set, and in the embodiments of the present invention, two methods for generating a middle pilot sequence set is provided, of course, the present invention is not limited to this.

Mode I: generating a middle pilot sequence set via the following operations:

as to a middle pilot sequence set which contains S sequences, selecting a natural number n, wherein n is the minimum natural number which meets $$2^n \geq \frac{m}{2}$$

or ($2^n \geq m$), m is the length of each sequence in the middle pilot sequence set, and S is a natural number;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i=(1,1, \ldots 1,0,0, \ldots 0, \ldots 1,1, \ldots 1,0,0, \ldots 0)$, wherein the number of consecutive 1s or consecutive 0s is $2^n/2^i$;

generating S' permutation sequences of sequence [1, 2, . . . n] or S' different arrangements of [1, 2, . . . n], wherein S'>S and S is the number of sequences in the middle pilot sequence set;

generating S' Golay complementary sequence pairs of $a_i$ and $b_i$ with the length of $2^n$, wherein $1 \leq i \leq S'$;

wherein $$a_i = \sum_{l=1}^{n} x_{\pi_i(l)} x_{\pi_i(l+1)}, \quad b_i = \sum_{l=1}^{n} x_{\pi_i(l)} x_{\pi(l+1)} + x_{\pi_i(1)},$$

and $\pi_i(l)$ represents the lth element of ith sequence in S' permutation sequences.

selecting M index sequences $I_j=[i_1^j, i_2^j, \ldots i_m^j]$, wherein $1 \leq j \leq M$, and any two elements in each index sequences are different and each element belongs to an interval [1, $2^n$];

in the generated S' Golay complementary sequence pairs, as to each sequence $a_i$ and/or $b_i$, selecting an element corresponding to index $I_j$ to construct a new sequence and totally construct S'M new sequences, wherein when n is the minimum natural number which meets $$2^n \geq \frac{m}{2},$$

the generated new sequence is $[a_i(I_j), b_i(I_j)]$ ($1 \leq i \leq S'$, $1 \leq j \leq M$), and when n is the minimum natural number which meets $2^n \geq m$, the generated new sequence is $a_i(I_j)$, or $b_i(I_j)$ ($1 \leq i \leq S'$, $1 \leq j \leq M$);

wherein $a_i(I_j)$ indicates to select an element with the index of $I_j$ in $a_i$ to generate a new sequence, and $[a_i(I_j), b_i(I_j)]$ indicates to cascade the two new sequences $a_i(I_j)$ and $b_i(I_j)$ to form a sequence; and from S'M new sequences, selecting S sequences which meet a predetermined condition to construct a middle pilot sequence set, wherein the predetermined condition is: the maximum peak-to-average power ratios of S sequences are all less than a first threshold value and the correlation coefficient between any two sequences is less than a second threshold value.

The middle pilot sequence set generated by this method is as shown from Tables 1 to 5 hereinafter.

Mode II:

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i=(1,1, \ldots 1,0,0, \ldots 0, \ldots 1,1, \ldots 1,0,0, \ldots 0)$, wherein the number of consecutive 1s or consecutive 0s is $2^n/2^i$;

generating S' permutation sequences $\pi_i$, i=1, 2, . . . S', of sequence [1, 2, . . . n] or S' different arrangements $\pi_i$, i=1, 2, . . . S' of [1, 2, . . . n], wherein S'>S and S is the number of sequences in the middle pilot sequence set;

generating $A_1$ different binary Golay sequences $P_i$ (i=1, 2, . . . $A_1$) with the length of $2^N$, wherein $A_1$>A and A is the number of middle pilot sequences in the middle pilot sequence set;

$$P_i = \sum_{l=1}^{n-1} x_{\pi_i(l)} x_{\pi(l+1)} + \sum_{l=1}^{n} c_l x_l + c, \, C_l$$

and c are any binary numbers (1 or 1);

as to each generated binary Golay sequence $P_i$, inserting a binary sequence a with the length of M–$2^N$ to obtain a sequence $S_i$ with the length of M, wherein the j ($1 \leq j \leq M-2^N$)th element of binary sequence a is the (9*j)th element of sequence $S_i$, wherein $1 \leq j \leq M-2^N$;

wherein the binary sequence a meets: a is a sequence, which enables $S_i$ to have the maximum peak-to-average power ratio, in $2^{M-2^N}$ binary sequences with the length of M–$2^N$.

The middle pilot sequence set generated by this method is as shown from Tables 6 to 10 hereinafter.

It needs to note that a sequence set can be generated by any sequence generating mode, and then selecting a sequence in the generated sequence set as a middle pilot sequence, selecting from any of the above Tables 1 to 10. In addition, the tables hereinafter are only exemplary, and the correspondence relationship between the sequences and Cell ID in the tables can be adjusted according to the requirements of implementation, and the elements in the tables can also be deleted or added, for example, part of the elements in the tables hereinafter can be used as a middle pilot sequence set, which are all in the protection scope of the present invention.

Method for Determining a Middle Pilot Sequence

A method for determining a middle pilot sequence is disclosed, which comprises: selecting a middle pilot sequence set in a plurality of preset middle pilot sequence sets according to a first preset factor, wherein the first preset factor includes at least one of the following: the number of transmission antennae(s) of wireless communication networking unit, system bandwidth used by the system, the number of subcarriers of the system, the number of discrete Fourier transform point of the system, and index of the wireless communication networking unit; selecting the middle pilot sequence to be transmitted from the middle pilot sequence set according to a second preset factor, wherein the second preset factor includes at least one of the following: index of the wireless communication networking unit, the number of part or all of sequences contained in a preset sequence set to which a middle pilot sequence corresponding to the wireless communication networking unit belongs; and a method for determining a middle pilot sequence is further disclosed, which comprises: the middle pilot sequence set to which the middle pilot sequence corresponding to the wireless communication networking unit belongs is determined by at least one of the following factors: the number of transmission antennae(s) corresponding to the wireless communication networking unit, system bandwidth, the number of subcarriers of the system, the number of discrete Fourier transform points of the system; and the following factors determine the index of the middle pilot sequence in the middle pilot sequence set to which the middle pilot sequence belongs, with the middle pilot sequence being the one to be transmitted and corresponding to the wireless communication networking unit: the index of the wireless communication networking unit, the number of part of or all of sequences contained in a predetermined sequence set to which the middle pilot sequence corresponding to the wireless communication networking unit belongs; and wherein the wireless communication networking unit includes at least one of the following: a cell, a base station, a sector, and a segment. In the above, the wireless communication networking unit includes at least one of the following: a cell, a base station, a sector, and a segment.

Embodiments 1 to 5 are 5 sequence sets generated using the above sequence generating mode 1, wherein the number of sequences contained in each sequence set is S=342, and of course any other S values can also be selected.

Embodiment 1

Table 1 is a set consisted of sequences with the length of 54, where the set totally includes 768 sequences, and each element of each sequence is a hexadecimal number, which represents a 4-bits binary bit (0 and 1) and the high position (order) is on the left and the low position (order) is on the right. In this case, the last two binary symbols of each sequence are 0 and 0, and during the modulation, these last two binary symbols are removed. Part or all of sequences of this sequence collection are used for a system in which the number of discrete Fourier transform points is $N_{FFT}$=512 and the number of transmission antennae is $N_{Tx}$=8 and are used as the middle pilot sequence. In this case, the middle pilots corresponding to all the antennae of each wireless communication networking unit totally occupy 432 subcarriers. Herein, the wireless communication networking unit can be one or more of the base station, the sector, the cell and the segment.

Embodiment 2

Table 2 is a set consisted of sequences with the length of 108, wherein the set totally includes 342 sequences, and each element of each sequence is a hexadecimal number, which represents a 4-bits binary bit (0 and 1) and the high position (order) is on the left and the low position (order) is on the right. Part or all of sequences of this sequence set are used for at least one of the following three systems and used as a middle pilot sequence:

System I: the number of discrete Fourier transform points is $N_{FFT}$=512 and the number of transmission antennae is $N_{Tx}$=2; wherein the middle pilots corresponding to all the antennae of each wireless communication networking unit totally occupy 216 subcarriers.

System II: the number of discrete Fourier transform points is $N_{FFT}$=512 and the number of transmission antennae is $N_{Tx}$=4; wherein the middle pilots corresponding to all the antennae of each wireless communication networking unit totally occupy 432 subcarriers.

System III: the number of discrete Fourier transform points is $N_{FFT}$=1024 and the number of transmission antennas is $N_{Tx}$=8. In this case, the middle pilots corresponding to all the antennas of each wireless communication networking unit totally occupy 864 subcarriers.

Embodiment 3

Table 3 is a set consisted of sequences with the length of 216, wherein the set totally includes 342 sequences, and each sequence is assigned with a specific base station. Each element of each sequence is a hexadecimal number, which represents a 4-hits binary bit (0 and 1) and the high position (order) is on the left and the low position (order) is on the right. Part or all of sequences of this set are used for at least one of the following four systems:

System I: the number of discrete Fourier transform points is $N_{FFT}$=512 and the number of transmission antennas is $N_{Tx}$=2; wherein the middle pilots corresponding to all the antennas of each wireless communication networking unit totally occupy 432 subcarriers.

System II: the number of discrete Fourier transform points is $N_{FFT}$=1024 and the number of transmission antennas is $N_{Tx}$=2. In this case, the middle pilots corresponding to all the antennas of each wireless communication networking unit totally occupy 864 subcarriers.

System III: the number of discrete Fourier transform points is $N_{FFT}$=1024 and the number of transmission antennas is $N_{Tx}$=4. In this case, the middle pilots corresponding to all the antennas of each wireless communication networking unit totally occupy 432 subcarriers.

System IV: the number of discrete Fourier transform points is $N_{FFT}$=2048 and the number of transmission antennas is $N_{Tx}$=8. In this case, the middle pilots corresponding to all the antennas of each wireless communication networking unit totally occupy 1728 subcarriers.

Embodiment 4

Table 4 is a set consisted of sequences with the length of 432, wherein the set totally includes 342 sequences. Each element of each sequence is a hexadecimal number, which represents a 4-bits binary bit (0 and 1). Part or all of sequences of this set are used for at least one of the following three systems:

System I: the number of discrete Fourier transform points is $N_{FFT}$=1024 and the number of transmission antennas is $N_{Tx}$=2. In this case, the middle pilots corresponding to all the antennae of each wireless communication networking unit totally occupy 864 subcarriers.

System II: the number of discrete Fourier transform points is $N_{FFT}$=2048 and the number of transmission antennae is $N_{Tx}$=2; wherein the middle pilots corresponding to all the antennae of each wireless communication networking unit totally occupy 864 subcarriers.

System III: the number of discrete Fourier transform points is $N_{FFT}$=2048 and the number of transmission antennae is $N_{Tx}$=4. In this case, the middle pilots corresponding to all the antennae of each wireless communication networking unit totally occupy 1728 subcarriers.

Embodiment 5

Table 5 is a set consisted of sequences with the length of 864, wherein the set totally includes 342 sequences, and each element of each sequence is a hexadecimal number, which represents a 4-bits binary bit (0 and 1) and the high position (order) is on the left and the low position (order) is on the right. Part or all of sequences of this sequence set are used for a system in which the number of discrete Fourier transform points is $N_{FFT}$=2048 and the number of transmission antennae is $N_{Tx}$=2 and are used as a middle pilot sequence. In this case, the middle pilots corresponding to all the antennae of each wireless communication networking unit totally occupy 1728 subcarriers.

Embodiments 6 to 10 are 5 sequence sets generated using the above sequence generating mode II, wherein the number of sequences contained in each sequence set is S=768, and of course any other S value can also be selected.

Embodiment 6

Table 6 is a set consisted of sequences with the length of 18, wherein the set totally includes 512 sequences, and each element of each sequence is a hexadecimal number, which represents a 4-bits binary bit (0 and 1) and the high position (order) is on the left and the low position (order) is on the right. In this case, the last two binary symbols of each sequence are 0 and 0, and during the modulation, these last two binary symbols are removed. Part or all of sequences of this sequence set are used for the system with the number of discrete Fourier transform points being $N_{FFT}$=512 and the number of transmission antennas being $N_{Tx}$=8 and used as a middle pilot sequence, wherein the middle pilots corresponding to all the antennae of each wireless communication networking unit totally occupy 144 subcarriers.

Embodiment 7

Table 7 is a set consisted of sequences with the length of 36, wherein the set totally includes 512 sequences, and each element of each sequence is a hexadecimal number, which represents a 4-bits binary bit (0 and 1) and the high position (order) is on the left and the low position (order) is on the right. This sequence is used for at least one of the following two systems and used as a middle pilot sequence:

System I: the number of discrete Fourier transform points is $N_{FFT}$=512 and the number of transmission antennae is $N_{Tx}$=4; wherein the middle pilots corresponding to all the antennae of each wireless communication networking unit totally occupy 144 subcarriers.

System II: the number of discrete Fourier transform points is $N_{FFT}$=1024 and the number of transmission antennae is $N_{Tx}$=8. In this case, the middle pilots corresponding to all the antennae of each wireless communication networking unit totally occupy 288 subcarriers.

Embodiment 8

Table 8 is a set consisted of sequences with the length of 72, wherein the set totally includes 114 sequences, and each sequence is assigned with a specific base station. Each element of each sequence is a hexadecimal number, which represents a 4-bits binary bit (0 and 1) and the high position (order) is on the left and the low position (order) is on the right. This sequence can be used for at least one of the following several systems and used as the middle pilot sequence:

System I: the number of discrete Fourier transform points is $N_{FFT}$=512 and the number of transmission antennae is $N_{Tx}$=2; wherein the middle pilots corresponding to all the antennae of each wireless communication networking unit totally occupy 144 subcarriers.

System II: the number of discrete Fourier transform points is $N_{FFT}$=1024 and the number of transmission antennae is $N_{Tx}$=4; wherein the middle pilots corresponding to all the antennae of each wireless communication networking unit totally occupy 288 subcarriers.

System III: the number of discrete Fourier transform points is $N_{FFT}$=2048 and the number of transmission antennae is $N_{Tx}$=8; wherein the middle pilots corresponding to all the antennae of each wireless communication networking unit totally occupy 576 subcarriers.

Embodiment 9

Table 9 is a set consisted of sequences with the length of 144, wherein the set totally includes 512 sequences, and each sequence is assigned with a specific base station. Each element of each sequence is a hexadecimal number, which represents a 4-bits binary bit (0 and 1). Part or all of sequences of this sequence set are used for at least one of the following two systems and used as the middle pilot sequence:

System I: the number of discrete Fourier transform points is $N_{FFT}$=1024 and the number of transmission antennae is $N_{Tx}$=2. In this case, the middle pilots corresponding to all the antennae of each wireless communication networking unit totally occupy 288 subcarriers.

System II: the number of discrete Fourier transform points is $N_{FFT}$=2048 and the number of transmission antennae is $N_{Tx}$=4. In this case, the middle pilots corresponding to all the antennae of each wireless communication networking unit totally occupy 576 subcarriers.

In the following embodiments, the starting position of available subcarriers is selected as $$-\frac{N_{used}}{2},$$

and it is not limited to this value in practice and can be otherwise set according to the requirements of the implementation.

Embodiment 10

Table 10 is a set consisted of sequences with the length of 288, wherein the set totally includes 114 sequences, and each element of each sequence is a hexadecimal number, which represents a 4-bits binary bit (0 and 1) and the high position (order) is on the left and the low position (order) is on the right. This sequence set are used for a system in which the number of discrete Fourier transform points is $N_{FFT}$=2048 and the number of transmission antennae is $N_{Tx}$=2 and used as the middle pilot sequence.

In the following embodiments, the starting position of available subcarriers is selected as $$-\frac{N_{used}}{2},$$

and it is not limited to this value in practice and can be otherwise set according to the requirements of the implementation.

In the following embodiment, all the sequences of each sequence set is used as the middle pilot sequence set under a specific system and a specific scene, and part of the sequences of the sequence set can also be used as the middle pilot sequence set under a specific system and a specific scene.

In the following embodiment 11-23, offset=0.

In the following embodiments 11-23, the correspondence relationship between cell index and corresponding middle pilot sequence set is: I=mod(CellID,MaxSeqNum) and of course other correspondences relationship can also be used.

In the following embodiments 11-23, when the elements of the sequence are mapped Onto the subcarriers, other carriers except for the zero carrier use the mode of elements of one sequence being mapped onto every other A subcarriers, and of course, other mapping modes can also be used to enable the elements of the sequence to be mapped onto the subcarriers, such as unequal interval mode, as long as each element of the sequence can be mapped onto different subcarriers.

Embodiment 11

As to a Cell ID=32 cell, the number of discrete Fourier transform points used is $N_{FFT}$=512, and 2 transmission antennae are used in the downlink, and the middle pilot sequence corresponding thereto is the sequence with the index of I=mod (32,768)=32 in Table 3.

In this case, the number of available subcarriers of the system is $N_{used}$=432 (except for DC subcarriers and protection bands on both sides of system bandwidth), and the interval of adjacent pilots of each antenna is $\Delta$=2, then the middle pilot QFDM symbol corresponding to antenna 1 is modulated to each binary element of the sequence with the index of 32 on the subcarriers with the index of [−216:2:−2,1:2:215] in order; the middle pilot OFDM symbol corresponding to antenna 2 is modulated to each binary element of the sequence with the index of 32 on the subcarriers with the index of [−215:2:−1,2:2:216] in order; as to each element of the sequence, the modulation method is as follows: if it is 0, then it is modulated to signal 1; if it is 1, then it is modulated to signal −1.

Sending of a Middle Pilot

Figure 5:
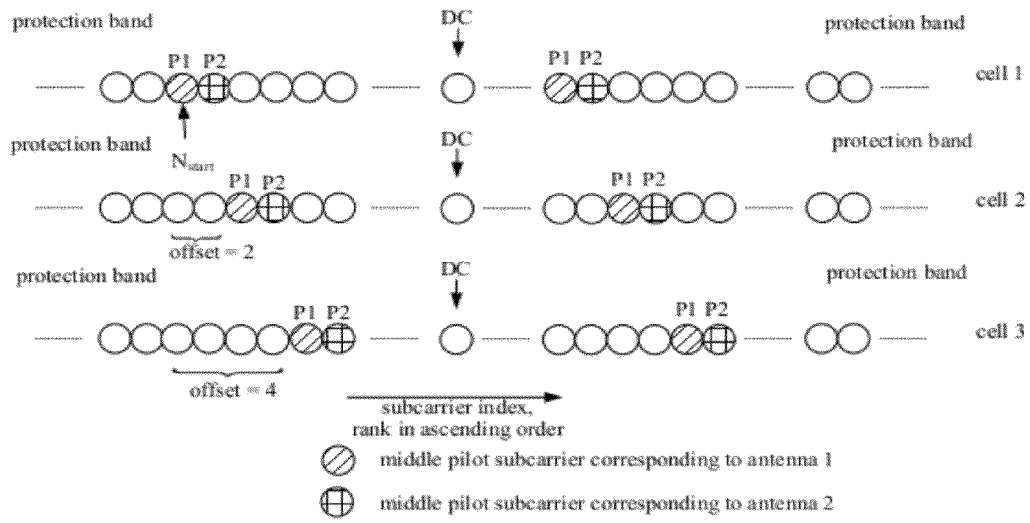
FIG. 5 is a second schematic diagram of a subcarrier of a middle pilot symbol of 2 transmission antennae in the frequency domain according to the embodiments of the present invention.
Figure 6:
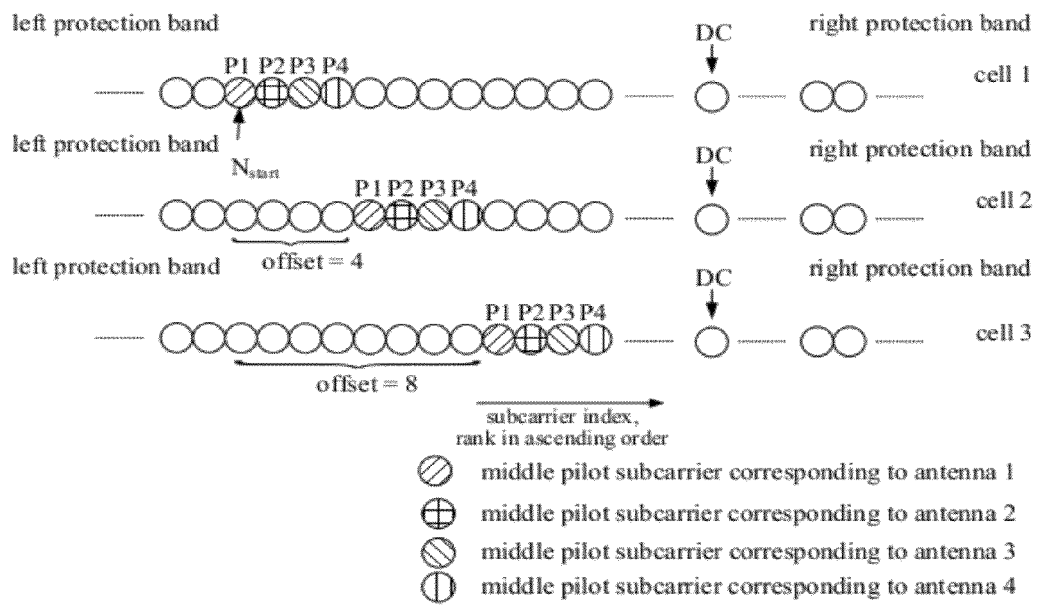
FIG. 6 is a second schematic diagram of a subcarrier of a middle pilot symbol of 4 transmission antennae in the frequency domain according to the embodiments of the present invention.
Figure 7:
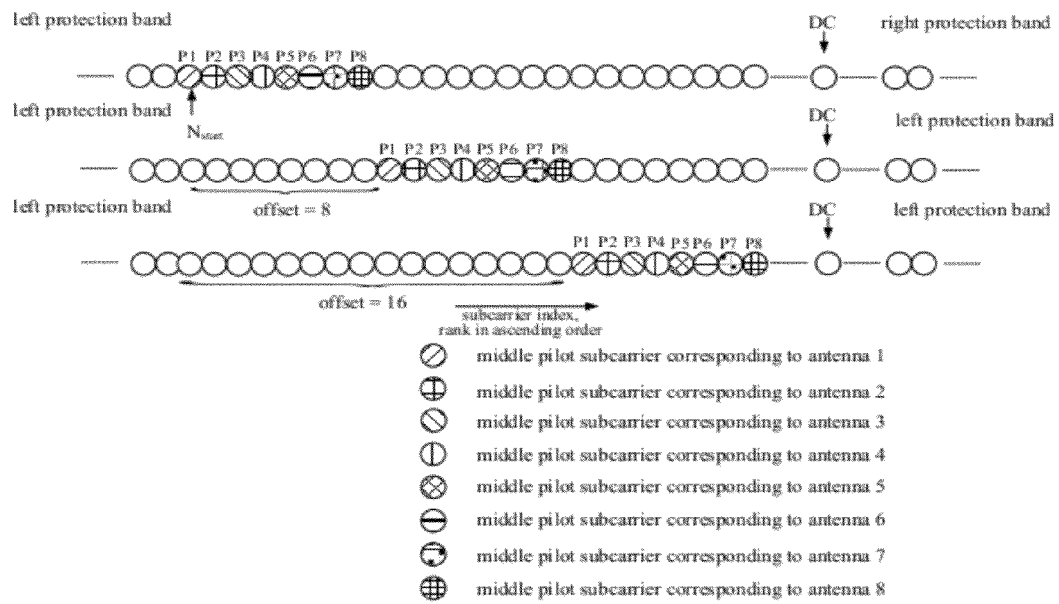
FIG. 7 is a second schematic diagram of a subcarrier of a middle pilot symbol of 8 transmission antennae in the frequency domain according to the embodiments of the present invention.

FIG. 2 is a first schematic diagram of a subcarrier of a middle pilot symbol of 2 transmission antennae in the frequency domain according to the embodiments of the present invention; FIG. 3 is a schematic diagram of a subcarrier of a middle pilot symbol of 4 transmission antennae in the frequency domain according to the embodiments of the present invention; FIG. 4 is a schematic diagram of a subcarrier of a middle pilot symbol of 8 transmission antennae in the frequency domain according to the embodiments of the present invention; FIG. 5 is a second schematic diagram of a subcarrier of a middle pilot symbol of 2 transmission antennae in the frequency domain according to the embodiments of the present invention; FIG. 6 is a second schematic diagram of a subcarrier of a middle pilot symbol of 4 transmission antennae in the frequency domain according to the embodiments of the present invention; and FIG. 7 is a second schematic diagram of a subcarrier of a middle pilot symbol of 8 transmission antennae in the frequency domain according to the embodiments of the present invention.

A method for sending a middle pilot is disclosed, which method comprises: setting subcarriers, the index of which meet the following condition, in the OFDMA or OFDM symbol as a union of the middle pilot subcarriers, which are used for transmitting middle pilot sequences, of all wireless communication networking units:

$$\left[ N_{start}:1:N_{start} + f\left(\frac{N_{used}-1}{2}\right) - 1, \right.$$
$$\left. N_{start} + f\left(\frac{N_{used}-1}{2}\right) + 1:1:N_{start}+N_{used}-1 \right],$$

which represents that the index increases to $$N_{start} + f\left(\frac{N_{used}-1}{2}\right) - 1$$

in the unit of 1 starting from $N_{start}$, and then increases to $N_{start}+N_{used}-1$ in the unit of 1 starting from $$N_{start} + f\left(\frac{N_{used}-1}{2}\right) + 1,$$

wherein both $N_{start}$ and $N_{used}$ are positive integer, wherein $N_{used}$ is the number of the subcarriers other than protection band subcarrier(s) in an OFDMA or OFDM system, and $$f\left(\frac{N_{used}-1}{2}\right)$$

represents the integral value by flooring the $$\frac{N_{used}-1}{2};$$

and the base station maps the middle pilot sequence after the modulation through an OFDMA or OFDM symbol for transmitting the middle pilot onto the middle pilot subcarrier in a union of the middle pilot subcarrier(s) corresponding to each transmission antenna, or, the base station maps the middle pilot sequence through an OFDMA or OFDM symbol for transmitting the middle pilot onto the middle pilot subcarrier in a union of the middle pilot subcarrier corresponding to each transmission antenna and then performs the modulation on data at the subcarrier.

The disclosed method for sending a middle pilot can avoid the periodicity of pilot symbols in the frequency domain and improve downlink performance of user data.

Embodiment 12

As to a cell with Cell ID=32, the number of discrete Fourier transform points used is $N_{FFT}$=512, and 4 transmission antennae are used in the downlink, and the middle pilot sequence corresponding thereto is a sequence with the index of I=mod (32, 768)=32 in Table 2.

In this case, the number of available subcarriers which can be used for transmitting the middle pilot sequence in the system is $N_{used}$=432 (except DC subcarriers and protection bands on both sides of system bandwidth), and the interval of the adjacent pilots of each antenna, is Δ=4, then the middle pilot OFDM symbol corresponding to antenna 1 is modulated to the sequence with the index of 32 on the subcarriers with the index of [−216:4:−4,1:4:213] (as shown in FIG. 3); the middle pilot OFDM symbol corresponding to antenna 2 is modulated to the sequence with the index of 32 on the subcarriers with the index of [−215:4:−3,2:4:214]; the middle pilot OFDM symbol corresponding to antenna 3 is modulated to the sequence with the index of 32 on the subcarriers with the index of [−214:4:−2,3:4:215]; the middle pilot OFDM symbol corresponding to antenna 4 is modulated to the sequence with the index of 32 on the subcarriers with the index of [−213:4:−1,4:4:216].

The modulation method used in the above processing is as follows: as to each element of the sequence, if it is 0, then it is modulated as signal 1, if it is 1, then it is modulated as signal −1.

Embodiment 13

As to a cell with Cell ID=32, the number of discrete Fourier transform points used is $N_{FFT}$=512, and 8 transmission antennas are used in the downlink, and the middle pilot sequence corresponding thereto is a sequence with the index of I=mod (32,768)=32 in Table 1.

In this case, the number of available subcarriers which can be used for transmitting the middle pilot sequence in the system is $N_{used}$=432 (except for DC subcarriers and protection bands on both sides of system bandwidth), and the interval of adjacent pilots of each antenna is Δ=8, then the middle pilot OFDM symbol corresponding to antenna 1 is modulated to each binary element of the sequence with the index of 32 on the subcarriers with the index of [−216:8:−8,1:8:209] in order; the middle pilot OFDM symbol corresponding to antenna 2 is modulated to each binary element of the sequence with the index of 32 on the subcarriers with the index of [−215:8:−7,2:8:210] in order; the middle pilot OFDM symbol corresponding to antenna 3 is modulated to each binary element of the sequence with the index of 32 on the subcarriers with the indexes of [−214:8:−6,3:8:211] in order; the middle pilot OFDM symbol corresponding to antenna 4 is modulated to each binary element of the sequence with the index of 32 on the subcarriers with the indexes of [−213:8:−5, 4:8:212] in order; then the middle pilot OFDM symbol corresponding to antenna 5 is modulated to each binary element of the sequence with the index of 32 on the subcarriers with the indexes of [−212:8:−4,5:8:213] in order; the middle pilot OFDM symbol corresponding to antenna 6 is modulated to each binary element of the sequence with the index of 32 on the subcarriers with the indexes of [−211:8:−3,6:8:214] in order; then the middle pilot OFDM symbol corresponding to antenna 7 is modulated to each binary element in the sequence with the index of 32 on the subcarriers with the indexes of [−210:8:−2,7:8:215] in order; and the middle pilot OFDM symbol corresponding to antenna 8 is modulated to each binary element of the sequence with the index of 32 on the subcarriers with the indexes of [−209:8:−1,8:8:216] in order.

The modulation method used in the above processing is as follows: as to each element of the sequence, if it is 0, then it is modulated as signal 1, if it is 1, then it is modulated as signal −1.

Embodiment 14

As to the cell with any Cell ID, such as Cell ID=78, the number of discrete Fourier transform points used is $N_{FFT}$=1024, and 2 transmission antennae are used in the downlink, and the middle pilot sequence corresponding thereto is a sequence with the index of I=mod(78,768)=78 in Table 4.

In this case, the number of available subcarriers of the system is $N_{used}$=864 (except for DC subcarriers and protection bands on both sides of system bandwidth), and the interval of adjacent pilots of each antenna is Δ=2, the middle pilot OFDM symbol corresponding to antenna 1 is modulated to each binary element in the sequence with the index of 78 on the subcarriers with the indexes of [−432:2:−2,1:2:431] in order; and the middle pilot OFDM symbol corresponding to antenna 2 is modulated to each binary element in the sequence with the index of 78 on the subcarriers with the indexes of [−431:2:−1,2:2:432] in order.

The modulation method used in the above processing is as follows: as to each element of the sequence, if it is 0, then it is modulated as signal 1, if it is 1, then it is modulated as signal −1.

Embodiment 15

As to the cell with any Cell ID, such as Cell ID=368, the number of discrete Fourier transform points used is $N_{FFT}$=1024, and 4 transmission antennae are used in the downlink, and the middle pilot sequence corresponding thereto is a sequence with the index of I=mod (794,768)=26 in Table 3.

In this case, the number of available subcarriers in the system is $N_{used}$=864 (expect DC subcarriers and protection bands on both sides of system bandwidth), and the interval of adjacent pilots of each antenna is Δ=4, then the middle pilot OFDM symbol corresponding to antenna 1 is modulated to the sequence with the index of 26 on the subcarriers with the indexes of [−432:4:−4,1:4:429]; the middle pilot OFDM symbol corresponding to antenna 2 is modulated to each binary element in the sequence with the index of 26 on the subcarriers with the indexes of [−431:4:−3,2:4:430] in order; the middle pilot OFDM symbol corresponding to antenna 3 is modulated to each binary element in the sequence with the index of 26 on the subcarriers with the indexes of [−430:4:−2,3:4:431] in order; and the middle pilot OFDM symbol corresponding to antenna 4 is modulated to each binary element in the sequence with the index of 26 on the subcarriers with the indexes of [−429:4:−1,4:4:432] in order.

The modulation method used in the above processing is as follows: as to each element of the sequence, if it is 0, then it is modulated as signal 1, if it is 1, then it is modulated as signal −1.

Embodiment 16

As to the cell with any Cell ID, such as Cell ID=78, the number of discrete Fourier transform points used is $N_{FFT}$=1024, and 8 transmission antennae are used in the downlink, and the middle pilot sequence corresponding thereto is a sequence with the index of I=mod(794,768)=78 in Table 2.

In this case, the number of available subcarriers in the system is $N_{used}$=864 (except for DC subcarriers and protection bands on both sides of system bandwidth), and the interval of adjacent pilots of each antenna is Δ=8, then the middle pilot OFDM symbol corresponding to antenna 1 is modulated to each binary element in the sequence with the index of 78 on the subcarriers with the indexes of [−432:8:−8,1:8:425] in order; the middle pilot OFDM symbol corresponding to antenna 2 is modulated to each binary element in the sequence with the index of 78 on the subcarriers with the indexes of [−431:8:−7,2:8:426] in order; the middle pilot QFDM symbol corresponding to antenna 3 is modulated to each binary element in the sequence with the index of 78 on the subcarriers with the indexes of [−430:8:−6,3:8:427] in order; the middle pilot OFDM symbol corresponding to antenna 4 is modulated to each binary element in the sequence with the index of 78 on the subcarriers with the indexes of [−429:8:−5,4:8:428] in order; the middle pilot OFDM symbol corresponding to antenna 5 is modulated to each binary element in the sequence with the index of 78 on the subcarriers with the indexes of [−428:8:−4,5:8:429] in order; the middle pilot OFDM symbol corresponding to antenna 6 is modulated to each binary element in the sequence with the index of 78 on the subcarriers with the indexes of [−427:8:−3,6:8:430] in order; the middle pilot OFDM symbol corresponding to antenna 7 is modulated to each binary element in the sequence with the index of 78 on the subcarriers with the indexes of [−426:8:−2,7:8:431] in order; and the middle pilot OFDM symbol corresponding to antenna 8 is modulated to each binary element in the sequence with the index of 78 on the subcarriers with the indexes of [−425:8:−1,8:8:432] in order.

The modulation method used in the above processing is as follows: as to each element of the sequence, if it is 0, then it is modulated as signal 1, if it is 1, then it is modulated as signal −1.

Embodiment 17

As to the cell with any Cell ID, such as Cell ID=78, the number of discrete Fourier transform points used is $N_{FFT}$=2048, and 2 transmission antennae are used in the downlink, and the middle pilot sequence corresponding thereto is a sequence with the index of I=mod(78,768) 78 in Table 5.

In this case, the number of available subcarriers of the system is $N_{used}$=1728 (except for DC subcarriers and protection bands on both sides of system bandwidth), and the interval of adjacent pilots of each antenna is $\Delta$=2, the middle pilot OFDM symbol corresponding to antenna 1 is modulated to each binary element in the sequence with the index of 78 on the subcarriers with the indexes of [−864:2:−2,1:2:863] in order; the middle pilot OFDM symbol corresponding to antenna 2 is modulated to each binary element in the sequence with the index of 78 on the subcarriers with the indexes of [−863:2:−1,2:2:864] in order.

The modulation method used in the above processing is as follows: as to each element of the sequence, if it is 0, then it is modulated as signal 1, if it is 1, then it is modulated as signal −1.

Embodiment 18

As to the cell with any Cell ID, such as Cell ID=368, the number of discrete Fourier transform points used is $N_{FFT}$=2048, and 4 transmission antennae are used in the downlink, and the middle pilot sequence corresponding thereto is a sequence with the index of I=mod(794,768)=26 in Table 4.

In this case, the number of available subcarriers in the system is $N_{used}$=1728 (except for DC subcarriers and protection bands on both sides of system bandwidth), and the interval of adjacent pilots of each antenna is $\Delta$=4, then the middle pilot OFDM symbol corresponding to antenna 1 is modulated to the sequence with the index of 26 on the subcarriers with the indexes of [−864:4:−4,1:4:861]; the middle pilot OFDM symbol corresponding to antenna 2 is modulated to each binary element in the sequence with the index of 26 on the subcarriers with the indexes of [−863:4:−3,2:4:862] in order; the middle pilot OFDM symbol corresponding to antenna 3 is modulated to each binary element in the sequence with the index of 26 on the subcarriers with the indexes of [−862:4:−2,3:4:863] in order; and the middle pilot OFDM symbol corresponding to antenna 4 is modulated to each binary element in the sequence with the index of 26 on the subcarriers with the indexes of [−861:4:−1,4:4:864] in order.

The modulation method used in the above processing is as follows: as to each element of the sequence, if it is 0, then it is modulated as signal 1, if it is 1, then it is modulated as signal −1.

Embodiment 19

As to the cell with any Cell ID, such as Cell ID=368, the number of discrete Fourier transform points used is $N_{FFT}$=2048, and 8 transmission antennae are used in the downlink, and the middle pilot sequence corresponding thereto is a sequence with the index of I=mod(794,768)=26 in Table 3.

In this case, the number of available subcarriers in the system is $N_{used}$=1728 (except for DC subcarriers and protection bands on both sides of system bandwidth), and the interval of adjacent pilots of each antenna is $\Delta$=8, then the middle pilot OFDM symbol corresponding to antenna 1 is modulated to the sequence with the index of 26 on the subcarriers with the indexes of [−864:8:−8,1:8:857]; the middle pilot OFDM symbol corresponding to antenna 2 is modulated to each binary element in the sequence with the index of 26 on the subcarriers with the indexes of [−863:8:−7,2:8:858] in order; the middle pilot OFDM symbol corresponding to antenna 3 is modulated to each binary element in the sequence with the index of 26 on the subcarriers with the indexes of [−862:8:−6,3:8:859] in order; the middle pilot OFDM symbol corresponding to antenna 4 is modulated to each binary element in the sequence with the index of 26 on the subcarriers with the indexes of [−861:8:−5,4:8:860] in order; then the middle pilot OFDM symbol corresponding to antenna 5 is modulated to each binary element in the sequence with the index of 26 on the subcarriers with the indexes of [−860:8:−4,5:8:861] in order; the middle pilot OFDM symbol corresponding to antenna 6 is modulated to each binary element in the sequence with the index of 26 on the subcarriers with the indexes of [−859:8:−3,6:8:862] in order; the middle pilot OFDM symbol corresponding to antenna 7 is modulated to each binary element in the sequence the index of which is 26 on the subcarriers with the indexes of [−858:8:−2,7:8:863] in order; and the middle pilot OFDM symbol corresponding to antenna 8 is modulated to each binary element in the sequence the index of which is 26 on the subcarriers with the indexes of [−857:8:−1,8:8:864] in order.

The modulation method used in the above processing is as follows: as to each element of the sequence, if it is 0, then it is modulated as signal 1, if it is 1, then it is modulated as signal −1.

Embodiment 20

As to the cell with any Cell ID, such as Cell ID=368, the number of discrete Fourier transform points used is $N_{FFT}$=512, and 2 transmission antennae are used in the downlink, and the middle pilot sequence corresponding thereto is a sequence with the index of I=mod(794,768)=26 in Table 2.

In this case, the number of available subcarriers of the system is $N_{used}$=432 (except for DC subcarriers and protection bands on both sides of system bandwidth), and the interval of adjacent pilots of each antenna is Δ=4, the middle pilot OFDM symbol corresponding to antenna 1 is modulated to each binary element in the sequence with the index of 26 on the subcarriers with the indexes of [−216:4:−4,1:4:213] in order; and the middle pilot OFDM symbol corresponding to antenna 2 is modulated to each binary element in the sequence with the index of 26 on the subcarriers with the indexes of [−215:4:−3,2:4:214] in order.

The modulation method used in the above processing is as follows: as to each element of the sequence, if it is 0, then it is modulated as signal 1, if it is 1, then it is modulated as signal −1.

Embodiment 21

As to the cell with any Cell ID, such as Cell ID=368, the number of discrete Fourier transform points used is $N_{FFT}$=1024, and 2 transmission antennae are used in the downlink, and the middle pilot sequence corresponding thereto is a sequence with the index of I=mod(794,768)=26 in Table 3.

In this case, the number of available subcarriers of the system is $N_{used}$=864 (except for DC subcarriers and protection bands on both sides of system bandwidth), and the interval of adjacent pilots of each antenna is Δ=4, the middle pilot OFDM symbol corresponding to antenna 1 is modulated to each binary element in the sequence with the index of 26 on the subcarriers with the indexes of [−432:4:−4,1:4:429] in order; the middle pilot OFDM symbol corresponding to antenna 2 is modulated to each binary element in the sequence with the index of 26 on the subcarriers with the indexes of [−431:4:−3,2:4:430] in order.

The modulation method used in the above processing is as follows: as to each element of the sequence, if it is 0, then it is modulated as signal 1, if it is 1, then it is modulated as signal −1.

Embodiment 22

As to the cell with any Cell ID, such as Cell ID=368, the number of discrete Fourier transform points used is $N_{FFT}$=2048, and 2 transmission antennae are used in the downlink, and the middle pilot sequence corresponding thereto is a sequence with the index of I=mod(794,768)=26 in Table 4.

In this case, the number of available subcarriers of the system is $N_{used}$=1728 (except for DC subcarriers and protection bands on both sides of system bandwidth), and the interval of adjacent pilots of each antenna is Δ=4, the middle pilot OFDM symbol corresponding to antenna 1 is modulated to each binary element in the sequence with the index of 26 on the subcarriers with the indexes of [−864:4:−4,1:4:861] in order; and the middle pilot OFDM symbol corresponding to antenna 2 is modulated to each binary element in the sequence with the index of 26 on the subcarriers with the indexes of [−863:4:−3,2:4:862] in order.

The modulation method used in the above processing is as follows: as to each element of the sequence, if it is 0, then it is modulated as signal 1, if it is 1, then it is modulated as signal −1.

Embodiment 23

As to the cell with any Cell ID, such as Cell ID=368, the number of discrete Fourier transform points used is $N_{FFT}$=2048, and 2 transmission antennae are used in the downlink, and the middle pilot sequence corresponding thereto is a sequence with the index of I=mod(794,768) 26 in Table 5.

In this case, the number of available subcarriers of the system is $N_{used}$=1728 (except for DC subcarriers and protection bands on both sides of system bandwidth), and the interval of adjacent pilots of each antenna is Δ=2, the middle pilot OFDM symbol corresponding to antenna 1 is modulated to each binary element in the sequence with the index of 26 on the subcarriers with the indexes of [−864:2:−2,1:4:863] in order; and the middle pilot OFDM symbol corresponding to antenna 2 is modulated to each binary element in the sequence with the index of 26 on the subcarriers with the indexes of [−863:2:−1,2:2:864] in order.

The modulation method used in the above processing is as follows: as to each element of the sequence, if it is 0, then it is modulated as signal 1, if it is 1, then it is modulated as signal −1.

In the following embodiment, the middle pilot subcarriers occupied by all the antennae of each cell are ⅓ of the available subcarriers.

Embodiment 24

As to three cells Cell IDs of which are respectively 97, the number of discrete Fourier transform points used is $N_{FFT}$=512, and 2 transmission antennae are used in the downlink, and the middle pilot sequence corresponding thereto is a sequence with the index of $$I = \mod\left(\left\lfloor \frac{97}{3} \right\rfloor, 512\right) = 32$$

in Table 8.

In this case, the number of available subcarriers of the system is $N_{used}$=432 (except for DC subcarriers and protection bands on both sides of system bandwidth), and the interval of adjacent pilots of each antenna is Δ=6, offset=mod(97, 3)*$N_{Tx}$=2, then the middle pilot OFDM symbol corresponding to antenna 1 of the cell with CellId=97 is modulated to each binary element in the sequence with the index of 32 on the subcarriers with the indexes of [−214:6:−4,3:6:213] in order; and the middle pilot OFDM symbol corresponding to antenna 2 is modulated to each binary element in the sequence with the index of 32 on the subcarriers with the indexes of [−213:6:−3,4:6:214] in order; as to each element of the sequence, the modulation method is as follows: if it is 0, then it is modulated to signal 1; if it is 1, then it is modulated to signal −1.

Embodiment 25

As to a cell with Cell ID=97, the number of discrete Fourier transform points used is $N_{FFT}$=512, and 4 transmission antennae are used in the downlink, and the middle pilot sequence corresponding thereto is a sequence with the index of $$I = \mod\left(\left\lfloor \frac{97}{2} \right\rfloor, 512\right) = 32$$

in Table 7.

In this case, the number of available subcarriers which can be used for transmitting the middle pilot sequence in the system is $N_{used}$=432 (except for DC subcarriers and protection bands on both sides of system bandwidth), and the interval of adjacent pilots of each antenna is Δ=12 and offset=mod (97,3)*$N_{Tx}$=4, then the middle pilot OFDM symbol corresponding to antenna 1 is modulated to the sequence with the index of 32 on the subcarriers with the indexes of [−212: 12:−8,5:12:209] (as shown in FIG. 3); the middle pilot OFDM symbol corresponding to antenna 2 is modulated to the sequence with the index of 32 on the subcarriers with the indexes of [−211:12:−7,6:12:210]; the middle pilot OFDM symbol corresponding to antenna 3 is modulated to the sequence with the index of 32 on the subcarriers with the indexes of [−210:12:−6,7:12:211]; and the middle pilot OFDM symbol corresponding to antenna 4 is modulated to the sequence with the index of 32 on the subcarriers with the indexes of [−209:12:−5,8:12:212].

The modulation method used in the above processing is as follows: as to each element of the sequence, if it is 0, then it is modulated as signal 1, if it is 1, then it is modulated as signal −1.

Embodiment 26

As to a cell with Cell ID=97, the number of discrete Fourier transform points used is $N_{FFT}$=512, and 8 transmission antennae are used in the downlink, and the middle pilot sequence corresponding thereto is a sequence with the index of $$I = \mod\left(\left\lfloor\frac{97}{3}\right\rfloor, 512\right) = 32$$

in Table 6.

In this case, the number of available subcarriers which can be used for transmitting the middle pilot sequence in the system is $N_{used}$=432 (except for DC subcarriers and protection bands on both sides of system bandwidth), and the interval of adjacent pilots of each antenna is Δ=24 and offset=mod (97,3)*$N_{Tx}$=8, then the middle pilot OFDM symbol corresponding to antenna 1 is modulated to each binary element in the sequence with the index of 32 on the subcarriers with the indexes of [−208:24:−16,9:24:201] in order; and the middle pilot OFDM symbol corresponding to antenna 2 is modulated to each binary element in the sequence with the index of 32 on the subcarriers with the indexes of [−207:24:45,10:24:202] in order; then the middle pilot OFDM symbol corresponding to antenna 3 is modulated to each binary element in the sequence with the index of 32 on the subcarriers with the indexes of [−206:24:−14,11:24:203] in order; the middle pilot OFDM symbol corresponding to antenna 4 is modulated to each binary element in the sequence with the index of 32 on the subcarriers with the indexes of [−205:24:−13,12:24:204] in order; then the middle pilot OFDM symbol corresponding to antenna 5 is modulated to each binary element in the sequence with the index of 32 on the subcarriers with the indexes of [−204:24:−12,13:24:205] in order; and the middle pilot OFDM symbol corresponding to antenna 6 is modulated to each binary element in the sequence with the index of 32 on the subcarriers with the indexes of [−203:24:−11,14:24:206] in order; and then the middle pilot OFDM symbol corresponding to antenna 7 is modulated to each binary element in the sequence with the index of 32 on the subcarriers with the indexes of [−202:24:−10,15:24:207] in order; and the middle pilot OFDM symbol corresponding to antenna 8 is modulated to each binary element in the sequence with the index of 32 on the subcarriers with the indexes of [−201:24:−9,16:24:208] in order.

The modulation method used in the above processing is as follows: as to each element of the sequence, if it is 0, then it is modulated as signal 1, if it is 1, then it is modulated as signal −1.

Embodiment 27

As to the cell with any Cell ID, such as Cell ID=236, the number of discrete Fourier transform points used is $N_{FFT}$=1024, and 2 transmission antennae are used in the downlink, and the middle pilot sequence corresponding thereto is a sequence with the index of $$I = \mod\left(\left\lfloor\frac{236}{3}\right\rfloor, 512\right) = 78$$

in Table 9.

In this case, the number of available subcarriers of the system is $N_{used}$=864 (except for DC subcarriers and protection bands on both sides of system bandwidth), and the interval of adjacent pilots of each antenna is Δ=6 and offset=mod (236,3)*$N_{Tx}$=4, the middle pilot OFDM symbol corresponding to antenna 1 is modulated to each binary element in the sequence with the index of 78 on the subcarriers with the indexes of [−428:6:−2,5:2:431] in order; and the middle pilot OFDM symbol corresponding to antenna 2 is modulated to each binary element in the sequence with the index of 78 on the subcarriers with the indexes of [−427:6:−1,6:6:432] in order.

The modulation method used in the above processing is as follows: as to each element of the sequence, if it is 0, then it is modulated as signal 1, if it is 1, then it is modulated as signal −1.

Embodiment 28

As to the cell with any Cell ID, such as Cell ID=78, the number of discrete Fourier transform points used is $N_{FFT}$=1024, and 4 transmission antennae are used in the downlink, and the middle pilot sequence corresponding thereto is a sequence with the index of $$I = \mod\left(\left\lfloor\frac{78}{3}\right\rfloor, 512\right) = 26$$

in Table 8.

In this case, the number of available subcarriers in the system is $N_{used}$=864 (except for DC subcarriers and protection bands on both sides of system bandwidth), and the interval of adjacent pilots of each antenna is Δ=12, and offset=mod (78,3)*$N_{Tx}$=0, then the middle pilot OFDM symbol corresponding to antenna 1 is modulated to each binary element in the sequence with the index of 26 on the subcarriers with the indexes of [−432:12:−12,1:12:421] in order; the middle pilot OFDM symbol corresponding to antenna 2 is modulated to each binary element in the sequence with the index of 26 on the subcarriers with the indexes of [−431:12:−11,2:12:422] in order; the middle pilot OFDM symbol corresponding to antenna 3 is modulated to each binary element in the sequence with the index of 26 on the subcarriers with the indexes of [−430:12:−10,3:12:423] in order; and the middle pilot OFDM symbol corresponding to antenna 4 is modulated to each binary element in the sequence with the index of 26 on the subcarriers with the indexes of [−429:12:−9,4:12:424] in order.

The modulation method used in the above processing is as follows: as to each element of the sequence, if it is 0, then it is modulated as signal 1, if it is 1, then it is modulated as signal −1.

Embodiment 29

As to the cell with any Cell ID, such as Cell ID=236, the number of discrete Fourier transform points used is $N_{FFT}=1024$, and 8 transmission antennae are used in the downlink, and the middle pilot sequence corresponding thereto is a sequence with the index of $$I = \mathrm{mod}\left(\left\lfloor \frac{236}{3} \right\rfloor, 512\right) = 78$$

in Table 7.

In this case, the number of available subcarriers in the system is $N_{used}=864$ (except for DC subcarriers and protection bands on both sides of system bandwidth), and the interval of adjacent pilots of each antenna is $\Delta=24$ and offset=mod $(236,3)*N_{Tx}=16$, the middle pilot OFDM symbol corresponding to antenna 1 is modulated to each binary element in the sequence with the index of 78 on the subcarriers with the indexes of [−416:24:−8,17:24:425] in order; the middle pilot OFDM symbol corresponding to antenna 2 is modulated to each binary element in the sequence with the index of 78 on the subcarriers with the indexes of [−415:24:−7,18:24:426] in order; the middle pilot OFDM symbol corresponding to antenna 3 is modulated to each binary element in the sequence with the index of 78 on the subcarriers with the indexes of [−414:8:−6,19:24:427] in order; the middle pilot OFDM symbol corresponding to antenna 4 is modulated to each binary element in the sequence with the index of 78 on the subcarriers with the indexes of [−413:24:−5,20:8:428] in order; the middle pilot OFDM symbol corresponding to antenna 5 is modulated to each binary element in the sequence with the index of 78 on the subcarriers with the indexes of [−412:24:−4,21:24:429] in order; the middle pilot OFDM symbol corresponding to antenna 6 is modulated to each binary element in the sequence with the index of 78 on the subcarriers with the indexes of [−411:24:−3,22:24:430] in order; the middle pilot OFDM symbol corresponding to antenna 7 is modulated to each binary element in the sequence with the index of 78 on the subcarriers with the indexes of [−410:24:−2,23:24:431] in order; and the middle pilot OFDM symbol corresponding to antenna 8 is modulated to each binary element in the sequence with the index of 78 on the subcarriers with the indexes of [−409:24:−1.24:24:432] in order.

The modulation method used in the above processing is as follows: as to each element of the sequence, if it is 0, then it is modulated as signal 1, if it is 1, then it is modulated as signal −1.

Embodiment 30

As to the cell with any Cell ID, such as Cell ID=236, the number of discrete Fourier transform points used is $N_{FFT}=2048$, and 2 transmission antennae are used in the downlink, and the middle pilot sequence corresponding thereto is a sequence with the index of $$I = \mathrm{mod}\left(\left\lfloor \frac{236}{3} \right\rfloor, 512\right) = 78$$

in Table 10.

In this case, the number of available subcarriers of the system is $N_{used}=1728$ (except for DC subcarriers and protection bands on both sides of system bandwidth), and the interval of adjacent pilots of each antenna is $\Delta=6$ and offset=mod $(236,3)*N_{Tx}=4$, the middle pilot OFDM symbol corresponding to antenna 1 is modulated to each binary element in the sequence with the index of 78 on the subcarriers with the indexes of [−860:6:−2,5:6:863] in order; and the middle pilot OFDM symbol corresponding to antenna 2 is modulated to each binary element in the sequence with the index of 78 on the subcarriers with the indexes of [−859:6:−1,6:6:864] in order.

The modulation method used in the above processing is as follows: as to each element of the sequence, if it is 0, then it is modulated as signal 1, if it is 1, then it is modulated as signal −1.

Embodiment 31

As to the cell with any Cell ID, such as Cell ID=78, the number of discrete Fourier transform points used is $N_{FFT}=2048$, and 4 transmission antennae are used in the downlink, and the middle pilot sequence corresponding thereto is a sequence with the index of $$I = \mathrm{mod}\left(\left\lfloor \frac{78}{3} \right\rfloor, 512\right) = 26$$

in Table 9.

In this case, the number of available subcarriers which can be used for transmitting the middle pilot sequence in the system is $N_{used}=1728$ (except for DC subcarriers and protection bands on both sides of system bandwidth), and the interval of adjacent pilots of each antenna is $\Delta=12$ and offset=mod $(78,3)*N_{Tx}=0$ then the middle pilot OFDM symbol corresponding to antenna 1 is modulated to the sequence with the index of 26 on the subcarriers with the indexes of [−864:12:−12,1:12:853] in order; the middle pilot OFDM symbol corresponding to antenna 2 is modulated to each binary element in the sequence with the index of 26 on the subcarriers with the indexes of [−863:12:−11,2:12:854] in order; the middle pilot OFDM symbol corresponding to antenna 3 is modulated to each binary element in the sequence with the index of 26 on the subcarriers with the indexes of [−862:12:−10,3:12:855] in order; and the middle pilot OFDM symbol corresponding to antenna 4 is modulated to each binary element in the sequence with the index of 26 on the subcarriers with the indexes of [−861:12:−9,3:12:856] in order.

The modulation method used in the above processing is as follows: as to each element of the sequence, if it is 0, then it is modulated as signal 1, if it is 1, then it is modulated as signal −1.

Embodiment 32

As to the cell with any Cell ID, such as Cell ID=78, the number of discrete Fourier transform points used is $N_{FFT}$=2048, and 8 transmission antennae are used in the downlink, and the middle pilot sequence corresponding thereto is a sequence with the index of $$I = \mod\left(\left\lfloor \frac{78}{3} \right\rfloor, 512\right) = 26$$

in Table 3.

In this case, the number of available subcarriers of the system is $N_{used}$=1728 (except for DC subcarriers and protection bands on both sides of system bandwidth), and the interval of adjacent pilots of each antenna is $\Delta$=24 and offset=mod (78,3)*$N_{Tx}$=0, then the middle pilot OFDM symbol corresponding to antenna 1 is modulated to the sequence with the index of 26 on the subcarriers with the indexes of [−864: 24:−24,1:24:841]; the middle pilot OFDM symbol corresponding to antenna 2 is modulated to each binary element in the sequence with the index of 26 on the subcarriers with the indexes of [−863:24:−23,2:24:842] in order; the middle pilot OFDM symbol corresponding to antenna 3 is modulated to each binary element in the sequence with the index of 26 on the subcarriers with the indexes of [−862:24:−22,3:24:843]; the middle pilot OFDM symbol corresponding to antenna 4 is modulated to each binary element in the sequence with the index of 26 on the subcarriers with the indexes of [−861:24:− 21,4:24:844]; then the middle pilot OFDM symbol corresponding to antenna 5 is modulated to each binary element in the sequence with the index of 26 on the subcarriers with the indexes of [−860:24:−20,4:24:845]; the middle pilot OFDM symbol corresponding to antenna 6 is modulated to each binary element in the sequence with the index of 26 on the subcarriers with the indexes of [−859:24:−19,5:24:846]; the middle pilot OFDM symbol corresponding to antenna 7 is modulated to each binary element in the sequence with the index of 26 on the subcarriers with the indexes of [−858:24:− 18,6:24:847]; and the middle pilot OFDM symbol corresponding to antenna 8 is modulated to each binary element in the sequence with the index of 26 on the subcarriers with the indexes of [−857:24:−17,8:24:848].

The modulation method used in the above processing is as follows: as to each element of the sequence, if it is 0, then it is modulated as signal 1, if it is 1, then it is modulated as signal −1.

The following embodiments describe the index of the middle pilot indexed by the wireless communication networking unit in a subset of a specific sequence set.

Embodiment 33

The sum of the number of middle pilot subcarriers occupied by all the transmission antennae of the wireless communication networking unit is equal to $N_{used}$, the index of the middle pilot sequence of a cell with the cell index of CellID in a specific sequence set or a subset thereof is I=f(CellID, MaxSeqNum)=mod(CellID,MaxSeqNum).

Embodiment 34

The sum of the number of middle pilot subcarriers occupied by all the transmission antennae of the wireless communication networking unit is equal to $$\frac{N_{used}}{3},$$

the index of the middle pilot sequence of a cell with the cell index of CellID in a specific sequence set or a subset thereof is $$I = f(CellID, MaxSeqNum) = \mod\left(\left\lfloor \frac{CellID}{3} \right\rfloor, MaxSeqNum\right);$$

and the corresponding middle pilot subcarrier offset thereof is offset=mod(CellID,3)*$N_{Tx}$.

Embodiment 35

The sum of the number of middle pilot subcarriers occupied by all the transmission antennae of the wireless communication networking unit is equal to $N_{used}$, the index of the middle pilot sequence of a cell with the cell index of CellID in a specific sequence set or a subset thereof is as follows:

I=f(CellID,MaxSeqNum)=mod(3*CellID+SegmentID,MaxSeqNum).

TABLE 1

| $N_{FFT}$ = 512, $N_{Tx}$ = 8 length = 54 | |
|---|---|
| Index | Midamble Sequence |
| 0 | 2E17472E001AF4 |
| 1 | 194597A201B920 |
| 2 | 650BB1206A73CC |
| 3 | 8853785B743228 |
| 4 | A35514F80769C0 |
| 5 | B9E109D20B1450 |
| 6 | F850AE26789360 |
| 7 | 91941D60772688 |
| 8 | 164961F9D42128 |
| 9 | 375052CCD18A54 |
| 10 | 73F2134A341084 |
| 11 | 611FC2C6CD48C4 |
| 12 | 0F88C97435A810 |
| 13 | A075299D634434 |
| 14 | 1327870E935054 |
| 15 | 42A8467F10494C |
| 16 | BB342237092DE0 |
| 17 | A0A21B7A166AD0 |
| 18 | 5A41C5076603A4 |
| 19 | 4A685C0EE23A70 |
| 20 | 023BA064C54B68 |
| 21 | 195208A93CA1E8 |
| 22 | 71AE352D4041B0 |
| 23 | 504E8E39A94038 |
| 24 | 720C28C6D217FC |
| 25 | 7025ECB240A338 |
| 26 | 827E3788626448 |
| 27 | 02816B755D32F0 |
| 28 | B8009D475C6D24 |
| 29 | 16D0F780289518 |
| 30 | DD8046896E8AC0 |
| 31 | EB9A28C1686424 |
| 32 | 960866CBAF058C |
| 33 | C9A0EE941C6884 |
| 34 | 8823936E1C96A4 |
| 35 | C2327C55ABB080 |
| 36 | 49418FCA9330F8 |
| 37 | 0716E80BB30960 |
| 38 | A397104E996E20 |
| 39 | 11BFC343492220 |
| 40 | 68E0C039886BC8 |
| 41 | 0F666030C54934 |

TABLE 1-continued $N_{FFT} = 512$, $N_{Tx} = 8$ length = 54

| Index | Midamble Sequence |
|---|---|
| 42 | FA1812F2611530 |
| 43 | 623A1B4882F7C8 |
| 44 | 79702ADA338124 |
| 45 | 2E0B01A59C06FC |
| 46 | E056D50C8F2518 |
| 47 | 751606085F9064 |
| 48 | 5132A4A1E770DC |
| 49 | BFD819216349A8 |
| 50 | D2B580268E024C |
| 51 | C2F9BAAD3800CC |
| 52 | 18C4DA0EB74F08 |
| 53 | 2884B62FE0C950 |
| 54 | 0EE40C2DEB64A0 |
| 55 | 8A059855B1F20C |
| 56 | 644B3CE11F442C |
| 57 | 08A91A669718DC |
| 58 | C9444518971A0C |
| 59 | 61E88912D5A04C |
| 60 | 811AE2935B0D84 |
| 61 | A1171F2D482610 |
| 62 | 32DC2A1A193114 |
| 63 | 4EBC26CE7B0A00 |
| 64 | 95A68AA588F1D8 |
| 65 | A493AC08599984 |
| 66 | 847944DE5E0044 |
| 67 | 8261E637E84A40 |
| 68 | 6056CAE95834CC |
| 69 | 986C084BA97CD0 |
| 70 | 0608D4D7F230D8 |
| 71 | 8C961401F51B64 |
| 72 | 890258C196FA54 |
| 73 | 43E4C670468960 |
| 74 | 92EC9183D6B808 |
| 75 | 869B728ECA0720 |
| 76 | 170239925A46AC |
| 77 | 65563C326DCC00 |
| 78 | 76F202E689650C |
| 79 | 4036B71833E2D4 |
| 80 | 71AB41B262081C |
| 81 | EF348F1A9882C0 |
| 82 | D8DE085E5154A4 |
| 83 | 39592793E00CC4 |
| 84 | DD82A398369108 |
| 85 | A66A015A4D18F8 |
| 86 | E643CA00C47C28 |
| 87 | CEF2048CA0C7C0 |
| 88 | 198AA12786D2A4 |
| 89 | 83CB18077AA510 |
| 90 | 40A960ECAA7B64 |
| 91 | 8BD125A653E608 |
| 92 | 6E30CB9CAC145C |
| 93 | 426E830B10E5E4 |
| 94 | 02B6B54CB0C830 |
| 95 | AB59CE00F2B200 |
| 96 | 43C1B6F0233108 |
| 97 | 286A4963B74110 |
| 98 | 09664602D66AF8 |
| 99 | 0E2CC58CA76014 |
| 100 | 1D609140697B2C |
| 101 | 4071EC33132ED4 |
| 102 | 6149A24E7F81A8 |
| 103 | ADF305C8B59C18 |
| 104 | 260BE51F184888 |
| 105 | 11830DAAB7A104 |
| 106 | EC12271434B460 |
| 107 | 0FF0E147322534 |
| 108 | 416C8DDF14118C |
| 109 | 2B421C40DACA2C |
| 110 | 8085C3B684D8EC |
| 111 | 4052C73DDA0F88 |
| 112 | D25A1DC7044488 |
| 113 | C602F146C881A8 |
| 114 | AA950120FB398C |
| 115 | B220748B38F430 |
| 116 | C77034B26284E8 |
| 117 | 8465301AA1764C |
| 118 | 93050EED642544 |
| 119 | 1EA0912329C6CC |
| 120 | 24D03B43C75440 |
| 121 | 0303DE4C725EA8 |
| 122 | CD411B612781D4 |
| 123 | 4D84B3A1DE2540 |
| 124 | A30A351989A27C |
| 125 | 773287416858C0 |
| 126 | 26C650C7029B04 |
| 127 | 9B8871502FD698 |
| 128 | E529A61AA80C18 |
| 129 | 9005474E7183F0 |
| 130 | B45902266243D0 |
| 131 | 602A253338605C |
| 132 | 193AEAE364B084 |
| 133 | 25993318805E28 |
| 134 | F195591B3E0148 |
| 135 | 7DC97282437160 |
| 136 | 11C9448BCED1D0 |
| 137 | 3CC8C15504958C |
| 138 | 7498392C15C08C |
| 139 | 63524E175081F8 |
| 140 | B054CC7FA128E0 |
| 141 | 907B4B82A588A0 |
| 142 | 020F03A6B52C60 |
| 143 | 92A9070C88BF60 |
| 144 | 3A04AA3F34B0C8 |
| 145 | 39E8948E938204 |
| 146 | 608D4FBC1D7404 |
| 147 | 053AE70185C494 |
| 148 | 0F5A423C5CA204 |
| 149 | 084666E2E916C0 |
| 150 | E16CF136946020 |
| 151 | 00B9655A9B1B84 |
| 152 | 58266D58798408 |
| 153 | 8C3C0DF9142548 |
| 154 | 0A480BFD331A38 |
| 155 | CF82D282A6CC00 |
| 156 | 33456887856450 |
| 157 | 76A143145C1B18 |
| 158 | C02013C55958F0 |
| 159 | 101BC16B8C4918 |
| 160 | CB1A4360F37114 |
| 161 | D49B8F9C4B1008 |
| 162 | 4B901213A08BCC |
| 163 | DC40DEB0582D64 |
| 164 | 4A38FC8404F234 |
| 165 | 20B11E37368C2C |
| 166 | 9A2A2D79DB00D0 |
| 167 | B11C201336BD04 |
| 168 | F1B3C0A51212D4 |
| 169 | 81CFD624590F70 |
| 170 | 71262341FB2868 |
| 171 | F106D5BC218888 |
| 172 | A91B051C7213D8 |
| 173 | 46DA884A78A68C |
| 174 | 6627A01DD7250C |
| 175 | A34A8869B1D360 |
| 176 | C58DC249410C5C |
| 177 | 7478657C898024 |
| 178 | 91A120A03F7658 |
| 179 | 29351888A7EB0C |
| 180 | D48190B445BBC0 |
| 181 | 11283C23A88B78 |
| 182 | 4B3519278CE03C |
| 183 | C712D561010BE0 |
| 184 | 08ADDF3016C1C4 |
| 185 | F3400D09EA9CE4 |
| 186 | 8176129279D388 |
| 187 | 4596EE590A0E24 |
| 188 | 5ABB3711A59004 |
| 189 | D5A0291A60E8CC |
| 190 | 598C58A53D28B8 |
| 191 | 54C163F06E4844 |

TABLE 1-continued $N_{FFT} = 512$, $N_{Tx} = 8$ length = 54

| Index | Midamble Sequence |
|---|---|
| 192 | FE1986281161E0 |
| 193 | 4C05682C279950 |
| 194 | 566283AC93C868 |
| 195 | 886D408782E5CC |
| 196 | 2C07C88B2E7158 |
| 197 | FCC492268254A0 |
| 198 | A7AC0721CC8880 |
| 199 | A0988906A73DC0 |
| 200 | 5B814063AB1A50 |
| 201 | A8D0A6963F031C |
| 202 | 87D82506D999E8 |
| 203 | F2020A47317AA4 |
| 204 | 3432518EAB9434 |
| 205 | 941D8A69F88020 |
| 206 | 6C0910B0796614 |
| 207 | A81E7483202C6C |
| 208 | 29BAC5D93107E0 |
| 209 | 425359BFB246A0 |
| 210 | 3E2495CC4A247C |
| 211 | 0D354F30462734 |
| 212 | 2638F9174A8484 |
| 213 | 104B7228B63EA4 |
| 214 | 9A9C5E07640D50 |
| 215 | 3D0B4C17CCC418 |
| 216 | B10669672306B4 |
| 17 | B959A4F404216C |
| 218 | 65540AD9215BC4 |
| 219 | 0CDA21DDE5E020 |
| 220 | 0563145B683874 |
| 221 | 2CA4610A3E0DB8 |
| 222 | 86A87E7922D440 |
| 223 | C740058D7449C8 |
| 224 | 84A48DF8E2E418 |
| 225 | BA4ED2889C5C40 |
| 226 | 270132C871CDE8 |
| 227 | CFE92096341720 |
| 228 | B6543D8E3A80D0 |
| 229 | B82594EA52E020 |
| 230 | 69165E40671ABC |
| 231 | 5D4128024E8E64 |
| 232 | 28C2918B81D92C |
| 233 | 82B2841C3A6D04 |
| 234 | C0D650138D68D8 |
| 235 | BC101744E129CC |
| 236 | 04AD2E97382710 |
| 237 | C8638A83E911B0 |
| 238 | 7E5728616C223C |
| 239 | FA54DE6E0CA930 |
| 240 | 31241F0E431DB8 |
| 241 | 042F9A2E36D1A8 |
| 242 | 7004E13D460A78 |
| 243 | 92154E8206B1F4 |
| 244 | A45406630BFA64 |
| 245 | 2C3856538C05D8 |
| 246 | 54EC5D1A84B4C4 |
| 247 | B4B80C8A182674 |
| 248 | 560E4F810BAC98 |
| 249 | B6321ADC201B20 |
| 250 | 4AE5237D150608 |
| 251 | 2514D906383C48 |
| 252 | F418E400C9DD48 |
| 253 | 004D16D0FCA854 |
| 254 | 3BCED40341B240 |
| 255 | 7785518F0014C8 |
| 256 | 421185FB702B24 |
| 257 | 17E394B6C40320 |
| 258 | 3CF64684E02A80 |
| 259 | 01BC4ED5D60894 |
| 260 | 832CFA923A5038 |
| 261 | C0243F286DA954 |
| 262 | CA00254CE1E074 |
| 263 | 2B310DED019354 |
| 264 | D170A08F21EE44 |
| 265 | B1FCC52E8484D8 |
| 266 | 5EA6692026EE18 |
| 267 | 68F410C245DE68 |
| 268 | 988C53D1E2EDA4 |
| 269 | 00725A9B851B1C |
| 270 | 3C688880DA6588 |
| 271 | EB144229381784 |
| 272 | D9B17986A295D0 |
| 273 | 9DE11C0953C340 |
| 274 | 88B14134AC7298 |
| 275 | E2397096809068 |
| 276 | 3467411BF1BC20 |
| 277 | 80F0B33AA10DB0 |
| 278 | 325058B49C45D8 |
| 279 | 91104DAE043F08 |
| 280 | 148E4065D5E960 |
| 281 | A009E92362F718 |
| 282 | 23C53173B05640 |
| 283 | 3F4502A163131C |
| 284 | 711178B80252E0 |
| 285 | 3930C00A2C7F14 |
| 286 | 38C1558FF4244C |
| 287 | B34A2761480E0C |
| 288 | 423913BDC3092C |
| 289 | 6840D72D51EC44 |
| 290 | EB81061A179194 |
| 291 | 25DF90FC420524 |
| 292 | 4B0FAE4E467004 |
| 293 | 0C2E4E48F32D10 |
| 294 | 18400EE64F0D58 |
| 295 | 4CD4F9608D5438 |
| 296 | D6A711B2784110 |
| 297 | 93EA9D288EC210 |
| 298 | 8ECFB90540D268 |
| 299 | 22809DC28D624C |
| 300 | 6A7731CC819680 |
| 301 | A42094AF331F14 |
| 302 | B016C6102933D4 |
| 303 | 4CDC12031CBA9C |
| 304 | 67CA8D82CA7280 |
| 305 | CB4070BEA88CB4 |
| 306 | 755C3A7D8CD040 |
| 307 | 5808B47303DA74 |
| 308 | DB1EA98202A790 |
| 309 | 67136AB4E40810 |
| 310 | 8556DE681BC580 |
| 311 | D240A22FC52F10 |
| 312 | B780D94182B120 |
| 313 | D8A78F9522086C |
| 314 | 8A6A5D0B1BB018 |
| 315 | 3B05940FFA30B4 |
| 316 | E64B0E7012A834 |
| 317 | 50D64370E13468 |
| 318 | 61C066BB73C054 |
| 319 | 390406CD43EE18 |
| 320 | 75B090F1AB2A04 |
| 321 | 23D0930B1FCA80 |
| 322 | C366BD40B514D0 |
| 323 | B028BB11ADACF0 |
| 324 | EE0C0B101754B8 |
| 325 | 2294F21913D524 |
| 326 | 64EAEC304857A4 |
| 327 | 139A8A0DB76818 |
| 328 | 849521C4741CD8 |
| 329 | 643D801A70B954 |
| 330 | C06A1F6261C290 |
| 331 | C58716E9888940 |
| 332 | 840D2C9026AB9C |
| 333 | 7ADE3423905D10 |
| 334 | 682A8573CD8370 |
| 335 | C091BAC5524E40 |
| 336 | 1201952CE55704 |
| 337 | D46C0F60B36144 |
| 338 | 34EC82A83AC360 |
| 339 | F564400DA9C9A4 |
| 340 | 1CCB27B01480B8 |
| 341 | A528B2B113E09C |

TABLE 1-continued $N_{FFT} = 512, N_{Tx} = 8$ length = 54

| Index | Midamble Sequence |
|---|---|
| 342 | C3B5875FC22030 |
| 343 | 92D4D0EC02E438 |
| 344 | 85E480B4199CA8 |
| 345 | 81BB34C8F28A94 |
| 346 | 052A8E7227ACC8 |
| 347 | BC8106AD093A84 |
| 348 | ECA68D30128768 |
| 349 | 15934B42A8479C |
| 350 | BA1C0960AF44C4 |
| 351 | 2C61F868144D54 |
| 352 | 718F8AB6269200 |
| 353 | 632D46148476E0 |
| 354 | 023378FE4AE920 |
| 355 | 488F78493150BC |
| 356 | 4AA64EC11C1610 |
| 357 | 0224E73B05D75C |
| 358 | 68AA361CD2D400 |
| 359 | 1A006676384BA4 |
| 360 | 1DD2B0E2106974 |
| 361 | 5055B2F8E81DA8 |
| 362 | 4DA8014659CC5C |
| 363 | B33601A5D0AC30 |
| 364 | E86088D9745B00 |
| 365 | 92932399C60A90 |
| 366 | 2675050E1D26B4 |
| 367 | E1388054A283E4 |
| 368 | B5CA0106EC69F0 |
| 369 | 4749B3980E55A4 |
| 370 | C3B1E892536048 |
| 371 | B5583CC05980E4 |
| 372 | 07B2C62CE8B540 |
| 373 | 48B078918DDC14 |
| 374 | A0BE6778E084A0 |
| 375 | 41120D77343E44 |
| 376 | 598CEC02B461A4 |
| 377 | 36406561BA85C4 |
| 378 | 661AFC052597A0 |
| 379 | 8EE11120960E4C |
| 380 | A56236DB1D1E00 |
| 381 | 4479288BDA8384 |
| 382 | D41518997E7820 |
| 383 | 885F09C2483AB8 |
| 384 | F540392C908F28 |
| 385 | 1BC0A46C90AAF0 |
| 386 | 892967851FA8D8 |
| 387 | 105831229FC8D4 |
| 388 | 0B2F5CB9840668 |
| 389 | 18A27A205BC8B0 |
| 390 | 19D130850A07B4 |
| 391 | 7E11C25373F150 |
| 392 | 4B846825051ECC |
| 393 | 31114A5E8193E8 |
| 394 | 523614209C737C |
| 395 | 5D53031330E900 |
| 396 | 9133CAC8A61848 |
| 397 | 03B687BD18A194 |
| 398 | 2BA06EF2C429A4 |
| 399 | 5C34963026431C |
| 400 | 9E0C8173AAA720 |
| 401 | 2279035CC4A5D0 |
| 402 | A974D0DB998020 |
| 403 | 24FE2735024158 |
| 404 | 4D4F852AB007C4 |
| 405 | 547A9648263830 |
| 406 | 4BF2242622A89C |
| 407 | 314D8816A25CF4 |
| 408 | 440AB5BA0AC238 |
| 409 | F22D227150058C |
| 410 | DB58859A287A08 |
| 411 | 781655173738C0 |
| 412 | 3ACF14099D03D0 |
| 413 | 11720C0372BAB0 |
| 414 | 84C8C51DF701D0 |
| 415 | 29126BAAE60718 |
| 416 | 3B56C60074034C |
| 417 | C8366B7CAB2160 |
| 418 | C91D2EEA00AC70 |
| 419 | 5AC40394D887D0 |
| 420 | 1231EAC94D111C |
| 421 | 0E807CCD291344 |
| 422 | 15E9099908516C |
| 423 | 402AF2AE486C98 |
| 424 | 1D0452DC34CFB0 |
| 425 | 35CD5C27B21608 |
| 426 | 7C01629411B2D4 |
| 427 | 4604AEFA689660 |
| 428 | 2053A91D352760 |
| 429 | D071081C4A8CBC |
| 430 | 23145BCB2E81F0 |
| 431 | 00433C82EE3A58 |
| 432 | 0B92F78C868AD8 |
| 433 | 04FAB0A7572690 |
| 434 | 2E4BA8646031F8 |
| 435 | 1075B9125148B4 |
| 436 | 22A85B92029C4C |
| 437 | 42247947D71244 |
| 438 | 438A0BF36E2218 |
| 439 | 34672D08855650 |
| 440 | EBCA58680622D8 |
| 441 | 4445B88F6B861C |
| 442 | 4B82C63035D604 |
| 443 | 77892841C16BA4 |
| 444 | 10DD2C4AC15B18 |
| 445 | 6ED1D18D9442C0 |
| 446 | 83962032755078 |
| 447 | 854E18B280F6D8 |
| 448 | C3061A9D921908 |
| 449 | C150AE78D98450 |
| 450 | 27D48E2A5E0504 |
| 451 | 75724A3E030A70 |
| 452 | D11484D08FB780 |
| 453 | 4C474037AFC284 |
| 454 | 4AAB662B4A1304 |
| 455 | E924AA2B007310 |
| 456 | 416508E35C9A14 |
| 457 | 14C206AF8709A8 |
| 458 | 10B506E197E7C0 |
| 459 | 62EF1C55C06010 |
| 460 | 861946126AC5EC |
| 461 | A067A23D2296CC |
| 462 | 13C143EB589650 |
| 463 | 2242A7CCB86328 |
| 464 | A29367ED018C28 |
| 465 | 6176A1C3A90330 |
| 466 | 0917920E73A2AC |
| 467 | 182A03E91964C4 |
| 468 | 4A7B51902341F4 |
| 469 | 6FB93050EC3088 |
| 470 | CE0081EB953258 |
| 471 | 58146A49BE1774 |
| 472 | 490CDEF0A13E14 |
| 473 | 8D07046F334A9C |
| 474 | 65984600F0AB48 |
| 475 | B8AE36642036E0 |
| 476 | B89C57093B6040 |
| 477 | CA00AAC4BC99E0 |
| 478 | 05A4A88C689BC4 |
| 479 | 80558D1EF23848 |
| 480 | B8656F2198B210 |
| 481 | 1018F4593715E8 |
| 482 | 20746221774A58 |
| 483 | 3484342215F978 |
| 484 | E1E69030741560 |
| 485 | 1D2168511309AC |
| 486 | 8D2AE48541083C |
| 487 | 4B1D40EEE24490 |
| 488 | 6003D935E46A4C |
| 489 | A190709E41BB10 |
| 490 | 90DD7125C3D508 |
| 491 | A49F082C21CDD0 |

TABLE 1-continued $N_{FFT} = 512$, $N_{Tx} = 8$ length = 54

| Index | Midamble Sequence |
|---|---|
| 492 | 17E82A50F67894 |
| 493 | B51B1047B38140 |
| 494 | 0D53138644BA50 |
| 495 | 8582A75D845960 |
| 496 | 4E75619F040F44 |
| 497 | 9541C2C05F8D10 |
| 498 | A25CD9CD041728 |
| 499 | 186035D410DC88 |
| 500 | 28ED31F8B0012C |
| 501 | 461F1052A1FD7C |
| 502 | 2489847CC3EB54 |
| 503 | 6D3862320D59E8 |
| 504 | A182335345C0A4 |
| 505 | 970856840436CC |
| 506 | 575E122F00B320 |
| 507 | 28598DDB456480 |
| 508 | 866625287F0688 |
| 509 | 50813E06E986B8 |
| 510 | C314AE8D097088 |
| 511 | 62E0B01A63D20C |
| 512 | 1E248A1D9CE710 |
| 513 | 85481133D868EC |
| 514 | EC88844F5281E0 |
| 515 | 00489E71EB1B90 |
| 516 | 619A17C2248654 |
| 517 | E84164C32A74BC |
| 518 | 543F23C9338A0C |
| 519 | 724401E1D6B370 |
| 520 | BC82F3499B1428 |
| 521 | 058A53E1D51B18 |
| 522 | 19E9983C892784 |
| 523 | 0DE1A3C8328BB0 |
| 524 | 27C22A4EC21ACC |
| 525 | CA6A9849D583D8 |
| 526 | 10FC96B22A0C40 |
| 527 | 31E16FC428B414 |
| 528 | 1F05768023A640 |
| 529 | 138E061947D428 |
| 530 | 9E8C8B849A0854 |
| 531 | 6B95E1868E8930 |
| 532 | 41762A184736E4 |
| 533 | 300827FC2DAE34 |
| 534 | 7B98910905385C |
| 535 | 3A0E7AA10E64D0 |
| 536 | 8513842C90EECC |
| 537 | 1E0C8889563BE0 |
| 538 | 7640D887B05128 |
| 539 | E41864E4B79230 |
| 540 | 5A8D86E2C81160 |
| 541 | 11EE296B124C4C |
| 542 | 056CA10FC79158 |
| 543 | 5E08E52224CDC4 |
| 544 | 327C95518F2008 |
| 545 | E70AD8D12B2580 |
| 546 | 2C0451EAD2BA64 |
| 547 | 9B21C13A9D4630 |
| 548 | E433A6B7A30D80 |
| 549 | 6B2823E2143C5C |
| 550 | 79825790E056D8 |
| 551 | 8A37004B58D90C |
| 552 | D31A100BACD3D0 |
| 553 | DAC1E8808DD320 |
| 554 | 624E09B4E62124 |
| 555 | 6221FBB2214750 |
| 556 | 74C8EA4403D0E8 |
| 557 | 59481CB406C0AC |
| 558 | DA606812AE6578 |
| 559 | 240C782D798CC8 |
| 560 | 4A863698088A7C |
| 561 | B289DEB2729060 |
| 562 | FC4A24A41C8C00 |
| 563 | 39A50642E2B704 |
| 564 | CC8EA04090D7B0 |
| 565 | 4A71504F46E99C |
| 566 | 530908D7E1A558 |
| 567 | 940842F596A184 |
| 568 | 31CBF9B0C1B214 |
| 569 | C4A50469B279A8 |
| 570 | 32D170CE15A02C |
| 571 | D06233553675A0 |
| 572 | 1C550A2DD2341C |
| 573 | 9271752352801C |
| 574 | 382741A653570C |
| 575 | 76549C4C7D7080 |
| 576 | 191EED81515F40 |
| 577 | 481C43F1934AD4 |
| 578 | E22B0094B778C0 |
| 579 | A3069DB720341C |
| 580 | 815D3BD6311B40 |
| 581 | 3D10905C6F1D70 |
| 582 | BA680B8B474468 |
| 583 | 0A72060B7C2CD0 |
| 584 | 53F4782E385490 |
| 585 | 85C9B214B3D010 |
| 586 | EA50E87D4D3240 |
| 587 | 3C8FC3246DC008 |
| 588 | 03A3047279CB20 |
| 589 | 6F2C926280A744 |
| 590 | 106535B03A11F4 |
| 591 | 26AE191B4E3800 |
| 592 | 6E2C3D40891278 |
| 593 | D860B20AF446D4 |
| 594 | 43D899EAA43830 |
| 595 | 147C77A99A4880 |
| 596 | 465DA10A095A4C |
| 597 | 3FA12306B591C0 |
| 598 | B70044F4E3955C |
| 599 | 7DA010ACCAE1C4 |
| 600 | AB9CFB32121BC0 |
| 601 | C554B30E807930 |
| 602 | C8494878BA20B8 |
| 603 | 41C28D740F3324 |
| 604 | B803231AE92348 |
| 605 | 6748BC8D860CC4 |
| 606 | 12E9E9603C2198 |
| 607 | 8D328A0906E6BC |
| 608 | 2D3F08D9777088 |
| 609 | 862445E5C6F78C |
| 610 | 060FB53C0DAA90 |
| 611 | B1024C2BC514AC |
| 612 | 0B6F34C282E478 |
| 613 | 2BA6400ECF63A0 |
| 614 | BC2CC37AE70284 |
| 615 | F823B2F3250824 |
| 616 | 01C7B6741A9A28 |
| 617 | 8582CA615DC468 |
| 618 | 36455B1048E048 |
| 619 | 0D2A953D8DA1CC |
| 620 | 4A10E8317E4B1C |
| 621 | 02C2EE15238CC8 |
| 622 | BCCBA421842518 |
| 623 | FCA0798BDA3840 |
| 624 | 003CA4DD2F0F50 |
| 625 | 6CC6BD1C4160C0 |
| 626 | C0E3FA9A8C5888 |
| 627 | B83DE68A421414 |
| 628 | 614011E9992CF4 |
| 629 | 263A80A7DC2D08 |
| 630 | 74B401B9499E24 |
| 631 | 1807B2C54C0E7C |
| 632 | 0E23FE92F19288 |
| 633 | 469D8D544E0164 |
| 634 | 72388AD4B140F8 |
| 635 | 971325608730AC |
| 636 | 67A5883103D92C |
| 637 | AA30B0D80378AC |
| 638 | 2472E581480FD4 |
| 639 | 542470ADF24374 |
| 640 | 3CBE93B13520E0 |
| 641 | 406D87172568A4 |

TABLE 1-continued $N_{FFT}$ = 512, $N_{Tx}$ = 8 length = 54

| Index | Midamble Sequence |
|---|---|
| 642 | E8705C8E10D890 |
| 643 | 0A0C1ADF1AEA24 |
| 644 | B09EF09158B2A0 |
| 645 | AF389509B99824 |
| 646 | C65094CD12AF88 |
| 647 | 2860DE26913730 |
| 648 | 31C4850CD26D6C |
| 649 | 21E021B30426E8 |
| 650 | 72193125ABAC20 |
| 651 | E44907B57114C0 |
| 652 | 45D222DC1390B0 |
| 653 | 85A45464A3CD70 |
| 654 | 219ECDA7E2A244 |
| 655 | 214C198616ABF4 |
| 656 | 7923849908675C |
| 657 | 067D72E27104B0 |
| 658 | A29F30E253D464 |
| 659 | E51920B69989D0 |
| 660 | 520E286371A8FC |
| 661 | 42F02BBA104338 |
| 662 | 7382F4A6D24478 |
| 663 | 62595519825A1C |
| 664 | 415281A78CB884 |
| 665 | 589E9D6D228038 |
| 666 | 8B882C8E4BD380 |
| 667 | 594BF808F3A260 |
| 668 | 041EFCD238A528 |
| 669 | A00AE329F43934 |
| 670 | 0A76485168A3B0 |
| 671 | 26D574339F2060 |
| 672 | 3A22422E1BD964 |
| 673 | 1015AB8674298C |
| 674 | 3DA930C3EA1A20 |
| 675 | C2A613A4317604 |
| 676 | C84795651080DC |
| 677 | 5A835C44960938 |
| 678 | 73101C392D0DB0 |
| 679 | 564F3C2A028DD8 |
| 680 | 1D80B16E2CA324 |
| 681 | 311B761A8F4C50 |
| 682 | 51371C9052C520 |
| 683 | D6A017CC08CA8C |
| 684 | 69442427F5460C |
| 685 | CD7069D12800DC |
| 686 | 218BA6081AE95C |
| 687 | AFC49C8AA09260 |
| 688 | CA5D94406721A0 |
| 689 | 5CED60C1D45808 |
| 690 | D3A3459EC0E418 |
| 691 | 56393E0CE80B10 |
| 692 | 6154837103F79C |
| 693 | 9245FD886206E0 |
| 694 | 1E814E29D86248 |
| 695 | 324A92E2C46070 |
| 696 | 044A62AB0437F0 |
| 697 | 81BB5D630E8904 |
| 698 | 4B228861542DCC |
| 699 | 9809B0957780C0 |
| 700 | 93B3D41C942874 |
| 701 | C812609F983938 |
| 702 | 442CB2EDE14D00 |
| 703 | 76B08C088B50EC |
| 704 | 801C44AC3A4EAC |
| 705 | E0D40D462CD270 |
| 706 | 41107625A2C6D8 |
| 707 | B0736E30409A44 |
| 708 | 5F436E074D4084 |
| 709 | 7EA1B2065DAC20 |
| 710 | 041B6310BE42E8 |
| 711 | 0E3A6053A97424 |
| 712 | 08D17AD8445F84 |
| 713 | 801AAC75922C24 |
| 714 | EB22A003C3B434 |
| 715 | 78BC956200E894 |
| 716 | 54ED84185E6038 |
| 717 | F2855CAC8AA080 |
| 718 | 6A0E8C69006AF0 |
| 719 | A02978ED901D48 |
| 720 | 760304541BCB0C |
| 721 | 4C5F9C5942B248 |
| 722 | 98FB160212A0D0 |
| 723 | F06B9106F28628 |
| 724 | 2F00E1DDD6A624 |
| 725 | 91E370075F2A64 |
| 726 | 2DC8620F5C303C |
| 727 | 2E555A74904674 |
| 728 | 0F4604DC6EE3A8 |
| 729 | 617AD12ECC430C |
| 730 | 14F9610CB2B570 |
| 731 | 1A511CFA2F7058 |
| 732 | 027669B758F018 |
| 733 | 65A4AB078BD180 |
| 734 | 684EDC64724940 |
| 735 | D1AB084709BEC8 |
| 736 | 99412E43C0E5E8 |
| 737 | D89F35B0C928C0 |
| 738 | 94859A103C54C4 |
| 739 | 9CCC17DA601428 |
| 740 | 6E8071EA006424 |
| 741 | 04B3071A173750 |
| 742 | 68E31CA007A37C |
| 743 | 1416057DDA1CF0 |
| 744 | 791C48A3076A60 |
| 745 | 80951A6B729B90 |
| 746 | 099EDCEE881784 |
| 747 | 85FB8713A08668 |
| 748 | 352E128CD9611C |
| 749 | A10C07D930A990 |
| 750 | D28C053443C6F8 |
| 751 | B859588FA10124 |
| 752 | 27D116AE28D0B0 |
| 753 | 4618907BAD1C8C |
| 754 | 276882C18F95E0 |
| 755 | 18C09263D6EC04 |
| 756 | 7CB524A708DC18 |
| 757 | C244CA031EBCC8 |
| 758 | 06A84393EA4304 |
| 759 | 12681CEA292E6C |
| 760 | 2B7C0C13E4B644 |
| 761 | 7E4C6232C2C0AC |
| 762 | 9E5E0828CD0F60 |
| 763 | 1402E98C1E9C88 |
| 764 | 063483290FAA28 |
| 765 | BE284462D06794 |
| 766 | 0BA7815A624108 |
| 767 | 941FA840E4BA6C |

TABLE 2

| Index | Midamble |
|---|---|
| 0 | 7890D37679740B6044B056210F5 |
| 1 | 9E3EC411053511A49F6A81CA064 |
| 2 | 8883E033C03A1ECB2B3012D75AD |
| 3 | 2F68A4A55718227CCAD7E280CC8 |
| 4 | 4025180D50EDA66BC18232E6B6C |
| 5 | EB80C1815B514178CC21B784DB2 |
| 6 | 073D0032214D3C79BB9A8D660B4 |
| 7 | 2A036D1870120FA773BA11C1D52 |
| 8 | DF036508C7D91C2D08834A38597 |
| 9 | 6711B0A587E75B760364811728 |
| 10 | 4E944D46009AE8F14ADD17246C3 |
| 11 | 2E2A54298646452D09AECBE6085 |
| 12 | 7010F56805D116B5423B39FB49C |
| 13 | 917848BADF44330323060A5EE91 |
| 14 | 3636C207204A2AC28CDBA775025 |
| 15 | A32EAFB32407587F099918246605 |

TABLE 2-continued

| Index | Midamble |
|---|---|
| 16 | A8E9A2B39738589621CD800263E |
| 17 | 928CA5841EA3823C49FD029524C |
| 18 | B9C904890F3F015700EC654A1B0 |
| 19 | F906B67D42C4804198684CBD71 |
| 20 | 095068CD21A38195BFF00D6392A |
| 21 | 572B8602D0C50763900B4D4BBE |
| 22 | 88F597233D98016ED03A105A33A |
| 23 | E2728F0B042157F0424B3455C22 |
| 24 | E1831A239AD67E929906A950E82 |
| 25 | 6CAE468CB20810E977901F83A4A |
| 26 | 18BBC5738058B69495C4549B0F |
| 27 | 33737AD538740711087A3824A18 |
| 28 | 0049D165D52F1B08E172435CD2E |
| 29 | EF80C485A3208FA14D8EDC71C83 |
| 30 | E254AB15534FD2640140A4A6037 |
| 31 | 37B850590A5AF6C3B208C0EA45D |
| 32 | 55DAD0B648B15C2CB083EB1B003 |
| 33 | 01A48951B38767DC34282D8D74C |
| 34 | 264E359AB0D15A0340187F6A16F |
| 35 | 9263C85D7E4751210056C1AA919 |
| 36 | D9306F06B28242152A5E22EE23 |
| 37 | 92C4C704E544885EBBC3CA45A40 |
| 38 | 5687441AC0ECF524BCE4A3E04C7 |
| 39 | 1D588063AAF1864AD3405069D99 |
| 40 | A02E4920A3A24F85E39C2C429CD |
| 41 | 0A8BE097997D6B08050A5CC268C |
| 42 | A892079034610FBC175299E9884 |
| 43 | 52414C7FE20947C1853628663AC |
| 44 | 0EE4388A9B9450E2D72D97C88B4 |
| 45 | 04BB386DF6380A86805CC999C1E |
| 46 | 799953C403D7D085226A5C045D2 |
| 47 | D539705811A0D498D7920B88A5D |
| 48 | D04160E46D76A658A68DE0B9117 |
| 49 | 627C08AE32DC33C53C6CC020D5A |
| 50 | 58D693486C005D1984C9834BE8F |
| 51 | F1692011C9D4AA0CD959708DBB |
| 52 | 2ED40FF7B2C1C1710B4444F88C0 |
| 53 | C51EC82A4A3486B98C8033E4D0B |
| 54 | 0B58AB925EFA0D5CD5E2200CB20 |
| 55 | FADAA2D01D107910710A7743B9 |
| 56 | DC125D4363B2706FF80C20E22C4 |
| 57 | 9D486A61BE2BD63098B6822D6E0 |
| 58 | 7D409920228DCCB4C44F4B5C0F1 |
| 59 | 40F14876AB018D3B02785DD6006 |
| 60 | A60B24E3B522B97784B91E04840 |
| 61 | 7C8A87C54F5A643B536B025C030 |
| 62 | DA2E0663DD05BF0D4B2321D2013 |
| 63 | D155A85CC03125EC3A0845CF560 |
| 64 | 8083A299D10E929C6ACC470A92B |
| 65 | C7117962724206A9032C9F07EDA |
| 66 | 04B0CD2A80DCD8ADA0D0C5CAE32 |
| 67 | 354D037632B00F9ED26883B0707 |
| 68 | 016699CB45A74214538E1E2041F |
| 69 | B50750E03A4832E253D860E7D39 |
| 70 | E6AFF53E1617225481CE4117580 |
| 71 | 2A27C92D22245B35E6701E9CC16 |
| 72 | 8BA45182116D0B92C68CEE95097 |
| 73 | C22B0B11A56A3514F50429C9FB0 |
| 74 | B2C9EF397098B906EA918087106 |
| 75 | 87804080F093E0D59A598CD5744 |
| 76 | 94091E247066017B265C92B0B69 |
| 77 | 869C76558FD338657000A5606A5 |
| 78 | 1095D47E2169F317B2D840D0891 |
| 79 | C9DFC10081CC4193640F52A83E5 |
| 80 | 351403CA8254E58D192F8D63B80 |
| 81 | B49545C9F28B4122676090E4628 |
| 82 | D288A9C89086C74623C88C7E149 |
| 83 | 619898506BEB88B316A16C050F8 |
| 84 | C351E406DFEACE66877C03810A2 |
| 85 | 2DE27E863E84824F5508145E62C |
| 86 | BA40F21E63BEB51325191523C20 |
| 87 | C060D2882B2B743C01BD5D3CD58 |
| 88 | 377B839CA2859E20405B4689507 |
| 89 | 60821326D5D46887A51C107F1D1 |
| 90 | 61981A63460116ADB572A23EC26 |
| 91 | 5A0827B956CC6412214C19E0EBB |
| 92 | 80D0B2EC0D78AC0C783A598018E |
| 93 | 805425A472DA6C3466207BF31D4 |
| 94 | 42D8338207A32BD4D94A9162218 |
| 95 | 669158B90406C416E92BED6A2EE |
| 96 | 0870A104F2A4E22BA973FA4CC48 |
| 97 | 26948D815748F346A2788ACB384 |
| 98 | ED053D0E43644531C3D4452B02C |
| 99 | C4464F5F8481961D64939862BE2 |
| 100 | 90B30851EBE1386AF5966A0323C |
| 101 | D3E0075D027669220D02C2A5E5B |
| 102 | 874F54A388877E45BE2DDC1CC14 |
| 103 | D26EB9085C4B98E22B2C3302407 |
| 104 | 2D82609C92EBE61A98898290977 |
| 105 | 67A938004D7070DF1E4A08E1A42 |
| 106 | F08059E269988929C28CA7E15EA |
| 107 | 1D7474DB7A02C4031891FB49D61 |
| 108 | 35907252AEDC0FD4D847054610D |
| 109 | 831ECF85C09A0BD292AC80D462BF |
| 110 | 59B9862A286F62810960F834B4F |
| 111 | 2386834D764130AF46CCC48531A |
| 112 | 6BA579201A54781DA1C485B8323 |
| 113 | 20246F725C6E0D062403B8A48AB6 |
| 114 | CDE425429A5032552E388120E6F |
| 115 | 5D277844BA194BE4258BE808151 |
| 116 | 88A305854B8DD865C920573F081 |
| 117 | E6D04D0C3809E52250F71162D67 |
| 118 | 8F9A4EC07921103154442AC57E9 |
| 119 | CE83B00592E9D3176979D484718 |
| 120 | 400E2AED9149C8C2D5B07243D93 |
| 121 | 1D8F6308DF22682BB2303CB1C51 |
| 122 | 27B5C96760156741B159D3A0061 |
| 123 | D859C3E0341A6D1218394633EAA |
| 124 | 6D44930A9D828902DCE643C6068 |
| 125 | C90228A55E0F848FD4091E99CC4 |
| 126 | 46A57259CA4F8715242C9AAEE00 |
| 127 | 138752D0D809D14A2078F2A3BC8 |
| 128 | D017EA9444A895C1B1E9BCC6070 |
| 129 | 2223382A11332E55C331DA443CA |
| 130 | 9080A94F095FA1473225A222CDF |
| 131 | 359D944502908E185F15F6803F7 |
| 132 | 4D1ED2256167B5E605D704401A0 |
| 133 | 8A636B03C5F45AE4800D22C61AF |
| 134 | A881C2729B636FE9C0487B0052C |
| 135 | F680D8268C96833D0893B5A4554 |
| 136 | B0EA080D29CC744F5E9C54A39A0 |
| 137 | 969671FA230084B8084D403BE8C |
| 138 | 9183CCC6CBAD041584D38813D4F |
| 139 | 511963483016DD2D73D50E02202 |
| 140 | F201541EC912A9C1101D0ADCF0D |
| 141 | B7CE82AD86B5400C1086B763705 |
| 142 | 0A663464D6063D86EBD174459BD |
| 143 | 9A30F4683CBC6531DA15219FB01 |
| 144 | 9890B0069A6C55AF05551A143B6 |
| 145 | 927DC9D05447B8E0C290C24E26B |
| 146 | 0C8328274193C37F94027CE94E2 |
| 147 | A2C948407A682142953B99F106D |
| 148 | B030416E5F1EC1001D6A4139E32 |
| 149 | FE1C480B24C642628B35BA6A937 |
| 150 | E9890F09F6D80E25E19E00A40CE |
| 151 | 2EC7E9AD58D880026E29DB60863 |
| 152 | 7E047F6C6E60CB0E80A1A0A9068 |
| 153 | 097845093A8791444A34DD398D6 |
| 154 | C26DF883209928A722DE02C3C44 |
| 155 | 6A0D083C991846250CEB27E7E00 |
| 156 | 586F7F06D1CD010889C996B2058 |
| 157 | 5100E7A6E433D0DB0364E0EB482 |
| 158 | 0A6E80F581C459C7964E06A751B |
| 159 | 8723C090015CC887BD2CAE587C9 |
| 160 | BE05646C549A64C6DCF71090431 |
| 161 | 1E4121CE8C950885A7CD5D8E83B |
| 162 | 8C6A10F95D7852BBC0128A807E6 |
| 163 | D9552404F0C2AE16A3E1C6CB92C |
| 164 | 6D12D086F0C2C6130205932D59C |
| 165 | 90C77EB4022251E94756C041E4C |
| 166 | C819CBF189F4D8404A9612D51F2 |
| 167 | C25F46D6C98A29582C1A631004F |
| 168 | 5E6991517806057AC47D8256253 |
| 169 | A454967CA5A40331B882A4E2EB1 |
| 170 | BD57DC4CF8AE601358221438F6 |
| 171 | 80A319878848BE07798BEF29604 |

TABLE 2-continued

| Index | Midamble |
|---|---|
| 172 | 0903F11CF58E23153809A7213EB |
| 173 | C7B350E40BA6EE0EF0803966E32 |
| 174 | D7CD423AC058153251C618985C9 |
| 175 | E3F98718043748286DA9359A95A |
| 176 | 82BB3C66F9006051E6502302D52 |
| 177 | CE2CE2A7C482481A0694C2D76ED |
| 178 | BD0A61C823E83A363B0D55332A4 |
| 179 | 4CB640D7791C21142DA1B285A11 |
| 180 | F814A11513317076B9B0410B8EE |
| 181 | 52A6F1E00193113253831C327E0 |
| 182 | B602C4550BA00FED86A98E289BF |
| 183 | 18A07244A8826D34B0B886BFDC8 |
| 184 | D12239C6871A90CE090642D65F4 |
| 185 | B01FAA52120C23C0F4AA8217199 |
| 186 | E8E65CA52580A4560B054776C68 |
| 187 | 14E0FA5AAB77429218F4AEB6284 |
| 188 | 0429BB1F389920AE0A412DEA11F |
| 189 | 433CF3205503052F513DE27CB88 |
| 190 | 891E553344F0C8045426A5EB433 |
| 191 | CF0EEEC683E8D4042498257459E |
| 192 | 8C2AF4576E44443B16C2C213A58 |
| 193 | AB65B99F18682B88B8317018265 |
| 194 | 87E40C28BF45048342484527B8D |
| 195 | 4724178A900337B43F38F498071 |
| 196 | 1473245236214261C5C37BB2784 |
| 197 | 4C0BABB033CB2D0DCA56D8DE001 |
| 198 | A0086C1C50EB52B8E26B48D36C2 |
| 199 | 97B052C1842D830715EEEC4194C |
| 200 | C2F30CADC7074B44CAA02223662 |
| 201 | 157120BE08422E5C2A37D8F5898 |
| 202 | FED453D23B1A86C45C69B62D106 |
| 203 | ABCE480CA60269B3059DE325832 |
| 204 | 98109B396C2A7CD02C2AA29947A |
| 205 | 14087B85F8E9088DB701AA8EE69 |
| 206 | 7044FC69415C2254F440D18E6FB |
| 207 | 9AE6022ECB1397951C942B00191 |
| 208 | EFB8B20E0C6E9918019C8D289DA |
| 209 | 663C4BDF406529C2E40189A7990 |
| 210 | 7DD0E834E2207ACD4D48197084C |
| 211 | 3E6047121B36C5984177A1A2429 |
| 212 | CF2CE80F174AF5B38562012D659 |
| 213 | 78A72884CD89C0215BCAE3A2492 |
| 214 | 0F6D62C1891F48351B329C2A452 |
| 215 | F4E28974ED18D2C2ABC2227D00C |
| 216 | 441316A61AFD38083B05AE09494 |
| 217 | 314180C54161C8FE88176BC2386 |
| 218 | 87B1C789955A31E45896E440250 |
| 219 | 0A84264CB71548EF4BC27A705DC |
| 220 | 581127D0AED372694094353DA00 |
| 221 | 4C5AC4284041E078137396EC564 |
| 222 | 34855891E3F1120767A8A4590A7 |
| 223 | AE14E0C26B21B9C9620007CE889 |
| 224 | 40605A81A6C903F049584AAD4F9 |
| 225 | 764F2A3A9916E5349010A17C28A |
| 226 | AF51076C2B66F149300753C9668 |
| 227 | 64C2FCB0D0355142905630D7CA6 |
| 228 | 391F3C0E6129493B7E931079449 |
| 229 | 500BCC6C262CCD8DC295E72C185 |
| 230 | 18924812B955A1607907F142EEA |
| 231 | 2BD124AE5039E24CA2880B53CF4 |
| 232 | C8525E9211CAABCF8825CA06A00 |
| 233 | C09925F536329CD64F462AC2081 |
| 234 | 4E0C16DC76C09A15A9A417EA224 |
| 235 | AEADC85738A4831023B41626571 |
| 236 | E6991A1408E02413AB5A4AB61D0 |
| 237 | 8A7828541C97A098043496D5B31 |
| 238 | 983E89B5C00845F51275E0421C5 |
| 239 | D4072C950573CA693E8191381E5 |
| 240 | E3B603DA4C286A1854A61134807 |
| 241 | 215786DE065E8620803A5354748 |
| 242 | 428E5188CD617050993021E193F |
| 243 | 934A706A828E77406641BFA422A |
| 244 | CA1E6F68CC465028A70D4436482 |
| 245 | CB5130423014959312FD7941C6E |
| 246 | 6D80CB5710930CA953809D4441D |
| 247 | 330ADFA31452C0B5201F20F2B28 |
| 248 | 9BA497224646E0035835C60238B |
| 249 | 45BD0C0233A49A0F484F28CA154 |
| 250 | 649F1C7C050372BC299C681015C |
| 251 | 748A6051E6AE0A0209C0CB7603D |
| 252 | 636866612C41C5BB84C357D5281 |
| 253 | 6E0A44914A60BBD4CB9B1882943 |
| 254 | 9E2448330B7F641D08A971704D2 |
| 255 | 16C7CC103450B84770824A9BE1A |
| 256 | 847E3CB42289378FE2AB6602501 |
| 257 | B760C17309ABC17FC980A12D215 |
| 258 | 026670B51AE8C3CA82B2847AFC9 |
| 259 | 42310D083D6D654E44303E2A6C1 |
| 260 | E931E59004046636CA6C38E907F |
| 261 | 1A6478871600BAE66283C903AA1 |
| 262 | 2709009970BE9BB06392C6E8988 |
| 263 | CE38449ECF07C115464815496D6 |
| 264 | 4880DE125E130BC2B2BDC7D8254 |
| 265 | 58B6C038C08030A6E045A7F7B03 |
| 266 | D067AF14A40207359A0F9B464EC |
| 267 | 06E44412A6483308F69D0C192F3 |
| 268 | D6C00D308270C1331571349172F |
| 269 | B24801E98D91502CCC746E1419E |
| 270 | 0664118D11987D710215FA2BB05 |
| 271 | 111FE4527559A8861E595342127 |
| 272 | 1B89D6017645B2420D4821B1715 |
| 273 | 5E2D9A093368171E520CEC2384A |
| 274 | A2647D8494B4FB4E022C3817710 |
| 275 | 9FA941C01D48DA6DEC803CB210C |
| 276 | AD27165D84708869C3DE1682C49 |
| 277 | 0C78BFE4AB54D24CCC06E202096 |
| 278 | 6F723AD8781D104E0DF520CB109C |
| 279 | 4E2169D802845FE54D2258AE61D |
| 280 | 071FE9162DAAA358AC8402E10DC |
| 281 | E5002B2D2E8D2814663A07DA6DF |
| 282 | AD08811F5416E8232516E53218D |
| 283 | EA182C116DEA1EC228258D84B7E |
| 284 | BBCC6652F881C01D58911EB285D |
| 285 | CA5E8A104BBC6D4C08099F0C7A9 |
| 286 | 5A8BE2D35E406228AB1BB02E18D |
| 287 | 25CE1033B07CC46F5A6264D7444 |
| 288 | 58001B2CFF05481A690B2AEE173 |
| 289 | 210C432C1BA0DE0BBE34316E7C5 |
| 290 | DB8321EB268281014A52AA53E59 |
| 291 | B83448C88055BAD0C0E86D23CD3 |
| 292 | C8276360E342A452C28BB06F5FC6 |
| 293 | 2482B2EBA11870C6F80E080DC87 |
| 294 | 09E26238B738B15A40E8D048959 |
| 295 | 451788168585F5504D8E7C8C012 |
| 296 | 212F3522C52464FEE0831948344 |
| 297 | 14615E32C5939F4D666400B8A80 |
| 298 | 7C2B082447BAB14CB80C7195131 |
| 299 | CE69086AC788F1A014CDE8C0928 |
| 300 | 8D3806634BB3FD2E889A5C28EA0 |
| 301 | 08FFF05B2471C58C944C0B08CDA |
| 302 | 985E89688881062BA8787B4206D |
| 303 | BC0162289FAC207A96249A84383 |
| 304 | 00B194AD2FD1A45185D98B81288 |
| 305 | 04A3D986BD07759109052B9181D |
| 306 | A9E92010871F2B60BC88A505F66 |
| 307 | 172E4539ED4953648884810C70E |
| 308 | 907C062B122AC5D46024D2C2EC9 |
| 309 | B0DF00040D2AB4DD938B6B8A03C |
| 310 | 46D3C6A0E12064A2569A68A2F24 |
| 311 | 092A122E434D0C04F12F8C90E77 |
| 312 | 40C5E522C267C2419F374C0242AA |
| 313 | CD803A964BB84612B8E9880BA91 |
| 314 | A8ABB20154A41D683A428E1E462 |
| 315 | 8ABF4262442413C1BED03147819 |
| 316 | 34C16379200360C47796D1B1626 |
| 317 | 08C20B61CC4FC16D19D75170A1D |
| 318 | 0745FB18B0F4D02ECD4CA580424 |
| 319 | 3A38039B6EC2D1A939473022F8A |
| 320 | 5F0CE45A8CD4AEC20E0062A0BBC |
| 321 | 0222D58F4345265DE8312D9C03A |
| 322 | 41EFA5C8E455969435008464F56 |
| 323 | 72100AB045ED52DA23806707A5C |
| 324 | F9450E3A817A18404523CC76105 |
| 325 | 830B074340581D86397114C8977 |
| 326 | 9A32D01A8C1A1E686403CAC037C |
| 327 | A05242E173A690665C7E01CA860 |

TABLE 2-continued

| Index | Midamble |
|---|---|
| 328 | 64149AA46FF8BC51B49AE118475 |
| 329 | A1A2DB2C33CD9E909C451CA03F0 |
| 330 | A082C11E291F10F304DCDA021B5 |
| 331 | 9685041598ABE51E930E666D605 |
| 332 | 28FA11E686059E05114B7264AE6 |
| 333 | 167811939560BF68204EB588602 |
| 334 | 5989A43C13F70128089079ACCB0 |
| 335 | 4CF662145C576C46C214B136748 |
| 336 | 42164158D12E2D0E021FD726E10 |
| 337 | 84DA51A4689D505C0C7F51A0A08 |
| 338 | E482C48B112D9B561F9CE319549 |
| 339 | 39A821A2EDA85304E98948859B8 |
| 340 | 1B2E1422C0C704529C8278A6F83 |
| 341 | 5322E1B88B0C25108CA182D7CBC |
| 342 | D301CF2F3244C07F2AB218848A5 |
| 343 | 80D8C9E55D20052E12E762C5535 |
| 344 | 72CD198173583B904EA455E5902 |
| 345 | 914E19E9C93D2AE3A1490212504 |
| 346 | 11723460CB386BD68830D961282 |
| 347 | 4E324805404D9CAD7742A18B813 |
| 348 | 12D335119608798B440D17E29FC |
| 349 | 8E664A599BBA0A7EC1204870822 |
| 350 | 988DD02034F96079951BC250B20 |
| 351 | 0F8812E7ED6204364286C92443A |
| 352 | E22C30206C691FBCAD228CD23A3 |
| 353 | 50BD8D4349831FB96425440AE06 |
| 354 | 431208ABF47B0A438E0B9303911 |
| 355 | 71AAD044D50841F04509B87FC29 |
| 356 | 066351A4ABB0094A515C074A64D |
| 357 | 905AEF283A00AC64FA64871F2A9 |
| 358 | C3A931881B8405B059A4053BA77 |
| 359 | 91991518A6500382409ED74B72C |
| 360 | 93E432ECD4004B1261683BB893C |
| 361 | 13C824F5A18168442ACB6370275 |
| 362 | 66369460166E1B5E031421D41D2 |
| 363 | 39A5D098B40085E78C4A90155DC |
| 364 | 106107A3A1CE9535390BBCA13CE |
| 365 | 9043450F6C10DC7CC6E2F490A15 |
| 366 | 4E01ADAEC7F4620C8B08544C160 |
| 367 | 945879987680CC74ED281E8DD07 |
| 368 | 7D6855771263100366B492841C1 |
| 369 | C170A99863090749C014B3E784C |
| 370 | 31B115246CB071F0ACD10DDE050 |
| 371 | 849ACA0601A5DBB444C120A7713 |
| 372 | 4F27084C099237A920D41C4BE9C |
| 373 | 204C94C038693D72AE88A62F0C4 |
| 374 | 1D90D03014DA00E90E5BB99A87C |
| 375 | A40B298E64412757CB9538C391C |
| 376 | D3087F169F0C995BA8E02023525 |
| 377 | 44839816220F71F5A4828874B55 |
| 378 | 58B365C832194EEEBC010B13082 |
| 379 | 7174C110C5886B1C11ECD612A4E |
| 380 | 24103A1B93932E254D972830AE2 |
| 381 | 44058CC208F04C466FC1B559976 |
| 382 | 4999AA5AC400C3EB95089E41A6A |
| 383 | CD309ED1EB264AA791023820540 |
| 384 | 39939A7C58362843E88A80AA031 |
| 385 | 684F14C86621024DE8BA7A162D0 |
| 386 | 168A890FD1960B48A983EED8C61 |
| 387 | 201B5D3D60F61A8B83808BCE705 |
| 388 | 29974905F8DE5E141F296C55A01 |
| 389 | 04AE139008AB4F4F52130271639 |
| 390 | 1747F741226049F0C16E8CD3588 |
| 391 | 2D3F11DD7980E8548746D1D3240 |
| 392 | 121382230ED947FB1818AC370B6 |
| 393 | D0890403E1C9588C6DD6F2D48F7 |
| 394 | EC2835CBC0E961633945A80994D |
| 395 | 1030DECF34A73A9809F9511B220 |
| 396 | 4E69880888F24152993E855F0D0 |
| 397 | 61709F5950699A604768588A980 |
| 398 | A8E0CC384B21DB262D03F521114 |
| 399 | 44A725853C1663E54CD28FA8608 |
| 400 | DD8649E0404D4107438E9842B1B |
| 401 | 813262F6A9D750065B448351482 |
| 402 | 046217328AACBA158F4C1007A59 |
| 403 | A71BA13BC4B1708A837DB383651 |
| 404 | 80E4CCB10FC453E538D188C1248 |
| 405 | 4C395C610C80CFE685380416BA2 |
| 406 | 8C5C292B8BCDF88253E804D144C |
| 407 | D8C600B314193D5823972D4981D |
| 408 | 83C4ADD43534175F3114A23C43C |
| 409 | 467D208E122E00B49327539D142 |
| 410 | 83DF2301A39551003904634B0DD |
| 411 | 8BFE1660167C86999AE68C2C490 |
| 412 | B28A13A31EEB84372E0590D9894 |
| 413 | B66308D3003CC74A1345E206525 |
| 414 | 4CA8629ED9A16004F8968C4E14D |
| 415 | 085B917B94F2445840661C01B55 |
| 416 | D2D446E5C720040D70CC1F311E8 |
| 417 | F08A031B48927D16A5D99418642 |
| 418 | 1560BE5281870848784C5F2EE42 |
| 419 | AEA088BC3CDF2149201702A41B8 |
| 420 | 0D01B70781AABB2051A48D5E74C |
| 421 | B12042006F24A08BC375C849CAF |
| 422 | 5142EC088A071A48781EB1D98C9 |
| 423 | 938FBE0E04A6415314F13708243 |
| 424 | CC654DCC02AC0B80506695B5DA2 |
| 425 | E13758114C466B6E0A494AB0450 |
| 426 | 05411B3A5C30D96C003F8311CB1 |
| 427 | 0621849B10F18BA45D2589915E5 |
| 428 | 1C570E5C6227D6CA34A4B806503 |
| 429 | 01205DB1D0D0192AA21DD41A34F |
| 430 | 45005B9F6151F22984FC65A47C9 |
| 431 | 18CC998880AD5593CF0627D5149 |
| 432 | 8D2B8694609B20D0E80D551CCC4 |
| 433 | 47136225EA5CCB035A4129C443A |
| 434 | 0588795ACC26D98F06E052400BB |
| 435 | 68F46CB11ADFD189278812910CF |
| 436 | 4206B4524191CE90CE9963FEA05 |
| 437 | 3A4442E584E219FEB186D52222F |
| 438 | 1A7422DBEC0485A207909491A74 |
| 439 | 70AC9C9143928D920B9EB43DC40 |
| 440 | E453073624C500D4A0459F46A38 |
| 441 | 30A82D23DC4DAC3E1A634EF4749 |
| 442 | 909537EAA943899E042A1326BC2 |
| 443 | EC08E071C9490AFD8A2E6C4AA41 |
| 444 | 2C426BEE789468EBA2610120A14 |
| 445 | 0459FD3F41A8054A3A21160E1C2 |
| 446 | C01D2F6182468938414421FAADE |
| 447 | 028D0CDCEAE61447721206EE7A8 |
| 448 | 3C8B4EA1AB60352CE0306088CC5 |
| 449 | C7A1A9B0BA528A0864A94818F44 |
| 450 | 338DFA79C1A55501E4D057242B1 |
| 451 | E4DBB68DCE8854404A7C0CB2A86 |
| 452 | 7B10973E1C351529A66D9891C07 |
| 453 | B8E1236C162386733F229044156 |
| 454 | EB26416F02631932A62468A1728 |
| 455 | 486AD9481924E268121C8DD2F14 |
| 456 | CB01845F2AA23603D891AC5A225 |
| 457 | 885684C8F03C02EB892D74DA8C7 |
| 458 | 099A0C66351178490DA0E875856 |
| 459 | D03701005537E72C5ABC171487A |
| 460 | 324EA55F090C2A5C07F320A238E |
| 461 | F81AC5FF07065B1A9AE12414231 |
| 462 | 6350E49AB631B1D2834C2D913C0 |
| 463 | 16039D2671C3D02C85C8B99654B |
| 464 | 2F21684125565613900FDF0C8CD |
| 465 | A197B4A320E1509369A8D206807 |
| 466 | 18E7606D848E052DCC004B7356B |
| 467 | F278B598A06C869CAEF28440CA4 |
| 468 | 44380089CA1CC8A6701E953EC9A |
| 469 | 08EA0AC4F37F8C1113864AC9786 |
| 470 | BA29C1E8EB40466A4F846734847 |
| 471 | 3D4085885CC2B61E8309E2714BA |
| 472 | 8206DA2E62D895D36100B3D0AE6 |
| 473 | 90C054AD5E47244E88F084D288B |
| 474 | 7BAA0B2E913B0502B29D3642306 |
| 475 | B05984A05101791E5E5ABBA800D |
| 476 | 148A8876844BD3530372AB8044B |
| 477 | D378018D295FB0AA680C1A78DC0 |
| 478 | 885464570997247A8A4940D18F9 |
| 479 | 239B303D844D2561103068FB612 |
| 480 | 923C5A4116B79D1214C21FD50A8 |
| 481 | 9E114305834D102F866038EF541 |
| 482 | A43724F80281963DB624E55A31C |
| 483 | 2F1A425C11669156F7CC1408ABC |

TABLE 2-continued

| Index | Midamble |
|---|---|
| 484 | E375AFC2A4C1202D3161C6909F0 |
| 485 | 79487881C01B8810DD7C1C9ACF5 |
| 486 | D8589287682F5C4E6111166593B |
| 487 | 1C03060B8979A696357B80E6750 |
| 488 | 695A4DEFA08ACA50E6185513BC3 |
| 489 | 9C9097D932A0408CE5D2C5042F0 |
| 490 | 4B9511B2B1EF6C2371592580616 |
| 491 | 103523A19C606DE4AAEB8282243 |
| 492 | FE286365B4C7A10CC042648BA74 |
| 493 | 0BA4781A750C7EBA50A266C77D0 |
| 494 | C0A25CAB2A96D783D0024DA0467 |
| 495 | CFD50800306C4BEC24DE2D8478C |
| 496 | 84602A9AC33A302C180FF4DC897 |
| 497 | 54FA0B0804864047919837F345A |
| 498 | 3C2DEA5CF9C102CD2265544108E |
| 499 | AA0A419A971C273E93D26E4B20A |
| 500 | C0F1E58AB91B77B0321A8F20115 |
| 501 | 8D14DC968A68F040736E40DE75A |
| 502 | 3189EA4644FB474F15BC44A049E |
| 503 | C18D432F1085E2D926001A2B65E |
| 504 | 20A6C02DCA6C916EFD1A4E4E01D |
| 505 | 951A48738B388316005516EBC06 |
| 506 | C94D6D6932B864088B7C0E86419 |
| 507 | 91080F918684BA29B990721475D |
| 508 | 4C8A1241B817B7C329EE8D14112 |
| 509 | 0423D418F1C07EC9B2A6531B1F5 |
| 510 | 338124B9C2ECE89D07CA2AB5400 |
| 511 | E9B00C3613B610674AD426A1819 |
| 512 | A1C8E1EBE9040B02E4210ACC84F |
| 513 | 361CC00650A045193D9B9ECA2A1 |
| 514 | 70ED13000AC0DE20EB8D4C913DE |
| 515 | 642311E00B6821746EEB4A40F5C |
| 516 | 502188EE9B6AE3F2383272D5424 |
| 517 | 9C9DB0451D824086B1933A799C4 |
| 518 | 7D2359EDA2207E8D168212E0AD2 |
| 519 | B6A2164102CE8E3612CF240833F |
| 520 | 3B8CE95198B000302FE74973304 |
| 521 | 7287094AF86B94E2B04CA284130 |
| 522 | 44DB0019D960871A682A155E46D |
| 523 | 38462C2F66F9984091F3A1828BA8 |
| 524 | 2A9D5C98CEE3484A0020BEF0CA3 |
| 525 | 7C84E0A61E06216F70D26AF4981 |
| 526 | A6D48990F5B28D7240386A30A58 |
| 527 | AADA80BE9309C5C48A2C49DB347 |
| 528 | 182B292165067BAC892EE201C0D |
| 529 | BCE40EAE0AC9312A58C03113921 |
| 530 | 947B69E3295002710699311BB74 |
| 531 | 4C6453A86007A9A03C601ACD9C9 |
| 532 | 902227D07904450E72BA7E5C398 |
| 533 | 8A43A7BF1AF250013B10651524A |
| 534 | 246DE1B011A50A337E0D92C510A |
| 535 | 3C832A7E63ACC7C09B14595A5A8 |
| 536 | 9804BBEEA616D8BCC0F0990C85C |
| 537 | DA59F116DE420092807119C9316 |
| 538 | 7470A5C74E5B8358812C32BD240 |
| 539 | 06AA80271CB2EE2AC9CF9B53301 |
| 540 | BA851B16424FE9624D104B04825 |
| 541 | 567F22C8F3307050FD15703A410 |
| 542 | EEEE48C3689A5A7344350297880 |
| 543 | 110268074CA476C6A59B5D51C06 |
| 544 | 78122FF002C5DF83DC61A31E4DF4 |
| 545 | A076EF36608BAEB6912DC530332 |
| 546 | 5C97F41B3CDC0A9E0349489958A |
| 547 | 0488AC49B2B5A4B1578CEA21C3D |
| 548 | 224B4C26E0FB515EC8A85027C7D |
| 549 | 88A1356D5FD895402CBCC6586D8 |
| 550 | 46B7046081299F8159E69078472 |
| 551 | 100D8F96BE7532E44A808FA1B45 |
| 552 | 9C5322B9488284F92F141F4808C |
| 553 | 25066E61F458601376750BC86A5 |
| 554 | 457ADA60D4207A5B92A907B1900 |
| 555 | 84A06ED01CA201CA8778F70D171 |
| 556 | 6D88B9720101C5E321D181631D6 |
| 557 | DA38CC29109088BA0DF4C3AC087 |
| 558 | F8F8D66A5C4270896410560D852 |
| 559 | AC7B0A214B47D4019232F407F3C |
| 560 | 8C0ED3005C1999EF353F25EA051 |
| 561 | 207C5635544C2A5952E40A6D73E |
| 562 | 020D027EA1834545D4F1B5AA178 |
| 563 | D929104BCB37F82569B0A0CC41C4 |
| 564 | 50C18AD413BA52BB24085C72369 |
| 565 | 7A6C8CAC882475D820D053BF5D0 |
| 566 | 329DC051C61217F03A1855BC2BC |
| 567 | B62D6B95482221E7C104742CE8D |
| 568 | CA1B2E06D120D38CE226B275487 |
| 569 | C4F40C6B9E5A24278BB621349C1 |
| 570 | CC45926AB23BCFC30C015A1B515 |
| 571 | 3775A0415A8C71F3A4E0DA0D80D |
| 572 | 0553310EC270A127B2B5404B3E7 |
| 573 | A14CE89A6D4FC649E109439612A |
| 574 | FB7093518D8976CE4938C01A520 |
| 575 | B940D813F2302E114F91B198E45 |
| 576 | 9D14CA903D5E60B64420620F9E9 |
| 577 | EEC0562174D41C69D63A0362DA8 |
| 578 | D06E881FEB23189454E0C06164D |
| 579 | 37748D834AA0290EB3C19C89D8E |
| 580 | B415789B505B3E163600B8CCA11 |
| 581 | 44486A9E0C76A4007519F24AC76 |
| 582 | 3A8FD84F5200282A5E264D38C5D |
| 583 | 060E364E26AEB29CB5E3F02C453 |
| 584 | 3093031AC7600F5418F822B935B |
| 585 | C290A4516E7F4B802E2884CA888C |
| 586 | 45A23B3B76CA232D03A52404198 |
| 587 | 1AA051AB40F07846695B576F024 |
| 588 | 93D8A50680B8191B9E5C538E46E |
| 589 | 24CAC52198EE5B0679163F05C10 |
| 590 | 568F29F911884FB162B6269241C |
| 591 | 85190B38685CE4042B9DE2E92C2 |
| 592 | 24300AC63F9391C52590B346952 |
| 593 | B851D256521099B049EBD0A462C |
| 594 | 72708DF6C1569200263AAD851A9 |
| 595 | D32C8B1E2ED04CD7AB09C1D9002 |
| 596 | 2981368CB82C7B22D44DC618158 |
| 597 | 8C58F5F47913590C7F00502AC44 |
| 598 | 67219D9D10860D2AF368E9275D0 |
| 599 | C59404163BC9170698548E8F43D |
| 600 | 0145C42427986C6868679591ABB |
| 601 | 03C23815D08670EC3E50A6E082D |
| 602 | AD1199F6925BD2292051C24F850 |
| 603 | 6061D6518CB8725674DE4D0025C |
| 604 | B1EC513EB747193D866C24401E1 |
| 605 | 4E030199A30A4A81969D60EE68A |
| 606 | 9F1342B00171BD60ACB4297320D |
| 607 | 341E04BB66CC543010F2155FCD4 |
| 608 | AC028B6CE4A336F8B998051485B |
| 609 | 85C39FF50D07688DD41B620132A |
| 610 | 89624519DC1D1094CE0F5C2AF24 |
| 611 | E7C02859311AE4C72727960C578 |
| 612 | F3C25D82968532804C6F568CC30 |
| 613 | 4321CE2497F53D15A2285A052B8 |
| 614 | A331A7967DD108A56056C00D16E |
| 615 | 523E18BF3F419B4D30431A0E527 |
| 616 | 5871C82200D1EB8A18F13D42674 |
| 617 | 4D16008C55BA9BB5843F1673450 |
| 618 | 3871F401AB78EE3B1B2508C3645 |
| 619 | 3162D55A83B5C0D835BC95C4101 |
| 620 | 0E1773027591637E8B2804064E5 |
| 621 | C2782CE61D013A4A2A347E2CD1A |
| 622 | CA0067250A1B35884690A7D4A0F |
| 623 | 5993CF04A8A087F895076D0E360 |
| 624 | 60067B3E78E2F540E1B84A54449 |
| 625 | 58082F26C18F6E26754FD54A031 |
| 626 | 2DD2EC60D110C24A9F01538D4D |
| 627 | 5293D86C93BEB04C0A20C181A9D |
| 628 | 4D48A42C28AB0017DF083916CF0 |
| 629 | 20F9448728D4F5812660BC0AAA5 |
| 630 | AAE660A43939ABB0160631CB36E |
| 631 | D5DA8AB298E1C04180E17209E60 |
| 632 | F39651227A15D83A5050A419E66 |
| 633 | 8D97431712105015AF07C21865B |
| 634 | 02AAC9727918D3A6A410238039D |
| 635 | 347680216BA2085CC6293568F18 |
| 636 | 7953428711607C291173341BC20 |
| 637 | 9F8AE21B263B0A1D52EC310890A |
| 638 | DA278C3607A092500AB6ACEEC21 |
| 639 | 63207644FB214A384AA9584FB12 |

TABLE 2-continued

| Index | Midamble |
|---|---|
| 640 | CF13C714D0ABDEEC1300ACB02D8 |
| 641 | 9C39F3C290C2291598A4516C07F |
| 642 | EA8F5361030B1A1022CA2DEA0CD |
| 643 | 4734D2B820A5239926152CBBA61 |
| 644 | 162893D417498DBC694DA3300A5 |
| 645 | CB80362DC3616D556E1CD489007 |
| 646 | 3CE9156496B63514C6650881FE0 |
| 647 | 221C0185E6217725B6E2D355156 |
| 648 | 5A3B485D2E11211B22B39939407 |
| 649 | 071B4808CC6849459EE6C9DD435 |
| 650 | E50099F118433B4F414048853E3 |
| 651 | 1700A3C275DB472928113A225E9 |
| 652 | C7C250FC4EE84B11D5C80441266 |
| 653 | 4D6064FA0CDC18A136F78108F68 |
| 654 | E2084FD20983907CAF53055D35E |
| 655 | 269E1CBBF1109658C616B3482A0 |
| 656 | B6CB93001D1821CD21D27EAC501 |
| 657 | 79208451C863660DAE478AD880D |
| 658 | 8D81F2941412ADCD37282293630 |
| 659 | 058FAF86089B9204C046932A72B |
| 660 | 1EA1A4471301045CB7D802170E7 |
| 661 | 09F6A78488CA38C132C13436AA0 |
| 662 | 3537122E76F434E282922C0710C |
| 663 | 820D46AF0179896DF2D9131770C |
| 664 | 60B25545C081C6E4279CB3687B4 |
| 665 | FDE1074EAA1C81C359A52B4160B |
| 666 | 9AB00F2B5DB0218AAA5E4966C10 |
| 667 | 4338243EE0A410285D8F1C4F662 |
| 668 | A4E402C2917974C48F12E6B2D13 |
| 669 | EAB46690B1C57A74B4739B26002 |
| 670 | 38040ABA39537C90ECCD25103D0 |
| 671 | 25C1C199AAA584649F6E8809C62 |
| 672 | AB4169144437A32BC6228B961E9 |
| 673 | 6E8D77CA6106164CA808FEA3324 |
| 674 | B709D174BF11826003293CD478C |
| 675 | 833BACC820A413B2BE3B2915EF0 |
| 676 | 8AE5610032E2F69A75B5C054DC2 |
| 677 | 69A32CA291E7047E272140C46D5 |
| 678 | 6E77496212A63D8960A015E705A |
| 679 | 92621819D2BEA107AE32F03C4E1 |
| 680 | CC64009760E418E41C25B77A14F |
| 681 | 05067C0704E125B8CE88155AED0 |
| 682 | 18D2ACB1B1F7562610265683039 |
| 683 | 04C41060DD6E95CB623507EBA19 |
| 684 | 47261B2E43F833564021449C425 |
| 685 | 01C9E177277A61468117E1291B2 |
| 686 | 82FB9B001E4E220D2220C73593A |
| 687 | 90EB8CC1042F4BF8545C2260986 |
| 688 | FA1D9B512CADC8708DCD438A213 |
| 689 | F83C13ED072E72115314B20A8E9 |
| 690 | 89C185129E179CA20EE48B32C0D |
| 691 | 247208650DFEA4564236FCA9533 |
| 692 | D0219B9304B6D5FE8CB108C0E89 |
| 693 | 2912D189E601911512ED1EBA3D4 |
| 694 | 8E3229218ED9B1154F288D2A999 |
| 695 | CEE2C4C087B35E045487407996C |
| 696 | 509CA4143E955A08B58D1CF077C |
| 697 | 97B693A840A0433411DDAB2A76B |
| 698 | 030809FE6F56D45A954CAC407C8 |
| 699 | 017A1E120558268928E2F8C36CD |
| 700 | 6941E2308FB1862D904A2276A17 |
| 701 | E2CED0697504E81F04C568D4419 |
| 702 | 11F3DEB699030EF0C580A65200A |
| 703 | F8F9212A614106C03C672C72DA0 |
| 704 | 86187F75015B50A2C9395878241 |
| 705 | 8D9E810A6F9B910763B06A80514 |
| 706 | 545838BB34E986288FE8C02B207 |
| 707 | 455B6687419D02E9B0A8E530254 |
| 708 | 0F93D76409804D844075D152B72 |
| 709 | 68B097C086918512300BF6FD1BD |
| 710 | 08D8A48E210C9F4A89E0B38698F |
| 711 | B0A90330B438CEB55CE84E6A481 |
| 712 | 502BB18D4096FE3F370758A6328 |
| 713 | BEB85203B233C1996C0604A69B0 |
| 714 | 0A14DC316AA0B22ED61B8404674 |
| 715 | C00885519CD4CD18BAD685B625F |
| 716 | 28010835E276CF0AE0717AC87B0 |
| 717 | EB019424643DC5149D129C35690 |
| 718 | 26C3486054FFEB344AD2054B8C3 |
| 719 | 4AA0A2924A8C93EC306785AB191 |
| 720 | 10205E4AEDDC56BC2C82F231D80 |
| 721 | 0F972556483C2421B8D5023EF12 |
| 722 | 72E056BB484C41B22B090E0D60D |
| 723 | 3E38394CCA2DB286AF1823D431A |
| 724 | 1BA1768BEB83E538E9294A10111 |
| 725 | 8EDC4137B7603B695421CF069D0 |
| 726 | 5326AFC1D879116B9E9A007A413 |
| 727 | 6F6B80C2EC8DD75A60890E9064A |
| 728 | F94F34151296C3B8CD1888C1C11 |
| 729 | 426B54310D8A8974CEF9316B860 |
| 730 | 2650386C3F9103110F3882A366A |
| 731 | 215A3EEC8462B16D0D884B8C2DC |
| 732 | 4CE939E16D021665757B80099C8 |
| 733 | 8A4CB2FDBF1CC2B5531033B4046 |
| 734 | 143AA271BEAC808502310FE136B |
| 735 | DC508D0D822EDACD356B59A9101 |
| 736 | 06964D1D7A26EB9082635508FCC |
| 737 | E40642C3237B5C146129ED164AB |
| 738 | 2070C18C68DACF1160DCF2D2688 |
| 739 | 1F34022F2438182F56639228C36 |
| 740 | 88960163E8B582EEEA562E590C1 |
| 741 | 0D63277D98AC26FC12053582438 |
| 742 | 142D0EFA44227788F05A9693061 |
| 743 | 384CB00DA34EA4BFA4445CAE823 |
| 744 | F46BCC5C5904E5038580C66EC90 |
| 745 | A5098874536448FAF9F4DC39C44 |
| 746 | 489240E631C8DA3E8593F14055E |
| 747 | A322D2271C0B137C3184F4A4AC1 |
| 748 | 215E83CD2C91154BCB8201E40C6 |
| 749 | 84618D0F1F0621B3D03CC4CF242 |
| 750 | D79C1748D464BA4849C64F208A4 |
| 751 | 6E1CBB690186DD119C3418AE14A |
| 752 | 8B02405938DD909EA975F018C0A |
| 753 | FD100C4415C822DCC24B3729A8F |
| 754 | C1AC8F912B48E4E4544B0A27E92 |
| 755 | C19E2B6938913209C088423FAAD |
| 756 | 194DB42689AB10E1D2B4F081CC6 |
| 757 | 93A0250307C652E30D52754B3CC |
| 758 | 8A005B73DB150575327940ADB10 |
| 759 | 012C3AE88629987BD851AB0513E |
| 760 | 0D4F2435C31EA15673BA2428189 |
| 761 | 3BF2D473F00E9068C0C96422557 |
| 762 | 100D00A9271DD16CC197497A3BC |
| 763 | A3E63304E40BD0C42C253D734F9 |
| 764 | 0BA1C74F74224475B1E5506F904 |
| 765 | 2045553B10C3A2C36B7B6899C13 |
| 766 | E957C02C9F5348A07C734841A84 |
| 767 | 2254F5774D398F0984FC958801A |

$N_{FFT} = 512/1024$, $N_{Tx} = 4/8$, Length = 108

TABLE 3

| Index | Midamble Sequence |
|---|---|
| 0 | 572DC451691E82443A5590E419804A42CCCF95C30EDD525B73F3AA |
| 1 | 21500303942227F425C69ED1A1EB03CBE4A983156DDC58B11EA793 |
| 2 | 0923CB08ABA0A0526D8F7E6361599667CCF8B0B51BCF7229121EF0 |
| 3 | 883CB69E7AD50DC95B4A8012265A373B203F9F8C26781F1CC9A0AD |
| 4 | B43B61EA66BC769730245C40649144BA86FE8C4A13A94DFE0FCE55 |
| 5 | EB66B50190CBE488A46218F20E607E5FA1478AE9BBB33A2FB150D3 |

TABLE 3-continued

| Index | Midamble Sequence |
|---|---|
| 6 | 66A7A14602A2E81F1ECF28C98221E4236C82488729CC7B73747772 |
| 7 | 26530DD6160B8605FAA19903F02FE61576E7FC581B1840937378D9 |
| 8 | 8BE8223AA64D6A02574B593E11404CFC3DC8B64204B39543E7FF28 |
| 9 | 9B8760C635D358D0C14007A21F674A6223AF526D0209E15498F6E1 |
| 10 | 833D2850824902AAD2A383E8EFDACFF55E138218CCD7D9848F0E91 |
| 11 | 297110E4D7559AA2002AEF4B6806F1CE25F9772697E90C580C4EC0 |
| 12 | F7104B410AE244495A1AA59B2C97A01A8E26E7BA9C081DA3732EB8 |
| 13 | C22B90260642577C211ABC6593940C2ACD96EA3BF2DBFAA6242E39 |
| 14 | 396086DF0005990989573D32A8CC5E32A965969503012B471BBDF5 |
| 15 | BF6A85D658A1C276828CCC348473E5C52EA7F125C07A3E9E3D8964 |
| 16 | A6F703221D2A4E4030DA1462C470607E31F15DD73BEC81AA7610E4 |
| 17 | 17AD74A561860C5146FC8C1017DDDAFA5C66E1F52B11C0A4E07454 |
| 18 | 0B1A072706854639B4CA4022F681941A93F56FE42CA3235D39151D |
| 19 | 54279123E5529A31666C6D801C813436729571D1421FB8A8531DC7 |
| 20 | 2751C43E28CDF8E440C33894A05B2939111E300DDFAF815B364DA5 |
| 21 | B2E82674ABC733D80A0C68A3112A235725A966B89B30EC1EFF0C25 |
| 22 | 9305A83233D3B6E0A036803A9ACF23F10EE1069A978353C7896452 |
| 23 | C4D16C0F7830B0C7010D7C825806A5633524F7578C575ED25D122A |
| 24 | AD05FCC0880125861F0E96930DC83B1BFDDDEA118EDF8479326D4A |
| 25 | B4B2CC52190C52AA01FF444A5AD3839FAA3BB3B9B310D0644C357A |
| 26 | E0AD85A0A32C3BC841BBF4CB1F8F7A6629173C8DB30936D8F9A922 |
| 27 | AED6DDCDA44559691F40430F0380A273FD1A5784E43E0C977286F1 |
| 28 | 1EE2805624E03629250CD49EB7B5FBB8441C31674365A2284D98F8 |
| 29 | 27A5A0B1AEF18416892ACEBC11DA35CAE0C4BB308F815DFAD981B0 |
| 30 | 433D1303481492124B516EE8BD91B7FA558D8A6E3B4603A1674C65 |
| 31 | 2D40ED2532A2239035C4357F3400D552FCB0895505B3AE5FBBFC86C |
| 32 | 3CB9514C0466E8294C87918CA6722EC20DD5AE07C3C31A0432AF3F |
| 33 | E441D548F47A8A46962012ECB6DB20DCBC3C23D0A9E4CDAB70C686 |
| 34 | C143C5D122A844C3B9F6C82E5A99A80F4F61DFB94B850C6F2EB0AC |
| 35 | 41E4F1F933285A0A004172CF714EDF3374F6103BE804D4BDC00D6A |
| 36 | D8D01C94B82B2155407FA6366C4BB169C6E01ADB5AEB866B4BB421 |
| 37 | DE2ACC12A29A0656E243A23225D2C21FDCC235CFF1E00C890AC7E7 |
| 38 | 48892D8E408D0F53B4A0C83AE8CB545E8CC31BB8193DE4DFB613F0 |
| 39 | 998C48134173F69988925488879F592A976AB1FB8C84F10C5F1C15 |
| 40 | 032665B74BFE0257AD45826A0B1A0310E39913F2BA7F4829C2AB3D |
| 41 | 5002EDD6347A63DE671252801646FBE74E899E3B28A99CA15605E6 |
| 42 | BEA3CD10705DA8600600D196B356D45F1D09D9834FDBB969146B08 |
| 43 | 9044786C016C1C39FF989467E28D21FB5DADA4236128DD183AE92F |
| 44 | 3903100BFA55195C74618A745A602F65E069352FBF4ABF16364343 |
| 45 | 920C4E3A8B171A4B561AC5FA552228EF6C36ECB904C6EAE1408C1F |
| 46 | C8A2B32585A252360607A83FC12A74EDA12E450457D882DF985617 |
| 47 | 4DB6010025AF9D88D162AC673A9EC1AB8935D503783F35170E30BE |
| 48 | 060619D5A1695177A54A2364B0533589478CBADBE338151600DE86 |
| 49 | 10A3135272803A2FDB40F9C088A1FB34CFF8622FA4DA841232E46B |
| 50 | 824943F0BD3A82A8BD846B0330CB50114422BF5587D99A6376D63E |
| 51 | 51226553106B35E696C95800F387C8982C2C1F07845DCC4FAA27F1 |
| 52 | 2729BC4A265C922822D8C7297E24AF0A6EEACB1C1447B91F19B1D6 |
| 53 | 371F4E2932626FC946D081076E4F4D600557A028A7AE18E1CE5BAD |
| 54 | 34A387872500671C1AC9AA8FC2CD7506E95C2215B46E8BBC857CF6 |
| 55 | 1522450E5199BC76ECE4B240D4F8FBE063D4EA246DD846F1211A39 |
| 56 | AE640104946838AC5FA3367B211C3E5197675CD5F940E04DC2C7F0 |
| 57 | 8A6C3A312295C1FCBD90A2230842DEA0C7DABC6994718A47D1FA42 |
| 58 | 20288E8A6D9B584BBC0F44058C1E51A9398D031CDF8E29E1B5EB62 |
| 59 | 0066D2362BD4DF48603552A6A69F72037B855461D8876F304879AF |
| 60 | 72A2FFE4D980561C3228841E62ED8CBD0B6AF231026A1BAA397394 |
| 61 | CEA0A58FE50968A1B0DEB0D162D315FDD0EB0647FC9A8A6D801626 |
| 62 | E512A48447A6475229C81BC3BA772C85D231129B7C5415D5347BAB |
| 63 | 6D1798BC5E878274039C09924E6956D7467FBC511B6F131003AA63 |
| 64 | 940696A6C26AB85032DDFE05643296259E1BF0350311CB6722FADB |
| 65 | 2D01AC4F044AA467008CA7DFF71E2A9761A5C282ACE59B2C657F1E |
| 66 | 2D436123DDC005D588E51A047889CDB7A2A621F95DB82028D2CC63 |
| 67 | 6C9C7442C384C6FA0D42C47B01057151EEBE9C871506AF5641B785 |
| 68 | B131E4D263A29D1A006B3E3A235341040A5FBB63871BD751DED956 |
| 69 | 0EBA8B20BD429407E4C21B5D2461E22733C5EFC3B3533E094B688E |
| 70 | 89AEC268A499D40756132E1F0C80B0BE2F48BDECE5835EC6363CC1 |
| 71 | C2116A04A14BF21E68293F9B4D29C07C05F772E5BFC7236160E69E |
| 72 | 482B74144E2A83F6AD7124254AB4332329131661ACF084B27D8A7E |
| 73 | 08CA8580D1565D0CD338259EED29ECC60CD5F2B5E003DAA09513CA |
| 74 | 2961CA12A07239366DFDD03924F806BEA2611C970F52786A70752F |
| 75 | 9F2890E84015DBD4F6B2EA20747B897E0ED99126A7714424BDB677 |
| 76 | 0A31792D4364DC8069B8A61A327FBD45655EC969325E1589E09176 |
| 77 | 9A6D20F5A79E926691225462C8515F805C2B2A5313B19F8AEEAE18 |
| 78 | 8CD0182A1D9650E715159F4351AC66DF38440158CA45FB73C5AC0B |
| 79 | 0620F21823CBC100DA8D517DBD76F5CCB7746220BCC37981276257 |
| 80 | 4F4AA80A02E1C2F4C99C6CBE3A1993B09E2C46DA476DD24E1C29 |
| 81 | 273A3221900C70B6358B61045FF71306ACCF35D3F05524BD035648 |
| 82 | 45302BEFC9CB1B15A176219EA603C95C6A2C4EA41CBA29C7FFD521 |
| 83 | E43E63632EA8A1C020DCC91B0598935E52AC47BD4F2F5F36A04417 |

TABLE 3-continued

| Index | Midamble Sequence |
|---|---|
| 84 | 2D15624F8EA885684A092F88C040ABF99B666617FC223B8A78E7C |
| 85 | 290BB41101BA720E929B36F45260721F2F58B2D51ED68FDF411754 |
| 86 | 6BA910784A4F480A0725545B60BE4795049B1F7C621C6382C8B67E |
| 87 | A41B48694117B26A672C1C4EA49A2E01A8B8ECB3256E990A55C3DF |
| 88 | A35C06164D00D97F6E22728CC8DC99C600ED29ED4FBA0DEF8D07C2 |
| 89 | 9D9048DBB2523527388E8077187121AD0E7BA6C2E7BE24965CA0F5 |
| 90 | C72965F69A38342D4FC22C0244EA8EBC111BE89F2C6698255CCDD7 |
| 91 | 9D356D42BEC1048B938B9502B0E2DF88566AF2374B2D855135C4F6 |
| 92 | C824E8221DCBEC025BC0B189227ED5E98F59E9E934805E5A7045DE |
| 93 | 81186EA029F30264F186AA86CC651B06C6782D0F77E261567C5232 |
| 94 | 145B320B85236A072C4A3D9C38E3EC49683DC50946687BA793E8DD |
| 95 | 71C12A10FDD086365536044ECE996681473037FE718957E36FA9C4 |
| 96 | C3E0778F7A90E0AC904112CC93B26A7C67CE54D27256093F5C8357 |
| 97 | 10EA986318A26E57033D65C642A497BF084D061D24DBB070FBAB3E |
| 98 | B03877EA012BBB491130D98524829F8043058D778CB3A13BAA9DC2 |
| 99 | 16986E7BDE3C7A0103EB1C940A776C6554D7665DC0BEE0A07C3493 |
| 100 | BC31C01DE289C2781C514CC4602D6D712709A5BF59216A9D602466 |
| 101 | 49E09FC093BF5D15D233036A148C65E38F644F0F034AD3F57A8842 |
| 102 | 46CACB1C3E698F10E80775DC041D6530DA8DECE4C6AEDD5AF228B2 |
| 103 | 5B7BD7034CAA82845CE150907C4612BE90C9D54B70C26C53DBF261 |
| 104 | 410202D29B86EC585871DB8D44394343F028DC36CCFCD8F76D4025 |
| 105 | 0B2BE0976655ECC6083656F1A013140ACDF69F7A1A0A628BA85D36 |
| 106 | BF49140630290A844E5315C67D0D5960C62AC7636DB2970D18EF5D |
| 107 | 85B4B1E0298244D982C04A7DD3A739EB35340A66F302AAA791A89B |
| 108 | 90582B00C80AC6E53E7E4CC82EF7A86A97720F2E18B5ADE64F451E |
| 109 | C9A0062199E1201774B6ADC947049F55217AC38942FEA382F26ACC |
| 110 | 4028E2FC5E71B6F9074CB158060DACDACC1786859756F5142C7AE3 |
| 111 | 638102B12AC93722D6C20ABA746BF8E145B6CAC80633607F681E83 |
| 112 | 03AB9594AD96262F6F8CC9803F89F5F9DB8071C42A222C1697F617 |
| 113 | 144813C8B6034C0EB2C15271E9D6A9910C0FDD9BA27233D2A1AEF3 |
| 114 | 40248B3B22581BB0ED58098673B215E2AA525D9C67B077650D7FC1 |
| 115 | 8800176D0D7EA512598180BBB9CADAD25EC978C378DD94C6855E2E |
| 116 | 00D8CF4E27206508B844EAD895DF22089E3B7E397F9464AF1D4F42 |
| 117 | B50C287277281431E4964E039DD06C6DE06AF765351344DAB81B44 |
| 118 | AA5322E4805F00251445F9B65059C58D079CFDCABDC1425078A667 |
| 119 | 92B165C2519E70116A2FE80B0D0E7C68DD15C8369B6172BF38190A |
| 120 | 78011CAF833425F6ABBAB14831291D1F81E9AE238C3DA2569EAD3A |
| 121 | E0C741B962D10F02033CBDAD4A99C2BE713A09ADB819B64E768AAA |
| 122 | D18C90382D30D1FB4905656EF04C09931DCBE28DCACE6B83B97C3C |
| 123 | 88474B016286FD4D927DC05688C143D6DC085C9994F4B3B7F87D1B |
| 124 | CDFD1EC5480B05244721311C180C5D47EF40125A4DEEC508D79E3E |
| 125 | 7A7CC44A8300C5AA66A10A6EC010E8E3FD063289BEB85948B63760 |
| 126 | 89A7E017407C54C9089CD5635E472DFD389EF4C96CDAC758801415 |
| 127 | E8DC509A5E272D260ECC3296C099F440231CF0D7BA2EE4B46067F6 |
| 128 | 7245F113C91401A9969D982C24895D2C5B39267EFD5D4E02828D60 |
| 129 | 20060483F156E42CEE37F1718AA9AAE16B63D616971CA3CD9AA70D |
| 130 | 71936B68AB03E0224E8A8920397703A32971FDCC742659D2BC1218 |
| 131 | E0BFCD359C281A8874E29E0428CA849ABD5134EC97D1DA93E3D4CC |
| 132 | A1893FAC05A20D8350458F4379229F7AB9738C1E4A362771526329 |
| 133 | F4E9894A65059DF5D809504460C76C071ED019C138F887EDBBF07D |
| 134 | 4F309035612273743A6DF585C43204E4E3F7352E84AF34075BC771 |
| 135 | 80958AAC13CB0F6D743078784937D994D64877DC7F4B9261AC0D4A |
| 136 | 4B2199642BD91049D06A62C3177462585D9D1C7F0E8FB8728AE129 |
| 137 | 6D5CD91AA525A0F023A053865C890339C397DE792187A2D1FD934C |
| 138 | 61110341C9672666C722D7E10D71F74A3B54C2EF7504092E2BA2B7 |
| 139 | 093A1E9C62332E1960D9F320AB185701B700AEEBD84B7BCA3F57AC |
| 140 | A36F4132AA26958088D446D7D94B064E9FE14C9052288CF8B8723D |
| 141 | 7009AE5420A1EF0FF4505D2C9095BF7B9A22741E5D1E305033DC2B |
| 142 | 5CB88C745B90B9582281398A14A680ABBD311050FFFA0FF348F4B8 |
| 143 | 995060B1E4C42A8AB8436E7A6CA9458C1F20CAFDAF3FE1BD320C45 |
| 144 | 506E7E1E4658468A0C254A58C03B8EDC8333249957DAE508EF4129 |
| 145 | 392237CF74930431E0E4B43DC46E594DEC51B77AC0C702423D627E |
| 146 | 40B8B49FB717A684D9843E78A8035BE0FF71E6B0C4533808D9BD18 |
| 147 | E20995376865020F46F2C43D933C2EDAC58D720F5725369990F872 |
| 148 | A5F0A256A69C362A0AE83815A9D68DF66F13BE29E900B6CB798A64 |
| 149 | 0DA844A4495FEBC385691592792D902291F88C3033CDDD7179AD39 |
| 150 | 80F56B8C8E412E28DE1F104C1680733ECA8EA8964EF0646A43D647 |
| 151 | A1D5E62EAE23030BC9708A42613C8B5356D02123C81B63DAB9CE69 |
| 152 | A1F8390C95C916174621D656A9C2147669E8DE417159A5E10EF9217 |
| 153 | 11DCD91C12381580083D37BE43B53AD2D6A71109DC3A26CFA61907 |
| 154 | F29B129C744C0FAA0DCAE070902DF7D28F36137261217695C257C4 |
| 155 | 8239879D9029217388F574182323FC54939F03FC94CD325E350037 |
| 156 | 4081A0C681179AECD590753E18A40D7A7D88AF9D827A9691B6B876 |
| 157 | 5CC6E40652292B8FA780A55404FBF36F8F19FE6F174A5244A51047 |
| 158 | 8A666040C9395A603116B30BDFC79A25DF09241A2396B82F9D9DA1 |
| 159 | 1464022073FC75D00717524BCA9F24FFA302DD23370FA2862DC8D2 |
| 160 | 2C0693F00A21634EBCEE2CE46629E2D0A09D204C477F70DB5C0D74 |
| 161 | C2D08FA2B150A7211D15D100BB39E4DC210F66B29852E94F5AD660 |

TABLE 3-continued

| Index | Midamble Sequence |
|---|---|
| 162 | 2D302352E2C40CF2D9E5873AA44C9FDD4876AFD9D4645700E61343 |
| 163 | 9B35AA8F91EC09C000DA8267C363A5195C0F5A7389D559233EA165 |
| 164 | 8D3922527D54879184E410A161C8CC8CE4AD824F156DACEDBCB0EE |
| 165 | 00E198B75F514272C39695493C448E58ECA54C9BB7460FFE81085D |
| 166 | E49F4A3E4A15163053B5B836450D57080C27ECA1B4B78F63C67723 |
| 167 | 13673B2FFA11A040803B6378B85DDE18AB7DA6F8A21AF27580E24B |
| 168 | 4157506B51B0CAD95C5108A01A74F52C4A9B9A16CBC9390DF7F481 |
| 169 | E9FC49A01602A5684490DA217A3A7D8126EBAF3FC22E18327A2833 |
| 170 | 28F8C07E9180DF1294D6A02951E22DB6B82478B35DBE5CD090AB06 |
| 171 | 0C9A506BBA83ED49521070EB0C4BC42B1BA30676ECBAAEA4F9FA69 |
| 172 | 59169CAA1DA45444FA38C1A284F091916E21559F5F31F983F34AB3 |
| 173 | B8F8459FC31A25060655DE24CD0BACF5C1DE9945CB59F092442D01 |
| 174 | 409CA8A3F7532C4C833E5CD0035BF59D582914612F0BD2E73CA615 |
| 175 | B05F0413B1985AF82AECC034609E0326304041DB8627EC3CD3D5EC |
| 176 | 46479D30CC0A99D4B4595AA92D142BFE95D3E033E4D1C45C714176 |
| 177 | 20FC554C40640D46A69DB648217B44784F50238847B870A5CE3F6F |
| 178 | 2E10652298079F924686898F00DC9D53870A30D371DF65EF1750AE |
| 179 | 41B8378B9A44B36081309B9873A551C723834FFB59E5ECEEFA8026 |
| 180 | F10AC1332C72D24B4BF35EA2A2083B189F8AA44298E8CAF56376E1 |
| 181 | 5A9E815DCA31460CABC9AA6228FF2660102106DCEF63D329AB2B39 |
| 182 | 93302413188A65600D8FC46D7566B407EA3A3AED78C78EA3C63B17 |
| 183 | 997F788172D7075B67089023A923989E99AFCB4AAC3173B08902EB |
| 184 | 7738CD547C7000075A972C10DC08D6DAFB4AEC07E02F4F4841934E |
| 185 | ED270A2DB802342A55160FEFE8420E4467ABBF02CC4C453DC56B0D |
| 186 | 759120967BC604F117907C3D88625364A9BC25250F5E06FCEB53BB |
| 187 | 2F94E066E9624A21098E56671BBE01AEBD49560EA04E87BF44FAC0 |
| 188 | C51A0646110FA5219AE70C648DDE0DECF7D09AB48380203D3F7A83 |
| 189 | D24387B249C7A091909451BD4D68D841BFEF160DD12BCC7CDF39D0 |
| 190 | 845A608B12E1351F9520764417C2DC6024EDB7B96AD546D48AAE74 |
| 191 | 8910CC0A11C5B9EA458B1B22AD31BFF5A4BE1B784CE32C0A681839 |
| 192 | 7A9A324D4CC3604430F7ABB42A0A4BAB216378749339C97B4426F9 |
| 193 | E5889A5DB71DC1201983025978C1B7032FCDDD25A8A92B3432FA08 |
| 194 | C005CD6D6E2C98B18653203C6CCC07E81388E1F189A6BD4AA4DDB2 |
| 195 | 9020481769F17425C56590D2A98E97B2FA40E3270ADE5067B02342 |
| 196 | 93E7029FEA8DC268804F10E35918F163D7E62433B9DF0072D2B61D |
| 197 | 16165AD5B7E060403D93B133B33EC19AAD235887085E2D870DE717 |
| 198 | A12401B25E3A1372B49FDC471262C6F84C1A99F110E6F953F6E383 |
| 199 | 1DEA61994FF093D26042F1A827CA8AC1A3F5398CCAA6754276CF0E |
| 200 | C8DD02446BF3A6047A53337D2EA3A741546F2CD279E672EA8EED9A |
| 201 | 218C7020412793E89130EDA2F3E5A7A9B868F450BC41DD3B13AA45 |
| 202 | 74D5529C12B7172982D80E22F7C0C5FEF17648A56E0C60FA005F94 |
| 203 | 88A610019053B035768A9C959BCAA6EC7D21E10AC47BCF71B79C19 |
| 204 | 515F200C0293E45BA621E6A64B50F250BFDCD070597B33A09A85A4 |
| 205 | B904DD06DC12382791D9229C1F32951E0CCED8C779747C61C92E3F |
| 206 | 8850C109866F227C30355A7D64A29D38E39E13B8B8A835A87D1B48 |
| 207 | 50259197B1D122344AB2FBA6C83D707EF2967B4B82F1C1B5852862 |
| 208 | ABA3A3846AEBDC25ACC020258E476F99B093B59A16AE9251214196 |
| 209 | C28A09B7231E80478CE197CD94476628841FE2045E566D75F5BCE7 |
| 210 | 4836418228374968CABE720A3C3F27955EA587EBFAB036290372C0 |
| 211 | 59E39288D06C1C8084B0ED932A47031007B5ADF8BC142AA155D781 |
| 212 | 809198F2B14748A4244C35D2EE9813DCD083DF66ED34781E2C2847 |
| 213 | 6CC548BB58D1C41B2058301245173FE81152811FCFA0F25B0D6363 |
| 214 | 0C984F7018950E4AABF3D6D1D822504285E6F126F602EEBE1B967A |
| 215 | 8AE262695328D8998CC1DBD9C0A649F0DA9350C7411F1EFFF48F78 |
| 216 | 6B2C10AA3A1DEE50CD320329024C7E5D0EC4FEC880F7E7480C5092 |
| 217 | B04DC780A6B7E694F12D660A04450315E69819C6CE3BF6A968CC94 |
| 218 | DA8430418893B30103605F64F15CAFCA76EFF0843414B2573936CC |
| 219 | 9E4A03F4439DA98F24C240F8B4866C622BEF0FB26CDEBD32681DA3 |
| 220 | B3CA0E89C011400C785AA7B543822DA5E65F2B220E7B9847012DDF |
| 221 | 66EC81C1930CAA0009EC471F972EB5FABC2CA5C537B5B98F70D682 |
| 222 | E2245C8CD453D303C59A8748228AA7FC7E5297E90368691B8E0806 |
| 223 | 0CADD0D3BE06F8E0C12258CC8B0EFB406852CC351C957729BB6F0D |
| 224 | 097D6030091916DC0B1723BD4A74B719345C1293B2766670C3A1AB |
| 225 | 78C0822012F1FA05EA4D5B18975A5AB0DE535D993E4C95EDF400CB |
| 226 | 14041B891910614D853BC9BAACECB4272BC41EB713E5BB17DC60CA |
| 227 | 3855662E4152CA2CAE911AEF5C23E71E9D3111D09FE3F83046016C |
| 228 | 70B3875B3024AD0645D012E274C5BBFC79ADA7A214A920A929D623 |
| 229 | C42407DD6CAFA30044698A6586A929724D3930EFB63FC5478B9023 |
| 230 | 4608AA3C6740819A817ADCC40B3B24AFE8736404E6A64151B3D517 |
| 231 | 7B50434168D15190CFE329001663B912A99F51734C836BE45AFB44 |
| 232 | D10C58E0488E51F85880AEE2D3BEA3B496D07913A38D2EBE93A1B2 |
| 233 | 094D11AFA079848063D740AD25A30D2377991C7CED3B3158A114FF |
| 234 | 1AE6FC57C1AF7270162436B448017D9561509B0543CAD5D6DB0A4F |
| 235 | 878AF7BC221058BB76D406293AC4CCEA88DE6967E35D3C399C0FC3 |
| 236 | D0075C2C48E339AC2CDA49AB4C5987BBC16E632028BBAA76921EBB |
| 337 | C9720E63835588AB9B332894281D71820CB6A81A9BB071713D95FE |
| 238 | 1C468B587518CBE00FECC41A489265CCECF42C5BDA5EBED540F352 |
| 239 | 957219A404918662363CF1552CE27B64491617B1B50260B7FD3C55 |

TABLE 3-continued

| Index | Midamble Sequence |
|---|---|
| 240 | 8A286356422A6596FBA47014836023EC2FC60993CFF968DEB1B303 |
| 241 | 5CF34D584C348DC214F42030A2F59E96064774050975C2EEE9954B |
| 242 | A22003CAE8D1D54B4444311A81FD7C9CF4DB1E5BA01C58B16129C8 |
| 243 | EB0A5C9C9285E843EA5730707894DD54F32B2118A649FA4F23A5CC |
| 244 | CF8241ACE91144426B0CD592F5074BA338AA086DF30B67E14F814D |
| 245 | 302B022959654778C87755368810CB9FC7FC8DCD264352BC5C6B0E |
| 246 | 747142D2C3F6029831AE562F630338CA25BD6AA271F2610D85F226 |
| 247 | 180AAB217299F0D90F38686A5F6DB96B6D7947C38180BE13510EB7 |
| 248 | 037400A4E3B39205041D6096A97A500C6E103779995DF2A1D41B66 |
| 249 | 19725BE13BB0A5305034F51A148CCBC24986B73A21B8A11D4163EF |
| 250 | 600DD139A0311530C77F05CBE0593B97BF592A47391A21C4071594 |
| 251 | F711DE14052303101B003E15A3991B161E7B4D255A95F3A5C04FF8 |
| 252 | E682A632210D1B61D911215F5A7BC6A5E73D24C28A44323DD76C2D |
| 253 | 3A0D62A15CCD881600B485E7661D6930A2F1CC7B349B15570C03F6 |
| 254 | 11A8997076269000244551825DF8C8CAC0AE66F0689FA53EE835985 |
| 255 | 1F11220A0B8B02EA2657C74A4494049E7352858759712CF93DC0FF |
| 256 | 5429C81E411863CEBC5B830334D0B674D272557F8A7E0A2C7CEC42 |
| 257 | 10115F6A9DC314E2230112FF4169DB572E53CF286B69EC5F3A3E83 |
| 258 | 2E4D1FCCBC00A5380FF3B830E68A0F6B85914A5696775727C8D540 |
| 259 | 2418958880FDC81639E99117A2597B5DC4E585E0F2A9E4A6510FAA |
| 260 | D3CD560F88D29F2A8C697C09044B6061CDEC7F8C24428EEB52FAA4 |
| 261 | 459214619D2A5D4964E4E10DE4ECB80DD949BE3D843382266E31D9 |
| 262 | CB505F2144F4FCE6453013F1444E2310735F36A81964263BCAE65F |
| 263 | E0341396AD64A44EE910411A3A12A08E1855FF74338ADE38DC33C9 |
| 264 | 39D7A7215890534C8B6C0E31D24CA892F08583A0A702697E757BE5 |
| 265 | 3D0894E725D5CA12F7846CD0442C11F2521AAAF98CE7BEC2FE93E0 |
| 266 | 2CC3448C41ED2095391594AA46D5C1DF27FEAD2504691210D5DF8F5 |
| 267 | 28F3A861F01A95CE4836175C89AC1134B411AFEF70FCF0871B177A |
| 268 | 93B73B9041CE7520B506888221E26F2FDCCC30EE042D5C514BD2570 |
| 269 | 47A4A6F5097D6C689001B72E18A9DE50742B4E46EB3A3BBF20D164 |
| 270 | DB1A8F5680CE1400A3A6E9C2655EC43FD055E8F81ABF5AF32C3021 |
| 271 | 8A0E180C45DF1F80EAE480AD2C2A73DAA1CDB77E2D1B242AF43F4E |
| 272 | 6C12D3C370A8843C83F21109FB023EF8A3B20B5E773E1FB9240AC6 |
| 273 | C031C5B11A95938415C143150363ECED793482CFD40E7F0A1914F1 |
| 274 | 382A958CA9504546580E31293FF25C8903E26F11245E7A4497BEDC |
| 275 | 1DE2A5222B04C33D00457A1F226AC0C369D4D94E9C5A50A13963FF |
| 276 | 57356A0E3330C86E0C1C2B91559682F88DB1CB59ADFF0C0ADF4A5F |
| 277 | 4709B87301309508E0F6B48B69ABC46F91728E49494A933EB78507 |
| 278 | 3AD201ED1AD5C53DA3C4825211E3B9A8F9230C192E65E6E46C7892 |
| 279 | 721A48A0B20F19531A2876EE83CAD434B272AF280FA3642B2F7267 |
| 280 | 220ADCB1D21D712028D603E31880512EFAD3FEBD26E5622DE45581 |
| 281 | 1C51EB1AD36BE10B1A8C8104032D00CFD1F8F71978EA8293A355C9 |
| 282 | 0320E9C444CBF7CD22847209E9AC21FBC4B7AC82D2D9B8960B51D6 |
| 283 | CE7D12D360C4308124EA22DCD1C3C15A32322DA2429F362FB1A3AD |
| 284 | D6AF1634710555240DB63846E0683F375710C1EBB1CF69C0F00CCB |
| 285 | 95D8AF4CA60CCB98821A8289C09926E0F2FFD65A428703409EDAAD |
| 286 | 2C5884458D3908FE8CE20460AF9BB1AFEF4CA1FE48A8D0A2A8AD44 |
| 287 | 9DE21CE2862191C8452E3C3A0D209682384EE8DA7CEED15594FD6E |
| 288 | C922E4520E984828B44C252F68E61E51B62888C521FBC2FD293BA9 |
| 289 | 5A1EEC9D1087D25116D5E0DB0A84D472F5D8EF0C65F30B6413CCDD |
| 290 | 0310E04735F20DF4123BF1FA9919C6A93EE1FB70543F2911155679 |
| 291 | D0F60E7488284BD0964BA2111513BAE33D68174D45006A55E7F796 |
| 292 | F18F9216EC50E34233AE3055BC0FC94235DBBF9064827D1D174E6E |
| 293 | 0689AB22D1223F47CE0046123D147ED4B3D8F53527B9E91E94A9E2 |
| 294 | 72144874D21A0A4D8D8AF57CC91CFC814E89CEE1EF413CB650E2FA |
| 295 | F8CA2F5439411A10CF42648DD560857FD286468CAF09CAC3EC985B |
| 296 | 8C8822CA553C5707D4F790838BEAF2CD74D1BB2B15068359874E06 |
| 297 | 8119BA1852E5E96C135020CFC75051D825E6DA3D05552EE1BA62D3 |
| 298 | 8E4E7C92A9FB1C4B206B6E1027357C95710A7C2AA3ACA1C1733BEE |
| 299 | E323571DFE70912C10159E11446DA670E1727CDC92C9780457E999 |
| 300 | 8E80A6519AB9C120855D317E06C7FFA62C686D02C52B62232F8625 |
| 301 | 3E3231C91FE5C1006A2819C4B5A45C04EC3F24ED5051D61D59CDFB |
| 302 | 045AA488F151D1A4F6B272486121BD5B245C1BF8D71DBA255206B4 |
| 303 | 2AA8EFED437810D9D261121A4103713ED439A60C4BCDE2B8F6DF44 |
| 304 | 84262B9632520AA892B709118C7A9F389EEF925611D32AF2E068EC |
| 305 | 829B69A14905EAC9C28C3F0D899C86609D6852B3BE25EEC236F182 |
| 306 | 4C5C105BCF7A893D0C1BE65C04979B9921BB8E8BE01031A14AECBF |
| 307 | 9CD0D049C0F44AD64E54038EA3809B3FF0568FDE63D14AAE19A6C0 |
| 308 | D74A22C2DBC5058F3355A0487C050B415A19A233BFDD97CF50E718 |
| 309 | 662D040E8B035158D748AF2E608C6ABA53A47FB3D80B85A1C811B6 |
| 310 | 8E5A9A2AC942ECA91C989742AC0CA87C52E1306120DAF51E7DADD9 |
| 311 | AA98B999296410E7287D80C2371B81A354E3FFDCD240FBA4C5C9A6 |
| 312 | 09D46B6A50090701352673C3A33BB882533782CECFAF8361F907B0 |
| 313 | 40989151BB0E87E0644056D7C8ADE94F94D0C0C3708178ACD30F5F |
| 314 | 94722DD0600DCE59E4140D0AB825FF02BA5636653C695D6D01234D |
| 315 | 50B9C291C9123D6368AF020FD909B615393FEA35B0FD8A4F678202 |
| 316 | 7CBE32A2B0B7F197914030C80A468713F2DAC5A5009F61E2CC9A9D |
| 317 | E05A2BB4A5AC4D5F05090E1941879219AD8CF116E7C0666B452F98 |

TABLE 3-continued

| Index | Midamble Sequence |
|---|---|
| 318 | 56C0507AA80FBE2C4027B668A8135ACB2EF4BC362F307611230C5C |
| 319 | 1DEF4130D0F5C411B0B719C71A6CBA265B9120AC17722CB6F93133 |
| 320 | 3B27600A9A19A38C9928A6935AB9F6830C910480E3E2F3FD891D45 |
| 321 | CFB65170050941689C356B8CBD47DC0A8F4D1F4AF2BB9E041B7217 |
| 322 | BF0E754F80501A0263A7A242D8745ABF6CF2449D1CF2D9B14BC0C0 |
| 323 | 3A1990783475844254908A7F15F447D317B1B34186FA3CAF6C8507 |
| 324 | 157A6746CA0D690B0186DFA41CD7AD268EAE611E8493253399BA95 |
| 325 | 94ECE911ACC204AEA9F226A3C4C7AA8A35CC39233C5C4FC844E859 |
| 326 | 86D487F8805139C9CC9257E00A5082D8593DBAF52299A363B60F9F |
| 327 | 82F567B56F3C25500068A62E0BC3B2766090F5D9A15452CCA74147 |
| 328 | 4433330961B61020F38D1A6E2BE990ADFEAE251D226059CBBAEB25 |
| 329 | E1CAABA74242A37DC6BC51A1500C64D78B5A7BE4CBBC0E420C6609 |
| 330 | 12F5427C7354405C53A5C4A094D13CE00A4B6FE260B1751BD0FD99 |
| 331 | 2581367532352646BC9C090D7C08A32D5FE9D7181474187BE943C8 |
| 332 | 8382045A13327E1BD3AC9E2619DE9228B1DCF20EED66B097EB8A37 |
| 333 | B2A5242202A9388DAC563A8514D1B780E79ABC1BF0A2716067783F |
| 334 | CD0A5E78B8046896F2C6C162CB63BF7C9D4BF70185542421DD07A9 |
| 335 | 69970225D41052F1615A2FB3B080530A7B1B64FE2858FC66B62795 |
| 336 | F7A0AC200B0970F0AFC2229A0B9C531D05A6C663FD0AAB1459BE5A |
| 337 | 925204BD640B81CE2ADD586162C79BB7C567203B8E292CE72481BB |
| 338 | 072AEA5382DDA1850865B47C25BC56475469058C9FB47A20554DEB |
| 339 | 034EB9C0F80A4745E69A1C282439A723769393DAF6C19A3882152B |
| 340 | A488C640DA3BA18748175C61607B38F43D1832ADF598DA66AD8EA0 |
| 341 | C8F9692E425DA3919A9400B53D0028ACF554D66EDF3BA687227F86 |
| 342 | 245E2C6689584E8E94900D698346933BAB7C06B029ABD930FEF5A8C |
| 343 | 677869132C280B10A5BB87657B2982F973EAAE90E10857A6928BB8 |
| 344 | 7655894A87316875D307184692415D1C410FA1EFC0C8E2FF51C8E9 |
| 345 | 433EF72ACAFAD1B152004E3214C8E45C207DB79C357671F710370B |
| 346 | 02CE416C03BC340F90F56CD02E52C4D6C7C8DC9C3779C444107569 |
| 347 | AF5296D89A10167D44263E99030DAEC928523B39D9A78B7B40E395 |
| 348 | CADCC12A0AA2FA4CE4F70B25424E2324B9477687FCC46AAC4F3C87 |
| 349 | C5823206AB15573144F324C04AD78B121B59DC5FE1BC058D3BE085 |
| 350 | EA80C4B58908C691164B5A69F39629B2DDA995B969F831D8C381C4 |
| 351 | 07086A01EF300A956FDF588099591E80DBD3DB8BB9748462E9AB3A |
| 352 | 6DAF10B1202990720B8BEF1085D81B20A92C6061D3BABDA25752C7 |
| 353 | 53BF2860CC9D1B4054083EAD4F0433071A2B7D35F9E03444A243EB |
| 354 | 6641C6072B0D20EF86AE30D70C67E1EB224F70580B92D0CD789D36 |
| 355 | 4056652FB44E360027399CAC405A39571869E31AA24B93B2E5DABA |
| 356 | 24C74B068D12DD6353C499B9E10CE1D07B8969E77F01B735114E246 |
| 357 | 43A96D007C90CECC2153322B83962182F6FA26A432A065BEFAFE90 |
| 358 | CE414F4F62BF08C950E281560B2694FF6480E2EAB7AB78C4468981 |
| 359 | B47985508CF4643AEC40D3A04815968150547568FE275CC776D23E3 |
| 360 | 889A1FCB3C12270911E0F2D54E04C279C6ED2EA07B421276AF1B76 |
| 361 | 47F315680A4C4DE3124D0345CB538D39243FCA9E1814F1B43FD31C |
| 362 | 20E165A427CB2613994509D2EC63B541A76B78FB88B7033A1991EE |
| 363 | 79C3AAC528343C524D8128FD130E518EECC4B628B6D42C08586FEC |
| 364 | 0E47D8080C5AD396985C880CF212CA99E6C335365FD3218ACE88F3 |
| 365 | 2830A003E8DDC9322D437818B49458342EEA88C646F2D770DE2D83 |
| 366 | 88756CE70601003953848AB9ED2CCD55D111C93E606F606D2136E |
| 367 | 8E721A63666100810B727693D0B26FA26EFEA15B1C3CBE1C26C2A0 |
| 368 | 98AD336C1379E08204D746208483B416A2F08EB30F6C85CFF6A473 |
| 369 | 253FAA71B70C01482DD188A2264D1B664F27F54381C50C41A8BD3A |
| 370 | 8F2D36CB12C8883D506A63014539CF4B6140FA846987D1EF29049F |
| 371 | 34B623600412E0C161C967AE1BF452EF18589A8AE4D5CC41523CFA |
| 372 | 85F4F5BEE22D10103BE0AA209502F1F193ADEC3A89E2D235E0C476 |
| 373 | A056A4D58430190E6C2979853FC4C3E854041C93F369F23C31EB5F |
| 374 | 709340504675D2C0171C63E6A130EF892D56C051AF620DAC7FBD36 |
| 375 | 4181739C808F58F14229B94AB7D1EF96BC5898EAAA69F8E20F700D |
| 376 | E92CFB0A82CF24B4204F80B3336B6BB960AD13F05804CC2AFA3DAD |
| 377 | DACC531A106F1622F0A1802C0967D24DE30FD20555492AB22BDE9D |
| 378 | E486BE0C83F54845823224D43D5219A57728DB8F71713B69D65058 |
| 379 | 39CC703157357D09554909306A627168937D4BAF81BC385B96F91C |
| 380 | 8A93F40A946E304CF80A5174692ECE537081737E968AB8FB2CE5C1 |
| 381 | 020634A0C58C46E0DDE6200786BF3364D8E1C9FB0AAEB282A969B3 |
| 382 | C548921118D084B65A540CD0B2F90057ABD823DE75C9656B8C445D1 |
| 383 | 278381A2442B7697097530C0D2DA4DCD172074848869ECED791F71 |
| 384 | B93E71C1C09BB205AAC089845E3D29671BE14310CF63D550C8D5CC |
| 385 | E961E024177669635A44E0522A8F329091CCC917AB07C47DF609A7 |
| 386 | 29473A8F7675D90E68292EA0A07B2A07827D039AA8377F5EC9C9DB |
| 387 | 8284AF8F608E06E151E148939B88FD8154FAE692D1DFD8859A2622 |
| 388 | AB2D4D1223536405271A490DB211C6346B83F55E183A7A217B3D8F |
| 389 | 206C8204A771E7B1D8F451F48764BAB30F1E25FD1B1A8BBC269071 |
| 390 | 72C3604ED08BC9B7A9356931B91792F9A00848AF5551B6E72838DE |
| 391 | 46422C9072C1FA7425DA69C23B311D6D0DE1B6B9EB1757E2090A18 |
| 392 | AAC906B98C4431F08523C5B59B07462AE3F3E9D72CA0FB8A353A43 |
| 393 | 013E8F24A4F2F68FBB97142066569D3ADDD0F44FF51826B43F1E2F |
| 394 | 0EAAF8C3E05F18CCA390E441B4A6CCB73A4B9E7BBE1505AD7895C9 |
| 395 | A0934009A9419F5C540E6AF13A19CE698C85C1595991FF365D2F80 |

TABLE 3-continued

| Index | Midamble Sequence |
|---|---|
| 396 | EE06B4E210963EAE104D50B60742B2881C739E22DF986C5CB45DA9 |
| 397 | 24581211C1559D7B8AB982326146D1E88576EC8442F26907FC0F1D |
| 398 | 41288EFEC0484C6E03289C10BBF8A19E069A55C759CC1A9FE0ADE8 |
| 399 | 12702DB98B66B88CEDA0803812C0054AF34DC74F23111E36A8FE87 |
| 400 | 916B854D65E4FD48161DC20A223A23C2021BBB3DD7A8822D7B9A76 |
| 401 | 3ECB28058C62C046A9887FE08D01F682A79B9CFB2AA1C1E9C8B3C5 |
| 402 | 4207608263F34AA68D7B77481EAB93045223BC13D4D8D0D15EED75 |
| 403 | 523E40376EB334CD413900642D627B3CBA8BEFD2D3901D39718344 |
| 404 | 11DB0C5B6A26E1E8E2266E14C22F0C6973420BFD2A9C2355A82BBB |
| 405 | 936437BC188419C2192ADA13A7010BA511BF8CD50DCB534DD1F75E |
| 406 | 45D3B981820CD4AE0A1BD85359297C3E3121167A462AD1D204DFB5 |
| 407 | 281997E5BAB5291B520B5CA6445E01A6BAE4FAC504538534A68BDD |
| 408 | 48B2E57499C88386D0EF003FD430B367788EA5C7B4CC6940308B51 |
| 409 | 8C0AE505A6BAA391C24CA0168EEA3D309C1CFAC5D97AC368EA3A46 |
| 410 | 15181026D54A4885B31CEABBF8D7283DC861C550B6BF2B6D6E5429 |
| 411 | 56C164D09DDF0A1D94854424260182DBF8554C59B42309D80F91FB |
| 412 | 490A518AF5A106ECB0C790462AACD3A487E1FEC7B72246051BE815 |
| 413 | F548F5CA5EC249881862FC0F02457D8BA38348CC29895670237A8B |
| 414 | 083AA50133A915F645D288681E9286539DB1E76D656394C24799B2 |
| 415 | B6BD564D04D34EF84965A28000290767C4EDAC846E7C4EBD0C6B3A |
| 416 | 2560E3C192F132CB25CA98200416514677CC40BAE14AA4F78648EF |
| 417 | D6D39C4954F9D6A41520E38A09D7FC2CDBFFA407D25E5D3A52540C |
| 418 | D1C044AE4404F013FC4F720A65BDE953DB2BCAF80D8EAC03B3C6B1 |
| 419 | A982C1CA1C9EC6DC0C093609ABA38DD4DFD79FE3B591247289 06B0 |
| 420 | C50911AF18083E5B3263636884B255A8435F23EBDC7771E12582BC |
| 421 | 10803930B2194B6A67C61D916EDDD3F98A2562ED86A360A302E39E |
| 422 | 39649C8B1B94A3ACC2071D80F28D911E7FD8148AA9EEBE57393C0D |
| 423 | D1D4E5683A84F182A899980934637E17B372C0C4D3A1AA592994CA |
| 424 | 3D1776241DCB000E4D07163218E2DB72BD3FA3F12D0E36516473FC |
| 425 | 898B5C20A48AE799074110B71CFC276917A0ECD5DBAD1F89026457 |
| 426 | A29406F849B070EC397899609B932A2465F6AC61976B79A4253E0D |
| 427 | D919E809918C41083457615CBE19761B5EADEE400CAC2DCD9360F6 |
| 428 | C3C84CB204E51D1BA9E6AC02A11A84E28BEBD898727EE1825FC21C |
| 429 | C170D001243C7568059413DE3A9F93199F1C126C2C6B5232126BFA |
| 430 | C14873CE321B896167692B1D321A58F0239F2074CAA662A8DF36AC |
| 431 | 3636C2447BA8C13D550E5215F381707154B26A7F72549B7272F12F |
| 432 | 5132508A928311C3F44817F8E731844F29B59B1A5F9E1A7A2045C3 |
| 433 | 3069F421391668B336C007703F4E1D65F79791E7D6D5131C80C1E |
| 434 | EEEF8920223868477249A14EA2690FF20BF44ABF9285C5C50CA2D2 |
| 435 | 39D073C7311529F3893C83C7402DBB0E9F8D8647D19A1746FA80F2 |
| 436 | C5B035E163E0D7010B9C569C624065AEF40B5D71640F5D4F8760AE |
| 437 | 708847A342C14261F707DDC97E6853754B06B1086F3BA025C24FF51 |
| 438 | CA1DDE60B78983FB00D0882021B7616CAF2B0BE12564BA43AA7EE3 |
| 439 | 6140790D5A43C8196E1D3A24977DCEE31543856BCC8C0BFC4327D4 |
| 440 | 96937D481112D51493460AE1E36708740DC4DF76E6AD4C860E7778 |
| 441 | 7C439EE250C0C2BE05F1379826A0DB89206DF685A3383A5AB9558C |
| 442 | 1EAF13C24454312E6FC00EB04B3AAC0BD2F6DB2F1B6EA8171BB029 |
| 443 | 218029E52225DDCD924F850236061CF0E6A83E4AFFA69DC174BF05 |
| 444 | 6E241B3180150BD1344651AE38F63904FD209C24999E7CA6F5ABA1 |
| 445 | 988880AEA4A9420D4F3E8B0F1196DAED98236710992E6BE60C14BE |
| 446 | 29888540622D37F9353023594AC6EF50DC302D7CCA59C93C2C9F01 |
| 447 | 00699329D0034D8BBC94C0D5C0C91133A1D87FA6677A2C9285D61B |
| 448 | 2C712CED4C713B3A844C0918D78751FF6B812285E51F5426AD10ED |
| 449 | 80AE4CC84CCBD9AE9D065F03501A3C290630E17FF2989CF3EFAACD |
| 450 | BF021D4842474B3A4FA9644A28A4D7924107A538299AD8E57D5CCE |
| 451 | 2AA1E102A1F4B99C37CF478548176E7B453DA0DD0B97E4111461ED |
| 452 | E0F30FDA0EA73A6D409948206258679E5F1B590A81AA99F523FE90 |
| 453 | 0806CA3ACB0A43C0237EA13D12532210E59C995BD5712EBB20DD8B |
| 454 | 70EE630017B88892D3D66645812A7A1D95F273C6AE0701C2AA55BE7 |
| 455 | 659670D50C3B21A3972F84062E01A5704EAD641D6272D8FD5133A8 |
| 456 | 1C4B408475852D8E12C57D1BB22ABDAE434A33DACE4B00ED55801D |
| 457 | 31B231783CD780211C0DC6EB21E106FD26C8932FA6A4A5BD0E1AFB |
| 458 | A69B07C63A4F63401878F1120AD737527C4ADB6772A0104B988D4E |
| 459 | 6532C28B900E458241690B57EC372ACFDD1BC9A029B0AE4921C9F6 |
| 460 | 341E5FA8ACE39CF07548210464771A69D9D3F04552E67A604AC4B |
| 461 | C8A4A8C4375B2348AA7855A465AD56DE74CBC3BFE3C3A09E018DAA |
| 462 | ADE14028291F5A6566958320166A5814E139F983755D660FD7D9078 |
| 463 | 613D82450425D71A0785D51B91A76E6815B6D590332BC31779DA4C |
| 464 | 05518C912B8087324A7E8F0E3485B884E70830697DBFD9CD8C5A17 |
| 465 | 89B06361CF42C938CA008563E2D0BF5439FDDEA30AC51FA783906D |
| 466 | 8D200E2341EB78B15124E75824AB7BD491E37D53100E84CB176073 |
| 467 | 3D5A095FC0DF849D1BE910432353D6AAE8402583DA7F0DDB4D5C66 |
| 468 | AB167D27090EA96004AA805838D50A5B60C271321FCB8A7745F109 |
| 469 | 095723191E7511637B4305904B8574E1EEDC8AE520A32E46FD4B19 |
| 470 | 10CBCD142743F4BC4530E033D846167C0F70978C4CBBCD50927FA7 |
| 471 | F62A6B8D9B0B16A8E0167213E309CA46F960B1D4D418A9F1B9908F |
| 472 | C45304583125007D22EA843A7387C6034D95BFA3577A0C5138DAAC |
| 473 | 07AA61CED807354C48B0A7028B65CED500CD9FFC845C731E5972C1 |

TABLE 3-continued

| Index | Midamble Sequence |
|---|---|
| 474 | 46C43F58B587245920F698ED832C2E6608C205DED70C61979BA2B6 |
| 475 | 53E27095822514BBC1FB02CE80CE51E07DFA50074D84828D9D9BDC |
| 476 | 1FD1310001BFD1FB88A5863484B2EFD984DF7470D0A6453123 54CD2 |
| 477 | 23E24154B327710F0383144197627B5DE329DDB8A4BD03061521B6 |
| 478 | 86B583CCDD468A997014AF0E2AAE1F7886DF243CE63066768CCD0A |
| 479 | 219C720AE3EE86912D5C610D18E6DC4D32556C65C0257D16839761 |
| 480 | 2161720C4AC12E39813E1B443D94065B46D1568B0DD5666D5F2A44 |
| 481 | C6CCF946051E3404A753063A26D91A7D1C611790CCEC2BA13547A3 |
| 482 | 9661DC0C84891A236D17295B484071B7538D37031DE734AC1D3E93 |
| 483 | 138CC6901083454E89545F1707B2767B2D2E1BB051EFA320600FB4 |
| 484 | 99774356E36C318823465227824A826C0371297F1ADECB0A4F59B0 |
| 485 | 9441C82240EC11B588DA19586E63B26066B25F92B17C65FAC30520 |
| 486 | 668B02E9A22125530F2A225E0BB2953987A8BC7EBD96E52ECE019D |
| 487 | 825225D1D9D25F4F809129C111E89E307274FDE6411BCEE2BDCC2A |
| 488 | 5B4A0326AF19906FA380997609886854507F39C250C65ECCDE167B |
| 489 | 521D510F692047D757803B92E665A80A30A59C4FA51F3E7FD320C9 |
| 490 | D50F704A6E0814BF92857EDB164B9AAF7230FC59D8600D4E165346 |
| 491 | 568061141F5A2C1C70B5881D55F46B3B47231A406CCC53A5F7F8F3 |
| 492 | 823C520AA803E89DAAC4B04B853B2118C65154C6B07EDDA5AFF813 |
| 493 | 0CF93708D7816C2690351C8D5E24708E4AE75926B365F0E3D3A2AE |
| 494 | 25931985F7960882F03431023C62F43C11F302E618FDF82ECD37A5 |
| 495 | A3698E26C81757648521F38A95C6DFECE578909A6485BE21046C3D |
| 496 | 95C40C6B96452E62A7B588B47286D03FF06DA4743C2CA913499E27 |
| 497 | F0641E48073DA29648C2F31ACF527EB5620A29D3174F18C642FF74 |
| 498 | 04D0C109BD3EA90F8411EA681C424FB94E01647AD841737891F399 |
| 499 | 046CB36CD3CC94152280AFB9516FA5C3902A87DA39D0DB99D98F25 |
| 500 | B38B09DE190AA262962045D10E84B0A2724ACB9E966D151EA59B06 |
| 501 | 3109BD25EAA2B20A2F17C40A4E89DF6851CEBD2436748FF5E081E1 |
| 502 | 40F251D09B57228EFF3157001CBB80BC1B4AF667C5645157893CD6 |
| 503 | 05E3D468B008EE5E12B4CDF054E1B58526F6FB4EF545D4C025A766 |
| 504 | 161D9C6809292734F47D0C201C434EA5A204127AF5987BBEABC4EA |
| 505 | 1854CEB50DDB273E68012CC6EE1547A70FA2C3235E26B4FF01F5B2 |
| 506 | 6F259A9D3B20AB84E90F31C08A4B025AA2B21C6CD71CAF63D4170D |
| 507 | 4E23BCF842D405395CF0D5A8B9069F9A522B1C597FB81D8DB5C40D |
| 508 | E179220C9426414D03352E46C6E91C117E214B7AE370D8CA2DB6CB |
| 509 | 64D4542380FA312269AF0ECBA6C405C7BDC9C16F6C5FE890606245 |
| 510 | D4E890662580D93E90E6024F0FC9E94FC80935933AA98ABA7FD685 |
| 511 | E28621485818A77BA11C30F8A265F2869113A0DD3AA0FBECEEE485 |
| 512 | 3227D361110A47848031ECAF7756B80EA807AC949D91EAB6C168F7 |
| 513 | 944D11904FB0A9414A14AC965DBD7D26115B1983D9EC77E410A3F3 |
| 514 | 403739B17A0D22C0B274EB15161808EA11BB3346F85276FB8A551C |
| 515 | AE1AD7CA80157B146079938C090FC623B2166EC47F82EA9F123592 |
| 516 | B467B520048D86838A64F70CC823681F503AC80713E54D6FA1D77D |
| 517 | 86BE81E2696837037AF401B1B7030D319D4B3CAAF97A363CFADE02 |
| 518 | 93C835AF28E751C6837A4ED003A4C68F21E1AEB33796A85589B29A |
| 519 | 08613D219DCB785DE79720201F6D0A2EC5E2A295206EEEF0CF2CE6 |
| 520 | 11AC5381485CA41D1B2730F9167AFDCC047E0964F77D9971A5A5015 |
| 521 | 44369C2395EF0FD5C2023286E8B8274876A9667E1296E0CF7979A42 |
| 522 | 66F97EE4C8099455D280D0D00F0A2496CE99273954238C3EEE171F |
| 523 | 81E01DA8D432094AA7E8D3ED04AD0849A79C1CB4BC6545B58468CF |
| 524 | 3D33736A6224E3AA061F2A8290897446BB0E2D1BF13E788D3D304C |
| 525 | 4CE829C32FE6663381C33D250200D29D9EBD1D6D6B6100AD4DA1D8 |
| 526 | 368D07334116F056D094A086BDC9EF7F90B661CE8A54975448BC1B |
| 527 | 2D6BAC31F2081F232A451BA138ADE3FD985111990FEDA3529E6606 |
| 528 | 6A80C281FA47625A1E456CA2543ABCFD43383CFF02C64A8256D7D5 |
| 529 | D7A91A12041171382B2C654AEE11613C037E922ABB43BBE95BE90E |
| 530 | D0DC40B629ECBC020CC2249EE26037A7AD5D0D178573D1628A870D |
| 531 | F4C1719A0EE5099B4201C055E500AD8C9624FBB1F25BA6768CE0F4 |
| 532 | 03A068A50BBCB939F0C61E16A37B78D96192F1CF29432BE17EC0C6 |
| 533 | 12951024DAD2894124CE49DAE7CB81C6623EB1674065C616BA804E |
| 534 | CAF040DF846C7815505EA4508C50C9726B0ED8CC889D269FE3410D |
| 535 | 9E5060C743F24BCA638078662C87103E3CEF253B1187B81DDED82C |
| 536 | 10D1DC4A4A512452EDAF09C7C18D8BDD2126E5F34FA43119631B2A |
| 537 | 0C85BF883894DFE6229409C4C8A1BE1687DF1B69AE822C95E62451 |
| 538 | 833AF814408454A32C937C9790C8C1E318E99D9E1E4DC94ABA15A4 |
| 539 | 88DD0E068404BCD2C17E013E2D72973E77C45AFA121C96CA270EAC |
| 540 | 786861C74282FB50555A0FB0821B788D44CED425AE8743B6CC4C73 |
| 541 | C74D5C97A11CE7959592B1328C065FD7B488ACD643C5F39067E900 |
| 542 | AD2058C11A4990301956C044FBF1D572F886E2D793528E4DDDE6C1 |
| 543 | 2BC4414D38583DC2403C17EC817ECC371B973854DEEE2A890269EA |
| 544 | FE806A5F063E40461292555C01CF184D3B3B8D70EBC3AD763310A2 |
| 545 | 74C8E0F9EF629A09055119216944A0EE6F811845ED03F65DB8C1CA |
| 546 | 120FCE0AFF610272D1715D899221BADB870B457A3AE09C130B547B |
| 547 | 25044132EF29807CC4950E2E37881019DB474F4DDE5FD4CD6ECD54 |
| 548 | EC6D6A77BC475940004DE0410B386C32C839F1DBA7A045A86BB644 |
| 549 | 214A05EBFD279F0B4A5C058D44A835D4CEAC21AF0F04E9A00CDAFD |
| 550 | 813042ABB804BE00B8EDBB4D21F7AC324A143045E93E2E5ECE81EA |
| 551 | 0C09E90626092DF370B00E9F94CF00AE8835577B775A9219F4A378 |

TABLE 3-continued

| Index | Midamble Sequence |
|---|---|
| 552 | 8F439B526AE65106D782482808152F985F146BEF1C184FE32216EE |
| 553 | 2B268A083E0F8A15B342B83252DB0D67D8D0E73322C5272B788957 |
| 554 | E8F4C28D0A5E7C0024570CB0FA1EC0AACCFD8D2B29611C79D0D92A |
| 555 | DB24050BA49B195078199C228E3D383928E637ACE92FAEE3033B2A |
| 556 | 10B479C0778E6B588807415581583A523681D1BBDDE327A6B69593 |
| 557 | 4995C36805F0648C3A1E2BA4E57091AA86DFB16E39E7022864A7D4 |
| 558 | 42FAD0CB911B8D2A16864B302550468CF61B7EFEA6838616EAEE3F |
| 559 | FE1C1BD04BC144CBA122822206F0266C1D5AAD66610762BA63CB4E7 |
| 560 | 21C90446389606C54A23CAFEFE6B1D65520CEA9E6EB74A1F1A71C4 |
| 561 | 54B506459C56FA06D90730EA821F2745CE3E155B224762069BCF12 |
| 562 | 42034573E387C4C51105508C6C7BAC79B1C431DF1FE81BE06B66C9 |
| 563 | 1AB01A6922A59C24672FD0191792A79E321C850B9350D6EBCE170F |
| 564 | CA27802E8DD71575C84CA58775CF476E460C6A43DB6438965A2CB7 |
| 565 | 821B0488084C83DD82C0F0B4FFE47E7084DCA469757FD0BB1949A3 |
| 566 | D280A6218EF8689D36D0569E1207FA9D697B264F3B118888C5D813 |
| 567 | A9C48CC1779EC4D86114427A5F1026747843CEF05C4CF72AA97B93 |
| 568 | 2FF6640C59013639391E09137352DC79E0721E11682D6F5C57F188 |
| 569 | 14C195BD04DA0771D442E72088653AAAD5B9181194F7D5F248B382 |
| 570 | 44223F7423BB23D068962D4B0343DCF8E8019A75B53E12CCEFE116 |
| 571 | A44E55A4DB1886BC69AB026422139C713DAC8F07D1449172F2BA85 |
| 572 | 980E8509DB22325C359CAB9928ACD7182A0AD49BC65FBF0C09A5BC |
| 573 | 54C91E3ADA401E6F1726467088629453DCAB92876182A987EC1D97 |
| 574 | E21B9A4D50502F9F3CB249311ADB8DD3DF5D41DA16E40903BEE22E |
| 575 | 6192E1C4D10255D6D5644E80AED58C8A45C7A83E2A76C1832B3DFE |
| 576 | 780558518C44E5758811DDE620D4A94C4A4DD1A7C71E681A2C2C1FE |
| 577 | DC37D56C90528A0D752C48216237BB8760CA40689E66A0E8FDA61E |
| 578 | 51A018165772D0C69F0B3B01CB95DF8AEA58EA1916E39D0BD474C8 |
| 579 | 67DFDC730700536545220520AAC2CECD4461F0BB01DEF39E85AE16 |
| 580 | 74FA80F2CB4730A9A61A8485001614AE522E522846C47FD9F82A16 |
| 581 | AC98C96711D42158087CD290FA0E9201C17B063DD3F54ECC91D68 |
| 582 | 5628A1D656EC1BB49496018CE6DF0E709AFDF7E46039B13973447C |
| 583 | DE8D655D3E5790000CF3500F1128AF992DB631D72121F8A1793EAD |
| 584 | 34484886E291D1AB56420C6D176DAF08A9DC0393BCAA6C1C6523FD |
| 585 | BCCD7B311D63C284960A78646A0FDA42CC4238A20FFD7692E15C89 |
| 586 | DCDFC70ACE0D2610742CB82892B0B506EDE4448859ADCE4A5551AF |
| 587 | 9739B08D9B11205C0156731BD4F5243F3F3C0B518EF77977A05F8A |
| 588 | 1864A39694443F450CD3F765272407A2277E997B94ED70DA70E01E |
| 589 | 8EBC29FC11311AE41849792491AED76750A160F1370468D6736ECF |
| 590 | 003472779AE915CC02A305C8BA6D2E704A1FB83B3102F1757F314E |
| 591 | 511F923AA614B4B9B8174231B01F6CB614E1B8463A95CCDB850A65 |
| 592 | 373500228BB48618D9DC12593CC22ED8CA3BC5BAB679017944A647 |
| 593 | 25D62C4D62529070D85ED430AA2FE6A60D9E97EAC035C4928C60B6 |
| 594 | 210A9966921A495D103E7DA8CEF8F3A846E5340FD2FF0748AD1779 |
| 595 | 9583627BC61BB1600CD025E2CD49C5411718C7F4C8FAED2D84CCAD |
| 596 | 9C865D072A15DAC65139540150E59840CC8C9F90B5B5DA0D98FA3A |
| 597 | 85F46801A8AE1562F530FF440B1E1EEA8639E0CB26329C94191E3E |
| 598 | 4064B415332E080638A72775F6C5BB58341D635958792AF03864EF |
| 599 | 93507C5FD3A48C0C6356A20ED0D504E773AC86AD5B89604FFC6E9E |
| 600 | 83D12FEBCCC1CA1CA1044215DC1B4B642EBBA26178C9C8F4A214BD |
| 601 | 2DD5E4210FEE9060083C23E8B98843A8149D540DBC98E2CD7231BD |
| 602 | AA7C0C16E18A959E964430A0430C85EF326A8472FFBEA9527E0A19 |
| 603 | E5A2DA0F7204711F351B15C408392C6918DE71727D9A3B4B651A89 |
| 604 | 1F0A13621F7945488A414E149380A7695B941D14E8FAD247198E49 |
| 605 | 192BC882A7206CE88DC344ECC4C9D5BD6B043872BC9D5045B8A23A |
| 606 | 313BA4C464FE4879028F13E50011FAA6D0402A724D71D87AA7CEBB |
| 607 | CA2585A0ADD15DB1A19A881890239114F46EE7018C5F7E9BE13035 |
| 608 | 12181FA58403C88C78EBD024FF47623C0FE8FDEA17634DC92C4D14 |
| 609 | 2840806EC58B3923DD24F0A786C604E4F74A4753C9445D9BCFD2AE |
| 610 | EC0969B4128AC7AC5C7F109508B894630FDE034C3D6A539B49F6DC |
| 611 | A883B0F21EDC800FF6ED0954402E259EC7CFB955C306505C82720C |
| 612 | FA5395327403E7A20FF0159813035E6B141D2FDCED644A0F6FCDD2 |
| 613 | 7C4925DC35D01542423882E94ECB1AD248D202BAD6732E7D9B022E |
| 614 | 763383057C4FD84483305A2C2439D1357CD5238F2B637623D287FB |
| 615 | 780B268DF390D2B8279A918602478F48652AB2E55445FE27712C0E |
| 616 | B23E1B895E8820B807445E237FCC542D7995736B27C2CD2037E651 |
| 617 | D5C07AD644392628E8622CC9D4690A355034C75FDA19A0C7F1E35B |
| 618 | 91485C3099BC6165CE0A74AC9AE46875D8B293D2B4CB0502079DFB |
| 619 | 4BC85410D59B1E6F432ED14B04A1F315A36435992203B6AE6643E3 |
| 620 | 4C867C5D26353B00E7C03D91A72506C37C1C2B7B26A9EF8AA30AC1 |
| 621 | 0CA0A6F6E089AF3E27F625449A338A9BE42F9EC72C960A296B5C5B |
| 622 | 2BB74F1C2C210814DA9D41F297C33C647ED112DD5E7DC604F33B89 |
| 623 | 13920F11128937E51E93901714C8110F46953463D0E77A85BD145A |
| 624 | AE3B6D5B858E00882B25204B4CC0A0D23ACD5475F0A65787F089EE |
| 625 | 46567428DE103F2E17915C671B024982E65BDB790611F79E88B169 |
| 626 | 3A7446AD89DD0C1AD902483A1E55204F7753E31FE4CD00EA3022F9 |
| 627 | 5C3284996A140C67F55C32B9024AD0B4F229AC69FB3FBCC2032F14 |
| 628 | F500B00D106CAADF32264BF6C64C42A6BD6FA1E0A67275D494C7E1 |
| 629 | 5492958381CFCB52F8762C5AE268A9433027C4E275903FFBEF6944 |

TABLE 3-continued

| Index | Midamble Sequence |
|---|---|
| 630 | 48809A0D2EE59B169CB70FC28C758115A5BC0664BAE924C933FFA5 |
| 631 | A64BC76440D755ADBCEC18E0072E421DEC25D13CA34275689B1BD2 |
| 632 | 91026F360A5A1B4E6E1DF4050749288B14D8FC46321C63A975D746 |
| 633 | 6578FC4512414E7A2415AE2D4C0213DF3CD86D3114EDF3A63B302C |
| 634 | 0115B213E542A0EFC4B2466125235A98F3B84174C582BDB75C2093 |
| 635 | 9366FE84BF42A68D0042BC80855E362371382B2DBB4C321AE389CB |
| 636 | 1260930B3321DCD97A7F19E19808A5D231707AEF4814EE8F14C77D |
| 637 | DB787A4523A94F00C19C460075420E5D1ECB85B777041DD0E4ADAE |
| 638 | 1C9A300B9F0C588991FA72501D238CD0CA17D38EC46EBF20E19849 |
| 639 | CC969853855FD13B241A30B94846F4040CD914FA2E4EE271B8B0DD |
| 640 | 267383DBC8B397F4480325A08B1364844524AFABC095AAD593F5F8 |
| 641 | 1C87A0655A98547B820869DED07DC417323587228BC2EBC34DB07E |
| 642 | D9F23C0184E99D834E6C4214D82E1E41DF6A64948D4F0C8ED5108E |
| 643 | 406316A29FB861DA10DC7C082C1A18585B8A88DB673D7ECF25907E |
| 644 | C00207DF3AA4D258FB32A85B888A075FCD91B397133529AB53C7B8 |
| 645 | 29A8B4822F49D70AC76218E86952862B9B5C0A46B2BF72FB091A78 |
| 646 | 0597514518BAD6B118C5F2823D9708301494B782266C3F3B3DDA15 |
| 647 | E616EEEF7424B1816903C124922E7A25077911E9B846FFE52C80A8 |
| 648 | 83A14E0BB1A3E16964311A419715311D725F4AF99629BD1408E03C |
| 649 | E670F6B90940865437A2F4E0A079566C6484D67260F7A0D28E9ABB |
| 650 | 0442CA46BEAC883CE1A3E8F95C0531779B1D21948B655A48CCF1B9 |
| 651 | 610D0338441762DBDD271883E81B58BA5B743549B563336F99051C |
| 652 | E4CC3292E0A8958AD5E4B218948731CA2D31DF9C8197034FD9C415 |
| 653 | 644F18E8252AE10894FA1FF1806285010D1D138ECFFDD2CB136597 |
| 654 | 8A09437FD22D422181236A969B56A3C9BD7FC01753FCBB5046F146 |
| 655 | 3A82B1F98D242DC41C1ED20A296C2E4E25DF6C887370A78B606AD1 |
| 656 | A0D9E83F5359565C68009E198373978DAFE956E08911733DB709B1 |
| 657 | 86DD4DC8650A64203924D813D51EABA5EC504A160BC3F7D245C60F |
| 658 | DA99F03708C2B934E8C010A49C4A910417DFC63F7242EFE866A93E |
| 659 | C851A72E325099D190C1F1B949AB4647DD83E41BE61D3855C20AB5 |
| 660 | 3EB5781E8709C840A6D2944AB06B07A8911DBF7DA662BF8CB79127 |
| 661 | CE675D8A801604347C619606B412D4F78B22C65DEDD0AB79A1B28A |
| 662 | 68828B8DE1C1CFEB9B23A2249122F83DDE4761BB87B2277B182219 |
| 663 | 9EB128C58D3F041F387C588E60D1CFA092A8B2E69671A34A77753B |
| 664 | CE828354070C74E1248203F7E4AF87785CC9124A7F00BD90E45071 |
| 665 | 5310806ED6F4ACAD20BA398545B593370FEBD1B03CF4DB8991AA81 |
| 666 | 48EC44289374C24161A8B95A73B15C3D8DBE60FE8F7C982741A5E3 |
| 667 | 7136C301DACCD9B98308614BF72E8F69517EA28A50DF835C8C2EAC |
| 668 | 81B178A42243364D44D794A8A943D9AF5F5B4D2CA3005DCFBA6642 |
| 669 | 2A20084E6A111FD80F53C64A156A1EC90BB6C5D9960BAE5E1D8D48 |
| 670 | 814A4C7EA58FE1C2137A920A055F45B06901AB43AF28178999F35B |
| 671 | 249C0639E929882A15064EA5760C1D437FE44A5DF1262AAE40C6E6 |
| 672 | 130C5E19C880A9E2A98F24C589C500C11BEAA5457ADB436B785377 |
| 673 | A0D00D516CCDF9139E11C1084B953E0266DBA2D283EDD4EF2CA72B |
| 674 | 054C282F264200FC13DB4706B3D2C3C88D6B891BDCDFB70D53B0A7 |
| 675 | 12D78E04CDC8A985A7B6A81C82C2688C3728DEE7B845847DBD0B1C |
| 676 | AB09A115D3B8D0D84BA70D4FEB0CC5E378D48DA84DF91C31EEC31F |
| 677 | CB981ED702F923183696C9180C619A6FED4307AC27C9B7CA293B52 |
| 678 | ECF0509ECBA6C100508E92837864FD946478A4793F44653D91A95B |
| 679 | 28B4A9FA175632D99C480B8FC02AC38122461CDE78C26496FEE6B5 |
| 680 | AC884728C082AD390076733F630B6AF740D2079C0ABF1A8F63DD25 |
| 681 | 78EB052B54D5191226422718F62BA9A2CB6E86DF848B823391D7CA |
| 682 | 4321F43002A436487FEA2871087DB86A32ED075281E40A46DB723F |
| 683 | A0F13A406C6AAE805248FAB61E78B719287E897EF1E91D0274D8A7 |
| 684 | 9D1585C9048208E3EDD3C3344277AA4920CAB301C722965A777B6B |
| 685 | BB84C8CB5D1C8DFC60E140B96862CFA4A451FDB75BB48425DA499B |
| 686 | AAAEC796CB6099480103B8B1E630DC5EF018F6A3C02A9E95ED3B83 |
| 687 | 21AB1BB413826255B9314E42C144D670A0B6B17300EDFC762D027E |
| 688 | 0E6110D0E426850F5E3851BA08B36E66C9E62913577585BC348777 |
| 689 | 06838D0C1248831667A0E465FE8DEE5816DBCB0CEA90EA350AF2EE |
| 690 | C3FB066E08AB6E26C030A8099448A65D2318FE03539F879BA4A7B2 |
| 691 | 96333DB450A38444A0605D863A84034EAFEB3B37088BEFB3074026 |
| 692 | D297B391810678141B870DA98C61370F5AA0914A9B6175CFB007B7 |
| 693 | 2787E8E2D5854171C2CC55161035A76ECF8E12EA0557B8A42FC7AE |
| 694 | 5D9E43F8C9F7B21020C42E68F300ADB149F3DAFD23409FB71519F9 |
| 695 | 863E9034124C61ACC9E1382B42D71D9417B860555F8F4E26906F6E |
| 696 | 0DCE30028753C37D0863363DA86FD67056E4AC8A65A2A49926A9F9 |
| 697 | 933AD01DBA1F81C60F024A0D210B79EAF80A1C98E4A7C2B7D1562C |
| 698 | 4C86ED10B0898A294C63E1211BDA582956A88F0DEA0801D47EF589 |
| 699 | 154FAE74BA333A10BE4051C429F278B7D3C9B80E94B202C5EE532C |
| 700 | 93B31B7061D12D002FBA50B828190E781CE650096D95D065F771E9 |
| 701 | 5481117309489806174A22EBEF4E5A33E850AB586DE642A1E72CF66 |
| 702 | 02917E0976CE5CAB81314AAAF0892E22221B9D7270CC0FE7CBCCB7 |
| 703 | 81653B324709C98961321 95C9CF11A5D22947A407E66FAF571D425 |
| 704 | 06CFC8C48B82A082A85F48B1BCA23640334A9F9DACEA33513B9EF1 |
| 705 | 32107009B54FDACEA69ED31098C10765E825D1B37A4AAE083BF5E3 |
| 706 | C5F20056FBAB106293B8B4C4D04D38D8084D9825D8EF55D9949658 |
| 707 | 6730244091CCF0CAF515610E58430F8D249FC03C79031B925453B3 |

TABLE 3-continued

| Index | Midamble Sequence |
|---|---|
| 708 | 1BC1A6974B5A3108886E99D61086C25076B50C11F42AAAE7A6E2E3 |
| 709 | F2443D822CE43C91C753A0E8129416DC76FBBB99AD9B352F402115 |
| 710 | C112531423FC1F4283D6E23907A90CE59BB560D6CEA7873E00C14E |
| 711 | 70EE10D46A238D64A99E6C88B2AF5C5A8D88520FD28B271E469ED2 |
| 712 | 10A5492841C7DCC9C368B5550747D9C728657817FE58F808CF5FC0 |
| 713 | 396DC53A05909A8154A4B030FB8CA590FDC4631DFF502D7863B68F |
| 714 | 65D04344F554FE0A6FA4A40B0666F37AD0C473928697110AF8CD7A |
| 715 | 07290C822FC0E95BD38583343D882248C6466DFFA9C68245FCAA51 |
| 716 | 1949DEC4121FC14301808CEF44B80B93176234E53D06815E49A3AD |
| 717 | 08400B6C690F970860FACCB1CEF3D50685A83F8E97C44ECAB1DE2C |
| 718 | B91A304A94277008EE21BDB834A6EC0E02F7A638FE85C27F6A9914 |
| 719 | 17D098FA3610739BCC081359D0AB4808A816B67DE3CADBA16F8750 |
| 720 | F4CC4544A1A1C5383817FD0D04140C4E033DCEDC1FE768FB6DA50B |
| 721 | 842B4410797D0D221746634355C51ED7EEDD067EBE01650AB860AD |
| 722 | 892B679AA4B381A04998BDCCDE1C41FF208B8F1ABF4DA49072BF0C |
| 721 | 0F419D24D206919BF462448262FD79CB5E808F045D58C3B4564763 |
| 724 | 60A11BE046B16AB40D0669953717075E22EFC7973BB86D10841DD6D |
| 725 | B6E30C27276C4828249A90CA7665D77C0F63CB39FA80680B83BB48 |
| 726 | 408177BD8CEA545FC63952E30023B5B069A27B26C6D5D599DA7641 |
| 727 | C825730B220646F53C93E5483C4C0A7EFBBBE9E5050CB2D00E5C0C |
| 728 | 507B86E1278822A1454151005EF6632B6F9C93B8101A32A3D27B1E |
| 729 | 0DF9002E448C241D11EBB2635A7D857B3C465DF1545540E788D68E |
| 730 | 4E86E4B0D5211276DC92C81AAACEAC1B2040E90A7392B9BF5A3E3E |
| 731 | 06985DE250A689901181CBCA96F50732DBDBF014CB176B2CECAC68 |
| 732 | AD1400429BD5B9838E91F6FA9082E632910F5B04DDC35F15A7A6DD |
| 733 | 2403D38163BBAA04E61CF22DA3A2D47666D5B5041B2491FB21A899 |
| 734 | A4B519BE31F48A197100014FF79BA3B20C978C55C5D12CD93335BB |
| 735 | 2C995EC35553A6F38822A090AF94248BC86F0319E5FEF8879F4E51 |
| 736 | 15D918307C3C1013A42DD4CAB427196CF847491ED8B0328717C655 |
| 737 | E031A96CA406C2D7E430111AFCA743180E9CB1B8F6CDD8275C68BB |
| 738 | 62831C4D62D37CD7123845ABA247247C5EA9BF3F65A040686B4992 |
| 739 | B7ABB2C1A0B311149604A33651990CA198B2AEECC23D0A53DFB8B4 |
| 740 | 33A0D6AF2F5071D810BAC7514209885F364C07A46ADDFD3D683658 |
| 741 | 2D39E94D3A84A10E80E1BDF1820E81B8D9C6DB50BB00E5D55A8CB6 |
| 742 | 23BA0B4AE4484499A45881D3E542F87684E0BBBAFED4B6011B3258 |
| 743 | E5C4D1DED3308042A646807A18E8BED05B8492A6ADFD8E6AD5D244 |
| 744 | 01D1BEC7D09B47172919491CA284BC59317BDD6B28B2EF4848564C |
| 745 | CBD8462BBF9610604681C11664B2CF2C824B3F44B3EF102AA80DE9 |
| 746 | 10493ED2C7EC0184F1203A01FA9C9156C5C6FB16D44FA988AD7C5C |
| 747 | A104BC7D4802020291F3267A9C7396B7A3EA133BE030E9B451DBAD |
| 748 | 3A160BEC40B4A18B49DAEE70C96A2DA1BB63617BC95787462A4338 |
| 749 | 1211BF41AB2E2C78CA22B81E664642C4682DB43EDD81EF73E61574 |
| 750 | EF05618F93488CA2E0441C84511BD334B50A0D3F5E75DE894E11B1 |
| 751 | 66E1F6105448E93146B02AD2A053E4747401A0A6E70FD573935E12 |
| 752 | 37829B487B0EF000F3451B88CD8297DDB57F7C1361AD5EB10A00CB |
| 753 | 511721F48301DC4399170EEAD74C0DCD56D129920C97F248A527D7 |
| 754 | 57B9B2CC84739401B08686255D02AA2169BC9103C5D9E576583C7D |
| 755 | D4934A7DA5C64250611E69550B8E0D33634E8318DD6323CF4AB25F |
| 756 | 23999D4D888BE658182C2C308E161694B8A01E32D42B501F752FE6 |
| 757 | A811CD320021AE00C60BCFD3FA9581ECD987ECC6B0596730B2E217 |
| 758 | 38E128F6ACF3AC2471228F96490286B375FDF3AB97A4E80AC26C6C |
| 759 | 06AE362802F8463D2993B3A31131D0DAC21CB5E28142614D135DED |
| 760 | A4DCF67A3E25D007A011216B98B0407DF8B2E965A89C568A733678 |
| 761 | 0241F43E696C7E69FA5118199D0DB8EB4D810E2AAB8E5039D3B556 |
| 762 | F0C54203982BB21C0BF3CE21892F4AA30758D0AFA48666E2FD651D |
| 763 | 97323748C5743205F0E8F1BC004AB2D92E3CB2217F42D0BC5DF94F |
| 764 | 08C24B1541B01DB80699BB5063B9E2884F5B5FCE0C74D529DD122B |
| 765 | 19CD6585F45429508CAB72A47E828CD4D5BAE92674E316249C2A7F |
| 766 | 0C211A917F4642D22C857874D21498EB54FC8CAB7F2D0C73BFE413 |
| 767 | 8ECA0B8BF5CB010D0005AC3240A9B98765711FE3D3B83C02546C9C6 |

$N_{FFT} = 512/1024/2048/$, $N_{Tx} = 2/4/8$, Length = 216

TABLE 4

| Index | Midamble Sequence |
|---|---|
| 0 | B2D64D68A682782402AB337341495960E3F0BC7F63D6AF372CE21CE190901D3765E37D8 D76A9738D82A080FF588F150C612BBAA09B12 |
| 1 | 255612161CEB2A9B784F5F050874ECC2815CC5F84E41A06D589AECA108E16068910FA5 B52F2F544D5C7412DF2335B4D108F74AFE4944 |
| 2 | 19EFF912BAA5E8E56FDA23C90A26E7B0B4FA80C1B40004D653E02656135D29A278C40 E343E25250DEFD93612450353BD649B30E2712E |
| 3 | 7F1BA1B749F7C7267E06259253F981D45211CF43ACA74620221485D851C705DC8E82930 DEA66EF42E99E7AB234205036394CBBCA8E9B |

TABLE 4-continued

| Index | Midamble Sequence |
|---|---|
| 4 | 96209A07E481F069F8A50C29798AF8E168F72744F0BEC9C415A924683A72D678110D83EC939EAA221A37961E142A80616AE71D09E0F5 |
| 5 | D63C233340FCAEE670426AAB1C206A13B927DD7771841A4900B0353A66A2958619924C528ACE87B21BB53275E015DE1342E1E30263E9 |
| 6 | D9E8F8E86172B88B17568102666B0845947C6E33B3D4A48E308EEB48F89798A02E8436A526B697FE0C39AED110429BC9B82AD278D574 |
| 7 | 8D2F5A2500686CFCA373196E09E0A455DFBE4DAD249E4B918B505085462BF5C4CD0A14C2B825DB1C2EE690659F14A3DF3C9A84FC32D2 |
| 8 | 0ED524338230186D0BB7E20EAC6B03E77A1B2A1201825D6A2BE9D54D27C741C21FB0A94562EA11DE4A4CC6EC5EA1C1AE8C4F98B4C35 |
| 9 | 7D83270D48D7C840A80AE1A25D3EBBDC7F0098A3391CA1DB422BD7243BCC43A9606CE6403D0B1276468ACEE8DD34523B776126B321BB |
| 10 | 005EF3ABA2616B61B845DF1B6D356B957A5D2450A48504C63873914238166861 1583108BB0FA7D7401B162D0706CD6D7C4E2ACA1C2CF |
| 11 | AB276A8494553308BC5F97BE0A2BEC548A58187E3DCBAA9CA8869024975C1A01741FB711BB0B1B5B0C24E8D7F890A3C6848F6332F4A2 |
| 12 | 8EB0A1244C13EB223D6E6373EE0BDEC786C00AB369405741656C9653E183815FEC0883E55AF8DC5094C3B243EE6CDF420952248709F4 |
| 13 | 9A8E0F9B8E89A235B8E50419407F3A29E1AD0DE8BC20A6934B0710E4C81EFA46CF612A1F266C43188AFAB27F55D080934CC32973D2F5 |
| 14 | 6E05094EEA6171E53DAA3907CDA2D7EB050E181082FA37D88A9DF95110512BEC586BA4A7A22F0C74C94B930E00C4E7FA05A8DACCF305 |
| 15 | 13179C6B187DA8CDB1596FA8E5CB5B0E2B8254F307297D5A4B448C818882C3ADE94B2076F2FCD2CC7E7100A53A800127A08573935E4 |
| 16 | 9EE4402CFF2FDD65FC8473B2BC5A47B45109C0CF0A8E89E019C7DA20143737CA65518B3DE2362E5A1D8998F163A1355B7A92BC015604 |
| 17 | 45700C78B72C9ED7BF69016B72A7B6C09F288270BC289C926073011D002CCFC310F2A11C59F9406BFEE7994297969A19F6448E0CE6A9 |
| 18 | 03867C118F71D06A335C9B7F20716C6AC7357CFB42074B3977799894BA2E1092C9210E120E1FE8DD9422F445EDF1FD1898DCC7032907E |
| 19 | 00329984331CF2C47287DD1F50839F897E4267C37D517679293C98B97A7939E86933A3CA1546882B74E80E01417D35CCB417A1B9954B |
| 20 | 03AB35BEE3BD7008BA286AD5C083469758636F680E764B8E8A018508F03C631C3382782874EA12FBA51FD29B58D884AE8D927B9905C |
| 21 | 84A1E0F5D4E6994632290580C45D6336CFD66310D392DEAD0994E01406F7A0CD527CCF054C39D20567D61C401B8E9C56A5DF4CD3069A |
| 22 | 804465CFD8ECBB21402D022852CA83B9DB1AE7413437DB65456F17D21F7518E8791960E319A9D0C0C2B16C10B4578B0BD3DABA3CB20B |
| 23 | 778E8313E12D05612DB81C5F0429D064911A55DE556F690BBD9BCDA258002C5D38BB64A8ED2159FB99542CE3E630E454F0225DB1BC5B |
| 24 | 1E88DCF081D1FACB9452967921DB2425ED6B9600018DAA3F4D560801224D4E048E31819446329A3EF9F7DD8BCFD032F7C85512B15BB1 |
| 25 | 64F32C7459A3E8F17745165CB4296FED52B6465D28A504B91208FAC4422A933CF4BF99CC8C371D4557C161D0B8B31AF73B9E9360CE42 |
| 26 | DAC4A66EE1589B51497BF85D13049A9C7859C2C14B62A7B027E9299DA26F2A1F1B638AA0991ADF8310BD67936C82C10289F00AEFDE32 |
| 27 | 60D587099BE0E32D35E49704AFF8655015DE3503414CFAAC6763D69927E2EEF82A7DE48548B019EEDCFC58BA586286035024A1BB438D |
| 28 | CD536205AE90AA5B1E813ECCF1E0061D426066BDC451FF065D95A8648AA0F00CB04AC7C7E23AFACC347257C04ECA3A0D2CB13F0CAA55 |
| 29 | EB7E86CF44BF6386219C00AD27E602BE42DA9C6307C1A46A26CAD06B5DEDAF6D19A62749A1CF440A422E501AED17199058D8AD188FA9 |
| 30 | C02DB414C1931604B7B1C31EB84A5096E46DE364D8B530F15CC2F5CC4186B83C77823297F71EE0203E5F2992523A081C00359DBAF75F |
| 31 | 9257CC08057E6B112B5C2DD06079070293CB09754DF5AB3A8C66DE8FE92546AA2D6256B948F9E7B1A80210141AE99E93B603D11E7415 |
| 32 | 7CAEE24E7707A38F35FA2681C57A6489B9CAC1050C0542A6C74420F17440A94242691F2E2F09DFB05D2E9D9A7FA3232CAA923A31AAC2 |
| 33 | 8876C9F941C1038C8064CE96EA1EADDB00B205A66C1C1CA66FEA4E15B33DC09F7FA098D36021250586A4268823E5587E528AF4537A89 |
| 34 | 928EBA27458019C4C6A94C5EB7F32D6D8A85EB83ED07CB4DF60C325458BA2B12447A4D5DF3DBF011079104F3F6581806198CB4F2CB13 |
| 35 | CEE0DBC35BF2E1721C88F514720D27A404C3585E0E686BE5D748EB287C805566F43C1DF8A0F6C710D66E60653E5BFA160CA5EA12ACC9 |
| 36 | D9F2CBDD8CD9D8914104FC77C03051485D14A60EADE398773766C5D08A6852C361C474AB41AA131005B9176D55D4F821C834FB225863 |
| 37 | 38D2D32841BBC27C8F6125A9598E647F9324452E7A9B31A6930CD1BC987037D60716E560C88D0B87E79492FD099E796569BB31013671 |
| 38 | A322615CFB38E5C6D3A5E46C1A60287CEAB0BC22D060841C4EAF40453A9EF6410028BE2367B8417BB541B4954B0426E0E6249F8DE806 |
| 39 | 8124E0747A11FF1A4B0B11025F704350E497CEBCF7A0C82FB9D6A2407B8238690E75CC325EB799C1F26F463A98397AA02880EA775268 |
| 40 | 5519531B32F753C658612E6232C8A9531BE160BF1480F10B031BF56451E4CD7249FB909B15DF04DCA502CA73C6EA5840613A5AA31A45 |
| 41 | 2D98F800493B814D25974D11D56AD28B6A3921045A1FCBA60EF0AC250172CC77B81F6FB4309B09B9B95ECD5120F474E1B1446AD07342 |
| 42 | EA513CC22B631F288218569F9183A3A71AB67C6F3304D51EC1F4844B46D528A0DA2D5AE38C36B0156A759BCC66DB008942046AEB6D26 |

TABLE 4-continued

| Index | Midamble Sequence |
|---|---|
| 43 | E17A9A61CB34296B395150D89B2126676A3AD802974D88DD6585724E26EAEE484CA5F520CC9050CE6F2B1955E84F97673A8C528408C1 |
| 44 | C65E8D2ED806641088D2A989AD547671880515526EF04862A4EEE7B330795C2AC4CF98F10AE1FF3F21D164A7091065BA1A1811A1145A |
| 45 | 1EC23E66476C26A5F0381A879E3AC34236D7A8A72105FDEC40A4D5B2AF89D0E0989105B48D0D57145C0B22B659CD1FF8225D6A15D707 |
| 46 | 87BC233897CE22D8A831724AF7290999F18EA1E2C36D4D135BE17473BF08591E4260DC959DC92F7B9B4827011445D2C81A98F6635651 |
| 47 | 70C3547D149BD52CB78118796D29A04291EC8708A87F568580CB9E19D8644F51968D1B546EE63006E8259D9A87DC82E3363D818BA720 |
| 48 | 22F21C4DDC8D13E5E506EB619F4ADEF80297003852363A284ED9F3E7DA3352F3C8072348117168F49176CF1E088598691D9DC97D398 |
| 49 | 09B8534E0B7766BE92F594074297C1B41C7B3DD2445D03C189A8B24E3A1133C3878D9EDD4AE58610AF16C0073804CAB90DFF8BF21527 |
| 50 | 26E10C9090BC2B2B489CE74D3B21940267971EB719AD7E02EAC602F4AFC3B4C2218147D0EF5B5089A81D3C61C3039B0C22E3F45C6607 |
| 51 | BA410AE019919F77D8D1493ABC11E7045D828AA930478BDCBC15A34D858804CE293E3B95A755D6EA1906E2E4B3E5BE3854A459630C03 |
| 52 | CB0DD00D5794F7040C9289BCE9164A94FCF775F7E78D0155C04E4128B43A8AD5F0D4F60704026F23605FB26F20D03DEA86A217114EC |
| 53 | A138BDA4777C559C598221605C3436CD1F809A508976D50779DA226E20B0447B9041C60A2DD8B6C4BD8E09154A3C1FC5AE3C6A0635C6 |
| 54 | A7F41705C14F1B327513510CE3BFCFA6DF8621DAAB50A480E45021A962247DC28DA9F302329278624B4E33A8EE7E2951CC6EE6B18C13 |
| 55 | 65B30FB4141221CA4A9B8AE3CA6887D5CE594E9CFAC33BC1881B29DD9060F43E583A54A125F24F472E31904C66726C23FF1B2F7808D5 |
| 56 | 2FD7869636816CC517F15560F4410A69C6A40240A36C2E94EC2E660EAB892436424750BECDD7FF30A3A7A53C729478009619CAAC637E |
| 57 | 9BDABD0CD46D494A8F8C88732D0518DABA9920FF2FC0432A94D3708493248F0AFC33C1003EC40C8D8B5CF89D3BCE906B2476AC7C6A99 |
| 58 | 40100C9D713121A86AE8B7BD7FA095449B16FAD39AC5CC780C85B7398DAE7A11656603454B8C7353B47FE89F4147FC010F34592A0296 |
| 59 | D204C031AC0DCD7826A086D68510E1BA28DA6957D47B098FACBDBC9508099573718C74D768D5AE7E00C4811CCC444CB951FAF4E941EB |
| 60 | 9BD4847C0FEF4CE15B8171995B6400C32078B6230B9D13171E13ADFB5EC2681781079DB22BDAB4D24F7301D926CD3F4265A508040535 |
| 61 | 6406FE87C5A2B54977D5E8C2398554FBEA98A23191386D6A9A280B71576F10DC91F0E3105B4A8522664C1225B74010395CED847DF1CE |
| 62 | 16E642DC070E745D49B25E0774362C5038981A6BB3B52501B6A334CCB14C462BB21B4292AB8003F789579C562D5A388106BE6BE62B47 |
| 63 | 478E2552D032C23FE92D387B839648E8EEAC947C135042C9531F9398FC8F4CE737A9203540C86484CE739D2AD4B079A067DA234FB563 |
| 64 | 5A302CD8C8F3C3C31E02C9ACD80430B5533BCE4714DC4600FDB65F9F06EB736A39170ACCE16B925510F6A91B77AEB40E5C1005178FA0 |
| 65 | 250D8B7D8C6A4682148EA8B1BDAC84411A02F881D44F5BC32C37AF4C96633E0A35A3D900D9DF4152746C9F6A728E07189E83E71D071B |
| 66 | BA4D62A980A255A9C01B512720126F4E7B6457C37C3A986F0B682E02E1CE01018EB5656B0E9BCA4BBF4033FCD1818D0E9FA36A7E28A1 |
| 67 | EB10FE655E4527A5A8C529B3AAB28F5CC19282C1E8F4A5813F60420A37CBD314836CFE9CC374486DD288804FC82986D52138B95D232CB |
| 68 | CA10340818C2068E8BD95FE6A9A61DBDA89B63EAA0616C02DFC7A849298C9C3BC5CB2982FE011E7A2751DC0B160B5AD7EA05611CE08C |
| 69 | 0377CEDED55F3C262E20D636E60FD29CB04C268594E65007285CD36F8164804DEADC70B95C413D155D1C15F2388412874F826073925 |
| 70 | A488B088068E2D84F9C11CCAD623E26B4B1AF415D9F3E6714E2980CD19B8C3119D5285C19F6C1106D9ED82F516007B2D5D76A0FE420A |
| 71 | 122438899A56552A68C490EEDCB3D89900FF270E1E4BC7E02FBC559A4EAF51C64032E7E36934C2965BCE7A0F10EA592A636866FB4024 |
| 72 | FE11F4E973D2E5B0117C03D1149D7BD2810345C630AE0042ECB1F2934E2C3D38B76D252EC6648E81A472ACEF63CC59016B9863241697 |
| 73 | 8ECD336D94FA051FF1F4ACE93AB78139011196009090B50214D1FB50E729BC139157B557C5891C66090D2CB44197F3685E1D5506E1BB |
| 74 | 67122867E41C4B368AECABD1B884243657EB1836598F0CA76168B20148518D890AFF51E7A6489A7521326E586AC45C07171554B2FBB0 |
| 75 | D280D37DC8409086FA97932429750124C1CC67AA53B370ED387DC52F2C331E1578A1D2B0DC7F7C41DCCCC33DA6DD010088570D5A4AEE |
| 76 | 719D09FE542A030142927587A367C8139AA99094C3FC0E38B2C26B1B43A0724169B96D4004A99ABA6A961918F4B9756DA6F99BD9429D |
| 77 | 54046F09398CD47E733AC1A8A9ED30B34DD6807C89D6789944C7AE4C0D98814DDB95C190C6A858115BB6BE8E9B7887321623DA872FD0 |
| 78 | 15B1C40877E9E79053B0EEEAE18A2C5C0400D3B0987A08CCF4DE5691085347728D81F84F711432422FC6F77096142853DB924D2AB9AE |
| 79 | 859F1E4EA72493EB23B3F09E9C5843CEC82AC4C3335895EA53023F2BFBE539430822EC7A5FC87D100CDD0D1E309CAC0DD288A49A1BCD |
| 80 | F8B959E5D605640ADEBE26C8D88E4F58AE288D1D710F8402E40D56B26425AE41BF239C01345CF0B9B5EA7C3CF30CFD7C9164312091A3 |
| 81 | FC38AB43D60CD47893DFB7A30122DB8A88981D84A42601BD7C8E316768BE2674971B6448A084E143698352DA2C1A105C6D2C97D7E698 |

TABLE 4-continued

| Index | Midamble Sequence |
|---|---|
| 82 | E627C0F5E3294F8DAC17A7A3571D0930CE8C584CC263EB08F7020CE9854331507592A18130E309E971FBF62625E768A019148491FE18 |
| 83 | F1BD34DC6322ACA542815879C85DB06370F24BB034E2A8E08618FAC06EFA200C4E565E9A11A0FACDC9394BF33598E6AD5201330D5906 |
| 84 | 920959D8D5948EE1D238CCDB2E9E79157063C19BE56C82417E8437F68713C3220702656A0ECA45E2B2510903C3C420B1B5CD8E1D49C6 |
| 85 | 0C94D5C8550D96354FEC5473405A09C64FB11E7223ABD60992146A3EA6CF0710589A9F611B6FAB67DB948153F879E9841240381545B0 |
| 86 | EE556218E0B89BFD7B5820841AC63585486141AE092BE1C831320457685F8488DC220D6187EB031B1A9A2B4A25FFC77D0EB130AF38E0 |
| 87 | D7FC5242378415355B12E09920571E98FBEC700EC2C5F53225CF1BF27DE33B0201B19E8210A806986185C1A6B10799121FD46354713C |
| 88 | 8A30089772669530947C22140DFF5CCD3F6CABC40A65B0571CE24FEC5E9C05D7594D04F996A55CCC4B150F3AF93C2833C21B83A58E25 |
| 89 | 504C1C95AFD3E84EE2047389C9B250E8B3807C7C761A66A2DFD003E6D3AEDA17055DA88186E31628E2FAA69FCE0A68CA3032816746EC |
| 90 | 30897A7D7C39587AC984312D0CCC9C97760D222AF513B444D6130A4C2EB3035522E2D045F8E648094948FFCB8FB29BD3475402673F81 |
| 91 | 357254A6DF641B079AF18F0013E279EC7A4FA1A7A668BA0668A69942282474742772EFFBD2B1AAA1D7E35E4E231DD494F049228A498A |
| 92 | BA65B66F13CD21D4AF0AC630991AF5ED64F15204173C79481294A3E3A3B0722A5DC192EF6972CCE7E3340C3FA003AE81422897342890 |
| 93 | A0729722601ADA64CE6609907C988BF55BC3CF910DF608630CE848DC219FD274DA882027B7A2A0DC74B635705A8266BEE2D5706096891 |
| 94 | 4452A1DF660E345360EED1635EBC8EC27EA7996C1C913F44B08E48C18819352C855C3CDFE4E50D6EF63C8B0DC012F5928283DDE37D5A |
| 95 | 1ADA557BC09A498FE749E41BB288B89362983C3E573D1B0231228E176A008A9921C68D3AD3DBB1109E7594E308509383E092EFEAAF47 |
| 96 | CAD89E404506D600E703B190967E87CEEBCAA1D61BEE3D6CD38E06251C9280C22BA1DEF9C9BC84B0B1F249999BC757911A1E367BB010 |
| 97 | F184F4651806888F0CE79A3C4B44B25042F5A1072EBD69D2760BF570C7910536FC00B0389E3E194D9B1028568FCA80915F8A5934A8CA |
| 98 | 46BC6D967331EDA405504AA51A084E91C31B1B6264DDFED49B4FB0D46C40C7D74866F8306E943D87C23B95010EBD77B8B7E0132443C2 |
| 99 | 086E830599F7052DA000C4D25F0DFA2E8C5A37CC97C996E3F4CA2E9538D445028E3DD413CC4A1063942263046D5C678BE07EB15EA022 |
| 100 | 90999313284F118493F7B7CF65D20F5690AD5534D334A1802CFA2E3D7A81DAE0692447E4ED2C86D783118A3CD00902774CCDF61AB971 |
| 101 | 1273EF20BA923A99602B095E673A084F047165E780DD975D52E1E64F217E489EAB26B9D5FA06A1C04328B333508E34219E63CE23A766 |
| 102 | 4DBBCF76159833A1BC587856EA61C33089B1CEDBD0E40D01CB55034D6C84054D6021754F1B7549665C2BC7DD992BA4B7A52E8A018574 |
| 103 | 4115BC9A9A072A57BE6CB1426825053A7A9F23118706B4C579ED5C7827B56C0FB34FE17A695985985D3098C6E0210B98C2DBD744918B |
| 104 | 229912928B46C25C3DDA8DC75E62C73C658BEB90861C531422A5AFC1E06B00E1DD65333D4A209AA204A67A6C9BAC6F0D57E874FC4C6A |
| 105 | B4712DDC10BE7AB2112B5F24F4C56D41F98E20341B5CD0A855A3095605CBA674510B831B4B8505C89664384E7A2B62C1FDC18DF07D92 |
| 106 | A3D199A78FD229CBA91388F748A914C07F0D7C1F5797F4C502402095D67AA4239BC4A1E33ED8129CE0ACE912E16051C0B4CC3CEC98B1 |
| 107 | D6A24740E4CE8FB26A26211E1208EF015F434BD31C8DB702A22D8DCD31EE1B00C5E2550E75AC4E852D4156D64FD545AFA01114B8D93C |
| 108 | FBA0938C441AC85730C8CFC1BD94D19E852D745AAC4B86909C2676D72CD148D19004BE5AB356F052D40FB34F28C8860049E97ECC236 |
| 109 | F9AC319FBC837B07BF341302A4520F4169004546283277DB2C92227CFC19622A9AB3100DB8E75858312CC6DCBDC5314FC0C8B40B4092 |
| 110 | 5C483067BFE11D463C456ED4A396A2428C99874E3B79A5D73A3C3A8C2AA441B5B0299FFD1FC6084CC5160757626364BD8B0E24D039EC |
| 111 | 20F20E71C7B8E5DE670C22841F96E88DD41DD2569392D661EA8332D9028164814B4405E1DE47104E53883617E0F7CD8BB1FE2485FFB0 |
| 112 | 2F9FC5B51E1940C4DD8188A9B68811845C754F070F0F4509735BFB9427CA481B4C0EA61F0CB1628A00F754B66F768A0370D6D2694A9F |
| 113 | CBD20F6540197B26F2D297A108C46BC8C3C81140EC8E5830F9BAA2556A29B262B0A6166F9220ED732ADA8A5A2F21B30312581F437D56 |
| 114 | F8E821893C08904BEF1C5D4C8B7A5320A73262701A4DA375A887709F1DA5A092AC07DB106F20CBAA8873A0544C17AD26A93ABCAD1625 |
| 115 | 28A4482D7F44F5931C5935727CE3E13DA0D0C4353211BA9415F3C854C9D117D4C5604E2858573FC9921AAE4057859EB6852884827D3E |
| 116 | 9F496628DE7FACDD86F6F94C5369D20A03404D2AD50C51387434A0D62C4C7A8262B41DBCDCECEE2E4254DDBA5C260234C37AE4BD9154 |
| 117 | 7724FCA16A38800F24E15472604962B17997D53823137754BAFE0FC49390052C97CF63267DBC8F8012240F02FCF38CC8B4605E13AA44A |
| 118 | F3128E88AC94F8EE2D3E2C73DE0311942C29222E4C6741852FE5D344C1D00CA27B032D4BBD3246872993F9B82B27A5A15FB88DD327BE |
| 119 | 092C7BE069FCF083DA30B2BF435C506317328912B8490815BFAE78B518664DDE3D565150222AC5365884E8E492D90A4A3347A1716273 |
| 120 | 603E2A8F6C94D778FC1FDA0968938C9912A102FF0428CE54C2FC6D81974EC0C64E305B9C7BE80318CE4178CA0187DE8A3A2A2FB5171C |

TABLE 4-continued

| Index | Midamble Sequence |
|---|---|
| 121 | 0E23411C4736968FD1EC13AA94959A9DD8E9067370EA603FDF0C11DD23DF3B0A92065517218E526FA95B50AB8B4B30583F5059C394A7 |
| 122 | 10064537DF5DB18910BF02C74B8E008A46F46D2E374288E7CDBA61F6E8A79440D5FEC3A3179DFA002241F44171A1221A88C0796909D7 |
| 123 | BCEA01B410DE6833CC846152C3BD868558B04633B7F1832AEFE25200F2C7342B3631E00BAD443224B24EB2A4E89C75BD5C458AAA687A |
| 124 | A7C9CD2D6CE19EC9100CAE90390B5BE41DB979CCE628650D018B37674A6D474ED051E1C7D14A77955CB07C827EB56164194B94164964 |
| 125 | A77E7552E54B69F4EA8F0BACA000E1B25812D5A82861A94DB48BCB69C8F1D3F2ADE114E698D056144FE11A2C6FD14807531EE9EC8460 |
| 126 | C2180280F31D81856F7B0C8BEAF0ECC98A0EA929595D9EF81C6B396A48C1EBA4440F4C9B3769803A155AE2D77585D463786A67452165 |
| 127 | CB28ECE17BA213E45A7F1233FB4335AD402466281D899EE8A5AFA482AF30E192579811708700000094FFE89C37BB74CE793D438BE5A6 |
| 128 | DE93B6E04FBA463720381DBA52D93C20B0026EA396065BEF3E6A8097269F05B6B54685634A2750FC661980CEF8C51812612F0058FAB1 |
| 129 | 81B10486CF2D6FA008F0685F33C72B206809F71186641572A558B3F9690F1AE3B5A1A74410569E64884157A392581479B0B7BC4C38F3B |
| 130 | 0823AD9A47A89564BC8C6A38CE8BC3541C1D648B5C133699D849EFF603F14888C1AB72DECE0C857B6F35192DA0505BCE222DDA55FD30 |
| 131 | C3A57C2D60E4BD46ACA64FC28533CD9DE81AAB5FAC310AE0B2888BC71217D90F8A301847B82FFE5F32CCEA988A1DE9F40C363E0A2508 |
| 132 | 2C1889CC003440AC4941F6008C8D6A55F8E3C9115FB83F479E872E309B7EC35A58370C7DED131754A258D5ED7BA382D210C11535D663 |
| 133 | B43500E19945AE41899DD35FF87348BCB8487A270527B022EA4795ACC37CFA650A104A6FA88A17EBF84345635E402B470F11498C6C68 |
| 134 | 99954B56C1E9F8A9BE0A184F82F0149AD14B326310D3F26AA3A454716BFC61A8816477960229B832A446089EB2F03FBA74611E4B1456 |
| 135 | B7C0EC77FD5C471E4B1D0D1A19015689E8247C710CAB939DE7C9ABA417A5AC88F4E66065C32479ECF40E3000F9114BB8E5DB1B8621E |
| 136 | 86117B262F86977AE1D76F72E01A4DB40A2DDD0D2F4F8ADC099B10A35B249D874CCACBF0FC368FE33311ED12F888800CBDD704220019 |
| 137 | 918A5505FC90DA096090FE6BAEC1C1B72FF890C6D81F640A24BEB22C9D062521C1C1B1D7780B518E6A43006691B51EE7995CBE40C137 |
| 138 | 6E06899D84C2F442FAF0AA92F29C4AD8D8151E78E1E68174884911E23C411109D1886655DFF642752786E0915CEF2705F9209E34027D1 |
| 139 | 55BC8B9090618CF10A6283A2502FEB27881F23FB3487CE3655989BBD69F5A38FCC9E690AA1C861720C9B381D848C22055E7484F62A6A |
| 140 | 559E3B94E9824AAD0512289875CCD102CE8F354AE422640EF116A7F30DC76746A04D87A6A4C2D0F81ED9A1AFA2677F9888NEA00AAB32 |
| 141 | FBB64865FCDF0C1FF4163B994FB86DA7278A27D11ACBF00216582AF5DB43609B1780F338AD2200CC162E4F8A23A1296C5EC54C4C4AB7 |
| 142 | AD4E2A84560195RE43F238A92B404B96583EA98C10683832805AC3F90C3F3E061C0D2DC2443464C68E3CC17E84DC429DB9763B01349E |
| 143 | B9006F2E7C6FB1AC1CD01A99FED89C4382C32830DA0ABD57B389A517AE681FBFC847204612356545C14C4E24B3B501419BA4950518EA |
| 144 | 936D40FCAF52B53E92B2B64F44890844A28EDB833C904644264BCE3A093468E189212B15E0555869FC72569831EE489ACFF65420E15F |
| 145 | 46AFDE69E96768E37D02291383DAE092A78D10904FA0D18D985A4341B50066D33D4A1F7AD5C822642AFEA9BC522239CF3F003F819067 |
| 146 | 1817426B3EA648FF81CAB46723CC6E831BC980A6897A41BC6B3170EBBD4AA48008E26042D29124FE44F3E37F8A1AA1C0F17AFF537192 |
| 147 | A796160729EC35F80C6A34530A01828667F3AB3B58DA20514944C06E16ABA45A8C467C72F19B401579C09FD63001C919176784AE2C68 |
| 148 | 6C7834F99384D511E3E125B14DEC5B92185423D5C74C6E98990A4E14D0021A0147F80220732AE68FDAED4D10BFCDF2ACB72AA9837296 |
| 149 | 04808FBF3597B792C3CC041A9AF47980293F5DBACBA8E2BA1753C2F856C35AA19172C13429DCFC29A3F178824ED914470D86DEC6F603 |
| 150 | EE8BFDCF3022E20DF6876252A68856401697B14503F84CDFAE2854E1AB6E16B944AEC02471DBBBB8AE883AC3E0596C54D298C13A59C6 |
| 151 | A01F4748FD87C52204251B0A59431899DABD992BC2EFE49580665D969FC2962B78105D53FB5E8E0082A699l0FAE306891C6C52C5D298 |
| 152 | 050620FDA66094ABE8590BF8D639044CA11B4E6F6C5768DDA8223A44DB485613C3A2CCE81BFC7B84C55A9A6DB0C9C8C06686649A834F |
| 153 | AD98A8D18199E8C29FBC0329290D2546A5861D200EBD61EBA2FEC7406592FB0CC31F26AC03E76E1101F23E333D9110BC9E26EC965E05 |
| 154 | 853B9945E6541C2B2B6AF23BF9119D8F2052479C87B8866DD340B70BEFD1A61AD20A57975F06AF0164CC864D9C93949001444F752762 |
| 155 | B8365635E26294217005836EFB121046AB9A0353868723E04DCE8D17177A8DC7FC819A6D0D2F2049F31B60A391E954C11B107D063D50 |
| 156 | 059F9300482911149B2F638AF08BE38D11C6869BD30BBEE49D4DA865D6A9E7DE4914566F32213341580F5C08F0A4871C3042BD8EBD13 |
| 157 | A27A8CDE1B132212C20562446E70FF39B119754EF860CFBA7E568A85A21DDFC803FCD13848FAD4DF4B68E4AB62D8D6D368F421A98044 |
| 158 | 2E2EEE9FCB721328D3597D044F15D3471B0152F5CA4D13839B6720787206B4032B45140EFA51CF0BF70BB72CE83A24F4AD7A409FA251 |
| 159 | 4F058060DB14F8FA22321AF14DAC618B3B6FB480625EA0C82DA5286208AA1E73F6F43D7DEE016889DAFCA5A91FE98AC50DC188F91845 |

TABLE 4-continued

| Index | Midamble Sequence |
|---|---|
| 160 | 427638A400E32A3D609453B0BC11E65B8AED2DD1E726C8C31B5FA5F43CC1157AA5051 6105E855A908CD73C929A609FC4029F55474CEF |
| 161 | AD348F3332DE850B34271BB2BC7BD8B8E89F5250906DF2B4E0600D9801BEAA3C2E7E C9C399B9D28012C206179D0428716EB3B1C680F6 |
| 162 | 44CC20561E4B8853222FD89833A10D4B9C52CB7DB173D9E307C053AA405A7325E8BE4 D066395A1369535D4C1E458541F8C32E717A5E7 |
| 163 | 908F15581503E2EA0D41766E7C2E05041DEFB7C1A2C2D7B82D70CB42CCE91347D901C 7DEC15BCB090350D268CC43704CC5D990EF2297 |
| 164 | 8081BAE42CA62F7E695B70FCE866880A6892090AF585682AA35E7EA45D38F506B004AB F194D6C306B436767A445D0FD3AC27A09432C8 |
| 165 | D70C8E991B0CD38AA851D01DFB42721E8FCA03C33E801BE566A464693A99D40B062C23 2AD8F65C6F2439CD910D34F6160F6AB2C366120 |
| 166 | ACFEE84189B31B815E70BFCF3E000CB6324B1703BF7098EC90800B53EF50A9D21ED63 A58BC1E5C7605485B0C51513AA613A28A53B27A |
| 167 | 9AAE3EEA24770BA29621702969CDEE965179A22C406676911AF1B4C7C084D1765E26C0 F38D43453E5188E621F36BE6B4031F4ED71614 |
| 168 | 894834A7910F4D0111224B68CF07C89488FEE70147FB9DD7CE065729C56025FC827ED57 E06222DE2F2EECA24771E1AA34BE8740D4C2C |
| 169 | 2A96425458FEDFA4F34F201A93E5863BE710999E4850988894C733E8393E01402D01F2738 D4A8035FF2FD2A4B834FD8C3B866259AEE81 |
| 170 | FF65C4E21248A3556F7D0CD0722AEE0A652D4EE6085024C69E272BA9166E02BA109CD E10CE7CC9C3C86641F27C60A10B470FC96E3E13 |
| 171 | 7820602A50D089BD49D36EC61EF4519A7D03EF34A001D1317551DA94FC8F40850FDDA 5ECB8CB0529750A2A49432ECDBC4531112DC291 |
| 172 | 3E6990E8134D650F2AB38879000E1CB3B748683AD73B6E2BCE7A5A221EEA9D4AF792D 1233E40B140533448426D7C32337BC44A4D85E5 |
| 173 | 03873BCE7C6BAC2F6347B2799BA42F8972D71736A3803541A22C5A6D1F2F20C4CB06F4 4BEAC0C7D0A3F98A18787F2D3B24D2D10815AA |
| 174 | 0D8E155124EE8AC3C8F8CCCBC7A8CE1B2EBA2498044496B1B517758A58545671E45CA B6E96414BF080A063D9EB10D6C089506A437EB3 |
| 175 | 507DFDD62C1029612A72615115A0D834089EEBF65891DEAB8AA54BE795C17A666135A CC5F61C302FD1548519E2E59F4278F584A0E152 |
| 176 | 5526D3E0D3E4CC252D8A392C6B5A15CB6943375F082A25ABC1300696D9054C6A7676F E197AFA0E75C2A962086547746109A7FE189A17 |
| 177 | 645F7EDA97C30041DF46B1BA32C8DF87838A267126F8096248465169DB7EC63437A3B58 21773382D37834A2167B51D855746F820AC44 |
| 178 | A82F5CC70C8E6253EE21629241F1D4254589D93453B9DD96A23645C061CF02CA4CF60F 7AA18C02DE879496051E669DF94C6969424EF4 |
| 179 | 905776E878D31FD0AE5D845921E12D09711AE626353C563AE289E04F82C099E7E87F4 18A42E8E13C1946135CE0C94CE4E6B812D512F |
| 180 | 769B57AC6A6C1136D6AE909885A3AE4788F5A280650885AC0D99D58A66BC50E9FD44D EA66F58448665BA9AB800AF1D0F316D5C309259 |
| 181 | D450302B993F1454A7AB063D36AF340791F99E4125332181A7139BCC0BA7812EDAB774 8105403C8996233D86CA53370E57599D5168D8 |
| 182 | 2B67266430DDAAC0818B0E998274557A4B979B8B22B54CEA28E41A0F2B26796A0DD36 07AAC4328ACB9B76D19CE31D11C0CC01E1B5D40 |
| 183 | 56809087949A67174E6698638D0D4166E85F79794032F77DEE76F8B95C9C52BDCA183F00 13E0884D4EB0D7087858AFBD2EF33C18581F |
| 184 | E0AA97E4CCB46F443A4DA6632A61944BCD6D846BD21050CE1B8E14A18002791A028E 4548F4397D9AF9F94B4E8562C421CCDC16C9BB01 |
| 185 | 374401813ADF39FB344851F33D00F37AAC3922916B3ABCA35E188D20128A963DAB37 5D4EA8553164140ADEC4DEF13D964767E225EE2 |
| 186 | A2479204568CEF26C172420A4EBBC1630B6B1B5341C22E2E5C3AF7C5ADCBEAD182B0 184A6A1C17688367AD41859F42DAA3723EC1469D |
| 187 | 07655046CE732472784F913926F481CA28C41AD68D19FE5E9C2CDB60BE2878B5BCC955 634D61D360E1FECAC50410E242182415BF758D |
| 188 | 5DFDEACA080E1AC2791652874FA960252FAB3C34F417E432029CD120E7D9C1224E8357 04F94C5A2D19CC561D51B947FF0B54BB634912 |
| 189 | D44A6202F117C97B122EBF71CFAB5B84904A7708C44ACF003A76145ADBF8FE0C440F9 B109245ADA0A80C371E28D0306A580F730E6437 |
| 190 | F6243823951DCE0092E4C5428C9693AFFFD67982383E2A6C63025ECA9A936834490CF43 0B74082721857E6F5F310C095EAC4DF8673D0 |
| 191 | A6B7F81B80E89E026636DE4B8C5350C61B2AC28D7E0F3C88A4AC7B9E2880DDA04D9 23732BD6226C6D74309AC50A17AEA7D14F12908A |
| 192 | 9F853D3C0973638C529A5D656CD612B18A499483F2EAE152CA80682204E92DF14E027F C8DE8D28D21514C2461F42C2BBBCBAF7781A39 |
| 193 | 8057DE34FDA1801C4CDE4DF84AD128866652EA1C8B1A33A030B78FA894127B26D077D FC2E251C152C8296516BD0918B94EC604BC3130 |
| 194 | 3D0EF3BF1B249A682EE104485B88E1BE5AACA9A4E281FCB8A1943538CF91B3EA4F630 3109D643CE429E7104DA80B3F1CDE290ED18588 |
| 195 | 1DB4CCB03082566E4DBC47F0BC8DA177414405A3C20937D063DA5AAB7031C7AE84486 662BD00789C4A2D245383BAE111E77C1FEF52C98 |
| 196 | 3524C04E2AE78F602A6B39010122871486FD19F1BEF5BBD0164C2968523CDAD8B37C72 D52BB08FCFB1970917E880A6180C3373C47609 |
| 197 | 905C732F70B382ED32624877317CCE313CD64D6A050FFD514A4E004ADE3B900C08347B 26EDC7E73BA7394199E7848B8C1D1AA750A570 |
| 198 | 06AE556C234C8C2C8361934C2A0DC35F41606A1AD81F7DDED11AE74E60D0F7AD91D9 EC1C697DB1424A903CB91D158B565019FE4C20DA2 |

TABLE 4-continued

| Index | Midamble Sequence |
|---|---|
| 199 | 71A6C76C43D1D92F4F4808695CE520991DE8CF4D8E10AB7F24A0866A2A3BCF8D31261 58CD1E9DCB0628A7E07A1F3A18EB1690A7C163C |
| 200 | F4143AC4CEF20177A5478B3BF71624B84E40E8B9EAC808D5441229202491E757FCF911C DC83E44B145C02836082F229E2AFAA4B6D6C4 |
| 201 | 8F9A725DF04A3FB9074299FDAEE625AC800467C4743C3B0B51325FB4749EE535336E8B 340B402E5F6F868D94087AAA3BEA18C945CDCC |
| 202 | 9F66E8363640EA516EC877A4E450005F11CDC43EF99A5207123C9C15AB17B531F80FF1 A14184C8192CBB4682D9E12D3DC947A7AB3CE |
| 203 | 90E7D518C6466471549913AC423EF1BD8AA0130F420FD3DB5848C70F530F86F9EC14DD A5E362AF242A1A24924313737322207645A00FE |
| 204 | F1C3B9529B5D2C2EEBEEC714AC3FAFA0262D2786C428655082024A64CCF84339B88B76 5F23B0AD589329BEAD80B114C2566B07AC7022 |
| 205 | 4B094B8438BAD6A48925554BE0DCC903EB3359A78CE36082C866F1D0080736ED03FB7 A698ABB38E0198B9E78FAC566D64A903F628034 |
| 206 | 88AF50618A4F25F68F3B2B9859DC0EF4F6F088D81207E36A404EB6824C8BB1BCD7B893 0D54618A11243C32E6F9E607D570550448FCC2 |
| 207 | BEDAE8EE3E7172254B06CC00CD40B3AD2256291B273D1298F79258725DA05C22911FD D44BB321F554138C44F5F27B9D0328754220A05 |
| 208 | D19656DF1622BDD0BC4C505CB8F67F0C06422C4AF6211FD3D10E3D02C8F4CF8A27B61 906E15548B9E5D9B7789257E65A28117A0E7A92 |
| 209 | 82DF4E24539F98D71A31417FB7BA26F68661D176571B0B183A809B9746C75FD5CB711C6 E09326CE12821765F3A1A743144D2C930802D |
| 210 | ACBC9C7FA5705CB315A1AB4034646852AA397D44B507BD16CBBE20D806D231A51CE C812CD2700A1D106C9CB1F1A1311E77EB753B435C |
| 211 | EC516302395B266A4E76475EEA0D0EB9E2E7D888382B0A8D2992E25C1D8EE0B2FFA1E D93C0A200A7464861AF176A051B1B5DFD72609D |
| 212 | 9B9783B14C02829B2280ABB9031724BB5E6D79B725AD6752372F2C71A271AC08D82CC C56EE3270A681B517A80121CB3623C196FF84AC |
| 213 | D17AFEF16CECE3A15111458222379012E5A4CE98687096803885C61271D5AFD89519658 A41C82697C6BA5B10F14BD90B081EC913FA50 |
| 214 | CEBD88224DA45D46BA82BD9837046723663221 83AD0C35AB1ADC35F6A45C0F3F552E7 E41652E148C84F897C62BE166E951025A420656 |
| 215 | C861B6A540EBC5A53A881B97A9D024A0D56458BCFA0681342D1F5F09A4B04AE226835 9FC601CF4FFCC57CC843E23F2989685D145A288 |
| 216 | 48397A1F64B4E0AA218D63AB667CB0F07FBB1A3B9D3104E1DB4AD4F540014A3639E93 327B04CA139AD955863A27F6911B8654740A46A |
| 217 | 01A106C164320E6B89FD499E769F2A5965D1654063BE9C8193374E299C97C21BA5DAFD 7782684AC704BC541955D65D1A3E1588029F9A |
| 218 | 30C9A0784B096D721E601960F95B66EF4BC71BA80767E37348AE96C6C27D5EC00AE626 6D7063FC3239A938E38BCE67E6D7CD681A2460 |
| 219 | D7E5CD99048A0D80EB7644448B4070A56E45D647BD6020D36EB874778C894AD532C2E 73CE099D00D8E18C0874617571B36F8FC833843 |
| 220 | A3454AF345F32CA25A3D1AE01BE0B8594F44994A6887C4E63BC2D870F7BFADAF8B1F 6AA017005589A820410CA0D7555BD45D35E4468F |
| 221 | 4B451203F1961401620D6AADCA370146B49D932FBC993E4567A6E84BA9314D2E325F28 459E8D540A5DB755F5256048C7CE04786167A4 |
| 222 | 6E22323AA57D6F184B5211C072A763BA35855C16A435A07CBDADD801ED475EB831DB 72AF622B3394D1771C83E19EA25548B9068618080 |
| 223 | 01772415575609C59B4CDCC02DA4C59A5E9C1D17E66431ED465AA29C1CBF1BF100B5 A7D7D18803D1FA27A389069C05022D662B4519BB |
| 224 | C91C44283C8A4286372FDE533826B34D507C236867D06ACD342E9F6E717A624383EA824 20EE7545A6002CE6DB73514FD6A07DEF13219 |
| 225 | 1C7C8FB9392A2F27181682912725911780D0395CA2A95F651647099FBBD5AD7B050E820 7680A6672DEEDC01F1A210AA3A5118E2D0671 |
| 226 | 209B0238A277460BB9E8E79C829584E4D026CD0CF2FAA9CABFBE8C66CFD3859BD8BC 429A00A10D77762074A60A85C2BC95EBEF2184DC |
| 227 | 1ABD5AAEEACE98490015DE01A88887BD9632D1EA2E7AFC512421A3B0F3843E6219B5 BAB40C589A98BD6D1F1594C7681564B8795E8E45 |
| 228 | 413952CD5AC1F9F943D6580CC09CC3BD66DE04BCB5A51C19A4762006D27C3EA6C20B 2E22743A3AD89D5342FF314D9E68244E8E3E9562 |
| 229 | A9F57566CDFB57302590F869830A6A1C1A88CE8566313A37601308972F240313A5047CA 3B74B60C06E171FD415C12CD493241BA6784D |
| 230 | 3E03C0B8054FD56D8DF2D125A0CEF134520310B6EFB9B567E2EF0188358DE714E9C103 54AF287889C95CE84610363F4D76303BF92578 |
| 231 | A642D79A550129361BA97589993D8481DA73C6CA9CB020093668B3193ACA1F31260062 D0F95348EB49AF0233D491DAA235C67EA8D425 |
| 232 | E8BD43D65D667F98D87132170005A19E45BABB4D795551F2F6C89128C67D7B6815B4C1 85AB18500807A67A5E88062C886EC56FCE821D |
| 233 | 74DB7113A78A60EF55F3D59CA15E0601153F66A5C4D40A44E5180366A22BB40204EF1F 4B0C125FDA5D30848B8472D7D5E7234B953863 |
| 234 | E336FCFA8A6EA3F64F3B4C82218A7891344691 03B14B285861641B06073096D4F6047CD BB509293E9F4A1EA960BC100DD88A915E14D1 |
| 235 | C53A8710B92E9155FCD9143E15B991BE122A275080EB434199 72A6C4BC999DE0420BE8 C3DCE2FD2D2042121A6B8029313CF66D2271C5 |
| 236 | E575D893724F312073E4C743A6847F68A0632FE8E69163311D2FCC7F298CB19D1AE95B5 8BB963221015BB63A085CD49069FE72A30488 |
| 237 | F3A8ACD8865486B8E13C90F1EE8972491255A54003BC5FF8F31ECC2F43C89E2503508D A4FEB11A80DA185B2EE45D9068592070476EEE |

TABLE 4-continued

| Index | Midamble Sequence |
|---|---|
| 238 | 8D4E50285B6F9CCCE3549DD82A4DA2E1CDB3007876F61F40C4E500453CE993F339A2D C486A63205129B7A9CBCED644948C65D6C04BB5 |
| 239 | 5174ACF04747823E014B48888F2354CBB38612F84143936B8E93C81B80867784275C97253 3A76D262FA3B6B41456632824DAC0CA43E8 |
| 240 | 85B8D3D108294AB65D321A6AD69916CC814CA9E4D701EE2091AACD2797C80F298267B 093FA2140C7197C099BD3F435B09C978CAAA0EA |
| 241 | 6A0A262BE0F0607690AF1453307DCEA9562ABD7E71659240CA49D83D448E785F706205 DDC4899435DFCD0AB878B0108E16BF4686DB82 |
| 241 | 731D232E28F2C80FD46B4420F2A77230933028B5376C99169284C0C2C48B3C206D97997 FF6E01538518272128F4F653D683171A9EB6 |
| 243 | 3D16D7C53D295CFB610194E183818BD51381F278414525F336F0698CFB152B6449F01D2C A48044A12B632D99C1EE868970B8129C7DC4 |
| 244 | 1511FC08E98D824CB2018B1F88C2A9857FACF676C82ACF198AF23A7D0610620DCAF455 9DAA968D274D0D91B9308A869DAA45A71779E8 |
| 245 | F6AEBD67F29C07B66E40E0104C5191C56D70A4A0EED6EC031F0715819D90D635819494 B2FF11207B86C03D5442A272FD59C4F26C2D0B |
| 246 | 268BDC94A3210F5E6C12EB2C8B0A2B4F60B4AF356AF2742B3A106A18424DD60F08C03 F3EE8210AB27B3BB4F7A554261D0262CA16469E |
| 247 | C37E5088488087B49994198C5B1FB62AE1197272EB70B659315421D0D81FA7116E294D83 32D0937CAEE7AF49839122C15B1855D0C2C0 |
| 248 | 41D0122EB10E7A5CAC68B5B1EB95268EDAE8158AC824521449DEE37E207313320B9FB 71545208DBD140E25499E0EA6E3D5FF3D00CE38248 |
| 249 | D25D6C0382EF5D3763A222239A9E7F266410F4A6C3E9310A0F599818A1BA93A94B0AF4 44360C629B78F8602AFB067D62F9CA8468CF21 |
| 250 | 405C01F0443442F575279687C8C695F32609CFA2A3B22C655BD3D43426276855227B951E 9B3289B32F0E4DAD34801BF2902EF843D703 |
| 251 | 4DA53741989C67B2C8A7B54A013A2A98205D2F8D1E55E5EAE5D18075385B4E49AB690 FB01A1F38C92BCA404AFEA6023640B166F20EEA |
| 252 | CF49431807F94383C226AABE6A5D9959D2382597F5040A4D5F27186C0D461680E28D6B A5751F241C444F0F4E6753CE69B56B6ED8601B |
| 253 | 12812891F9B67A4787254E968CAF6C5C115F80C98257AF6434F2CED953824C56F691A518 FA9E12A020DC61398E89EDC3E153680577B9 |
| 254 | 878C3791202611D96FFC835020B63F740F168C6F5C6462D0DC56BC4C690FBA95AFB82E1 EC95017A68205D80FC6578B04C5624B32AD2F |
| 255 | A1EB0A5C93CF98114B819234B35B2E0FA4C1CBCF1A777000837444B5C84AD14E0ACFE D016F905012A1E0722D7BB5504F30DC4026F68F |
| 256 | EE913A4989A39E91C59149002CBC4FEE1AF62501C6201CF83482282DD45216F59AE1FC 967912C2F32A5D8A5B0601272A258A17A9E478 |
| 257 | 0BEB7967121F9F804114C02E08A8C6A7EE12DD0042E67911BE5719B01C9DA30C5B56F3 20C2BAA95C378A0368E4AFA148656B3BE145CC |
| 258 | 85E39FE0CE3D804C712A6520BA6A436BE51403679CAAC372959C339405124337EEC96F 5EF5750E15382540747B02C0CCCF28D3E26460 |
| 259 | AFDC81BD65C015246457B0885B5CA1469AC1C2A437B0BF9D1642A2DF23406E72C688F 5A071BD5A21A08E19818C6217003534CD3F166A |
| 260 | A8DAE14DE1C57A62799F70AE5564A42846F440454FF0CBE0C6487EE4BB65F0C4810037 6C282124F9332EC6409FCF98B670360BE878F6 |
| 261 | AF17E7FD28C24BE0C0D7602CE58A40A482FA9B157D239919243C269F0C1EDC288557E BF26E9025B271D7E8C0072E98DAE60272C29880 |
| 262 | F47C2B394972D853B84F43A2129520931216F048F9CE4917AEFE580181412A38F7D75C44 8B812881E79093F554C7E0CEE964C9BDE24F |
| 263 | C0CA2EB86348E22164349A7655A9C489C870698943F836EA2F3B5BB0D908B5B3955D70 05449D23806EB904D199CC625116B3E74DC388 |
| 264 | C4587467EA47D9C9D0188F4C24FBB788F7CD7499415A73A043324BC4B0A7F07ED1874 DB43A2586934628A4168FCFB803AB483171EEB0 |
| 265 | 2A06FE308274FD8F9E992313026A34C690F8D16CCD74D1B1BF3CA1447F314B6047FDB0 30E32AD471B8248AD40872AAF56412D07C1F5A |
| 266 | 05B7204429BC6D1AD90837DE0295A64B40848A1CCD4C3BD4F25CB56443C9D6FC79898 1564ECEFAF81B96695F988654E090D052316E12 |
| 267 | D0B8ACF0A4084AB2F40BAD309DE021AFD8B15E6018208391EF3728C506233D70105EA E59D79C65048311BF03A419C3E719F88F896BEC |
| 268 | 61159372889AD0CAE6A9A079A307F6DF9CA82E21365830D98A5600A0887B848A82857E A34EE0734DC2992C78D5B3953EE26E6E8281ED |
| 269 | 9ACFF79872BA81185945704D1A78921DF60C59E71C9F47AB0426CA6ED6C74A18C1363E 01C529EC092B50F708AB50B176171E0E6753D5 |
| 270 | E075BDE612EA8B0681028B38B70D3D9391419865853C567A0BE819F0FC40A8B558D319 66366B18968F8A3A6AC37326CE93E65CAEA1A0 |
| 271 | D9A6D6602351F4D18CE319EF857CFB4C61C0DC14A91013B36B30B4911AC4AB895CDE 8F177A0253BE3DB4549C350F404BA27E89282185 |
| 272 | 4A3897F6B01CB62A219CFE238626B242F1B13AF3CF84CDC8990AF122068BD1AFF5675 C83034E7E0463909056EA484E5439DB5CD924E1 |
| 273 | 7522C107B184D8062FBD2659BA6B39174E9210AA9A4566CF84FECD0E92A12730F50F9F B8C13F541C90D60BCE49854A5C05136A47D5D3 |
| 274 | CB5B586D2603FD374440C748801711039FBA93EE092231EC0D682B7B9D24DB1594D4AC 39F48FC9811E7E0480E3719F15347333848D71 |
| 275 | 4D0D610E8663FDF814EE80F481D848B9D7C378526D068B722879C786F8A559B0E609063 36657D6BA91596D8542B6B4B57C022EC99821 |
| 276 | 2C1E704ED7D0E27281A6B35A611CBE62C320F9850C64ED21C5DF9E4D3EBF9A85720A 8802AA0EC06FB11BF26C45294EB752450C297A4 |

TABLE 4-continued

| Index | Midamble Sequence |
|---|---|
| 277 | F8AB19980B021CC905E9D110DF8E0A9E97F637449703FD4E1D1D7E3B20C5203D4416F23F82C45C21F9D6878584848AC9F7C5A429EBB8 |
| 278 | 962673CB232166F598E01AD2E612A2CF7E914E10D5F4C3B513560F03A22C8755E56FB01402680CF04BB05194C5CE0B19E1CACAEDE684 |
| 279 | A6928494484C146C55F4AC9D69082DD8EA1461D2257E6DCFFA74D20382755458141D4A9BDAC4437CC125C66FDC247CBE03055E3C256 |
| 280 | B0E551A9527A0F96335DA6A24C1E6097930FE62F30707940B59DA738EA71D3B8BC188BA69A879D9D53191B9D6868023353F4092B600FD |
| 281 | C3608714D9E1DEDD68276C6C521E34EE3695807B5B80B3F314C2913490A21FB608F6B442993480A20ADCAECFEDF6C90AEAA0DB5B18070 |
| 282 | 163A008C7CCEF9C8CE4149BEB4AD8536C589B3E18E2ABE680EA820035C83EC44584C22759EBD8CC35EA0A36689597502507EC7A1BAEC |
| 283 | 230943173D39A0852AA81E806719F16617C061F308EAAE4BB72DE26BA74D402D0022424382D1E1E7D91AEA91CF8A9BB5BD69D1296326 |
| 284 | 13DAFC76D234E469E6286B2A2881A9396F473422F402AAEDC31FC68E0AE6E40995AFD3A6D40B1B021DB4DD7389AB3469848493C38099 |
| 285 | 717E09A2012B858A40B33096DAF08465ABBD378F1B52113F8AB659DEEA1A1730565D0BD70DC5BCB6494327200B63D01F60794541D456E |
| 286 | 24500FA09506335449D5D6BC2770A56E2F38A17A63A6D906F7CB80BE2F01E24975827271183BE30B2D57DC91280956319E26C427833B |
| 287 | 515C4B29DB685113A17F7BAE0305883860CACDCCFE27D48C480D6152570167384152CD8102F7B0A0683B56ED91BCDCAFB05507F926BE |
| 288 | 53F91235208815F501F634D5D889AD60DC3F229DCBD52BA10D8525D2D96C0CB7571520C3BA0B8F494F18081980C937E6EB11B360B643 |
| 289 | 3A797679C0A5FC088BD27A9A66E5A2F47C8DAA2401AEBC17FC30C0F64E8A5CEC59A4267084C1FFAF08E2F0C1AD7C2B5C0ECF02B0E926 |
| 290 | B0D1F40E4510758D9D499AACBF2C98CFA9D1CEB0582524930054E3C45B03AB3FB9591C646F978ECA100DD60C3DD10C345D2110929B1C |
| 291 | C5AF0E47BCC14813116F282B84232F033AD5847C015792D472DFE82F9B12A1B0E24C1B13C815F7CE467234C7E20C8785DA071B2A40A |
| 292 | 8C7F4093FA90D1303F94C288C2078A1B33D5A736E518B5BB246207F5199E9C3C1B848001567FCAAD39E28D2623865AAEA6EEA076B3D5 |
| 293 | 6ACCAA961A6302CB5E4D9A29419A75A4C0A3CF06E89119D5509BCD3FD1E14864C4920E58090856B4D51478E8E43FD225FDFE954D63C9 |
| 294 | DAB2985C8C281E5AF315EB4E7B4CB508DCAA99B507BD84C378402B42717DE416A236262D10B0BC30676D87CD7BC809D4C7203610D952 |
| 295 | 251EC40627AA0AC08E04301723EAFF1883D39DB24FF22FB40FA7937247FA7083839F2511185EE22D4E7830E62ACD9064F5300912A97E9 |
| 296 | 1EDF934F4C277450B0329503D2267086D97A5C097543060E368D8430A1E2AC805DAD4463A4C66B75BA35083B83FCC728534084DBC3CA |
| 297 | EA0755C25B519608581D7344D561472C3FEB238E17E88D0E3A1018441A649526C4D745A4DBDD269031FED73AC44B34C6A1910F4B7131 |
| 298 | 822D9B64D9BB21B2AE3EFBAE28560496F05747AB2050289A8842EC3321B2138900397EE6F18E0CB6FBF4201E172F8ED03B6A1741C512 |
| 299 | C4D3A9C25243441290DEA279D98486D014E836673AAA4E9FA440F757A39EBD39D97843187CD12FD12C94F8A006A0740869B0332B5EE1 |
| 300 | 43D9A2C33FC81001202BE25A06B827279DB15583D6F34FD0E4C42B3E78B1E43576353C2057F3B518CDE1E4EEAF1126B58450A83AAD02 |
| 301 | 12DCEF97031D98C5020A4EBE6635A517FED4D763E833E4790E9460590524DE575A2464B05CBAE0ACCC3C08E35969496999103E2FB3DC |
| 302 | 255B69919D72817749341C0BC2874457F558C9792023CDD5CAFAA452FADAF348D87A4D16337F1186EE8F7A61964B8C588262EEE0C62B |
| 303 | 153BAD20CF932FF32FC84615C0178794C99A1111FB4144094FCB06F00766759000738F19B9AA978050B8876254E2CBD0D7909A866F4E |
| 304 | E1B5DE09CB56671693621F1339DD3C070D06062F9860E2C08D3327506DA512CC12F390DF23487ACAA79B3616E4FE816116849B1ACC27 |
| 305 | E2EBED1CD88CCAE2507DC3174654597DA48C1A143025A89972F2C4AC6F609A254502C810CF330640AF51A9F87D75595A144F9692D97B |
| 306 | B2060E19CB4895A080E03539CAAE3FBA7AC668CDB41856B1B941BBACC5902AC89D8AE8564AA136A13DFCC76C15202408A0B4943CA7F2 |
| 307 | E40E5D013456D40F0482AA145ECD3470FCF02198EDE18D3CD4FCFD9A04652ACB3BC4AD28A5253F4B196643AE30DD530639519FA75403 |
| 308 | 6BEFAA07E64B582DD061E949CF04E33280A1018157E21B18C113FF819596D6EF2F473F32B10F8A412550F3901E12C77B264DCC39E891 |
| 309 | 02BF97DA21F56062B2A31CE044C63F198738CFD291845E38C17D9704EB2630D0C1CABFAD3A0C13FA2E7BA3C057CF12874326D20D1325 |
| 310 | C45E903D36B153D1E6D8760C9053FE8EDA41F22E2470259B0084B4B392071110D6650A3D241E5F100359341AE3FB4B6376DC29F8A24A |
| 311 | 62CA1A99AF20B3B6C7FA082904CE8E388E425E02DA50D1B1DA57D892CA6A0DF5A37F6CD036D87C70179944624AF8F2A7030844080A05 |
| 312 | EA344B012B1488221F6DA3E84DEC8C38A814CB95C53C3C3818A74DAA029CB1E2CB2FA7F28C99451A7AF8832804C49301137539C603EF |
| 313 | C5A6653E84B5D8EFC42618C4867E0BE102FBA20AC12619D0EC4AF61652DFAE73E55C8AB4F38F4770AA3D2EB28C71AF12060271C040A |
| 314 | 5C0B1D1CC61654598C515B82109F007E48936DBDB0BC5C0A57DF58AE0CC7109264D49485D2D5B109C8EFA80BDAB5C9B613687C8F2412 |
| 315 | F9AA044EC003C23CE5E8ABA042CB5EA62ED89DAE192D5DA4A44194EAC76A702D59508E3368CE8C77486B5002E13BF077A520F0F7D018 |

TABLE 4-continued

| Index | Midamble Sequence |
|---|---|
| 316 | E143A83C0DD197610424675F064BC9BAD0AB450A8EF17399DD85253D10ACD1E47D87D5520F810A57A0E140F5D58B29388A0CD7558C35 |
| 317 | CCE07EA31BBF394D8139454389D6C6D949B64E2576501B00ED6E4695F18D3A13906AA9C50F21EB4129F806199D22CA7ADC38C43A3BD6 |
| 318 | D9CD3AE00DAC16209EA57CBC40D13CE2B6C6AC2123D369C364C9DD2819690D3B446911C2571A6A41C33C4451E50768A3F8BADB85B62B |
| 319 | 44105325A1861B85D61D610923CBD4CFF940ED2EFF3BBE35CD0807E0E25F7E6E4361ED3F1A30AE4E0AD1981A9662A3FE04BA0F161909 |
| 320 | 631125764AA246D7793AABD1AD0C227FC8907FC4B06F0747A08E776AEBBCFA9140C6009E4CF1497F9FA91B806318F9328092516AA4B7 |
| 321 | 4261BF414BD0734CECF956135C2831090947C3BE3C4A44BDF0AE11E25339BB2EDA9176D0A14F4EBD8A4BC8CA8B2321C7E9A9C722E31 |
| 322 | 9358407B7A37B39646CB76131CE7513C5B884107098A466444EC7530D5C4A43F9FEFCF4787606429BC495180681AF1AC282BA6095F10 |
| 323 | 7E0A6B4F2265D6ACE537A68F01380A7FE1C38A5BFB37056834304290944E41D124D40B95C907B72BCA5A9F73E333476CAB9A519361D1C |
| 324 | A941946D11476BB09388A630A4CD7808C2CE49FB3707D5B36912DC5BD94829E83F407B84C7A15D79308026DB506309EAA6C1D8999AD0 |
| 325 | E1E617759581520A48A4CF4224148B9B66E5A23FE201ECCD02D24917E13743654922D997C610AA31C672C5F0C11442207D4C7FBD666B |
| 326 | C96297500FE5CF902B7435AEC03F02F12A927355A114C68E731D71CC6C359E52C7972895A9999069EA3A058390CFA1ADF56061F26460 |
| 327 | 17CDC1D8D4AA9E72EB81D2D3A3812961BEC88252A6A138A69370E7A37FF7555978620202E136820E260FE72B162324BC1D7035878099 |
| 328 | 3C5CB4B31657509CEAEDC96C4E4BC2BE820801D7942A8267119AC4144321C0286E7A01CC2CAD369C48871D4CF32FF03B6680BE4DE4D6 |
| 329 | E9A57594F6ADA75246397810BA53E4548E45794AE06809360E13A6FD896C1C2846B15113C5A74C72EB8E6C1E8D01FA8D7547C6138CDE |
| 330 | CF173ABFCC008CC61F748C7F04145C48FF02D8B09C4B1340DA59C225C25985AD30C33BAA8E4CD6A647C0AB529AE5DC30DB8A61C1972A |
| 331 | 1271C69F129E3C4B15B0452CE23CA187D265408B78D5D0A7D534721142759259C5EDBF9ED5A8D60971009EDE808CC5E88091E5615A9A |
| 332 | D5AAFBAB488238962DE09ED54550A322070B426ADF784744B1B7E2860C6DED13B9331EEEEF64235767420C5A5D41BA419004136A9393 |
| 333 | D4FBC8091BA095EB73DE12BEC15BD800676E7971365863922FA050C8B33D22D03B4A3DCFCD18009813A24C3A5D881E75F62DDD6EA520 |
| 334 | 8E1169D4C050436E353C2ED896D166F5C23E8A264303366AED46F38CF216562F4D9FD10B552D10F290A453EF89020C7747699E432289 |
| 335 | F018D4052F4574337CBEAC3BE48F0F1D66EB1A59C9B920AF90E029A1731966F2E0FCB521E6D7A3276770456D1718D18A4092990C81CF |
| 336 | 32F3CE2FEE14C433043F0C943420F5812EB996C79300CC51EAA63E8FB0A934757D48881DCA0C4DD825ABD078BFAE281182D00F6B5FC9 |
| 337 | 0162F48798C5292C88842FB03B22E7FA50B0C2E34D0B58A3868F9618658528E7A59FF7A6F0707589B4C296CF2761C990414C36077686 |
| 338 | 3BCB93450001BEDDE401AC7321D0C26075B0B299F1CE6E4DFC6F0C450B2008986A1A1FF55834316C5CC1D2B5CA15250A333331E5F43F |
| 339 | A3EA5F7AB16207CD8615A6260D2E1CFB88D39040B7657102CAB437ED04038210F05CDD69A9D726DF4C1C6237395D17E13F047641A888 |
| 340 | A86075BDD5099ABFFB932655B22262080199CF4F058FC45E1087E64260FE4CBE5328AECC4CFE479AF04FADACBC50D6C48366B4A4C481 |
| 341 | 155E961329C36B45E5D6C0CBFC031108D85CE18A6E4A58A392F2E431F0922F15103A5FE2274A6F369B0E714F425D630C390E583946E6 |
| 342 | C62985C663223D2FDFA20120A02EED4567CBE131A3B3877B53524B03176F4099710C07522B146D0F5603759BD42729EDF16DAED56004 |
| 343 | D42CAF0E56FB351E2E50719978E0240A2417F29A1E1BD59492AC5046546297291ECA7224E42F1960CF7E57495F92550CC3FA87412B84 |
| 344 | 08DA1CDD539476D2CB00303874DC9500A9F814B2B4BB783DC3CB033E4D7CB05956AF4057E775406718FEE56AB504685608268BD31C62 |
| 345 | 90E8AA855771C3B767A4A0A65FA687629203BAA48AACAC51F27395B38B7A0DC9C82DD256000835EE2314FA3FBEEC8252C84A724C9F83 |
| 346 | EB006D95E2F6B5C06918C52672314CB2AAA9FC0BB112829EC63E18C2AC0E29560E6FE04411D5D408ECC2EDC92E78BC072CC1DD37E692 |
| 347 | 433D32F098E1AAFB80920382D69B7E18FB8279C812EC91BEC93EB04EC492821C9B070762D48678036B1DE964A125DB7A9D493C7BDEC5 |
| 348 | 766C64C0165F5A4EDCB3C5C0281B879BC4E9DC508E75A72A13C3BDD2387D29D527E51C8DC23ED9D629028305BC0AA994E47A4BF0183 |
| 349 | 09CD06588BFC16B1FD6E9AB9F8AA0FE32DADE60A432079A34A59146FA101CA0C4D16C9DDA123A0E397E409554FBC6AF5C945C812B47F |
| 350 | A01ED27CA283A9C1C762146E10C7FBAF5A08990B11269A28B6A99297FDC0523678FCB090D929690784B8E847E5686329645E8B533AF8 |
| 351 | A227B61512D358E449CC86164F7A74A6FA473E6A84B70A64AAB27A9FA101C281F94FE4C14DA779936186B9F000F423980B2CC3CD2DF4 |
| 352 | 2B6D1382C9B1B2B0C19FB5F42712985DBC1141B0B430B5BC6AAD54DC8487928C893F105C0E3B99A9F70096DBB8D0A32B07D40C224768 |
| 353 | 0A79F69CBC2E3E382FA72CE55A4B40619844055CA01DA8749073E2248FCA8CAFDBCC316AE0FA93D417020814159FE8E7291C77A7E4B80 |
| 354 | 72414E2A6CE1846E943684262D3CCD122E54D425F7B4BAFF0078720082612172CDCE432FF9F3784FB2C60875F85576A2FB5E6B068482 |

TABLE 4-continued

| Index | Midamble Sequence |
|---|---|
| 355 | 58612501FEDC7A722D96E538469CCC0C52DB31DA5291113792EF58B7AE83AA917E8D41395C4C34F18C30FB860CF139B56100F664649 |
| 356 | 55441DF8E1471747A3D00426417D169664E3AE1DB3FD85508896953970DBE831B591690F4771A966A61DD20502C732AC04AEE19DB8E2 |
| 357 | 20987F3A0FA524223BC09A2E8D5E7872666B0B07A948425CEB0C3F06773B75664BB9F503257C1598D820D2180EA0A80D21704D968F7A |
| 358 | EC69741329715FA709A050261ED591716433B0D2102D521E161F74A70A5670BBF9A8801937781AD14470F9899CDB6A851E892575BD6B |
| 359 | 026AE6951D11E4647CD6267F88998645B4ECEB606F6BB1D08210846AEFC03FEB60E71A7579302E403018E7A05824DA6C10568E470C7F |
| 360 | 48D21311FDD7003514AA468125BEDD00FEC7C518093079C93BEA2364881054DDD263351EF9C7F5BAB9DA5318C7892495134234230F5 |
| 361 | 971EC85D6D32CB1B5243DDFD6228051836F602A0129020DB79155F15DAB709615F1750D8D0462C2226E8C641C2C50D4AE273E83F12E8 |
| 362 | C4CBB587FE0D80D716054130574506D70310E0B2D2F88F6CE645B232C18A4A384491B9DFE3534426E0E68A405267CB9A016F33F9E03B |
| 363 | A243CFA0855FEBAB82196FAA48609B9C2EE12C4262816 92BD27FEF40B8E6C25F491947C128C22205D28796B1DB41E2BA33CEE99D3509 |
| 364 | 7C12EF671C6EFA5DC2DC494858B4EC3CE3ECD0220E1344CAC05165DEA4C332E06BC6448A0907A7217CAACD0921C3A91B90F333BDE561 |
| 365 | 1B8F1591CC25423885B00C0CCCB7D40856C8C36B889932FFEDDAF1758538528AF9D33906F524964FE0E6E718521C9B3C542900BE93F4 |
| 366 | FF18C4C34AE24281730E45B86C6B80A9DFF8E48C6007C5B6995337B84827F2A9CA504F6687BDD73712D6E040FFD0134595024A387146 |
| 367 | B10A0161F99CA8A9644902A7E4A06322CF58EF13FCA528C307565B18FF437F375A5337628A58B4A0F523493CE0915033CE326786641A |
| 368 | F13AC92B818E02C3BAD5126851DC04816A8E42E06617F9507368ADE1F7163B344A40A9151E86FFB900060DC6419B80A55377A8293F32 |
| 369 | 3E1970A01BAB6C773D8883C6C015741D9FC15AE319F18400248A45E44B155E66181719CC1C8838F480E63DBBEBCE3C71ACBF52458212 |
| 370 | 9DD04E76B5486B1B793C0E08DD69138ED22A656A3E927CE1CC0C86F5FA181C0A7A1A20A34433A4050524DD3303F6FF227C13C10A9E11 |
| 371 | 5908724117084ED472714AC0142ABFA57B0D5A933295532F38F2A5AF342B8C07ADB74540EF2659983091C6924D03C91E635DDD8D209E |
| 372 | 13377D471CA6E853365DA9E05CA7B1214E302B97E103E1A1105CC71103E9F7AC0670A4B3D1F072D3C14F50D153398467B27A546A9280 |
| 373 | E599AB821CCA0A95F102DE56C51190CAF684B4D45B88BAA13810774F01811BEEB10229D0A4FD3306C6DFE01687EB9BE3CBD663854EC6 |
| 374 | 6B29C528D7B008E3D9A63B75C05844D9D6D7F0F225A1D45AED2221DA0C7CB212C574781B5910C58F1C14B8DDD74080D556C49832D399 |
| 375 | 604C053E428B2CD6D26C73B5085DF8703D5182ADCD419BA14E4CEEC486FBAAA4CE1D485B35E73500526A87B5085351BA0B64062C73C2 |
| 376 | 42193219D303394CA99C7AF88354C3B29724EA10566BFBBACA5096C7C8B82232CF6729F65C1757240278233A454D81DC403137970AF4 |
| 377 | F5695D8E42F2AC1A4BA6172925B9F632AB073FF0A5C1384204825046E8AE6063670B0E04AF4608348FC1EE8DF77E843534F40BBE17A6 |
| 378 | 2C003443E520E5172A6FE1A0142539D118173BAADD56389BD8B599361083CF88B6E24371DF50D043790ACCFE3AC091B800E72FA923 |
| 379 | 134D028B50C180BFD9F9070472C72E768DB6F61F09F4885FD886C725183262A0C65F90EDDAB6707944E1231A7159882FFB3851731044 |
| 380 | 0A6174B59752638CC5D1B0B6B4D7347AA0A163BB023FB253B51361AEB5BED9F4B3041A21840028F771D025EE0ADA4665E9197229B220 |
| 381 | 4A90A11D0CE3A68C6F8C9D47706739A19785D5972714B37E0174DA9D06900DE48F263EB00FC88751C699B55B08EBCED2F4BCAA240A4 |
| 382 | 461BD8CA0F65865A5D6A5B3E02F08E81EA9664267B4CE8EF8080B0429E0A5854E195A97C57828DE30ECF7DDC3F79B80E44143320CBE9 |
| 383 | 49512EF7702F652F75D39EEB358DB44A1A0851850A540652BD0179B745EC8623311E9E6B50D763963CAB45CEE4403BE7B2A664E34050 |
| 384 | 437E008EA9786F0C2E74C445925B91EE19F46B4F03C3C8C4C05066DB31B99BED432048E8F743992592A05157C527E2091D169D08D119 |
| 385 | 223BB6765D5FC196078B50B04A3A15E8B77FE2184EC16D366D4D807ACDFBDCD9E21AAB6848628F292856C810C164F19E21DE9C346189 |
| 386 | 3B56B4F49609875413E483A24889443936303B1F8629F6DE678AD22FF4DA0952188A2B5981A7BFB8648A0CF10E8468F430D97C0691D1 |
| 387 | 40AD743A09565383E83E81E18484A04D909C489CA687A2AE5EDD3734C64C1356BC35EC28F119A9D4A0C3CBC12CF4F95C44E886AB8BC8 |
| 388 | 530E2820639FBA1E3049AC74DBB6011666A67847EDB54F16B9C0E32A6578629DED1667203FD85AD564175D8CC554AD662A632604B20F |
| 389 | 47635554A0A1C74982A916211 10BF8BB9EB7FE45390B856C3D7C17951E0B8199BB41D1EA1269C055BBBB1D64267CA2400C7985BD25DE |
| 390 | D0103D4040870746B466BC4D52A3B3C01D9811E3F56D67886D5F03643EB79F4C000C5ADA4CBD520CE5FAC92240CA2CC2324FB488C632 |
| 391 | 97F711D1A84E44C30FBE53CDCAA6C92D1AABB1B206956F0070BD190634893027E5A0F8A74C13646844ADD6BFF701C6DB2AD8A14C6748 |
| 392 | 644E8A07293BFD18279D82FF919A44C0F3024147C69C899847B4FF55843984168F3BD13D8DADD2E2C15B25456A8B5BC0516856E56326 |
| 393 | BEC178A4DD7AC38B334023D922B08A50E3CC49BBB8021B68B3E6FF029B04CC66FF28590BCA791F1759C2351897D414281C77A82DCCD |

TABLE 4-continued

| Index | Midamble Sequence |
|---|---|
| 394 | 6E566AC1F42EE86C0E4BCE923A518B195D11DA7DD81B4046B2E45265EC00FE714015B458430698FEF43594F25B9DAA38C6E367D35888 |
| 395 | B19AB807B790041C668ACEE2832824E25ECD1F40FAFEDD450ECFCCA759656C654233539C0011CE635A24CB9E3EABF7F70BA30C64892E |
| 396 | B88048D8674E5139B2610D2728D14A79384995EA8D6A21C17BEB595D82C32E582FBD4021DC3BCEB1F99AC5A93990D0430290C23F6AFC |
| 397 | B02D1F1FC3CFFD940527401E0B56E41914B728A0C5022116C5125E29A03143639F8BEF2A91498BFFCF823A63633B5C4E06B16253C433 |
| 398 | 084E2CB796059A3C9AA3190C5B1427A4CF70E1080CFDDD99B6BED55EA815B7CD51B5461B1101D07E014BED96ADAA660FA6604117625C |
| 399 | D5C65F633ECBE01D1E55AF456DA5261901A0DE90D8912128E0222965DCF8CC674882F48C0B64F84BDDC0280355B2C24A734C77F4AF30 |
| 400 | BCAE59A7E4EA1B697859A49995145D298DE83A3102730248DA4A2A3EC3403BC75846002D2F55BB024C119BB11E6CAFD81DC90DE4722E |
| 401 | 31A8C104C9E582E9D938E2C3805527050449CE7FA897E25A6ACA736980E74B0720D0B34A9BDD143E0147608649555ECBFC21322475A7 |
| 402 | DDB649FDF8991753DE170EA1F10B724080FD8AB31717586888CB851CBA05D23BCA877097EACD8EE1BC486C035EC6532DA82B14AE905C7 |
| 403 | D50A0AFE08A41889F2F9B5A4889096A6077088D78F6A77B2171DE4DCBB28D47158C3F42E04B123D661FCA00F201F73D7C15767440842 |
| 404 | CC05E91D5BC59004EA4BA300AE9F40E0CBF310A866DCF43088C2735384B8B1B4F5069FD1883F400E748B0754540D99BBA6E579B090C |
| 405 | 46D2498AE874E3CE8D81D322FB32B7D436A275F60636C519E16593ED962124C6AF6FB504FB7F001A4AEC04B51E81ACE3708D12E2BBCE |
| 406 | B844D6ED29723F51A506428FC262F81C1E7C9B15B046490397BF1678AE918CE62CEA921CB9E49407094F6E8C79D191982551013CC9C5 |
| 407 | ADB5C09EDBB55D44BB9E3D4492C44297527838B2D278861C2A937EC7FCB88282FA83343B10608A3F571B343071665274C801DA961B41E7 |
| 408 | B1083273EB5E1CA2D4392E1ACE2CD91D81E0AC4D0B239430C09A94397FBA07AE299E5B255478069058B1950707B19FE42A903B47913F1 |
| 409 | 41E036D092DA6B21CAA771DC65E01573343114CA1A662405E5EFA133CA810D7C688CEBCF0EC13DD6B51275AA3070F35CF3E6B62B4083 |
| 410 | 1809FD388D3A00A3CE0B2F74FBD4EE881A3FD701A5CC470903F3C4ABEA23B8276938F285D2C521223B76CA9FD2E005CC7B2A2C893615 |
| 411 | F8B7E5022B9449319D715604D18D8AC2C7D2D5FFF46E115DE4C017FBDBF31D4CB0F4B7E96120859E31DB8A590DA21D1D104E09CE6543 |
| 412 | E1A0ED88E0439CC393F68D7FB0B7D092C52D26AA4481997D97355A2AB0F563F230D35E1D4BB85E03306868C532AE262B97AA0105E659 |
| 413 | 2F3F5F00F540884658517E6E95CEDDE97C9A9C7054B85028E25A4A104B5456866A70F9E00129432B58DDF0E5C71F51E698983D759AB4 |
| 414 | D6196C345124A5CA3794A44AC52EBD407797AC014E25DE1215BA9EB487E29A480B71839C11BFB35AC4C24F982FECD04A9B043FE1B6D9E |
| 415 | CC4C6041B610899DBFB192681C99BA8170D636FC7EA9872C14A03F1F08492D06D861877141C2A6912E9E32CA17E229D43574F70D9F27 |
| 416 | D8AAC054C9221C0B41AA536D03F32627711FDBCB51289D092A4C6FC766869643D1E3A8406E57BCF726208855633B22E418D0055B4297 |
| 417 | 873E88C23E9F5F43EACA04EE5424959E56898D5ADDD0F60041648114D84D72722C444122CBB150E39DE7A26110E698EF56CE891085F7 |
| 418 | EF1144E11464B4F27CD17BEB5103128895934F13A816197D8132D46652FBD88498CA782A686254418B78393A0944EA650F16D9EEE07A |
| 419 | CF04A9370F7B0943B8088EA3E4C4066A258207EA4D5EC1D1CBF410037D9F472D509010C65A8B0ECED978A489569F08809C5CCE7FBE3D |
| 420 | 616C20B434C45A0F1EF288C8F4EE9B55B381888B60DBD7807CA60B8F374192407D0F16C1763566A810C557B1A720F24953AA6AE727A6 |
| 421 | F0620DE2ADBCC2490F2F499864E34FE4648E9DDC50C57431541D3E5C14AA8CDA78481D42194732FB555B47B8B81E625D961768638CCC |
| 422 | 859AA14E5940DACC7C6EEA9A304879DCB0032CA366047E92A8B3EC8B92D02C42B781C346DD8195BBEE1147C351B970D166B7563EB85B |
| 423 | A0506B1A10DAC72693589C072DBE59CBDB60D12D87ABEE07CD9310C48248C6A0D5C75C5B87F54199E264126B6A0C5445DC18B78B08AA |
| 424 | 361AB05BDE09C3935235252248F3DCEDE120937CCC6C6181DD0625298413B03051F13B7159FA46A89FEDB542986570C3DD352A1EEB12 |
| 425 | 19754B6118F92A7FD2206044F2EE7F3D78648F83D4078193C023A1FCF0B7044ABF08826670D62D8FBD6738CA374E6B40293667021359 |
| 426 | 2E884CB3DAE4609591C8E764A91E805EA9EF13842C3624D2AC2E5CAF200281CD120626252FD08EB9C5D9045B8F9B7E43BE2F3C8A8714 |
| 427 | 573A11DCCB67554FC4223F0272803826CE70B4E664041067C5F2A895468D8D33065B3EE1A5F050A5D53D90398FC4B85C5D522B24A130 |
| 428 | E8CC678ED72FFC80BAE3834CD44B5A23D8CCB868C82244F72E52D445248AADD2C8B54B61F00B828F78C8BF8E5A5A63DBD21840AB1B89 |
| 429 | C6D29633A31736405885DB0C0EAAF150617B88AA0B72C77244B0D889E13E855066DB194C3159FF6CC70009DFA4AC8ED11BF8284888F2 |
| 430 | 223F4695D6BC94B20AF3A1ADF1C16F67F824D0743522AB549B40E5A0C08CF04BCE918C53A5312C0C9A0C85EE82BB05D1F9EE8C3EF04D |
| 431 | 906CA1F17F5D8FFC0D7DEE35B8129A584CA56CCC3D2B03504342D08E65DDCE2C55E9818845DE467FBDC142C2C035D3C308C2B5B1933D |
| 432 | C2E7E4AB64AE217AE189AEF65C039A0341122CA11FFF991D00A7470C3ADAE1DC882729C29E0406074760629C18137D26B69E429555BCF |

TABLE 4-continued

| Index | Midamble Sequence |
|---|---|
| 433 | 9B92417441042F9C84AC0A66BDB82499061EB9E3F2788E9276A70DD60AD98C74C7B9273A0F3B913F54691C5F0097525223460524CDC2 |
| 434 | A4C01C123EE72D00C7E4B4872A46EA41124EE38A5EBCF6BF7CA0686C607ACF4CB11500FF51C891E1B920EE5D61E0FB6F946D18A46CC4 |
| 435 | 5BA012D34D0756BD8A882FA38D060893886BFEA3190B4BAA5F98376050FA01D67325052A04B89F981F9D862C75A6D6858333503D2FD |
| 436 | EC98946FEA8EA72CA366F2109169A40D14E45FA7C12CEED45820606A0439E6B8FC508CC2825260D91AC36B7692FA642AE0192E9AA736 |
| 437 | 9AB33BFF4D4ED6A9580C40CBC48E44443098D9CFAB5CD727518F388AB20D5B7AC4F329A752EF4C2B13E002AF6BF8A6259E69FB310CB2 |
| 438 | FC333E9204F244293505123A271C6812CDF3AEEB9CE9301A7C6B9DB4DA0F69465F58A663D435AC5D720EEA6A3D0BC40404547F287889 |
| 439 | B072302CDEFB881793911C1D91DB554A0541403B379571015A660F77A70592792076DF51E22304B13C70C1DB5AF893641E00450B829F |
| 440 | 33A39D542A08F850351E059443C18DDDD75268492A83FF1679B7760B723284664A01F2A18406B1B1B3E6FCEB04BBE025BC152DE6B1AA |
| 441 | F87D639082F9A68A23B94E1DEF58C0C756C218218A859883ADA9E63A5C96036049836C4262C825615F338E2F00AEC4D3D2BDDFD71210 |
| 442 | 416051FF4A1027CC190C3459AB87B1E68E70B164EAFB5C41A65D90F72575AA7C0CF6243F14A3446474794F4104469B8FD60F6372BE84 |
| 443 | E0E8822315680F15AB6B79ECA624F5AEE49369CA4B2449FF739E863AD03DFFDA0B60859D55104CC0E5AE1DEA97227488E96AC927E448 |
| 444 | F0EB336461EFF33EC5C9CA2933D32136492988A927BC80E903DC80E86AAC602A587CBBC3A54B16B93CC00BE9412950E0D60F87B7B3BB |
| 445 | 39446B5C4AD8DB889487CA2C2345C3112A0956E07EAF5317917753E43C22D85B472DB07371E15025E603A211639D7206AEA6491D5D03 |
| 446 | E3DC486CE0036248342E31F294150A8EEE2CFB1C24E47542AF7811EF85A18E101E800A17143234A3F3DACD4B1276B51AD901945BFDC9 |
| 447 | 5A2E2E3C60AE68CBDDD6154BFA823C1E722FD8982838940F614F9489730CE6E8288871B7A061B102C369CB2BD25F68C4B37D0F9BEA1C |
| 448 | 534029D83956EDAB46BF5FE29E7B791217A789C07643E6F000C50C54EDF2B48EE206009BCDDD989CD2688582541C8710DEA2F5453CB3 |
| 449 | 41945595BD9CAC4DBD481F31018E2CCBEA2B8CDCB22D17BC40CB86C43B39D70FE5800BF4A8C819A44246C61E66313430CDD1EB9FB617 |
| 450 | AC5A7A5AF11E258633D0D8DA18C2E9138EF1F42DD7CD81762A40A8846F5D87132C0016793214B2260EBECAF0F38D59C0AD08613DB15D |
| 451 | AC53C3CD4497AD2FE2B3105D548BB78713F46881C4B886B9721045299C0E5287F5092452899C0B48058361269BA60B0DBE43F96D5B72 |
| 452 | 2CC07D58179AAD118D66EC41E1C113D9F79402C52E3AF27D8A4A39D9AA674626B02A01A5445EFF5B24FDA0E0A57A302BC424DF08019C |
| 453 | 3F7CA882E05D39C767B18F95C6F0B065F40CAB1072BC40496878A4F2CCBFA6EA216A32A55D2100C10DF41ED4AE511A6469B80F17BD64 |
| 454 | 67031ABE9494C624AA7E9883EB7391200AE145FB813851F3D72A616044B0A607E62D3F242017F64D44557C4959267E816F32F52DA6DA |
| 455 | 8B89FB1EFDF89674B812F99C741433ACF85231A0D6440CC424321070846CEAE7000BB3B4A7F42FCD18FC46E08C322D3EC8A1EE0A1A9A |
| 456 | 72D1A861C67269BBB0DA1D6343E218CA34FA70070B2E962139DCA0DE180E20E23CB4EC2594B261820AC70FF92F77743A88F9500EB7C8 |
| 457 | F578950E7AD59665A6146034C1AC64D5B0AC102630B107F9B8E46D1EA53226FEDA0332AD2941345A421BF55BA9DDC0446C01C51EC7A5 |
| 458 | B81A1D1E5179846D447B6B4F00AF0E1102032BE34D376020699B76CC2E8C6A68A446DB559BABC71A96540A643BB24C61AF57923CA291 |
| 459 | E28C369ADC496D6A9ACDA94726C436672E04212DA2A5166ACC816743269E5C15F9D908761E32B92D93C4EE92055624D124C8C787991A |
| 460 | E681613987201403282ABFBD34DD81894F7FAC9152FEAA2E9962727BF0287BC27A6845CA9EE81DB63F454AC30C655F19D14501D488E9 |
| 461 | B614540C498F13382ED1F7D3BA927D0F7530CF202CBA8908C3954B1B524C54CC808CDCE4F86E12E2C5725094690551D665F0165D5 |
| 462 | 8A4D679FCBE15116C11B385BF96C4A4FC4B0456092FF90C666259CB11BB6F53E2E69827016A8AB4D908251E327D21ED1B689EA8538D4 |
| 463 | 9FE27BC841DD2F1C993ED4822D153295D45A31E0CBEE113DC348125CA5F20D85F9DAE83F5585CE544F6F22B9DD091E89792543685094 |
| 464 | 2D9F9A9F9B40DCAC4FCA239336011140FD8677044CB8163CCC282FEE224F4C48CF60202754C4AF6DAD7475FA5E54E2A6108110DC65B5 |
| 465 | 0F44BA86BA58E83882523A4B381C4A6BB11E87CEEB65540F6278C9983153108839D8BD7E3E3AA5B60E2C82699B00F70A2F366835BB1 |
| 466 | 8E538800ED37A6BC3326F49B45D9B08D9547586C74A94416A9DE82B7A1B3B8634E86AA1C7092FCD29FD82A84CEBD1451BC506D82D86E |
| 467 | 4A26CC89E311FBE0C8024F9E971A6C196C521E021C6E67682F4FE4F65F6C54F0FDC416C4836B7AFA6C58042051A9AC265A05F98E1E22 |
| 468 | 45E038217C1979C6668EA40B067D327A50DB6275BA50ABF1A5999D4E62A1D40CB68A6DF89C81351F1F61BD0006B1AC80B2B903D287A2 |
| 469 | 2AEB93CD928A2C4A53D8E991E72943C31A94C8C3A1EC2163C4CE629991DF0584848C138430937D2FC8D92587450CB1D19250483EBFCE |
| 470 | 7B15A4F3E3EBA82DB26C2D7920D42A546DB86F73E0508645A258390190954BEF41FB5A59E3061924B480D3D4F47002E70DCF374451C2 |
| 471 | 0C8F3164930D74049C9CE0E92A998C9618A0FF3FA2AE02D4BF503B4EAAED701267CDA6C41175B06B7AD9B31C5643049281BC33D6A6C7 |

TABLE 4-continued

| Index | Midamble Sequence |
|---|---|
| 472 | F0CD2080C3A2D612DCD24E0C3249BF63822BB2503FD9BC4E87BABA8237C31B73983F0622106DB9054766CD6C6B5767A8EF901B8384E6 |
| 473 | C17C25A68244B8DDB1AF12015C228E52E0CBD2A7E6CE1BEE58920D4A479A9114F0BDEE32B1941B2098B839D03ACCC835A7A3FD4188AC |
| 474 | 815305417C357815336B2AA7708B7D287E078C10A73C73395C7660E07E9885812806AD3B69BAE80E94F4C904EC0C5BE2756861A31389 |
| 475 | 42CAE02185FC1C5F3A7B4706BB16574E183A9672BF80431D6868471423E06B3A5FADAB27E3EBC143D6DDC30A4090DA6EA72C4390A498 |
| 476 | 1164CBB7E465736D8085648E6C2A060F614F283B1683C47081FE05EA40A0BD3B246428CB7CC5A801685CA2DF4A77846EA6A28E0B5D14 |
| 477 | 1931466A75449F741D36163F58E010D7499A8CC8C67ABEE31320434203C3BA18E6B604A202DA4032DF1BFD2E42EADFA4BD4DB589C827 |
| 478 | 2666797AC11546736556256C1265B02FAEE4E16D30EE71296B0E5A5218E161A88F4205FB2B208AB7CEB1ECE12CDD543ACB8F8302EB68 |
| 479 | CD53B1408C502C4C438065CA5CDED9E884C3A6206BDB3D52FF131B7A22BC494BD09465383EF8DC7A2BAF7093121D3E94CB321B8B0B04 |
| 480 | E111E400BF7D1C1F8C28B62B9A5A4C5541913312B9081C953F893E25AA10E908086D1DCE68FB8512492C08B1F9644DFD73FBF4E0BE14 |
| 481 | 41AA2677719857244F89468C51E61020EB286FD1D36868A39050F6507F7EDC554936002622B983595B046C529CA09AAB82CB3B23F20B |
| 482 | 9D01A719E1ABE8DA788594A25F838C12146715173E8C7F3519988C31C5208C123CD968F18A5C1327D7AC0E5E8BC45CDBB08280F57D53 |
| 483 | DE448C0E86A6CD2A23B08D908CD824580CF0CA29D64E5579ECE3E2801666290A3D5F648A60380F23A8578C5E7944491FC059E86FA31A |
| 484 | 944E251BA9ABBA63C159FF26F863C29E9144606B28A645CE0145EBE5D416128C15500BC62BC1B995088F24CD7E2F6C24BA1C9CAD23B0 |
| 485 | F8F4B9C1077F93AA7A25A152461A964D05B7B4DA85902A9CEE08AA752A45867D80A2AB73B16CE174CF0B36622CF437078B30896504A1 |
| 486 | FA5D485BB9010A88403364DC8A00ED3A418E48906CDB0E2964F3B4A987C03E0371FC14A78151951839EF0283ADDBAA30C3676DF06AFB |
| 487 | 3D726257A22F18CB070E8C865AB3F543BA69CC862B32181031926D87F24318383AA705AAE0504DD1F9292EFF52C89243C9617750D83 |
| 488 | FC4503E61BA9A5778E4082C6155C482169D4E9A4133EAC48F6EA31B13656CAFC112F1DBAFD2CB098B17B1B53D050C604792200C03B5 |
| 489 | 115AF0C6C89E7B5106A52471484F775C4AF60CB76AA3684060E876D0C1EF5D11D87FF71D21D70BF60E242E209F20964EDD0466D8438CD |
| 490 | C60A309CEE5420FDF81EE6B0F1461EDB1C9B1AA10C6896BA5F7E24A09D0760338DACA1454767969218DE0885D0C2AE8C0960FD03BF2D |
| 491 | 6A09DB91A67B255D232E2C21AC4E2115617C598574B7201A93D95296C07BEB0C244CF1477C05F2CB7F3FC2B81A2B470202509C208BC7 |
| 492 | FC47BC6A8254005475CF3D4323E4CDF2684408F8F838B085C874B9758835F780D5A3D4AED18189581B6C33B60E941D4CE05B3044693A |
| 493 | 9FDB0CA8A64227FE38A59FBD39A14647D68112FE0115C956510C0B99C26DC4DB85DEBC918E1B62B490850E061C240D9B83896D88B28A |
| 494 | 396C562F7B8C0BC488C242DE6FE2CF0C60A8044348ADFA59B6DD4BF465EDED80A9FA3EC9080B8CB155062E20FF81C05C549252EE2532 |
| 495 | 8CA46F305F86940D53FBEC474265D8D053E42C0F13C23A347ED9D7AA03D712AE000B769670F4937F671398486C65E171746E69CD2FD |
| 496 | 809572E1FDBA2658640DE9A9CA2D8209787BD6ABE29E4C4F888C6D8D06A7E92BB6580F46C10435D9B43E989ADFDD3C75C00FE164F613 |
| 497 | 6A1A05EF04179628FB46A021A32C5C90E0B6592DD0187EC61683DDD4B198286169B4E1F9972DD226E771D0497268526BCB53360E009E |
| 498 | F8DA745076A545218A9EA86592C1C71295F5980C8D0223F0679FFA8B3D70F785EDD264DE62E9409C0359222A901B4E7F5ED12483E780 |
| 499 | D8C132BC165245A0F3AF1E3EE81B55897443B1032D1B46648EE01944507D158F773354B6BF5D04159D46236782AF33E0EC2F27000742 |
| 500 | 0E5AB0B1A9151866416FB9D9D58E63E40BA60B35BA4848D25F98F1D0638C2D17CA91F9409683CE66805A2558CBC5F576DCE4E8751B82 |
| 501 | 13E3845A06DF13AF994D15A66FF260401908A6639A4FC02B131CD59D43033D8A0E258E85D8CCA782ABFABA2CAB591A01E5C00E79AAA8 |
| 502 | 7FCA6D195F0B414FCF515325B2B3693C0501589CC6619F3A602F13B3FA2282646118C68D2C33A042FED423FE91155F15F2B3D3108C9D |
| 503 | EDA4311A1A3BA4D84504F24967DC0C21925508772A7778049D72F00F3521D90E5483B2038616C2162E5F924563F97FFB8CA3499D1878 |
| 504 | 610B749E010F9A04392D81B72A6C5E11600FA9D9D6858F58F5C83A18C9C23BF904322CE4BF24C53EDF2F09BDDC8E184D0D80AF3C860B |
| 505 | 7AB9C16706AD3F5D0D20A680214F390A55CF94B45272336723873C544B0B5C52C5CCE7FF6B03C0A82912551D35969D06A8CD7799C447 |
| 506 | 9017F4DF6856BA3C3A91F9596855EE8FC0F18C0483B401664509F1083EBE157D25CE6740FDBB09944C48B4FF4EF361034631504C0514 |
| 507 | 0D21CB341C86913EB5B1C43892E9AAC4581D7D658937C5668C57904EB477BDD7AD4A6A11248F1B51A3C384A5CC0F8422219F362669EC |
| 508 | 5F42B31DC5302DAD19E9672EB20B97FC58108E60646850373E61DF6CB094404AD214633A116E1B33D0427EFE28DDA3B6E1667251F06B |
| 509 | BE0A496A575B2C9F6637C455B026F52C1C8EA15A10BC3112C189E0D2F457A14223FEFBE477BBA1461E9A1844314235B09915B8A95722 |
| 510 | 340B24C85030A2A026BB2B793FE8491171EA33786CE2EFD9945B0C3F046BDD0D3600559055B839D59CEBB28CAD33DC00733D3869542 |

TABLE 4-continued

| Index | Midamble Sequence |
|---|---|
| 511 | 7F89C88E2146570CCAD0598285606998BAB6CFA9E7A4485CEEDD496C4B2EC9EC60DD520259F705BE861E760A3B3E6A793C29079608E9 |
| 512 | 826262B3A520C491E917B71A04A316F410A7DDB49D0AC04A91EB8C543E9D5179C7F26211512424440B2653DDC0EC7AEC5DE6859ABB0B9 |
| 513 | 2E4A21578A9DF37C420D5164D936DF24F17212C644A39245C9F6881999BB0B00C2AD8808CD9DEDE0BA19884FFF1CA48062ADB1724392 |
| 514 | 245EEEE4E381BE22413A66732EB2628B2C3220ECC805A2A25BDCFDAFA525CADB32A5D31F270DED6DF504905220FA445E8C768E02855B |
| 515 | D3773C8A8FC5029958AFFE02382330CE948980141309DCB6928681A4B965595067FB9C1B7A5E4CABEC90A4313B0482D01162C9BFB0C3 |
| 516 | 5CA0635BE055F72A8109D404066A17028712B66525C92B4F6DAFAEC1712404D036C8EDB457A4B3F78895AE88222BEE5B18E32632E527 |
| 517 | 3DC09D1203DD9FA44AC29A7013AB892335B2FED31088B0CAC40297EAACC082E0195D90D8D93DF12316CD36BEA3DAC85E070F24599BCA |
| 518 | 21597ABD2D8D46D30F85802769AD4C1B89B19B6C6335F6300A77E0972DCCA5B0792B3A8C442448C2FEBE41A17DD9FD0F646393C50A6 |
| 519 | 038B6E28C978420EDBF24DA11FF5F2E124A752A764A028D4107EBF543AC74BB8CE5CD473206623C30F50D19FB01D45ECD45408F72E62 |
| 520 | E7B87D4316912350014C702CD68A565E699EA32C38EA5DE2AC8493764A869FF082073C489CF3F37DD722A2010DAC94953D0590949BB6 |
| 521 | E16C9BD41D0363F091941C64D41F6AB11FD245521BCE839D8928AB93BDA141053E2E8511537F3C002932C23FC9CA0532D545E4359303 |
| 522 | 65CBDB7E46EEF087524451A1101CB26A3034E3C96A14BE21E3028A4111627348D683C8A20BCDC4CF90C6220D90DCDFEF06770A88B7F9 |
| 523 | 5114C2C7A64C3CD73504A66520E4D3CF6047EA7281D5DD29B4601E5E0696B70E92888030020185782FA750AB1F63ACC7A92B5667603C |
| 524 | 3242F5E154F7758E911F0A319656F51039E0A323FE1C426D133369D290C87A70924840B6D167C359785FE628E3232D7CF8D6BA4F0224 |
| 525 | 103C061DE9F7276231FDA60AA21EE26B78F4C5CC422872E232E25F0B14B16838FE520B5D6ACC480B7F17853C8AFC0E11CCD4814F2615 |
| 526 | 5ACC14043D99E7A518E5510382D02F8CD90DE46071217547D74AEF97808FD444493FCE5436C648C16D21998464F1678D2FAF700261A6 |
| 527 | 73E386C12F209735010A435A2D225B45540645B06D4A179FDA8F9823442A3CCA1FA5808F00AAAF27D8E16DFBA344ECFDC9D100B442B8 |
| 528 | 51A0665D3E5DD5AA04AA0972AB582F535830B8F98D4C59E87438EC151805E807B6712EFAB68EBB06476204B4F5E260EDD8C70016FF1D |
| 529 | 72CEA153ACA9D3AEDBA72980CA85014A84A890F898519922EDF88E2078410FBF016739F440C08FEC6C36F0103D943EA4784B98CA833A |
| 530 | 4C8D9FFA7456BDC1EF009BE6086C294864A79876A0C13A584B777AE2E744FCD4FEE1E1CA886104A84198E989397A4790768592D2AAA1 |
| 531 | B70225F1EC1CE96896E4C629383F79A9C57F55C158CC161106475169DE8E91D136E39E174E08530B411FB3400724CE4D87B65A40B92 |
| 532 | BB018A8A903E9E2A9EB7734012235AD117EDF18CE9B342192EE8840E1452E4CE7D2FA09A0C7F03684624F85B4B221465CADFB49AB491 |
| 533 | E24EBC1DE84546E8381922BD46B828131E292585CE5040FDC8EBBDDBE1506FDE28A75F0126D0B9CE00E61B3CFF3331C0082E84EB0928 |
| 534 | A394478D88B401980858892807D2F50DC3B72C7BF8671ED960A9BD015916E94B8DCA562AB5DFC8531524399A82DC2E3E18672C832DC2 |
| 535 | 875B4E9585B33347B5D0BF01820A22BFA5815795E51097540ADC014CF6AE5824CA34F030316576015F038296F673385DF7FE46B08084 |
| 536 | D8356D85BCF844E848C9483462FE4AE47E2B41584E994ED2982CC172E03553D1E2EDEE4128102EEC018037929B08F491BD7477A10706 |
| 537 | 48C19D00C368AF3B90D623BAA651ACD9CE2A3DB71B94410FD7D02372E0B8574D420857C68C2EED310B98FEA75E460D90737D3F8207E0 |
| 538 | A241CB70202760D6BB1CAAF0B1391230C9CA484A475583A5B5F9F0574DD396D144C4AA2A96AB3CD612C0CA60FD8992B35BE43D088810 |
| 539 | 8F00563960B326AD85C887004AFB2CB451A0D8F8DF3D9B837DE03A9E18DC6BDB379612617AC37002DB1BEAE90D00817D886668A60A4C |
| 540 | 1A339EE736013A2D2EAC0C3F003DC6D01F00C14B6EC8E8DC8743820DA0242E92CD713879FF995E7AB0E1076554838763D028CAF4B9E |
| 541 | 3E41D736E6535781479C2C585414F4BEDADC0117085BA3D6A5D83AC7E23DC2459CC35102D7A892E6D434C4790B0BF2AC826937951C127 |
| 542 | C58CE43CC442ECADD26EE83AADE3C2A87A2E60DBBB11C821183E72B5A2496E50501AA806D52FE2DD1887470DFAE01FD8BA60927D9CB7 |
| 543 | 3ED9EE536511CFB8D84316C419552963C85DA00D89E2231EB96A16B2F09D8D21038A454D9898C587E20B2B2DA03B58E32DE2EC5A6AA9 |
| 544 | 78DCEA2EA7A094A30B1530D2AF1D0F597260388DDD712212870C9C1172905C04DC1F9645F930128D899D8612DD046E0EA7B869EED452 |
| 545 | 9DDEB007E571823C16CAE7E7C9956EFEA8970958420C91E48436522B11DDC9CA1A08D49C4CFBE40FE09CE1952002B1DA0A9CACB0FBB0 |
| 546 | 158630C8AE7A0246DAC464707C0DA806D7297D43842821DD393D69189D3FC688F099234573335EC1681E1941479A8624D3EDD63B1489 |
| 547 | 16DB52828E9FC366737A0EDA7A487D968891088489675E2F0897C09F3B18008FF75CB54BB99E1D25F00580405646AAFC02D536D7A32A |
| 548 | 6E641541B78D7216A8E2C134E691971E2988069E90E3EA95B6FFDA68B47AAA45924BF6D90C022074AB2BA7F8096EB1A25C39F91615F4 |
| 549 | 8818FF8450B10FDB2BCF52EBDA634B9588BDB190040278563A50C0B8B6064A044CA4F0265899D41C74579FD526B1031316447F9BF178 |

TABLE 4-continued

| Index | Midamble Sequence |
|---|---|
| 550 | 346A31E5AB905B43D61451D2357C6604E2DA6018682DFC67313006C4FC629578AE6637 66C68855FB4EAC8E244B10D215A70A921704C4 |
| 551 | 04023E9EA1407BF4E282E642F0E77E21B4322C5A0E1AF063D22D80D37DC2F48708F8A9 1CE1A801F0481CAD3C6F26C8D230BC8B823277 |
| 552 | 2BFEF5647CF27FC46C28516ACE08E667024B8671168AB440059747C62AC3CA11120B3E8 EB923525C8A40D9660C73ABEFD4A44611D4AB |
| 553 | 1DA4CBDEF8A6E8C2185F8F68F1057398AF8149B90F5736084825AC72AC2E2E28FF1A2B 05C23B0D0F311A8D31D0314CA30F32E0ADAE6D |
| 554 | 0E3126045F9FEC90237B56AD18D8AA1008D430EAC725FA521E11E2D65697080256094D A054113266DA4E10F65975F84FCB1A6AAD17D4 |
| 555 | 0B9469F8B99E4B2DDDC66F21640B55FD03B49B1C5AC8A010F930011F45B3A72338E816 74AC913E55DE6870C95081D7C1A38B4AEFB02B6 |
| 556 | E280F2E5970B9804D4B831CB22B5C43E1CDF876217633122A51F45C942158CC84BA62F DB2B705507856CE24B685F0628F60A87D39EE1 |
| 557 | 33555C83C5411FCB30CD5B51E0E49EFB98C038E91C191584E4E943FA34EE166743B12B6 F3B324A5644DC00D0BD20C54751DBF9116C22 |
| 558 | 8866C378D773FBF1681D774A8B873A663732CB2D520305BD129A8243C826CE2B0FF05A 401308D53F0F012A056E789DDFD611FFEC0A09 |
| 559 | 888213E68B91D307533BC47D142CFCDC56C08930B6866C288B5710D562E541B4338D5633 DF7547A019EC8B116DC5CB1C342C638024CC8 |
| 560 | 54B26A4F08015629AEB01A26D03E4C00F2F73357CFFC9D14EEE36811060075A7C94AB8 889213C9CB12E6B4FC0EC4FC9A753800C0A5FE |
| 561 | 8C2C93D43EDEA291875333A1554106510B7B5080B4DD8C3A78576612BE61183D53C7298 88F295065A99333103DBE29108587A7D6E33C |
| 562 | 48F49B4C0C19CCA085ECB21ABED37680D49B0AA53BF24BC65156601541A8D95A4B7F 60C0223C74D748D18C1788212B87DDFDA68F4EB8 |
| 563 | 9F4B9E9C1083481C332A90E1D957E416E676862039CB986F0053389A27B268BDAB13418 830AF78DBB698B845C0562805ED462F39B835 |
| 564 | 29DC62FFB1E8218457A934E09085DA759D927A3B511D4A410EBDDD45B7651F0119728B 0661889770046BC63E2CE23171F920F0F75E56 |
| 565 | 950F92806EE72527C555600168274E8AD2C6654355252D3BC524FEBC92C07C129266240D CAAECE06EAA2C89CB7FA2BDEB73E7033419F0 |
| 566 | 5D2B3117325991A48E045B21DA6DE23D014F788F9FFF6245C370A819E1CD7C595232C2 A2966D1F96BCDC1819E2EAE028AE97E4708F5 |
| 567 | C2861EF5CA6AB68F4205880041F88060AB77777CF74A529053274367CC3A10F2CE9F3441 3A9166FA50989FEA66C273629E8270BB8A09A |
| 568 | 90F5812EBECABE5D301CB52A51044E524B1DE7F2349461204E256609F9CE00FA25A5CF DB26A40BE9E798A0A063E4B211D026299193F3 |
| 569 | F2087F5F80155481E2C0BB324CAC1ADDF05B31C24216E6C7D6C267C7B846960BD0561F 8E414CA2CDD7974E8737BDC2706304114D4DB0 |
| 570 | C7C18D2E3B044781BB425C4D8E386E29A62B0D83049713655F7AE98308A379E917A04C DB4D9B4083404837ED5FE4858AF12B99AD18FC |
| 571 | 4FB318D9F387F1134317220D65B7928F0D365F010B0204B04AF2C7B8FB7AA04EA5487F9 81B15897E0A74664179194C6A4E3AC20A9C6 |
| 572 | F64F241DD24C0843E473433D43A752F989C48C85940A99B33D7321F8F02E3B3CA14F061 59B41E28A9379740AA6D52403D374916A41E7 |
| 573 | 81B69794C3B138047E57C89EB6492560CE3E10115685F1A00F61FCD36520CB742CB46D06 9834D630A209A984ECABD14508513953ABFA |
| 574 | 9B3785C99F3CF23DC58EF4076A0CB85AA6C56AA758E36704900068DE5C450E5B222F3F 2A0009DE06364C420BF4ADC7CA5E190BBCD6E6 |
| 575 | 733558F87DE927C23879A2236F548AF0F030823B87D31BCA30E3BD32C03E91E9032400F E2AA4537948DD63CA4A614647D580A5D66CB0 |
| 576 | 13CEB1DC9B1D0CDA0FD32DF869758B81C18E76A82AAA212D9C3E07066F0A32775F06 02A682D409ADDCE69262A277EBA17701426F78DC |
| 577 | 78970B38E6123C7792A29EC36C8FDF599A349BBEE9204A060423037F012281E5BDA1CA 51C2406AC6254F403BAD9C4C5F5E28A8AEA275 |
| 578 | 214A64B2984C33C17952D1BF0671C20F5766B1FA233E6E81CEDDC443B810D467D31023 F93C89EA0D5FA0545CD8D0E5685F59E69E4C49 |
| 579 | 849C786A67F82BA1236E3640DD64054C79D526E80EFA445309E9A7E7B64FC2FF4720072 239050F49B69B20E5021BACCC713A4495B8EA |
| 580 | 9BD6F3153082F402E58492EE643A45C9C68EE6774E03804893D759FB75A6BCA2956269 011B20BCD8025B91D253993C792FBE0B408C5 |
| 581 | 483C8ED21C41637524DD7568A63BE30C471CAFCE088D72FB878107860CE2C9B4254C4F 50F4B8E662D02FF211B158D2AB1E246FB3696B |
| 582 | 89621679E96FF1EEB08A0A65DE56082F1BA0885657C5871730322E16D7D9C95D9369C70 856F0192B738FBD2B05EE501FE2842457A132 |
| 583 | F5D0DB147F20143996F84BBF1BB69322FB31506553A2820305836E488F04753C54840E613 A0B724B6768B342F11897F48E5AC598D107 |
| 584 | 2EA3B14D094AEC921051480EC3DF6911F59770D88E7B322D6530FE1BD09C230965186D 4359D47BF7FB458146F86C4327251C683E5929 |
| 585 | E6493F45D297C12C3B007D263211B3558F00A7898A23784989B1F89AD63139ED19E1494A 45488128B451173250B21C5F3CB7D79119FD |
| 586 | 34DA0BC232AD4B377461BAC935064329C85DFA2F74AC84442FCA6EA5CC34E4DA49F8 9C11E238DEDBC04CEF747080F28F8CF86848E861 |
| 587 | 5EA06A2BE2AAD9C6161BB280D83C76CD4A202C8B0F3C17C60DE45CAC713AD02F919 1A0E4E39811B12DD59BC60F9B71B361054B7C1072 |
| 588 | 9E947358B6C6851D9BAC2E6E3510644F480E14E3C9806277FBBB6D3F00091581BA34477 0AF90F8B92A1FEA5594EF68F3857114D26E58 |

TABLE 4-continued

| Index | Midamble Sequence |
|---|---|
| 589 | CB3BC4F6B0AE1B1C52EC7C24413667EFE870C29D8292A020187B8989BCFABC21279E3EB5340D92C886DBABC80CC4DA0EF312C5DF450 |
| 590 | D0722FBCC2951A9EDC858B2A84D8F43A38B8532E8C51C652C98213430225350551C257293CB35516EDF7DC8D5A0D6B42BC488B2AEB53 |
| 591 | 15A3BDC170E3001A34E72B0B403E58194A8DEE470839F8BBAEE411351A4F70756CBB86ECF556730F24D31E86100C47EA920F2285A82E |
| 592 | 60ABA234C0BD0447C17553EECDC0E34B78E8C4709163B29B151A34A7E49FC910FC4312188F700F6B8E53A48A1DD07CD00A65A3C756FF |
| 593 | DDC08D04660D2557E24E360927575859B2EF1FA80B163E22BB0A85559631A4D89DCAF3AB4A679C0A54A2AC4D56109709E140A05300C9 |
| 594 | 58E81E8BEE482BC7E3037D74B5230C1AD0305D60633161D458C22B05F3F18CD145A9100C616D76EA10486F135102431359FBA26CF3DE |
| 595 | 16F3C9D1974FA27314B38B600E704EF78A0AF02ECA8CCC4EA93CB03A19E44E84EB6B3E53673C23863449DD406C05039AF3A42500C0A0 |
| 596 | 1F6FA25C82521CB0AA34A1A0F07BC6D038ADC75207CF9C92F024DCBE763F647A87F32CAC0A4C255937666A5EEF1085873672124C00D7 |
| 597 | C45494320F4C27B4D34F8C080344E447786EDD5A9BF6C7A8D3C0C1D0FE5A4015EACCFA60FA24D1C244CB125CE820DD50B94F5BF5A45 |
| 598 | 4A98011500DACDF42E806E16BCA09EFBC9C0E0C6B1B9B4A1A887CA8D24338D362C55748113D600D6CBA370FF02253EC701943B76EBFB |
| 599 | DD3CBB0B7C6A21221CDFFE729DA4EC960F5B20DDEC00C884441C6C43AA43F92A687B0CE232DEB1897654A4D0368946865ED241C6191C |
| 600 | 8F6E8E12208EBA48590FE7F9E8E84E4884F13D72C3298A241BF44306AFD10B81BED6FE148D92A682A670484C1B6305A1C68716C22630 |
| 601 | 07ECF180E8F810AA0B87DB50980EFEBB04E084BB96A3D324C9DB15E7232E10D4C8C0AB5D66208083069CD119DB4BD6DA9F2DC378DB99 |
| 602 | 1AC7127134D1741449C67E92F87710736EE2C8AFDADF47E0F29001A1E179A677B6DC01064A1B6F68400E62A0BB8F571838D90933A269 |
| 603 | 0ACFE8024F9078424912CB9A3B32CF9763A303540AA38BFF44ED36DFD818081821284EAC2DA4B16A5A235722BD8F06B17C62579EA71C |
| 604 | F9F4E6D361BAFFED1F32124351FCCD10AF18B32691A0852086A0A2EDB94A958BB8C03943E1D6B03E4152016E97DAEB57562600A5DD0D |
| 605 | D289B80EF0C6C508103E40433341D73FB270D73F14FDFDF2B880C925C551A88726727E0475A6A9278AC7E920B7A649173BCE24F31451 |
| 606 | 645A1E87B53C78AD282C4AD85FBB0487732A1C0704ED7855147D6DF9260D9CDE6620093847345824A0C744D9A728A5C9DD7997695E9 |
| 607 | 35D95C9B380B38AA0D270ED4B9F6329441B0636676A0E611B770125AD2254ABA0791D9C7507DA039738FBA2D4D804CE3B70C98887122 |
| 608 | 64F08DB3B16060B26581949110AB0A5E74FA7A2656DCC08F88C1CC738F31572842F3EEE013627563915C3C6A9759B053C242FB928DB4 |
| 609 | 1E0C2AF2C6A6ABE41E37D3803FCEE2A300B8BD131C5846BE47530820944E5C6A3F3F6A570B249A206602EBE0CF938E3166AD82CB1846 |
| 610 | D0785159AF0031DC37CAE0B0BCD1D0DEBB040683F2209198B751B544A7A7E8018052D0C6222CB1A26F14749929FC25F6898446457E0F |
| 611 | 47C06E710A0F217A049C1F6FA6C82F4C0EC82C9F440AB53F36332355FA30C11D6A101E89FB23CDB124520E268E8DD5A6111F624FDEB6 |
| 612 | 893093EA822F329C3EEFD27C590C36220FDB3360CD2212C9A113D87056B5F5AB91BF64D298D68C26079E72341EA0F998471735253B4 |
| 613 | 7D01A5F2E950170060E380D4E62018C92A55F5B3AC03A7673D12414EBDD4169C629AF3A92C091980C7ABA70523C5BC0E0E6E0F4E4063 |
| 614 | E6ED30E5B00B92E1A412D73254A56575504BD8F68122FA0E592503A3F5B0CACE4E7AEAE001BAAF98C501722700A8FA095C3493C4AC3 |
| 615 | AE2621D0F1B80F8E5D48545A29543234E1447B9B8E28C2858B3B2C773254ABB8BBDE0E6F3CE6DC312309CBA60613285A16129B56442E |
| 616 | 58BBDE10546D6CFB315D6416C71601EA59B0C0CD115F9B0C651C6AAC7BB5722A44011913859498B25AEA5DD71EDD1038D98C5E8D2E69 |
| 617 | 3718F080C4B9125B842A80A7AB01F58A6071962ADBB37E06C51FCA163A20F094C62D5DE15142C88BD4C644C82D129DFE57770F3AB24E |
| 618 | 66065A2746CB041F8150FA6F264CB590A96BB82C90273BDD4108E9DC11C5CDB4875C8E078AE185756F3080B63897AB7F374A886C0880 |
| 619 | E432503E78C219447F5586B107A11E59D6C59955294B3D04AE83E673269DD6E08DA51556B331F4E987DCB1A856856C2C2BF8E0346A60 |
| 620 | 293CBD1A107099FC4EBD3A4EC94CE9CB465682A4D4DA92CDCC9571A884545F500B08CAF012E5A62BED4E3263A0B7B0FFD53952C4C5F0 |
| 621 | 4A8D18842F3F5C2C8271607B25EDAE4DBC184CB627C2DEDD4D5C819C299389C87B0D999F0B54419F29324AC817AAE821645971EF451A |
| 622 | 0E36036A3D3EC1FB0384668A59B1B26308B700D5D26451BAD235C9D184238AC7E3B8A82B4E7E6C6028E7646F6B5BD4082902A1F9919B |
| 623 | 249742B9187BB06E33F4EEBF360A84B5168CE70E0046983D2960329DFD99EAE40C812DA3A64DB8B8041A7E8103C24A668893B991F945 |
| 624 | C7AD7A2CA44414704FD08880128038762A9DBFF322BABDC16504866D61C54F02F2CA26CC042F231BE0C0C5AA997870A2CBF9D6939D1A |
| 625 | 997386F1AEEEEA20E82752C095F827F1D6AD9166596B121290455D0C544B0ABF9A44E048A85DEBE580B86B077850EC0A0106CB578C0B |
| 626 | 9916F513089A6D6B19B9B72A2AEABB1BD8C4A0467821D022AA079810332596BA431E8585C14C50E367FF2A06E9CAEFFEB546813DA0CE |
| 627 | F345501B825762F04D8104091B9EF0C2F44420D5EE65BA7F94B74991DF092771B2E6E1B37A6815A0A1388650790E86767D5AE57B0AA30 |

TABLE 4-continued

| Index | Midamble Sequence |
|---|---|
| 628 | B0BA6CE9794EFF5BAA4B5D4B814915C4B884A9A5273B500312B3A1340F488304F37CF7781C801B9C39A2C697B012BF35578CD161022F |
| 629 | F24936CF14D8984E48F3FA0E926A6B0B180FC1C01E87E9BA171F34538D5728800AA4BE883721AE794C855CECD65DC85BE0CAA57D0DE |
| 630 | 9B82BD0E4492B5F1998F0E96239010E3D0578D49DC904BA46815B4470F436698C743983C7740C8837B9B816B6D0D4A5A5474FC0CBE44 |
| 631 | B8AE0B8BA8D19DB471662057EB968362149798776E121421F9AB05DDEBA942CACBC0A6FE49748B248104F37506D6241923F4006A52C0 |
| 632 | A49756E807C0555964546DEC88A11D10D32EC0F1700BCBD149E27BBB08ECE7D9FF0C292A360AC798621528C899CC9B1CA7430069D4C6 |
| 633 | 53F7D2C481998F0461BDC30700942453206E30E6386A355A847EFE47CC42AA9270866BD0FCBEF05336C0404605B51992895177B33D98 |
| 634 | E13A0496402AC6D0E6CBD517D2ACE1013D5972F80EA0DBAA0693ABD925B52D0466C11339892AB1CA852395037AE8725F6458E97835A6 |
| 635 | 518348F81CF96C20CA697DF80A420B8AD10435DB9CFFEE581C950659F37174DD64014CBE048CD2778E49DD852999EB22F5B58431316B |
| 636 | 30DC802AE9062D232F1D1A05027E7C9B610E8E47B3D554751739357127A02782ADEA17C5E99961280E959535D2DB600F1890E379C853 |
| 637 | 87BFD833E331222DDDB00FE583A18C82686DCC5A88095F453895A4A2240235708190284726B9BC56E99C6D69B036B94258AFCA5768F3 |
| 638 | C9752525EB07B84D4FE7328AA274B8E766406B861F1C33280A0E0009BE2608A8A700C8FE39D3A4A473FA994D485DB9E99154F92C10B8 |
| 639 | 045F4EEB9FDA5E6F32A504D710186F20FA6B929B4890402B64E2D1C51A0FF304A11768A2FD1F0518C31D5A95949C75C11D1A4EF1CC89 |
| 640 | 66C011DA198BB587174B1BB00E36BB31AAC0821BC297C3AB41F85A9D9C769B261CD009AF835D98D4A41B174605584DD94BB905710E69 |
| 641 | 0F68D26F8AB08348857E81D647B8DD6D4032F67C843C6220C39615846A384353D0688A9AA4300E454BA3B6AB3B1774880E645FE6B94D |
| 642 | 09175DFD185A10B3397982D94942F79D3EF9C6BE66059012485B584166B9800176A06A58DB25BD178009BAA2A9571D92E23F3E1C1FC77 |
| 643 | 0069D72B1F9B166E7C3D81BBAC440A3C39E82825FAA0C42A25C38C125FF03088844309B19541986D71ECCD324CBAC32F3942F5BF4B68 |
| 644 | 1352C835FC226B91C5952A74A569011F1AC93082D46DC7FF6E7632D46CE04CB0D34E139A86C80330FCD517F9D234779E91586976CC39 |
| 645 | 2E726D600DC508AF631CF26D003301635F84493151E99970F9B875A1F837AD929D5AA63D9122020CF568FAA0795B4270D093123AC507 |
| 646 | 398436F695EBD8582D409D0AF513EC74A6CB312A6BFC2488898F4237191D7D2C8A0A5140FECB1A9A5C11004E2A6C330AF30E9F44E13 |
| 647 | F017F42C456E4763FAE530D41D22C33F38825DB8D8DD02A95C43548C9D3C2A00F922FEB70D43734418082ECEE564D9FF70AB0B33670A |
| 648 | ECE004A2F5EBA5995200A36EF9C00BA5850437B932E92FC4199C2871E8DB9B41089AE5F958D1B10DC498A7B6ACAB187660540AC3544D |
| 649 | E5AD420EA3ABABDD6BA69516E29B20124D206C016A48E400A633BDD1163E6E48E293AEB75A13D2BA4B4203AEA293C3789013E0F4B1C5 |
| 650 | 56CD4A720D555FB60A0A5AFBD28041C42039B8085FA5BEDEE7422F3C66635455BAB8865BFAC70FBD8208C451C14D46C3068708B385E2 |
| 651 | 311944F3C11C69224315AECEEC56907949F3A27BF7B9B416D0BB6465CE2E6BE0BB82BC9B331C13CFF258F97502216B5C2A0AE23762C1 |
| 652 | 9B1242AA905D29512754210E8976D2C1CE6ED3A7FDD9050A5624BD15CE60E686833D33F4195EA18399C0A291BFDDC5E5441ED61CC175 |
| 653 | 38E2C064DA28D7A75F1C601FD87E0496E534E4D6C2E2B314918FAF5A25E5EEC19702E0DD823536E442505F118CA68A13BCF8130D2057 |
| 654 | 221E24F4C98F60A06C17020383C65E870E3C5B41FC7A4A5D3DBD1B5DBE920514B33EF6478B0247AC1BB6023565B19CCD502059D21B9E |
| 655 | 9D45AFDB317E1030699DC210122123C264C4B394FE0583D4F39D6655B72E6106939290E2DABD00EC55421855DF580A2F309431A43137 |
| 656 | 451F0154683058D927A2F6AE51B1BEBA88954B2C27FCE2622E035A8011224D47103C6193CEE19263E4A3A40F570C70857BBCBD15FC7C |
| 657 | 92044D70300AA112B3226F5D6F859C976572BE11612DEB90685FC091FA0C19292EB827895B8734F630321C3C7E5240B31B11C31BD673 |
| 658 | F2D891C346551748C736E463DB46ECFA93A23F8058210D8BE5AA4EBAC50500BE3CF249907A10CD9A85E05008F3241DAF8CE477A6750 |
| 659 | 94DB4E55089C2D518C2D6C2698BCB76A670EE6A4FC4D42D6EE1BA85228314B146D86FAF8DBD645263C35908EB678A8C734776274AC0 |
| 660 | E9B360E53E8A482F452A7807A65140E3690A6129740E091A3CFE59312C215ABEA900A2F830589B5EEE1FBAA12B8065DE58811B818C7F |
| 661 | C0DEAA95878628B9A854400F3499DE20E48208F9756D7C4B52EAA48D6259E96401C56B338739CF18CD640AE426CF91430BED830DCCD8 |
| 662 | 8233D0694E1561740DDD0C529110875F8C982C8708A3DBABF91C43AD5BAC4133D2E50A9B7BCFD2369F7D089710220B45AC1ADA8646149 |
| 663 | 46749F2327BED7050D0F7857E45A58F15581E08D9A3B1569968A865F07D214DC16DE488448199F767F81AE90C5EBC08C0C61D2AB93C1 |
| 664 | C0B2B4B1C28EAB2AD67DD62F258240F1AFAF904C5B7E31A53200733DA0369D3CDF980BF1A315C31CF2DF8921CC811D11516F328C278 |
| 665 | C392719A94E44AAE4D6C1072362AFA1317A8572293A3EBA0A6050DC56FD0CE88FD8171A62F380C6E2C9C1A4219D835CDDF21126F4B5 |
| 666 | 4000458D7663A3E3CC3A79226C7B02E6AEC10B0B0ED482EAA6B8FC5431C8BF1092E06F1129D57010269876EE4CDFFE84AC34962913C1 |

TABLE 4-continued

| Index | Midamble Sequence |
|---|---|
| 667 | 7836E2584D08121EDA83D4A35DB1E16A8C262FA994E5BAE8394D000D1DA401985306A04569C1B1D15D8F29713317B69BC49F3C5E78EB |
| 668 | CF027C214284228F015B1EB34DC178A1B85E9D9AB8A8CD93744A7528261D65C83D840FFDB137B2C4E4AD83C5351105FC18230CA870BA |
| 669 | 61108BAA4C838AFF086CE1FE2DB9D2D851F069E61074398135711474BA34B8F2674A4C5B70D4688E6AA776C56601A192A6342C48DA42 |
| 670 | 33A1A2A90448AD611FED6289596C2F9926FC5647D0E1B7BC12905E6E112757F61816A38C098F59BD520F49148D29375425CEE6C1086 |
| 671 | B3134B3D1583C6A56248E3D3028A43000F25FFE417EC14591CC5B21E2CE78675C7786529C06FCA68182AB7707C952701A362489DD9E8 |
| 672 | E1117D9373946021B1D22A34740820A7378AFABDC74C09EA4F76173B460589B5CDA718B3746A1382A535C59AC99DB15371A223899ADE4 |
| 673 | E5E11D9108BE59C8787869D922221945D476BE509393CA11F570B418C048B450A0AE7389E305BAE7D420666B3F935BF7518C9E8163509 |
| 674 | 1BB824B57109751E075D204522F6D8C2E89E9834A89C0F756E9384A82882A0EE459F61E264A70DA02BF0052DF9A731D9ADBBEC0700E |
| 675 | 404755A41B25CC68A60199E79B62E597EE89207562B2BB21581C5D49BE42352E4B498406168D33A44FD07093A292AA33BC3BEBB7A |
| 676 | 42865E6EC08AEA020F5DF4F189CE0E0EA2563ECCD425D3AEC92F247163380DF3C85A1527C67AD6267FA8100F50ECE5C1B58FD3C2D0E0 |
| 677 | DA6238A211904C10479B006E9B4A5C5CAF62109D1CCA81BF536D46D0556708970EE9FBAE81C29E0AE9A4EA850D0E33896915609385D1 |
| 678 | 78672528F0868A84EF746B612C4CD82E49225294500DA69E81E8EEC40F11CE63235D50932890EE7E58081926FAD5F73B4187BA08F92 |
| 679 | 044D0CCB03BC9E66350772C0A9D139381208B4535D32FBF4A3B36E4764C2363115A0EED670DA210D98374853CF4B194BD4710502B91D |
| 680 | AC24E640C5220B7B2400A40FBE05ADD3367E6979D1DC06F39B0BA69605C3174B08AC17725AA9582951799F45F0A12C35A3B3AC3CEDC65 |
| 681 | F22D2848458A17E48B652F868413045E8EFFA6283EDB014FE1DC229DFDB49815E9918D513B56420C66A1A02C59E8B54A46BF48E97615 |
| 682 | E8B195C41D2854FDB2AC28381960A5E69376856B05B8DC4141CE41A38552743FB78E7B74F84B1EF0927610340066EA6641581AE7D20C |
| 683 | 6F465C4E0C5A3858D16634E518FBE243A2A323C2DEB065BC22DCC68A594025130069E77B2F607F370AA5A7B1A151FC89FA4E02626C1A |
| 684 | F50C882604402DC564F15848A8E903F843F3149A77CBADFBC569EB90EB0A03939DE350C157AB360DB3876888DFE8B362952362F9AFA0 |
| 685 | 3000BD3C3F751664AB8E9AC205258C186FDD576C05309423C256F5D060A0971A1F8786592397A4F81FC6214C3D989974F24CBE8B3431 |
| 686 | 1AC2A18306FCAE921C48874448C6D9E1234E26624C8AD859E4DEF775D6044F3D2583C230DD3748E04FAE348D1ED6240EE75C059AA092 |
| 687 | E4A260D61561575C6560CD414CD651AB6A055453062EDCBB75418D3F96691B5802C357A6DD989C866768725348652BB8E56223C9900C |
| 688 | 7655365395E96145CA89CF912667E8AA0024DE37E02B06CDA0B392CD70E96C95C6122F48F67562D6530D00694A1E6430E92427DD8235 |
| 689 | C932374E9080553BD9F2FC7578DE39DE18197429A2A881A5A0141943C5B0E3D6D9ACFC4454507625D0491DF62236E6E73D0539A1CD39 |
| 690 | BB1B4745556D634336C67F6945C1735A09F42964D028889E05C8E912AD16F90E21226F8288DC641436A6C60A75727D0B1040E7968ABF |
| 691 | 614075F20D07388ED8C7F0E0D00A40D378546D0A2DE9850AFA64F93548A204C83F51473C0DFF08E8EF529474F3C17543912B32097059 |
| 692 | CB26C20EF4C84AD32663A08B015D902A941EB60E6071E76CF6092D481014AEFA230B286DE31E330119FACCFBABF14390D313016CCD9B |
| 693 | F419890E4315C6803A07CB2CDDA1F0B409B4953A6A3ECDCCFAC49CD2098743BAC38D12513AD625CE622B6F02D569B29F022D1870CF11 |
| 694 | 38FF606C4BD3050C73046B90B51D860A79648672E178E79C549C24DFD4B26EED0BCA35B01567C7FC0F2048231F3C150C4230441F3142 |
| 695 | 25B3FE1E12CD06318F59094B5C748332616D011AFD011F0993C4E545D38950421B1C9989AA85EA571D4F9EA46898D00DD527D779A01E |
| 696 | 29D4E7C67F804A6807AE95543B324831B4A14C28E2AB2C9EA1AB2341F187C73C84DCEDEA519520806433572FAB87C03E5409FB961D9D |
| 697 | 6A781D8FE314EC04D6383826B3C669CAD8BAAD722104D2DB6465BB8ABBD6790841F11E8C05F21F155756C03092918E4918B14A5CF576 |
| 698 | 1795B04AC226C8F395FA4BCC675444FE495839E2C00ADB202270C04C88AC610B1E74F6113C11334171B91A401435FF74A3E13CDBA7F4 |
| 699 | 07045811C0E9618492D0334CA77A8EDE507928E3D33D0DAEBA0D1153B7724E505988BC7ED9C855DAF5F9A1148D888361912DD814A794 |
| 700 | 913211F80E82A5DFCC30E343D12897CEBE4B52C1E0AAFAE16442E4989373A380432E625D6E17FF9654437903DC4DA9E17BD02090D045 |
| 701 | 898A05C1130D5DDB0EB3062760F755DDE42B37D68C20C8B86921941506E97FD4A3F59227B5B8B096019DBC86D90FC6000F7A92A71915 |
| 702 | C9960BA7B5A3813C0DBFD7EE47405842AD10C81746117E85B28456F76CE1F6666B19384A44B06564870B5EE30C49FDAA45494842C7A9 |
| 703 | 97661DD2A4337107F3158F391C3C75C060356740E6710010F6DF5ECAA093EB1204FB9E6F4135850251ECBAF5514616BE0B5A83EC1A75 |
| 704 | 70AF63436ECC3FA37243B422766DBF193B3816027069A9584611B4AD5BFC0C059F81BA27789027DD6036645AB813C22D30E5B05064EA |
| 705 | A983B9F8AF0F156000400442B7B3293845F5B3C8F62949846BE025B024F37B6044CD2FF0855D61BA3E90D8972335A8B1AC2A9616AB4D |

TABLE 4-continued

| Index | Midamble Sequence |
|---|---|
| 706 | 9291AA980AD6D469BB5E64329BD4ABD8000AC111BADE21D4F2E85AB095D055090D2FE6CBA04A79C64E9231EB8B9EA630F191B4712648 |
| 707 | FEF374C22D524C5D28A0828DB2096B7C42806F65316143E93BA8C59D234A88D0DFE147D574624ED329962A42E6F56884899E8730E468 |
| 708 | 152AE122C028603568D2787B84266DC4B5D863EC14ABF5EDA1BAC511471A7A9A107846A30F1565F96220CA868CB220ECFF4496D1635F |
| 709 | A87E5D668D3231DC217D9437C8644A9C35650CA80A291FC668215F471B3686869C30576CC03132EA3B7AA2DA5001CCCCE7CED8A99498 |
| 710 | 103AEA7324116F042737AB1F3318FEE59B11A05A9AAAAC43B49A1A8BF000F9A730AEA98D08E4E272618F32611FB57F1A840E75CE9205 |
| 711 | 2E708D607E6B439EEA401862D35C1D6F072F8A7A4CEE4548FD0481A59B206EBE829C837BF1D568282130CC5EA704CAACAA7472E0AEF0 |
| 712 | CBB334794BA3084F7CE52B047758015982AE5405CF89D98C0F01086E9C98AA9DAA87DC67301C02A71721521AED1F10B8508474F923A7 |
| 713 | 820F2888D569B3254B4E302B5E0B14F095DF7D46C91C743DA607FCD0BA80D49C9ECB6D5EE3A5898B75D7601B92904802C645154F837A |
| 714 | 31A3D32DE16AE300C4003A3EC148936026E4CDB3F0BB97445DD2FEE83DEB66060B66F26CB02FFA2A38CAE2C841DD9C66F3883D0A2846 |
| 715 | F33DF885301A0F8C0A62013810688C4D70D15222517FF8AA293BF6A45E0B89E619FC900FA16029BD2F3271AF59B722DAC00881E950B1 |
| 716 | 013EE3862A6BD9B6094766C82CE2F88BB53ECC9CCC30B4D0D79051DADD8EE9D15D77B88053469D2C611190C00ACC22ECD7892329C3AD |
| 717 | B684697BAB283460D3E25D02401DB05F0D34546FA4E2BAC21E5CED1EA383993AB528E849108CF3D0324E3F89A7524DF23C04CC4A1E87 |
| 718 | 3F14530006305D0A4D2E688AE224A1DB4FDBB6F27897B34F070199611B25403F0F39953848CEE03EE891B320540F5F79EDB02B25C623 |
| 719 | 1AE4989CD402F1AB0859F3EBA8AB66B36E73BB924A90A0CF06558543C3172626404D49AE56F88968AD280614F7A6293CAD75A68D5106 |
| 720 | 004A5FDD8BCCE608546137DA151431AD9E35A317C6F5580F2BA4A02870BD28796CDBDD36ED736751459E106530A2004327678A4740B7 |
| 721 | 7519620632AAB90B46E41B16908DF35E8E3A5C23864064AF5D4DE0BD3FD3D9D3197D88640492535A2E122E4FC1E0BA24696010F69E6D |
| 722 | 7AC0125ADF7D7F442FC95036CE30082C0A9A46EAF0CED39A8879882AD5DD0D13D1A885062B6E317E4AE99B14E17682009DBDA54C92F |
| 723 | 44FF22C3A011075B12D6739535691A0C6FAC154266CD95F3C87FA9C014D71BB458D3A543D97AAF288C17ADAF744851DD4582C042C326 |
| 724 | D80B34F25C2E41EAC28E111D7A839A51ACD0AA8DC6B9E478306D071EF668B771FED7F4500C34C1551B13E54980FDD112600560A93380 |
| 725 | 331A63C1674DB384FFC0A8171A0A48DBC066348F793D1B990E471897083709D5B246D81059973811A50E055A4135EF6D2F6C320C5CDC |
| 726 | E20016D1173425AC90FC2A90ABD47C79FECACCC164777392C2D8BE32F60106441E8D33029A89B90273D98392F2D379B385422A71FE96 |
| 727 | B615532C25416C820C80289C4D71DD3A1855C3B2D072F72F425F99701EE73C7CD0D63BA018FF53810D19027B149808ADABA78B096E2A |
| 728 | 46F485EA4B99030981E64C8C68A51CFC57A65194A6D4EF1B3362A273D817C354BDA76C304002E2973D3A33DD126A2D406F56EFC44482 |
| 729 | 26B361AECCAD83B22860937614A7134462B4C7AD3517B92F2756AEA0CDB04D59D2E150DD9D1E6C9445A268A28E112DF4431E8C29F6B7 |
| 730 | 4F21C0C9C921DA02CC63FD38A78CF4F2674E3C2F0E1A13D760BC1FA755D568825B2911DEB5B2DB051BF4B44B3FC48028A962189C5D30 |
| 731 | C98A74C6CDF3E8B81C00110415CE74CC3B07DECFE0521FC09EC276053CCC551D4C28C05FB414D25E18771F6E03259C3319BE78F0B454 |
| 732 | 9E86626564CB4377522BE05728B874C3A0E84EB4254687C3E2C1D547BDF6171E63B6EB8A796615065080AF18F015CCC9B601D7890269 |
| 733 | 3813577ABF0E840C62AC2B0000808A7CD846E3BFFA2261F7F4FAC993F38E5B8545BC2431B348F027F46D722E21019792A778A3F9095C |
| 734 | D0D2E50CAD6C01675D203EB45960794D6CC504C56FEAA12524521FC09249A87E71F5C0608E9C5264A3BB5FABA3E06E8303921B1346B1 |
| 735 | D015C2B4E81C0321885DA6EC232A5D8032C70F1D645D7D735DFFA54F91C5B906C845C9CB6FA80FCD6662118F94AD33C504E4A8D016AB |
| 736 | C85AD90262C5062DA06633324A0037ADA0329E6A5B1FB756CDEA8C0449ECCABE592E33E81AE43B66B884AA65F514E9822E398BFB0C17 |
| 737 | 355B07DB174A3EDCCF885599ACA101F6B164A553010D1FD7810430F12B62055258277E093FB8084EEA2AA14F14934C5AE699B78E6BB0 |
| 738 | E3EBEF158026F0516229068A8472A698CB6168F149815890DE37C6AA9A8420B9BFB7A4DACFB61A31A814EE5960092E3710C9DC2572DE |
| 739 | CE4021F843479C9D7ADF03B3C59601D913C4A586D6C78422EED852C9E359BE583C12413D79C4DD13BB5821A6021390F7C5BE039F1795 |
| 740 | 5301381531C492ED6648A107A106E39DF90940447AB13C20FEE77E86D8B2A2ACFB4C1CD8A9596D2F14C30EB91203DB1FB43A531E6224 |
| 741 | A901FF02408684A71C95B108D1D5B7EBB4482CA8AA66DFA1BAAD898D35B69197FA07E44AD8034F832AC10CDA1C81E9830F199837A96E |
| 742 | 4CD63C08A865487C960DCB64586B420DA61DA0B71EB0F7B2CCBAF06BBC80CC1C9A1302A21A9784C22BFF063A3C9EC093B711A5CB98DF |
| 743 | CDE3AB1DD7A4003D02A5D537788896862B45AF3098BD58F6A265E228049062506FD54B48BFD5658443ADFDC6EC8740FCF827E7AEB0F2 |
| 744 | 084297B1BC8B2E550E0288A874C98D16FA0E6D60280DA9E96DCBEE7455B94376C406AA7780F7DC18AB4A403683407108021B1B6E68BD |

TABLE 4-continued

| Index | Midamble Sequence |
|---|---|
| 745 | 4167CEA40FA591412A3577D5FC054148310A4848FBF74CC3581AE2BE420CCE61F802481B14EA1EB56DCDF6C8EDC36C507E2098552B6A |
| 746 | D71E611D0544A4AB44B2051420F5F568E2CC6BD416E0E4D23F262A2013D4114FA32860F6A6DDD03DE6BC25E039A4D4CC038B77959046 |
| 747 | 901E23A528A728BBC93D618A0DE742490C16226F611EC78FE96D17C4E4AB266460F6CD66D24B8310A1605750DB4173151E1F48762F66 |
| 748 | C332D216BACED4CE103A74B719980E0B33B17148136887FC3204DC30C272069F599D1B019CC08BA556552D4A04C7B874EACF64DED608 |
| 749 | 9D357AC5142EF94C2D9594B84327F060A69F81639E4D935C80F90004316E5FA90B2D82FD5883C3DE09E225FB2D01FC1DD22A8202338F |
| 750 | 2493122EE5E03CBBF2FA23A4B4A84CF156C8BE021C5BA31D0D1857D5B9078286BDACB39A7A1B038A1310019851219F3B52F3AED0CAF0 |
| 751 | 1814B0DE2637093FF0D30F39AB0B3C78A0B98640D021D2747C76881C883119A5F444D6DA3661BBD52CC08789878226B22A5CCC3DEC0A |
| 752 | CEC5A60B6A562EB3EFE1382BB531C686BA4CB06DEB941A51725C0280DE2B3312411EB06F0FB511430B18BBB93628CB77391C1EC46938 |
| 753 | 840650FE103289F55D34759AE2EF3AD9D2C5A96F63B6EB9006270FD12A716868B237F6C8ACBC27AB101463487A7562B2C21BD2309242 |
| 754 | 4FA9D9217352A6741BA5C9BAE990EA80A470FB0C51F618082B30ABC38439DA821E779F8A40ABDB6B609C4F2A732E606697C300C67308 |
| 755 | 8697C00AB51B0734BDECC251095D3EA1873E4519670676B1B0598672D17D818F88433C80A113B8A7E7F64BC3FF12AB046F8116B0361B |
| 756 | E542C41636E4507D0466BC6410AE64103A88DAD7EBF84D50776426579E7A04EC3A558980628035D9AE5F0F0953A513EB932A641A489B |
| 757 | 6360AC9A3B975851106184A1F6B9B2CE2C3D59EF9221B1A81CBF132C09C60CBAED7636F7E629D05E5FA8C4E6CF801128C205D637B60F |
| 758 | 3759E1925605C9D4C8A642473C00A7700BDCD1940550FFD376071E0E1F6F071FBB30432A52048F33C560488E6D1CDE7F13629A8ED2D2 |
| 759 | 90BCFA950D44CBF3A64D5447B515766DEA2FF008D8D04A312380004F2C955A09325E968D4754E65AAB45EF04182F38CD7524A45B7681 |
| 760 | 03A83534AAA56A9D80ED2A474F6C90D7E54BA4898D619A043CDDA784B9A27BDC63518E019A7C520554FF5C54EC3B30B48BD9305E5C70 |
| 761 | 2A6744CA9C9977628602C282F2A4D274264F55CE1E84EADA2B14DD56CFE8A403AB0D582EDE20A6C05791F1C6FC207A2447626D36DA31 |
| 762 | 4E4720366F8C7D140D490F144D144E6C8150AF0F962163B67638C6506AE7ED73028C77813889269F03784B241C8E20EEB251CF507AE0 |
| 763 | 5D45A1336B44A70B237369B2F4775F2CDE52421419401CA91D061DBD751813865A3C3CD07B91E982A6AEE6998456398017843EF4418D |
| 764 | AF93894B73F5317CE328B465805CF7D061282019D0018F49F535CD450A346C8E68C3F97761A96C825301D70A62A51AADB4205C9F2CD6 |
| 765 | 2444039764957808D57392E61F1E3DE66CE6166A4BD9D14FDCC4D60D821BB8FC13CCB650C7EE100A9C6F029E285113FE3B6F135D0BB4 |
| 766 | 07102E269270C9EC03793A1E8FB2F31A4B92335E784055F168A30B86453E80E10C5A3B653580B8F3477F453D4881CC0378ED29040F7F |
| 767 | 771EDF1182AC9F6F078A1C16CEE25ABA3C12204E542F2565021791E760197BD9B41918C19DA183B4203F221A2F805DC698E3D929AA82 |

$N_{FFT} = 1024/2048/, N_{Tx} = 2/4$, Length = 432

TABLE 5

$N_{FFT} = 2048/, N_{Tx} = 2$, Length = 864

| Index | Midamble Sequence |
|---|---|
| 0 | 7D1C1F290A456E82620BD3F751005CCA0BF4026582B7D79497729388F702B2ADB6CD0BCDE1572554C70D2CD22205206980CAF2F297229FEEFDA52C0FF96227481C127898E5C0B61271F140395A28DE77799D5A509AC10989EE49AC9D0B0E474DB5EE1C46BB953414C913E708 |
| 1 | DB02875F4D83D04C983CDA6AA9015F81413296FAEBBB2DDE9AA356D2366665D20B68CC911B9EADA8704B800263A62979D1822C3212D2ABD431E59464FF63B977B9945CF8F3065316486BC37A4775E0D7A1B3E841E6A77030656E10460AA92751E382751DABFDD8404A07C752 |
| 2 | 964E17C97B8401A54626E33EAB6E140C02EB1D197C589F9B5CEA4BD31653B1C883901AACBA4A16546626EB1D0AFB106D6A4E09A5536362DBBF5B74309EE44EBD205141C5B5679082CDDB4D159DFA0FCA907AC7B3E0751E7EED3DB343511CA983422550BFD0D0955912E22DFA |
| 3 | 90CC3532ADC880396F49B3C15A224E588CB93CB59490F8B826B00271DAA2B79074E4B2062770C230C061DACF49EA53110D76F5D50C9EAF1490C7590CC0C68BEA757173302204 59F8D39EF06EA2EFA40BAB5C88BA9D80E9B9624D3E81DA241949D72B8BF9F629D8A97B84DBF5 |
| 4 | 857B81CF72B41B6CBF378C20B3212402A1817C1E8DA2470FCECF01C07B3F617FA0CF502AA460CF218B2D2AE060B57D46A01BF90109564D598F4CA426C59BE779C13DCBD3BFCA83D53242D3FD66BF51881D97ADA83487DB6AC3040E747C390721D0D13A3C4EF3B382EBAF3495 |

TABLE 5-continued $N_{FFT} = 2048, N_{TX} = 2$, Length = 864

| Index | Midamble Sequence |
|---|---|
| 5 | 92819D21962A15B924FC010F754ECC390C478D8C5943341D9BF2A282AD358F132335566 BD1F0F4D70CADD03E0810CE6ED81E7D9261B02E5025B09421E5F02CBEFC18CE7F339E 35CFEF060B3039FBB830794DB877412E2EA3BAF9A1724959491B85454070CD52966E81F 468ED |
| 6 | 290537C52862C5A26526A5E2C9C0CFD2C612527694A15D358975029EE54BA346C2A90E F9FE1B39256FE031F1291C8FBBA9098771DA8B5248D54F2AAF674AAE77F7280B08DC9 271B992B4AECB1ABAA2A2A84162A28679B7BA58333176964B24C9566D348DFD7EDB2 B468D18BC |
| 7 | 84F113FF9A2ADBCD10D31DC293E2770B7EF443E1C080895AF042429314599D52713CCC 83B5A3C3E8492A944E3999553712D64E0171112BC56235EE520B133EF558BABD9ACBF5 3FCE47E4B9EB1701E017C35BD2F0D13C9707890B059560CE3666FB75AE648F4936D9CE 31C793 |
| 8 | 8F11D8D8AACA33104E0E8CAF263E60C60BE838A28FDCA9425123986B9A6FB2D4CC41 1ADC986AC1EB5A7A4C94613E3321B2132A94629236F8C16D1E955BCC16B2A62FBE1CF 889DA95D3BEA14D4ED31FB0809228DE509520F60FD09166C63D08E9A3E6121BF8F5D1 0FA3F44DE9 |
| 9 | 7BB48C1E08E83B6DC630634BA71202F965BA798ECF80E757B14B7FFC298103F4208F8234F14888 A5652A8208F2EE56221511E87A9801DD9846B22E7D58A6D2767EB394E7AB016906B56D6DC9422 01F62B879EE91ABE75A0325CF5DBE328CD997A2E982EFC4453DA4D023D2D9 |
| 10 | 7EA58FD844BE96898496200AE41CCD55C2F2D00E22C336ED8053D526D8A73B93B8A7E 8C94E62D4E42432919282AB9B2674AFCFDCB0281F2A42688F6E0000E343FB439AEC853 F423B2E2DD8C7E591E62F7C493FF5F031B94433F4C42A94EFB17145714FCB142AD02E5 71961D6 |
| 11 | 2117963D247351B543A511A604F4E483B118CBF2A7E8A1E30F4B807538643C8C501680A3 BABB79EA55E7E966A8D32C2D532215DBEA88F338F33F4C92341504E82DBD9506E98A1 5E9C55CFCD2069A54D7E91FCD9639E06CDD8CC0685E2C39CC20269C8EC03D18FBEE2 73136D3 |
| 12 | A671CB4F5808D6AFA9C7271D8B1CC9DD31AC2009E89861B7635AF98ABDA0A88298B8 7C108D735B991BEE903EA85699B069A2CA8243F16613E6F47F15F233A05DF4736550930 D282907B19CBEC63D2D0FCA5D06F51884F4B731ED2A329811690F3640A64557A148C25 DBCA987 |
| 13 | 1D9FB6E747D610CFFCF7143130020D6F00DDA061F60324098A8BE05E0A78121747A8240 5529C0C20451D7175AD61FB3D69360A678BF143829576F4094CAE69AE7C98E7E34C774 C1DAF213BC75B17E2BF858E4A8AD1ED6E08D061EE4862807D50D633E6B868F60F5DB6 7A6812 |
| 14 | C4A110BBCD8FFDA2C076F66184EED42F2A0D9B0B1AA1F0D31AE04B0D620484D791E DFB3FC94E093D05585AFD59B48043C441FA01197978500FBF02F4EF95E89F9344C817E2 FF510121ABF36241546350C50F02E1206D91568223BB833EE37EF123BB4D575D1955E971 FB5E75 |
| 15 | 0B05C3BD82259849DCA05B9848574B666B99836B21D92792B58EE416D5CCCE04A106B2 F4782A5F6BA0871198605617641116E7FEB8015DCEF2B00F74FBFC2F6C17940410112874 815AC86E9852AD4588B8825CF208E9C52DC74F24B3DF965AC4A1FD046E5DFEB746EA0 067AA |
| 16 | EC7EDE11643FAC7A53F559218DDAF8D9D084A0F5263384222DBB7E18C644E6E41A2E1 1E54611FABC3B355FB532A3809EC2B118889409A6C7860ADAD5A4E3B974F94F29B44A9 00B7E301B15EC54D735DDF8BD87B07A66B4ECD4D3E1C53B103D14FF7F884510338F6C 6E16D8751 |
| 17 | 5C6290E0CFE2498FBC21AA67FE93EA8C7A59F16E9202F9C2A966502BF9F400D1A1484B 0CF8FA92AC1C46D5BD52263D56987703A5D978B95074CFAE3DB75D18496E82CC731D1 DBFC4817C354D0D092616286BB23AB8D2D2F490A1EF7277AE51B4723903164834D606E CD8E37A |
| 18 | 34B5C8885E7E4C31C5BF85DA88934F588DE42430CF8A91561CCEA032D00B1E0CA0A42 5F3A4B8A8E6CE4A470B699C0A2B38DE3F24FC0782B5613F3EE536C7A49CF82AB07697 734BB01998C1F61DF4E81360AFAAE6AC6E922CC8C152D84D089D2C06757A791EAAAF 5DBB318AEB |
| 19 | 58A5818405CB9713F5928918447D7DA882E585B5AF12AC0117B918F0CF0DD30BEFF7D4 2F23D0CDAC4C6C84B4C4AE860A24E59006F8F9088378366B85BEEA07D599521AD02E3 DF8240932F07A4D3EC8268EBCC73492B57F3B91B059F4AEB79C3E13C52C8F0A6A53A9 52C74B39 |
| 20 | 58A7702055B118270D3C70DF03445A54055A017566850A84A9E05D9BBF9DF1ECBEE419 A9BD1C2157F6480CBD4324F641957AA963858C7074DCB0E5DD8BE25FE729C08FB0EA E0748D2D5EE62DD319867AA69B70A6EEA8AEADC681CEDF6D1D83053425A58D946676 642FA971DB |
| 21 | 4C55CA54BCF575030B088DED50F60129250F2D8CA203FE801898A5F625A2D8769105941 9878B00EF3D91B8D81D39AB80DE83EB4424E6C6DE430BA3D521F67686971BC221560D CA956270612AFB44AE440E48FAB54DC553298290620F4F5972FBB0FC5E61D3C46EFAD7 C76B5C |
| 22 | C0068AF668CD68DF608173C5ABE60A73F9BF969C8E2A72D3F2412F8F20C6D1EDE1EA8 B800091650E57A624990562D628C8E120D80D6DDE2C90DC99A8A38FAA04DD60F3D49F C75AA59C8C357BBFE28FCBEE69C10906F64694A1C2DC7E8C4FE4436BF7D0C95C1BA3 CA566642DF |
| 23 | 73F137B68833010CAC1A916FC8FF55AC3F45EBDED71E4730C7D6708523179725C111883 994CAE053008BA26226BFC9C0569D74F4F4D5E8C636B535D0362613BEDF0980CF74B2A A46B9BD296427906961B42161FB246774DEDB7487585142EB443D37AD52778F8C7D4B4 AD74E |

TABLE 5-continued $N_{FFT} = 2048/, N_{Tx} = 2$, Length = 864

| Index | Midamble Sequence |
|---|---|
| 24 | 2AAE64F97B4F5EA1974967C9EA2A5EA483600BEF52CB111574D726BAC70B26F33052C F02D97E0120C07E6022908C1AC093092EAE63FE25215D1140CF85A3F797179A27803FA9 DCF429C27D8717C5AC78CE81672C5C2FCD4F09889CF4E0288D339194B95AB61B56CDE 13704AF |
| 25 | C79DA77C306FB8AE95532773275ABBF4922C83A0031CDF800D80113C4A4D3B5E63DF9 01AF828A6484B0A3B0406970B4533B20B52F6291B75A985704672438BFC5CAD4E9E9664 BEA1E91C07ECE3A15C9213FE27A30FF20224E792AEC2F0C22517EBBB9B350FE74D8D1 ABD0C23 |
| 26 | 60EB305D4A8EB8A7F2FD85C6D046053D5DD088392D9720076157A8A2E4DBC188EA1A 695919884B4174B20AAB7E8DBEF23C10C141DA583CA5B0AB09BACD683673FD1F63C0 9EB23542369802B74C04152D88A20F6444A1C64A5A80874C80B2F9E7F96A95685A6C8D0 F7B7FB343 |
| 27 | C14C90A6CE07AF915302CC823997BCF12080B35E6E23403E1AB45F8000CAEF2CCD9231 2B1445F0AC98FDB630C363877262BDAD8839F5DB7090F9FBAC780798464DD178EEDFE EDC088636554074ECD9CF2D8BEEA891AED2553D02B51897082BBD8023A99B6DB0EC9 52E61CB2A |
| 28 | 2AF836D43E6BCC1C1F95B7E7AB0BB80100188F634163F7E669CDF6B1C23334878181B56 4F1393D2D0E60C92BC2A845C5D5D212140F68C556055E0D76AFCDC99654D72B1927E54 33D8C9D4255EEDF421AED205A9904B6F7A2D73C960F5C137250AA74230DDA5D500389 CAA67D9 |
| 29 | 33BBCDC495D005D95000A34D8DC22F7466282080DAA22EF6822D26D7524A1271CEC4C 2598CAF5457B51F85F7A536C39F2E1EF6D94909A9FD2FACAAAF2B4454A79EB157CCD 9F39EED9BB300BCD3967507E1CD65914A613859307A8D924C437DC32D51F173149B4C8 C84E8906D |
| 30 | 6BB7EDAE13593C867D800035B3D384869640AE631576ABBAF383914EF11530529A9CFD 4B26EA902B8006980395B20426C19C8D75069A17F29868043299A2CCB701A7925BF2C7C 1257804CC72345E21C77386548FCB0439139C0AFFD71327629DB1A3764F6A9BCC0CAF8 3FC67 |
| 31 | 0EEE84969ED24794664A3DCCA83792D80D7173233915C4D48F15E7204802B7B9FDBA3D 4B1B7F349527421E81168134E41DA898BB03977B424D17F9C87822D3BE5DF67854E4420 D33BC6D80A46F542C76B78A323514AA180F7099E13B5B550134D95329A68367BD9263E 4AB0B |
| 32 | F2BA870060F41E5270F87D7244C1000F1889B8E4B61704D865C5AC689621DDD66E91148 E299C13DE3E2F5E0AFB94312CFCC816B583450EE44879829A72E4D04CB639D44CB0CF B4FC41711DAF8E4CABB93BECC72161C7971D64B1631884E38FD7E5D42F737D7DBA73 0EB225BD |
| 33 | F07ED2988B5B40D5B718D71F3085F6F607B554845A2F22F4EF15A005F34E7194410C4BE A046405BC0156898E1E62B6E46D14B24C34E4A1B8B1C8A28800D6E731E8719B8E61ED6 48EE2F337F5B1F132F1D83EDB9B6BDAA5D2AC2C936419E767CABDEA0F14407BF786D 056A4D4 |
| 34 | 446A7810D76A1772DA03CCD07BF1A11402B09AE1C4AF3295590A90045AC701BAAFB8 8B4CC70F2953E27CF84A044E32DBFE41C075B2275011BC13DE1CD42868EE16462E053A 79612DF4EAC1ABF5583E02A0985E2846515C092040CDEB42CE39D6FA789DBFC0461175 7D5B573A |
| 35 | 26032BD6E5E7810F4906F2AC0434064BB9553684CDDCA139D0C10976CC6196B38614D2 3E6029702067370AB3EC902C8FA8B37C306F74FEF27615B394D665DC26549AC82B5B47 C543C1C7CEEE80F02310B2A951A61EFAA5437E4BC3012A3C76B96D190D74E6C299EFF 61C6068 |
| 36 | 0641D7AE6C4258068011EA4E1278412CD98C80A8640CE7A3A1D86A7D63A9A0B6E5169 06EBF539C7BB32CD1243D443B81B64BC6ED6C14AB0C147D551DC672362A124BB11FA 65C801159332787BCA46F898E9D5AB27F7EDD30076BA5AF7443B986753296063B745A7 BDBA75E01 |
| 37 | 61A106B3A1F67456A34EFB8482C83E164D0DE30779C798A3A78BF96006AD5AA90547A 175528C56D779B756492A430DFD60E4119966F47A7B85FAF877AB759B5D02D534E5E90F 2FF70189F3201E48398855EB27C10A14FF1DC4C92B88CD8D255A1E0C0867ED2C1E1B33 712F63 |
| 38 | 2D33685DA06BE5CBC1B1389AAB28155AA2F6B0D00B1460577555A658A4C07A0E9476 D5E356C7D310FA05537488DE5B8A5EDC76075B6481BC05B5062371E05EDE5DCDE038B 38A5F96BCEEBBF9C68244619D057F3DB1E025EDB3424CC691C75C87C8A2E230F3D3E AC01EA95A79 |
| 39 | 5F9574DD10793DB88924288A6EAD44C29B184496020EB1944686D7A51FCB85FBB0D9C5 0908155253204E624B5F83E4F1863FF8D52F8AF228844BD3F34FD649584E49DD9DE8079 A3BBF473576E2D8F19BB75AD8ADC4A143CED139DF0B5FADFC004C1A38007688ED5 CEBC02B6 |
| 40 | 949CB4F0618A62AA0329588F75832083EE477F4455EECD54E451BB255EC2D968CF7FF80 A89C89C8D44CF6077E3EFEC3341D081100DE7917F8DB2C5925BA8E2B87D4F9854C2C4 F3B0489CA93296BCEC9F0C386D57DDC3B7EB09BC22F82B77C7E6F02F3C3DE8261EBA AEE92328 |
| 41 | 5B44EA3EBA1247B9D2EC71463579D21C98BC3502E8875FF32B820605849E59978593C19 900EB497E8263E5B9883C80F58F25A0C6E48616425CD42ACDAF949A798CA8BBEAD714 2C0364E6B9E0C28CA66D92FD10196ED335D66F586CFF12E70F57DAB3D849FC29A87AF AE6989A |
| 42 | AC4064F425D633AC64AD26E3323FBF35460D638A8BA638A3DC3C717C2E4D422847783 524A7AA94E4EBEF6F43B28D8E8852370A6F7259783DC14EF5110DB51E0ECF3D0D6D02 D0A789FFA056FD4CFE0AE098652536506A09B196C402308413F9E6FEFA20CDDFAA43D B5981EE97 |

TABLE 5-continued $N_{FFT} = 2048/, N_{Tx} = 2$, Length = 864

| Index | Midamble Sequence |
|---|---|
| 43 | 16E836007BD7A62AF55F8A8B22BE9D497F30A0883A46B3127B27B2701B40E1889A319 142A7381E1AAD0A2E5E403BA53087AB64D1B6B6EF02040BE183CE4DA66E4BED8E949 B9B939C70C968491060BC296030B7A7EB899904AF84B436AA69A22871955FF0D3BB345 7BB2FBA7 |
| 44 | 412E9D161650B366859A81EA74605E4B0E0E0294C2317645F6C116CBDC18B8B337EA591 9643BA54C1B7218A100F253FAB4ED8E3F7BD0328626EC8A25B1FD2D6218EF30C108A2 0E6CFF27A2D37DED480C8C7BB9CCFC18704167C369C4A6046AA1D14B7F2D72DE5C77 F4B11EC5 |
| 45 | D6913F3C8F6FBF6AF82681522C65ADA0D19D8CC9263DB45CA2D521280FC8068A3A7D 009E141A03E9F2EC291633566BACCB602300F0575C67C56937E300CED2A87676E39FC49 4642F6E60EF7A94C0E1B685F21A83CFD8E919C4AFAE046325334D51BFBC9EC45744706 CD44510 |
| 46 | 3C44283E26E17EBEFCC70AC80417EB75658E64A09A35CC25C8F205B843640114F2A8307 C00CF38A4E8225F9D8AC13628C78BC6FC529534BDDB1841FA1752C24F541C54E27DDB 707D734379FBD12912D501C3394E4066EC6E640B66DC726A10DA4370C0DC1921EFA50F A2B154 |
| 47 | E398407B116D3431A4AB58DA99DE9AB3F83874A0D95D7AB399CA611542C063241C39E 2AAE85F9281711D2B20DA4528DEC3D7B48431A576EA46CF8D3B70625E628B7D29EE95 E166B32D9E4C0F531954961064312AFC45D4FC34B3281150D3DA13A2D5F92C5B117FE3 E0DC8AD6 |
| 48 | 4901DBFD8A99CB4B450801D6F71185C4ED923336310F190DEDFB377247A0B8D76A0E09 9485C0B0E957B2D38239D0D9160758E1814EF42B554513371ACD1F840C5BD01D4BD7BC AE17642CE72F6247F48B49314A4A49BEEB515F5779DBBEA9D80E38E41A03E1BB092EA 8663774 |
| 49 | C18DF6C17DE9DE059A2473A4C0146A3D3B7221684F3AE9D0C24714E6A0125B02474E11 D66D8FF5ABF1C40C83C5695796B63CDCD4865A9A0B6308525FB07E1ED5E5C38D013D E39CD5DE6A746A0767E30944E2EFB2E7988FC1AA7263A48C914BD4A5B5DB611A91CE E1CB11122E |
| 50 | 740E2E5D10AD092A46A302E8765D71C297AB0B29A2EA770F732598EA131E31C808AC1 02F53E934192B23AC1706306BAB13844A7605EED8DF1B0E55455AFDE6F1383689299666 26A6ABFD088B30E1D0B936396B3E7E96FA06EC8AA89C509AA16177C491AEF9AA7580 616ECBE5 |
| 51 | 4740FB1C2E828860D1293AA927F5B450A8B55058BA49FC3F548318C5876B7128ABC6385 CDA71033646F98712FEB0479A6D1CBC3BB85C191D64DA11A36382249639DF0FA37BE9 1281FD5FEA9AA4B22CDBE8E6C1BBBF25A033065BDBB16B4311D557A9755251E52025 A22AEC17 |
| 52 | 1676B6D855D4B09C328917323C13291BD9F8C0AD7F2CD2CB4F82A3F094A2DDA9634C2 E4E4B97758BE20A06C3E64E9EAD26E3A0420BCAD0C80F9E44B16A75D500628873BCF8 E1EAD3E37D205C688BCF7E6B83BA3B89973066A63A7159E777B16AC62D1F0DB6F1441 1785F2DBF |
| 53 | E4E2EE5BA3473F78CD44C120324A9918A30B61CA710794868F6E830FAFAB49E0093DD5 A0A32A4A9DB6A2DA1D82C203F2864083123E3BEFF007BAAAF12355DAC0FE8D066AF 801C8775DAE44843658740B0A6ED4551657500B8C437041070EBF0B31F3CB171EFAF6C1 FDC62D19 |
| 54 | E1CF422E49C4272617B18C56F51821681DC2F15E59162C34EA611C4F3FB6791C0ED1A16 DEF0310102E926502981A971F4BEAE526FEB06DAE9CFA4413741294E16CE76CEC2DC8 C376C92C512AD5CDC3A0A1BCCCF10B90F5532B92E3FF20C21AFE920634D2110AAAD B2E98EA75 |
| 55 | 772F033405DC0845337361DE5E2B6EC6C8EFBC329F83BB7C8112403A65F6280C30D2490 E592841B816C4C4E1DAC390B79F73D80E021602A0D6EAA1093B33113BA4CFB99FCB50 DAC517D8CAD0C3A650DEA0439FFF47255BCD7EB6AAFF4BA4DFC140E160C424D399E 90F377AC8 |
| 56 | C087D8CCC1751061FA31FE761DDA9F5C03C9FAE01880105D4E60A6221F1AE669934C66 902AE4840788D20ADB28ED696FD2E0AB833699BB683A09B34A37AFA73B78C2431E445 7F34EDF3A70B439D488A535799AB04A6E3771448CE0F716F106A09D8EB70A790A5E17F 3812C4F |
| 57 | 020F81A405E7E409A4C34C26F0E237F3B88857CE4A37EFAC42D25E4E192E181E2C053B D269C6224E917579A1B16F17C18340EAA7860DF8F56C11655A392A64CA9AAC2C4D90D 4D2B7BAB7227E0F2D9BF06FA05534C72A12DC771FDE57208E1AF08F8C67D80E8537576 C694618 |
| 58 | 2868130202F5A16968D4095C8042189E2D69792A3546E2FFCE32CDE17937E9031317128F5 EAC31F8DD061693C3038EB8B6A354D13181A9D5050EE9C94FC31D87FDF002B0B1B514 91AE24D73442517C37D303F8B0E7D9ECA0290DC333C7E05EF71E131946FDA43C851F45 BFD3 |
| 59 | CFBD58320933CF1EB288447179E3645F688A75CE5943EF892C672051196C3C0485D12269 DDA5C23EA691C45C11DEC9303A4242805934707815ED47BFA51783AB3B00C6D5BB79B A9F684F7F8BF4027E34C0AF0CD0D0C8213F9814C59EFFEC4423F14942749AD6BBD117F 27B3C |
| 60 | A9BB16B850A844FACBA80A38BAB04DEC22203B2F736D41FA27991120BD2E33168345 6CE875000DF096BDADF11AD34E6290FBD0FEB2CDA62267EE17741AAEA214536FED63 477A4D3C23D5979E35910D433DDE16D46328BABD702D61850650829D31E69F2182B826 A564A5E44 |
| 61 | CC806C7D5BE698A010C2B0DA4A2448BCA1716BB1CA857C5FDCA50F742502AE8E6738 6581967B29FC3BA1F1573527D524BEBEC088848C08075BEBCBA5B3ED75A63A708E0F1 13400E582460673B82982E68121DB44B5714E1CB4AF5963A391AB7D3FF1E3069152748A 75F4B3DA |

TABLE 5-continued $N_{FFT} = 2048$, $N_{Tx} = 2$, Length = 864

| Index | Midamble Sequence |
|---|---|
| 62 | A853F6DBF76C4ED994B05144BA9BA915DB81F95148D74E422D769BA3426417A4C5050 12042CEA26C11A8A968CBBAD2F10D516D74805AE2867C1EA7C5C999CFECA61C2B442 2990D7FC46B87AF8528FD81F8878F56F4BAB8BBE3273899A0AB800BA6C1794E6C8900F 18C9CDEDA |
| 63 | CAB0814639045C777D29753AC21671771A57CE6D0701B2F1BAED8805B63E0C3A185983 6CCAD482119FB76B02AF4518CF8B449D3406F409388DAA7A04933394CD1EAF5AD8AE 103EE89FC64CF0DAD5955C70F74CECFAEFD2DE8300D110449D2E108EFB0C8893513F7 74938ACF2 |
| 64 | 6C0166F5CAA870DFBD89AD8E583074FDD6C28E44C60E285A4C959E300BE488D950228 D20480C2632677D21CE2C1B1635F983FA615AE95DCA2CFD4F38A6025946140C72AFE8E A01DE72EF3B99235D95BB9053970139142E988C725C3F82A166FC41A7E527C98584F2D5 BCCDB8 |
| 65 | 2D1041883C1F8B826963AED0C0B9E404F63A7A611EDDDC7104D5EDA1E9DCF7176EF2 EC0A82BA8FD10C6720395B9851DD8BA68C0210872E64AFC2EBDBACA5AF45B2AF013 B8217AB6ABD81C6B48B0D3053FA6F50CCC510B648FD7FA9034024ABC0FF756C55ED0 345C8BE3406E5 |
| 66 | 11C1C119AA50A8F025995CA5C10601F36EAE0068E05DF188DF7A263402B163013B24901 EBDB4E16021363F5A66B8D7E5E7E09A457C8BF7D714ACB4D2D7D076344590B8DB6C3 725A398E1447F0DB40E0E7EE12ECFFC2B00B45D802F628439A54F68A9C63C388AA9FC3 EB85C0A |
| 67 | 94A28BE3AE9C53CD330B90DE92C5A97282D4C734F0882C2E5AF997E15B3048F8C68FA 728B4B885AF53A201594C1AE8558063109EA44AAE4F3F62207860467A880742A7FC4655 FB2CF519E253D96073693F2F796A89A6C437C00A470C80359FB5C2EDE06441B1E68FC39 EAECA |
| 68 | B0E2353068E61ACEAB55E146643241628DBE8F822089D63C1138B052C0E2760D6B2A849 66C70A64A1BF287FB3C6E9E13483E9E654A38FA4EA5704A26CF776F18D292AA9ABEC0 0493727CDBA05B4B58C0314CA07955FA3800DE9E5F9A947077818B5DB6C5A684F1C90F 0BA6C7 |
| 69 | 9518BC691544EDBB8F0B9229908C371E77A54E57D1C1252E9947389CD1081322A104BA CB4ED4019AC0CDF72702F068836AEEE6302B84EA21E54E07A8EBB3341A6C39C65F1E7 09DCABA6CFE1C1810F611C098DB490F2455EE7C61FFFB44CAE628F6E405564C7DAA5 AEE5D7A6A |
| 70 | 0E0B5830EEAAA345F733156A77BB836038A9C641E7E3D061E794E4721E2A8826C38FAC 94620710FD1BFF915391501328528E92D68BA9EE7A541F6821F5FDE46B702957C0A4F552 34141F702D4C0030B5A77F0865B83CA9ABDDC5BF798EE107618C2BF26A6E87D825C4A DDB2B |
| 71 | 899640EE1E53AB434F08A5C4BAAC223FE487652304173ECD3C58A84A3042FAD1E77F0 DA37BA63AACBE190E525619DF4ABC16602C1DAA9E95DAD6A2FB5F0F572034966B3E E02FF43883D09C2C0D05F98A6F5240638A1215A6EE34DB98FBC20FDF6FBFB0A771F64 CC73C516120 |
| 72 | AEB9772C7B28CFFB52151C2486622A62CE2E98FEE5CB3300312BA6C574DC02BA91E00 0F9E73008CFEC633687362C5E4E9C62C96EA563810BA20D2FE2E1F284F0C368A00FA387 521009AC8D432A56BFB442EF9AF457B3AEC371B4DB1A72E69F225383FA4ABDD8FE04 F22D16F0 |
| 73 | 691FCD433E08F5478C0F08D5248F5C4D030062C149FDD499188E1F2A31E5C02FD2D5F 3A71120136A592B08ECAB8D10DC25F564F6D2E18BFB5E55072D6F009B91F6DD660F9A 417CFE12D3A7732CDD057F75660B44A56A15128A8D1F47A818E3AE14DEAC603D938EC 87186479D |
| 74 | 1D49192341E095D3C1BBF2BC053E1373988807D63F4B83A542304218A921DB8FDA00DA 1883F20AA835344B0E6D9D538E82BEF67AC26999A613BB3DB55FECAC5AB9244828680 843F3FB94226012FD7BCDD18065268E2A2FCA82DB8A13CEF81C7F96ABC856159EC65F 3B51E60C |
| 75 | 380716A0CA71F53D0CB77168E9C193A441139F0061622B4C74CF151940F78F69B12F42A ADE6575672D8A40423728C2E1B28AFA1D841B5122B6765BEDF24108367DB722293D845 06E2DEBA9130AB61DA534FAA42FB1A8FBD6FF6C46380980C5267770E4B3F05C6DCE4 BD21B5F |
| 76 | 340FCE0B911EDF7AD2D2825754AC21A403F394C7F1094D48E655E088C2F65D47E3740127 78D4A4DC4B78CBB808EA0AF32C023F2D3AE079B4260B98A149FA7F736EE47C6F61737 CA5E0917B35078C6E8E5B59D93AECB94321694F9A59F36303578021012C3C5156A658A5 9AD78 |
| 77 | 0B809EC3E42D7B990A120C5E1B30457273169E59072CB1F1DCDC02F3CC68DB173D888 CAF81C495E9AFEC4197527E7731521744954470AA3E4A04F873599227993ACBD5A3EAE DB5149A99A610E9183356BE5EFEFE0898D20F6C2ED97A98F8330111701A6E54522CF0D 2EC32DF |
| 78 | 35D2D33AA45061E4098BC53CB5280738FE60840BD064843D0074731F7136F923B3F28F8F 2DB68BD6241A739FEA00702B45047CC94CAACCBC05ABF04CDE34900D88D470349832 A031CE3A97F1B0F0F0AA372B4FCE3B8728BD7669DED0291D2B7CD9BB7682D627FD0 DF579810D |
| 79 | 2A4ABD6B453A564B63B416DD2773A22496A4940D863E28C74F00AA9E6C19621524262 DF20C70632700F0A74D1BB955177DFE29B58B462615C3BBBCC8D5CC6251580201B50B CD98FE43F5D7F795C499198E1C16023582CBB6843C5D67588107CFF9EA5B71C54FC81B ED26B111 |
| 80 | D4A5118404067DDAD8B574BFC991718618C9CF6A647156446CEEF485083DB274652F232 A1C6661C8F0AFAA74762C26A8045CC0DB1C2196298919AADF8BA01B66D2EBE5F4006 2E1B62F250DADB61F2AEA113C333A10F86135FECAC7E21B29A848F7D273D7B05FB47 ADDFF4738 |

TABLE 5-continued $N_{FFT} = 2048, N_{Tx} = 2$, Length = 864

| Index | Midamble Sequence |
|---|---|
| 81 | FAA4162F1C86E5C9E964A70617540CD90E4FE208E3B6453510396EB7AE83B73593B0A44 0421BF09886EEEC90884FCE9B15CF39D74793B2C5EE33F0CBB48A8E514BAA654D089C A184950F38CA1869203D76CCD7CB996773FC51EA5D9105F9254E8EDEE7DE5D6966474F 18C00A |
| 82 | 2CD1659BB52F080511AA41F2380A13A19B0C98C0C923103C091E93BC6B7E2FA7AF6B6 E0413E37589C3988AFA5EB9F8CD3017BF390FA0BC754DCE9893AF2235F8446D6548AA2 6A66543E9905DB09633A6AD7B91DECE7CC64E0ABB54682DBA1C866EF5C2FA9C0B88 EF0BA58979 |
| 83 | 0C81421F9CDB0AC66C22981404A488D9726A7E277E03351542094A83B0FA7347D6514D6 CB28B9BDF0B7814DEBA20D6FB714AFACA9F2AA939D48CB56AEA04CE51E711FF615A 39E38059295AF8F8CDB8E689D25240356904C3606FF0E5B65658F15D0C1BFF33230BEEC 7AB5D98 |
| 84 | C5F95029DE2666999D5E832368EC05E09A0DD13CFB690A3CDD4E1C5635B8C82B58E0D B046868507E0826488C1060A31AFCAC0C49435B16BDA07916B7C7FE923E2ECB019783B C88FE384098E2EDD75794EF718CD5FE4725B298C992F724798053580455586920D5A2BA 9FC7F4 |
| 85 | 465D546B47069CD5D457BE708CBE929847ADF6643300880845C24DB5692ECA8C83AB51 4EDC10B4A5DAC07206AE031F34755F6275BA049927924F1759CFBBD50746E380F3D0FA 74F128217D4D07E7F0B71A3DBDE8BA6DBADC0401FC2C05C41CC2C7B86F0C7289BC4 F6EE9DA4E |
| 86 | B62385E81B162119994C012B977ADA01946DEDD33E880C93CA98E3AEA92DD6E7B530C 1B6EF8141F8C88390D841F75313166495B4229FF081836D74BBCB2DB66E5020587445EC0 714D1EAF969255F6ECEBEF319BAD854545B8643BE2E5C5311CE0A73C66659075C7C9EE 11FD0 |
| 87 | 16AD78F0D42DAC680A166BE8345A924F40D087F6DAAE8E1162886A93610920A3FCFC1 DC1991A82450347E29D2449F09502E2B56ABBF3673187BA10959C825572260477BCBBA3 4EEFEFC11FDCC6FE6DFD308609AE2739F5014C1D92C78FCA7A33C0311620F7DDC2741 A513716 |
| 88 | 8A00C16461157813D12F5B080E20D804650E770977C138947711D1256061F688E2FE29965F 3B2BB9EB85183AB9A9477A5995BDBA84A31F52694DBA82D9A13FE555A85CF5CFF9A4 C404CA33196D6A1BE55C185996669F269726556A3B5FD85B9E319BB543F703A8DAD1B2 1CF64 |
| 89 | 4168E6EC884F8911B0228E0764F8C19BD6F296DB0450974C691D6054BA18C92870C9942 D91506EEED13008F977F0487E3D1979181ADF4CDF94AEF586725BA67CD93CEB00E5D3 4144DDC693FC45C6BEE0752FBBB09A3149CF13D8A90F8C557F496969036963C46025FC5 CE3036 |
| 90 | FB2A5FFBB4B5F51000D3A50216DD44C23E087B87B5E3BA3FD388FA26C1496A1E7FD9 C82241B15F58138699082462617B21CF83883FC2CBC837CB4296B106E61B557032B16BB2 F6AF855B65C9578CBB8914B5D6B1D42734AF12FA113CF0D2A5521208665D768CF4EF09 774C87 |
| 91 | 0212CFD7C500C63706268AD2898452ABE473367E216324AFD691D1D5CDAB2220541A3 D2DD83FAFD5E8B4816C924BBF44CEEAD156031FDFAF6477103F04EC532000D652EEA C3339353F872B214CC13C9672F9C7C61E4AD245BBA473E9AC42C49DF1CFB5FA83B108 7834ECE3DD |
| 92 | 61F58BA5181BB24A04135DAB88790833745DCCA3DE6D60CC7ECA1B23005F857CBD51 B026331FC0270D96C98E27898EB4834887950A883E1F8A6F12980A8960CDCA9932F38E0 644651DADDCDD94A8AADAB89C48D060F0CBB5E55F7E153F61DA3703338B1C788F83 A4D85E95A4 |
| 93 | ABB128C1A21E66A10B7608E863A74CDE024861E2B85C281CB2924F730159C0EC17293E 69ABEC86CF34C638E97BCFC626FB90339EFC85AA155B4222B0849CA65D844A4C0ED6 E7ED175315E850779D7D6246FBB789837C980FCB885AF165EA1146CF69C52EBDF64400 CFD9D7BA |
| 94 | 5338E06F511DD928ED915B3D90AC32A9F5AF2842F0603831CA2FB2214D0981DA6C431 D3FA4369B62D4FD4BD33A4D6D04F083D2BE56575C67633457702CC811DF0FAA70CDA 12C79147151F070F876166D918DC88F502B08FDEBC0CB7BDA6F2DFE3AE0FDB6F99D37 D920CA90B1 |
| 95 | 051D4E2516208E243D84A8D720952DB22CF448240B35DEA79DF84193FB4C22F0A9361E B724D7581E8031D66F7D7366E33B508704C467F1724D97CF89ABABE47B7944E14FA12D C01EDD062A55EA5880B4920136078019BF3C93735EFF7249502EF78F0CE092ED87915E5 709F8 |
| 96 | CE1E46C4AF94CF3008637C6431117F382ED836C9E4623E27330292B69AD88E2F62D9F5E A956EC57006BC47343D7A82479281614608B80D2A0DF5C54B497E3AB8E40FD920B7E72 F7C1547EC919F8FD96D5823C98A96A42221C2DDBCAFAEB01EF830114CF50CF06F547C B5BC6B |
| 97 | F16010EB82291AE761E54F162169A643A8F29F127F35652442153DEF17C968E96938E5E00 4E24683BF15433CEF1B132D6A0004AF50C65CBD35BD882F6F372966EF6E3A0FBA56174 96C3F4A9AF087320A80A5380D7810D0BAE6A6DB16E670B16EDB1122B3D8DD05C88F9 3B62C |
| 98 | EE87505F304F4BD4EA03D416C434B7FA5AC5AE33ED6068AA5A9209404DEB8689E9A43 64D274B1C3003932CB32A4B1708E06A757BB63B8B76467F7C20E466601863B2AA7DF6F BA3750472D28B63E080ECFD97AA51AE33CAD67616C73F8C57B055674F24C59DEA02E5 7E0CD9A0 |
| 99 | 483C872ED9382602A05DA003D881EB896CE6EEDD539AC9D9846738CA895F166792EEE 52219A3CC4CF217B642A2435F0CE7536CA7865F48F6BD69C009991940A9D639928B5EE0 9A83621F15E63BF702CD2F01D322F533D1E0A30A2C1E13934EB6D6AFB602FC77252929 CB6399 |

TABLE 5-continued $N_{FFT} = 2048, N_{TX} = 2$, Length = 864

| Index | Midamble Sequence |
|---|---|
| 100 | F46817C2072889973988B9D3A2692DD5491D5EB438ADE0E5291C18FA5AF152126CCB69 267009BF6F0F110230D7EDB9B858060753992FB0AEC1372F13855BEFBAA853DEAE4E10 D8ADB1D5245CEDA117B0C11485E9A4773284FABEA1FACAE8DB6826B2214373DE0B67 8F7D10E4 |
| 101 | 8C79D340C978DD4AD3E226BFC804BA626107CCA90395963DDC0463CBAC9BAA8C763 A4F16F384D907B152107D0377976C21005730D1C3977D8F0D008D5AD9C621601352D333 CF3D17B0B262AED131D59A32F226A600535F69206C181BBE04AB35AE2F4136835D927B E8F5E995 |
| 102 | 8C67D9C612ADE1EF640180F6A19C80013922ADDE7A4160D60D5CD46CB20138BC6272 A31E20836A703D963DCDC86742413F70E7408ACB28E3B22B363780389ECE96E56876201 B982E3DC5AFCBDF9343A46E18AB400C52580B722E47FD1FA3C8A6B6C97E9A75569D9 4CDA23C68 |
| 103 | C162185479D70786E4A20355E312D1A4A55F2E1E429C4472D6CFC0389EEFC4B83ACF03 F44404ACEAF1E891F06691A0F5AC936832773C55877D1F14B7F17F70ECE864BA04AB53 BC8373DA293D8ED8EAD46473061821942CCABEC7424DE983330A0CEDE2A9C8C2C8B 547D46344 |
| 104 | 569161899498874F0C05BC4CE237A8CD9DF58453E89F2680EB0AAB501D2C02975D6F0A 85838B2E8721B8D0C2B8F470A947D92904D9FDFB25B9AF6114ACE51FD18D5E27351FE6 97D89496870D1333752CCEFECAFA12E3E836A0108B2C64889CA2DF24F33FC048B821ED FA450B |
| 105 | 3D004CB32FA1C05455E02FBB4E8B0A0907418C8C57F5DAA054035D1017B61A71C8B2F 3EE55E76CD8D1281719558E6E247A7360A22C9338598F13C4E8719A5D2E13259430DFD1 D7BB04E98DF93D5474FD21D6AAE49E06463E2E45FF5D52D63119E82051277332D519F4 2064E6 |
| 106 | 52F21A90E9B0E79DDAAB915E0845F75D126DA548CD9711146876A81622C52BD88DC15 0239B900BCDD8E6E453516B930E757CDC0DA2EBB84F00CC11B343167711CF096BFE80B 947964EBF85F121CCEBBFE8E6838F181F7CC20D358D09ADE9A0B51E3FF6E460B14BC5 7B11EBC9F |
| 107 | 5D35C0373411A8E108C1A274122A29B3658EF416E32A8E615F71633E0375F438A71CAB1 DFAA340535999ACF108C172902B73A2D8B457581AA8C29153FA504A627680EB4993823 A48CFD83F9C21175997C374A95D7D2322BCE2F00B4F81334BEE9B66F97815358A593BC 8EEB7 |
| 108 | D0498E1CD501392A90B29A5D11A202F0DC32E0E942F454E340637CE41F6C56082F9CBA FFCC69A5B959C48A8D1F4810AA7431E51C61176EE52903A47858E1E5768DC56D18EEE2 2E020DCE06FEE4B763276DDD88B882AAE216F7720BF640F99D24F48394AA5CD9286C8 33B8C73 |
| 109 | A9EADF536718C4C48FC9DB43166AB27981B3A056BA8617B44EF6D2BD23CB7CA3904C D8F10D3B8260B307F695582C721E0AB563501676EC0D9BB6E36487E93B0077CD6B110B 06846B057CD4FE103FDFEAC27A9F37DA9502537C4CA7B669863187E0DFA42746237DC E1A4AAF04 |
| 110 | 59ED64CA408986C911CFFFB4584687AB982AE63AF52A7A8EB21F21430416C580B27A04 F04A838B2EBD27C46EF71C3BDCC4B31B704B3BF0FE86350B30FEA346F2BA5284F6539 1CD0A09BAD52C11845907720CAD0F6C088B3046BCA4DB50142AF1D7D48CD6EABC9F 5C796EC113 |
| 111 | 8A1DC9FBF5A7B6BB278DE5875E09A184C982241F01FC149F2C92A4BE6C8C6586550474 3A4AACE7380A8B856D11C7217DD32169D573019C8A4BCECD0E50AA8595D39F060CFC 5EBF7875BA331003FDDEB78904837B8E049399CB38D96AB1EC3E3A55CFAB40CB820A 61CD9385D3 |
| 112 | 470BF9A1B0B4E0AD8D0B6076F86C5899D47620C064AFAEBAA8A13BD08E8237718A7 9CDED28CB6E2F93F160FC320574DE21928A00992503B0926A8617BDFD72C3A1CEF9A8 6A2431A70E8254DB1460B63B0B4C3F3032721A7C92458D199E8EDA678D84935BDD796 C29E6CFF2B |
| 113 | 5943957EBAA3D1EB01D576868ECC0208A12B6CC180BE0985544B2EE12A95D627E1E63 D1424E7C177640976325E22824309EA4FF6D4A8CD306C6E985B52C5ADFE6283EDB5F3 A765B13F5F3892043B681C547B1BFFB06C556E475364B0E867531B51E37DADA05A44690 90B073 |
| 114 | 366BDDA9F0DA41E2C75D1494C152E55901A082F8D70088E77383F293A48902B65E0B21 5931195CE0F7A122EFB06156A859684E4A4BB495BEF6998298C256F33368E0FCEAA2CC 600DFF611C62BA694E00BAF307A426E089DC19F3D0A5932CF2AD535328EC151C1E52C D183A5B |
| 115 | 9602AA640F47064DDB9E790DE2994FF759000A5FEDD0E455BAF168EE8C5C4B97B3242 DC031D12CBE040451D06E7F6135A74D2180D845E88BB509C016F51F85372683B6C5C16F CF95AD5BAABFC14A6BED5EF106A024C78A1CD5BE3B92D9228F6042DAD9094A90836 A0F78C688 |
| 116 | BF87CDAB38F12065E98FD60164DF249C97B531D17406D134FA84545057856BB997CA07 07D291E257DC2052040560DC825CC1F08F23A2B42A038073FAFE9326F1C4082E867DD95 5320E7789ADDCAC7FD41ADF79DB2FA8E15AC773996C76457BB40C5058B0430277A634 DCB495 |
| 117 | FF6BD31D6A1F0CCD33AC0019AB0C2087DA69F17F1809D6353735E3AC9E35845F1A1CF 486E3A846EB24A9C1D3981289C8DE670A24C8992D0A93F95E629B9543BE31917852C671 0E12BF20D96ECD98B4D5748A65B51EF655E4A1A4056801C1AB35947C47EEE977B06DC 06FD1E3 |
| 118 | 0EC24D4CC73AFAE1714463357E492AF99B84AD93F43380B944454F0934BF689F9B7F4B8 A8D8806E2018A15F596100E87A9AA25B21601E7F6890B61C34935EF8741113F9A09C9A5 D95E18650C130A568DE15AA3D2DF97FDB989202932AE5D29F0B3E0BCEA8037ED65AB A34A17 |

TABLE 5-continued $N_{FFT} = 2048/, N_{Tx} = 2$, Length = 864

| Index | Midamble Sequence |
|---|---|
| 119 | 77AC1B4102CAA22DE1C7E6083ACEC15D892C4976BF42296F8EAA0646C19B1237953BD<br>C7AB94246CBA049530B5BE29F500503A1D933870587DB5C70389E315F2D0F7D264FB71<br>8E617D1F5DA08B9A9ADBEB628A06579D3A841E06331777E50A39950B4B59F09954884B<br>3A98FC2 |
| 120 | F2DE1287A54816B401F2B952AB704DF1F08C71B54CE0C80549F2083120B1E21681B035D<br>CC22526DBFE787D242F580BEC54810E56F65FEBFA505FDD640084196D5561E89C7BAFA<br>E1A60D3829FE07D56A588ACC3164BA9E29EFF4D880AABEB949C2CC9411AFD9AF9404<br>E198E64 |
| 121 | 94C9968F5C7F54C1A8B51159F0E1102B0D6E8F58134B7E61411598441595EAB4909EC507<br>B3EF046072BD172B903FCD0A4E71EA0832A161BE99FE134E86C59BCFD30780FE0067B6<br>E55292EB0C5E52ECB87E365C5DB9C3E61E0E9CDE5F1BF38014394E59ADB14E840D708<br>5AC62 |
| 122 | 711A94C842CE4FBDB29032DBC6F1691D73E01D51D884961EB36A6B0E45ECDE342FB74<br>541820CB4A8B4007E77CBF8034EE4EF8C2BC9F4BCD84D6E86056E4CAC93675084ECEF<br>7265138BDB7FBB03AB6806A18268B4D22E0D8016A9FB50575802A4A8A2BABE8B07E87<br>BF22E86BF |
| 123 | 094E6A5E724E665D4436A9EE1513C9ACE0B33B48305254477FD1A729973F50160CCE9F<br>C4F8D8883064818DA76B8014ADD271F968E5145B2153920107D388F0D861BA3CF2D719<br>F639057FA2A954EDB84470D53CCA157EECE75969C70D545E9EC4909F4903C0DF5AA5D<br>2C25C1D |
| 124 | A0CA7051F49AC2F1AADAD50E5B96C13039A46E1B29A698ADDC4942442E330562EB69<br>889E6D66823415D2C1A8793854A141D5B6B9ADD973341FAE7BB19AA414089D83011E4<br>BD807D6EE409C438F357EC0C7E2AA891A7DF6E5A6D61384FF27C40EB28C99A8E7F54F<br>95036E839C |
| 125 | 8C5237086BE0F5AFACF20E65B3D091311DCD7C14706BD80770DD00BB314FD342B8EF8<br>C9FDA908C39849387945318612E6D24EE889B21C8AF78594A05A016DFAD3D131C9ED78<br>E5468E01458200A749C8C359FD4CD971A4462E906098E42EC7A3F5D98D8BC7683FDFA8<br>FCF9E31 |
| 126 | 26788792160F058C8BE5406D7213C475A9AE8D013B408A0BC2681884F84A9018DC80AC<br>D443C7D56537AA8844E6D1DEC7529E2E42CF4E27D6710364437D5E7EBA22B142DA5E4<br>23365C2FD97988283BF3BECDBABB287807E6702E034DA2567CAC094266EE889E582716<br>8AADC91 |
| 127 | BB5AB1B91449B428233EE7BA3ED2419A31AB123F36BD8F0D9CE3C853BEF38CC5365A<br>1602BDB1189430BEBD90D0C872272D29CCB8600D22F03EE4E83C18F2E1416DDA1169A<br>AA33BD9EC45A24198CB1F3A7B31C597795274FB9E88AA112C0A33DAA5A9234767EE9<br>F07E0F446F2 |
| 128 | E46236F9C888D29A19AA1F35C7DFB0FAEEB2CFEACB388CB210A3BED13C1D710081D<br>0742A80D86BE20366685290240590DD51EDDF8C3A83E84729E395050BC9FEEF6427072B<br>413979EB94F7BA4BA9768D76B6B7D1003091BE85B3052BEB5F0DF910B9ACB1AAA9A4<br>78891AA2ED |
| 129 | 8D427F9C4543B3616EE27CF73C6D1016527A1ABD78FE70F75E15FC22E14149382B4109D<br>77C488C6205921EE72D801482D8B3018CA21361BF4B0EF7C16C341759557CE26E8808DC<br>B2DD37F3AC14A2A4B5E6484693E1CF9CD81C207065A59103DF9F81CD4FA66539738274<br>7426 |
| 130 | A3F2F3F2C89BA413E232753E2D287105EEBA85FB4444598796D707816C8C5C0709F79D6<br>741074E9F186BD04999E201842144D6A7393F21F4269A45C895304CC55BC3A53009FD227<br>4F66E62BDD9F14799D264B9BA3E7EE78F08804F362BC6E0AFB691388ECB825C4910B40<br>EAE |
| 131 | 930B4B38F0B117A2DAA7ED538F77262E7170C7CD8553A9CE8335920E24461D24E3E0A6<br>8CB6059707891045C1608408765DCD3ADE9F9DA30016AE0DB514CB579C0E89921BFE55<br>DDB63DA5141B52593DF1FCB476E84615428B7A16F81B7BA7B6AA15160BF94005F36F1<br>A99858D |
| 132 | 32DA3B101369755E83EA9F029CD2D67268DC4956A2E1A87FE4D304C7350B0C915BDE9<br>C976C780F61F3505C6499DA7F2CB2EE712D2280B3B503BD91D4955EBF05780189373C71<br>F64F5013AC6A4F9E88CDA756531EFC7E681F920F1F273AA38714BDEE23870EF4533848<br>CDA780 |
| 133 | 1E1F844A23461DBEB3D87B33CAF1E44420FBE28ECD2845E7267EF740F0BD1B012C80B<br>0C05DE196FD06622C2D98091F46631D2F24485708DE155B0F3262F137A605FAE64E7C45<br>7F7224986B9738B32A0D97892E2C63E1525B688ACACD9F10F4F1C2C35EF02AA6C3E42<br>C908ADE |
| 134 | 6E3F3AAF8799B81FD01B099C8BCA131C2A6651A825B3427506CC25D3371C1E0CF857D<br>9EE7D34211402428F9F05D4D965A8210C26A2D1381D0B257BC796B097D03C18F55A15A<br>F86D6644DBB292402138646B12CCA9FFB80ABCE2F7DC671C33FC9CD57544C0BBA0C0<br>37B8BC136 |
| 135 | 065AC1273925B449027B8852B988A689028E358898FBE32348D22D560A223D3390E8FAD<br>E5FE6AF729997326AEBA86E0F9F8403176799E01768F42725AA31460FC24520CCC72C95<br>5E81F05A3433BC1BDE787E10BA7B98A71697909FCFD002EC0DBEDECE61A3964F6D80<br>649D55 |
| 136 | 28D73C05A4FC15F34823D886003865E81DBB0CDC60E8C9E9E9F9A82A8669E369897BD2<br>17451AB2FAD06C0444662205F5459605EA537627F6AD91EE2FD618048B5EB53703991064<br>79AF76B29C84AF3B2720331E848BC434A3C84BCDF5544EE1F6C2E577A1343A90EDA25<br>FD51B |
| 137 | 08299890EA8E90C5F8CA077CA89D7C8F2952597825A695CE763E8816E917CC465A518E2<br>72DBE312533BE86F034A6A382E330179A9C1C7503AA9FC9D22B8C8D8CEB4BBDF0175<br>ED089E5AA70E7BDD31B12C37B1C028BFF5AE99B130A9956F116C6D8A4A08491D851C<br>0668FD7B3 |

TABLE 5-continued $N_{FFT} = 2048$, $N_{Tx} = 2$, Length = 864

| Index | Midamble Sequence |
|---|---|
| 138 | 1A7319A234B2AE80CBC85162E46995A80D4E8E6A85BE808BC44092C431DF359C049193 3E3A1E8C0483EE1DBDCA4B93C3DFB00BBD3D2034C3D9D4161899CCF0ED21D3FE3F6 C3D5337E612BEF5DEA24420C526CE58AC96864A898384FCE96F8C050AEEF68CE22DD0 47CBB21152 |
| 139 | C34714FA6CFF76BD1C22785DB92BA109EF680089A18E530FF17950FF9D1AB0810177740 D6002B5A7EC518B00C4708BED3AB83240052A09987776517DDD4E243D6CD3A0702A7E 0C52ECBD11C73DE708BEBE9E1F81D292805D85A15EEBD2CA6595A21345549B588283C E39F53C |
| 140 | EB54EE2C70B6F2B04B140BB3BA3E8888A533C843D1FE081D852D6969D9B7A1AC6BA5 7DE88C2CA02A32B881394838A0C510BEEAE292480E95B6FC551D1AE35D57F5D3EF369 262744EA4EAA8A684A4B20F1C6376C757223FEB43F48681E7E41A18C453C4EB97A2A9E 954A7A2D0 |
| 141 | F64982599B15DD075C06A86E409B9DE1CFA2BA12E78949A50489303B0D49E309410E1D 507BDB447E75B74150606FE532E46449AE8365913782D465D3106FD97343C9C6AB054D2 18E86CAE1EF51DE56F57DB1F63F4B0B8A3C693F68FF2D5C9C4D6BD161730EE31281861 15E7A |
| 142 | D5800B985CC8CA4706489C1893BD3552B8872996F0A109DEE9234C9EF16D8531C71063 B303C3886358E0E3BED85C8FE16BF8F09A807AC8BF60D779752AFB618494AD04E37C54 B285783E819691C9D715A4AAB390C69D78114EE9DCBC6822AFE987AFA43B2BA7C5804 3EB17B6 |
| 143 | F9406334F0A2F00957AC7B80585E6829103B3C21410DEEC637551C3F566A9002AFC7A2F D111CE160304C84224B780BADC5AD8FA5F34F182689C9559CD31C58BA0B8098D59AEB 81DF64FB1ABF51D095F54703DD7C927FDC04956616A67C8528811CFE88ADA04E537950 794B70 |
| 144 | CE54AE91E15A4CC7610D8C3E2D261087C15474C1EF403F0729FF50E89059B6E795DDFC D5F06ED0C73158D40C9DD190922854C556EC7CBB02BA04413F3F88DB54BD0EDBF8CA 557740DA569A9A21C3A97CE468D90A5D113CEA35F3DB4C9EECB809EDC655025A738F 956A7142A5 |
| 145 | 2971BC7A5DF2D4B2E7C110438599DD1160C3C350E80873184815A365C077706EBB20F17 0A9B5CC3782C5BF249CBE10D92D46CE3D1870A40578DF40D5F9D5A1D7A7381582ABE CA08F34E52AC717F9830FE18A67628158691CF76FC67B7EB928F71644372E14AF05E25E 528FA9 |
| 146 | 9C23044ACDB8520B475F5D7A6B69C1589E6BB5517C00C86C4723427D0F682C536DC7E4 B43FBB4102A528F8A4BDBA70E1065061AA1AC8D084898EF713D4EAEFABC93E2A06FF 9B9217FCF4DDBC9474AAC608897193CA11AE3728B6947DBD3EE4E8864040F962B4FE6 A6E18648C |
| 147 | 9AF900C7B209BA66DE4E9C0A82FA7A54D1EF45B039420844161AFB7B9A441D7665D64 6561E3838087F161441D7225DA452DB4BE82B84855DEE0A52116181F661F88899ACF9D3 B552217F7E3D61AC772490F7B08984BC6811FAB5D37B0C79616B99D596122DA1E315B1 A9B1F3 |
| 148 | 121102F98AAF5E6375849B9761D2B7B2E0B0EE84F2BB42E2F4C7C1E9DBD85C68855584 689B72E84C6394CECA1683228FDD01483C93CC8F97D630BB8A89251AA752352778DC48 5B81BA41AAA505E458DB3217FF9F9E3B53CF78487CC1C2259808FE0206BA536EAAED A45DB867 |
| 149 | 6156516376C8ED00584D27A75B327CEEBC5C20CC0284978CE18CE042729CE0D5D1911D 86136DD0531E93D9868874763E32F80F7510143D1CA310DE4ACA1ACD1F8FDE69B55F93 E0BE8868D4940DC8D3F32A1E6ABDDE2FC016C44F18FA2694CB62A820192056F94E4DC 4AB97BE |
| 150 | 35844EADB00F637D297A0C65D8E28B97634EAA2840F83F06AC99DF8C6827F692C33F6D 718F3497659266D70203874C8011700094507FEAB2EC5792C5728AD8A49C4F7A628F2209 E743855701B7608F3D68BE2B71AE42E81072DE4C794F8E7DB8D034EE4CEFBB5A414428 F033 |
| 151 | CBD4BB8E4D29F4655163C1408BBB112D809091044F52C1E89C5D911FDD7040DA05D4F 2C7369B82F68411CB43765BDBA29305185E9E561753AC2B66120A039146FB8411BED13A F5DE67197DE6D4A7F1A0B08D724C22622C4810D569BEC8664CB1D391E9281ADD5BF2 F25C6262 |
| 152 | 7F21B992C1AC209241DB93270D3988F23E38572B8266CA8C96827B75924F1843CFC04646 E6175CDECBA85918E1C2B882107760CCE461AA992F2D7CF66952F6669758F060A8E2B2 41D5471129DCCAA3F7CD3EA2D5CAD6E9F198BF54FD531CEEFD98D929D7048C00028B 29F794 |
| 153 | 433B8E2AD567B53C7E34F5FD14C0DC2F2035821244A1B17D8F23676C5F237E4B4C2D59 C82CC573429B429E2A356C502184E8B8C0F7030CDF2F6D2F0C3F4E135716842FFBA9A5 5A689B4430D5E81CB83BDB14BCF716AA52096BD28542376B99FFB6F231810E4BC31244 71D8D8 |
| 154 | 016F5449C2ED28DA71C55D50791294C13D96447F6BEA4D704E72F1AC6AA80608ECB4C 9F36D45CFB4608CF9D25062A52424F8EE1AA4365B06EB175057242BD8047C79BCCBD8 F0D966C71F20DD21C717F697406C54A11C8F83F57A7F2300185D5E977CE215A801CB421 F1DCD1A |
| 155 | C4351DD994EA7FC6557285C814D036B38882F847ABD9A03903B098312161AA753405B76 CA0A234C157220520A7ACAF180B5165C7E1D647EC3667DF86F8B9D64C655D46DD2A49 D424F53C69A2E73340A302CF23E839B702FC7017D0DEBF74683340B309164BCA797645 A73993 |
| 156 | 44DFC2C32611C3AC72340B7313CB95E34943CC2E39A6294F8C3B783BA080F965220E96 D50B8C05979B164F0C208DBF82312E3612292A579825984111C2180D5F0212CDFE553675 FDC54C41ED0DDBF39EB718BEBBBDAA49270D34B626030DAA438E86F53AF7EF79887 8C126EB |

TABLE 5-continued $N_{FFT} = 2048/, N_{Tx} = 2$, Length = 864

| Index | Midamble Sequence |
|---|---|
| 157 | D5D0AA9AA27DFE9281CFA84B2989A83A54119EAAD47B5E9B1C9E6471264783287230E548EE9AFE102C37331B834609AB30E3628299A973CC7430FEB4B0DE1B402EBE602A9BCB7DB6772D3D8A8A0952FD5E4BFD3FE4AC38A7890D8911DFEB4148304D0A4C838C5F10F8D1B88A |
| 158 | 4D9152A02172EA047DBF52236304D7D494768515AC25751823E09228203CC6E9688808A35A0FC6ED925CCE1AED10E4E9E532587B04F40B50415A8368677A0D7B60B8B3040E43D1C39DB34CF21AF9A78BA953D451DA1F7BD61400C1515C629BD095AB7A5D2D61827E16D7FD4A |
| 159 | A96DD04CD23E721FC59D9E68249EA72F2895B3C47219870D6F98D13E48E7C2D09A831F4B0E220E25C6A5C6E44131E0A2C93894251528581E9CBAB8CCF0DAFDAA36E06A14416EE16AA2974CF6B64E94125B07107B665B47400F6BF2AB859FB0003F4176F50A1ED8672CBEF678 |
| 160 | 239D4513B7E0A3989D85B7CC85205C5DB92A483A34A8297010D8802A6411B0D378C76B2D89AB2ABF08C5B17850CD42EBDB86CD9C5882DE1784EC9FD5C230B440D11A6603E98FFCE4B1EEA06B950B828A1A6DB0C6A5984CABB5DF894FC88AFAC315D0C58FF24784A8EAC5395E |
| 161 | 823F7DC31064113ED063F2397B79D0D0EAB40A13990FA056918C2C1DBB3452EDA8AB0BCB128FD6209145B7AB82A97B4FED1E037181E0C8E9D01AA52B30077AF7659BF07352EDF1610DE589FE8EAE6196FB40F14D9BA714F695D32799869028514FA6121A9BA354B627E73C37 |
| 162 | 31698F1E27516014E9EC2C069225F320A08BE62C852C911C6E978C363E1EEABA801C51668D611D6889B9442080F6067C1535459F9F7E590DE4546DB3B92218BE162A0A8A18D2468F329B9C00E64976F407CAD4564AA6CD28C61521745FEDDB7FC3CF6C3D5AA05C10B2FED2FD |
| 163 | 6AE65C183888E9B26E712B3F86E2D8C98B4F43354C8869DE64FA504045A685F73C0280E1810B4211EA74E3271044669258FB4E974F05C961011E889424F0B61B8EA8BF94677C35FBC7515681ABA9B92AC9B1A989573257E43852B7ED42BFBF488F88A931265C48C7197B9F91 |
| 164 | 810470ED428C7A29428B74C86BC69B81E67BEFC9E3F2D7EBBA20E84658E72386CF31CF15771ACA89591B00F4EE13728A92A05827537C9EA23BF1327EDC53B1714BED25BA41268E9B6E1945E3FF6A324E07C11489BB09EA103E88792463195FC4ADCBBB9CB85FC0E2C748AD8C |
| 165 | 05C80BFD3FFEB8544F493FB289145D00EA0A817E40C29423EE3923191334997DB230C82B084987F09F1CB35020CF008BF14685E2BFD8A0236FDF4879B53AE63A74B40EB3F0B0516DD94515379DD0301AC0E370399173053A61DC8481E07C9C548F3C8A740D29DB7BA95367DD |
| 166 | 07CE0238A423B5AC0A20D34EDDCEB11E3152945CD32409EC690D921AE3BB2802FAA2712AF39B2892254DEACC65CE23E253F8DE0C02F9F3AEE1F43E7DB3E8487A6DF3E0551EF791A6CB283806704D6934D500016D12A0EF8924F2433F4F55F3A43F7C5D677908A97BC6759D5B |
| 167 | 149D56458BADF7328579800EE41F126EE403FFCDE4A20A702DE077F138892A59C26CE069FF50F8F653CC6041D9A32848543D5641460E3C1CB6CB9A88051C4CAD33456BE8ACE575BE15BCA5575A3EF27281F247C2693E14032FF40E1D7CC29E00FBEDC8F9AB2199417155765E |
| 168 | A75C328B821432606FAF5294D0CC73D10803A243E2B00045AE4A772C9CEB615419F8CA816DCF6157B2C4D4908E26298AA107EAF17E804270DA300461307BF8163A017712EF8B9AD30C6F11D52961D91A7BC6DB5AFA8761C56EF0AC957A4CFF4C04CE4A8C67E3D3EF2044174D |
| 169 | D862C45183347B76AC7E8964BB6A60BEC11DFD44F75016D968111D5A6657C7612E1142328AA445D93548F14F93F082A2B1DCECB8159C1ED195A867B5851CB777DAC152866F0E3709B80C02FD335C462AC961667203E373D4A4ECA9B2A0DAF12E61DA7A360AC95E78BC0D2BAD2 |
| 170 | 99A5E420F2B697EC6700C2CD0D4CDE3D0850FC607E167AD2CA89822B5B249AB1CE5C418EE407F7105E3E9DB993261923A2E98870291CEE83416F2487C3A59135146D82D1763CF3C4E5CF5CDE75C30144683F85D31EF570C88CF94CC1C061A2CF10DDAB717CF8E4C7182EB61C |
| 171 | 1EB39A3870707F7AEBB280520DFA02E913069105C2FA464A20A85E82663950A564A582A762B1F407343F1AC4C8C581ECD6ACECC3832D323D76894F82D77C1D7D841DF4908C32461E9C3B0CB2725DC3D105AC3E4B0CA76311CD01C03F33DC4CD43FE3B82A3F25DE2E7E8E0767 |
| 172 | 3F891E877528399CD5041878C32069A44984311E4AC7E019562BB212ECF18CFF7FA4C011D63E612112698FDAE90EC5075DF68E929899EE850FC22646B33EE6E97CF8E1B0827252C94AE796AA4D5A88A46168F404E62C975D1A2C50CD0562E3F4E6D8DC28FDABF2A05FEBF0C3 |
| 173 | A32242F3D09855F0E3758CD738DE89F1765151A343024089D2C20C030A7E78905864D90E6E07EA748A3F4B3DE75A33817C826645511D12EC14ADF69E28B51A221B2EA075F7ABEF51007614470CBCD74E9B3A766A3F3D9253304E0125AED37935CFD08222F6BDFC30FA83E47F |
| 174 | 1CB64328E0C847C7DAC87438575BB0085B30C23F257E8D5495320154106353EBF3D2B1C7BF929C0B98645B0763BB993111FA3D972DBA8A2B4A530E5DD40407A5A168C80595381 7E55ACADB2E3385244962CBA3275A22B69CDE4CACB03FFA1ABEB233C3F9AC40B2EE67A1D49B |
| 175 | 3223C7E17BDA06691B8E0EAE41B37122CD9C6095A4354F6994F39CB8D1F57E21BE3F282320957B8353AB31CC526EA52560AE7C434C6185BCF19532FF75D1EE0D94C6EE4F61E74BD620205A22A723CAE5304EC0C2C802D8B364ABFB06C96941A3950EC412AC87BAD7F9AEE9DB |

TABLE 5-continued $N_{FFT} = 2048$, $N_{Tx} = 2$, Length = 864

| Index | Midamble Sequence |
|---|---|
| 176 | B2A63033CA1445305124614C42333A0716D6F374917D4FBD16663D6EF3C0F8986D5A4C40F0E24AB911743BC270726CC613AB015E85C92832E1CD068633A54673165894E1E3D7BE621FB129414A6EAE289B96DBCA2CBC5A59281F18F740867BBF79EEA481525B23F28FC80A6F |
| 177 | D30A9DC76738C8AADB4345D6EBB0135190A537589874DAD1E0E6BA20030CD4A384151343D13F93BD7C657E523B4082C90FF115901460010E699EF3261039FCA5B6F3F58FCAAAF913F5CE027DB24624479C809B624CF1A1DF4500C5A27F6A1C9DB889E35918B05CDBB6B11B16 |
| 178 | 3A216F92D59281D3134A007247479811DE2EC64DE280AB4171DD39D755B86F420801DB7228F8FAA7959F3186D4D6E988883C27503199851F8C3449DF56B7A748647F1AA31C702A8477594D218C794A61CE26DD4B2BB5C7932A4AF7BEE2F24BAD64D5699CEAFA55C0D018754F |
| 179 | 4A7C625B088540F9D649BCE5F1F34A5DFEE03422140C35D379B7605DA44EEFAC476102A1D78C1F0658F70C6ADC740915C448361C08789D90C0C7826F610FA828660441705D6E85DC9EA977BAE28DDDF7F4FD3DF9D6C29760B07393334CE3A1D91B8A6489D9BEE4A83412DC45 |
| 180 | 07A1C217784166889000719A1EE17DDED0D2B2F258C8F0D45B5B16D4881DF4A32E4DBC4EA43F4E1EB2D858478149316F6DD314463AECCBEC5702F9DE9B6B0643C56C286493DAFB3DE393671689B5750749356512A654632D7E131627F8A23A7C4E61F8CB1F29B319C1DC4C62 |
| 181 | 08F46691AC91415145F1F8879CA6BA85E542760D03A680C8BEC28A5CA124FC3AE96BA8E5880A72F141498A7945192B5B49F65748A8A3A90BB4E46FF19324370BABC50FE9BE0BB992F208B46C0A760B8E09942D7C992D2262DFF17CBFBDDC98FCF3B51A9E42645804FD18F4E2 |
| 182 | 1077A1E03EEBBF1E21E5CDE77016580109B0166E9E9DC749DB896FFEC7201851262A46564EB80B0CD1B03F3086BC5B57DD53052003B6718EC0AE9427F9BA9A8C8376858465B8B4BF7C1DC09BDC8B87E46C98690143E30ACB812DB09F7D0E17D1B5295E639BAB2C56236137CA |
| 183 | 427A5699C25776B4575A8860C80011646EA0557E5740201B36392078C09CCAE1D2726435202E96546F506F5F1AAD5D14C35A9F60B5EFF886BD4DD1061ED4904AB64E5DDC422B39B56A13501C456E91D87A78FB68C38ABF27DB7A3E0985CD79EC7F175C9247818D816B5CC1B8 |
| 184 | 0824361DBEAC8AE8D91EA957AF98FF21D24252986A95A65255FB6B50AEA818438EA8ED1971131BEAA257F03891F7280BE41C9535C010ACE7C8D1264E7E35557BD09CEEB05CE4E7AF90C301FABFC9FDAE0FD7835E184CB0D29927AB6C8903AEAE8830A1DD0C11BBD91E5D838B |
| 185 | 436049AFA4DD2562C6916A0D2871594E411E2B86889C2D370D2AAE1362B944210820588 9AC5ADEC389193B186DC4A7F72ABFF535ABB38AB46BC0156ABD3FFF46D0046C8201506CDC64EE227669DC3DCB0FEA250B51CAA290D16752BCEEBA0FB8F2222CF683361AE59C8975F4 |
| 186 | B598B0731F8330DB6B436F34FDE4022918496A2812A50D827177A5D6210599CAD919CD49983EC7624CB5A04C35464B858F96A5D40B6CE3F7B30D67AC6C46C621A97B5273818D04FF4FAAB8E5093932C30BA799745C3ECDE4D04849AD88F58C741F1A6FC5159778B1F8BAE2E2 |
| 187 | F536CDCFCE5940EA7AE14AC039A0674164E5A3271C3EE9BAB4174DA392B4F0BA30D3374D7AD107E600AD0C62A15AE49A441234144EE235176856920D00AFC3F656D2E53C2CF7729AD22D7B9A46EFAD98A93DC0BC68DE8AC78E31D013AED80794C9AD6C491C208CA9D4F94F48A |
| 188 | 4C17EAC3343672DC70EEE8B33066F705CF07D182110F33EB5EFBCEEB4CDCC520B67A80A2E47334FA75F410A1C02B16469A84106BA8AA477D581E16FBF34CE4BE1ACF6AF05F64B96ECC174688B74ABC5C7E71372D1EE6E0DF40105A364DA524B43E6B00ECC12D358FCCBDF298 |
| 189 | 0BCF34AF0B1945F2CC85363A5FA27E3431E32724CD071C6C82040B7B22413B0540D647DC811A4CE993A8EF84880DA07B8133DBED489BAD1ADA1059968C3F74876845790812AF89C1B3E8B030E0C0EA7ADFE737A78563835E21DA3EFB3F4CEF411ED52AA92125C113E6432AEB |
| 190 | B5310F81B89B5851A9A50CFD63D7440ACF30BCD0DF548649549A2EA073C68F2BD3476D8187A6E430A51D13D4889449C6F6F0F8CE1C04B15C35DC68220F0F314779994A6E01B0501EA0993FD1C34E5DAFD4F35AFF73B5E50AA7962AABBF7E0B7A044D83884901FA2A0A01F962 |
| 191 | 538C954B60E5D1818702A96CE28BF885B2D2FD06D30D009AB4DF1528F0C4339D83B67AA40D27F54406E22A41F69972D884378F86043BA3CEA254CC3F6CBDB9EF22096ABA5C2FAECE4BCBA0B83D63FDC9B2E48B4675C3466579E7F5F2C1CA8270202760C290700CF20EE02589 |
| 192 | 9C5A9E70725C20482455BC90CE1DA82DBBCA7B2A7C6EF343A422E924E190AF0D93C437E1CDC18EB020D5A23EBF4188AE8F4A6CD6E66302F36C42165F0FD35325D29EE9DB2B2CD746BF921DA813BFF1775890EE21AFE149458A63A1BB945D47A9657AA7247F30A2DD13950478 |
| 193 | 56AE533F6AB123B5201A1E00252B8BE6422F8E6BA642874CE6D12EA8E637938AC9521D4E0BF5219206341CC1E8EE4B3E378BB49A6721B3FE5915F904ED27394B2ED0F094DAE491ECD4492FB22349D87357C4FFE2E182E405147DFD079F263BEB970A630402169A56FB4A76E9 |
| 194 | 24CAE5DAD6EA49E7602C6ABCF62A7B130385EEFF0A5957510768FC6146105486A0590F044F503298EE2215843695E949D593E24E10422F4C56BD11A2D5787DEF86CB3D1F4B9B90C52ED29C3D4D82B9DCEC84CA4BC60AC980D993E61E7830FA5C88C44D401033CBF35E45E2BC |

TABLE 5-continued $N_{FFT} = 2048$, $N_{Tx} = 2$, Length = 864

| Index | Midamble Sequence |
|---|---|
| 195 | 38EC22EE5DEC5C2926B4831C9292331FEAEF6AA0839663A7B1AFD105F4B0240C2D272626128C87763AE591D039E1C885FAC516A2317CF80B08405A8FD684E8523036881667486 89B702D8830AC76698C25B6CEEFBC5D913C3D127B9063FF18CA52E3D61BB5AFDC55F5D668A5 |
| 196 | B892960D7ABB5AC347A4A31242D19E0A56B48A675C3BF0DD8A63C32EBB38F532381C82854C62A9189C614D684CE28FFD784A3A99D2255B285E8BBC362F801157A302DAC837DF05AD8FB12F12F01115FC27A11C466F1587F75E61F8720C2B96851847095736DB45F6CF0CCCE4 |
| 197 | E92AFC90BA929479E33568C5D4097A1119074BA2770D9864125E1DB0075006D7518F125E5286393D60645A391B622C19CC44DB058DDE1A4DA205CC6E25C682596DBD8A74290A9ECB47E0A3A3277F687C89F3F140ECFAE8DDB3B1AFB1AAAD343EDD7C452EEA188A71DB012BC4 |
| 198 | 232CF82480B098A91380085970558501DB12B4DA73B125D39E557C768E951DAE3B800BF0DFF381361E03BF4546B6B6CEA1029D3D9312533A58ABEE0E629A4714622B9CD2BC7122FE61FD8729998B048DFDE45B69B44381B4F139E533E6AEF32B5E47E711B5DB1848F620E1A3 |
| 199 | 21598B243898F08895C462341695C4CE64605D9BA449E3DCB801E16DF815A40C7D20975BF7CF3F4D6B21087580D4099C0177BA53BA1095F1B927F1B0D8E0DC00C5797F4C8513A3CE6FE4D1041D28C2D72E947221173689A603BA902918670177E9FCADED5A00E7E5A6F3D4FD |
| 200 | 5E180D65E4A79CD222352A55D07029699C03903D9062EF4743D0B15FCF87C0F2491B9E8A76DB88382A94989A17E8CA39D9108D844687BFBCFC22E1F500E3A35A1770DC78B48F5F7E54034BC89E0A1EDD8C828C8EFD13D14E5608A44A0D705B064730B3F291ED4CEA5C62FD0D |
| 201 | AAA14E9960C2A069CFAE36861B1C1BCA6C5476248973A24D423398185CF05EE188661710BA6AF4518A694DBED3564DD8B685B42B18B7AA33625BB0339569362EA71614240B6C43D6EF5F708046EB683F5FB98172FEDE0607444F1DB405EAAE3E2AC2A5DF56B646DD0E606798 |
| 202 | 77F6E6DD20C7F1C6762D222ADE92ED4625162C4EB5EC8A1AEBB64091829EE00B9E12BBE806025808E956A469379C66A8291E4D5A1C88629679BC3FBF0D9E4E261742FA01D439AFDF9CA996B791B955F1D90301E1F507E9DF871C3D28C908C66991275E40E5168945D5871E09 |
| 203 | 1927EC4A9309A86697320228EB940CAA33E71501FC3BCAC086C5593544079E53B49DF68F9626F52C0BF6F86542D09D58A6A883ED6CCC509E997B22DFF0FA71FA9943CD3F4BD19D74ABE8C426BF1F107A88F1A1E39B8CB73365B59F4C7789E5C4EA8B59573C3507A920C44880 |
| 204 | 09EC0C41F444F1D4011219289B874E9008F5B547F7A4C3899AF4458BA2E1227FD20A4D6F246F6495D3352FE95044D78547AD34B49DD6A3B08BBDE78E679C5C5A43A76658283D45DE19910DD693CA171424C7F17B6BD0DA814E04A512B3593A4A8D383D00123333DE7644D352 |
| 205 | B8181462561202433EC4FA390ACBD05E9FA35BF76C1FEB284E8278CD1D20CB8A0CF5BCE157E2954E4CCFC6E2AB588D920A64041C6D63251C74BC3F4D4890614F6C5F2CD052BD93FDAE759136DA11CF9FE55C0C223F5393A214CBA5C940899661681B35FA44F36DEC38C24F58 |
| 206 | 945E8487A264D2E4C0464B4483EB2646C16F883998DE54F28EA3C5FCA281EBF5798F5A9653B200D719C2F2E87982A7980C0874205E650C3A5BB9FDBE555FB05D7C0858DA29BC9926D00C71C6EAB650E8E0E34D1A635F06929BCD5B04D58FFB6C4400D11AA3BBFA02E6065ED1 |
| 207 | 0CAC03B4EFA2C201728BE144FE8658A8D95C182BB17CA8EAC8B455D423520BB2679B405F458813668DAB39894EB39EFC66F8AA105AC4446A2D1E01E446C5ECED38177F5671D97ED7512D909EF3F08C91C6CB47BACB4E915E37707C168213F2565BE786DE99E11215B83F1A4A1 |
| 208 | 6DAE8FFDE0A21C63C935683DE6E80845161542D66A9AA0282D73F303705D9992EDC3E100300D84195D8317C3B82AE7315EEE400F03F3C8E0B2540BAB0E35A6BA62D10065486E736326C17BB812438A89E81EF4A6E2BFECF486EC9F38909E111C4D568833D4DCFD94CC2E34DC |
| 209 | 81753C414489C476ACA594729C93EC0F228541FDCE0C59FC3A3D3BB79924130F0FC1D13F1DC546B2723096705F4BC7541C69CC5E126893A7630C07DB6E089DBAAC9A46990A0C99863A190A0EEB01F44CF1AA8C7155FFCDB925DFDB0D1E0E02A72A53A7AF573BC65087BE108F |
| 210 | F14241E3402F9D54FA94D0D3A953061622B70A20F621C86B27118B50F8EA9AB89E6002149CB12E2566FCBE7E54F1035EDAC2A0ED01044032ADF769F64BCC4B3844751C050BA03C0223EBBCCE1C051B1B517D962D5BDD7012376733974657AEBFF3522D3CF45D51162DC5C9C5 |
| 211 | 6C83F932192F86628BDC9DA605E958B849E617749F2E887001C3B00A87A367E14972B712E20FCCD93890DCD60A8C8E1B33CA5E6A6284E221098B93A2878405FE03D4D39038F3155FEB04E8E88EFB038598DC33CEE984B15FF6AED9BD91A2296E9A7BF6F7EC7C779E2F11CC00 |
| 212 | 3499FE1921003A1A24CD986CD90173576DFECAB2624577160501879611F9F90785236F32C91F9431F578E954300768E549F9188A907AEAF4B181F2818572D7267717C2C20C2BF796A8796CAB105C5201B782A7089ED998DBDE50E3348679F57A1766A33F9EBCD49F508DE818 |
| 213 | A743905C98F16847ABC923A507663CD590A78BE3A1852881AE018C5099DE66A63F2A57185B739B7B5F4C39919DE01B05ED847094EC0B7D1861FD6EF625494927F6DA196683792A907B6896EE4A42BCC552372A1D4C433254B3EE00F6334D2B8E3C130193576AED3A82F33C03 |

TABLE 5-continued $N_{FFT} = 2048, N_{Tx} = 2$, Length = 864

| Index | Midamble Sequence |
|---|---|
| 214 | 680D839C46F2408BA6DD114A42ED314F501DD4A3844FCE0217114318FC0A1469ACBA8B5F0608DAAF15D34D778326990CE3154DD1C5FFBF933D496C850BAAD8DCE3E3D21262F3A17C80823F25D3847804D34F284B28D8C8CE75E2FF0755BD465E11F5A1D59397790FDC895D33 |
| 215 | B8B20CE326D990B3714D2B6E7B38944343A548B915A161CF14750D54052015556903D10AAD2DC9C3C34758C1A67CAC80D2C464CAF5CCEAF930A037E9B3DA798F0CB59F344957BCA8382722AD00F122E1FD0F36D28ECE301AD9937F1463EF2D944072302BE49F9CB79D602BA8 |
| 216 | 89B4472B1CA87DCBB57917D601C50F8EB1C171459713504A89338ECC6C01AC710DE0EF059708681F6D6C3DA7DB5D97D41571A4F2C9D42BE7CFB51620177DDDE70262E0C21034539AF711B4E417A57897CD7F106DAE21E81ADECEB9A36D6BDBF2C10CD1F42F608B860B97A1C4 |
| 217 | 62D3836D4A393ADC8AB19086CC09BB3D062AA3D51616E86250AE7C1A1526C11951D53A9BF3018A1393BB6B4DEA0DC3F53167A6202E622E01DB43112022B72A46E726D353CF3B3EF5D34CB9286FB90EEE8B87BF5961CE4D41809D07E5D254AB9FBD8204977FB2BC1CC5A62208 |
| 218 | DDFC969E205C1AF6712ED59459612B55F7B6E48C08F54448ACF01EEE204C5CC28B61AE4D089A9CCD02C7CF58F9DCE631E7D4564D10148AEBBE8FD8B1479FF3D0A00F551F9333F6A2F28496FDBD0C0071615DDE296CC96036F631E9C5A1562C5DE06BFCBD2DD1040098700DFE |
| 219 | 5C2324717C3DDFC6A328E30460C5816621245900F6C5E746F9C2766FB708588CF00FFE9B3E2F33228E1930D7EEB2EB02482B80784AE46BDE47502CB6C6064EA52524838AFE3ABBDD0BF04EE8635D34C2C2EBC9D9D62AFE120B642365BE042B0D717A7065C4BDD6921531B4CC |
| 220 | FA6E3715B58A705882D5585461915B61B6C104A8AEECB01DA6F376E8B86B88660F7011F1A59B9B7DCA461A1044E71594DF4260243D9A107C30AE7705734C2233260DADE14CF92EF6C9C989DA34423D1BE46DDB29627D0C09E2E04722E5E33CD56BEF87113BFB0FA1FB26D1D6 |
| 221 | 6981C23178761A60193C90DA9CE6DBFF060787FC5B34C1F05246A674908D7B0B0369C18CCF321C63309B4E2CF20840DE8449D5660B21263735F21CB74643A925310B6B349296523A3152817E4873F5D1A991E918755CB716539F57D546B03BEE9E0A1DB0D6F4C7CF66453830 |
| 222 | 35776418E933B8AE4A8A30C6D132FB2B1DA8DE84E48C9F14570B366211DB546073C72D8D5803B03582368ACF571584D309C2D1292F74AC2FBF70D00215D1FC417F1990908A079ACF943B9A93B8D3803B2F3B83B64FC326EFA69B6BE1469A1234A2B51997149D33A6F53C29E3 |
| 223 | 2D76F01E608260FD69397272E113D982E8B29223950C88F7587C1A9500801A25FCF351497F56A379D683E105A3025FF0917676380348799E69AAB51681FFAA493D8BBC32568FB3853BDF307259108D1D49BB959ED19C43F65C6100A3990A2CBA23815092EB54D72CA73215BC |
| 224 | 3D916B89DB00507D02E1538BA5AC6F855BFADDD3EBE763A8AE121928611B24B33AFEAC628D2A981F66288E8929A6388C1D6A54449B3C424DCE8772EB92AD50BD2F252B8A78F35A32BF7EBDE5989FD0BCD82F0F5833027E8D04DDD48F1A11C57FB2222464DDCA42784C765921 |
| 225 | FBB58C665C9D333FEB5C2CA023AB777AEE4AB5514C4B8022841565D0BE1A4E0CBB29A84A43CC0E237C161AD8F065C0110D93394382CE7EE7AAE7615FF718101A9A0B05E452C8D6EE30883631F404A78012CC98723C7FEF39759A33AB397A36528D2B0456896E20F929F6D973 |
| 226 | E110BA65D30189413F04F325A332245B5152996E1695439170B3F41CD3B2513674FF8B94247A0161D77BA49240DE4C3D6986BFCEF8C9AE888FEA0E4AA3006F2D864556B46DFD0F20E96425ABDD8E07D1C7F3FEA0E5ADDB3FA074668523B448A70371EC86522F037D388FCB5E |
| 227 | 45D03A74A2647C45DAD49F33F1F292B01876113268CDA492863CD01AC2A402E479A29FE0C25991E5870F2EA15EEB1096AD0750BB6242224CFE67205500916A8820E38276C7C716EB5D45EC1FCD267B59878F05716595A929753C3ED17563A3B8979CB14E28989FFE85BECA1E |
| 228 | 19C8CA6D66BDB1BD8F4C919F34E0A5AD14008833292F26A89FC90192E0A741F24416669C16F43C7DF34C2D10C41B23A5347B6AA6182388B518461608A983B8030C021EEC19CA6EC414B1CBF73BC0B7F7BB8DC64D2AE1E9D94DC8FFC498D666905AC0BE6AD1F71FC5A30A47FBC |
| 229 | 5CD144342762E1C9D8453CBFC10923A691CEE708A9A5D18451AA06221714AAEE5373A76F0A52AE995725092054967A236AD8EBA240B6AB516FBEC9EA84A27D83FE5ADACE9F210DF06339B8826A5E4313E1153CB7D0C1A258DCF580364423AF6B9379955EB30A6791C2574DE7 |
| 230 | 7167549F8C7F173B351B04E3AF0688029093AD1809E50C8D20F243DC1972470B84D87F774B6413F874DC2B5385720A73492329C48E5B1AEFC5B0ECE2E35B26C3DFD87A9E85997E731E58B4179851006FF477C1908FB151301C30E59821DA245F6B3277A015FECFE3A4C3543D |
| 231 | 9240F8E2EFBA1764DC8CF0F9BF0A34F44A55F248D0444B36A55A524657D1DC5A1EE14191A1171ECA114C12093E76527DBCC9BE5584E8378973D5807567742F086C7E69B72BEB9051CC487D03D5B4DBE7DAC64F139F71708BD24EA21044ABB9323FEEA3B128C63C0BDD5EC0D9 |
| 232 | 318E14D52D013A9372B780FCBA44C761C8A20EB726E0ED08CE19DD60F240AE1851406E3768F23B1983B74E918DDA73996120AA921BAC5C260B1C759FD8BBECA135D99CBE9C50471918EF8BB290646361F9A836E89FE1DF710AC891F178FF6854A9C2942CD19B140C50D07981 |

TABLE 5-continued $N_{FFT} = 2048$, $N_{TX} = 2$, Length = 864

| Index | Midamble Sequence |
|---|---|
| 233 | 16D2A410323CFB1B83558CC1FACB6E90C3894092F98C6E63D69A86C8F409084682F4340A50B0BFD132F0F41BA78E92EF15AB209EBCEFCB318BD95E447A38BC7660A905873A66B80579811133C517566651AFA38F39575B55EA879D40CE9AFB511FBB4E905AF497C522888DA3 |
| 234 | E8A737452C36D50F1304E206678722E7409E1E0F99A5B9CC4A43C1E776F0A605926B6EA21502757CE1F2AB529E78C22AB2081CB0D1A85F6382BAA847604D3DE445837F33D3630439DFEE0C54472760CB0ECB900C2756ACEC6BCB771B9C10BDD371B123741EB452E768D8A39C |
| 235 | FFFE9AB492942C8F9CE9B8E09C3389340A7BBAE5549B9BC541C08F02A2EA9E91A6483C75E325E448A5210C10C349109FC44EF9724776C86B9CB87896545A5E150E022126FA7B5082A5CEEBF27F9375B37BAD4FA44BACF170ECDD42B0F5E10F4F84869C32048BC6EC19CAA81F |
| 236 | 526847E45F2BA996F0BF5C504E5229D6290D2887A45548126C903422F00C0F5606CF1A30F53FC6E672429FB3B9E1E1B33EA302C2A98020EDC69FD0E201B5D1BD7050AAFB36256886F70541AF37AAF8CD2883D18FAEC7BF7591664B41159FBC0C426F2A8720B8C6C8FFDAE69A |
| 237 | E47966D563C26A7EF5884FC4E4C1F6D085769B6885E2828488342A2720103C717F4B4FA02D6FC56602C55F0290996660877341A7B802F88E01A027D740579F5ADC6A31176498B185B7222B7DDCE0B193D579F67A6D6A4530CDAABDDFC5F472436B31D16693274C90324AC3A6 |
| 238 | D7FC3832B820698F6ACB9A2C785CC609A6922A661F7818662076D198194C979D6455CBCC8162358742618E75D7592597D8AA85395EA96F60C691AEA1A428E8CB8790A67ED00A73A92391DE0E447E473BACAE1B1943CC53AA490BDA8E9A89A8EEBD20664495D8E2DD9B9BF6751 |
| 239 | 6A8B841322671FBAA8A008968181E5FC09589EF200EE50D5FD0D929D61C5AC4058A1F844B36E25FABFD16A634C76E436DBA6BC60D712C88DC9B94764788CA6187ED0DC214806F508E9BBF6BE52A4ACCF4F28D8FC9995BDEBE25EEFF459F6B29C561F4348D9244E9A22A1E1861 |
| 240 | 830DF432DC9E892AE59109E1A7DC7676AA44D74533E1DD65211EEB4F2E25602A4F5482E1DA6F663409CCDA2CF438CCC03B2B180AB185A14B38C61F811D47220B29BBD3DFB7C4AC16A916342A197AD6FAB7C935FEDB9C690E06A414FE1144817C3521EB528F9C0089916275FC |
| 241 | 85A7B2573B0A3174CDCB3D9C0B8863A8ABA4C362A7DF4310AB0E46D2A24B93AC1B8F12F0D0287ABB54A64A4FB40541C66809891C3647A959D2FE7699E622F5F5C9D135C414922EEA446EC5FFE63C4A611E64D15425FF22E9AF24EB28D3B280BF3FB905960D186EA05211A0D7 |
| 242 | E3810473889F96A54D4191BE3CE2920ACB1A2A98CCE245A95388EE4B404A37D2E5475975D93FD7E4844D2544912839E89D6A93BE647526A84388C033CB8901A57BCE95C37AE6A16680D207D0F79E6F23D86F390435FE2AEDE90305DA849920CF52C58FADCAE0E8693DF6F1DB |
| 243 | D3988839AD6C49FD0A689D60DBC211A531531442235024487605D283BD727A4C35717482B4CE939ED50317D1DCEF3A87AE9D20616CE2288A31E8A4173A34D9B5865103BE5D1F2249815F9D682716DA4313888027676CFF47C25D39E3A5DD6AB046C6CE85E561AEB7BBFBCE17 |
| 244 | 133312B8F4474B90988DD1A8B79F0628BB6399A9A97611CD0B97DD5F0A264AA4700B2E1D844300E588325C7A4D48F5D4C5B64E31E1A8B8390154A7EDE8BDF783AD4D689EF781BD0F58F00F204BF13FAC88BFAE636CD2927437EC4AAB4A4602DC8161FFB9B9142DE478201A68 |
| 245 | 05EA2EC503AA2784727C4C1DF51D7BC6EE1646489BAFC64ED4D853C502083C04B023D9CD8AC9D868EB4E9E593E25453994A2E33281C064AC26287F29343CE4FB56972E145C1DDFDB51C34194397C830AF027190FDA934290FDA6928BB6E4CA21EC45EF8C5097C10EB283BFAC |
| 246 | C5A000C1E39707751D9EF6CD58A08691A67D2103AEC4C5F10AC64C88489AEFDE409688316BCE78B132BDA27E2597769D74BB48951A728847DA1EDA775EA4961B2F5F6222CFE9C9CD036432F332BEA6E38877E5AE2C30FC5795925D4A0941B00ED93DC70E428CEBBCD8B2F712 |
| 247 | 0340AEA06B4FF1B5EB1EC05D34163AC2E4F1D8261EFFF6ACC4C729082FD0B2470D0650E43A062F5526FC892776C603880BD1CF328C57235B5D9D5609E1E296989AB5EE8ED2D0E0C98FC2E814640034CCFC50365D431E90AEDAA7FE3B82F3426BE99012BA160BF48308826FF6 |
| 248 | 780CB288BE1E7C3CF5563457C4E715953B08D213C05FDB917917600C01A8585496E4A3D936307FA6F2E5683DBC9E06500938C6DCCC592688F9FC3BADC960C2A536C5C5B4CAD42127CA2680A43F98C24D52EF49B7758ECA2BBCF8072D15D96E0723E148FABF7B2F6E7ADD2922 |
| 249 | E4781A6CDEAE569C07980311F02F8072A4A3C784BD5FFEF10D4222730D1CCB42E630290F7E6AD9A77E1DA040B15012E8905B02BB3F3A544BA19C390A0F1BE07278AAB2D2E553AF05B2E937FCC93C1AF3DB4151D087E61065CF657273521312FFFB6215892E6F5B596696BF10 |
| 250 | 8130C982E8BE1D9B2A9CD2909876E4897684837D2CA4B20C0D7C7648511A4BF41D208506BC921B9AB16BBA10873FE55651F7B71F1B8D41D4A9C6AC3391455030B754F57A3AADABD7CE9642A3C4D3B61ECC42281A437FC8511B57FD3678B0BF81AC56DA547DEBAC893C9818F56 |
| 251 | 66590EF5FA826030DB5011CFE2089C607D7CDEA84E47A13840A28A15C8ED4C0D03A860486F3472DACA4B7FF0AB4D23D58B05391044DD1FF0D269D4DB6739FE558FC1547075338D9681E185DFA5942BB089D8FF199614155BD3A351A3E8B708E72657B2D280D76BCD02D860F2 |

TABLE 5-continued $N_{FFT} = 2048/, N_{Tx} = 2$, Length = 864

| Index | Midamble Sequence |
|---|---|
| 252 | 501AE494B0330D903C5A25ED84DC728472A56CFED115D66A4167E748B3C767640E0891 5F557261DC84E27921F7D0915A1D32EC232CB32AE42D23764642729427CCD1F5A8072F0 751F4B50DB69ABCA2F1451D64F70FFC12584F6AFEF05BE660C8D9481340E4715A6AC6 DBB1EA |
| 253 | 686897C317B2144EF8044B5BD95A08E6813D0B1AA0AD297DA1C52BB5190289E62519B D9098C63A299E3B3240186CA29A1EEC98405FD8382942B41466300D53C8F85B61D6AEE7 EAF731D9B5F39F4DCD741758338735B1B1DB1FB5002423C7896CE404785AA7CA2BBBF6 8837208D |
| 254 | 0C27EDBC479C30E850023175915E442EEB28B66C84E0B3B57EB6A1AFB89C87A9ADB20 4D6CB99C3D98BB8DC6892ABC1D510300122A9E30C6BF95886FA7DBE233DC922C3D2E 2315103AE13CD136AE104D5FB5323F3CDA5E5687B5836C5A6991F8FF169302829DE06D A126B675D |
| 255 | 34AFB545DD58EBBDD09F26605A02351C941348F163DE52100C25DD76A21CAB305AF02 334C33BE0694CBC7B77705812E4378228D5928269D518961F17101A8A2302C258F3304323 422B6CE7E8B81A9357ED867241CB3FC6EE24499327EC5495C6CDC590BFE0ED4D1B61F AA686 |
| 256 | BFCD82CDBFC034624E580A8343D932D53A1EA883B433890D8AA5B5F7654C888DC634F 728A7D2D12749C9A96F41C021C11E05F6DAA6415CAF3471949CF5E3FD8CB3786FFE402 098EA5F15D9E3CF181A557F05C0B912F82209D92D53E700ABC86CAFCEE76CECA59A0 2F60B20BC |
| 257 | 5226A742A032C35088E9E0B8F3CC65A3AD0BEBDCCF2A0BC65C8A8AEEB1758062976E C0142E600AAE534F26574E2D2D2EA0DC94170C014F07A5B9D3567D414C407AB9EBFE0 D21FF2BF4907815AFBDAB279810BB2196BF20ADCF383088A1808797D5434B60CB0AF6 4B335CE3C2 |
| 258 | C3048DAB6DF410DC67A6AA6872277C47623E4448C6F8D08A4381D699E21005E85A7546 20F6BE579C835D85C46579E1453CA853DC2283CA459B5A4144F60B654F5F48887E00704 F3E59B44546076640CDF8B1CA415246B28A838E76C72D3DF60E8BCBEB1FCFB941B866B 399ABC |
| 259 | C710653299FC28CE72B7624EAFCD163A1E494DA05641829C410BECD9083DF673751A7C E6195D4986DE4A260850ED42AE9094308D490FCBAB3C6D07863C549CCBBBF1D591FD DC920D0399C3E3D265664C3E57CA5A7193162B2279A6995A32FF45E79DCCC6138A9614 A0DAE183 |
| 260 | 6DC1DB17479A7C051D0F0A57458E2694898560BDB73E8C6981923C0560283E9B6703767 2173F56A0344BCF650849D968F75C44935A66A5142A2F1C41A1156DFC66E70ED22D1E85 220890F1EB3AE5B401E7EB3D2D4FA05E3014E21FB6784BCE833F997EFBDA2CF7119F16 86A6 |
| 261 | DC501349802235193120 7422D67891D045428C31F484DE24F2221ABD67611FE89406552A7 DCFE1B034F622AC87ABD9BFD33F3A9AB9CA0EF0A94E629246E016559E726A13F3A2C 3B73833DE8F55EF8E907391AF5AA4E2174EC2C27C00FA9760267E47FBD9E97CBD50D4 751D53 |
| 262 | CF9231C697D585B4833B07B1880E4EC3D9BCE11FDC23D40912E380818C01C4DDD0BE0 D1746FCBD9EF236591C88A6928B2A89277889610031088A2FF85E9586E49966C4535E27E 6726503BD61C65EE8DC089432C67B683B8ACC34FA710F0B33BEF09E7AE164136BBAC2 F3902D |
| 263 | BD5046F11CBE9E27E7E57FAB88449EA70E811D1C84D08F587E8AD1B0F3AA863293A87 1AF388786C1447F0411BC28408413ED14E1F900182EC3972D7E0735373E64EDFE27D50F BA86E1030F3CDE66D2528A795F18EC55E7F5A267D915328CA0511147ED5FF10004E0339 0B5B7 |
| 264 | 6DF1F1261CF5D1B885F4C3F170CCA572ED88E60086232CEF8937B002B8530DDBB9CC0 7C51F04C4F5784632997C2CD8C27CBD8ACC1D0305892940D97AB59E666E8D69FCF1F11F 111DD5FD079B7390A5D6198242B85C5AAA75E7401F5A40A746ADDF8B4450D6304B0F7 997DBFCE |
| 265 | C515C90450E6022BB9C249D78EBC11FB198713588748E650C34BEBFA21A93A740C5C25 5D886E5D03EED87E386CC226D204E0A7227E389B1DA38623FA23437748F3E6697CCFA5 8F84F02726DE379B5B02ACA80F62CAA92854956CA537A6EE47254D00843C57D6109750 AA0BDC |
| 266 | 2DF1CAAE58C86B81B9320011CCCBEF42E1B7385669143A231DFEA850066403347F94EC 1A9970B3C9CAB01B03F4C7624E5E5D781629E627298166CF49FA2E1A94314FB7BFE9BD F388DF8F82B6F4C2E41B32A88E2C3608210D5869091C98447EE08EAEBB8749BEA8F15A 3928E7 |
| 267 | 3F207E65A79E990378EF3AA65C083C4DAC9FA10BBC925509235502900D3C8C591C8440 7C05F8F96B1B8E66557D5863D1C794E4D79FA8FEA79E852036A2A9944687D65049776D AD1907B6434216 34F1A1338DE267B672777CE6A794128EF2C9AAAA32977E0A3E1C54E E330EF2 |
| 268 | 8270BC882B4D1BF460FA06CFC352937A17574BC5EBABC35811C94211F3C902FC7637BB 2D58DCE3FE3B1801B5A67020C770C057896AE52E7A236E06DE689AD78E025B8BBDBB 7E2BDA461A7A40B483DB219DF8545DADA1D421251813E1FC7A8A21531CFDE5987251 4664CA608B |
| 269 | 41C83D4617F20B929F34207480B533481A781912C0260C150F6F727C5BF56D4C0D63C036 0576AC463D75B48E85D74ABADCDB1489AF974A5161D11988F215B8C4808395DE55999 C975D305FADF7BFDE60A868C2D894F9FE0C09BE261B30DEF93AE3B305E6DC74449F74 70B492 |
| 270 | 94D2368B50A5DDFFD48303455F01E730D19414BCEE7548EA1390702444F700919E9A8FD 34354BD3B22B16ADDD1C10D2AC49CD82C9325795AC7674FC0DE3BA9E30C49C77C2B 4E9A6C35F33AE2339B585E223BBB6D9A1418DFDD6C16F432DB4C0E5411B1DDA1B548 801B7C79AB |

TABLE 5-continued $N_{FFT} = 2048$, $N_{Tx} = 2$, Length = 864

| Index | Midamble Sequence |
|---|---|
| 271 | 6752F0966C18DF89B464C67D96640A52136F9C1CEBE096322EA163196AA72203F9F4702CD43A9EA4D08104EC14547F4831F9EE428229F0BF3A94AF1019F71761AE54F87A2560F41ACA60D7CD4310594C52EC0ABDF077C04F791555D3C38DCB57DE52A06568C8FB5CA6F66A6E |
| 272 | 5E1A692EB852F3563C506C6EF0344720CAEAFBBEDEE8813830402AA73B21033FB73D5A63F71D203147A28F92A1F28DA3E1080E06AEA1C24DDA9D549DEB5F364A7CE13A17263154D7C7E254EB7C139FDF8B90B2D02604E74D75D8222C5BB72168993B76D2680794A4AE11612D |
| 273 | 24F8008847596CE87D4CEDDB142369B46CA970D3E304C58E73F9B8120D602143687FAB26618F52BB86492B717043B034CB171A052968510AFEC461B042ECE88EBFF4358F181F5D4CC68EE6D5CF5DFC79AD0FF056FDF3AF93B95A230719861A88CC8D2F8A99E12E51A2B05214 |
| 274 | 75107D18074E88C0BF7BE770CCEF864C8943D55DA16DDE3D45069842767C5392C241099860D2D992C6A7B895E60EE7614336D8C131023DA94A73A9EEA9A9CCA260DE149B16FEEE62ADBD7752D26C1FF7F12E4A979AD2DE1A3CF29A2601D8EFEFBE9169724AB67E3182381E41 |
| 275 | 9CC108256287E116991EC4F1374066E096D1DC9A8929675A3C5866A7F606A6B004B7702CCD21A6C4CF12B34E887ECE6905CD4D68687C81566101C0DC77FE7D100AD2C3129B9DF9423ECAA356FD82CB8FD17E4616960CC91663C4CF1440164863AC2F9BE2C53FA9C8BBF10BCB |
| 276 | 27C097A265CC0B4D4463293A848805F0683B0CB66A8EB5E03E16A9F1AD3902867AF4A3CA09E682927E64F5AEA532B806479D015F20DCDEE79B18FB9A536A3885E117BFEEAE1BEE92E15394C0A5714435BB1C5E3E57AA6B78F12A5601241C5BC6B4DC32188089ADF019EE00D6 |
| 277 | 19C3B4868E790DDCA047CF98048A0330C09F4FB1ECBC01E44F8590AF919A6E5E8B58AF42C213518D9A6485B9C435E45F51DD227E477361C7D157C9F4257856E650B975E68D90C329564C92F18EBC59831B90B22EC574F0E58107F7CE7FB76F27287BD07351054D6BA19C6ABC |
| 278 | 4BC3F063A46FED15004AD95BC2CBC377F64843BB5D8E20B688022E8C527FA487FD3638547A9B84811F8C88171DD5658C9F91C6C653403ABAA3A120E3710136224E744F28C0614D67287CFAF5EBD530E5ACCEAFFFB6B72AD761724D611BC53FB83A7906809D24B868441DF00D |
| 279 | B293205434E526870E6CB105257A105B4D9C7322D15C0900F7EC916650E87F75592CFF82B6FB4B8A01638EC205B013E03D71035463315B5141734179DDE15E45E8218E3DFB1CBD5DB0799F5284AE4E55A1722153D553849E3A4AADCDFEA93E5D5494C80C47E2E26C71559DF8 |
| 280 | FDC544519FD06B9F8FC24D38B278B0BB8A177F9160CC86B063088961227157AACA6B844308517E751881CBAAA9D1EE38CF7FB55211283917296E64B3AE119D5EE4F92CE5EAF4EB578E261B2C02365D696443A56879DC5F901DA2049E38A33701595B69A06D7D8FA0CD583B62 |
| 281 | 0BFE80E58C69C54A13B5E57E0DA2B1CD9FEF299D76D70310EA146AD2700FC4E1ACF6B243D3048CA058A079D68AF603020495BCDD434001DF9757DE1C485FBA74C069F7A4F0B3E7170AF2B22034A6C243AC3F5904FD8CEB9716E8534A74A64679D30DC8B2BF74E4E8DA1EDC15 |
| 282 | E4E6A88AE296834A98A331902491867A32FD0661C4BF40D9CDEFC60962578B06D47C2BFF054D317BF118F6144786C5CE3016B71A007468105B8A3E5F197B32C9AA5AA6C69415A5B161A33DD9FFB2308260B628D076355F7990CBF04440768D5DFB27C22B7AA47030EA5DE1CB0 |
| 283 | D328156913C7542A77EE8C746A2A837C4318A5919A14F1CBB29C35BBA9374155E879CC8813A2BAC3CCC089D3D417B92F68CF816DAD8496FEF8C8E4C37075238DB84611C05C1983B3BFF65EB127FE0F1594459CC7F0342593B38597FAF0A0E54705569BFB8EA873B5B84A779B |
| 284 | 16F923D8652047F03B40217E487A9C4694798D0B51F18FB0E5F622472D7D4A73C6F93E24A6C5EC406866A77BC890D9B198E98EC5059B50767D7CD5EAD803A34B856CFCEF27DD01B914AE911AEB86EE3E061BC98F4948102A086070CE08E147CE43682065E4FA7BF92D95703A |
| 285 | D97479CB49F050A9B2615125BA5A91C851EB47921147463677322651 63A58E386F20320B8147C924C5A6B7CE6E9B7068E9465719912642D4C0EAD503233B7C9E551287E2EE7CE30183EE324996F93E40D32762FFD4F949BEF93F4673AC574DFB56270C90B0A60CBC17F982BA |
| 286 | 64A259CD81AA5373B02EBF94842D260351EC440EC076BD4A071E14151163C3DBB027D2A0C0D27873BD68BDC400F20163277555D55D195C17F8AA3F6E9CFF163DA10B2CBF1DA1D02DFA82622BBDB3B4592B1CD60B532CC064125E680439A78CC6C94855474F01C98A3F5F7ED1 |
| 287 | 221BA02875D14CF49341214027BE1DA69DE862417EA55EBDDBA8292227A20171009A1929272FBB2A9DC5745BD54E19478A454FB3EBF084BB5A1E3342D9494AAD0586FAD72365E936592BD246F185661F2F76B5147EACCD98B6E4E5C7DEB03AF9BC3A5002C0218E631862F9D7 |
| 288 | 431674A909AB2329266A5C33444160C2E105B71EEBCBBB19386009FA3835921971983587 23E27FB88AE45A92653FB03B36D2A48F05CEF0CFFF4AB2C6D1C7B869B5407124A8D85427D5DFE31E2C9931E3C150DB320455B0C21D7345640525F9C5313D768E66598CC2D7B9F405 |
| 289 | 22C2200456B122332656EA5C994CAD2A308647B2D477497ED744B896DD90AB8415E34D2D3A8352B65ABEB2FBBDA0D84CF2756451BFC8388C4EDEB7B06C046299FFE53F6D3EB1B8EEE98708F90ACD902EF450215D7AC15AF8952AFF75200F0F21DBD9016D069D3655224AEC30 |

TABLE 5-continued $N_{FFT} = 2048/, N_{Tx} = 2$, Length = 864

| Index | Midamble Sequence |
|---|---|
| 290 | CD4E383C00D2448D4D438514CAB7AD1A6018790428B9A813992516B45A4B7A1E069B1AC8223CE574F303E65E0A31F66966EE5CA6079D29094FA3F2CCDE5232C83847221EC9CB5A206CB76FA0EF957FD313B4165DB53B51C739C1017460FD6B89B2B299100D5C87933A9DBE0B |
| 291 | E5D6867648B1B58A685666954A97410D18ACF833048285B82DE6FAF8C58001F435A59424D84529CC6179158158CEBB180786A98D88D484494FDB63A1B758C6A45670946F7D3A5C0055DFF5CDEAB847E33847C96B052A8A0972E36672AE8C881D73430377B2C299CF0240DB347 |
| 292 | 99F428CB50B30E4CE390A226B06E1AD9A4D78525506671D20E81184FE9FA33FB2475A460AFAF087AEA201DA160E9F1AC93C4D952097FFE1A2CD183B84096ADE881494DF32ADDCB0F5F2578BE130A1CABA68E062406DF7CE71090A7E854EF1D4F695BB991E15636297742D8A5 |
| 293 | A1C51641C200B5CBBCB21A41A73329932FBBD2284F5A2A03906E4934CE7AEB717E511D3C59350001C340667574B62182BE4B283A44FB96A768DF4A43638D348EAB78B60B01B2007FFD24B8904EF210024A8802B22F330BF25E77969CCD9D5ED78EE7C2ADCC6B2886C9E1FDC7 |
| 294 | 5FFF9F11071065A4F58FA30D9F2FA32D246AAE4558134F5198849E78E0A4531131F6541E901CE01A90710E163BEAA2B95F85DAD20ABB2FBAD95DDF06DC656A7A181971FC6A71802833028FF2A94003902791503777 6879E7E9D07E2CB4679C11D6E9B1527243D17B69364710 |
| 295 | CCAC3333A9D5C4100870B5D888C2D9D12408F6623AA4B8703EEC8E8945AD18FA22ABB3AEBA26DD96B18C5D04F4083D99431AB462916C42B491F2AE4058FB463B151EB23DD724AC3B28EB21BED275A97BC42B9931F5A0107DF71BEA2C2215B1619264052FB4D0FF66180E6516 |
| 296 | E0BCB9200E21C20F7A240E5D2136A37BACF0647EA0B16138814A85AB3AC5A9363CBA83B59D9DEB012BBEE29B4632163524CEAE37E82551A26CDFEF4773C1127E9EF4590E97BD965D66E4DD84D9A28724B89D61EB0817A20FE31F8A8BD5A182E9952560908FD777BD5383025C |
| 297 | 5EC6D82C1F03667FF25A6E48F42B9B178D0427F10C1561053A6F09B0EBFD1C29BED22064646B6ABD85367F618D32118481AB0C96CA3E4AE77E5A9C5BC28A875E676D32B6E6E2E0C403D1E8DB95D8E6B3AD6E692A45B1B72485A4584E48E3FDCB49F98D82DFF185BA46382F993 |
| 298 | 3B2106CA2FB81662D926CCBC53774084B16E8E7A12C560CB8EB9275C1C232E267273232CE91AACA4B4A791068EE72C07AB45C8A15B9C1A1729153138511349D2392834F4B6C212B991B6E81E663D4B432629FC4F7D37D48BBED4D46E2D55E33BB75BA561D45DCB73A8B4C25C |
| 299 | E5E662C0F806CBD740349660778431ED267DDDFE754A936150CB79800C784330F43478EEE2E48B84793E497DB0020E91B0D4CD1BD8895D3A921583118D1D214E14856D726F2EFFA057A0C8DBB894BA880122F7781399D9EAC4F60B802AB6A6947F1CB5D5A2B3BED39A3BF4D2 |
| 300 | BBC66A0231730DD3F183EBF20004F6678491B81BB9BE548A3153E96F4B9B9276BB04A3D0BAECE930C10854E61E776956 97D3945710A42F634920CEEDDE7B4352C03EA2E20491D1D8814D67D8BC4BD648EE564E8FEDBF65F39C5F050333D5BBC674AE60F35442F44C8330EC5BF2 |
| 301 | 8B82E2802F78411E4224255BF69F8E8555040D6917ABA9BE1B9E2C443148A30611DA2E4F941D6C8438AD6BAFCDF29E0A9A24B1579129E6F068A348F4D1AF2AC51881C103DAF15D805BA63BD2F69CF3F9911F8E60D48856E79A951B4E6B3DA8CB4F8C63319B5FEA109ADC5B0A |
| 302 | 68C4888C6C5A61927485286EFF1EB7A055411199570032C872ACE48B8BB15593419175B0B2A22B9384B263D47A289B0994AE0F4FA33C95069E90CBE946F727D2FE3AEDA70A46F961A6F8D26640A0428DC805CC786A59AC242B8E2BFC139EBBEADE194F687569FE905C12D732 |
| 303 | 3AA7F64926B9FCCF2B8CAC222620901943DB114A960C085945EDE194499138B0660D04A4511FFFC750CE5548327672D08CE94D9263C8C383F7951DC123FD93DFCBC36C0018A6E6085EAF7DF5686853098830ED650E7B1ECF9AE96DCCB56AC0DC008678CE0E53A6A173CE9E3B |
| 304 | 8C63D6BBA0910F791128E8EA0A96C6C3A18131E2C51EE1E377E2464F22AC9689062211BB1FFE47F642AC209A6CD26A0814D6E2BA82EB760CED16F6C33992FABD27E8D6F70606F9F0B18308EE29FB5AD1D19B03377EDA111578857AD4CB4D91798CC85C45D94D471DF82E99DB |
| 305 | 5480D82042C32556D4F9C0E90176143B865B966305300ACB6727B38AC5637D2E9BB426457DAAEAEC84227222E174779CDE745FBFA469608DE99039FA684B0A29076B76F54360137D249CD5433506B2A304EBBDD8B52361BED36ED9EE3B3C0B20691F4BCA44663F4F1C5950E8 |
| 306 | 5BC6FCDDD922AD0DC4AB16971A89C539232CD6E048A1A37D4194E9F604486EB890E2683281AF4B7BAA81EE8438F0E3905CE3545DC87545AF0E040C66BAD9DBEFD455EB6EF4AC451CFB5BC8F355C7D90E6201D3D3684EB3080A4720410CAB4F5C474F0B12CFC74063FA055972 |
| 307 | 329C09A05E0A273BFF299F2016140510446E5A40B878E3A2F7D05F015C8BBC9397BC083C9BA3F95D9819B68CE0B7147024B7A60C11182E2FB9895A25E384F477DBB42B3C32A72AC107D85A44E5518E69ADD566174458373B35E857AD234763F4910E43D1C86A5B6595CAF44E |
| 308 | 18855A039C7160C3846EA305F3054FF22A6831F28285A4AD26EF09DA1E8D8B606584D7535900BD4E3DB334177FD3A5DD20061178A8BCAF74382B3D86B18CC87D0D1F52FA4375DE6EEE4635A43D0C306462C935BB2E523C1D35A5CA57EFE4066D98BAEE606D4869A9EDFC396D1 |

TABLE 5-continued $N_{FFT} = 2048$, $N_{Tx} = 2$, Length = 864

| Index | Midamble Sequence |
|---|---|
| 309 | 9793894473D5709B5CE47866B3F0A9120C8174442F8995C4F08E282FAEC38E63CA2D6024 8850367D483E406BCE300BB5BEE83285EC7445DF9B929EBF8EB956FFAD4AB12A3A0F3 22A208A192611016B70F88481E55D8C6AE85FF94FB97F685902E0AD6A1DB89F3A5BBA C36C48 |
| 310 | CA55ED001A7AE487657224705DC5733EF0C59988B0F0E100774AC61597E658C525450A4 93745F637ED89CF1D834358770A0A27CB5C060DF9A718B5FA197EDC17ED449E7E01FF B977BB47949FA0FDB8231C4894007934642B0BD78EE7D52F2F8840A8BE8D27491434709 D136D |
| 311 | 0DE94280156C76E744576B445B8EEE9250DECBAAA5B9685A6EC3503460651454364B60 A6D9F935087BE533F54027426B133E8CC9031042181E64BCED90AF433ACAA779630B3F E842F4EFE282BBA709FF3E68E68090A2F4B4648ADD30259C93F2734D9AA2B3AF06167 C146D8E |
| 312 | 36311AA851E2628F861BBD9A78639A1C8B49C850D12BA736A6179E499E06D7845CA3C9 C5E6538A7E189BC0CE048981EF37A6F2034038E3830BCC095FA4136B59B22D7CC605107 06E0DD3DCF4945D27DA768DB1D376ED27AF7997CD56804AA4AC002B9C4651B8F41F4 039DEFE |
| 313 | EF7C4CF100E001F7D39739671D31F08400234704138505EB767812089C0467FB4955A9C276 DED0B18C516484485E502F4CB95BF769DDFD4B9E8B9C30C5EF7FB4B777438E9CD15FA B4B71A221CF04C9493C9FBC2E0B8278090B5A409976F86D4AC7E73A6E1C5AA9E6C1D7 38480 |
| 314 | D5C449C6363839628013CCE5DD83763A47610303973A05C65E1C7DDE2F9C3AAA9B56A 1ADBC18021F5DB42A9C80C9F664923BB3C242CE509DCEFDE44B89F59FA2BB12E3B7F 97641503D06E650B51B328C9730CE57ABAD9004F84F1A66C2ADE144450974CDC03C9B C98D616F3D |
| 315 | 19451FB42B36226C876982814C1CE96902943227F9F85AE6E85E0125F4B0C375487F5754B 2EBF243D7694FE8762A90C320F260E5AF31DD348B8151893C4E20D74373C6F1B789F6E4 DC59886B5ECFABF88E67159DF356DF321AD81B0D3DB66AC9CC511A70C282E8DC1236 851A |
| 316 | 8BAF00800F5C9008986403400CFAA39D8CCEA0C672619D6D6BDB416C90CE1617E6E68 FB32457CBB43AA6F5FD728A4402CC4F8040B543575E9DE3DA4F2954DF659930447B265 D8194FE245B82B0270B4ED66713DDB3F21C56F444B5831868C9893CFAA378823145A489 6471FD |
| 317 | 533D82C607A901A781271C58791FAC906E204BBD1AAE0EB39FAEBFAD648956E4E0151 720002D9F7E60838B72230B20C79EE4510A88B6AA1E5A537CB219E3CA8BDD3B8C4788 9E46962F2DBFE5B44E566F99B22748C5D09133CED140DF61D43B91B4EA34FE8308216B 4485D9E8 |
| 318 | 0B82F5FE820D5333EF389B5D37C71DEC6020CB5A8D425917F34F49A610F01662F113DC4 0F56EA609E51123471D241920C61627EFC144CDD4426EA4CA1FC7313063A258E8F67EC2 E203354E80A85229E38F402C19B6F5AF215CFA7A4CFEB39B15EF44E1A464275B6CA6F4 455B |
| 319 | 2969526CE5A95EC78E660089543C1FA9043A6E6B7514A10F0D958E64C1B9E9170088A5B CCF83F65E385AF91CF598C8091744C6ACD8A0DDE4418E6ACFB5F805B52555D52BE6E A0B30D3E343F9B88FF08898FC06EF692612C57B4540C27F2C9411F2FD80FF5B63CCC311 B9C1BB |
| 320 | 79420FA9FA882DA221225CBE214E3DDE42D16B41C92181627C2664739D7301A2222C6C 70B6951064B4BD2311D2A31C2E2D7BD86CA350FCB9C65DFEA89E1B199A6D531691C0 F9F151A21A8894232EB44A782768CF0A056641527B897B55EAE3F8FFB772BFC4ED71164 AB98B66 |
| 321 | DB1007E3EE16A5419FD31A082609B9DDC48CFB7EB052D18861DFDC900CA2A19E2162 7645809119052A2946132CA97E657EBF1D12A06166711AF2193CBAE6CDA4EC1E3DCE9 CB8ADED482461A0BE27DBCF68CB9210CE1E2961EECF50E3FC8E2C3D5009415B5813D D86536AB738 |
| 322 | FCE4D07D6C26A00AE3F7DDC7A075106913AE4D89134BAB8631006B2C4163092A83A2F 8B99A09A5C1AB34EA933AD60DF9C549F03A0ED76300D056F6A94F1F84051BA10B4789 5C25E91ABC894786893D0936F4E6FC9BD14B9EDD65E0EF68899BF2E34E83B339B141A3 BFB980E3 |
| 323 | 3607801C314EA8C9AAA339D1479F23E4BA040214875F39692E06024A6347A16E592928F FEB100B96FE3BFF042D814BD8E03E5C5EB63E6692BD8A479CAB44DF4565F8ED215EE6 D633AA23D6DE4AC4BB6FF021D32B2C202DA5CF1931BFE38A8F0C5DA90B54055166B3 448DCD88 |
| 324 | 2FB50C6C366012034B9D858648FC5CD16B786BC93089513B41222CE2340A00A5AB9874F 241D224FD6D17F43E00506D871B8D3577FACE8EF766A89AC23F67708A6DB20B3E753C4 4A0610D147FED126698281AB46FF23C4335D18CE2BC48EECA821AFFD5C3F87394E08E 397CA5 |
| 325 | 401C79AD33F6EE1F3325F4B105D0094373A91D5E4B9B892AFD7D18DE142A24887E2728 534697292E222768E5A24DC69EB087B6D9680AEF549F08500383650CD2F19311E252E6F9 56F43D215B4C0D96A67AC3673E337C2339B9C20DC24E1FF357F9C9689994EC37E9CB8F F34E |
| 326 | 81C85A9106A91A08D6B706FDAA9995C24C644BB7E3312136B5566A5E033F01C54CE690 032AC674D0CFF356C951C8CFDD568047A2892DE747F4073D379E57D1A21E65C52B79CF A072EA16CFA4AF5025296DB5EE9E19343D3983A14700F1C928946748047C97F7C928575 1A358 |
| 327 | C81F6693C6658E93A8DC16A4890A737B1A4B83887210FD157B11779D2AA0C178AC3053 136C4C3097E12786D3B46B0D3BE40AB9DD808468484F0AAEBA5FCE7ECF5060CBE054 6E0D6EF373141073C0D62F8EDEC9537187241DB69841FAF6BD0F2C4E2A368C0618A7AF B885D2AE |

TABLE 5-continued $N_{FFT} = 2048, N_{Tx} = 2$, Length = 864

| Index | Midamble Sequence |
|---|---|
| 328 | 0A85A364A2C6127D18DC487818D7DC0180E8506643BBAEC539DA92D063CC16D6540F AF3A57B5283DDFE29D3B0A8884AC811AA7497E6658F16AE3992D7BA955E6E432B2857 2892E332DF46EF32248F4283B99F8FDD6CA68063B51A4733CC4DFCF4A67D91F33A1366 A26259D83 |
| 329 | 0D4A188364DCC78CFDF29D5E07EFD63D9046E54B50D3049A4702B314AE8385184B6A7 20984C55E6451E6586B9C7DA513D39D6A93979FF53E6CD7D367EE8A05000F9BDA5CE4 F5E50D1E48390F075A7EC027D259EEAF95C252A608CAB90ABBC1E78463BE7F6182CC4 301EAD170 |
| 330 | 5995B49497E04F0169620A8C61BB718ADF1FB6F4E9074644AD7270D8074AA3C388004C5 4D949B57A61DEB9845A69C87F3FEE805B134CC5D5618AB9B39CDD043C352DDEDED3A00 3B8D75706862FD652C2FFCFBE14E02A0EC9098F4C4255F9E34A7238D7EA6BBD260C13 0652C7B2 |
| 331 | 2DE19FA6C7777522DF882346D735BCA73261AFBAB2919C2511D1A2CD63026A0DA5510 1125CD58BF019C5E58239A935481FD36017738333D130916F9A28A8CB890D782793C7816 51B7685D921559716C70F61A4DF999E92B94873BE57F38CC22635056CF5E749DA384532 CF1A |
| 332 | DEE896495361E37E83C751EEDBEB1B043AF4A5C12A56CE5E420504098472C34E823E15 BC48408151BAA6D622D6BC07FF294E321E05FC1EA6F35166D1C928AE30999E47E851C5 A6630D95A31E58F18E38763047370696B666DD619273EE5659C8E2C582F12B4EBCB3DA 3B1A8B |
| 333 | 8ED016E1713C88FE2BF464F99961AC20E8F98AE91EC96AC069C686C6AC27B9AA186BC 794019E09A31154B0E81B1007E528A4F618BB81E0C197FFA9983900C4D24AF19A514E0C CEAD7444081495BB94ECFAF8EBA8A883F72C4B0666A59A01D1FD28CC350A8F737FD5 A461ED2B |
| 334 | 1370CFC254933BA2CB07A2AD344C09351402CC08C87297A250B8B364E236059F554C791 A9626077A25502B228595F06FBD9899EE0EBF7D7F00D6F37E2532E473943D7DA8349302 29D827DAA5EDF4FEE5038D32FACF31D886956C4181F8D56AD7004AD42C844D7340C06 46A9D |
| 335 | AD96A39C1FB50147140EEDD20942BF7076822B69DBBD1D01DF333C6202D0B314059B1 14BE6EEBC941046150FDEB94102297F02785774374F0477587D27CFB6F1F7809A693FCB3 3EDA02519E82938A49CB9AE26AE73047D5A8A10C03574697D0AD7FB97C5C77892891E 00B73E |
| 336 | 146C77679A2316C5C9D3B33453C010B8F6BEB02A92EF8E8A6C7695A10EB06B3C6A4D6 1BB15EC022E0FF20152BC84B43099CCC98457617346C078EBE0C2029EE732658A075EB1 C3051B1CD73EA875859340B85D16FEDA750442E9F1121F56626C08178159BDDF7135C919 CBC22 |
| 337 | 55828F799555EABAF9A02B15366C68051C4C0BA5C5925E7021A41A8F3D43C29CAB93169 FBD3DA1ECA180D55B8EE0378368876DE7840FCB6C5B8DA7C42FC9A56FC54EFD26A4 12C954FC586D081722F4E7AB051C835A5C623374239B43D9CB3A14A71A550377F8A7F9 E845A55B7 |
| 338 | 4B46E80A10EA8BE699D02543509CDA9D1047C03DCC74A0F9B6417E7A7052F5565E1994 E34F59E0CB88551A1DC5B3473B4D6B02CFB231DB4C3B4F1617567FFC234069A185F9F1 2FDFCF7668137CA424C6362AEBE926FAB4D3012B485DD63556A6377414D01FEC70B0C B6E8780 |
| 339 | FD4BD97E31EABC873E667000548856DFAE56F9CB44CE88951D6C3F19006B21C318097 626C21AB80B0B29EFD027206986BB732289D45734B8CE77775FBB69902878DA1C24E09 E3842EA5239A5301C8FD50904850760E22AAFDDE0A4C17DEC159676BA3CD8B6FA3AF 3A4E0530 |
| 340 | E6DCC774532E9186FE3B9988CC4D4DFB26881166118D0D9894CA66A64DA209143CC0D FB32395EE68ED390CE5A8D02EB4D1C57005A266240302BE55FB4BDF0690F920AE1317E 12AF5D671B6F88814AA1CC5B5178D5B6B4F8078B2E36C3A84985A057E3BCED3E7C3E E1CA69748 |
| 341 | E8BBC9283376C06E03ADA357AEE2E4718C31B37F230FA4C76D855EDA44218C4630CDC 940595A90FD227C42C03BBD3475CE9668343358FCBB60382E452DBC74A1DEE9D79F958 57952911AE89382AC6D32E39EAC42866C720E812F62ED6782025629AE64D71413B8CC33 683BEA |
| 342 | 36A311BF1A8477BA46EC1AF0115B059625A29E7F0518A562701CBA1B7DB3FC7063AAD B092B4B502A148316FE2B919E81F59601F1C7E03A7549DB78FF180F61371B2FB3FF99A0 62E0A3B7C10CC4CF4B633C92173640D1E757984D6CBF21F1BFE9BA14200CE15E5FA229 8827EC |
| 343 | A600879F827156E90924DF3F431A05DDB2BEC4C95028BC6C0A0E1C3EF0FAD2A72D00C 1A25AEF796DC4E20B56247806F00B76C850BD1D5AD762281A7F89357734A8E3B547CD41 750B58F3CBEB88A5BF2CCE45658425DD1331A597B48F4C21835713F144C17A6023E83B 8D9AD96 |
| 344 | 00E440B77E0E012E7108831E41669B06BF2B52C3067F289379616912E534BD8C7F8B2C66 ABB36540267E681D0E59351A9435E25EB3DB0B19E0F11348CF2F524E8AE15C3D5D90B6 E50FD3E4B94CED9795D5DCCC5A5325347FE9BF61A38098CF8BEB0526B113450DA03C7 4FC94 |
| 345 | 1C6A9693BFB2CC0CDAE4B187B25C81E811EA1E00BAB139508AF80D36C51F12E95DCA 6A5C6096F5B27B772010C2B2070B39972C5E391A01BF8A3261498BBC99A94954B77B5E2 3448061A8CB65BB9E2B1FC0A620A89B1DE66C7BBBF512F5DA1F2198F48D67F536401E 61B57A00 |
| 346 | 03414246951B0968B04011849366B04A70C962BA47D9E7F159F7AFB52DD22633939493C0 AEC84D73063BF8E3EAC104DC8270CC2AE2CE69A3BEDE2F78130C57C189AD4E39EE45 19EAED2A81D516C351ED9FE0E861B4E8B879310A9D4BC409E9FC142DEBB73664B0570 B261020 |

TABLE 5-continued $N_{FFT} = 2048, N_{Tx} = 2$, Length = 864

| Index | Midamble Sequence |
|---|---|
| 347 | 43483164E0CACC302554142A8298B4C510823FEAE78F7529BA24E83D1EFB0FC7658694B1A2688A31B79DC36BF6FEDAA86955D90240951E95060D60980F512C60A433ACC34C3CE533E8AF7711DA4DC6444A5707BFC8542AE520735453A25FBA58DA0712C4C2F7E4CF1CF8BD72F |
| 348 | C8117E811FEAD8CA2582589823499E0214155DCAB0FFE6C527218FD3B5E6A8D653228E039ADAD3691CD2A28FCA47188B6AC4E436AD8E4A5E83A0F4885C797BCFAC1E13E0B23D84C6526C2618F50226E53C071751D66562769DDDCAD4D8DEC49FF5B22BAF2DD1DAE1B19AEBF5 |
| 349 | 3DDDC21502E4166CB640EA090315D00334235633DD82B42DA486611ED794F2792BBE133965CC633DD03C37D05819B284E1113C0BEFBBE74B626C00A78E4617CB0DDCFDA201732725716B92CAB392569294FFE24DA25A564393CCF1B45D6D94E26AE7943EA85B50301135FF5F |
| 350 | 424CD5F16CE4E1269242ACAA405026ECC34AFB7E921F3847B05D5D0855AE3186D648B89A4A2A9DCE225D25CCC280CEE8EFA10BE9BAE7BDD6F81513652728DDD031C50B0162F23D61144CB03FFDEBC5DFC8B46BB0753B84AE17843A92175360D83773036C767E8B08B838D062 |
| 351 | A96E48BBCE7852FAD9CD83DBB31AAD8656A8472980115120BB18853874341FAF3227059709B859773A17C6A5FB66B935DBFD27883A1DF230F46D887B6CF4F2B9B795FA1D1CA2CED194EC3B2D74B204060FB22283033AB93723E0777C187995B77DD07829C05822BDBA2C64DC |
| 352 | 87EC694FE6FC86C4BA3C0ED314ABB983384483132307E02D9917006079742EBB620EA372763B53BF38EFA322819B02E65D48610F0ACCF6CE877B8A1066FADDE5BDCEBBB9A4D886D7356D8C2A1077C566C4CA29D18F727673861A9518B82AFCFA0FD11590271E65A22E5C08AD5 |
| 353 | BF0DBE448452C111ADE99C1E30542BE6F0128A9D02719772BB5A4F64F29C4C0EE5794A70BC69C10CB9D20EEE006608769BC6016E9B43842C80EEA5B57FF1474F62957302BEC11CADFE6391A78683EAC86FD7F91ED706D812A846BB701CCA3862356B6B45CCD03071690D90EB |
| 354 | 33C52084D28291BBB10F5A384F4CEA7F6242D226D45A96E796BA6462924CC698060105701E775AE4A32DB69C88B22A6BAEA7A47BC8F6F45FAAE0F4E5EF162D557F46DA56F823B28974C82229444C28DC5BE3990482CF6F5633892517A6703D650A2D8FD2D1F7B0168BE30911 |
| 355 | 23BE98CE27887DE2A9598F04B70A7A3C8D241337C7DC1BBF6D103B6AC5C8E80AA8D433660F52C524602909235C0032412AB9EAD36EF04A706D5897136B8FDC954CBE23AFA238EC17EF920CCA5E5320EF739727D1D6848D503DB6AA935A50CA86647F5FEEA859B2FBC3A62A930 |
| 356 | 02DF69CE0438D8BBBEEAC432B90668C71E26C57D3632B68A82A841304EC68C064EDBEA81A66CC7CBC32A19B47BC2A61318C82A02D1D3E2A0F579365A218AC831885EAF746BFAFB522160EB1D55424F6466C91DCACA499ED7BA3123F6211AB4E6806BFBF1C01B60B4A81F0C77 |
| 357 | E030A3FB76A5E2246864F83B2F69849C15985FA6641EB39C6F73C8A147EA27933C9016CC825C7D1F7B4084C5E50079BE3096898D65241452930F5423EB8CA5CE99D594D7CB1492EB67182AB66093DD36796362BE573D052BD2A7586A7DB2EDBFAA012A6717DAAC2782794700 |
| 358 | 4FA10087AA1A27EED6DD8347A8780A56E583CB1807C0D032138EE0C2814ED50FC14E049E53FE49E71660E3F482F0AEFBC28D71DC0E5A6C73B774F22B64F65DEE08F14600E293E2AE32FAC9F13316C34AD72F629675B18A21793F4DEA4417071B66798B66D9406ED45B9ECCCE |
| 359 | 0AE0595F64DB9494C64E1AA8C7B66D7D04C2199EF4822B51796E14B5CB41FC373FE3308920D575EE00DB305B4BB9C3FC41F60944886526ABB820981FAC737723CF7BA7C479EEDB340AA445427B7A350D71C81A904E39D845D7BDA6B835484574169036E3F0BB5D7D1938DA5D |
| 360 | 9941EA8C45F070E3A65350EB8AC867A06C0F099C80AB914218341194F7AB38C3BCE17FEC3DF3289C054C8A9E8BD53C21ED026FD2850A8A236274D1557C6ED136DE80859D5F24F898CE8FC702E3E6485744BA15BB64F90E4200BC807FE6CF27CC4B7882202861EDACB730659 |
| 361 | 926D1B53968560FB3B57769358A642DEA0D554AC96FF7C113C9934F0934411885A13C4B51A3C216EB2DB771DF520E5AD00654A9CC1E21A8385D173DF0A52CC15ADE9C9C9B0C5DF52DA254D174A34672334D9A331704CBE579CAA9FEF5CAB9349A84360902DBDF546227A30CE |
| 362 | D4C76312DFD04799C738C8AD2DA9131FA1D1CE7690F91C876E958473F07D468851F9630839B826C0DC1052A6A12249441AD8F68C5DD5546C13E44E85E629E93A98220D14BAEE17EDEC86515A06EA1B233BB9DFA0D7A4A8516A960E10FA3AAEADFB36C7B7953C4D0F2285655C |
| 363 | 28EAEDCCA5DC80C1E54B80F432B7B2428689A96314873118301EAA0F56CF80F15CC04B71E7124B14FB0D2D2A53B70F4FBAF8DA9075C63B69E2ABDB3D1A43431089ED9D72C82A365343EB358F4E16DFBA016111A4C16D4169E2EE0265F19534FC6F1AE8F863A4E31BA29337E0 |
| 364 | 65295B56A77B9701954BF1F2C0A7D395FC10CA511196D02060A8C3B05BF86885F6074B618690C58A9EBEB3243AF15B79D5CB5D78A004E30FFCF03350056D13B95235C76DC80712DB128E4EDE38B57043CF92E704918C1575EFE9558C833EB94388A86ABF4C817D5A07924DA1 |
| 365 | 21C1D638D2CBB5117BECA4751B4D3169EDEAD2209A4E1B45820F8EBA8B8341A1A201F8E24E4247C14A1DF99C792C84456E88AB5442E718BF7DA08846DACC1E8CE76476E94578147DA98E09BF9F7612DBE4B815B4AF13C30CD6630E61BCB4A3642ABAB350F7AA3D23E4AEC688 |

TABLE 5-continued $N_{FFT} = 2048/, N_{Tx} = 2$, Length = 864

| Index | Midamble Sequence |
|---|---|
| 366 | 0D1605B06B69C7198624CAE79762C30706A40274DD2E7131E62D0B22BF0A9EC0ACBC7 1A59A44411DF6CAD103955D8990E86956C2DB3B864C00AD9325CCBF5FD081E20EEA56 6BC423D7A2E629ECCC63A3F0F5123BBB8008829FA8AA6874D40AA7B3582F5EEFBB58 6B90B2E62E |
| 367 | 66E3FBD7B6C39C3F03A2744C90E4636D2025410044581C0ADEC0846422A161C5D4A79A ED94605A58057E483D6C604DFC8F19B56F2C784D47969D2DCBA3681BCFAA140EA9548 13B97B9A9FE5EF31C46A859C523975C24765951918DF24109FD8C1DB6F9C6162D9FCEA 323AC6D |
| 368 | FB00BB835046D4819F9EE7B5083AFFA73096E40021509B4EF6ECD1221705764E8DC2C80 2AC779890846E93B9FDD0D03401B58DFA402E8D669FD97D48E5F14CA0254651875BB3 D0976039B20A8F8AD5B707B652F49AB238783B4C46B3486FB6DA85974E3CE22053F20E 8A9911 |
| 369 | CF22D4ED2D4A3074490E21A7A9842D7B4286309AD9DDCC49B20DFEA83C720B93A6C0 BAC0ACB430C4603B2CA82E68BF89E9B1A841C5226B7EE40D9DA51ECC78EB3465B48 BA9142E9C5E75E93378570A6DF92E23028A4B77C10C4A3DAC17504C24F6DC7A74F577 58841F517BC2 |
| 370 | B220802A3321D7EF21464F86F75934CAF13A4C091F4D293EDC06AE026BAEC1D62BE14 D61B55831624640E5B9DA5970C93CCA0A1CEBC2831D6FA9AA2E10BC3677C558EB5ED 11CFF262FE55E85C17A5064AD1D812E7F44458C6BEF77D715B022AC104960ABBE1AF7 862219135B |
| 371 | D6BDC3B8232E908FC48511508D44E8549E08CFA1FA3494A6D5F85B52097D28C8473CE6 2D7D27742C79426250C11A896F5CAB64D84860ADCBA31A5F072C3ABEBD314FF128D8 E10B456CEBA896DBFAEF0151DE3EA96B9451A8A9CDFC5ADD1A37283EBBE26445F25 C206A311A00 |
| 372 | 4462C00019136A9E21C43EC4FF46355A203D03158A2218600A3168FBD89CE432257359D1 B277ED3658A83A5D2EE05646CEB29C8FCD5931FCC514A6117B5BB4CB0A5FEED9024E 82D8E8E1D6C793D5AA12368EB096865EC032BB4D895BDA1FE99A06E0F16D7818528E0 9D5CBDB |
| 373 | C7E8C07FADD275D38B651447B79E4027AC1A2D2BB45C10A56B26CE9C116E86F33289F 880A465834102B42CBA76612550C4A984C2FCE42F8456B290F935E5D97D93BBD72DA28 E822FF027758B84860C9BA8A4C721D6EDF4BD0349267C48F11727FBD8535A3158017FE0 331473 |
| 374 | 9EA00EBE3F093365724AEC44141C6CA3207AB6527EABB924674D84B2C2469B1B903A1 D33468B469398D89FA1483673634E81AB04E858ED597A6E5D7C1ECF377F60F28F600330 860511706B0711984F8F8EBA6CE9C890D16BEA69EFD2DB591E24792ACF63DC552BFE8 74E996B |
| 375 | 787FAE2BB4446CAADF24963EB3829E42C2B13CAB1178DD428912B44E86C7271B2B8A0 2467D7132DB7934745CA7324828DE702F5401C6FCA624CA71E12EAA3C9CE83E45CA71 85E4F7089EE7BE5AF3E7430B8BDD2913A7A4EB0056CB18BF411EA5F8C55C189751C4C 0E8192E66 |
| 376 | 5DEAD82D0403C1FDE96216F933A98ADD2C99168F974DA31AA81101349ED10FBDE35C 916026CAF8AC196B48E03370E50030505FE088ACA3F608D7EB9A392B9E2418B6F9888C 058BDD44FBCB9583EF0222597B2C5BD2A406B501C1D91F450850A2C22B3B26BBAEB5 6C34EEB9BF |
| 377 | C4CD8E175C67CDDCA41FC0AD064D84AE7405911CCC21250E79BFC0442D5F2651012F4 7A7AC15DEA662A9E1C48C0F1671355B927215B8BB53F2DA1B21DF5E45AF8148395989F AEC2C6FA5E78C790756132BD411A30DE38B18F193DD884C6734F81B36369B480F4A0EB 4568A68 |
| 378 | 096490666476D1675524836575580D2A693BB056FE5643E480AC6340E9C58D19AE7C3A3 F6C79D2CA0B964D0BEA410D7061486775A2A75A96AEE1E37DE48EFC10E076720BBB8 BE012CCD0502816834D4433BDC6D88F44BE279F022575AB116B2E5AC67BC9639384726 02F50AF |
| 379 | 40AB8162EA9ACF52716D056FB3D9FEFC80F7D06E812A9F8C33BCF48A902C565858302 A50130172E2F75894961D90F14F17E928C95B624914B55BDDDD980BD5C12A147B30B5D 0CDAE83E841F382BBA4A2BAA61F9D751D71B21EA39643A1C50BC3BA8DD164FE1281 AAE6052F87 |
| 380 | 11939EA555EA4F601B1FFABE7BF0CA9CD152250589EF8501709AF7B880429B9E4580C8 E308828BDA386DA1D249CD0B941974111D855A9035D8FD008F416F9779B764F6818AC92 364C76F438E20E2AD870F10F94DA94FA9F73E57B2E25F042A84F9878BA0060A6C49CBB 1BDCEC |
| 381 | 7495E71C49CFCAAD62D125AEAB14AA3122E162D74BAD5E9CF9E674711F97A79878959 4297A5804663111E380D0A876082BC48018B339A23311AE26290B69FC1306741B0AFF776 A2D5150328D1B8CA87BBE3E5A355854CE3ADEBA87FA206D29D04CFF651274B2FA8CD 38E9EA0 |
| 382 | E93501AB714AB649493ED29C2C6050E51B7D370E73C976197870EF47C0A09A5FB082455 15630BA93F5124489C99F63991315BA2811FA7DC6CAF4490DD2DB12F936D4CE4BE44B9 A408F515A510085D07018B9E99D8CFDF98567479450BE7E585A6E482242DFD774C429D3 D24F |
| 383 | 6478A685810BF792A407BA103E7F21A998CAB76A1C84E21F6B61FE289430CCBB28A4C 0B56528050B5E4F7BE1E0A0FA3160D3FA9826A8F342E29E1E3AE295D56C621B13E9D83 9E2AA50DF822D76E30ECF527FB4B3B8E3C134D76F4471A7FBC036C209E6464F0B8C641 7BF2AE3 |
| 384 | 322C1EC699A4A1CF16C03CEF1C45BCF0B64529BE361D2B7E6D599410B1BF6750F865C 6B2037552B37447A68FA0180C6C040C810DCBB4F3016D1464027E10F43F125969F4A8C8 3DD8936C46111EA7491E5668CD981A5EBED8C0372ED573D5FBE08A0FBE0F23F022EA0 6A1B475 |

TABLE 5-continued $N_{FFT} = 2048, N_{Tx} = 2$, Length = 864

| Index | Midamble Sequence |
|---|---|
| 385 | 16010C03B8039153CBF25627CC94F0F8D4D6403E9CC44C2B96EC69AF7944159FC64CBD D797157BEAD009E7056AD86BA1218A98268B4CA296D8107D60DA46380A9F39F1C720 5612FC57516E364EECE59E2DEF3C1B555E1C7FD1C34D706FE3F5B854C68CB34E7C1932 00F763B |
| 386 | 8BD133DBE0CE5E163FD7A00838C9E6E81A42B0CDF97BE154420E90D7CCCC5D31C4C8 0026C1362E5CB3B96B2B038F31CE12921F7A050DEFBFBBD3AB3C92E8C7C13589A8C1 BE0917A2D4EB2E179C0DE86431DD852260E0ABDA795DD9FB8FF4348A80A1CE834231 D8B1E0017079 |
| 387 | A22D0CF1B703545AFBC1F8C1B2767AA130E01EA91B42C139E4E27646401354673D155D A98F9478AF2BA4977C398D9F847B210086939584D5C208A421C9FCB64F331A320D4E47F A45EC6749A2A7962C5DF05E507CF1AAF5E2470E94C6D0B41734A7583FFDDC3BDE51A D2B5E6B |
| 388 | 3CDDA32D083B9AB0E0797C0B704B1CCEA5232C24B662378F7A64F942D96CD70DAB39 D66CC59BB19408169E2E276DCEFF18400E0272AA6CD165CB83512CE7ECA2C4C72D302 548C99617B9830D1BEC7B5E023F63D2C0A32117FB3C91DC9FCA5F3FA6135342EAF668 C53ED2C167 |
| 389 | 155E0661DA8DBA9FFC578C4231044435963DD4ABF90E836958B38621BC604CE861B387 AD838DED71B426B079922130DAE9151C976C76B2C160C3C5AEEBCC00B18E79A81E56 F7A0089A8C2967A7C83F3ED52B3236D5B7A1AEDA3221E98EE3489C59B4A9166A4B839 9BDB4DF0F |
| 390 | 79E64A3550F6B0831E98A4534BAE05EF30945BED192EDBD5B3383C03302D423452EDF0 E31843E27BBE42110D3F107F687D0A867881773E22C9745C64EBB48CE0EC8F8F9274F63 49B7E0D534126AC0D7ABE31B1756BD12D0C1E1BFFB2518C6A86FE8EAFC71D445E410 890D4E9 |
| 391 | EC3713953AF1C4A1224E2316867748924BC4B6450BE6309E4D7ED35FCE8B121C2548440 825495D16820A4CF6C2E2D56EE99E01BB4306403E9BA789A3F160E58C3F82FEA289B87 D4E7A9ABAD685E8249429E0C63A7690608E1B5EE5635FDC5D98FE99092F0995BD2C7F D1333F |
| 392 | 4B7051325B10601E465FF5B9E5BE79103152163BD8021AC7B316DF6DC18E100A43CF6D 6E404C8C8BB2D80CAB70D1362EC79A182435E2140EFA1E89B6EAB501B3CA1BE9DA76 217D2D9523CDC97208D56254AF72A95070187F28C918653730A79E09F7BDEFE7EEAE76 6177E071 |
| 393 | ABD1AD8CE31F030100834AC788CE4D988ADA283AC7D669EE506190A7C63A1FD30C8 A9003C110C4A8DED537A2FEB2FC59FCEB64AEC390B84E9DE8093C7D5B8005AD8365E 160ECB2CF320CD4B13F0F0DE0E2871BC653AEC3A7BCFACECC07192EAEB64AE42CC7 F42BDE4772C1DB |
| 394 | 86D700DAA30FD1F0BB9D4059512CB522C6EAAAC0A52C214C82D4B564B00D6EF1BEA 437333349F31CA945AC0BA13533D08F8726F5C27161B025FE89838054669C1D0BC2B908 6B68D5B596C72CCD9424BFD2B7ABADBF38101DDD4325C860F7A242DF1FF0FADF740 4F598C64C91 |
| 395 | E26E9FB5954D32C7E5B7EDC804ED1D4405304B889C3F8AF41433AF8D3C81D3CB6CBB 874506744F6797E204544423CD95E0DC7D8A44761EFBDA79D7A3F46B9911EC561372 FCBFE1E96FDC591AB8508B3850558A0D4421544E42619F4F04C0AE9483CFE9C5C722184 CB43B16 |
| 396 | AB46B06E226D90582DC6F4252C2EFE25F136A3450C050F843949C42FF0B399919D7D3FF 611159E85104E4E045902B57972D08033D8C7354A28A9CE7C454D3E6DA5A3B10A103FC BA7B9F824A3D0461ED32EF3DE4EDFD993DB270DB2A1AC5D4928D9DF76EC319222B1 8494200C |
| 397 | 995C2CF4BC8D655F65864AA5986A0AB90A7FD87CDC51B0ED553B08560B2C2941EA71 3005FB449B30D79EA6C91B75EBF967AD6F1400090522F1C9268C89E16B15E3270E780DF DC2999B2B6DDF28C6C6487DEEC5E3FE2979829E74B6010A0CEF627DEE2DF964511387 EB41B58D |
| 398 | 276C1E51C122AC93A1F01EF79B95182ABD799052F49554884199C575997A3007B7E1D8D 1A05F2771151EC20600CBD29557996F4825200305FCD9389C42276DCA5D21CE363B3853B 3C0010A4F65866B306F1A5CAFE48A03C0F7EA272979A1EE496B5C0C7492EF97116FAA1 59DB |
| 399 | 0E2E28573A009079D047C66ED6D97150425120E4C585366EBFDB4F90B794F5F116646BF4 D05486B017046E27D21C0E2A0AE530C3C2C849A55C8FBDD8A4B312201DEE9F14025EB 07FA440A3C768F0D1A41A32B3BC8768CAEFC8406A6BD9575B1AEDED23FADAD48DE1 9F11C3DD |
| 400 | 42793DBCFA4B0B8CC129CA214BE30E6C2458537023087CCB4955570ED420606BBE7089 349E6624519037F7B8F1B845965F6B9E0A9F800E67C6CE0FDDD2D48CAFF1524A3C48B5 D9DC752BDF6CE164C3B4CC754183F61366C9B47CA8B323628811FCCFD30E3E92B2421 10D374C |
| 401 | E189A4B5A3215B23CCFAAF0D1864EB25288CA52308BAFFCAD29CB81B0A1016435DC C693E03A8C9F066EA6B7E011C327429C8552194DDA4669133FD00594A448A048AAAD7 AE59ED38E6B5A3BF68B1E3CA5D4046BA19D095DF5BEB725556C192F3E9E12D014FAA 608278ED7DD0 |
| 402 | 4C608B15BE23B8C245381A942FC21FFE24457E228C3A4FF61E19922465F83B03A4877A8 AD4E3E1FB120223963FAC87488F4887D295DB8E2627D3B9480B7B7B0B6C418661360923 D4531E0CCEB91A9AADA5FC9FD51799D55455B62CDE6CB01A0F38E36D4683C78B5285 C4BE3E |
| 403 | A104114F83F3D4172563AC852EC601A8848FE7F27689AB9FC07422209677C19B5C7607A 5D7641769F92150C4BA011419D72C6535A325BC13894B5B1CB890F7EB19E8F26FA19E92 F1C63730BAB01448CB23B40F3CFF729AEBF626A066087AA47B3A24D27B8C602F0697C FC8A5 |

TABLE 5-continued $N_{FFT} = 2048, N_{Tx} = 2$, Length = 864

| Index | Midamble Sequence |
|---|---|
| 404 | A6109967F19D185844BCAFB8DF8AB97ACC672C4704E5BAC1C8609284387520139CB2D79B689CE828237FC175B86E42A2B09A92910E94040A545C40CBD657E675CA2B7815B22C7092EC452E87F3BC3D1B614A4CDE32064D2465D25C598B3CB5ECFDB048A161FCCC5FDF81BEF1 |
| 405 | 285A6B015DD54DC114644B8576365B4933D3A0038773B18FA4F12F0EA4AA076294D73D4D1870F9C5B1598ED08867069C296E8F0D05DC1F250E95B5E025A3FF4EB238E3D7E95212458420B050DCEBF7C8AB552C1A62BBC7EB7CD032BFCFBEFF734A090C6CC13B111E27616FD |
| 406 | 256484735FF5418B14F08E1B32E91E4ACD8C1222B219EB3ACD6F331EAF81AE584ED6702915670310520E7F84156A6246D2ACF59DE7465560BA86EEE328949FB7D3706DDF856E662CC9AA0F1F5897972C2B79FD18B26C59457585EF3A052B5CAB81CC284EAEA0975470342689 |
| 407 | D1B652C1161A2EDC7D250625D44891C356D07191BBD60E97C5F78DA216DF08B5B4CE7DEFBF601B3B3A40605066808CB60110C648E869736A880B786A8FC26DF1CF087A92C9546986B2883ADF81B58C6B0E1F0620556FFD62561AE207C708EEE96B2A13345E10527CDE55AEEE |
| 408 | 77F257A3F6B92B04EB806400551859318F07D0D2CA60F46B858A31702862C259CD87B62FBE21760B2271268ECE99668DA52201F9C7044DC33C236BAE1DDF22F1D6AA0E51E036F6CDD0829763059F3D770F1DAC112D6C86A190F7583EEEF1491C4AF82873369BA5B965937BC1 |
| 409 | 9072046124ADF55133680752666BADD3EEA61D2D2EA80D2723810057B8D079F362069A22C63ADAEBDDD437041D54DAF87001145692D437347E1B1DB14617AA109F6A7822EC99BAE95697458B0A78941702F77C6455F2DE5B9D321077123D2F9AC1BBBCDDF41C0F6E50861B0 |
| 410 | 81D1DDB6559A542995D1F6049913F0A0029536598EA15605AD3C6372B2578821F79CA46C744531DA2AE84D8F98238FB78305229C261AC2757EB034FFFA9FBC88E8A3BE19732EEDE1B53505E1B9C50AC75242BE44B0CE0844599AF23C07BF6D8DF0AA06E72196CD2080BB3969 |
| 411 | AC2FCD99EE02DD37DCD8385E4E417F1689D541E86386BB3E8962C0A49916401F0CAAE839B50222CBF86A05B32C2BA39FA8837F42F06A3A3647642369FD6012F2B15DB44FF5972D1C40A5772A199D7A16286489ABBDEB9A9BA193FA5AD106D2085A41451D58FE7D97A56CD96E |
| 412 | 1DE540595B410A8A3503811C5E8A42EE89CD2EE19E9CA10DBEA394CFDA2CD296C310005AC06F086EA4569F3F06B36239BE50CDCCFB731D38DDD5143FF9385451ABE2505CE8FBB7B0EBD53F486E8A58A022CF8FA9C598604E3226C6035633DA223EA178D82583D60C3FE3D71D |
| 413 | 90A1911C24F4627171080E109523AADB26A33FE7AC534082818C9A70546B282874936D18D97F230B33360EFC63F2AE309A35D42D67EAEBD1F6C04399EC55529920716189853C7A003F78A96CAE04EBCFACBBFD20667C9E044FB07B32F0FF3A00FC1443AD7F7C44EDE3FC77D06 |
| 414 | C0B72CB2B4409CEF293694400715F1AAD3DB22F3562AC9D52016E959535357BB2261927E50CD58F6C3EE2EA0366FA71750DC48884B58BD9BA34A174219C211D3667E3519A7F105D82A500B9F80B8F20FC7FB60D2DF3C801CA1055AF7BCB9D0D44485CF5F85C5F3968675FA33 |
| 415 | 6F2305F04A25B8AE693BF0B3A742423C55D9E38A652620A0470E5C8226F2F273F0F582AD1DB39A29026412BA3F9E01D8FB333B0DD142700A94D06DBA5AA735DBEDA3DB1F832A145EB1E53FF843069DB36E2348212801ECB4677270B43C11344E707C353F5D297B9C28D6E8F2 |
| 416 | C80BA2FEC407BB96774205977DCD4EE8A921A07EA85DDF48C9929B7CCCBC2926C5F67040B520A45689F1B2134AAD43472EF4920501883DEFB570E862E66411CD17D28ABFC7F8EB9641FB5229E4B7C66E902D41D65849BFE561C046B68E84DA99F0C1B835EF31895A0714F358 |
| 417 | 52959B885000517C56F333B53674F7296287D8723D16086D15A851C7518C095B1A4788B7A6E0248E1B4B7A2D0431B1595486EBB072C45302AD456D046714030EACA752F5F3F60CA0BEDC8BB9B807E8E9C9460FEDC86068BD8B421D2E659635425FD7E8F3748CA1F622A37287 |
| 418 | 754F8B9E8D4DE32CB864ACDA6A71B2F591A1D71B8E6BE0B9CB40280E2A5B90496673 2782F6A7172022D032C8E3FC236802E0876259B5F1586A0612792446C01FDFB893239D432BF42007146FE8906FB4C5016A7BB5F14FA36DBD3CB566FDF6548400B9858580848E46D9B18A |
| 419 | BDD6103300F533DB67F63A1A742224B20D69E1CC739CE6590F672EC0997CC6722D225C051225C204EEBE0B0912CA938A0060658A9937900AB9E7AA133C153892ED82CFB0D9F079005CF8C8483F1557839B7702FDA4715DEDB5AC0FB39C17B236DDB04208CE8D0E70DE56E47E |
| 420 | A4788D36C01E14CDB6416EC06444EAAC703DEA0D1DF627B00B4E0DACF44C44B7074561C7B8CE8F1451C792821D90FD51DACE7AC20BA22B4713E27EBEC47809F27B7F46A11DC403CBEB0A908ECED8E37A70F55D7F689D46B574E0D2285E4848AC9F83AA1678200061D01ABB3F |
| 421 | 808403DB4511CE927B110BB29A379D831B8825D352BB89F166C83E13F2590B36D06A43B953CA03BFA4A586CE2A0F370068FCEF68ED11515E9221C28218C639C1523730E24BE2DB1F1425465A11F2E145EF566D1672F57D1BAD7DCB129654D1CBE211D0EFD46CD51FE94F2541 |
| 422 | CBB4F0A6D589248C0056C714F5CA228113910E1851A0D3021149AF1C14C5BCA566D019D0D97CA458E80732B316D4EEFAEF5FA5456D326B1EAC6A44197D1718C39940323D268DCCFEC125BF1001EDE73E0A645FD402FF0D158AE3D3FD401D4E2C7E9F6C4F445F4E5F7C44AC3E |

TABLE 5-continued $N_{FFT} = 2048/, N_{Tx} = 2$, Length = 864

| Index | Midamble Sequence |
|---|---|
| 423 | FCAB27255FBD6774F1287D20502122A826D45FC0923088E1AA78D6CFC026918CC198AB856829000DE3389957C62DBC273646D0518AD20FF8E1C0233E36B3BF27446A24B74B21B2CF795853808B7E1640C0B7D93974A68E3994D04715DF57B8E6C0A4D6DBB5230A7CB61597AA |
| 424 | B306178D3EC621064DAB67EDE5862315B0A965649817F81D2A8D425FC0E726451015100FF06ECEEC06A9133610896C85C6148BBE626615DAB048129B0091343AC16E8F8EBE738D56D6DE1A5D312DCAE58CBD78E21105D161CD636DC3741E878EF15F4AB3A4A6F2D5CE7A4D9C |
| 425 | 09DD0DD6425DB2118913BA30317B5DA0EBC3C26A085FA4838EB5D9670C06905D0DB71E42800600F532A233190EEDDC3460F3877330EF51586173FD5FAAE03D39CA613C48B067F6B4D772F8DDF90616E8EA3CF822302322048FE151974D529C3CD1A2EE8F0E5FCC579955CABA |
| 426 | 0196B39F1D991935A3FE6963EFC8C244403C18A84E5E403EA9950A1AC801295A690BFACF12C4056E28597DB4CEC011C27E49D11E9A1C2673D95BBFCD9D9043C06188E2BB88F82C93BBFF568D686D3B2FA950E2B2757C1FA72AB1F92598B0A58F42CC2580BC498EA615D9B10C |
| 427 | E6CEC445B353352D046374627FA821A8AFBC68A310B89350163A55D1926F5C94C8705DE868B220C6C488512E78D8FA8A76B29A0C7B0F37878F92CAF357D3F7EA8677184BA02E5D08401ED786AB7BA512DCF48CBB0E570535FBF2090F18D9D46639C8924B4E0D1C49F9919C1D |
| 428 | 96921B39B8849BDE6A52E81B7AB3CC6EB240DA0060545BEF5EB728D1B232D2A90A961436A71C85C929024717B0574AA737732E87CB02F86EF8498ECBC8D039E714D609F5A432D3CEF447715893F9F848B2106F43956155A80227C37248A9D43873E75FDE2DDBABB862DB5912 |
| 429 | B5A8918ACCF6BA602AABA953871BE036D18656F043C72DE22B95D939813412548C63854CDBDF4A95A526FC133C4622D5158C2A88003E57E676CE587291723A3DCDEA1E3C9C0C86FDA1F605F4DC53898AC93A7B003159091577802E6188F47EAE77F7A6D83EEEAF7A079C1F6A |
| 430 | FA334B9895D339D12CA0EE7412027D302C4275247E5E6AD092321A80D029B75FB25067C5C1558392EAACDB38A814816C69CE813A6403C79F3686C487F4F8B0C6155B26342D148095989E0A1D67502EFCB68A207CDCCA71818F3728BC4DBEE438BFB158F70B48FA3E388F2BEA |
| 431 | 40D44830EDEB94E444475B2EC21C7DE878A6F81668E4EC8B04E4C48305A593DFC3829154376424EF28FCCAB18F8816AF595326E68A98ED4FE7231C03E4FA751D9D1F96FB1708F4501A161F29B7706F20A62CDF79E606DA430ACE4C3FCA65F5ACEA216E0A59B5D0F522E0E39C |
| 432 | 003EBC670D96098067C8CFFA82EA624461D1A0226CF5FBEE71F94644614A0C140A18B35A82CE61273F7B7484625F12F2F854DD095C9FB0B0D602F843CDED264050CCEF6ADAD3A5168A91596FFE511D7C6C986BB3414504B2E692CB1FC6E3081F4FE42B3379F375990FA156F1 |
| 433 | 91068C31FA291A9C1BFA88D31CFE1194A57E96D4D3082950F40082F7EA31579E3CB4BDBCAC627BBF00BF05323E0406DC61C002460FD57CA63CED380B7A2C24E25C9405426473FEB2B4B07597502B8010E86BE7059DE666F2A1F6579F5D283C59605CD6662BBB3797A8CC5AD9 |
| 434 | 44DA19B5495B239D77653010271E22265B75D079C6C91F92E07462E48DED5C53FEAAD4DE92904726E04A054ABA0B4C2C74D1E0936F9DA0BDF66BB2867D6914AD2DD4D7981BC2EA2E8B97FA1FACCB3EFD0277ECE9E94A021DCB52F8C6051DE85D4E2C2A0AAE09608CB2D93F77 |
| 435 | BA9CA8276E2F048933227C0B3CE4E668AAE60B7630FA0BC446CA921D8760698330872D2E954123BC7B45B5F7F0232F4EA020C3CFBC31E8422B5E5EF7C5970012D10AE4FD7A2885A1C45F463DC02934757C9B091C172F781D9234EDD82C881D14975A41CFAE9EB19D39BCFB38 |
| 436 | 7071D431E60E2B8869FE72429540CBA16CC02AB22F1E1368815DE6A377D425C2225A21E4374742A4B94D16CE6BBAE115164C0A1EA488BE38906E0F1EC56CB7DCFE0153136C684B012928E5FF2CCF01291073B2EA5A7503E8C4DB1D479F963E65B25BCB0364DD1A7234235709 |
| 437 | 8FD9BA95F56D22A96F934161A3A5B6DAB8DE4C3B80D43CCA45973A0B244B407AA61C72ACEA4CA910292D6B7444CC3E72C80AE88101E93AA87061BC9CAF4089E34D3ABEB7688229C31A26281AFC23ACED7D450BBF20F2D0445E80B96A4F1B024ABE6E87EE43E7FCD203E4FE1B |
| 438 | 8F79D248D352FD94C6072144A5A982AC7E28C106F6190B08A89AE4D77591765B3D8E4E1BA0FAC3240375260234267F7DBFB9D044AF4A426CF795AEE64D333EE52E4809DDC208B0A9FAC9BD6D97D0574FFF873C0B970BA1C47D493A39F1CB24ADE011CC293FD4DF1C3093F5BC |
| 439 | F24B284881D2D692442CEFD61A06227F1434461D847FB8F95AC688470F7041F6F4C9883101F89D681F96E3AC0AF8CFD008B85852DF529F2754876201F5D2559EA183E6237B3E0E62947893875DF558EB9CE0AF4FAAC16306CD91B9621C8CA4C9596B1723A27696972A4A1FC6 |
| 440 | A160BCA96E6001F40E6FA9C3A0E84C2A139FACA0BC79BA580085B8C7622543CD2463476003FD2183CD75FEF393143331D36C2CD1D318C34FCBC943F60DC8191CB6C0A38FF497E375555BBF2B3C47E20E3A85559A160CCAB5A7731499AC8484EC4B10422713DB27DFD86AB90F |
| 441 | 3CC19A990CF3083A5E207AD346977777B64B81CF004B3599A610F84B51635D5651306C8342C805B20630632D5598F7A032C4FB1A4E10D323FB18D74284ABCD84ACBF175304036 4BFF155A409EE7F65934E3C940E8D0B3A6F2C656ECB7EB1C00A708AF2329AF32AC9CFDA6769 |

TABLE 5-continued $N_{FFT} = 2048/, N_{Tx} = 2$, Length = 864

| Index | Midamble Sequence |
|---|---|
| 442 | 3E9F529EFD9AE0225A67773E1503ADC55031E1FE7DA3287122EBC434D291AB176E1D2 5F83B08BA95AB8D101C002E8431B5582C3D2DAD013A5804F849F016D443130E18329B4 53FBEFB33AAFA2E9B5994F0EB697B15EAF752BC4CF72C24CBE12543383DC8D2786A00 047CC1BE |
| 443 | 24C134EB11BB5AED862F838080643A474B59CB44A9C3EE754640E30D1E8406AB6AA70 C4DC321F171298A779DA75C1F12A2130C2CBBFEB0B03931A5BA2594DA15DDEAB431 ABFD4657344EF04974AC9F1F025838A82748891AC0FB089A149784591F9A73CA3FD6C1 486AEB84BC |
| 444 | 6551A30277E0E61EC280BA1587B5A3654B558EE303A5EFE75600CE05B1B8A9866C693C D58CC02C33FF0F4C8A470D06F8867E85B4D2F22026D7B1BB42EF1E2C1307D4777B4739 23FBBA99956E5E48E2B6AF3F63DE60646F8AF5926E7BDEA083251EFF860574290B03178 F5E80 |
| 445 | 170C698D88B82C37DFB98917BBEA223748194F80116922D91A5D50E22C2019B5EF35517 C78DC38605FB5DEC35E5209EE3CD80059049AF19E5874BD46BB5B8956F104D36C86F7 DB5C4ECAA5A8DA57940FACD742C82A527BBBCDF00D5D64BF3C9C122C74D72A0310 7021B85DDF |
| 446 | 3DAD88037C61AF61A301E40D02A41801F48A95E876AE9B005EC81EB32F34D5AE20A0B 47B3F55815F1B8BA221DE8336C2317CF9AC458C6CE16CFC6BAB60CEA7296BAD857BE CA77A8B4633295719D9938B0EA383129A8CB764504A1E0A3815B3EA6A284AF49F71E6 D12A165E9E |
| 447 | 3EC3E216648CC48E035FC62CBA09952705282DCCD4B84EDEF7838E075597270BF731BA 76C1A999C82E5CF86223E5671B4EA310750A86835B2BC2591BA956DE51117A3AD8879C D79914BE3CD6D85FDC95A561134291EFEEA6585ED78107BFDB006AB69828D358555E4 9D1C638 |
| 448 | 1EB20899321A72F489178E90F71B77514669082727E10FAA71EEFB110FC58FCC929812F6 A16EE8F87C82061503328550EF0FAA920F7170009E8FB8C098110CD7FFF9968E0E13F0C CAAA2C46AA1E049FEC1AEEED752F73B907907D0ECBB8ED3720B5CB9D253BD4982F D269096 |
| 449 | 40F044C5E961E3AB0A7C090A2E2E23778AA4C6828F17AD435AE3E31E1DBB9E44FAFC 5417B214452660048400BDB4B79ECFA12649C3292CDDE9BDE7F5FA8555B2698A0FE1D4 0EECCB24C4C7E69D613C657D5C0A1284F97D4651B0B46AF9616DAC4C60E6CBE59419 BE0D711942 |
| 450 | E0D56B63F1BC59B577D7A740C4FC2745BD226C1245DB0B1C000B23610962641DEBA68 B27D0E704306BB35D19CD9941C1CD7215C1F0DCCE3F92DCCA923B75644CB2A928729 81F2B5D082F3AC5A92B437616EF351202C560A918B2433F7E45B7A67D9F13FE619099F6 D5F86446 |
| 451 | 0684D4E39B5149094E0D901A61C929B19E08F91CB1B92E49B75657311391C3A3E2EE1C4 3B102BE22BDA9DC4995955B27A8DE9CAC1025415EFD315E082D42F0AF95CD92501A4 A372F4BBE8412AF0E9B94B831AB9D5DA5E48CAA7D9590EC08184D71815D982546FFA 9AE07C690 |
| 452 | 447622968E92CCC7C0D302603AE6E2E3B9C8A580BAD9660495915F22097A935A73A67A 22DB340C2C3DA8F450690ADA45C1F6119FA7CE4132BCCA914CA3792ABAC7A7149841 6CD16B16FD374F600A2EBB9C8F217C41CCF0C86572A23230CDA3351C987BC67D2B812 548B17DEB |
| 453 | 1C63AD310C95301ED1001C5B33E3A33286480F560CEA304812D40B65BC674AE1DCF8E 9CFF843CAC085FC0D9D3616CCABE9156926EFFCEC50F2B4DF55FDB3A3CDFD00E57C A8A77A26B36985607C6445EF4774144D26D1C711FF1AA853228D3CD6B721656E03DB1B E18992F443 |
| 454 | 82219A52D301F7E32CBA0446437509EB5D100D013CAC912D41249E4F48DC2CCBF88D8 B312CD0EDBA0437FC7BEF310C9DDACADD3343D5976F37F82C2905AE7F3921D477DD E04FEF65938F19474719064E0EF5511C704B2636E382E4474125EA0F247367F674727EF39 DB5C68E |
| 455 | 6E9C1A5CE4B75DF94132940D781F10BDCCDA2D768E74414CF4C8892A38F4FFB9E281D 4CA0444C4A60A7082759E4971496A04507B9C8BC6CECF56A1780015D16DE4235740C76 268BBE516FF56BC17B1561450E673FA3EB57681C0CB07C0C43EFE8E5ED463B0169EA8 AECA50F0 |
| 456 | 4478A99C4C41B61041FBCEAD10C3F4928A2650A890132E9E65FDF0289E79B66B15FB27 46619108061B091BE115B10875A3BE0FFD264988EC904FDD85A05B036DCF3FA55207FC D3C281B4AAA4FAD22A2D6CD7126EF0C3FEDDE97C589E2AD144D429DC061EF826208 CEB52383A |
| 457 | 7228D5DE01DF92A3C0C3FA01EDF05EFE92D5328A27141FCD4C5212D9083625455877E B46CDA75509058A440C199AA0644AB9224BCFE16657AEEA01E888618B5E12FC30A274 EA1AAF75295BD7338653CAC7AA6448047AB42BD5010F5F1E7F7531CB00FE5B740B929 AEF77C1B1 |
| 458 | 26B82A6FAAE691996456AF12543F50AD515810841BCA4F77C2482F4CCB7668193960292 62FE4055A701AEDA360640F5413EE0D84E07B7B4401205D313A64262B704E63EAF8D49 319EA8D09BAD2C15B0FFB6D7CBDCC05CB540C72FF15CE40EA5A617772F521D9511C1 E4FA375 |
| 459 | D8AFB5267D4A50402EDAAC17C58AF4C62B41A533E8AA986098F82504D0DC587C0EF2 7546D813B290A4B35B166E7E64F45843CF9A86C7CBE9CB9D2F64EEEE75684D984F6F86 59165C062517321DD06DA4E4BDF8E7154C78A13F8BD8EDD048A9C78D019C6BAECF41 432E168E38 |
| 460 | 8C762884A1FA0FB1BF359BA3AFDFA609292182B9A95D85AF12835B25C0100A4EE715E4 B10B14683FB1D6CE42672E84B1432A302134E136DAC5035CCCBC130C15572AB33C1212 FC806734787CDC43CE8F4F8BAEEB32ED6FFF856232A7C28158529E7435AF1D1FD892D 6FF6684 |

TABLE 5-continued $N_{FFT} = 2048, N_{Tx} = 2$, Length = 864

| Index | Midamble Sequence |
|---|---|
| 461 | D48E039A68520DCB8E48AFC4B647202A5EE9A09778DC88D3F96FBE6235461F770222F8DCE063B039F0B2EA01C737124294DFEF857494998FE43D1697ED6B846991461D56CD520770C1399F0E3FC549AC0F4D57BD29915201D303B3580DE4D181A7A39D7EA5EB92FC655EDFA8 |
| 462 | 12F11EF0C507A1C8E475B31428C65DD9562FF75425C05BA4F468C1382384C2BF19EBD68029499B979102A503559E2B6C51C8E1AD84634D3D96DEF6F591A6D53F62B59F03A1DC669CCEBAC8C608C7AF4C3866554894EDFD22B3F0B657B69C0460EF409CC10A1B6D8D1517864B1 |
| 463 | 4B1CA84BFC9CD581FEB2153CF418C3AB850C701C6395D18E60DAB0BC3068DE687032D5560C811E563FB4B6163652BCE47702804896CC00B30A43560AD186FFDC975F466FFF540CC36909BC1E077736F004FC6894B1F973A8FDE97D0AE8094476BDCDC2CA5CAEF6370968762A |
| 464 | C40D82F5AFAF140E4464662529F5827CE48F65C8F8A2E08ED3800DF762B36D77E2280830E2DE0503AAD15859FBA7F230E3E791C498838364199C2A11E94D2517DB1B27B15A82DDEDF8C35BFFDF25E9168CA968ABF414CD241802EF9E68C571BFDE3C10917874DCF4A8D8972B |
| 465 | D087BDC6A454ABE26C7DD47C6A130A3521E86B82EBC8A65FDEAE4C9AE2AFA3301A0CF96B20229B5A513053C21B504359154F64CE7A92E0C9F33EFEB70C4EA93E3E1CF9FDC5CB0FE180FAFC3A30799202748A5C57C88C2103731F1563A3DD9E0E9D5F205F72EC349D6A1ADE28 |
| 466 | E166FF24A2A8F8086085673206BB378608A894F7436A9DB4F9431024DAB074790C4B471C8F2E557A86D83F7B4B33D79E0402A6541A8D0294F199FE7880238E88FF12A564AB6633FA179483F05FC76D270B7539E7A8D3A5BA13024AB5C3D8323678AFDBB52638AC122DC5893F |
| 467 | 23113882B89C5DCA7D7C1E50F8DB44013B3E3448A398248A5AD72CF3B3A3195EC2D7B386A91EA1FF2022389029778A994939B06AB13B8397B56B58BE0AA0F762FFDEEC00D4E6A9F2FB36C74166C9252D30A2B4834B7544C03125C721DDA63D54FB008652517579EFDC7013EC |
| 468 | 72F5C860A40E9C71727551DE5F677F4FB4C4989C9236A422FD0462A04A3B57BF181A26932029BE135BF8174840A009C2DE30DE28AC89E51E0C8DAC0D8216615C6119750B4BCCAD6FF2EC47BA7E517A3F0F16A24E3CDEC34664E6555BCF49B2835B04C00896D09B19B62F4E07 |
| 469 | 8051748B0D330C27B4F331217815E9AE8D8DEEBD70C79429DA73545A44922748075C04CE97EBB29E0F7820CF1B61B8B6D15771A0AA14E039494C3213C65CC061D5AEBEDDB78E2B1F979164CC4B62CBA04A8AD3335DD686C2BE314A5A3FD902D18AAF7F7C8867905AACD569FA |
| 470 | 83610F95B2795C40DDB5F17D7865D021BCC6162FB29EFA6B5471034382AE1BC25DFB21748650291BBAD60F3496848DEB9CE4121C4AC3A814CB4D5FB2448EB84EE775BCFE5C0644D83C611C26B6ADEC94A13BE2D8FB2732C1199B1E52FCB7A5C04051169D3234261D9794CEC2 |
| 471 | 34C27AE11A02ACFAAF2233803923DD03FEC09892E3022A5CEFD5DC0D02D4C26F071873EC2A100089296803A2F47F7DAE76B5A422BFFB622D8E23BBC030CFCB5676C18584144EB31504F8A36B132EC92E40761BD7A92D1E85FF4FB26D53FE98EF89DD8D80B112A7747234F6BE |
| 472 | 32F37C942089F11C1691BAD45FEB8D9AAAD531B7023553FD0AC1EC441EAE13490A91487462A98F309158DF01A93AE289372C6ECB9C8418198B8C754FA6399724E72E6BBCA1226EFFEEEF47D89EA0D237468A6652E955000F0FE7CB79371C3D34B3B09C427221B9AB6FF24F87 |
| 473 | 554DB029EA2A24DC771F8C30213BFFAFC6EEE15120DD60129D102D30A96618D039E025140299879C357B3A13D75A8A777C7523218238278837BDD51C001D9D9AD90166B1371C8643C161BD8C3D4AC554B5E9C9F4DC6418059D031489F9F63718FED6D8EF648F6DE95B638C252 |
| 474 | BB3633CA51895A10475555FA0A2D3B9EFC0A9DDAA832D9FCC489D6DA88407984B60DBBD453C11D1A6EC7160F1B5689C16309E8C87E165AFD1F3DFC6D6042D7F88BAFDC5E9086B50879772C2FC8EA389850007742C1A17C913B738BBEDCD160035AC1C17497DE69F4039530FB |
| 475 | 411C0C19D44A02EC808CEDB39951EEFEA0B4F14CBD458346F879C62E240EB1ACEC1E8882A0E4A12480F023385CFE212AD35F56439D36CC19E87A1A51FC675EE3C3AFE91F6F4996407C061DCF3B8E89FC9E6A0E544EAF5430EF5053030909BD2D086E98AA1BF596CF927A54C9 |
| 476 | 117921400BFC8B24022D4F3674637471A07F5C6145E1082150B86CD4C1E7D4FAA4045779943E30A44656E8FA6D06532A1EB7D4E0D1FDB2D335ED10091B8882CB2D8D811B32354793C8B147C0F4C0D34372C59F248FCDC036D6A2EEACBD0E65920DA7AA5944FBD21498BABD49 |
| 477 | 56525F2B28F61A864D431B1D23554895460D60C2893FC09CD9798D496CDB12287799928E3080BF8B71D23EEAA65D87137107D31A0858928C2018299AD395A1D019C0F2E3F2F0E89D73BD3BF59499AE74C40F09BAE835DEB6CF7169F259F72167AB2CB570A63E211A131986E6 |
| 478 | ED181B175849E6D92F7FA137228EA7460D765ECEC5333C69A09130FB060D945C7BC7BE41F1A1155D9BA0BF12EB3A510E01568516F8027A006E9A2E4A2A54B0A3E9E116A321ECF08203C05AB5EC1BD2F5A7A9887753156A8F53426E75D28BF4362E911FB9DDE683266B6693E8 |
| 479 | 5EE61632DCC5A773F0F01FB2398B67A32038404948AD614D345EB0FE88921ECE377917A2A2304D0BE747265E88A1D15EC7D8448136951AE3C62A27ACEC0A2B850CB44CC95B70D7EF61EDB53BBE0C6FD5544AF53BEBA6914317369D8955D6E408FDED0F447D55203600DB3C03 |

TABLE 5-continued $N_{FFT} = 2048, N_{Tx} = 2$, Length = 864

| Index | Midamble Sequence |
|---|---|
| 480 | B65B6D6014F96E0562842AA81AC6D7793A5EAD00B22391AD9380D9122480AE0B3247F 64960FB0913C219610D3FCF95C40A41F56C5603D16EC31F37A84E2EF10725D845CF9416 7AE520B322EED8D6AC4F7A2F6402095EABB075558CA7D69CA163F0077420E3162A30F 77D7E16 |
| 481 | 366507E2CF53F84A0931B8509035C71024A772C544FD89462BA00054EE8EE1972F3EFEF AA38ECC451F057271388E096BBF6326ACB8725E0138B0E378B3FC0D65F3C098427BFA3 C57BF078A6237EC648733D897CD1DF1BC180D355AA56ECC16CF5EA5C31C1CFED942D 42844FF |
| 482 | A4313464A54017B834B3E5BC40234B240FC559B182DC3E42D06BC22199D374133B1138D BEBF9270D4B22CE6C175861D246CE49C55BD7E1D5F14B93992CA456DA37DCCC5B300 9FDC5BB555A6EEDA47CCF1E2E54BEA0A33371A38454103342BF8A2B8A05AE535DE02 ACFEA724F |
| 483 | 44A1119AEA80BE0926C7B3D38AF50B86D10CD9B8E021268B1343771CB0BFEE269727C C0DFB483B4D2125E5CE94098CC3B437753D014E4A71B19009DA5B7347AE9AD907D653 9AE1DC342403E8A815898BB5B2A217F6567A23706B5ABB81789E2B5B743A9F2B66BF40 1F42A84C |
| 484 | 5331BFF720FD332E2118EA6BF48503AA211EC16C081F4D831A6086137960AFC48DF9E02 FFB9E854173DEB09070E91234889D55E727945BFAC48E1A9651A9966A9E860AE5E992C4 4F89DA35A969E1159818DEB47AAEA278FECACAACCF0178F61D6B52A10C7EBD814D9 B146967 |
| 485 | 4E7D284C1F415B82D7883341F44C492A4D2EB831CB30044DE7F223D2D3CA44D3B67D9 2F1E8E65BA51EDC81FE84595E8806F3913E00B7BE69DA61944F9EC657655EBCF03C475 7EBB4375423093A957331F16C4DC4DC5F0446B2A77362E4AC7D64EFCB5406A3B4F0027 98C7263 |
| 486 | F9F006801E13A62A33386EDD842FD0B60C13513460A6BF7548ACCE9E86D85273BA70C B062536A0D6C3F5488EC372B33FBA795DEA37088785FE69EF4932B290656B059002A2A3 7119FF18185DE450FCFA8C239D54AF43965FAB35AB1D6A5B370C1BD7EC768274FAB99 A073C7B |
| 487 | 3803E2F2DA609B248DAF3D0321B245522CCF95D43A4B6F99B8D33A78045239C1C1E2A 6C865D83E5228541AC74E78DCD729407AE0080724FE06ADB4A657B13FBDA75243786B 14D0978044F07006131F985C7B04D627B77D02DA31DAFDC16FB59454CB795DFA99BAB F7CEB4018 |
| 488 | F42BB3BE4D657021C821C35CE168DD0F8339BA117CA904C9CB70A61D816A6CD18D85 5002FA7161947DDFAC77F19044F0E171B4CEC59385E224ACF7E4544EDBCCD4442E7551 2C9703C44E39B97377778649B702A0D196349D48359E390E62694F525A7BA696D223937D 4E47F9 |
| 489 | 15050E1C786ED88ACB13448B6BB26EF69AB447DE25585DE15D4B4C53BE028B453FC22 61A1B38C8A2C094814ABAB31184EF39322E28177964B00B5839D510F2BCB6485076FFB5 885FC1C8FAF86393E2A4CC6DD0939EE55FAD5635582EAD454AF5B82CE99B9E30C6C28 2ADF96F |
| 490 | 3050F3997B01D362B51967A56450155D20E81C53278BEFDF1D252F05CACC0BB2EC8460 0EE2A65BC9595CD524C205CFD85EC6A5D2035A988F59DE1A7A443E5851DEA96577E69 B8C4F6EF3F85B40D613D8000D614C1D6FBCEB1C2F4F1D42E9C4916F836538D428D823 C6824B66 |
| 491 | CC6D40F06D290AE446AF4B4D3FD913F7E59611B8DA642D6FC9E1A6A65C3682EA07FE 82E2C30ACD03C46E0A2AA495070D0F37D9000C5446D43D9D19E579C7360EF71BF913B 584571972C00246D55756C689E335B64E8A51BB1CEA0B74689D73AF7F0CB049D6D0AF7 B2BEFE089 |
| 492 | 57D2526410D0634127CF529FFC6408EB65BB2BB73A8640476B6219580E552674C49F73B8 CBB22EE3855804ABEEF0481989340C4E5C8FD71725D9E3637E9A2A9A3E29ECAF447A2 3AD4D32AD33D229B38A6B85829C56665121DE12FFA19617C9705FC13218BBE04555363 D44E4 |
| 493 | 8C6E3A63748451B011E03080E6E68E161EFD8163CE215EB75480F8843C1C3CAF433FFA6 A0C811E010F190FC7CE1CF2D9A9C938B0CF6D311664BA1FEAD401554AF9FC8826AB59 BC811E562A3B495959E8F4945618AE6B9FF24B563BEE86A3B1416F6B80B1CE55FF81B3 1A9980 |
| 494 | 69904F80CB054690A13616ABBC618B4B1BA86B8E836FAC1490EBBBED31696FC6F2F4C A8522434982D09619E4D5117EB2277989723BD98919D915B386C64D1E6BA784780417777 F8D820198825A59CE70B9115366977AB752ED45EBA83AB48B8BF520B79DF520A47DB9 06FC57 |
| 495 | 2B0C14367F0430364656D7A42716F9C8D6FC1C49CB445ECB6B82B2204C8AA6F3A3B706 576E68B7FA7DF542D7504009A31C200EE5C5377398343DAB5C6A694EE08E8CFA45C174 840EBEFA31EA3CB667B0B9B691FD49D97960840D3FBDFA8FAA158D09F82CCC7D0483 D7EC050D |
| 496 | 2A9D24EAD6860DF6837813FBF2833D278462284A8116CB894C0F6FD18F374F0A252D44 B0CC30F3CE6F484AE1204E0A3BFD0C8564F43D3EEE75393AEEFD1A09054DAEF22CC7 46C9B4F67548070129930DE7B1C348354538683893FECAD7DFB04E2FA136064974A2E7A8 20C3283 |
| 497 | C22F977ECF66AD531122E6049B8B86261E91C24F5020D01DBBF8808D322CDC5B8B4A82 CF0CB2F83612CA74EE891EE9933C918C7684673C9BE87AA4C5C74BEBB81AD481E80C9 DE44D517378B15885BCD4252F6D5871A0A25C781D5B68FE14BB29F39C38FF4E5119E01 9958293 |
| 498 | C7746C2DA0E70F383B6F6DE8BE47F6459A57C5C15875071E580A1E064E2017E422E054C 5ABE98C00EA06F0AB4648D7464F2ADCC210EDB5A1995AE2A467CE5F4639AA2A39590 74B6B9B38AE411C4757A71F55027DA09BE5C66D0A353B53C8A74650BAE0E7BE683A30 8ACDE4B8 |

TABLE 5-continued $N_{FFT} = 2048/, N_{Tx} = 2$, Length = 864

| Index | Midamble Sequence |
|---|---|
| 499 | DE1EE52E33C97208FDC6FA01FD53F838AE1CCBACF7A68AC7CC2360F12C07240E68FA158CA0F023942F37D10F218C61220ECAD5B60DDC269551958B95853503AE9E001DCB64FC6EAEE9353D9267BE7A47533DA018D4084D653E742A4E4193BA5B56A553CB952C272DCC17CB9D |
| 500 | CC102131636B5E5DC4C655E07D865160CB971B2C9C0397F5C10448B825CC8D33E0463C050023A3AAC51B869F045BE67387AB005DBAA85E5987884755A53FBB17E09B95EA86635D1A549FCE31400297846030919C9F952AFFDF6551AC73035415253636942CEF426D2397FB05 |
| 501 | 5A7EF290406AB1E5327D05F9E62EDF08E8EE22B0D857B7D61702B812A807A0C42211069AC0F7A62E922D4B4308C6C561079B60D1CEDBC4EEEE6E9A021DE9747351E214D7573343691709324665B6CAF235A7709D5C135AD27116BF3F49B4E160C44911E109E8B73CC48BE07F |
| 502 | 003DAABC68FCC6CDBC0804FFCDD2B24EC16217641026281621194DFE311F5E676F1741EEE4586EA2A2B306A5A2AD67C48A780A600B9619F33887C1C5AFAC6227505E0DCA7EC335F572D655A78F14BB05549DA69263BA809A4BC1222D3EE9014A4DB45DAE391C4330D9E274AA |
| 503 | 526C8B6267F6C3460CC137757B42A22BE105A07C72AD0365F778C24D0412350416961CE70EDF9B71B3C2C5AB37385839D785052ED68D71C1E627B1337284EF788F4F527513DFA27094D227F1E92BC5CDEC9D82C8A044DCF10493771ED04017E17486AF08AB442FE259141995 |
| 504 | F32AF8F8E3B3B012F340E5D6A6525F1C60A62A27E422094E0060CA42B0DC2D1B823FF5477066E210455D26885C87DA0CE71EFD9C42225FF8ED79ED4F74F641BFD114A8FBA40D38B081CA14DE924E5585BFCDCC70FE00A344FBE42D60C854A3BD3705825A7E62AFAD73687291 |
| 505 | 3FBE3804D170DCC397D44C51D3D865B0CED03639AE993648D605EC6D29A9D79140D5E84C0B8963C12890EC4B3A550B048A811F385588E4368D5AB1FB910305DF3B4650454FA7AD0082E9B7D4F6CE1C8085C65C64A9ABA69B0A6645563C17FA82762EEB0B41CCD61D6B59D8FD |
| 506 | 80B25F0570E1FBA4CD156A133289180BCD145A84B6E095815B71358227D70E0647711526BC9D59819D95AD484F3268537D2D7CD781CD5C75385382AA98679A9F7B01E24A5BEC5FD7A9C53B52ED1DD07AB9179D3793F75369715369B2247380A8786121756CF45C71E5C9E618 |
| 507 | 010D0AF3370B0C27E3A2ED30C76536C731AC7EBECF600B02A4886DDAB4ABC84524D76E1342E84089B849BB59E688E3D5A2129110A7CE2095AA2DF38190B7323791F0C3803D94A7702EEB5E4D8593E9175715B30801BEB660CCEFA115DE4786131A012E25F14BC3FFC8CD36EF |
| 508 | 42A0A42C03832D67D03D4D280B7923038ACE51FCB69A6F01E56913D5F6AD4710014A25A9F1468861A199F17BC362B388D3507518CEBD7CD141F527A8DCC02FE757350488D853B56F9F72932BFF03B655D0B41B672E6A6FA647C294423F24B752DA24D443EFCA503ECED5A205 |
| 509 | 72D2502AD7C9003A95528A9AABE54481E922CAA6C0E0AA74CF7D4BB25EE2334DFFB481601D3091FC0411051458B8C551FB6F6FAC3F1B84A061C1DBE9CD2D66282D7923BF0B5CD995C061A5F2F2B434C5BF52BB689DC5FDD8D849825944AFA0C3BBD6DB7515609008473031CF |
| 510 | 1B5467B8C46E38924F9202ED8F343241047A8A71A148FA203715B0CFE3E610DE34303B65DE9CF4132AD219937433CD74452449325B54742981F04F4DF2E1D26B9310D94BA9557F35D2317D631DA179A2FB38F3AD7CC312655440F0E7CCC8B44BCB544EEFA1EA0327C4AE5D654 |
| 511 | 03C96A059DFA7EA40C29977876DB1BBC1DFC5A399A06A1B6C028B99DAC01E2E4853B22E11D5801D2654828E03DA2660DEF9659386BA77AB0A85F4C7D042E709E9F81564119BBF0F62197CB6FC78F9EE9CE592661F8C6E2C51A9151E273C67AC7A24591A0C7C7224BA890B983 |
| 512 | 9EE8101B293F05662F0F628CF6F29695AA15366E0B8F8F1E13E4059B1CC04B82CF5F90742F2C76AAAAAC7240E3100C008CF39774E2ADE79B44CA9BC7A1F896821137161073A0695AEA02DB021EC6F3607A873C3155E782E82482F26EFFCEEB12C50FC21C1B0137967A91600D |
| 513 | 7B0F1BD9CBDD1CC71BA120440F566CDE9663E4D20801D69B7809DAD033FD02D318BC91AD3C19A3E8375ABAE448D10017E36B98626E873865EE5F86433BCB20FEB6B82B2C11CE6BDE2C5FC0518E3ED112A3771715C3790D0CB0B85B668137D1DBAA49D2A8CA88532DEBE47C99 |
| 514 | 923BC45FF1AAE76005D6AC3DA9EDE83062281D904A19CB8982E645218D46AB41B6B20261DA8112061BB7EA7CF7485DA45E0EAE745E5BDCE03BDE733AB2E890D24B8D11C3719BB9631E203ABB05C1D0754D800794CEF51B39FCAF8A94FEABAC9108306BAF2BEEBCA05A8DF435 |
| 515 | C7B9D873CEB110151EC1E28C2B8C9CD03066278E3BFEB4911524C452C343B84500BF4EE29C12CD3EC488367B6094544D72BDF1C88039F83041A9B93FF2DBDF2FAAA34B8286144119FE3D9E85B35992BDE15A7E183ED3A8011A602E2B3E60CB89E6F560BE53EC830807B41C44 |
| 516 | 7A4CA4CCEBDAA64BFD3C32DB005B30F08E5CE17CA3E28E15A9B9E483F7B8076906CD8416F71F0520EB1F6DB17100145F6CBA1819441966C94F2E4A17E739E2D6C291EC3BFE02A6A1B1A8A24E5F7351E6B409F15D3458C3E3ABB1F02E7858C88AD0517ADEE622BFAF7A6D7E32 |
| 517 | E857603E9E0F9DEE2129B84883F804415EE275E89EA68202457B12DA289F200DA3E09AE4238CA43AA016EBEEC9B010722F749A7F353E94D09D7F95A3638E6EAB598C40F623553064A57DE5441F9FBE8C34827A9424FB5A91BEFE5443F3836C116EBCAFFC916B21CD68289BF2 |

TABLE 5-continued $N_{FFT} = 2048$, $N_{TX} = 2$, Length = 864

| Index | Midamble Sequence |
|---|---|
| 518 | 02A1A689186A542E4F32158B51B78E050E571D4F14E0A7C1292B7AA3E6EF1414F44B605 9C24EB2C617326B541D88DB73F9CFD2F71B8D729D61F00B94E2F74AEA8CE8B0B2C6C 0FAC6679EA9E51DB2A7CDA21364EAB81F3B653A0B3348867B4E605831953BC3AC025B 7FCEED66 |
| 519 | F76CC191551160041BCA004FCB11BC111DDB53BE0007300C926076918A598FC64A0946F 8BD1B6757C49EAC3902FDB0B958A9A3E08C012FB7838AB68D692746294B7B1ABD0772 FCD124C69805AE52A1CDE51C7AF3928B14FEDAFB4123E95D904294A965CC9C571F106 CEBBA60 |
| 520 | CA2E76BCAF51943639AD4E1B0DC0FCAE1E54A85F30CA3890B3621A93729120BB725B 648B689B8CF1BA3802A8D8D891A6A4D3D95DD8115420414567566AB09FC3AC90F6D6 91448182ECDB1200EDC8DBFF75559398A4E7ADA8DEF7DD6116DA0315E087C316BABF CCE8258FA81 |
| 521 | B44158204E601A94B6D8074F7D56FEF7E745C0C38B41DF9A8E41298584D0C923192458D 862746925F4955AA784769BDC79771181F44E68C0448C7EA75621161BA01272212A3ACF C6FDBF761902C865DD888A6EABD0F51BDD76D68B9F4D1F295B8A7CE11F7EC8B19A1 7BFDC2B |
| 522 | 9529D9DA2C0E22111C812C0D2FECA6A513345311283668AD789F239A1CA6EFCF90E4D 552F93E5B22AA318EA93D38B071E19E08958D435301B906DE9C65E0F4173F568D9A8732 619575A45BD72667051FFA0344DF97DE278CE03CB0FD3D91AE097D8D483618960BBC9 2C8E0B4 |
| 523 | D3E5EC3437E2508FF9AB794B0849B3204393E475ED378F60B408DD1D9D6B2F6300181F3 0E085E804135849535C876270446CBD51C2319B36D6F52E011C7755F4333A1186D863B70 3F882D303880D385D7D9D1E33626D3604F64990BDF41F30860E88B31C9F79DEB1CFBD7 A94 |
| 524 | C21DA060A7D0DED4901A460175BA3705D8AE7E460F0A27DF8620E1C9C14E028E75FA5 13271FF161511CB08516AFC030F7355DB95E41390B75386A42CA28A958EC54F5CEAA72 5D41D8760F19ACD06C837957D19AF532405F6F14D286A1D763CE56C8C1EDA7FEB3472 365E758C |
| 525 | C94D8DFB58320EDA1015AA818C218ADE06D570DE1C9C6A931381F37F76FEC0DB3002 DF16D0449A1DC2010901CC6AA68D2560BF2398B37F1F0FD28E560F7A6FB4C9ECEC588 446756121C0487FB770CE8506CC801110C5A89F5557DA147A41A73C2CAC469487F6BB49 B5EE4BED |
| 526 | 1E25899865878EAE6E1450061F49A29F0A834B9C9247AD087F4084BE30395AE36C10379 B180FB6133F75A3B9CE0FD5B5704203119915FAB3C3200DC3D5E91B826A54568E46F1F3 E453A4EC46588F7DFE911B18ADBE89445BD75A2DA2E97926E96CD54F51614CCB943D7 1AEAE |
| 527 | 8893D7003607A8C0466EE6490209A8E7A5D9EB52A0AD383AED6866332C5C7A4FAA34B 98CAB1E34174D57771FD011E8009C2232BA76A76DDAA3FD57A3D889CF078C88FFF3F0 6C928A539EACDD41A6FDED5AC8DAC6A34E1985103E0325B87571B0253C2949A1E863 81749C31A3 |
| 528 | 0754263FA8163F90FC08EA227E72C2858D9F2054D5420639A843E0FBEBD32DC0056526E 065E08AAC5249F8190CC57CBC4651C736118CDA7BDA59715BD9D5661FCA4885675CD0 B8ECA4AD4693421A1AC7A368B0D522CE370B032E8A0EEE250A3C4BD66DED6F12013 DD1026617 |
| 529 | F59140001B196491E5A3ECFC06774E438948F14AC5B02C11C85AD864D33EE144891419F 1AE393BDCA6CF5ACA3BC27FE266C0FD72D8289EE4CC201478221C18E9CD526255E01 7F5A50C551E77EEEFBFE894C38EEA702D3944AFF9498E6AC54791FF0EE7C88CADA588 CD70798F |
| 530 | BBDA305E3C69033A4A433EC7FE039410EBE5096B7BC7EE5BF65B5274E12C04736E9AC 214510A453B40AB444AD1C1653E2D0C1147699EB74BE0390F9FAE37395EFAA9901ED5C EE5118D4C1E8036A9B681C265BCC3267AE2278F8CBB54307ECD486082FCFBEAE632AE 7D19B30E |
| 531 | C628F42AE6A75B22AE70B0F14E66FF71415A0E3619171E20F13FA5B7571C6252434B1A9 A3FD197E055143112C91C7960ABBC12A79D24884D580C318014384812DDCF31C7565B8 0F82F4B5E0781A9D378CCA64E4F59DF6FE3B279ABCDCC0FB7422A4D07BF25481DF8F 0E87E3B |
| 532 | 45CFE04DC449811292D09E0293B719B747511C1F77004660E0D37C284E472338A291DB05 EC07C75FB263A8D8977282F13E866AA7EC28B59D2DF7F130C3BCDD25ABACAC0C1D4 A2B2C8EBE5FA0E74152930763CED65DEFB1641D987FF1C208297E7016F642CB85B8711 BE922A0 |
| 533 | 8C97CBA32F98810A0B5EAA3DAC7695F759102306610FF710DC8109904C74A3A86B5C50 3452751959B83D3F2864EA17B85509D0C5CE3BB19486F4AC1926FF9592B6D057C99586D B5A597EA798A207757ED0F15522421C347A409D019F81F406BF136492EFD46E197178CA BF33 |
| 534 | 0326C8C12D550F85952CEC3C50733F3CECBA1AEF8A46F6082D20DEC3FAEBDDEF8B3 D136896EA04BF002A8C7892E2C648D2071C58DA5C150DF9278F7FFB2707CA0E6795E53 EC3B43A98AC76292E5D032BF705B5ED15226166550F698F916B71332E5568FEC11414118 24EA3F8 |
| 535 | 9C8A1CA68D1949F075FCFDB7EB9446212A47D8F004C67F80389569AE0C3EA991B080B DAF5B6626A3DC9931231056692A0C6AEABC0E9E6144741EF21738C922FA56253CE9682 18EBF74F149B43B0337FDE5CBD8A72A947A650A24C7C3F57690A7337BC65A05E8D836 7793448F |
| 536 | 39369C980AE99D1A15B27085C424E19894FCEEF80553692A8D5AB21D867598CF4BE101 DADCC897A1A490AB339A07F5F22D7823055BFA2CC180DA818F34B41FAAB5E2412837 9C38A75646CEF09FA293135374BFFE379FFD8A8C63330823015A4DA470F6D037BDCEC9 B7DD034C |

TABLE 5-continued $N_{FFT} = 2048/, N_{Tx} = 2$, Length = 864

| Index | Midamble Sequence |
|---|---|
| 537 | 67737558E0AB21468CCAF18373092D05384076B200880AE565A1337E7C3D8D8A28BDCE 65B0BD17CDFF1AB94CD2923075E39A2743166E340750ED1EEDAF116A8AF403DC6613A C95D7C5991EC9913D5FC81D4D6BEF6697AE699E792523E2700A13C7975A556ED932B3B E17A096 |
| 538 | 8A9E3ABAB127076589E06511CB40650E53505512F47BFCA29517F6742B2C682E34537BA DE16706CF7A1E225607ED000152318B3E5426D0A3B43D8E4D614BDA97EF0FFE2704AD A28261B90A4AF0609C12DC4B5343380B7DAD0AFC203027FBBC228735EDEA00CAB46D FF79B1E5 |
| 539 | 1663E6C5B1E145535AD0F89217F31A13F1A0D3A6B4DC455C71030C22CEBD0CCA4E058 552EF814C727D27A94ADCD972881CF97740626F2B3A04776007341F50A77BC4A0C74C2 FFC67475A099965E52FF26E7B7968EDB56FCC6123811A8FB7F68B285D187044523CF8A3 7C83D8 |
| 540 | 1AD8D030AC21941F201AF4E2068FD5089F84A1FB8F56816C624B48819FA84D8DCAC563 9D7A11564DE82CAFBFE4B8AB1A53733B3C0248368F6D21398B670343B1D3E4A248FB5 5DF66672603044F1995CE9E889CE2185EE50C9733095C4A6ADF797B812DCFA805185FCF 19F382 |
| 541 | C9FDECA2AB214080A44C94D8531834528457F90F65052E85F109135833EB1911E6F551E AAAAF4A66810ECE2E2E775385DB705ECC82AA212687FAC77DAF49298C7A4B148530E 83E9F6162C1AD3FB0430BED72CBD6F9B76FBEDE0D2FD3205A98C03EA6592C1B60D42 E0E566AC8 |
| 542 | 2821DDFBCD6679224C0D20A9E3A089666CE1DFB71A2724A309B017E4E8402F6F4AC62 CB38307F250428488107A692CD975B1D9EBF069F34013DA977FC625B3ABB94F4419C9F 3BA9C5830DF9DA2AA8371ED84219C56FAE2741A862BF0381C370F172E7AE208C6F8130 B237312 |
| 543 | 4BA4E463C11A676309E9F5DF4C432664A0C14ABEE81D85BE79ABA5037CC631F050F37 C89D08A61D2A5594103ED820ECD82E53E4FE8D5E25F1C9062BEAF8C483D3BD349F132 8F3B16E2EDC9648063F1ABC84F2009D8C020BD792ADD78C109D2CCDB84E71CF610F6 B8E3E37A95 |
| 544 | 2E83E7EEDC94436AC4061756E906B71496B3A89D0E281C1C665A646E9C8598029E568C9 5288941752050934E6C261E339F5D0837D92E6C30934709D753AD7A98A3A684689564E E2ED69F9555F690EA459218779F046398C4204E5AFCF2B30CFCE027CEA5E628691570D DBDD |
| 545 | 732109A2AA322431A9E642A8C5B3C32058FCEA02116450B36B603619A31F37FB1FD71C 5A108079B70DE1B7F14CD3918676599354229A929523BF8AA3F454C5C346B93CE24E439 4AA07C3DD799DA52F16C84DE5E063B6A9ED716E42B37167905A790AC268CD1AE93E2 E3B791A |
| 546 | 4496BE3197B2D69C58A80A129AF3F9846604357ED5CAE7180E1E511966040A17B759892 A1160527516A5E9DB9E8F04BE8C2E974772ECE86213D087DE0C7C0C54286128BE6F0949 73E6D52BE7C0BE6A6D5E9CE6FA1EC2F1CD18FD613102A57A7C3A19EB0D6AAACAD4 F752B14C |
| 547 | D51F8AF120AC85CAF20E2195A9DE4C4EF4D2DF9714944C70681FE15148037F7D5E0488 A68A90F83A88175F81B08815472897A60261AAD7F1510A2E4B6788EBD990BB227E17EF 8C6E0E6F3B5D82D4031987DAF104CB749C3EF7DE34F40450DB087A51F985C3618D450B 8355BE |
| 548 | AA1986E5708EC111334A88A6813D3AACD1BDD9889BB31E43A5F16E50B22661B97A151 BFD12DB878A2079508692DD2C1DA959B9559190109E6F527DAD735810582F45EF9E9E1 28523B61EAC4F8E239B4CCA9A08A27EBF3961E09FB6C95DCB730B261DDCF69083E4C 6B998048A |
| 549 | E96CA0C1E07B6226708FC5F1DD9AC6A41803CCF3A03945C2A6B9F5953D2113A04D917 44B9F0DAB8E5AADF3C226F277E8F92D2022E660DD4B4536A42AD81FB6D704CCFB8E D03E0BA930DF50A476A89DDF226540AB35787E86A650311FE2D094FC661EF1F5548D45 41D93FB988 |
| 550 | 0ED9DEE28BC79B5E5EEF08789199400DB3048F765D538E0C2FCD0EDFE39117D51BC34 6E88F2282040942CA05567AE091486E3482D12A29D2D9D00507C7B7789477021B27B4CF 5AE54FE49CC17B54A03979A791F583A6DB4E3BCC782F8F21B8FFC41103DEAE34B9C5C 1C8A1EE |
| 551 | FE83CCC5C69A80BE3AE4A3D360D171A2CC57E0BB306FDB14F4805AE42851B85D0E19 129CF6C089CEE32BA186BE95CC96E91CC18D2A0C520E555D436B4609F67AEE671A001 E0BA659F551C37A60686790D4F53F4B3B6C11B3F13E11974E58F0F6E0B6CED509E28298 ACBF8124 |
| 552 | 7A7C621BC432C4EE3C00FFEF54EFEAD8D9DA00693312360F149290881DB12421CABB6 2AC8F965BB8784D718C07682B4F80F9744451149CBF1A3DC012FD5AD91A6133B28561A 1350D808D9B608C8DA58B6567B09B271A173A3F19AF28DA02D2D798454221C3FC35DB FBECEBF0 |
| 553 | 45D1395769E326B3846509BC1E0E524C8423EE2A01B928B4F8104ADA4F4D78AD66DB66 3FC8BB8F25208860B95A01E338D2CCA5EEB8CF6449EEFCE186C5589329316897F0338B AAC8D56F7FBE524DAD5684B82C74105E621B8AFA75BA0254A03FC512791B36694B924 3B8A150 |
| 554 | B52822E415A8ED02A578E9D6236779F90D462BFD3C9336DDCE6AA3314C83EBBDD1EB 438412039044314923A233E432F58DB8201B4FB0B0348496E4353AC03E28B6CE506BB85F 81E53886E8F3E0C4F8E86E82699CB6B4F5234EFB7B60E3B25F60CB1AB3A2AA946ADF3 D22D128 |
| 555 | 91F18530F020C229E6B40231A5B84BB10D8CCBE0A8D5A0A9B222698A887DE19687F5B 2470E30191F7F27FFE39BB756B84098990FABB3395257E59CF47DAE92F055B623F0088F9 115C9AC8519510F71120A36FA1AD47BC41FDE4789DADFADEDD5FECE6855E9FDCC02 4C795138 |

TABLE 5-continued $N_{FFT} = 2048$, $N_{Tx} = 2$, Length = 864

| Index | Midamble Sequence |
|---|---|
| 556 | CA65272E01264FCF8202FD041A10C8A053F0D70D778FD3DF39572CBD1ED1118D705701E6954F4AB2D56474588283383972948BB8DC1DF131F187646E6E56DA5E71A3983FF61099BEDD54C1601337AFF2371974CC2C2E247F99A1A4BE16F73473123C8169DBCC1BD43DF4804 |
| 557 | C12606330E4A92D260CD3112E01ABAECE0D8A95C1C3A862329D6D1B56FC0971F535E4B9E580DB1E18831D8A531D25532492F360008671B6D451B78102A505FC3F90F58179EA1037418223AF52CC8DEA6B8EF67A6D145BC3AC0CC81991E66335ED7C059A99B9E0A3D9FEEB3FF |
| 558 | 03C155194E6138B390427F9B767FE11CC798B20295E9E755246B7DEDD0A9A9924071B95B61A40AEFF4456A1614011FD12999D5F40DC6F9D44B1129D60E2EAD73010D9621B02615B72A315D45DE3D27679A244E13BBD3DE34D0E7CCE35CBBEB4EE21924B2EB7DD5A3132A1A5A |
| 559 | CBAF61FD062218FEB0E258B04A2716A53CDE7277284F241861A3005DBE08BD4379A2801261090111563E8D7E51EC291A0DC9C268DFC0AE35C5BB5F5C7C8FE0DAD45187B4BAD51409673A895CE1345C7AF03920DDE957DC35FF81CCDC9323E483E810AC7E4B9450464AE6262B |
| 560 | 12A0B2C12388F06E383A689AE1A6DA73D83D74016B2C98A38175A9ADC0A3BF36B6EA6160A951B7784459084D48AD64E03522946D8E7562AC8E67721C9359B6A7C6222EB4E470D424BD4887F35D495D12357948DB18067187FD1851EFD2930E2E2009FE7DAA27761BD60E22BD |
| 561 | 5DBA57642907ACB1DC868D453793ADD988485341C59128CAD44A89B50B3C165AA4E76615F97FCAC40B8CC65082EE6B8C22CC6D05740704A0C1714E5CC652D3EFFD8FF6C0E4EC3309B66ABE4AF92056F8BF03FD9BBDCA56791007F57C0581E684ECA51FB4B65B628C49B10366 |
| 562 | 831234860C8938EA26C7090F98077D50C86A74730440AF28C9D3392312914EA9A6FBCA934B88A5B71C873FBD0F97C5442960B7AB67966C2892BFECF3891D031A7C7128FDB82EAAAF2A5DF75C986B61C99DCCF68C95C9B388E5687DCF29FE949AA0ED061A0CF60630AF8E5F0A |
| 563 | 5DE0846FE1F424C09D8D2156D72E02911322B2583944420B32A5C2F6CF3A794FCE908C399EC63E16B084E553081EB179E15C547C805C81669EBBCADC7C0BEDA9DE0D99E6CC9B53B755B517686C8F017A6259B9A4010D0DF7541E67BC67606C5115BA436BB0C4C60DE4B0A7DB |
| 564 | 33F6B0AFD003F5789C1D539C00FBC9335C1DDBD17F044B4781C5422631510A338769806A23C3E078000A53DEB844864C33A0B8D4DE8C31611647F7A96019CB437CEBEB7646688AC5C33BB6E5957A4DE1D3049183198333D6CCB4E6FF0A3C7CD2CD26DB5E52471012C3759EB8 |
| 565 | FC674896AB94A20CBFCA61E0103CF317B040E8988C84CA01470C43F5226FE3ED7B58882A2C87C31AE92470549CA07187B033F9477FA6FD767CC4F3CC471FD7520E26A8F64E548CA4661B78ACA002E082F999C3EC05348A86578A910189FA3EF156E75FB32B5B2966677A075 |
| 566 | 1CD614636321B74BB263667D70A2E2D844888C3BA869801BF8102C3467EFE85F3DF1FECA55EEC8CF20B5426DA1AD2888B2261C621134632835D9145D5F303BF836030A99AF6A6FB4677C52C9217431490345ECCEDA3F1241DAF17E75DBEA751D1C5A7189E62F923260F106F5 |
| 567 | 522EC5B58401C91BE8BB47B907D1335EDC2C4062AF26099F9DE53021404F055F885938D9A1F778CBFC534883C3C6224A71BCD151D53CDDF371694696DFD3618381EAA7F4E4D2B542B6F2F887136350DB765129C47D15DAAD4CC50F7E5251C3288E459CF0B95A318A1CBC021ED |
| 568 | 5832D5589A840B1C6600D93FF8FF009236944FC3331E7A1B32EB44C00D171C93A79742B015D5472DA47E922404C7ADDA48DE4B57F7C574229E3509AC7914E0D8FA06298C1E40A11451DCA24C76FB9E68B217FF51E42BD3A0B879B3BDE0DAED44FE29EEA1162BDEB1BB262B19 |
| 569 | 2DAA253AC854AB5AFF0F96C190B1CDB91F30C08DEA3E5E62A62F64867A037E0D63F12E01AAFE747386900CF1341A828A209432EEA48E526A50E01194E7F244C7ED4D53B36FD06E4594DFB9AD8A10765129E60E5D742D9B2A2EF80A89462539BD4034CDD06624F92ED327FD3B |
| 570 | 1D03114026D615A55DBF082E9C0DCD80425A8F03F66E42957095483823B2EFC23D0E8211BBC574DE884BC099F45CE8321207669F5DA50E1D0354C4C358656E3A18F3536769504E9E65CA4741E32EBB79B215AAA35A5DD302E365378A3FCA2D90577ADEC77125AB2789E026A3 |
| 571 | 8C5CBC0B6124DE2B886B4421C7FB30399484B3CBA3A503FA07193E25BDE615489642AF8FCBDEFB40ECF8E946EF6E10A64718367A98CC6FDCCBD2FFC6448A6BA450D059641EE5F4482A9A437F53156044D9911E20FB5B384C9F2F79B59E57C61A2A4DAACFF6B35D39E44B0682 |
| 572 | A0C2BA7B051D19AC8F51DC721A11C0C077DFA597B8E7CDE5A6FDECB2C22A4D37462F02024E8C1030883E41DCB017E0A074F2F8722C82ECBB52CB0711F82CA42DB95877361B0DD04C07BD5B3362F23207E54D74D13E7C76836D5158E5D0AD44AD203D2955352FB66E416C56A5 |
| 573 | AC12E6A560B6705A8D1011D4BA67CB00D099647D6353BE3041981CF871AD15B43A0BE2C5DFD1E60C584288E50BA0336A0B1351FE68C45994D5ED21119ACB7728C61A5611461B628225DE5708E06FBFF39D7C71B0CB8C6B615EED9FC8BDC26BA717C278CC76398C801C8F2B45 |
| 574 | B10994C3A6A897522B67D208F519642208E24AB3A886D0E59E72FED389D3427883894B0EC9A39A250AAB4C0EFC2C915DE95297E330E0FE1E19B5C5ECBBE2C989AA040CD4CD8EAEB00AE29C211C932CBB1CEA289231A35592BDC35B64A87C7725C2FB09C839F92FA3C33FF6CC |

TABLE 5-continued $N_{FFT} = 2048, N_{Tx} = 2$, Length = 864

| Index | Midamble Sequence |
|---|---|
| 575 | 3A74D0D584B4C0747BD6CF6E06E0C1D5743586C33F2AE5E495919B722E18301C9751452 84F31BC7972ECE61B890437B468D7061FAD1CD886A71BC7B07A29F9AD143EEBA5F90F CE25CF224C0D3BD2D4134CD20F42470ED439CDD235D2328ABA3173688C903FD2AD8A 19C394E3 |
| 576 | 9A0F3E4F0A5155D33E7EA0434A42B721925E1AD12ADDC57239634080B1E964309216504 4F7457DCB852A77C2511893130E3A9471F8AB2DA625EBDE562EC81EFBD430643A0860F 94FC39E967A68651FF06632305FB217726681C780DC443F7C226B50BEC93A73261A9ADD C2E2 |
| 577 | 9D784C7DBB6EAC379D44CA30350F0EEDB9D700D1AA5382B6CE21FD3116E56740E6C8 84032885706443368E907FD86069F304D0E40384574F70033E7DF3EC914574DAEEE9CE178 935F3DE38B7F0F99452E189A88AD3794FCA4EA58772DF648A1C214E49844C053B44FFC 199B2D |
| 578 | 0A8744348E4FC0C8D6F518FCFAFEFF2B8B76346180E85E0E9706204207185D10E9851F12 10E2D6BA709BA1198339949713569D50BB289E5ABA2624D52DF0695BACAF8144BF1D0 0B0EF0379DC668A3025757E4FC154B436D04B5B3C2C0CE098A1DE2431AFE2BAA537A3 C45FB8 |
| 579 | FC0EC51FB10FF2CE13BAF4312C1CEB77E1D340A2D71245A09208AFEC1B6CA639226A EF05D1B90311310E431AD7A79287EB800483A93802DD9B7C3BB7C1988BADE7B188CC C807683B91F5ADAE7F186EF8355519A76297D6DCDCD14A6E4CE41ABAE603AA55C183 9E791DA2BB04 |
| 580 | 16EA3FA58F7C6C51FF5A2F5A0289C92C136E14D6D54BA8192C822C65280DAE9303DA9 CD28CE0CF71E204AC7C23284166C6B1E856BD77FF9D3BF088198315866A543D2CC1428 8D36FBADBE99EFE7DE0461CFC65378A75273B42AC067C3DD0F5218DBF9B12D42AC00 A27E98079 |
| 581 | 2F491AFEC2208146BA5FABB4817436D1E54273918690B6440D68C7998C4603156DF09D0 F0FDB6191902DCCF0C6343292142E6245D147EB566DF8B89F01E5BCB00E98738671776B 777614EFB11F28069B57B03D39E274430326E657D66768586AB9CB289F03B4F74AB8D8B 18A |
| 582 | 77ABC23490F554460781FA5D7282DE04D165B035CC4A30BA192F64B22B45A712A22115 99B0B17E297BA4EA15FBC3D6835003A06B5CA83CA6FAB6A9F9F19B444E8818F3BC788 3FB83D46E6FA67484E11C34D6D6392218B3BA8EA5AE9C4EB9E22C256591CE68F8426A 3A83C16C |
| 583 | 04C29D29ECC9D5E990F9D2899899F791ACD50423FEA932DA0395636EE2FAA45A2B6CD 5813AF30B54526EF488202914855E7920291357191000D64367646BC26A7DB9093D3FE6E E04729B40A3E01353CC17E8788E3E8EEE26BB2136EC091E451362A7398FC4447460FF41E 529B |
| 584 | 238958830A020E7ED3E2B4C1658C51C1C259AB650B67A914789CCD1FA68429DAAEB54 1BAC1C6BD8F1CCD8256D8526CC40DE0BCCCAAA9856D6799BEA04749BA569ABB711 21805FD9256F6DE37D62CD2A799BEF1A9E45400E45F3F4727F183C565D536A05846C076 92931B0ECC |
| 585 | 711BE1E0DCE4120075EA08290548991660A6C4AF03DBEFBA0C4015B1C4DB526FD9C2F AD8B72D780364359E50ED7E4F4380D8EB678A880D56EA527B66CDDD18B6BB0FDA0C A7B6EEDFCB94B840460E6045315C93FE754496EFC21EAC69EDA520E1108946E4CEAE0 F1C041383C6 |
| 586 | C0C265655AA3999088E1A053EC0D6B953C0BFAE88300003508D17509524E5F5FAC5DC1 9EB2440655D8C679BCA250CBA8848C355D9CFC7905F177AF8127647E2E15DAC8A0AB9 4F8921374573FA5AD357C83948F640B7E6FB1EFC1877A5FF6FEC7294127EC2333A33870 9CD01B |
| 587 | FCD48BCC274BB3F32EE534983D08D171A47C1B378204003B401EAA4B7C35B268E1A48 0B2C7F6DD4AE3622B6704652E7394CEF44B20CE8EACE7D2B5761155EF4992FC6997AA 95001445AD20245C9A928775BDBE37C01384888C4DF25D6639DA47D19CCEDC1B521CE AE7FF5258 |
| 588 | 2CBCE915C1A1E668DC17E252A9D56F240600CC8CD34517BD8DB126A373909C6678B50 3336C028359A82F7800975530CF69315EB851A4C30856DDE1E4E2A0B761ABF03B8B162F 32B2288CBF4EB664E6AE689D1DAF26E8B7C10FE83B19EC29DBB70D90160A3FB63AA4 9984C0C2 |
| 589 | 2D75FB64925B2BDA3CB47104907E434DEA5FC3BBD00D3DE14E6A02B78134BF89894B B6209A0405C76E54508A68BE6610B603A8BB43B1B5129621EF90F763BCF9B5FD1CCFC6 C04D70789AFDFA5417E8E6985737D42310502B318725F3ABC684720423505BD7A8D60B BC3D7886 |
| 590 | 54B35F362011461D0D139645BD01100D48198C627DE66F98A4A78C8854F4F0D09274810F CE89DA5B9C85CB6902B64791F230CF486E3651A3B914064B92883BE0D8B4AB542E5235 9890819F64BB0CD85E44D77E2AF51FE0FAA99237D3116F652C456D9553FA0F990EEFD8 0B2F |
| 591 | 5A436A6048B2B53F3DC6655BAB140C7924B823CF234A62BA15C563A16E32040C4CE497 86526833AB1736CD1DE65161F21C55E701A97E4CA0DBB86969A1C536A3A97E661E33A 94B3EF07A4F1110C91D98E31F09B3E8992F0B805224A580E38577ACA3ABE4ABA38DDB 67B27658 |
| 592 | CF7C634D4850B5BA96E2032D9800CB9B365937EF2561381ADAC6DF24E598523914C953 94604243CDA04D55A150EC9C12F7A826B0B95151DD856F945A96D8460E4FE3999D7DE E27BEC42C84923F88B7222539B071DC80083803C64D9967E329A35FA54CE23BA461D657 255166 |
| 593 | 749D810C154081D69C8A5CEA430FCEBD50BD714D83B5E8A806310D6489AE5218B8139 2912E21A57D7140304A705DD21F5A8FA001F7C884D89DDB7D36E8119E2E4AF60E309557 9A20FB33C30C4F066C602F22879986335BAB1C33071B906536AEBA22655E14A352FFBC EFBCDB7 |

TABLE 5-continued $N_{FFT} = 2048/, N_{Tx} = 2$, Length = 864

| Index | Midamble Sequence |
|---|---|
| 594 | 32074551ACFF152B59C339D0825B3F3DDC42F40902435147606534C04AF5AA3961E4156EB4613B77B33FF4F4CF685543161F8710E3C18ECD3E9007DD4947C6A60D80C32A3225624C180CD9847F3C56C0ABB2FF04D108DFD8341E6DF7376CB8A137757F55EB7FE72E23E204EA |
| 595 | 05D3055B3C4A8136CCA02B8CCE0B442D121455AF7B299D8E908A5AA6F068CFAE6CAE8AE1603CD7D5CA35328E9D03772752733333C971F90FE2725C71EC39A86704157ECEFB10C31C16679D946B36D18CDA98D3E079D0EF915925A0F2526240FA5AFDA4D289C5C35077ADDFDA |
| 596 | AABBA1FA70C808524CE4080C56CAFC32D6A2E44832C0CF24A27663966B4279E976B8C42C6F65575C61A769B8C48D11465FBA2729C0219E4DD82EA39D3900CAFC16A5DAA68D6175180A634FB117348004F110F3ECCF94B7D1CA094E1FFC43F88ADA704DFA5C33B8AC89B53A7E |
| 597 | 372D0B8730A7F50E09DF7FC0024954601162CB22D8E28B24B058540D85E3408B6D2C181E577C9FCD5FDEB9603713A7D12F7381043EE7152273D61605C6F5B39CE6DEF00C8A2120DBE4EC2EA112EC4FCD99A684CA1235745A532AB60949EBAFDA7A9A2B6EFC6FA4AFC35BAF61 |
| 598 | 57FFA8E354838948D1E87D457D3CEEF4A724B25A5B406A4B91A876C2B320A650AC10590FC2A8B87E2645E7A44B099E6F6E97CD569A0335AA1F8811976CDDECDA9CB33C93667C7630CFD72F76986A795E0336B05CEA14C1B66223FA876B0CCC6A60C136AC49FA2B92898129EAA |
| 599 | E63E0E5C74D7D852E42C441F1A3A4BCEB12D7D60C4D233C997D4682061C8FA32CD1F1981D896702AB21F46C14A54E61F6B70D73EF515A89E0C6084AF4F92165D76E10DF910882A0366CDE234E2C74DDA33302EEC82DA52422170C797BF739C5B2FBC28FB398FEA3FF500EE84 |
| 600 | EC8CB84C7FC4BA40A7E10582E4AB6C1626DB56AC04E1620159AB51E0C4C46C61C97CA3B154ACF2FBE6980820D080D0B02BA7CEC8864A1FE7F301E41B9EB2E09405042A6CC996AE80C064CE6628C1C9249BD0E7CD182A5016DF0B6F989BE2F4EFBA811F4FB176B2703EF3178F |
| 601 | D2F01D03A62E6220C1562E81882F0A6B43D5C3A3AACODAA9B6636579B0ED34843E905C2D64D97D778FF787732AA8CDD7FA84001A3283546DA2246B00454611F7FB0D7DA841BA5D3DF340F9A3D81D6FF98A6D2518BD2E8449C84DBCB1C111539C4D3B62BD55A6F4CF5D9D71FC |
| 602 | 8377978A3AB8CE20EDB18B1A6FD51418161A14809DA33176FAD376BF63AAF5F0A44B526A9ADAC0CF2DE5360EDE1A7BD839497A75202033844408DBCC457C582742DF976735F47FA078A66995B1DB4CDB6A51625EB33869DD3775B284697AB2FE7A925808DBD555972E884DAE |
| 603 | D6235ECD0DE29BA8D229A0976EF6A48262B15F497848C9350518D4C4201343CA16FB3653ED4678D281402D0970F1B0E5B01950BECBA5C080BEF82CDEC57B8717B2EEC18F4A403764485AD97B691468198C3ADB2FC0EAF5E49110A8ADDB22D5BE0694A5B4AFEA6D62C8F77D6B |
| 604 | C2A14A127BC32394ACBFB83660E149305F8E2874D04B1CFB036ACAC92AD4D1DC0843E8D08675694AD1A66282E5B29988F67575E64F285509B691E0FDF948D47A80AF8FCF44B937CED3275C7C2A78BDFA9DA0486AD067A379AD8E969B845AC3A8A46A4E4D94E30FA43CF02A3F |
| 605 | FD696932CC42175C850175E5083DD1A07626461C10F5242ED9C742AEA799D291041D287D03C9C577C8E72C13E312C6B854ACF9BC9468242335F06FDD964EEEA6233369B1BA110BE60160F8401BC829F41F8B50A0A4B3BDF3507503D482FFAF0A3ABEF4C015A8DE10D4C5B8CD |
| 606 | CAD14FD18EC126F8E428BCB011F2795D6B690827054C23C28529A09B1FD9D78D06F750FCBB76047DFA2D49072AC2D5062BC0103A379D988C6E7020C8EFD74711010DA6FB4941E5CD45756624C723537D066D4ED56F3ADD80B87DDA90CF562C253B52D8BD05A16E0EC21EB7D6 |
| 607 | 3A94F70E00288F07014C69DB09843B42E3D9AE20A4F8242404CA68EE1ED6E2F0609706C881C3A6A785F2A2E58B1F3F889CB155836FA1EDA37D32BA6912D48CE38E65D22063507AC581FD7DF2902F2E2275993AE18436F37D67C92C0EC892FC74248C0952E665BA68B56E37DE |
| 608 | 9C26B97F67091A88762788A934660CB76DE3DAA65329602308B5D84A42709150B4FA7C485B283B54F8B227F4AB3902A129F5805D3E20C1AFAACAB883041DBE8A77A1E177A1A16E7A6920D5FFF6A5111B369779A4A49990906C4B8C98266576AEBDEC3EB6D05750B04F2F50D8 |
| 609 | 3AD10424EB1524FAED7872BCC4462021B8B0287B5ABCCC24BB586892A0D921420AAF1B912144632EAAABA75C86A0111B02FF5A3657482870CD4032C7B62A7AD105790313E0A52D8EFAECB51377EF213180A13E122320379E10DABA69618B982B7B2D72F7D98555DDC751BA27D |
| 610 | 070E08672F42A81B7EB109DE33CDF843719B9A25D2967083CDFF22B427D25CD26013C56BABE9DED05C6228A4C097ADD8C405158112E6478A7A307F8B9FBE76A843046096A6092BFDC2834C5E1668241046DDC62571AC6ACF629BC2F5F07F797BFE7C19232F4D86D5CC2A7145 |
| 611 | 37404C4CCD159E2384CC06E3AB5AC3B5444F26E0BE3173E0A49DA104B8C7160C40F06804A902DFD0CF61E99F01FF8DA3409BAB0724ACCB5FFE45DCCA99CBE358B566A2330F502818CE6EF7E9162AEA12890EF6D68339A8BBA4961265FC78B118822EA79140107CA439C5D96A |
| 612 | 6C113433F4D1A0E7A3B2DD52F6DF0A670847A7585A842C50A54E44011F419C9EB5822450C0E15E96DA0E8886278231EFBA810DFA7638D2166A910AB1E1F00D2E4D5842B7E844E288EB1BA087EB7BB12BEDADCA0995D81BB981EC80D85FA4B7E3234A8E6F99F45B7526BD33D4 |

TABLE 5-continued $N_{FFT} = 2048/, N_{Tx} = 2$, Length = 864

| Index | Midamble Sequence |
|---|---|
| 613 | E9A9C4AF801BCB889EC344419F8017821FFC471C9ACB2ECFF00A074C56D7715010B507 C6691ADBC5DB501CCA2146BAEA4B223562D760515C9895C48A59C76BA514559985C39 C1924536DB48E9E52DFA18FA171B1470B3F6B5F735ED268B12E7DCBECFA0CA1CE17B D364EC805 |
| 614 | 101A8633885A49AC37E3B256905C98746AD0EFC904053C647016C7B5C3B0F0A3F78AD7 28205AC7591BD9CEE2221074B3366345F2CD1DEB07BE75EB7ACEC58710F9A0393386B 27596C516F845503DD988FDD44CF8556DDA465FEBD69E0E558141196451C8ED9B33FEC 04D074B |
| 615 | 19B761B6AE1065A7B6B22CCA36159673B240E884C08BD18307402B90C5FFB331A05206 59646B5C32F39C0886BC036C1F9F8ACE05CD7EC70D05F0B3F89CE4CA0E9BCFBAD6B6 2DF37055065D56518082A5EC897D2417983A8CF893799213DE14681447A619BB9572EBD 0344561 |
| 616 | 334F515E7496CC86944B709C162AB400782ED09750496C20145B99025ABA4EE3035C0BD BE67D750C20F4DE20CAC2D19BC5F5AF51EA2A7AB60ECE5B1199B5ABA9A28DDBBE7 2D2B270152AE3C30F127BFCD9C0F85157A44413A34288A4557FC3304A6221E54045BE75 593CA73B |
| 617 | 0BE11E69DC8E6FB89196180C72C82620096C1C8FA78B37F4D3CC90520B60C1AA116A62 12D2DAE5A385139C7C36E17BB67FFE210EE921A3C8BDF5A06C39CAC91F0B11B9626C 88891FCA99AC1F1DC9358E1BA6265D5CB0EE9CD5375947D378917A327885D74DD48D5 FFD671CB0 |
| 618 | 21D22717455C0BCCDA04106B429117E172370BAEB1C792E9E931A31889DF919FA5EEA9 B54FB2D301DA484631D007C306BC5D68DC0A3D92DB6B8EB9885BD7F31FDD769CCC7 E8A40C0D1136995A7644888049661850DC6595F5FBD12B57106337D8132207D262AAF14 AEBE01DF |
| 619 | 6131990C9EA544AA3A5FEEBF9D9006F80CFF97B508B3867FA9E3950944E7711978A60E4 98B78D43DFCF45C034B7420466719C4F7A810C0372C7DA86457E1478F0CD2D1E9114B0 1F027555F3DBBF497FFEA43B7D786508F95127F4AEA88A682549955871CD121B76CD619 DDAD |
| 620 | EA72310C3A94F0CA7808E5951622048F901CB0AB6DAC16A0B9E6EE143CA57859F622B 73DA18B21E18FA962C519BBB6AB085F003A099127D21456879EDB1F38504762A23BB7E F2B8D795804433941273E659C57FC0D450BBBEA5B0836D56625EEB2F628EAF3B2AC962 AD19179 |
| 621 | 022A2305FC84A0B7A6B3C34D4B5943DA0AA0508E548584305A165AFD3314D66DBFF05 8062D8FEFF268AA75201D1D0C95D52DFA29E1A4C0E9ED70B8525F5ED73236B929374B D01375A7032D9A7CF3EA32222C9CCB8EF5C81F8C655E90BFF93F2472088A5315AD90B 091A3AC06 |
| 622 | C6AEE6400E3C62ABF49521FB4EEBE03355C3586F1A4189D7D11CE04C6FD2941E7C078 BA7261B01FCCADC087C04A402970F778F06A331D7F12ECB923C6BEDF98DD40FAB3C1 90D8905029E1795ED1B601D696A39A2A53A8CB706B63AE468854B0199D2EFB84D37308 26CBC7AA4 |
| 623 | 1A8AB0C28819F7311B7637D75E9F42F1E5614C8B85C01F9692C1C7B460C9E7C2330ECD 03447BB8DA8551D0214BB0AA824C8BBC4FBB40AB0DB16C56DE66ACF2E3C08B49C75 FE292C9E5DD399B4E8C1B57505E885BD84E0246337129FF27D243A324D8EA38BE935AB A4A658D78 |
| 624 | 0D466E74651AFB53D1410DB1DAB6D03ED7A402189179226F4D97A22F401B8AC50A432 E3093194015C5508B065DB39FCDB39E01F6C0DF25F12DEC16CE7614F06D17ED76C86E3 8DCEDEF1B78F2F47E8B7499330DB26E019DA1A338DCC2C91A41A643D85997AAD0E1 AF3CA36314 |
| 625 | 071C1822819DEF3ADE05701277614D69AADD3B873F88D0F927805B4AC456A2D2A1187 E85996E9EC786205B31110CA1CD683D72BED9CA5E57B203F919627975D374E2CAB7A9 EC8E8744242BF634C76490AEA92FF55C1E8BAF0ED770383AFA369C0072C40B4C849277 DA2D6F9B |
| 626 | D21859E76FFDCE26C6C30626CEB109C91E131C5841E11AE8CB4BDC534A44382732185F 8E030126FA8E54DEC0C1F164549FCFF9E80991073ED230E8B4F6901C71F5C58151E2ECF C7D16E5A922B9B0D9C51729FD58415A56A6D2CFF629B1FE4FE6D2B8EB07C34A95413 A81D2E9 |
| 627 | F5BDE511C3BBF65822504B3A211A90477B5704831B67604832DDD4AABADA828B2A659 88F2A5D049EC0C9F42670F40B724D27ECA97C882AF1CC820B22B047343431C43A2790F 16CFF17E165301275B113C56D71BBADEB866A1D77C0CD53EDC3B3F7BB8CFD09F886 0287A10D3 |
| 628 | F1A88F2D1171E53F0BF5E4BD922885E06244098D325B5455660A95463B96C98C7B852D7 C33A363E96A18467B11F0A3A2900603EE7500C29B672636F56A5ECB1E3A888C854E4641 FE9729B4D6C9BB7098F63C05B854A906F32EAF12C02EB6B0A78A69F9D1F06055486BE6 BF00 |
| 629 | 412D7B24B88CE052AC3858E48684AF4E3CC9E2AA132084765B5C349ACC552B83D83B1 3431EFE9F834EBBF097EA02E1B18C14952E8E8DEED9B8914917927CBEF40993B81D7E8 FB21658237983800C604E55086DAD1F366219F6EA63658C9B2B4CB7C3F6187D9C949CA 346D282 |
| 630 | 1E2C25A84B8E01C9D7B7BE3022B4DB067E8E338987E5D2EA18068AB2CC184D329BEB 544D4824C23A25BA1C270BA570BECC9FC8C981D7A6EB5AB1C86ECD04C3DA4A74598 43D98BFAD5EC9F016251C39B60BC493153ACC8D7B49C792AA23CF668DA8AF27E5116 ECA8BECE40028 |
| 631 | DF4C53A3DDA48BDF110AD604340A85C080642726B0B1C29DAE00836B93A4E51D43C5 A9E416C0AFF12DF448645328DB37FEAB5F0C00B50C9947B720900E9B81592A54C0DE54 F0C9ECBF88EF84830482FA1A9129A57B3CB0A88B277FC03BDEA44D8DAD42F670D2AF E4EDD1DF61 |

TABLE 5-continued $N_{FFT} = 2048/, N_{Tx} = 2$, Length = 864

| Index | Midamble Sequence |
|---|---|
| 632 | 9FCF810A9DCA9EA03AEF81B9663921CCDE50096A430C5348EEAB4123D8ADE3A2BD6579FB85C3A07BC580250FEA0C36D1B67B6151428FB8B876448807C87214C484CB5191A9C13F8F3DAC55857CBD8C638A800BD79CEDEDE838B8CB72A72F0B32837AF56EDFCF3792D4920C64 |
| 633 | 766D96DB9E1F53EE18034F09025E139B17E0224F687AB2061580F248C7AFDE9862181402B110DDD11C9C73BEA14CA6F40511925D03A9288F6A74D329CC2E1BDAB7AA78E153D0BF2E868414C35F30B1777664F37BCE2937DA5EE86B3E82A204124A985F6ACE46038E9072C5AD |
| 634 | 253BD44C9DF767C649ED6EC515835987724837199412521566 1767D2E5B100C68808D759F001B6E0267D62BB4242DE9307622E231DC33C23F14D7549072682BE8D6ADFFB0F8764142974CE336CD7D0BD3B796304308DBB475B1852C38D14FDF4ACE59508420F89C9918587C2 |
| 635 | 86979B962B7C76B3C3815A502132A37B9C9E5403A829C43171F5A087F31160FF8778C851CA4E982C20DA6CF900A2D9A2349A0B72E23A0359609661F3E4D1EA45F64C7F7731C1B2860D27DEFE852BDFEF1C680B00722FD073944132186E9416827362342ED0D7C8BDB77E9A4C |
| 636 | 720FE1DB0B8D0E08C02D1FE5C00BAFDAEC50CC093D6EDCACFE8A1CDE61131BE8B21C448B1406B66C5F408969804720EF7A56FDCA8FE3333947 50917433CF6E642D48AF32FA06AEF44CC80F90571FBB56504D578EDE46F48C2A93E62DE695ED80F3427FA6FCC7FB950A8280B0 |
| 637 | 05C6063FC36D804BF68F2679C6AD27F6C4E686110481B4615C840561BA40B0D0B8BAC7237AB50B517312C60BA0AAA87700E2BAB3C365A87CF7C9B2868ABBF394485CA173D03DFF72CE157B207601515DCDF7624262898C7949398790CCA94BCD75286CD179EB51CAFE538F85 |
| 638 | 9B9899A323C288A397866AACA80733A022A2B42C79D12D8B21F5C6718AAE583D8423D815A8993D08EA9C6FC5332B231ECEECC77211B708081FED1DA99F284C4BEACC259A7CB681C241B1CDFD5BF71676904063CEBDE58B6C6D933D5F18061275F5CE4706EDDE8EAAF57A8792 |
| 639 | 49F2050B495ACF0619C8CD6CE4610B9F05153042929A8F1A441D01C758A1C88249A08767871FDCC92A87B9586C7751CE7B24868ECD7FC43667FD0B7A20A2229970A0CA98CE9B2EF3ABFFDA585F38D013FC0DA9B9F6AEEC2E01E9D1458F0B6D0EFD4015A88A5072BF73783CD2 |
| 640 | 874ED9ABFD0AE7155F20AC5E8FDF854E923C4404DE8FDD4218C68901CD05A134A94FC4BC8925E44A924FD733386E9BD9D346180294F6B1AB2A532C485499C610D27EBE014187C15B02D4696EB884BC1CD15F5D1893E34177B13D8D6E88AA339A1C1C4D976B07CEB71F0DE598 |
| 641 | 0C35D10BA6E85C7A6E87AD1EA6DFC4C4D616842C3A84C1AF730923F176B72002BED0094F59FE00AC01EE704A7501DAC53428E985C1141CB48B78CF0DAFE6DCDDDF812D1535877E8B8FA79456D43910525CB034FD91E259BCC1BE379A6D924069FF18D0590548EA53202B2134 |
| 642 | D4A5D11637546542B397E64DC8BB0D511A923B7D4538BBA39A81C756AAEB00272CA01987BF2348367318B3E6906D23224A4018F96FBA7FCA8E085E346881E56F3CD9783DA9E9718EEC26DB52009213BC6781118B1A5BC476996E6AB0E8F1463D8FEEC87C1DBB70FC3A6C4B0F |
| 643 | 70ADE0C18AD17093157C20566DE3ACB4BD73574D257A74057AE24F7DB675207446D2233D022A182733FA5A16CAC9C5D45A13700D57487CEA38DE2692910F52CE462C4FE55443361855D9F1DB704AC9A3FA6E4E07D4252B27F2511AACF6869D138ED4B6C0D288910D05BF6CD0 |
| 644 | 9C89602A955ACB84EC7D5C597667562A035DEC00F0428C8CFAA499CBC92C63FF589B479F0A18C828131A8B6B9A517910F339F52141CD5B16194E9CB7AB7E4F61496E38FC3100FEC9D83A072916639184BE8F9A8843B35D51FB95AE60F2F77EE4AB82B45928594D44F9571B82 |
| 645 | 871C7E10523590FA0FA2C0433D431C871DA125A40DB63C49AA8A9534929A767BDFB2AF12A3ADDFC87486A04A3D509C649C52659C3E6F6D8841B433E3DD49AB3B04529B96193E6A9A3EA2559C8088689B856871C4506C6FFA42E99DF936FA99C713709CBA4ACCCDFFF4C987A5 |
| 646 | 872398CDF359DC4616A95538198911A254D19CEDBAFE58DB4783B0438B3A43C4D8DBDA8A1F82DACC19BBC0BA6A745D95044430D78B4E6D6BCEF71D0EC5D00FA7366BD5A5B7C0AA96598240CD365F91C90BAB717EEEC318B1DF14D8497F99C0B8B28657273540 00253604BF47 |
| 647 | E182A08012C89C1305183F3163606342BD0357C26589538328DB9B3CB9E96C2B9C7731F217AD141093AB5B64350CA7B380EA7D344421F17F648043A7E9F92F7052D3E39DBB44C240DF40CB941DC0AB7DC686674A284E5179AE68F23BFE4976410546476928BDF9E56BAE109B |
| 648 | 45523CC03F25F28B85C62D79004500FCCD013D59E6F34E469BADAF8379040502895B52A0FF36A38AC193F4525D88386888D6E82B357614218E449D4BF9275ECDFE08D64C584B1E6828CFAB64E4C2AE50B084D9F95E5D23346DF2761A51ECA4A3E0C1BD6271333C9F157F3C66 |
| 649 | 7CB20FC64A703AB462A1990EFCC03D13E50BAC2BBF9A60CD45A74F1A7EF61D2B6DB4064D4282C0A51D2CF208AF4194459CC14A6F2969AA7488CE230BF71C4D9165076BFBD4710F9B0BD10398D5BD531375FCA04E242C3A5544F8B7222A9763B4458FDFBE4F0757198949305B |
| 650 | 5ADF4ABDB8A1147C8A98CDF0301C08874C1D523DCDA5E148A6D33C85D834BA9AB62263CBC9851A28443A6317DEA56D82F0010F2531F901E640A11161A3CFA527A3225D83E69CF1A5A656089CB06CF715E6D5F606BBBD4D508BBDB19439FF52A04FE7CA8DD2E61570AC12EF1A |

TABLE 5-continued $N_{FFT} = 2048, N_{Tx} = 2$, Length = 864

| Index | Midamble Sequence |
|---|---|
| 651 | 87631E14E5E1E09B42E6189A44CA3971269B8550ABB2080755CDD3F4116542821C141430259C86AEA1028FB5CCE0EE06DFCC7EB8E3023D9D9BCCDB3C3A0DCC9A46235C275CA9CE9ADD36D15699DB506D1028504611AD1AEEAEBCD96C441FA6F65B06BB82DCBE268F794BD3CC |
| 652 | 76AD57707DABA7586048E3742F0BFBD42A8E0782ADF3BCDD7842715A22D30D0200C5F591A3660B8E030791A95C3012AD8EDC584511D8A3E44AEE08B69EE89E1951C03CD92B8FA428DD992953D71F587879B96C2C2210389B39CFFD267A00FBCC4C5829D16BD14E34A57D517C |
| 653 | F5DC38FA17439937601DE819C5ED9C109D35468FA184CE53981AA9F505F504CCEBB27A491228C31BB15020098DE563A32662F42C008B6C0AE27A673E6D9D8DA75CA080A2ADFAC95273C5234EB9F1095B0A9209726094C5EBC8FAD767F3A4FE8453AB7D7F2E9E498C6B4F9305 |
| 654 | 1618074D819D5BE2E1308948699484D982D58345358B82BBE50929748CAE8DA0C960C6D817575E1DF1FD3C5B3B84F01FD216D4880227E2C3B2C6AEE0E1044AEF25898A8780C87EA513CA0EDC8339ED18A2DD5CD79CE11AC9A2EFDF32869E446502E1E85D1B46555CBBEB3137 |
| 655 | E36AE742CE6D5215146F10648AF82B65BB4AF6B503E3A18E6B13F51C1DB3C71E8483B75409260CA49CA0B49858DC4603D02F1C7ADD40F5F38FBF67C4053D28EB66C95B8BF58EC520A30C194BA822DC85C59094D23FF51220B5D700EDC01EC9A1AB1A2EA4A108481FB8CD9EAD |
| 656 | F488C2FBBCE4F84D64E69BF105BF64687397A3F5BD7C10AC5F1C58671140522C8B4EA6D54598534C498CD95568107466C25A37C98045C9BA50E6B97912AD415DD5AD3A2F12CC9EFBC89DB7A1F77AB11BE9F4006BC352CA882C421D1BDF7701033AD70CCB1095928F8B7D4F89 |
| 657 | 147C003292B1E44B497440571FCA15E0987DE73518ED421FE687607595BE0B9B6990C43BC2E8F12D86D41B86DFE6D430AB8662E1D881FA246FB88D21BD7CCBBB8E9057DDB89D9902FF7AD9A60CFB28A9905711F85CC669E803E1F023D220CA4F0163272AC3D6AB7956A025B2 |
| 658 | 60A28BA2A36C571C27B8096D3767854E1F1C010E0124C1A72D9C8E4EE08FF260DB3AAA9289D9C500A933ED1792FDBEE70C8A84087F72FBF6446A9E61A3BC83D66F001DFF53D56A0E3311BEA96886E76BD895B876B34F44CC94D414DDDFCAF893E4D197FC8CD04E6336A0A5CA |
| 659 | 242E25E877C1F83A82318A4D739D5C02F0E2320B1D94C1E9913FBB18FED110E6181BF42F21554C49CC9A0AC052A4A1C2E3746784C61389F6D8B4FADF245B996534FCE2D5F39DB08AEE1FF6542199C670925B328780DCD2F49294A856EA58183346BCE9DE5C814B94B8F58001 |
| 660 | 50587670B98F5587589EDD38E8E6062041437CF6B828258AA77B746B84ECA8DD7EA08757165A0D35882D9437B03C249922624A86D01D158050C157CFA9B3F5A9E56C5C8F5C539475C2168CFA3D44E53E09B6ED3E34BE431AFFE420D75DEE4CC6A5B391388026B9C097060A8B |
| 661 | DAE2574521E8343C3B60E6A29AE65A1CC5A7279B00616789E5C36095074003FDBB9578370C3AF292280393B6E53CCD4317D566F1A28505DC61E9B8A6D2D1B8E6E21783CD3091F77F74E524F8958881FF297595DA0B71E860816D733929169A1C0BEAF40185867C3CD9574667 |
| 662 | C4F81BA5EEAE4610006B2A5F32A23D9AD33B7C7E01A7CF9C013173F32E182D16609983E94212D010D1F4E84077CC031E626B3D2B59B12F44905EDAD705FC38926C8CF3CA9B734D363DA152B1C9045F20E29DFA1542CA863BA92B0247D8F7B3E320B01F2CC8368C4EFE3D9B4D |
| 663 | 4622B0BA4835ACA83CABD1F305A1934D206EBB99D08B00081C61DC31C98D5E12455EA8800F6455F17ECBC7AAF601F5BAD0B81EBFCEC7CB3F49E63DA69C5E98F4395B041664C141D1003C45D2664B7DBEC3D43268F660C647E13489572D1DBBBA2270367D3D4DD45C284FF8B3 |
| 664 | 791E9D81BE06190D7FDA6B01EAA8463942A79E8471902E75DBD784C46EAB63054A542568F81FB201A60F11816037442C9BC0CB3E51DCB8B65A4A3D7CB7F9B38A97BD1AEFEE42D0F9912D4999369734DFDEB894515D13E3861D1B43D4820C86B44138D5712A50127616D792DC |
| 665 | 6AE3F12FC8A462A114181D96CAE468DDDEF2C96FB076AD5B180A4101C9AB1A0332A2AB28A43B80B26F11E92F08EE913560081D6E3DE05A4DD3FE3A1BE60E84C0E2DD01C1957CD59E69A2B640A5EB111435F9A0F9C94E035E5469BC8B8C5106C1FDC648578DEA4F149DF28EB20 |
| 666 | FC555A1DBFA8023AE93B8B3BD02DB65C9E05CA9796A91A191BD809F2BB2BE29C3354F8420EFC2C6910489897E62635BE83A0161AE20A1BB66F2FC00B506CC4F29693A04C25EEB780864803E359BD0E35247A756D9918F0C351B2F5AF83F8FCF1C923A1878B3C8F26A0CDA02F |
| 667 | 4F0CD8E3016981B185A8991E57D7E9D448F354AF9EA7750978884189944E471E057278B42A27FDA9AC64A24D2571926521F3B27B66442A3D855B514A38A97CDC4072B0DEC4C7B7499253494CEC5EF0419DDC6EF8E05F68D45368CEED34F8F8520918B978176601EA6C3258E3 |
| 668 | E2B6BC9038AC84A83279DEA8868C8B9B0E4A28A6548ABF447B451459C6D8A0FDCEC659611E41E360D70541C7A4A86CE1CA9F781B4D42EDA47FC5324FC362F6B6943E8AEFF9ABDD98657FC6062AA9FA30F5920367F6F3FF3DBC42887C87851D0890EB30F20436514D42FD3301 |
| 669 | A3B345EF2CA05FF9E400B950866B5B1C2B76339489B2152D01107EF5A68F2A3A4884EC23AA4CDC4DB0F55B39A439390DB1294FC86B0D66718CBFE2C7B030F11343F4B6B0FB0116268ACC38151CDA5A7A5864C7A158288A14ADE9C68803C7AB3A5E69BF4B9DB10B86FB07735F |

TABLE 5-continued $N_{FFT} = 2048, N_{Tx} = 2$, Length = 864

| Index | Midamble Sequence |
|---|---|
| 670 | CCC2ADF6C48F434983C90928061C712B4A5976E404F0D2960725F7560E0A0C53A8C3390072FB4CCF94384BF80152FE631DF9DB884EAEF0ACFE07502723F32473D8DA9EA37862041108F020FB9FB7A8B85CC7AEDCFE88EA27450FB091822669EAD911FE0C64B8FDCCF6B95CB0 |
| 671 | 631B73C2E513CAA79649C1E6064B8270E118EBA6F58C3524F9134D5D2682A39F4B56E8FB45B03AB2A4DD82401094F2087CC16E8F344A578731F2D92F969C615212246DAEB9603353EC421289B9B924B243CF501371E869D0FF99DCDC831E0DFEB773E323DBBB343668820AD6 |
| 672 | 5A1073FC030100AAAF328068E5973A7A5A5066121E6756A79715A8789077691EDFCED1D2A8F769D81E10510CDAC6AA0D18EA6AE4B03A865DB4647F81962B92996ED76FFDF656954434198FA6F193D8552AA33721FA5B2AA429B840A84D41A1A7A59B54898C0D9D5A96B2A247 |
| 673 | D94B74E26360B3591BBCAD10FE3F3AAE8A8FC729A34C29704D6703BF18416A112FBA2048580FCAC1D19ED12C0D2A1063910322F9403A2303E64C87735DC1367132FEB2AE11ECE6A1DE3010B84691629155BBBEC8D0E1757765FE58A15B7C71D0D311B0BF4D0997181BB57759 |
| 674 | 86141F28BBF6CA368598E175B182A1AA6945A1ED5DA80EBDBD72D354903D04E42D5460902084E6D0575410F64598D5D62D33B1074362FC60D713FA97230C0452127CE6437587AFFA8D670459CFFEC2C502098CB2877377151A64187462F019F9BF2E69997A0FEEDB7142499 |
| 675 | D4432C25C52A1033397B9BC689C022B9AD796620ED221D0BCD1D579980A9DBAA769E8593C645F591E00890991CF2A472C4007770F34840278E002FC2F9E9E7448B8FA30356CEB5223E1E3C03D69E98624835E5958DC195BDC98BF867E3D69728B6CBE2EB9FFB116CA31C8DF1 |
| 676 | 00743CF14E5AAC9C242B74C06EF2BD4CFB63E8839B45A7772557518E3AC82D0C22004EDE661D412E4D6CD590E8A3630FB34A42C4FCD4E77AFB120877BB552166E10C4437ED0972C00E8777CE5B5F66E763A9245C8329CD8C6EF024A79B3607E2BA7E19812498E9C51F8214E1 |
| 677 | AF410934ADB554DA3FBCA10ED4287A562E1450C3B0ABA22BE48FE0221BB9C499654B6DAFC312A211F430F802616455571444FC70966164C3A48724F53E5444F8D68DB9B621B9787B97EB177B020F93BF6753909ED20CAB4BFBB2FE70A10742B923412696235BC0DC695C23FE |
| 678 | B869FCEB1725C001856A4CE559D00E170132BC21E3D884B6C46EBEDC11CD0CCAF4CF075C668238559176AC37228153869281A9A4BAD6D599301F77572748F5A44389CCD2E0CB31631B6AA9A493F16BCB0696E62496D2B7EB38450AFAF52B260E824991534B97E31DCF06A082 |
| 679 | B246913981C6A4C511224BB0826378D3DEDC2D788C6859C3B82E94964236FCA2DA00D92B0AD11E8870DA652A6B320E4FCE945BCD4F1F78E16DBE182D51DA7C0787C628D5AAB8DD1956408949CDE78310D53799788DEDCC439B659C9A3C513A5E233A0DB9FADC995A01DFD240 |
| 680 | 4C1A6699D763537F2D9D1033E5F1585EFFF3118B364AFC92CAA1E402566BAAFA054238018B45C5D6051873313293611325CC25674141CFE3DD22F216C5CDE6C41E0668319BAD2CEDF3A4AF2EF1C3C078A2D0F1BF91B93D49E02852836EB1B4A03E9CC349B3652E2EF473AA06 |
| 681 | 03143D80B937AD01FBAD715EAD9D17729778D10C032336953CD31CDC2EE59E2C49D3C3F434E234D3E15985835275040A00BF54355B45C77781AD7D6D838A0422E547F35A3432B656844F245338B29BAABEA2B7B6E12B474599F742F274E83A7309A5A19A35FC6AA472D1A9E8C |
| 682 | 86CD5A9F62F59D3831163061F709C39B74F62309B5108579E109CD9CBC8A49A31E01B89CE7B7908A4B17A28C203739978D44E1EDA6E421D9326A8BD4CA8B9478C3550C7D2E5377D7E8ABFA70BE4834619A794E0BE3693C07B5409B1F3E06401BE6CDCEFD59C8AE6A5B43AB1D |
| 683 | 4844445872CB5CC9587065F28305CA1B0B0BF598157AFCEC8763249581C867861945AEAAA97F11C37C5B183B16902CCEA06BCBDB923B2A9E1583B0C16ED49623C9A692AA0BC6AB3CDBFC45AF8A7253E537718334287FF18243C16DB359B7C364E0E952D6722D613EAAF7F40E |
| 684 | 01A07206C060A48BD6C1076E794C1DF7BC69F1B28F6F66CC6E9A02AE811528CFE2267E658B9AF4574A686E262555B0C7511C4D5AF32A51705B0A3BD2F1483CABECD246B00CE26834F85D3F0EDDE9E02D841FD8E504092BE0104F1A7E05AE67DF492754820DD6935CF79611E4 |
| 685 | 765D5A4B6A62455CDB1128F14080C53CABAC0F8B952D28FA2DB6CEA8080BE0FB811F01D6811BA28CD12D98F65E308DA4BEFD788954C1229B9F61D5FD0A8BDF43FEE54F1C4FF91A0BC52C1F8AE2BBF377886913D59484B9E866CAD09408A0D80433C85B5E0097E3CC381CEDF0 |
| 686 | EF76756D0E44243E8E11324B0A6FF5299515C5A236BA46E5329C4AE221B42800DAF112EFB9ACF2F8F511136E434ADA42A84664C8E84E1A1A7627A7CFEDB28D72C791571140052 57FF5D86F1925F0B61008AB1DCB3A37DAA76DE6A3A7E1CECDAE40877D2D488B6F68550B1C25 |
| 687 | 4DC6E14831368B4B34CECD81F6E1FB2BE45EFB828583DDCB370E0D42D6225C35BD8989F6A9C5603AE6B632E226126F86E0B206F11C6924F63972B574847810F9F78A841A91315E218094A9C707FFDB7ABEADBAF9FA2F9135ED1238B40D6769BF93B2A6B020A18252C5B3F355 |
| 688 | 7AD3DA4390917845CEBB27C412D85EEF34D667050163869019E59842D078400DC783D75AF8475C77ECE20D582942FEABE84D670E993E3DAB59FA1C2A1286C7FDDACB38ECE2AD48338D640C585B5CA8C23600D2DD57C2344EBB7A78B84ADBBEAAD8AEDB3523F200BDC174AC23 |

TABLE 5-continued $N_{FFT} = 2048/, N_{TX} = 2$, Length = 864

| Index | Midamble Sequence |
|---|---|
| 689 | 1823F515F064D23241DCDA43D7497E05DFE215093134B440F520B2FF61BAA5F5910293F D7B576DD09461901590583AD060385714EFA8A09593AC7FDD84E27763D79FC46B169E7 CA0888AB1C319D186CF920B4EB5A530849C39577CA80C1D9C0321BCCFC3E0D7725B1 C54BCDA |
| 690 | 1B6B5200B37DB0912EB8E0587190C74DB4B4C051D9CDD3BEF032E838923C9CD778653 0CB928E101EAF27CCE4B2B9CC3E1734427830803AA3AE90989566CBC47CDA6EBDA44 BD3544D8A6669BEDA814987AB36D981862DF5C401486D3F7BDE1D35960BE65D140254 FCE940EA62 |
| 691 | 3D687252667763061F678C8613AB6D460849748917CC9404E12F096622659177B133E25FD 16A2B5F4138806460978B45B28EBBD2BDC4252D40AA8C8A584E57532628BC67D58671C 1A74F6A90E1DD39DB43EFCC6EF7BC5421C9FC8AEDAD218F8841433F88289C2DDF2A5 D3494 |
| 692 | BF625C000E0F490ACF52C5F140A4F1D346EDE0B351945F17B14081EDD012DD89F30E54 C2538C897E6818373536EB12059F581D04A22876D5FC4F9337BB566D5AEE0341692E3F3 DC2008EAAE110DAF9CC5509B6010460481352A08703796DF4AFBBC2FCB383A4DA8E3 D1C56F3 |
| 693 | 962A0D8B0FF6FD3D76724D0708DC43091E1408DBEB60728213CE5444F8132E096C6A8D 9C0FD48757A89DA82E57EDC557220E714C4D300A5F81F1130D804E6FD677E1D4180A38 8335BC3E8809DB234F138052F8789B57A139C7D8E6C3C526C7A6D562618E65F414B5B3 B6AFEA |
| 694 | 42AC1B8C7F31E406894CAFA9249B08506ACA58CC1A794088535DF9A769454584D19A81 B12F96DB216FE2D8E158AAF0315D5FF0D91C6CA6FD2FD4855C30307792852969437DF4 040FE2D95D6EAE2B9C9818486A4069F48A3D42E756C09FC55ACFE66B4CA94E7953C43 6CFC289 |
| 695 | 86606D80FDC913286D321ECC1E4332C0E8891CD34D44EF909AADF9224C696EBD9E2F3 C54C88E0F511FF69BC1554454A8D316081573F57AF71754D92D6FCBA0B01CAB7550E94 A6E7C727F7D12F0357A47D0B8981ACB3D10A38EF8353277305B734633FB8A84A590A54 4011C2D |
| 696 | 46FAC0E6F5F4BEE9F25E31B6A92A08E51CC124687B498C604C98011AE4D55F472B12C7 AA090183A576A77F991213A03C757D4F406F1937CE8131957204029C6841D88912B2BB69 7AFF7895171456F5CB536F0F35F5A592F8332599A156C4B1D42DBF6827C37F748E69BDB 50F |
| 697 | C24F29342C2901C09F810099BDD883D0C853A2259C648CD4AD6F248F89B351FAA61F90 C320AB4FBEDD3318E470953CFAA9C0AB76CC4A6CAB456CD9D1994504A29F1D0431C A88847D728C7E5AC6D4B2D16A2BBFD4C6BAC9CDFBC65C540682F658883DE96EAB17 A49541DD81BF |
| 698 | 5FA1037B34EE8172E43A1CAF362055C1879F00B770BC961721469C82D48C175A0A79954 5B9C493D04C8C15C5C04A1EE78A1ABEAB5CAC3953802264C6C6F473A9532C9737B2A 8CF2497F5837B68479AF1119A0699B7E96476E242577662CE53CC872B2977B7238602AA4 B98B7 |
| 699 | 277748B64FE92BD65C4491119FC69B25B7BAC9DACE0A91145E5ED18001E499C67CDE3 E32C4D6207C13260FAA3D445E6324F02133107EFDD8DEAFB95D270D9E044E77C0EB90 D72F6630A9F25A909F18E278817A21CC28AAF87EB15EE9EED0F1E67315FC115F9521A1 403C4899 |
| 700 | A4881B65005C025CDB4F118760E785A97CAAE721C01E4CE1AA998F4016FBA231425434 F7D5E9F5F2ECE19FC07D78A672E39260CC50B142617304AC50F9BAE268E545A517DD9 544DFF915DBE519226E97B8B921EC59E5CF48DBE94E0D24A07034C601B155F4D7460F4 48CFD07 |
| 701 | 1C1768BC40521C2CC97C6C61D9713419EB4EF982C2593C83846CAC72BB8AF9B0BF04C F79B03567DDABBA03B8D00FCC09B29A595001C8F76AF2C14A4740FF55112D03E9CFB9 8A2F537919BA786E245583D480A7794364C3ED6A5FF920C1EE256003E3AC69861C64490 C243CEE |
| 702 | B3814542B322E9DC0BD466C708842320725749EE69D61A842F8A74F7EBCD8D767128E06 5729C34855BB82597AEE1F3F53ED2B4648558A328E9F3ADE7E0B7930491C8302DFE402F F36C27C5FD957C097A566FD6F411866A42CE493C6C7805E2F9A15C03470E52AADD10B3 CEEF |
| 703 | C13C055FE492FBA5B56158AB4B06DAB8F17F0F7DC138308EA6A968AA1070FE9C08D95 00BA812646073916C040B504E69FCEEEAC737C184FBD2E61C32207C6B321FE99A3A120 BB3021B22BC3306E56A660BDE2581B787319F7B5B3E7B60ADA7AB552A25A9D77AC6A 36A9A1D28 |
| 704 | B0B8F79587F57E7D183010DB40288A4A8E84A4CBB640166EA2A47386428C9FA47D9691 D842CC9213FDDF08065A63608123AAB78170953BA2569AEDA1017CB70E50E61C2CD9E 7322A4AD9CD85C0B480E7BFEED0F12C6DAB3917B0CD6672D4FB5B66FC12358415879 BD2163520 |
| 705 | 9A464948CB773590D8B18DC5755842A893BA09B85830B8797146DDF5EB01E4016C90851 39A47E036E0629686831C78C4F6694ECDF7071EE9ED5B735AEF2014670FA286080EB05F CC017EEDDD2A0005F7348DFF3E10EC0D87A6DE520F316CA644F9C4BD8432C3059E33 B75B70 |
| 706 | A25E293E031109163837B822303AD9DA2F06606FD43AE2E2CCD28017811DB2A4C51BE9 80E4C54AED3C85EE813EA9636AE997404C53BF65E10C652458E2AE9EB71D4968D6B64 AB8759F1489906E28467DA2DB776E390C8C62E900ABAE692856A7A1D1C209DCDFEED C2469F0F1 |
| 707 | 43301520D80CE206881861082CEFCDC18D4D8137C99719CCE519AE169EA6D564215E36 C68425C0EA73E829083E874AC686F073375DA780574E04909FC53B763AF9F670F72C59A A9E0ABDE07C027104944755F2A80FE6FDBEE24FB598C86EAAE7A9F781C6D685F201A EC1E50E |

TABLE 5-continued $N_{FFT} = 2048$, $N_{Tx} = 2$, Length = 864

| Index | Midamble Sequence |
|---|---|
| 708 | AB115E586057ECE291F81FC5765D8106059184005BCF46A214818962C7AD5A167496749AA22923BFAC7BA55DBA95398AD37350FEC30C7E423D5E3248A9564C47E2789653E2D2D6B9110E1F3D903C3B85A2F0797F9EFF39310F7004A752D8C577F0B7F1BE1D52D61B2678BC19F |
| 709 | 930EA84B3326C5BBA0A144051C7B1930A86153CA5FA506ADC151097D30AD9F9A5ABF08078B278DBD8B8D097273FB884043B87B918A55B884E3CE15AF373479189DE8DE31F8B20F43D5F98D34485C4015D7FFCB2D3F397443434B6A6C85E38C23105B2A147B351E471838BB4 |
| 710 | 132B009BA40FA4680E052D525618B9E55DE76D5E4B84D03834B550DD23BD8180622741A3FCF235C1A721B08D1995D2A1B0526C40CFB0CD7690A4AB46852E212FDE6CC58C0ADC635FBA745FF03AF9CB3906E0D01027A2DFB1CDE3EA4D3C1A06141641E4A5CEFDA5FC7C09E51F |
| 711 | 198F911ECA6177995318722A2DD614A4A3DCAA40FCD15B67662D9BF202327B740918D06850609C205B17614EE7E0DDC17C01E7632E4F87A88C34715ED733E31F600E4B22E17164AA940C47C99F084E5AFEAB0EB0961F23CBCD95B92D7E6B109B499FF089BBEA720388DC145A |
| 712 | 128F94B151C691BD7F89E622EBF118BF1C730439612A3B5244030ABD09EAB8DE6EE005EAC0235995589C40172BB97700938A6C8DDA68A8980746DBEFB77B097142B486A740969ADCE163CBC4F459FB7CC0B519FAF99D45664EE4090E9DE25CE2A6C751681E40A601D097CB34 |
| 713 | 0AC13A7EE8204112DA0A58AE286C98CF7933ADB8151C9D5BB8C122971F1A762F8700DB0A5C31D1E90290B0D70E40E61629C467A4B7DEEA12F2DE159EC0794E5507B26CBF5E9F5BC7864FDCBAF3007ED6B1675430D42941580FE02D7DCAE5E1CF64BF45B10722FBB804332710 |
| 714 | 140F36FB21271431EDA246D7B0F44D06E47780A4FEC0A8455581EE80EF7667039ECFF13D469A334823018223E30B5E4EAD39940A78828AE3385C5DFB6CFE7D320B0C73E5FDC813225B1F02CD2C62B9D21DAF3159DA8F1C74682AC816AF4A0A867AABEE407F741E7D11DC18DE |
| 715 | AA52036689089B80E25AFAF62481287E313C2DC64D86C581BDE70B5DF28393F45521503 8B605C720A0EF88D1330A151EB575DBD29A3FFE313E713A80A45328B5144B3E51BD3ADDBD3794135DCD9F58E9F25B698F9FCC610C0C5EE5B1D56C48B312A3B66C96907F2121686DF6 |
| 716 | 2542C3DC7384EB495CC23E4F2125517B92745D4600848D248E2FA5F6B2C0C54A9A864F383F1E39DABA93428235C71272FF70D692819BFEC6E517676A4CCE2F3A88ED3426610AB83861C0B457F31FB3AEC07F880B5D3C442C205BF634C82EA80C072C38BAB9448F08DF79A4D6 |
| 717 | DA65114E1A6383FB460597E9F24056EFD8060BE2F6E460DE288145291DA34EAD143EF27109B344483212712D57492A4511AECCE87E3EA6C34212CC9D9D08F458A786507038E193D2B7D17D042050EAEA9D8A8FE2BB9A2AED476570A93AD831E6F505FB1F923BB329702CC419 |
| 718 | 1F608A13D64A41B17ED8271C601C0CA2A92315CF9045531E6628457F9E325CD0222AAED80921343172BBE14626F63AAC8E7754C9E92B858F8FF6732B06B021E272BD64B8C2AE78713118F743868F393C59BFC59A625788D4EE92A57E6E16C3B60FDA675C6FD9CBD4B15D76C0 |
| 719 | C8BB60484258E62027A85115113C6D42AC2DC14C634FA5A6504A0562E6E5F6B2A2B7E21B901D53D1F9ED24D790F25B99B88617B954E3A0F24FC31995F875559F2D9028CD4F16439E8E4FB441174845558A13FE78E59ADB0387B75A2426A0A0792E4E91810743F594CC7C43DF |
| 720 | 5E1803C56FD44E08D8CB872637FE43B83BF85B5A4C10653E015AA8CD41837B20161AA0E3EFB32C0CD77662A4DE1732D2BA51534CA7C5832B5A935F5E29B4DDE9967C8CAEA5E3EF4C3A5B45A98409D225531E19878EFDDAC05C1792F6B04E1BF299A5D72052BE3E69746A54C0 |
| 721 | 250DD8F16ED1E8CA96483EF8AF17C14D4F652EE1C088F734F9A41AC1B82DA008397C13842DCAF2040CE385EC0B2CE6A5A9BD6991A048762CEF26224F09F3A14C14E62B6D69409AFB767A45D6C2FDA1D384F8760C21FE95AA34DA2167A2796B881AE54B19CC97C7C57A233F88 |
| 722 | 163E0AE4E7ECAB8A727FA20EA907ED5695FFA00E190F7032DCA7D25E80840343066BE95A7E3E0791A55B41EC19D263088DEA2819038B4402695624C5B9A7477B7D32ED5FF9174B3DDFD2C0997615A3E8B23DA3152E0D7F025E040202EC4CCEA9E4ABDF95812C3687427D34F3 |
| 723 | EA09090400B9A64F40A80935B6C887816A519AB4CFC0BB3888B42768CB392F9F8600D581645F1D01570FAAAD13A6396AC11FB20AF935001646CBE77AAF978D1C00D6F34F8D4A9F08DD2A54899E93AC789C3CADADE94172BB8E9CA6FAA52CCA36268B323B97C4590424D4F23A9 |
| 724 | 8917198347F266A513D6E630504C95338DC864BC1D25BDB190B3C8545E80FD4C9ACC7380303C4F2C72DCEB541AEFB4DC81173590988AEEFF3B69CBB568AF8D900C3AE8A1C85D055FDC03536E4C2721E270C3C8335CF575457509E01AF83219D5B96375E9A31B0F57596D8F88 |
| 725 | DA1317C84D806E8F3084B69E7A4670D888FEEB22D08840D2322D03E2FF1A044164C897153215DE77B507ED8AB76948909797B08E5D576D623F3839BF595A452FC9CE78923C7A5428D02A8E0444534C071F7CEF8D32379BC3DA87B0CBB55D4E78D60BBCCC8A6CA221FE205F02 |
| 726 | 61052E11108CC421740662D4C2C2CAB5AFEBFE0E68CDEB0B8284417E3CDF5E05914DA0D7A68A8EAB24BA4170EEA2C8B5E102D8EFB8723016CEC1CBECBC2796379D8C34462A55AFB22DB1C7C6644B9B6831C2CF34F5764D72CE42A1BACFD70D6E4281A6F990B21B3CA59D1E73 |

TABLE 5-continued $N_{FFT} = 2048, N_{Tx} = 2$, Length = 864

| Index | Midamble Sequence |
|---|---|
| 727 | DF20B6E49DC7A4CBD1278BAA159B6B32627F1212C987C29839F971E2358EF90010E1A A5E42D1AC86F3CAACC20E5B8561006928811C2EE0951E5BF5B242A42AC5BEBA8B325 D1AE6A4292571D5A28D887A2C9464846528A39642521397EE03BAF4B87F18D504F50F96 977B78F6 |
| 728 | 2E4888280C069A7A33E3A4E15DAE18846EA24885609EADAEBBC121A3EF092F7A508A2 F7ED9D32C4E49C37834E22FBE8A7CD4F12A93D098B415B719AC32049FA4466F294EC8 D6D8EBD7958BA38508690835185E5B0DAC3B23BDBAC27997B2F733155DC5DCBFD8B 0EC63463E24 |
| 729 | 674CDAFB8D913C6E8FCD62F962D00ACCD200F91404DA2481EA6961F991162B9BA6EE 464B6ACE221790C9B9BF13849DA9C231881A312F8C3E936E28A68F47EF505FE3FD9328 E483FEC626A5AF134D0CC8957777B89DCA4EBE14864FF92E88192E1B023024A324972F AF4450DF |
| 730 | EF40797F2D2DFAD41FE3CB832EC902A808E498E3310ADE128CD0CF55D2975817844A4 7A009091ADC975883CF2BCD55E62A020D58D792BE0DDEE4B10118F53A2AEA8AA3717 D37492B349C1F0AD720AB6CA6C66E7470CB9259E07692D9C65C02A395CC8CBD3190F5 F372D39ABF |
| 731 | A1754A146C78BA4B4102CEE0DB6D10F03B7E4089121118534FAD12214525C4C6C815DB 6D8CA3989340A8140567C36C2EACF7EE256D60FDE23D250386FE3CCE0DA3B264854F4 27CDFDC726AD180980C65B9038524EE2A51BDFEAF232F50FAA0B0DF293D5A29E0AEC 1ED39E882 |
| 732 | 4C0ED31D531BBE3E454B913E4AAA0C2FE541934CDAD7D9FA84F480F6E5B2548418AF 3D8601D26136AD00F6020194EB376C4D18FC015E6702198CAEA873A79EC1C5C3794CFE 3A949745C3BC92F83195FECF64B47FE29044835074D742305AB00548E1DAD7602734BF7 E0593BE |
| 733 | 12C82E5E3D99BF6D040910B980309E295A0EE78105B8FA62F3BDC45C6BE791D9C582EF 87942012A73817598515E43CE04AAADFAB62A6B915AC43C22A94FFC194E80F4E611C5 DC8579698E9A18E8ADF060EF02981E723F551EC12AF08E5F75877CCFF128B7B63D7E81 BD44908 |
| 734 | 109E4CE1809268F9E0AE8C9256F2FBADE7F30B88BB28DFD82210AE0A80388EFEBCBB 07C714B46C75C2382055B32D9E883AB8A546803A9867EDACC90FBA6DDAAC66AF4B78 20D9952BA54D20048FD4F573500BB9D082812D5DC53CFCF58BF8D9884B80770F29D8EF 34D0711CFA |
| 735 | B0D578982A5C6A69CF4A0D110488A3CD2B843A34EDA8D91F3811B2177B8DA9A029E8 2604DC7D0CCF19E4BA7313676C36DC105000317CCB409E3656FF4463D5F88BFC1C9473 DF7F4C058966254E7A35B87546481EF8E8A44C926972850EAD20A85CBD9D174C1D13C6 0D19E63A |
| 736 | 49A6545F09480233467636E952C046407B3F508B842C4F8D144601FA3E2D38256976944D2 53C388EF88CF92D83AE85203B9CA5CF37F576C8B15B0F57010558BEBD579B3DEF9609E A3EDE58EF5CC4101226B35C8172161154FBDDD042E4CCEFE9EB17CA5D858DD0D1543 758B0 |
| 737 | ECE5622E8289350FA52506A1B6A163734730C5D52498A58AEE30D9FC2B1D5DF76B06F0 91F06410AD0ADBA1704D27A47B718C9A56213ABCA448945017533D276F658A9ADF5B0 6E99A59F448F3CEBD65AE7A1173450EF957A26DE10DEB6EBC2D13EA667D90756E8C59 454001BE |
| 738 | E2CB97A291B04B58822402DAA9DB0E6DF484A463EBD5D28A00331DEC170603863934C 5E7FE0317AC540F1150735D1E349D0D98EFBEA3284CA0D18F964FDD23EC22A3068B68 57464F6E915F5B08E3C815517B392B923D452029F847FC22E24E3ACFBD4F753B23EA4E9 4F27C12 |
| 739 | 012699F7E183BAA13616E0238471F7E74286741C2D0E6001AB98E97AFB4E24D89E17824 80603314505F6A9A537A64F76A39CEBF2ED535C40474004CAE4FD49503713E228AFBE6 223FB7E9334D1618E999EBEEF36A92F9A177A35A9AEB2C7E37A7133401A0FC57CC119 D47DC3 |
| 740 | A4766B17F5DBAB3545777045EC92DBAF49CA1228CC5E35D08B1E179B8A820A4608B4 A47021F9AC1690B8B4220251F12DEEACD50ED058C7321D95E19EC740CA2C3EC105DD C567CBDF8B866F5001BF2E68CA5C6D04B4CF61F5BBF22C9050DBDD8A847DA06A8464 900234875F97 |
| 741 | E4173106FE2FC801279926B5F491133319B970D392193892CE55606385D869D2DD3890D89 E4A71571E492938C284558E6503E334118F507DAF9087BF86A18322DB9CC5D3C1E67101 1492A359F9EC683587DA9B4747C2E95E4CAF0D2B4F93D4254A1CDD37BB66C8CBE64B 4A451 |
| 742 | 411B58A181785D91EB08F3FB923B9A3921A2F11D262719F218AA48D7232C9A58D094866 E5806D8234540B7AC121EFC993E9A0873B7C5E1A5C467FFDC4B9E49FB85D7390E37C55 2AC0B6DD4E7D05987160507E26C5EAE2836174090CD819231C591AE304DA2464297771 B00C7 |
| 743 | 6CDAABF408679979840E116E264D31A600A1B6A2EF8C42B09DE341806830DF47FD21EE 0726EE161272442593995BD4E72E5EBDFA754859CB31C8E4FFC613DA890B582B8A03BA 710ABFC8BCE9B1251544F66111D6AC8547651061C34224C5F247912D4BF7B97FF8A8295 82F6D |
| 744 | 776F21A6B719E5BF7135560A58831F80B0D425E901827804C38C4DE26A849529BF3CA08 B781769426106F0BB29E082DA2EEEF5A80CC6934E2F192668C2EB939E894B31ABA7731 AB11508A03B10ADBA5E0D607914F8EAA6478ED5DC191CBDB7CD254F91CF35EE13263 82949AB |
| 745 | 8627BE511B12501A07A6A9FC64A5247D7CA732E33DA4CDCC697830005199287E3CE6A 5D3008CC90302226B21B483BEC36D00885547413B6DE3CC6165DC7E3FC360CBD6FEC1 E2A2324D2238FC70CEFD18813574E0A30C45E8800AF4AC096AFEAE458D38636D0AB4F F846B1979 |

TABLE 5-continued $N_{FFT} = 2048$, $N_{Tx} = 2$, Length = 864

| Index | Midamble Sequence |
|---|---|
| 746 | 2AA5EC5A885C449C24F1531BD80948350D013FA0F7C852F48228BCC115F6E05BC83987E4F2B603859151A26CFBECFA94D9C5DCFF6C0EB1EEC5730A10B2418EB54B8233E6C86F64D2636ACAE360061BFCDC30C251C1C51D7E8A3A2D4FBBA8DCF2BB2B46AFD8C295D0D65124F7 |
| 747 | ACB9E15A4B6735A2DA90774E4F42B20380AA8C463927E9398225497BE905AE61602804165CF9F3E0D463B11466E6134551FBDD8C723247CC3BED9F6E11269392B57B29A8D8025DF7D54AB7F045650DFD25878643FA85CC18FDF15A3E0CA98571FA29124EB918F2B029664E60 |
| 748 | A30B59CA6C566CA39C97B47C26FDDF5B0E978C31042F1E150A877834461642064AB02149DFC6E5235A28262BC5A0BD59863A0F22821967B40025AD44FD70A586B53B6435A90C674B50AF8C128C89DE4B98B833BA63582DA14393999A59519FCACB4D8A278ADFB078DB9B3FEC |
| 749 | 5900CB5CB43ED710F896F10820998D44C1890C3B2A44D12D0DD7B03DEE6907C807DF18A232F6231CA356F95B63C83357F1B8AA8C383929423EF93EEB4B4C49FA08B0F0F7339AFBF93DFD161B5C95339ED6A5D2504B562819483A2CF36A832300447293981A28D57FA5BEFB66 |
| 750 | C3E02561969FAE8353C4CCE9379EC3A556A0F918E931148F64A2BCFAD3A4E015C49D612216125DC5A6206014EBCE0958765CCD14E82122DD35ACBED5820A59BC68AE739538599BC3AA4D3F46F2483C570BAC047E137571E575675618966F3DD0770BA559674E56AE7DA08355 |
| 751 | 8C3FBAAA08DC681D2505E7686B493E908068C0323F550BD6E780AE87B51BB5F0952C242B9E8A2675322E4001383499B9A0C82B0E5FAC672D664DB04E88D4AE55477D6A318D7B32AF866785AA427600BFEC5EC76C51609CD3E2856D7BCCDF3BB0A25139E0AD85127625AFDDA1 |
| 752 | D0490D5035C5C313144576E5FBC9CC57F7805DA7E6CE02BC234F33BAE724408F7C8CA621603B82C6CA457194D0B2A74A0C159EA46580320ACDBD02E83EA4B6449E77DC98DF74F8A55EB8218A496AB9E4E62ED0F41766EBC985DD995D688D20FDCA904CA0C9AF93668539F802 |
| 753 | E24EA125500340CFC40C42A4C1F20D833F1664F543C2CD2E79B99645BA90705A883081642D1FFAD4BA5236D5A528BC54AD1D790327B24F4F4952F27D85CDE3CA8E89D484E7F28811800689CF24743EBE2013B803BA11549B59DA3EB3CC652A69EDF8EC4FD1458C3ADF2E550D |
| 754 | 8C4CAB87F07AD985D1E855C46DD37BF18B012E2318AA1019CBA9A75E13F2DA6CC862F475E41553A90ED06C510B0529D600412A46E9AB5D5A22B9C454B519A7C0C3E008A2C1F5CBE77FF89505770F836C48993CBC5B24B679CF09CB6983930B59D6128136ED6BC0E7E1388BE8 |
| 755 | 4E9E6993F0F5FC3F26848C0A1B0D32A4613B8C7712007DAC8BA831AB98AE334513B10631688EEF39F1CAB04122498FFE34552A700597907447937E1344D4F1F8FE8DD774742867AC9B699420C661DB90DB4698574FF2B34E4183F28620B9810CCF3121B70632AD7F711829DD |
| 756 | B3C5380314232F21A573F646EE910D0E140DEAC10134CCC46B6B461A0BE36E3B8C3E36201C6D91552C3C960903095ADF079DD0308FF777D8D0B9BC52AA3FF95943B08CD5F9614A5A74B110F83A873B54C5C035D68817A3B754949E374FB3996AB3841C22353843A889F154AF1 |
| 757 | 650D2028AF5B45AFE7120D70156E86B14667A8C070BC83D987DD8A801250DD7523500A14E6AB24367EFA541D6D76C8B048634CE07C7C0C778C71DBD85EF9DC15E5A8D3C7E0BC5AC1DB0A0BDA58A2CF58FFC0BC7809BEB2EAB240CA34FF0150E5001DBC4F66C2D751AF253D78 |
| 758 | 3A5DDC8E2415B4EB3153692AC86A9387376A31461B254BA853EE0A6A00B77983560309810F7146DDB92B4D8644CE10C57C780B52A85F6538EA74C8863619C2242A1C3CEA24E97C1D363A0B4909E2C8DC3F3FE8CB7C20FBC590E1148BBE2C5CF0FE271939399DFC78A1DCADE9 |
| 759 | BBAC033D0725491F60113523307F3CBB4B4AA453D30E82600A0033490C37265687D38923B903FB11A8AC2BC5AC5087B05806F7C6CFA5FC5D41A42F5B4CC89B4F1A593C62FDA680DEF0C45467259E8AF7B93787C38286F34707FD50F3C4D82CCAA5F0B0C7CE338A1F7FCEA2A4 |
| 760 | AD6D96F0913CC2E79843DC34FDD0691BAE59C2421AA4D76783CB20503C2AB4D74D7461A3A66C60A89463B37538F47D32999C00147F79B677B81ADC2FD1D580D9D9A66731015A588DD5CB84A7E5368CB8B10BD0EC55B4C449F4409D3547390B0FBF8BC31454C7AFFFFFE77B03 |
| 761 | 591BD335634324847CEEB0C379C5B3B5247A3559089130AE69B539123D9FEBB8A1013D216D82E333101909FB1051A755AE4300E9AE6C752A3561542B4D5FEAF5A1FE1B43076B4EC1054307EF505759069C25C4CF96EF8679FCA77FC5316B9196EDA4AF9AC82E6E86106E0E66 |
| 762 | 5D90526D26E44303AB3E0F28807B52E298D5706EDC8EA8F0828286547C80698F4A2FC762B4FC0A2F1053B4C490653D0E2A9AF7ECDFE80F9B54970BE676B62056EBE35B9FD51800CD81B87C0136E21C53FB7C9123A452D7E31A304D83B41F9EF542CC2AB07D1899A6D9EDEE5D |
| 763 | 8D1B13C4218DEF20BF5B288822ECE8B400A1031C8E1DB22BD89511BA1CB5ED05904102026A74A6A1809DC9F7CBBC095BB1691A763E5D761085F854C972BC2FB5326171C0B0D0F3DA66B6C01AAA9880606ADFD3EF1B677891CB23D788DA67AC472A5C987E481AE28A170FA4EA |
| 764 | 7559D140499B60913D06C6E6926C17E8D321043AA43741B6EE0EA15C70EC7606A43F164A28922B858941367A7F3F45AD72E6D025067005B8CCAB5DCF5A6A6B0214E94A064DB8978031CCC85173E86BDB41DF5349B6C2213FF0E3F86471E07BBC7D4153CD62D3AE95805D399A |

TABLE 5-continued $N_{FFT} = 2048/, N_{Tx} = 2$, Length = 864

| Index | Midamble Sequence |
|---|---|
| 765 | 24D22AB1DD4AAF4CD4E28023564C04F1A6D8F8A116C212DCA8374326EDC63AE7056F5803D8D2600C253A7FCA63A5A745C7F6ECEC70334894FD1233909AB15B590ECB69242220E90B4D2FB2441DDD7EFB4103D7CEAB629BF721C83E995B1FF2E3EE8D907085A7232EC42BD72C |
| 766 | BE5A1C38596A7FFA9E7C87CE14001428A05D7967AAA1E7764728A3CD1D95D7E5094AE1BCC704E9349095190C0663D6401B3CC0B01928A825919FB4CDC31B904AC6C91AD2E43E50AEF1780C9193D84F06B633910E75FE5FAEB5CCF6B15652D1D8B0589698E3DDCCBC123A6286 |
| 767 | DD95CD83249D2231677812D40488178F1C42293D4881D2B4C595A18A67E0B9A35FFD98DCEB5CBB1884D59456B31A44DE864E25229FF793D64A659CC65ED3E40275C075641195C3DDA120F869B65278F562F92DFA23BB8F31EC20313A038BF946F27BAE0290B608EB41157AEC |

TABLE 6

$N_{FFT} = 512$, $N_{Tx} = 8$, Length = 18, Reuse = 3

| Index | Midamble Sequence |
|---|---|
| 0 | 05390 |
| 1 | 0546C |
| 2 | 05138 |
| 3 | 056C4 |
| 4 | 051D8 |
| 5 | 05624 |
| 6 | 05370 |
| 7 | 0548C |
| 8 | 0328C |
| 9 | 03570 |
| 10 | 049A8 |
| 11 | 04E54 |
| 12 | 031D4 |
| 13 | 03628 |
| 14 | 090B8 |
| 15 | 09744 |
| 16 | 093A0 |
| 17 | 0945C |
| 18 | 04AB0 |
| 19 | 04D4C |
| 20 | 07128 |
| 21 | 076D4 |
| 22 | 07290 |
| 23 | 0756C |
| 24 | 0A930 |
| 25 | 0AECC |
| 26 | 02B38 |
| 27 | 02CC4 |
| 28 | 02B98 |
| 29 | 02C64 |
| 30 | 0A990 |
| 31 | 0AE6C |
| 32 | 04A70 |
| 33 | 04D8C |
| 34 | 01B54 |
| 35 | 01CA8 |
| 36 | 04A8C |
| 37 | 04D70 |
| 38 | 01AA4 |
| 39 | 01D58 |
| 40 | 049C8 |
| 41 | 04E34 |
| 42 | 049D4 |
| 43 | 04E28 |
| 44 | 0A9B0 |
| 45 | 0AE4C |
| 46 | 02B18 |
| 47 | 02CE4 |
| 48 | 05988 |
| 49 | 05E74 |
| 50 | 02B8C |
| 51 | 02C70 |
| 52 | 0A924 |
| 53 | 0AED8 |
| 54 | 05A30 |
| 55 | 05DCC |
| 56 | 0AB6C |
| 57 | 0AC90 |
| 58 | 029C4 |
| 59 | 02E38 |
| 60 | 03394 |
| 61 | 03468 |
| 62 | 032C4 |
| 63 | 03538 |
| 64 | 09950 |
| 65 | 09EAC |
| 66 | 0B994 |
| 67 | 0BE68 |
| 68 | 0A3B0 |
| 69 | 0A44C |
| 70 | 0CA14 |
| 71 | 0CDE8 |
| 72 | 0A1B8 |
| 73 | 0A644 |
| 74 | 0BACC |
| 75 | 0BD30 |
| 76 | 0CAF4 |
| 77 | 0CD08 |
| 78 | 04B88 |
| 79 | 04C74 |
| 80 | 04A38 |
| 81 | 04DC4 |
| 82 | 04AE0 |
| 83 | 04D1C |
| 84 | 048E8 |
| 85 | 04F14 |
| 86 | 0928C |
| 87 | 09570 |
| 88 | 091D4 |
| 89 | 09628 |
| 90 | 01AC4 |
| 91 | 01D38 |
| 92 | 01B94 |
| 93 | 01C68 |
| 94 | 0C854 |
| 95 | 0CFA8 |
| 96 | 02994 |
| 97 | 02E68 |
| 98 | 0A864 |
| 99 | 0AF98 |
| 100 | 050D8 |
| 101 | 05724 |
| 102 | 02ACC |
| 103 | 02D30 |
| 104 | 092E0 |
| 105 | 0951C |

TABLE 6-continued $N_{FFT}$ = 512, $N_{Tx}$ = 8, Length = 18, Reuse = 3

| Index | Midamble Sequence |
|---|---|
| 106 | 05360 |
| 107 | 0549C |
| 108 | 090E8 |
| 109 | 09714 |
| 110 | 0AB3C |
| 111 | 0ACC0 |
| 112 | 0CABC |
| 113 | 0CD40 |
| 114 | 05270 |
| 115 | 0558C |
| 116 | 01A98 |
| 117 | 01D64 |
| 118 | 062A4 |
| 119 | 06558 |
| 120 | 051C8 |
| 121 | 05634 |
| 122 | 01B28 |
| 123 | 01CD4 |
| 124 | 06354 |
| 125 | 064A8 |
| 126 | 0C950 |
| 127 | 0CEAC |
| 128 | 051B0 |
| 129 | 0564C |
| 130 | 03B28 |
| 131 | 03CD4 |
| 132 | 06254 |
| 133 | 065A8 |
| 134 | 06358 |
| 135 | 064A4 |
| 136 | 05318 |
| 137 | 054E4 |
| 138 | 03A98 |
| 139 | 03D64 |
| 140 | 062B4 |
| 141 | 06548 |
| 142 | 060B4 |
| 143 | 06748 |
| 144 | 0625C |
| 145 | 065A0 |
| 146 | 04AC4 |
| 147 | 04D38 |
| 148 | 04B94 |
| 149 | 04C68 |
| 150 | 0519C |
| 151 | 05660 |
| 152 | 0A2CC |
| 153 | 0A530 |
| 154 | 0CBE8 |
| 155 | 0CC14 |
| 156 | 0A194 |
| 157 | 0A668 |
| 158 | 0B064 |
| 159 | 0B798 |
| 160 | 02A70 |
| 161 | 02D8C |
| 162 | 0A8D8 |
| 163 | 0AF24 |
| 164 | 0B33C |
| 165 | 0B4C0 |
| 166 | 0CB40 |
| 167 | 0CCBC |
| 168 | 08AF0 |
| 169 | 08D0C |
| 170 | 05A60 |
| 171 | 05D9C |
| 172 | 050CC |
| 173 | 05730 |
| 174 | 0D188 |
| 175 | 0CAF8 |
| 176 | 0CD04 |
| 177 | 0A11C |
| 178 | 0A6E0 |
| 179 | 05264 |
| 180 | 05598 |
| 181 | 0D320 |
| 182 | 0D4DC |
| 183 | 09960 |
| 184 | 09E9C |
| 185 | 029C8 |
| 186 | 02E34 |
| 187 | 0D230 |
| 188 | 0C858 |
| 189 | 0CFA4 |
| 190 | 058C8 |
| 191 | 05F34 |
| 192 | 05334 |
| 193 | 054C8 |
| 194 | 0B2EC |
| 195 | 0B510 |
| 196 | 0AB60 |
| 197 | 0AC9C |
| 198 | 0B114 |
| 199 | 0B6E8 |
| 200 | 0A0EC |
| 201 | 0A710 |
| 202 | 089E8 |
| 203 | 08E14 |
| 204 | 0714C |
| 205 | 076B0 |
| 206 | 0D098 |
| 207 | 098D0 |
| 208 | 09F2C |
| 209 | 071AC |
| 210 | 07650 |
| 211 | 08970 |
| 212 | 08E8C |
| 213 | 09A84 |
| 214 | 09D78 |
| 215 | 060AC |
| 216 | 06750 |
| 217 | 06B5C |
| 218 | 06CA0 |
| 219 | 089D0 |
| 220 | 08E2C |
| 221 | 0615C |
| 222 | 066A0 |
| 223 | 091D0 |
| 224 | 0962C |
| 225 | 09BD4 |
| 226 | 09C28 |
| 227 | 05B14 |
| 228 | 05CE8 |
| 229 | 030D4 |
| 230 | 03728 |
| 231 | 069A8 |
| 232 | 06E54 |
| 233 | 05AE4 |
| 234 | 05D18 |
| 235 | 031AC |
| 236 | 03650 |
| 237 | 0329C |
| 238 | 03560 |
| 239 | 068A4 |
| 240 | 06F58 |
| 241 | 07194 |
| 242 | 07668 |
| 243 | 0314C |
| 244 | 036B0 |
| 245 | 06AB0 |
| 246 | 06D4C |
| 247 | 0C928 |
| 248 | 0CED4 |
| 249 | 09170 |
| 250 | 0968C |
| 251 | 069D4 |
| 252 | 06E28 |
| 253 | 048D4 |
| 254 | 04F28 |
| 255 | 0CA90 |

TABLE 6-continued $N_{FFT} = 512$, $N_{Tx} = 8$, Length = 18, Reuse = 3

| Index | Midamble Sequence |
|---|---|
| 256 | 0CD6C |
| 257 | 072CC |
| 258 | 07530 |
| 259 | 06A8C |
| 260 | 06D70 |
| 261 | 01AB0 |
| 262 | 01D4C |
| 263 | 07244 |
| 264 | 075B8 |
| 265 | 0CBD0 |
| 266 | 0CC2C |
| 267 | 04A9C |
| 268 | 04D60 |
| 269 | 0C978 |
| 270 | 0CE84 |
| 271 | 019A8 |
| 272 | 01E54 |
| 273 | 03354 |
| 274 | 034A8 |
| 275 | 032A4 |
| 276 | 03558 |
| 277 | 073B4 |
| 278 | 07448 |
| 279 | 0CADC |
| 280 | 0CD20 |
| 281 | 0C894 |
| 282 | 0CF68 |
| 283 | 01A94 |
| 284 | 01D68 |
| 285 | 08BA4 |
| 286 | 08C58 |
| 287 | 07AA4 |
| 288 | 07D58 |
| 289 | 08B44 |
| 290 | 08CB8 |
| 291 | 03B4C |
| 292 | 03CB0 |
| 293 | 01AD4 |
| 294 | 01D28 |
| 295 | 07B54 |
| 296 | 07CA8 |
| 297 | 05BCC |
| 298 | 05C30 |
| 299 | 028E4 |
| 300 | 02F18 |
| 301 | 039A4 |
| 302 | 03E58 |
| 303 | 0A9B4 |
| 304 | 0AE48 |
| 305 | 05984 |
| 306 | 05E78 |
| 307 | 0AA4C |
| 308 | 0ADB0 |
| 309 | 0C350 |
| 310 | 0C4AC |
| 311 | 0C158 |
| 312 | 0C6A4 |
| 313 | 02B1C |
| 314 | 02CE0 |
| 315 | 0B144 |
| 316 | 0B6B8 |
| 317 | 0AB24 |
| 318 | 0ACD8 |
| 319 | 03948 |
| 320 | 03EB4 |
| 321 | 058C4 |
| 322 | 05F38 |
| 323 | 0298C |
| 324 | 02E70 |
| 325 | 09B5C |
| 326 | 09CA0 |
| 327 | 098A4 |
| 328 | 09F58 |
| 329 | 0BBCC |
| 330 | 0BC30 |

TABLE 6-continued $N_{FFT} = 512$, $N_{Tx} = 8$, Length = 18, Reuse = 3

| Index | Midamble Sequence |
|---|---|
| 331 | 0B3AC |
| 332 | 0B450 |
| 333 | 0735C |
| 334 | 074A0 |
| 335 | 05B9C |
| 336 | 05C60 |
| 337 | 0AB64 |
| 338 | 0AC98 |
| 339 | 0B984 |
| 340 | 0BE78 |
| 341 | 03A50 |
| 342 | 03DAC |
| 343 | 029CC |
| 344 | 02E30 |
| 345 | 070A4 |
| 346 | 07758 |
| 347 | 05B98 |
| 348 | 05C64 |
| 349 | 07148 |
| 350 | 076B4 |
| 351 | 05B38 |
| 352 | 05CC4 |
| 353 | 08B60 |
| 354 | 08C9C |
| 355 | 07250 |
| 356 | 075AC |
| 357 | 01ACC |
| 358 | 01D30 |
| 359 | 088D8 |
| 360 | 08F24 |
| 361 | 0CB54 |
| 362 | 0CCA8 |
| 363 | 072D8 |
| 364 | 07524 |
| 365 | 01994 |
| 366 | 01E68 |
| 367 | 0CAA4 |
| 368 | 0CD58 |
| 369 | 049E8 |
| 370 | 04E14 |
| 371 | 07368 |
| 372 | 07494 |
| 373 | 0B1D4 |
| 374 | 0B628 |
| 375 | 0B8C8 |
| 376 | 0BF34 |
| 377 | 0BA60 |
| 378 | 0BD9C |
| 379 | 0A338 |
| 380 | 0A4C4 |
| 381 | 0A264 |
| 382 | 0A598 |
| 383 | 0A9A4 |
| 384 | 0AE58 |
| 385 | 0A398 |
| 386 | 0A464 |
| 387 | 029E4 |
| 388 | 02E18 |
| 389 | 0A334 |
| 390 | 0A4C8 |
| 391 | 05B18 |
| 392 | 05CE4 |
| 393 | 0D3B0 |
| 394 | 0D44C |
| 395 | 0B28C |
| 396 | 0B570 |
| 397 | 0AB4C |
| 398 | 0ACB0 |
| 399 | 06944 |
| 400 | 06EB8 |
| 401 | 04AF0 |
| 402 | 04D0C |
| 403 | 02B0C |
| 404 | 02CF0 |
| 405 | 06A18 |

TABLE 6-continued $N_{FFT} = 512$, $N_{Tx} = 8$, Length = 18, Reuse = 3

| Index | Midamble Sequence |
|---|---|
| 406 | 06DE4 |
| 407 | 05AC4 |
| 408 | 05D38 |
| 409 | 032B0 |
| 410 | 0354C |
| 411 | 05B94 |
| 412 | 05C68 |
| 413 | 06298 |
| 414 | 06564 |
| 415 | 01AE4 |
| 416 | 01D18 |
| 417 | 06BAC |
| 418 | 06C50 |
| 419 | 0D1B8 |
| 420 | 06A70 |
| 421 | 06D8C |
| 422 | 09AA4 |
| 423 | 09D58 |
| 424 | 031A8 |
| 425 | 03654 |
| 426 | 07358 |
| 427 | 074A4 |
| 428 | 05B8C |
| 429 | 05C70 |
| 430 | 09B54 |
| 431 | 09CA8 |
| 432 | 06B08 |
| 433 | 06CF4 |
| 434 | 01B14 |
| 435 | 01CE8 |
| 436 | 08BD0 |
| 437 | 08C2C |
| 438 | 0D118 |
| 439 | 0D310 |
| 440 | 0D4EC |
| 441 | 06328 |
| 442 | 064D4 |
| 443 | 069C8 |
| 444 | 06E34 |
| 445 | 08978 |
| 446 | 08E84 |
| 447 | 0D370 |
| 448 | 0D48C |
| 449 | 059C4 |
| 450 | 05E38 |
| 451 | 06158 |
| 452 | 066A4 |
| 453 | 06350 |
| 454 | 064AC |
| 455 | 09AE4 |
| 456 | 09D18 |
| 457 | 09B14 |
| 458 | 09CE8 |
| 459 | 0D390 |
| 460 | 0D46C |
| 461 | 0D1D8 |
| 462 | 0D138 |
| 463 | 071B4 |
| 464 | 07648 |
| 465 | 0B388 |
| 466 | 0B474 |
| 467 | 0923C |
| 468 | 095C0 |
| 469 | 0B230 |
| 470 | 0B5CC |
| 471 | 0A06C |
| 472 | 0A790 |
| 473 | 01A64 |
| 474 | 01D98 |
| 475 | 0A13C |
| 476 | 0A6C0 |
| 477 | 0B238 |
| 478 | 0B5C4 |
| 479 | 08A5C |
| 480 | 08DA0 |
| 481 | 09074 |
| 482 | 09788 |
| 483 | 07948 |
| 484 | 07EB4 |
| 485 | 07A50 |
| 486 | 07DAC |
| 487 | 0B188 |
| 488 | 0B674 |
| 489 | 032CC |
| 490 | 03530 |
| 491 | 01B34 |
| 492 | 01CC8 |
| 493 | 0A0D8 |
| 494 | 0A724 |
| 495 | 0724C |
| 496 | 075B0 |
| 497 | 0A360 |
| 498 | 0A49C |
| 499 | 088B4 |
| 500 | 08F48 |
| 501 | 0B3B8 |
| 502 | 0B444 |
| 503 | 0A09C |
| 504 | 0A760 |
| 505 | 03298 |
| 506 | 03564 |
| 507 | 062B0 |
| 508 | 0654C |
| 509 | 0D224 |
| 510 | 0C9A8 |
| 511 | 0CE54 |

TABLE 7

$N_{FFT} = 512/1024$, $N_{Tx} = 4/8$, Length = 36, Reuse = 3

| Index | Midamble Sequence |
|---|---|
| 0 | A51E3FCCC |
| 1 | 5AE1FFCCC |
| 2 | F04B6A999 |
| 3 | FF3329478 |
| 4 | FF528F0CC |
| 5 | 55F81A599 |
| 6 | AA07DA599 |
| 7 | C3CCC02B5 |
| 8 | 77C3B75A4 |
| 9 | DD69220F1 |
| 10 | FC186A534 |
| 11 | 03E7AA534 |
| 12 | A94D3F061 |
| 13 | 30FE596AC |
| 14 | 9A54CC3F9 |
| 15 | 885D9E169 |
| 16 | 5A61E6600 |
| 17 | 87A588BDD |
| 18 | 785A5DE89 |
| 19 | DD089E169 |
| 20 | 77A20B43C |
| 21 | 22F70B43C |
| 22 | 2D0F1DE88 |
| 23 | D2F0DDE88 |
| 24 | 87259DE88 |
| 25 | D270C8BDD |
| 26 | 0F550CD2C |
| 27 | CF60268D5 |
| 28 | 562CB3F80 |
| 29 | FF3330EB4 |
| 30 | 00CCF0EB4 |
| 31 | 3C52FFCCC |
| 32 | C3AD3FCCC |

TABLE 7-continued $N_{FFT} = 512/1024$, $N_{Tx} = 4/8$, Length = 36, Reuse = 3

| Index | Midamble Sequence |
|---|---|
| 33 | F02ADA599 |
| 34 | 443BF87A5 |
| 35 | 997F96879 |
| 36 | 1E16AEF10 |
| 37 | A57F8F0CC |
| 38 | 6661FFCB4 |
| 39 | ED092E171 |
| 40 | B85C7B424 |
| 41 | 47A3BB424 |
| 42 | FF5299879 |
| 43 | 55F80CD2C |
| 44 | 96F82A999 |
| 45 | AA6665BE0 |
| 46 | 3C52BFCCC |
| 47 | FF3330EB5 |
| 48 | DE6F22CE9 |
| 49 | 5A61FFCCC |
| 50 | A59E3FCCC |
| 51 | FF3329678 |
| 52 | F0CB6A999 |
| 53 | 99FF8F0B5 |
| 54 | 77DA3743C |
| 55 | 959F96618 |
| 56 | 9961C02B4 |
| 57 | DD0F1DF68 |
| 58 | C3D2800CD |
| 59 | DD70A2169 |
| 60 | 5A7FB0CCD |
| 61 | 5A61E6601 |
| 62 | 697815598 |
| 63 | 9687D5598 |
| 64 | 4B224463D |
| 65 | F05525998 |
| 66 | E188D1368 |
| 67 | F04B73354 |
| 68 | 118F52C89 |
| 69 | EE7092C89 |
| 70 | 96663C154 |
| 71 | A57F99878 |
| 72 | FA2872739 |
| 73 | 9CD0542D8 |
| 74 | 0AFD0E66D |
| 75 | 9C9B2BDF4 |
| 76 | 6364EBDF4 |
| 77 | BB25C79DC |
| 78 | 367AC178D |
| 79 | C9850178D |
| 80 | C66482BF4 |
| 81 | C9CE7E8A1 |
| 82 | A0579B338 |
| 83 | 997F8F0B5 |
| 84 | F6848EA75 |
| 85 | EE7091369 |
| 86 | 3A9D425ED |
| 87 | 9037D70B8 |
| 88 | 3949BD740 |
| 89 | 93E328215 |
| 90 | F5D031AD9 |
| 91 | 5F7AA4F8C |
| 92 | A08564F8C |
| 93 | 723E9069C |
| 94 | 8DC15069C |
| 95 | FF2D26479 |
| 96 | FC2B26861 |
| 97 | CF4D2A5F9 |
| 98 | D894053C9 |
| 99 | FA853258C |
| 100 | 057AF258C |
| 101 | E16EFB9A4 |
| 102 | FF4C8F0B5 |
| 103 | A97E73D34 |
| 104 | 5681B3D34 |
| 105 | FF3329479 |
| 106 | 63C9ABF41 |
| 107 | 367A8178C |
| 108 | C9854178C |
| 109 | EE0F2ED69 |
| 110 | 39854166C |
| 111 | 697815798 |
| 112 | C9633EA14 |
| 113 | C3D2802CD |
| 114 | AFD0670D9 |
| 115 | F04B2A999 |
| 116 | 932FD4339 |
| 117 | CC4B2A9E1 |
| 118 | 873BC89A5 |
| 119 | 9CD0142D9 |
| 120 | A51E7FCCC |
| 121 | 5AE1BFCCC |
| 122 | E1693BA44 |
| 123 | 87C4375A4 |
| 124 | 783BF75A4 |
| 125 | C0679AB34 |
| 126 | D291620F1 |
| 127 | C9A841738 |
| 128 | C664829F5 |
| 129 | BBC46D0F1 |
| 130 | 4BC3AEF11 |
| 131 | 2296E1F10 |
| 132 | 843DDD0E8 |
| 133 | 959F8C334 |
| 134 | 883C74A45 |
| 135 | AF64A73F4 |
| 136 | F6D1BD8B8 |
| 137 | F62E024B9 |
| 138 | 90D1E40B9 |
| 139 | 667FB0EB4 |
| 140 | 998070EB4 |
| 141 | 3A7B715EC |
| 142 | EE112D0F1 |
| 143 | B43C7B844 |
| 144 | 3C4CE9601 |
| 145 | C97D31A14 |
| 146 | A0D7DB338 |
| 147 | C584E40B9 |
| 148 | 56D300E19 |
| 149 | FA1B7D58C |
| 150 | FC7995B4C |
| 151 | A50066678 |
| 152 | BB44785A4 |
| 153 | C57B1BCB9 |
| 154 | 96F873354 |
| 155 | EE91385A4 |
| 156 | 116EF85A4 |
| 157 | 5C7B28DED |
| 158 | 902E5BCB8 |
| 159 | 823EDC8E4 |
| 160 | A981CC334 |
| 161 | 743A1EF08 |
| 162 | 654AB3D81 |
| 163 | A9533F218 |
| 164 | FC066A74D |
| 165 | 3C52E6601 |
| 166 | CCD525BE1 |
| 167 | 0A7D4E66D |
| 168 | B13EEF8E4 |
| 169 | AF4E280D9 |
| 170 | CF32D59F8 |
| 171 | CF32959F9 |
| 172 | A0366BD38 |
| 173 | DEC5B4708 |
| 174 | 1.49E+56 |
| 175 | F929FE758 |
| 176 | 4E275077D |
| 177 | F32C959F9 |
| 178 | 659840CAD |
| 179 | F04B33355 |
| 180 | BE209389D |
| 181 | 3F4ABCF4C |
| 182 | 0379EA54C |

TABLE 7-continued $N_{FFT} = 512/1024$, $N_{Tx} = 4/8$, Length = 36, Reuse = 3

| Index | Midamble Sequence |
|---|---|
| 183 | 601AD4E0D |
| 184 | 1EF712E89 |
| 185 | 6F2E715EC |
| 186 | 93506BD38 |
| 187 | 9C50542D9 |
| 188 | 95E029A19 |
| 189 | 998029479 |
| 190 | BE3913B04 |
| 191 | 968795799 |
| 192 | 96E66A9E0 |
| 193 | 9A67959F9 |
| 194 | F3D3302D5 |
| 195 | A679959F9 |
| 196 | A98196619 |
| 197 | 567E56619 |
| 198 | 0CD340CAD |
| 199 | AC7CAB20D |
| 200 | DE45F4709 |
| 201 | 0F4B55799 |
| 202 | F0B495799 |
| 203 | A9818C335 |
| 204 | B45D87BDC |
| 205 | 00D2B0ECC |
| 206 | FF2D70ECC |
| 207 | CA1AC1A0D |
| 208 | DE6F22EE9 |
| 209 | AF64A71F5 |
| 210 | BB3C045A5 |
| 211 | 44C3C45A5 |
| 212 | FCD48334D |
| 213 | 93CE282A1 |
| 214 | 60B054F58 |
| 215 | 9F4F94F58 |
| 216 | F62E0EB20 |
| 217 | 537C94E0D |
| 218 | 5979A5780 |
| 219 | F9D601B58 |
| 220 | EE6907845 |
| 221 | C61B7D5F4 |
| 222 | 39C9BD741 |
| 223 | 567E16618 |
| 224 | A981D6618 |
| 225 | AFE4A71F4 |
| 226 | 39D07D4D9 |
| 227 | C62FBD4D9 |
| 228 | 5031E4F41 |
| 229 | 335503F2D |
| 230 | FCD30C2D5 |
| 231 | DD44348F1 |
| 232 | 55E643D2D |
| 233 | F5D0718D9 |
| 234 | 9CA8682D8 |
| 235 | AA7825B99 |
| 236 | 6C7A97F8C |
| 237 | 938557F8C |
| 238 | B470D11DC |
| 239 | C9CE3EAA1 |
| 240 | C3B33FCB5 |
| 241 | 3C4CFFCB5 |
| 242 | C6D002AD9 |
| 243 | 87DA22289 |
| 244 | 335503D2D |
| 245 | 0F551A599 |
| 246 | C69B3D5F4 |
| 247 | 3964FD5F4 |
| 248 | C03573D34 |
| 249 | 3FCAB3D34 |
| 250 | E191445A5 |
| 251 | 1E6E845A5 |
| 252 | 65E02A619 |
| 253 | 9A1FEA619 |
| 254 | F33500D35 |
| 255 | 0CCAC0D35 |
| 256 | F96501995 |
| 257 | 9F6518195 |
| 258 | 775A7743C |
| 259 | DD0F1DD69 |
| 260 | C537FD8B8 |
| 261 | 0F4B15799 |
| 262 | F0B4D5799 |
| 263 | 88DA1E289 |
| 264 | F564F19F4 |
| 265 | FC2B3CD4D |
| 266 | 03D4FCD4D |
| 267 | 0AC98E741 |
| 268 | CCD5659E1 |
| 269 | 7D3EAC69C |
| 270 | 2D6EA1D11 |
| 271 | FCAB33D34 |
| 272 | 0354F3D34 |
| 273 | 397AB25F5 |
| 274 | CCCB3C154 |
| 275 | D714391C9 |
| 276 | A679D59F8 |
| 277 | CF4D300D5 |
| 278 | 967873355 |
| 279 | D28F375DC |
| 280 | 447712E3C |
| 281 | FAA872738 |
| 282 | A5E1802CC |
| 283 | 567999780 |
| 284 | FC54CC335 |
| 285 | FC6795B34 |
| 286 | 886EDE1A4 |
| 287 | D2F75E288 |
| 288 | EE69510F0 |
| 289 | BBC3FB9A5 |
| 290 | 2DF761E88 |
| 291 | D208A1E88 |
| 292 | 785DCB7DD |
| 293 | 87A20B7DD |
| 294 | 1EEE92D10 |
| 295 | 932857F39 |
| 296 | C9050178C |
| 297 | DDF0E2169 |
| 298 | A0631B214 |
| 299 | 937AE818C |
| 300 | C92801738 |
| 301 | C92841538 |
| 302 | B4C4110F0 |
| 303 | 44C392D10 |
| 304 | 8B10A125C |
| 305 | 213A34509 |
| 306 | D142484E8 |
| 307 | BB3BC79A4 |
| 308 | FA1B71814 |
| 309 | 3602FD78D |
| 310 | 0A1CB27F4 |
| 311 | A37B5BE75 |
| 312 | 5C849BE75 |
| 313 | 6F9D68DED |
| 314 | A686300D4 |
| 315 | C03529A18 |
| 316 | A9818C134 |
| 317 | 6A9FBCF4D |
| 318 | 95607CF4D |
| 319 | 651840CAC |
| 320 | 0C2CA5581 |
| 321 | 8B90A105C |
| 322 | 213A34708 |
| 323 | D1C2084E8 |
| 324 | 148A06DC8 |
| 325 | E48DC5228 |
| 326 | EB75C6DC8 |
| 327 | 659800CAC |
| 328 | CFB2D59F9 |
| 329 | CF9F95B4D |
| 330 | A6AB70061 |
| 331 | 6.54E+23 |
| 332 | 9ACAC0E18 |

TABLE 7-continued $N_{FFT} = 512/1024$, $N_{Tx} = 4/8$, Length = 36, Reuse = 3

| Index | Midamble Sequence |
|---|---|
| 333 | 954D3CFF8 |
| 334 | F3FE25534 |
| 335 | 0C01E5534 |
| 336 | 955330218 |
| 337 | 3F79E554C |
| 338 | 9AAB73FF8 |
| 339 | C0066574D |
| 340 | 998030CB4 |
| 341 | 998029478 |
| 342 | 99FF8F0B4 |
| 343 | 667FF0CB4 |
| 344 | 3CD2E6600 |
| 345 | B12720905 |
| 346 | 82416C49C |
| 347 | A50070CCC |
| 348 | 991E3FCB5 |
| 349 | 2D70B77DC |
| 350 | 882261F69 |
| 351 | 936328214 |
| 352 | 0A504E4D8 |
| 353 | A08524D8C |
| 354 | 6364ABFF4 |
| 355 | 9350670A0 |
| 356 | C605325F5 |
| 357 | 934E280A1 |
| 358 | A02864D38 |
| 359 | 3964BD7F4 |
| 360 | A5E1C02CC |
| 361 | 99FF8F2B5 |
| 362 | 876922045 |
| 363 | 1EDA44489 |
| 364 | EEDD87B69 |
| 365 | E12584489 |
| 366 | 881161DA4 |
| 367 | 0A504E6D9 |
| 368 | 5F7AE4D8C |
| 369 | 9C9B6BFF4 |
| 370 | A97E69818 |
| 371 | 956026861 |
| 372 | A6062A5F9 |
| 373 | 6567E5580 |
| 374 | 874434845 |
| 375 | E1F76D288 |
| 376 | 8843889A5 |
| 377 | E10892E88 |
| 378 | 4B5DF87DD |
| 379 | B4A2387DD |
| 380 | 883C375A5 |
| 381 | 445A0463C |
| 382 | 06567E759 |
| 383 | AC8314C0C |
| 384 | 032B16419 |
| 385 | FCD4D6419 |
| 386 | 590640CAC |
| 387 | CFCD700D5 |
| 388 | FCD4C334C |
| 389 | 956026A60 |
| 390 | C03573F35 |
| 391 | 3FCAB3F35 |
| 392 | 0CD300CAC |
| 393 | 65E7A5580 |
| 394 | 4425B87DC |
| 395 | E1F72EF69 |
| 396 | 6661A9401 |
| 397 | 36FAC178C |
| 398 | A66055860 |
| 399 | 5667D6580 |
| 400 | A02864F39 |
| 401 | C0CA8314C |
| 402 | A9FE66861 |
| 403 | 6A6016419 |
| 404 | 9A186A7F9 |
| 405 | 304D40CAC |
| 406 | 954D30061 |
| 407 | A92C80E18 |
| 408 | A6AB7CFF8 |
| 409 | C01865534 |
| 410 | 3FE7A5534 |
| 411 | FF4CCF0B4 |
| 412 | 99FF96878 |
| 413 | 8BBA61109 |
| 414 | 2110F445C |
| 415 | 844262EE9 |
| 416 | DEEF3445C |
| 417 | F52FCE6D9 |
| 418 | 875DF4BDD |
| 419 | B44407845 |
| 420 | C982C2B8C |
| 421 | CF4ABF34C |
| 422 | F6E2BD874 |
| 423 | 0354FCF4D |
| 424 | FCAB3CF4D |
| 425 | FF4CD6878 |
| 426 | A9FE69A18 |
| 427 | D70DF6229 |
| 428 | 6357E4F41 |
| 429 | 9518567F9 |
| 430 | F354F0134 |
| 431 | 8DA0E0A9C |
| 432 | CA3041B58 |
| 433 | 2DF73763D |
| 434 | 1B0DB5E50 |
| 435 | 22708B7DC |
| 436 | DD8F4B7DC |
| 437 | 7DA76377C |
| 438 | C0B566861 |
| 439 | 632857ED9 |
| 440 | 9CD797ED9 |
| 441 | A6F9D59F9 |
| 442 | 00CCB0CB4 |
| 443 | A6862A7F9 |
| 444 | AA66259E1 |
| 445 | D7F249C29 |
| 446 | 63D02BED9 |
| 447 | 9C2FEBED9 |
| 448 | 96786A998 |
| 449 | C32D3FCCD |
| 450 | F61D02475 |
| 451 | C97ABEB8C |
| 452 | 55E643D2C |
| 453 | AFD0272D9 |
| 454 | A036670A1 |
| 455 | A07A9B38C |
| 456 | FCAB69A18 |
| 457 | 95E033D34 |
| 458 | 6A1FF3D34 |
| 459 | FF4CD6879 |
| 460 | 304A80F4C |
| 461 | CFB540F4C |
| 462 | 0564BD78C |
| 463 | 9F6514E0D |
| 464 | 504998F40 |
| 465 | 96282475 |
| 466 | AF9B58FF4 |
| 467 | 506498FF4 |
| 468 | 9AE015A19 |
| 469 | 7220DF69D |
| 470 | 8DDF1F69D |
| 471 | C9E33EA15 |
| 472 | 9AB57F019 |
| 473 | 5A61BFCCD |
| 474 | A59E7FCCD |
| 475 | F51CCD9F4 |
| 476 | 6349ABF40 |
| 477 | 0C5340CAC |
| 478 | 281446FC9 |
| 479 | D7EB86FC9 |
| 480 | 354FCD4C0 |
| 481 | 82BED3A9C |
| 482 | F3D36A7F8 |

TABLE 7-continued $N_{FFT} = 512/1024$, $N_{Tx} = 4/8$, Length = 36, Reuse = 3

| Index | Midamble Sequence |
|---|---|
| 483 | F0CB2A998 |
| 484 | FC4D032D4 |
| 485 | 5601FCF4D |
| 486 | A9FE3CF4D |
| 487 | FF4CD6A79 |
| 488 | 270A75FC9 |
| 489 | D8F5B5FC9 |
| 490 | C04ACC134 |
| 491 | 534FD4CC0 |
| 492 | 9062E4074 |
| 493 | FACE0DAA1 |
| 494 | 875DA2368 |
| 495 | C67A8DBF4 |
| 496 | D88A4A3C8 |
| 497 | 30B2E5780 |
| 498 | 057AB278C |
| 499 | FA857278C |
| 500 | DE108BA5C |
| 501 | F564B1BF4 |
| 502 | 9A18702D5 |
| 503 | A9018334C |
| 504 | C97D3D58C |
| 505 | F90332B94 |
| 506 | 9FB06B159 |
| 507 | A34857120 |
| 508 | 55E643F2C |
| 509 | C5484EB21 |
| 510 | 8B45DEF09 |
| 511 | BB5A787DD |

TABLE 8

| Index | MidambleSequence |
|---|---|
| 0 | AA4B3C198662D4F001 |
| 1 | F019AA8D3C380266B5 |
| 2 | 992D0F1FFAA3483D98 |
| 3 | A5333FE7869D54CFE0 |
| 4 | 9952B0DFFAACB3C398 |
| 5 | CC079A5550061A96CC |
| 6 | 5A4CC018769550CFE1 |
| 7 | EE5A088F11EA274911 |
| 8 | B408DE1BABB0F1DDA5 |
| 9 | DD3C3B897D2BBB8689 |
| 10 | E1220B51111DA376F1 |
| 11 | DD4384696D24447A89 |
| 12 | 8816AEE3C786ED2FDD |
| 13 | 1E5DB4AEF115A774F1 |
| 14 | EEE907A45443C6D311 |
| 15 | B43B9110FE111445A5 |
| 16 | DD0F34A2388A5A1E88 |
| 17 | E111045A44B446EEF0 |
| 18 | DD70CB622885A1E088 |
| 19 | 8825E1E892270CB7DC |
| 20 | 1E6EBB85A4B446EEF0 |
| 21 | AA4B3C19866AD0F200 |
| 22 | F019AAAD2C380666B4 |
| 23 | 992D0F1FFAA3483F98 |
| 24 | A5333FE7869D54CFE1 |
| 25 | 9952B0FFFAACB3C398 |
| 26 | CC079A5550061E96CD |
| 27 | 5A4CC018769D54CFE0 |
| 28 | F929B2AC006D6328C0 |
| 29 | A37B6438BA3FB1BE75 |
| 30 | CA4F818A7CA4FFE758 |
| 31 | F651B152109AE71521 |
| 32 | CA303E4A7CAB001959 |
| 33 | 9F6514C0D601AD4C0D |
| 34 | 092E0E8DE09AE31521 |
| 35 | DD69622F12D115E110 |
| 36 | 87BBF4BBA883C377A4 |
| 37 | EE0F11096E18892E88 |

TABLE 8-continued

| Index | MidambleSequence |
|---|---|
| 38 | D21121D1022E91DCF1 |
| 39 | EE70EEE96E1776D289 |
| 40 | BBA5C443C4BDDF85DD |
| 41 | 2D6E9E0EF22695DCF0 |
| 42 | AA7825998669E16A00 |
| 43 | F02AB30D2C3333FCB5 |
| 44 | 991E169FFAA079A798 |
| 45 | A5002647969E6555E1 |
| 46 | 9961E97FFAA7865998 |
| 47 | CC3483D5400D2B0ECC |
| 48 | 5A7F99B8669E6557E0 |
| 49 | EE0F11097E188892C89 |
| 50 | D21161D1022691DCF1 |
| 51 | EE70EEE97E1F76D089 |
| 52 | BBA5C463D4BDDF85DC |
| 53 | 2D6E9E2EE22E91DCF0 |
| 54 | AA4B331E15AB30F201 |
| 55 | F019A5AAAFF9E664B5 |
| 56 | 992D4018696AA83D98 |
| 57 | A53330E0055CB0CDE0 |
| 58 | 9952BFD8796553C398 |
| 59 | CC079552C3CFFA94CD |
| 60 | 5A4C8F1FF55CB0CFE1 |
| 61 | E15A3B8882D3C08B10 |
| 62 | BB08ED1C2889161FA4 |
| 63 | D23C088EEE125C4488 |
| 64 | EE223856922C44B4F1 |
| 65 | D243B76EFE1DA3BA88 |
| 66 | 87169DC444B70EEFDC |
| 67 | 115D8789722C40B4F1 |
| 68 | EB0A391C9276C0A250 |
| 69 | B158AFA8282C1236E4 |
| 70 | D86C0A1AFEBF586FC9 |
| 71 | E4723AE28281409DB1 |
| 72 | D813B5DAFEB0A791C8 |
| 73 | 8D469F5054120EC49D |
| 74 | 1B0DC51D7289449FB0 |
| 75 | F066259545A334F200 |
| 76 | AA34B301EFF1E666B4 |
| 77 | C30056933962A83F99 |
| 78 | FF1E664B455CB0CDE0 |
| 79 | C37FE953296553C398 |
| 80 | 962A83D983CFFA94CD |
| 81 | 00619994B554B4CDE0 |
| 82 | FA4E4D8A10A3631940 |
| 83 | A01C9B3EBAF1B58DF5 |
| 84 | C9283E8C7C6AFBD6D8 |
| 85 | F5360E74154E724A1 |
| 86 | C957814C7C65002AD8 |
| 87 | 9C02ABE6C6C7A97F8D |
| 88 | 0AC9B18BE05CE326A1 |
| 89 | FC4D15A600CB569B80 |
| 90 | A61F8312BA99840F35 |
| 91 | CF2B26807C0ACA5618 |
| 92 | F33556581034D6A661 |
| 93 | CF5499606C0535AA19 |
| 94 | 9A01B3CAD6A798FF4C |
| 95 | 0C4AA987F034D6A460 |
| 96 | E46BB92511B1479051 |
| 97 | BEB92F91ABE39504E4 |
| 98 | D70D8A237D70DF5DC9 |
| 99 | EB93BAFB1146C7AFB1 |
| 100 | D77235E36D7720A1C9 |
| 101 | 82275F49C7DD89F49C |
| 102 | 146C0504F146C3AFB0 |
| 103 | D86C35C51276C0A250 |
| 104 | 823EE371B8241236E4 |
| 105 | EB0A06C37EBF586FC9 |
| 106 | D714363B1281449DB1 |
| 107 | EB75F9237EB0A791C8 |
| 108 | BE209389C41A0AC49D |
| 109 | 286B89C4F281409DB1 |
| 110 | EB6C451B11B1439251 |
| 111 | B13E938FBBEB9104E5 |
| 112 | D80A361D7D70DF5FC9 |
| 113 | E41446C50146C7AFB1 |
| 114 | D87589FD6D7720A3C9 |
| 115 | 8D20A357D7DD8DF49D |

TABLE 8-continued

| Index | MidambleSequence |
|---|---|
| 116 | 1BEBB93AF146C7AFB1 |
| 117 | EE5A07889223C34B10 |
| 118 | B408911C287115DDA4 |
| 119 | DD3C348EFEE25B8688 |
| 120 | E122045682DC4374F1 |
| 121 | DDC38B4EFEE5A07889 |
| 122 | 8816A1C4444F092DDD |
| 123 | 1E5DBB8972DC4774F1 |
| 124 | D86BB6051271436250 |
| 125 | 82392091A82B91F4E5 |
| 126 | EB0D85236EB0DFAFC9 |
| 127 | D713B5DB128EC75DB1 |
| 128 | EB723AE36EB72051C9 |
| 129 | BE275049C41D89049C |
| 130 | 286C0A04F286C35FB0 |
| 131 | FC06268D556534C180 |
| 132 | A654B039EF3FE65535 |
| 133 | CF60158B39A4AC0E18 |
| 134 | F37E65734592B4FE61 |
| 135 | CF1FAA4B39A357F018 |
| 136 | 9A4A80C18301FAA74C |
| 137 | 0C019AACA59AB4FC61 |
| 138 | EE0F2D28822691E311 |
| 139 | B45DBB9C287C4775A5 |
| 140 | DD695E0EEEE70D2E89 |
| 141 | E1772ED682D111DEF0 |
| 142 | DD16A1CEFEE0F6D088 |
| 143 | 88438B4454425F85DC |
| 144 | 1E08912972D115DCF1 |
| 145 | F550318D839B602941 |
| 146 | AF02E71929C9B2BDF4 |
| 147 | C63602ABFF52FCE4D9 |
| 148 | FA2832738364E014A1 |
| 149 | C649BD6BEF55031AD8 |
| 150 | 931C97C155FFAA4D8D |
| 151 | 05578D8C6364E416A0 |
| 152 | A9F9E6B80560626B80 |
| 153 | F32B302CAF32B0FD35 |
| 154 | 9A1F95BE69A1FAA419 |
| 155 | A601A546159FE65461 |
| 156 | 9A602A5E79A6055A18 |
| 157 | CF3500F4C304A80D4D |
| 158 | 597E1AB9E597E25461 |
| 159 | ED23B8890125C38A90 |
| 160 | B7712E1DAB77151E24 |
| 161 | DEC58B8F6DE45F4509 |
| 162 | E25BBB5711DA47B571 |
| 163 | DE3A346F7DEBA0BB08 |
| 164 | 8B6F1EE5D7410DEC5D |
| 165 | 1D240488E1DA47B571 |
| 166 | ED5C049701D2478A90 |
| 167 | B70E9203AB80951C25 |
| 168 | DE3A37B17D13DF4508 |
| 169 | E2240769012DC3B570 |
| 170 | DEC5C8517D1420B908 |
| 171 | 8B10E2DBC7B68DEE5D |
| 172 | 1D5BF896E125C7B771 |
| 173 | EEE9112F11E916D310 |
| 174 | B43B879BBBBBC047A5 |
| 175 | DD0F22097D288A1E89 |
| 176 | E11112D1011E92ECF1 |
| 177 | DD70DDE97D2775E088 |
| 178 | 8825B763C78DD8B5DC |
| 179 | 1E6EED0EE11E96EEF0 |
| 180 | F563682D939055B140 |
| 181 | AF31FEB939C28327F4 |
| 182 | C6051B0BFF59C97CD9 |
| 183 | FA1B2BD3936FD18EA1 |
| 184 | C6FAA4EBFF563682D9 |
| 185 | 932F8E4155FC9FD58D |
| 186 | 0564940C636DF18EA1 |
| 187 | F353700D459061A981 |
| 188 | A901A6B9FFC2B73D35 |
| 189 | C035030B2959F96619 |
| 190 | FC2B33F34567E19461 |
| 191 | C04ABCCB3956029819 |
| 192 | 951F964193F4AFCD4D |
| 193 | 03548C2CA567E19460 |
| 194 | E177748444B225E111 |
| 195 | BB25A210FEE8F377A5 |
| 196 | D21107822873BD2C88 |
| 197 | EE0F775A5445A1DCF0 |
| 198 | D26EB862287442D089 |
| 199 | 873B92E882D6EB85DD |
| 200 | 117088A5A445A1DCF1 |
| 201 | B43B9110FE191047A5 |
| 202 | DD0F74A2388A5E1C89 |
| 203 | E111445A44BC46ECF0 |
| 204 | DD70CB622885A5E289 |
| 205 | 88A5A1C8822708B7DC |
| 206 | 1E6EBB85B4B446EEF0 |
| 207 | BB5A222F04B225E111 |
| 208 | E188F4BBBEE0F777A5 |
| 209 | 883C11096873BD2C88 |
| 210 | B42221D1144DA5DCF1 |
| 211 | 8843AEC9787442D288 |
| 212 | DD168443D2D6EF85DC |
| 213 | 4B5D9E2EF445A5DCF1 |
| 214 | F9032B1583565182C0 |
| 215 | A351BD813904871474 |
| 216 | CA651813FF97CD4D59 |
| 217 | F67B28EB83A1D1BD21 |
| 218 | CA1AE7F3EF9032B158 |
| 219 | 9F4FCD79453A9FE60D |
| 220 | 0904971463A1D5BD20 |
| 221 | AA4B3C398662D0F001 |
| 222 | F019AAAD3C300266B4 |
| 223 | 992D0F1FFAAB483F99 |
| 224 | A5337FC7869554CFE1 |
| 225 | 9952F0DFFAA4B3C198 |
| 226 | CC079A55500E1A96CD |
| 227 | 5A4CC038669550CDE0 |
| 228 | C957B194036A831941 |
| 229 | 93056700A930558FF5 |
| 230 | FA3182B26FA31BD4D9 |
| 231 | C62FB26A13950726A1 |
| 232 | FA4E3D527FA4E428D8 |
| 233 | AF1B57F8C506497D8C |
| 234 | 39500D95F3950326A0 |
| 235 | C957F194036A831940 |
| 236 | 93852700A930558DF5 |
| 237 | FAB182927FAB18BD4D8 |
| 238 | C62FF24A03950324A1 |
| 239 | FA4E7D526FACE028D8 |
| 240 | AF9B17D8C5064D7D8C |
| 241 | 39500D95F3950724A0 |
| 242 | ED23B8890125C38A91 |
| 243 | B7716E1DAB77111C25 |
| 244 | DEC58B8F7DEC5F4708 |
| 245 | E25BDB5701DA43B570 |
| 246 | DEBA346F6DEBA0B908 |
| 247 | 8BEF1EC5C7410DEC5C |
| 248 | 1D240488F1D247B570 |
| 249 | A953F01865350C380 |
| 250 | F301A9952C09825535 |
| 251 | 9A350C07FA9AC80E19 |
| 252 | A62B3CFF96ACD0FE60 |
| 253 | 9A4AB3C7FA9D33F019 |
| 254 | CF1F994D50379AA74C |
| 255 | 5954830066A4D4FC60 |
| 256 | EB0A791C827EC4A250 |
| 257 | B158AFA8282C1636E4 |
| 258 | D86C0A3AEEB75C6FC9 |
| 259 | E4723AE282814009FB1 |
| 260 | D813B5DAFEB8A393C8 |
| 261 | 8D469F7054120EC49D |
| 262 | 1B0DC53D6281409DB1 |
| 263 | EB8A393C827EC4A250 |
| 264 | B158AFA838241634E4 |
| 265 | D86C4A1AEEBF5C6FC8 |
| 266 | E4723AE29281449DB1 |
| 267 | D813F5FAFEB8A393C8 |
| 268 | 8D46DF5044120AC49D |
| 269 | 1B0DC53D7281409FB0 |
| 270 | E1772D0892D911E311 |
| 271 | BB25BBBC288BC775A4 |

TABLE 8-continued

| Index | MidambleSequence |
|---|---|
| 272 | D2111E0EEE108D2E88 |
| 273 | EE0F2ED6922695DCF0 |
| 274 | D26EE1CEEE1772D089 |
| 275 | 873B8B4444BDDF87DC |
| 276 | 11709109622695DCF1 |
| 277 | AA7825B99661E56801 |
| 278 | F02AB30D2C3333FEB4 |
| 279 | 991E169FFAA879A798 |
| 280 | A5002667869E6555E0 |
| 281 | 9961F97FFAAF865B98 |
| 282 | CC3483D550052B0ECC |
| 283 | 5A7FD998669E6155E0 |
| 284 | ED5C049701DA438891 |
| 285 | B70E9203AB80951E24 |
| 286 | DE3A77B17D13DF4508 |
| 287 | E2244769112DC3B570 |
| 288 | DEC5C8517D1420BB09 |
| 289 | 1D5BF896F125C3B570 |
| 290 | EB6C06E5114EC39250 |
| 291 | B13E9051AB141106E4 |
| 292 | D80A35C37D875F5DC9 |
| 293 | E414051B01B147AFB0 |
| 294 | D875CA037D80A0A3C9 |
| 295 | 8D20A089C72A09F49D |
| 296 | 1BEBBAC4E1B943AFB0 |
| 297 | FA28318D8364E42B40 |
| 298 | A07AE739393632BFF4 |
| 299 | C94E02ABEFA57CE6D9 |
| 300 | F550725383936014A1 |
| 301 | C931BD4BEFAA8318D9 |
| 302 | 9C6497E155002E4D8D |
| 303 | 0A2F8D8C73936016A0 |
| 304 | C97AA7340368567340 |
| 305 | 93283180B93284E7F4 |
| 306 | FA1CD4327FA9CABCD8 |
| 307 | C602A4CA0397D64EA0 |
| 308 | FA636BF26FA63140D8 |
| 309 | AF360178C50498158D |
| 310 | 397D1B15F397D64CA0 |
| 311 | CC4B2A9E03CB316A00 |
| 312 | 9619BC0AA991E7FCB5 |
| 313 | FF2D19B86F0AA9A598 |
| 314 | C3332940133CB555E1 |
| 315 | FF52A6587F05565998 |
| 316 | AA078CD2C5A7FF0CCC |
| 317 | 3C4C96BFE33CB555E1 |
| 318 | CC4B2A9E03CB316A01 |
| 319 | 9619BC0AA999E3FEB4 |
| 320 | FF2D59986F02ADA799 |
| 321 | C3336940133CB555E0 |
| 322 | FF52E6586F05525999 |
| 323 | AA078CD2C5A7FF0CCD |
| 324 | 3C4C69FF33CB555E0 |
| 325 | FA1B31815504E5B340 |
| 326 | A049A715EF5E3325F5 |
| 327 | C97D028739C57D7CD8 |
| 328 | F563325F55F3658CA0 |
| 329 | C902BD4729C28680D8 |
| 330 | 9C5797CD83602BD78C |
| 331 | 0A1CCDA0A5FB658EA1 |
| 332 | E1772D2882D111E110 |
| 333 | BB25BBBC3883C775A4 |
| 334 | D2111E0EEE18892C89 |
| 335 | EE8F2ED6822695DCF0 |
| 336 | D26EE1EEEE1F76D288 |
| 337 | 873B8B4454BDDF85DD |
| 338 | 11709109722691DEF0 |
| 339 | BB25FBBC3883C377A4 |
| 340 | D2111E0EFE10892E88 |
| 341 | EE8F2EF6822691DEF1 |
| 342 | 873B8B6444B5DF87DD |
| 343 | 11709109722E95DCF1 |
| 344 | EE0F11097E18892E89 |
| 345 | D29121F1122691DEF1 |
| 346 | EEF0AEC96E1776D088 |
| 347 | 2D6E9E2EF22695DCF1 |
| 348 | DD4474AF02DBC08910 |
| 349 | 8716A23BA881121DA5 |
| 350 | EE2207A97E125C4489 |
| 351 | D23C7751122C44B4F0 |
| 352 | EE5DB8696E15A3B889 |
| 353 | BB0892E3C4B70EEFDC |
| 354 | 2D43888EE22444B4F1 |
| 355 | CF4D302D465181A981 |
| 356 | 951FA6B9EC03533F35 |
| 357 | FC2B030B3A90196619 |
| 358 | C03533D356A6019660 |
| 359 | FC54FCEB3A97E29818 |
| 360 | A9019641803D4BCD4D |
| 361 | 3F4A8C0CB6AE059461 |
| 362 | F9560D6C106D6328C1 |
| 363 | A3049BF8AA37B1BC75 |
| 364 | CAB03E4A7CA4FBE559 |
| 365 | F62E0E920092E31720 |
| 366 | CACF81AA7CA3001958 |
| 367 | 9F1AEB00C601A94E0D |
| 368 | 0951B14DF09AE31520 |
| 369 | E177748444B225E311 |
| 370 | BB25E210EEE0F777A5 |
| 371 | D21107822873BD2E88 |
| 372 | EE0F777A5445A1DCF1 |
| 373 | D26EB862287C42D088 |
| 374 | 873BD2C882DEEF87DD |
| 375 | 1170C885A44DA5DEF0 |
| 376 | F91AAB2C106E52B2C1 |
| 377 | A3483D98BA34842474 |
| 378 | CA7C982A6CA7CE7F59 |
| 379 | F662A8F20099D68F20 |
| 380 | CA0367EA6CA0318158 |
| 381 | 9F560D40C60298D60C |
| 382 | 091D172DF091D68D21 |
| 383 | ED8EAE09112F16E291 |
| 384 | B75C389DBB75C47424 |
| 385 | DE689D2F6DE68E2F09 |
| 386 | D276ADD701D092DF71 |
| 387 | DE1762CF6DE171D309 |
| 388 | 8B420845C743D8865C |
| 389 | 1D091208E1D096DF70 |
| 390 | E1697B8444B3C51311 |
| 391 | BB3BAD30EEE11385A5 |
| 392 | D20F088228725DDC88 |
| 393 | EE11385A5444452CF0 |
| 394 | D270B762287DA22088 |
| 395 | 87259DC892D70F75DD |
| 396 | 116E8785A444412EF0 |
| 397 | E188F4BBBEE8F377A5 |
| 398 | 883C11097873B92E88 |
| 399 | B42261D10445A1DCF1 |
| 400 | 8843AEE9787C42D288 |
| 401 | DD168443D2DEEB87DD |
| 402 | 4B5DDE2EF445A1DEF0 |
| 403 | E2712DC911DF112291 |
| 404 | B823BB5DBB8DC3B625 |
| 405 | B1171ECF7D1E8DED09 |
| 406 | ED096E171120911D71 |
| 407 | D168A10F7D11761108 |
| 408 | 843D8B85C7BBDB445D |
| 409 | 127691C8F128911F71 |
| 410 | F92981B58CAB0328C0 |
| 411 | A37B570126F1D5BE75 |
| 412 | CA4FF293F0629BE759 |
| 413 | F651826B9C54871521 |
| 414 | CA300D53E065601B58 |
| 415 | 9F6527D95AC7C94E0D |
| 416 | 092E3D946C54871720 |
| 417 | E16907BA5BB4451111 |
| 418 | BB3B910EE1E69787A4 |
| 419 | D20F34BC3775DDDC89 |
| 420 | EE1104444B43C52EF0 |
| 421 | D2708B7C2772222089 |
| 422 | 8725E1D68DD08B75DD |
| 423 | 116EBB9BBB43C52EF0 |
| 424 | DD440B4F1D2BC08B11 |
| 425 | 87169DDBB771161DA5 |
| 426 | EE22384961E2584489 |
| 427 | D23C08911DDC40B4F1 |

TABLE 8-continued

| Index | MidambleSequence |
|---|---|
| 428 | EE5DC7A971E5A3B888 |
| 429 | BB08AD23CB4F0EEFDC |
| 430 | 2D43B74EEDD444B4F1 |
| 431 | F56342B8C93501B140 |
| 432 | AF31942C736FD327F4 |
| 433 | C605319EA5FC997CD9 |
| 434 | FA1B0146D9C2858CA0 |
| 435 | C67A8E5EA5F36680D8 |
| 436 | 932FE4D41F51CBD58C |
| 437 | 0564BE9939C2858CA0 |
| 438 | A9531594DCF600C181 |
| 439 | F301830076ACD65535 |
| 440 | 9A352692B03F980E19 |
| 441 | A62B164ADC0180FE60 |
| 442 | 9A4A9952A03067F218 |
| 443 | CF1FB3D81A92CEA74C |
| 444 | 5954A9952C0980FC61 |
| 445 | DD43888F0D24474B10 |
| 446 | 87111E3BA77E95DFA4 |
| 447 | EE25FB8961EDDB8488 |
| 448 | D23B8B511DDBC376F0 |
| 449 | EE5A044961E2247A88 |
| 450 | BB0F2EC3CB408D2FDC |
| 451 | 2D44348EEDDBC774F1 |
| 452 | E15A07B68DD4448B11 |
| 453 | BB0891223786961DA5 |
| 454 | D23C3490F11DD84489 |
| 455 | EE2204488D23C4B6F0 |
| 456 | D2438B50F11223BA88 |
| 457 | 8716A1FA4BB88EEFDC |
| 458 | 115DFBB77D2BC0B6F1 |
| 459 | FC4D558600CB529980 |
| 460 | A61F8332AA91800D35 |
| 461 | CF2B26A07C0ACA5618 |
| 462 | F33556781034D6A461 |
| 463 | CF54D9606C0531A818 |
| 464 | 9A01B3EAC6AF98FD4C |
| 465 | 0C4AA9A7F034D6A461 |
| 466 | E16912EF0EE9111110 |
| 467 | BB3BC47BB4BBC785A5 |
| 468 | D20F21C9722089DE88 |
| 469 | EE1111110E16952CF1 |
| 470 | D2709E29622F722088 |
| 471 | 8725F4A3D88DDF75DD |
| 472 | 116EAEEEEE16952EF1 |
| 473 | BB4A1116987441E310 |
| 474 | E10887A222269377A5 |
| 475 | 88BC2210E4BDD92E89 |
| 476 | B42252C8988BC5DEF0 |
| 477 | 88439DD0F4B222D288 |
| 478 | DD96B77A4E108F87DD |
| 479 | 4B5DED17688BC5DCF0 |
| 480 | E17712C88D2115E110 |
| 481 | BB25847C3773C775A5 |
| 482 | D21121CEE1E8892C89 |
| 483 | EE0F11368DDE91DCF0 |
| 484 | D26EDE0EE1E772D089 |
| 485 | 873BB4844B45DF87DC |
| 486 | 1170AEE96DDE95DEF1 |
| 487 | FC4D030D5569829B81 |
| 488 | A61FD599EF33500D35 |
| 489 | CF2B302B39A01E5419 |
| 490 | F33500D3559E02A661 |
| 491 | CF548FEB29A7E5AA19 |
| 492 | 9A01A56183054BFD4D |
| 493 | 0C4ABF2CA59602A461 |
| 494 | ED71049C547A42E091 |
| 495 | B7239208FE28907625 |
| 496 | DE9777BA28BBDA2D09 |
| 497 | E2090742548DC6DD71 |
| 498 | DEE8887A38B421D109 |
| 499 | 1D76B89DB485C6DD71 |
| 500 | A337D70E8FDF69D02474 |
| 501 | CA0332BF29F29E7F59 |
| 502 | F61D026745CC868F20 |
| 503 | CAFC8D7F39F5618159 |
| 504 | 9F29E7F5935FCCD40D |
| 505 | 0962FD98A5C4828D21 |
| 506 | DD444B4F1D23C08B11 |
| 507 | 87169DFBA779121DA4 |
| 508 | EE22384961E2584688 |
| 509 | D23C08B10DD444B6F1 |
| 510 | EEDD878961EDA3BA88 |
| 511 | BB08AD23DB470EEDDD |

$N_{FFT}$ = 512/1024/2048,
$N_{Tx}$ = 2/4/8,
Length = 72,
Reuse = 3

TABLE 9

| Index | Midamblesequence |
|---|---|
| 0 | 0332FF134A9E7D5A600C35430D5A6E069B81 |
| 1 | 0354D59F8CFB2E6A600CD369A19C0B55AB81 |
| 2 | 110F785DCBBDA52E8822697484588BC5E311 |
| 3 | 0379D594CA9ACFF2183060668D59AB54C381 |
| 4 | 1E25C4576E1DA7BA882DBC089102D3C08B10 |
| 5 | 001E568CCCCF865B54AA4B7C198662D0F001 |
| 6 | 36054D81463AFE7340C9FA8D8149C5027340 |
| 7 | 3334D541ECCCB6ABE03C3316A013CB356A01 |
| 8 | 5507D987899E1EABE05A0065B9996E656801 |
| 9 | 1E0F488444BDA5DF10E18F77645B45A62310 |
| 10 | 1276D1D7012896E371E28EADC91E2F152291 |
| 11 | 552D5992D994B2A8B40F000F399C3663C201 |
| 12 | 117752D691E0F11088DD9121CF1D26922311 |
| 13 | 110F4B444EE8F74A44BB5A61D10445A1E111 |
| 14 | 22114B5A477C45E2F0D2E93764587BC62310 |
| 15 | 002D59878F0D565B98CC4B6ABE13CB356801 |
| 16 | 1E0F4B5A411F748A44B45A61CF0BB2222111 |
| 17 | 002D59878F0D565B98CC4B6A9E03C3316801 |
| 18 | 5601D959EA9FE66A6159065AB8159065AB80 |
| 19 | 33334F12C0FAD40354996625A78A5F86AA01 |
| 20 | 1111479A5E1693B844BB442D2F14B3C51310 |
| 21 | 0C2CC314C6A9FDAB80F3530334C95E01A980 |
| 22 | 5534D68CC009E7C39899D2E5B55CCF80F201 |
| 23 | 1125C88F0EEDA48AF0E1DDB49101E2234B10 |
| 24 | 05054D98CC9E37EA14AFD0672D963B654340 |
| 25 | 3334D541E3CB356A00CC4B6A9E03C3316801 |
| 26 | 05284E4D8FAA871AD9C94E7D54136CE42941 |
| 27 | 443BD2D0F4B3C11110BB446D2F04BBC51110 |
| 28 | 1E16D2CF011EED1310E16952EF1EE9151110 |
| 29 | 0332D5860F3CAE9B80FCCD15A610CB569B80 |
| 30 | 223BCB4F02DC3C8B11DD440B6F1D2BC48911 |
| 31 | 120EC49C4EDF144BC4B85BEE09047242E091 |
| 32 | 55335692C33804F3E0A54B6A8CCC37833001 |
| 33 | 562CD594C9ACAE6AD403067F018CF600C181 |
| 34 | 5601D946056FE66A60A6F9A5580A6061AB80 |
| 35 | 5632D64D503183CD80A932A9AD5FC1843380 |
| 36 | 3602D8CA039FADB340C97D58EA1C6851B141 |
| 37 | 1D0ED216E1DF152291E2716DE901DF152290 |
| 38 | 4425DDCF0BBA5E22F04BA221D10B4221E310 |
| 39 | 562CD94D4038673F80A9ACA68D5FC864C380 |
| 40 | 562CD594C03867F2189A4AE6AD5CFE04C181 |
| 41 | 3631CD9380AAFC2B40C94E4D938F55002941 |
| 42 | 0379D594C65CACC380FC065594C9AB54C381 |
| 43 | 361CC141463B66BF40C91CFE8149C3614141 |
| 44 | 0F1E5A4B4A5CB70FE0006650755AAB373201 |
| 45 | 5534D68CC99D2E5B54001E7C198CC780F001 |
| 46 | 0379D594C30E066AD5A9ACFF2189AB54C181 |
| 47 | 1D244756E1DA478A90E25BF88901D2438891 |
| 48 | 067CC180C35E572B94ACA9EB3599FB0182C1 |
| 49 | 0C065A8D459D34FF80F386256D5A6D370380 |
| 50 | 5519D9800A5E1E5BE05A1E659E0AA6619801 |
| 51 | 560655818659FE6B80A9F9958189A6026B80 |
| 52 | 1209789C447DC6DE90ED09475C4B85C12091 |
| 53 | 33005A4B499D570FE03C7819B54962D73000 |
| 54 | 00334F0B4F0CB73354AA66659E05A1E19801 |
| 55 | 1111785A4EE9147BA44B3C6EF11B4BC51111 |
| 56 | 5632C0C6056CD7F260A64AFCD80A63503181 |
| 57 | 332ACF0B46987D9A00CC554F0B596F859A01 |
| 58 | 051B4E414FA9B71A14AF4E64F4150CE5B341 |
| 59 | 037E4301865CD5AAD4A9AB69B4DCF9830380 |

TABLE 9-continued

| Index | Midamblesequence |
|---|---|
| 60 | 1E25CB4F011DDC8B10E15A4B4F1EEA248B11 |
| 61 | 1B0DCA0501BF275E50E40DF5C50E4720A051 |
| 62 | 1413C6C50EB93F9250EBEC06C50146C39250 |
| 63 | 00664F1E05ACB59B54AAB3258B5F01E33000 |
| 64 | 057D58D38C99B6BEA00A851B0D8C66328340 |
| 65 | 0A36428D839AFF1B40F5C9828D8C65071940 |
| 66 | 5601D959E59865AB80A97E6686059061A981 |
| 67 | 55005A47899E6697E05AF819B99969E6AA00 |
| 68 | 1E0F52D68E18F6D36822115DF11DD1122110 |
| 69 | 05057258D36633E814AF5018ED99C3654340 |
| 70 | 05284D938C9CE7EAA0F5D0318D8393602B40 |
| 71 | 2216CB44477BC61F11DD96B4A4588BC1E111 |
| 72 | 06034D594ACD667EC0F9037299553D6582C1 |
| 73 | 0306594D4A9D373F80FC8626AD556D34C380 |
| 74 | 112247968E1DA7BA89DD4434AF02D3C08B10 |
| 75 | 5329D4D5860B067EC0ACA9AB1589F30182C0 |
| 76 | 223BC89102DBC74AF0D2C3B4AF0DD4408B10 |
| 77 | 1223F896F125C38890ED5C07690125C78A91 |
| 78 | 0F1E5692D553300198C3F8258B599D533001 |
| 79 | 361CD8CD8C9E358ED8057AD4140FA0514141 |
| 80 | 0318564D4A9CD7CF80FC9829AD556CD43380 |
| 81 | 1111479A4E1E97BA44BBC42D2F14BBC51310 |
| 82 | 2216CB44477BC61F10DD96F4A4488BC1E310 |
| 83 | 067CD4D58359AD82C0F90354F59CAE5580C1 |
| 84 | 0629C1958CACFF2AC1F95641B5935B072AC0 |
| 85 | 067CD4D58CA9AE7EC006036B359CAE5580C1 |
| 86 | 00665692D66550F1E0F01E2A8CD96AD33201 |
| 87 | 1E25CB4F0E1DA4B6F011DD88910EE2208B10 |
| 88 | 051CD40D8FAE3542D9C97AE7340368567340 |
| 89 | 0332EA59EFCCD55A600C3529B800C3529981 |
| 90 | 030673D8056D366AD4A953594D4FC060C181 |
| 91 | 140DFADC814F2453C8D8EB89C50D81436250 |
| 92 | 5534D68CC009E7C39899D2E5B55CCF80F200 |
| 93 | 3032D94603FB565780CF32E6861C0351A981 |
| 94 | 223BC8910D2C3F4AF02D3C74AF11DDC448911 |
| 95 | 361CC141436E37EA149C49EBD409C3614141 |
| 96 | 0A2FC2940C6C9F1AD839B631AD9F5D042B40 |
| 97 | 032CFF14D568615819CF4A8C2D59AE066B81 |
| 98 | 56065947F560666B80A9F9A6981568666B81 |
| 99 | 032B56418FCAB69A18CF4D65580304D1A981 |
| 100 | 1475C6C36EB8A793C827EC4A251276C4A251 |
| 101 | 032B59460FCAB66A60F353655800C531A981 |
| 102 | 1E08D2D762D915E310E1776D0882D115E110 |
| 103 | 1E08CB4441EF774A44B45DE1D10B4221E111 |
| 104 | 1E25C45762DBC48B10E15A7B8882D3C08911 |
| 105 | 052872538FAA84DB3839363D741C6B642B40 |
| 106 | 051B4298CAFCE682D8C9FD7181563285B341 |
| 107 | 1223C7490EDA3F8A90ED5C47490125C38891 |
| 108 | 0F2D4CCCC699E55601F02D332CD961E6A801 |
| 109 | 0C065654CA6D37CE183F605A8D5953530180 |
| 110 | 0F1E40198A5CB6AACC692D19B54C3F873201 |
| 111 | 0306594D4A9D373F80FC86268D556534C381 |
| 112 | 120ED1C90ED8EEE290EDF111C9112716E291 |
| 113 | 1413FAC4EEBEC453B11B14392501B9439250 |
| 114 | 1170CB5BA44DA5E310EE0F34A4544DA5E311 |
| 115 | 5534C007866AD733E0A5CCBC39996D54F200 |
| 116 | 037E4C06059D35AAD5A92B66B34F30630380 |
| 117 | 5632D59340C9FC3380A94D55B35F3E043181 |
| 118 | 562B5654C300984FF80A92B6994CCF1830181 |
| 119 | 067CD4D58359AD82C0F90314F59CAE5582C1 |
| 120 | 5601D959E69FE66A6059865A98159065AB81 |
| 121 | 067CCD594F9834D7945329D80C0AC56180C1 |
| 122 | 067CD4D5806836B358CA1AE7EC1CAE5580C1 |
| 123 | 562B40DF859D3432189A4D73C60953530181 |
| 124 | 0332FF134A9E7D5A600D332D4A66029980 |
| 125 | 057D4E58DC91B3D41450A85B0D99CCE28140 |
| 126 | 0629FE55806D641B58CA4FCD4C0CA30328C1 |
| 127 | 1116D10F0E1EEED310EE69510F01E916D311 |
| 128 | 030673D8056D366AD4A9D3196D5FC860C380 |
| 129 | 050558CD9C9632BF41FA05272D936E354140 |
| 130 | 140DC51C9EB72051C8D86BF6250279476050 |
| 131 | 120EFB5C51271049C4B85B91E91B8242E291 |
| 132 | 361B58D38C99B673380A8517C5180F50528340 |
| 133 | 361B540A0C99B6BEA0396357D40C66328141 |
| 134 | 05057E814C9E34DB8C6336272D8AFD054341 |
| 135 | 3602CD9F4398571A149C57E70A193D05B341 |
| 136 | 032B59460F3D365780FC2B668600C531A981 |
| 137 | 533054CC053CFEB2C0AC4FD4EC1ACB06B0C1 |

TABLE 9-continued

| Index | Midamblesequence |
|---|---|
| 138 | 1E1152CEE1E916D310E1EEAD3111E112D110 |
| 139 | 0F2D4CCCC3CCB40354A5F866599969E6AA01 |
| 140 | 032CEA5E630B566B80FC5355A1830B566B81 |
| 141 | 1111785A4EE9147BA44BBC2EF11B4BC51310 |
| 142 | 333340154699E56BE0C34B3C2B499E66A801 |
| 143 | 30184FD8065CD5AAD49A4D656D5CF9870181 |
| 144 | 051B725F40AE371A14AFCE18EA1A0B65B341 |
| 145 | 06037E40CACD654F5835E532B959FB0582C0 |
| 146 | 4425D2C88BBA5ED288773C21F1088BC1E110 |
| 147 | 05057258C63B66BF40FA850DB8B9CB654340 |
| 148 | 55335692C33804F3E0A5CB6AACDC37833200 |
| 149 | 361CCD98C50AFD4340C9634D98CAFD054341 |
| 150 | 032B59460F3D365780FC2B26A600CD35AB81 |
| 151 | 032B4314CA9FE69A18CF4D700D565181A980 |
| 152 | 22114B5A478BC5DF10DD11749A4873C22111 |
| 153 | 1E0F4B5A4E18F74BA444221DF11BB2262111 |
| 154 | 361B58D380A8557F40C99B27338F50528140 |
| 155 | 002D7312CF0D54F2CC669E6ABE1966656A00 |
| 156 | 0A2FCE4D80AD071AD8C649FD741C6B642941 |
| 157 | 05284D938F5D071AD8C94E7E8A0393602941 |
| 158 | 0C065654C6AB54FF80F3066994C953530181 |
| 159 | 5519D68786987D9A01AA661687896F819801 |
| 160 | 0F1E5692C338059B55A5CB3C07899D533200 |
| 161 | 06034D594F98372B94AC5667CC05356180C1 |
| 162 | 0A055B0D839E357F41F50524ED8C66368341 |
| 163 | 067CD4D58359AD82C0F98314D58CA65580C0 |
| 164 | 032B56418CFCD65780FC2B69818304D5A981 |
| 165 | 1276C482447DC6E370E20EF89C4B72412091 |
| 166 | 5031D7CD89CD7E4F4150CE282D99CA81B141 |
| 167 | 0332D5860F3CAE9B80FCCD158600C3529B80 |
| 168 | 003373154F0CB4F2B45A9E259E1AA6619800 |
| 169 | 066541995534FAB0C0F91A81B95AC302B2C1 |
| 170 | 3334D987800AD6ABE0C34CE5998F05556A01 |
| 171 | 0531FD52636A871B41FA4E42AD9362871940 |
| 172 | 361B415F439E342A149C4E6BCA0933628141 |
| 173 | 051B4298CAFCE682B8C9FD31A1563A85B340 |
| 174 | 115DC7968E1A5FBA8822C434AF1D2BC48B10 |
| 175 | 0A0557D40C6E364ED839631B2D8F50568140 |
| 176 | 061AFE46A53B06B2C1F96501B9553306B0C1 |
| 177 | 0F2D4CCCC699E55600F0AD332CD969E6A801 |
| 178 | 1111479A4BBC46D2F0E1697B8454BBC51311 |
| 179 | 3602D8CA0C6FAE4F4036FD272A1C6851B140 |
| 180 | 115DC7968E1A5FBA88224434AF1D2BC48B10 |
| 181 | 06564195835CFF2AC0F929C1959CAB072AC1 |
| 182 | 115DC796822C474AF0E125FBA89D2BC48911 |
| 183 | 032CCC0D4FCD34C2D4A9F9E6B81568666980 |
| 184 | 3602CE4149CD7E4F41367D31A159C281B140 |
| 185 | 0F005695469B34F398C366658CCA5557C000 |
| 186 | 0531CD8A0FACE4DAA0F549F19400A3631941 |
| 187 | 1125F8576EEDA47A88223C74910223C34911 |
| 188 | 562CC0C1856D37F2189A4AF3D809A350C181 |
| 189 | 0033731545A9E65BE0F04B4F0B4AA6619801 |
| 190 | 3334D9878C3CCE5B9800AD2ABE1F0D556A00 |
| 191 | 56065947E568666B81A979E6B81568626B81 |
| 192 | 3602CD9F463A8672A0C67AF1A1593D05B141 |
| 193 | 1111479A4E1E97BA44BBC42D0F04B3C11310 |
| 194 | 351ACD594CA9AF2B94603027EC09FB0180C0 |
| 195 | 550059998699E56BE0A5786587999E66A801 |
| 196 | 4425DD10B4DA61EF14B5A5E0F1BBA222111 |
| 197 | 051B7E86CF5E342B8C6328672A093D01B141 |
| 198 | 552D4CC7869B343E01AA2D7307996337C201 |
| 199 | 562B40DF865CD4C260A6537CC1995B570381 |
| 200 | 5507DA466669E56A00AAF865B99669E16A00 |
| 201 | 36284D8A039AFF1B40C957CDAA1C6D071941 |
| 202 | 562CD94D40438673F80A9ACA6AD5FC864C380 |
| 203 | 351AD813ECAE567EC035E5582C03565180C0 |
| 204 | 067CC180C53D66B358CA1AF2B959FB0580C1 |
| 205 | 110F775A444DA622F0E1774B644B4A25E311 |
| 206 | 55335692C99D565A5B50F9E40198C37873000 |
| 207 | 0629FE4A6F9D641B5835B032AC135B072AC1 |
| 208 | 553343C7899D570FE05ACB00198962D33001 |
| 209 | 0F004F198A5D565ACC693316B54C3E67C001 |
| 210 | 4425D2C8877BC61F10BBA5ED289883C5E110 |
| 211 | 120ED1C90ED8EEE290EDF111C9012712E290 |
| 212 | 3334C00B4669E6ABE0C34CFC154966616801 |
| 213 | 2216C89A478BBDE310DD69489A487441E111 |
| 214 | 1122775101EDA74AF0E1DA0B6F1EEA248B10 |
| 215 | 3631C14A1364E3E8A0C649BD741C63642B40 |

TABLE 9-continued

| Index | Midamblesequence |
|---|---|
| 216 | 333340155691E16BE0C34B3C2B599E66A800 |
| 217 | 3307CF00066AD65B5499D2A5954CC780F200 |
| 218 | 0A1CCE414F5E34E6145F49DB340A0B65B341 |
| 219 | 061AD4CC0F99AEB2C0F96554CC006652B0C1 |
| 220 | 1475C6DC82793CA250EB0A46DC9D8EC4A051 |
| 221 | 03066A54D56533F018CF60196D59A354C380 |
| 222 | 057AD414036E3672D8C91CE70D8FA8554141 |
| 223 | 56065947E568666B81A979E6980568666B80 |
| 224 | 05054D98CC9E37EA15AF50670D8633654340 |
| 225 | 4723D1D71485B92091B85C51F70B7A412090 |
| 226 | 061AC1994F9E541B94ACCFAB0CB0C053302B2C0 |
| 227 | 0367C318056CD69AD4A932E98D5FC9843181 |
| 228 | 360558CBE368567340C97AE7341368567141 |
| 229 | 502FD8CD863C9D4340AF5058CD89C3614141 |
| 230 | 560655818A9F9D5A18651FE69809A6026981 |
| 231 | 03065594CA9D37F218CFE026AD565B54C381 |
| 232 | 1E25C4576E1DA7BA882D3C489102D3C08911 |
| 233 | 1E08D2C882DEEDE310E17752C88D2111E111 |
| 234 | 057D58D38369B542A0F50564ED9C6E368141 |
| 235 | 032CEA5E630B566B80FC5355818303526981 |
| 236 | 0F19D68CC3C8065B54A54CFC19896550F001 |
| 237 | 1E25CB4F011A277710E1A5B4AF1EE2208910 |
| 238 | 562B40DF89ACD73E6059534321995B570180 |
| 239 | 003373154F0CB4F2B45A1E659E1AA6619800 |
| 240 | 0531FD52636A871B40FA4E42AD936A871940 |
| 241 | 1116FB9A41E9147A44BBC3D10F1B4C46D311 |
| 242 | 3032D94603FB565780CF32E6861C0355AB81 |
| 243 | 03067F01865B566AD4A9D31594CCF600C380 |
| 244 | 0354C314C56FE69A18CFB2B00D59A181A980 |
| 245 | 11117B8444BBC6D2F0E169479A4BB4411111 |
| 246 | 3631CE4D805D7C2B40C94E4E4D9FAA842941 |
| 247 | 1122785682DBC77710EE2247B69D2BC48911 |
| 248 | 0557CD938FAA84DB3839C982B41C6B642B40 |
| 249 | 001E598B4F0E665B54AA4B731E05A330F001 |
| 250 | 140DC9C50EB8DF6250EB7249C50147236051 |
| 251 | 0F34CF0B45599D9A00F0CB0F0B4AA6619A00 |
| 252 | 0318564D4FC9869AD4A94D7CF8156CD43181 |
| 253 | 5329D4D5860CFD82C0AC5654D589FB0580C1 |
| 254 | 11227B888E1DA47B692DBC34AF1DD4408B11 |
| 255 | 051B7D58C63A864F41FA1B42B8C9C281B340 |
| 256 | 0C355647E0CB569B80F3CAA99800C3529B80 |
| 257 | 0564D4138F59CE82D836FD272A1C6851B140 |
| 258 | 5534D68CC3387CF200AA4B568CCCC780F001 |
| 259 | 05056B4036E3672D8C96358CD8FA8554141 |
| 260 | 1223C4971ED5C04B71E25BF8A901D2438890 |
| 261 | 0306594D4FC8666AD4A95373D8056530C181 |
| 262 | 140DF61AEEBF249E50147276050147236051 |
| 263 | 4723D1D70B8A3EE37048246DE91B7A452091 |
| 264 | 5031D8CA05FC9DB340AFCE18CA0A0361B340 |
| 265 | 0A0557D40C6E364ED839635B2D9F50568140 |
| 266 | 5534C007866AD733E0A5CCBC19896550F200 |
| 267 | 032B6A5F8CFCD596600C5369819C0B55AB81 |
| 268 | 33334F12C99E665A780FAD00354A5F86AA01 |
| 269 | 0F2AD68013C3325998C3CCA5999F05516A01 |
| 270 | 060354D58CAE567EC0F9036B3583565180C1 |
| 271 | 112247968E1DA7BA89DD4434AF12D3C48911 |
| 272 | 0F34CF0B45599D9A00F0CB4F0B4AA6619800 |
| 273 | 562B40DF8A6D37CE1865CD4C06195B530180 |
| 274 | 333343CB499E6697E03CCB00354961E2A800 |
| 275 | 0557CD938FAA84DB3839C9C2B40C6B642B41 |
| 276 | 3032DA87E30CD5AB80CFCD25580304D1AB80 |
| 277 | 4723D1D71485B92090B8DC11D71B72412291 |
| 278 | 037E4301865CD5AAD4A9AB29B4DCF9870380 |
| 279 | 0F34CF0B400B373355A561A59E1AA6619801 |
| 280 | 03066A54D56533F018CFE059D49AB50C181 |
| 281 | 0306594D4FC8666AD4A95373F8156D34C181 |
| 282 | 110F6ED682D9161F10EE8F11168D2111E310 |
| 283 | 061AC1995F96501994ACCFEB0C053B06B0C1 |
| 284 | 1276C743A47DC5229ED09789C447DC52291 |
| 285 | 037E4C06059D5AAD4A92B26B34F38670380 |
| 286 | 1E25CB4F0E1DA4B6F0115DC8B11EEA248911 |
| 287 | 1B0DCA1AE1BF24A250E47275C501B720A051 |
| 288 | 1116C7844BBC3ED310EE6947844443C2D111 |
| 289 | 4425DDD0E4BA25E310BB5A620F04BA25E311 |
| 290 | 0629CD4C0F9D64D6C1F9A9B28C006D6728C1 |
| 291 | 1E16C4444B4C3EEF101E697B844B43C11111 |
| 292 | 36054D81463AFE7340C97ACD8149C5027141 |
| 293 | 2216DDCF02D9161F10DD16E22F1D2915E111 |
| 294 | 0C2CD64183FB565780F32CE9818C0351A981 |
| 295 | 032CD5818CFCAE6B80FCD315818303526B80 |
| 296 | 1E22478882DBBF4B10E15D87A88D24434B10 |
| 297 | 05284E4D8FAA871AD8C94E7D540364E02941 |
| 298 | 1E08D2D762D915E310E1776D2882D111E110 |
| 299 | 0564C298C36FD71A15AF31A80D99C285B140 |
| 300 | 0F2D4CCCC3CCB40354A5F866599969E6A801 |
| 301 | 3032CFD2ACFCD702D565981A98165185AB81 |
| 302 | 0354D959EFCAB66A600C535A9800C531A981 |
| 303 | 037E5654CA9AB7CE1830181AAD49ACD30381 |
| 304 | 0531C28D9C957B1B41FA4E02AD936A871B41 |
| 305 | 051B54138F5E3682D8C97D670A039055B140 |
| 306 | 051CD40D8C9FAE7340FAE3142D8368567341 |
| 307 | 3631CE4D905283D540C931B1AD9FAA802941 |
| 308 | 1116EED0E1E916D310EE69112F01E916D310 |
| 309 | 35304D53ECACFF2AC035B032AC135B032AC0 |
| 310 | 3631C14A039B67D740C931FE8A0C63602941 |
| 311 | 110F775A444DA622F0E1774B444B4221E111 |
| 312 | 1125F750EEEDA48AF01EA2349101E2234B10 |
| 313 | 3631C14A036CE7EAA0C6C9BD741C6B642940 |
| 314 | 552D5992C99CB6AAB40F800F198C3663C200 |
| 315 | 562CD94D403F9CC380A953596D5FC860C381 |
| 316 | 333355400C3CB697E03C4B569E0CC332A801 |
| 317 | 0F2D4CCCCA5F8667983C4B00355961E6AA01 |
| 318 | 057D4E58C369B42A14AF2864CD89C4E28141 |
| 319 | 11774783CDD9174BA44B5A51288873C22110 |
| 320 | 0F34C00CC5A9E6AB99C352B315496F819800 |
| 321 | 120EFB43AEDF144BC447A42E29147A46E290 |
| 322 | 331E43C0099CB69754664B16B54CC1E3C200 |
| 323 | 051B7D58CFA9B42B8D63A824D409CA85B340 |
| 324 | 0A1CCE4145FC9DB340F5630E614A0B65B141 |
| 325 | 1E1152CEE1E916D310E16EED3111E916D111 |
| 326 | 5329D813E53D6582C0AC5667CC05356180C1 |
| 327 | 0354D65E630CD5AB80FCAB69A19304D1AB80 |
| 328 | 0367D652A5DC4380FC1869AD4564D03180 |
| 329 | 5632C0C60A6CAFCF8156CD3F061A63503181 |
| 330 | 351AD813E35E5582C0CAE527CC03565182C0 |
| 331 | 0F34CCCAAF0CB733545A1E598005A1E19801 |
| 332 | 0A2FCE4D8C6C9FD7400A5031AD8C6B642B41 |
| 333 | 1276C743A47DC52290ED09372B9553D6582C1 |
| 334 | 0367D593459CAC3380FC1855934A6B543381 |
| 335 | 1276D1D70E28EEDE9112092E370E27112291 |
| 336 | 03187F060A9CD55B345935698D4F36003181 |
| 337 | 443BD2CF0B4C3EEF1044446D2F1B4BC51111 |
| 338 | 002D7312DAA78198783C333C15596E616A01 |
| 339 | 1111479A4BBC46D2F0E1697B8444B3C11111 |
| 340 | 05287D54036CE71AD8C9CE0E4D9FA2842940 |
| 341 | 00785992C3CE656B55AA2D7307996B37C001 |
| 342 | 0564D8D5E0AE35B340FA1B670A10AE35B341 |
| 343 | 562B4C06059D34FF80A92B73C60A65330181 |
| 344 | 1E08C79DDB45DAD0882D1174A4487C45E110 |
| 345 | 0332C30D4A9E7E9B80FC4D430D4561829981 |
| 346 | 5329D4D5860CFD82C1AC5614D599FB0182C0 |
| 347 | 067CD4D58359AD82C0F98314D58CAE5582C0 |
| 348 | 361B4E58DC9B3198C502817F41AF2868340 |
| 349 | 0629C1958CACFF2AC1F95601B5835B0328C0 |
| 350 | 051CCD814AFC9E7340FA634D81550B667341 |
| 351 | 051CF25EAFAE34DA1450366714050362714 1|
| 352 | 1116C7844EEE947A44BBC3AD110443C2D310 |
| 353 | 0C065A8D459D34FF80F306656D5A6D370181 |
| 354 | 1111785A41EE97BA44BBC412CF0B43C11310 |
| 355 | 3631CD93805A87EAA0C649F18D8F55002941 |
| 356 | 0629C1958CACFF2AC0F95641B5935B0728C1 |
| 357 | 032B4314CA9FE69A18CF4D700D565981A980 |
| 358 | 061AC1994ACCFEB2C0F9E54199553306B2C0 |
| 359 | 5632D64D403987CF81A932E9AD5FC1803380 |
| 360 | 1223C4971ED5C04970E25BF8A901DA478890 |
| 361 | 1B0DC6DC828EBCA250E47246FC9D7144A050 |
| 362 | 333343CB4C887B37C2B4691E55601969E6A801 |
| 363 | 0354D65E6FCAB69A18304D1AB80304D5AB81 |
| 364 | 032B59461FC2B26860F353257810C535AB80 |
| 365 | 110F7B83D4B222D088DDE9489A487C41E111 |
| 366 | 067CCD46A53D6582C0F90372B9553D6582C1 |
| 367 | 56065947EA9F9E6B80568626B81568666B80 |
| 368 | 037E558ACCF9866B34595343019953530180 |
| 369 | 1D0EC75C4E2F1477C4485B92291B7A452290 |
| 370 | 0564D413839FADB340FA1B54339C6851B141 |
| 371 | 3307D98B4CCF859AB4692ACF00096D50F001 |

TABLE 9-continued

| Index | Midamblesequence |
|---|---|
| 372 | 140A7AC2827EC763B0E4F206DC8D7140A250 |
| 373 | 55005A47866E656BE0A57866598961E2A801 |
| 374 | 0379CC180A9ACE6AD45653668D4FC060C181 |
| 375 | 562B40DF865CD4C260A6D33CE1995B570380 |
| 376 | 1170D11692D6E9E110EE8F11169D2911E111 |
| 377 | 533054D3E53B06B2C1AC4FAB0C053B06B0C0 |
| 378 | 3602D8D5E39855B340C97D670A039855B141 |
| 379 | 110F489A4BBDA622F0E17774A454BA25E311 |
| 380 | 1475C5028D893F63B01B72793C9D7944A050 |
| 381 | 065641959F92981958354FF2AC0CA3032AC1 |
| 382 | 22114B5A478BC5DF11DD91349A487BC62111 |
| 383 | 140DFADC8279449E50EB0DC51C8D81436051 |
| 384 | 110F52C88DDE961F10EE0F2D28822E95E310 |
| 385 | 0F005695469B34F398C366658CCA5553C001 |
| 386 | 0564C298C63D7DB340FA9B02B8C9CA85B341 |
| 387 | 032CF3D2BFC530C0D4560626981568626B81 |
| 388 | 361CCD98CC9E34DB8C502FD4140AF5014141 |
| 389 | 562CCC07E56D34C380A95373D8056530C181 |
| 390 | 00665692C3CF859B54AA333C27996AD73001 |
| 391 | 032B73D34FCAB4C334598625580A6061AB80 |
| 392 | 110F51168E1F76D288DD69620F02D2111E111 |
| 393 | 00785992C5AD54F399CC1E6A8B496337C000 |
| 394 | 2216DDCF022E9622F0D2EEA1D11D2915E311 |
| 395 | 1E08D2C881EF76D288D26EE1D10D2111E111 |
| 396 | 00337C12C3CAD73354AA6616A7996F819A00 |
| 397 | 110F6ED682D9161F10EE0F51368D2911E110 |
| 398 | 1170D2D7622E95E310EE8F2D28822691E110 |
| 399 | 1D0ED216E1DF152291E2716DE901D7112290 |
| 400 | 0F1E5A4B455B34CE00F01E25AB4AA3373201 |
| 401 | 060354D58CAE567EC0F9036B35935E5582C1 |
| 402 | 361B58D380A8557F40C99B27339F58568340 |
| 403 | 0564D413839FADB340FA1B54138C6051B141 |
| 404 | 1D0ED2090E28EEDE901DF12DC90E27112091 |
| 405 | 1170C89A41EF774A44BBA5A20F0B4221E310 |
| 406 | 2216DE0EE22E95E310DDE921F1122691E110 |
| 407 | 03066A54C56D37F218CFE0196D59AB54C380 |
| 408 | 0A1CD7CD80AE3682D8C67AA4F41C6855B141 |
| 409 | 037E5953456AB4C260F306256D5A6D370180 |
| 410 | 0306594D4A9D373F80FC86268D556530C380 |
| 411 | 0C065A8D459D34FF80F306256D4A6570381 |
| 412 | 1475C6C3627EC4A250EB8A793C927EC0A250 |
| 413 | 0367C318056CD69AD4A932E98D4FC1803181 |
| 414 | 031855934F3E069AD4A94D7F060593503181 |
| 415 | 2713C9DB028EBCA250D8EC09DB0D7140A250 |
| 416 | 11116ED101EE96D2F0E16912EF0EE9111110 |
| 417 | 001E568CCCCF865B54AACB3C198662D0F001 |
| 418 | 110F7B83CBBDA513682D913484587C45E311 |
| 419 | 0629F293E06D672AC0F9564D4C00656328C1 |
| 420 | 443BD1110B4C3ED2F04BBC2D2F1BBC451310 |
| 421 | 552D43C0066CB4F398994B70F99AAAD7C001 |
| 422 | 03186A53459B57CF80FC1855934A63503181 |
| 423 | 061AEB13E06E56B2C1F96514EC106656B0C1 |
| 424 | 1E11478444BBBED310E16EC7844B4442D111 |
| 425 | 3334D98780FAAD6A00CC4B59878F05516801 |
| 426 | 5632D64D403E7C3380A9CD164D4FC1803380 |
| 427 | 05057258D36633EA14AF5018ED99CD654341 |
| 428 | 032B7CD4D304D300D4A9FE564199A981A980 |
| 429 | 001E6A92C5AB37C398CC7819AB596D54F200 |
| 430 | 2713CA1AE27EC4A251D86C75C5127EC4A251 |
| 431 | 4723D1D70B8DC51F7048DBD2291B7A412291 |
| 432 | 120EFB5C412F144BC4B8DB91E91B8246E291 |
| 433 | 0A055B0D9396317D40F58564CD8C6E328141 |
| 434 | 5632D59340C9FC3380A9CD15934F36043180 |
| 435 | 00785992C5AD54F399CC1E6AAB496B37C200 |
| 436 | 0C2CC314C6A9FDAB80F3530334C95E01AB81 |
| 437 | 06036B158F98354F5835E527CC0CA65182C0 |
| 438 | 561855860599FE9B80A9E795A61A6E069980 |
| 439 | 0F34C00CCA5E1EAB983C2D73154967819801 |
| 440 | 0564C298C36FD71A14AF31E80D89C281B141 |
| 441 | 115DC796822C474AF0E125FBA89D2BC48B10 |
| 442 | 503658CBE50B667340AF49E7140503627141 |
| 443 | 22115E0F0DD9161EF02D695DD10D26922111 |
| 444 | 117752D681E8F51288DD1161EF1D2E962111 |
| 445 | 333343CB4699E55600CC337C0B4961E2A801 |
| 446 | 051B54138F5E3682D8C97D670A039051B141 |
| 447 | 037E4301865CD5AAD5A92B2994CCF9830180 |
| 448 | 331E401E069B356B55994B6A8B4C3663C200 |
| 449 | 140A761B01BF275E50EB8A09FB1E4F24A050 |

TABLE 9-continued

| Index | Midamblesequence |
|---|---|
| 450 | 0629CD4C0F9A9F2AC0F9D64D6C1065672AC0 |
| 451 | 0F2D40154699E59B98C34B332CCA5F86AA01 |
| 452 | 1475C50281BF2793C8D813F63B0D7140A051 |
| 453 | 117752D6822915E2F0E10F6EC88D26922111 |
| 454 | 562CD94D4038673F80A9ACA68D4FC060C380 |
| 455 | 1475C5028E48DF93C927EC763B0D7144A251 |
| 456 | 5601D641856FE69A189A67E57819A985A981 |
| 457 | 1209475C4ED8978BC4B85C6DC9147DC52291 |
| 458 | 443C52CEE44BC6D310BBC3AD31144BC6D310 |
| 459 | 3631CD93805A87EAA0C649F1AD9F55002B40 |
| 460 | 22115E0F02DE95DF11DD1121EF0D26922310 |
| 461 | 4723D216E47DC52291B85C2DE9047DC12090 |
| 462 | 032B73D34598665780FC2B0C334A6065A981 |
| 463 | 0A1CC298C5FB6682D8C67AF181493501B141 |
| 464 | 0C2CCFCD40CD3702D4A679E5580A6061A981 |
| 465 | 562CCC07E56D34C380A95373F8156D34C181 |
| 466 | 111152CF0EE916D2F0E1692EF101EE911110 |
| 467 | 140A7AC28D8EC49FB11B72793C9D7940A251 |
| 468 | 1E0F510882DE95DF10E10F2EE88D2E962310 |
| 469 | 1125FB9681EA247A88DD43C8AF1D2C474911 |
| 470 | 0F34D6878C3D2E5BE000336AB99CCD559801 |
| 471 | 3602CE4149CD7E4F4136FD318149C285B140 |
| 472 | 4425DDD0E4BA25E310BB5A620F14B221E111 |
| 473 | 562B5654C9ACD656D403FE03018CF1830380 |
| 474 | 4425D2C8877BC61F10BBA5AD288883C1E110 |
| 475 | 22114B5A4D2E97764477441E2F0873C22111 |
| 476 | 1475C9C4E1BF24A250EB1A763B11BF24A051 |
| 477 | 1223FB570EDA3C4B701DA407690E2A478A91 |
| 478 | 1E16D10EE1EE951310E1696ED101E6911111 |
| 479 | 0F1E5A4B455B34CE00F01E25AB5AAB373001 |
| 480 | 057AD8D2636E354341FA85270D9366314141 |
| 481 | 443BD2CF0BBC452EF04B43D1311B4BC51111 |
| 482 | 0C1FD64D459CAC3381F360166D5A63503181 |
| 483 | 5534D98B40F99CF200AA4B19AB4F0E60F000 |
| 484 | 002D59878CCCB6ABE0F0D5259993C3316800 |
| 485 | 5031D7CD9632824D40AF31E82D89CA85B140 |
| 486 | 032CFF14C30B54C2D4A9F9958199A6066B81 |
| 487 | 03186A53459B57CF80FC1815B34A6B543180 |
| 488 | 051CD40D9FA63140D8C97AA7340360567341 |
| 489 | 057AD414036E33672D9C91CE70D8FA8554140 |
| 490 | 0F34C00CCC3D2F33545A1E6AB9996F859801 |
| 491 | 116EC79A44BC3D1310EE11479A4B43C11111 |
| 492 | 1223C4970E2DBF8A90ED5C449711DA478A91 |
| 493 | 051B6BD38FA9B54338398524D40C6051B340 |
| 494 | 051CCD814FAE34DA14AFC9A7340503627140 |
| 495 | 116ED1110E196ED2F11E692D0F1EE1111110 |
| 496 | 3602D8D5E39855B340C97D672A139855B140 |
| 497 | 1170C89A44BDDDE310EE8F089A4B4A21E311 |
| 498 | 032CCC0D4FCD34C2D4A979E6B81568666981 |
| 499 | 03065594CCFE066AD4A9D37F21965B54C380 |
| 500 | 1E16C44441EE97BA44B443EED10B43C11111 |
| 501 | 1209789C447DC6DE90ED09475C4B85C12291 |
| 502 | 5534D68CC99D2E5B54001E7C399CCF84F001 |
| 503 | 140DC9C50EB8DF6250EB7249E5114F276051 |
| 504 | 05057258C63B66BF40FA054D98C9C3614141 |
| 505 | 00785992C3CE656B55AA2D3307896333C200 |
| 506 | 051B4298CC9FD71A14AF4E682D9063A85B141 |
| 507 | 553343C785ACB40398995570FE196AD73201 |
| 508 | 5601D59F8598669A189A67E6A6095E01A980 |
| 509 | 0354D59F8CFB2E6A610CD329818C0B51AB81 |
| 510 | 037E4301865CD5AAD5A92B2994DCF1830181 |
| 511 | 1B1446DAE1B9479250E46BF90501B1439051 |

$N_{FFT} = 1024/2048$,
$N_{Tx} = 2/4$

TABLE 10

| Index | Midamble Sequence |
|---|---|
| 0 | FF662952CC37826554553303C78692D0CC0000661692C3C7819954AA333C27996AD73201 |
| 1 | FF4CBC12CA561AA998332A8F0B469079980000333C12C5A1E2A998CC550F2B596F859A01 |
| 2 | FF52AA9E0C34CA59983334998780F2A96800002D2A9E03C3325998CC4B19A79F0D556A01 |
| 3 | CC4CB0D2CF052BFD54CC330F12CF02D0015466199A4785A0795400666625A795AF86AA01 |
| 4 | CC5530D4A9678265FE332A8F0B4690799800CC550F0B4967819800CC550F2B596F859A01 |
| 5 | FF4CBC12CA561AA998332A8F0B469079980000333C12C5A1E2A998CC554F0B596F859A01 |
| 6 | AA4CB31FEA54B30DE05A348F01E55330CC00AA33330005A4B0F1E05A4B0F3E1AAB373201 |
| 7 | FF6630DE0A54B2655455331A4B40F1E0CC0000660F1E05A4B19954AA3325AB5F09E73201 |
| 8 | CC4CB0D2CF052BFD5466199A4785A0795400CC330F12CF02D00154666625A795AF86AA01 |
| 9 | AA4B295329952A5954FF6183C66CC780F0005534968CC9952A59540011E3C399CCF84F201 |
| 10 | BB442D10EB443AED10443B92CF0B443AED10BB3B92D0EB43C1111044446D0F1B4BC51311 |
| 11 | CC61BFDE0964CA9554CC1E001E09633169546634954B43C1983C00664B2AAB53CE67C201 |
| 12 | F06625954F06625954A54CB0DFE5A330F0000F199A4AAF066259545A330F2015AB34F201 |
| 13 | EE690445AE16E87844BB43AED0EB4442D1101116BB9A4E16E87844443C112F1B4C46C311 |
| 14 | EE08B485AE10F3744411770B5A4E10F37444BB5DA1D0EB45A2211044221E2F1B4DA62311 |
| 15 | EE693B9A4E16E87844443C110F04B3BAD1101116BB9A41E1107844BB43912F1B4C46D311 |
| 16 | CC4B3312CF0553C154996199878A57F968003334B312C0F2ABC154661E19A795A8056A01 |
| 17 | BB442D10EB443AED10443B92CF0B443AED10BB3B92D0EB43C1111044442D2F1B4BC51311 |
| 18 | A954AA4ACFC7E00DF8A62CA994CF30603018653299534301833C606A4A9AAD53FE070381 |
| 19 | F04B30D4AFF4CB3154F04B0F0B40033331545A1E1A41E5519998005A1E25BE1AAE659A01 |
| 20 | FA64A715EF56324D40056498D5E0A631B140051B18CA0F56324D40FA1B672A10AE35B341 |
| 21 | CC7FA6554C307A58B4C3781A4B4CC0019954662A8CC0069528F1E0692D30FE166D573201 |
| 22 | FA64940C6F56317CD8FA1B141380A63280D83602A715E390524D4036D7D272A1C6855B341 |
| 23 | AA52A5932CC61BC1FEAA2D258CCCC1E3C000552D1A4CC331E03C00AA2D25ACDCC9E7C201 |
| 24 | EE693B9A4443C110F0E16E878444B3BAD1101116BB9A4BB43910F01E1107A45B4C46D311 |
| 25 | CC5533154C3528F0B49678259E0997F99800332AB31543C2D0F0B46907E5BE0668059A01 |
| 26 | ED5C0488EE25B874901223BB570E25B87490ED23BB48EE22438890125C04B71E2A478A91 |
| 27 | CC4CAA9FEC34B295E0CC332A8003C4B169E03C349681E3333154003C4B16BE1CCB36AA01 |
| 28 | FA283D4BEC931B18D8FA2802940364E318D8364E0E526055782940364E31AD9FAA842B41 |
| 29 | FF782652CA55530D9800781992C5A550F198331E154B4693303C00CC1E6AAB596B37C001 |
| 30 | AA662A998A561968789678259E0997F998005519AA9985A1E168786907A5BE1668059A01 |
| 31 | A954A68CAFC7E33C60A653254D40C060FD805654994CA037E0C06059531AAD5F38670381 |
| 32 | AA4B3FD8699528CC1E553480078662D331E0A54CBC19896550F000A54CBC39996D54F201 |
| 33 | CC5533154C3528F0B49678259E0997F99800332AB31543C2D0F0B46907E59E1668059A01 |
| 34 | FA28318D8FA28318D805578E526FA28318D8C931BD4BE364E02940364E42B4036CE42B41 |
| 35 | FA6301472AF49ABD26C97A8D8149C5027140051CBE98C5036140D8C97ACDA149C067341 |
| 36 | FA7AB258CAF5018CD8057A8D98C5050270D8361C8141463362BD40C99CFEA149C654141 |
| 37 | AA4B29532FF61BC198AA4B168CC001E3C198662D1A4AA33078F000662D65B55CC784F201 |
| 38 | ED5C3896E122387490ED23B8890ED23B88901223B896EED5C0749012DC78A9112DC78890 |
| 39 | ED092E08EE20EADC90127691D70E20EADC90ED7691C8EE2711209012092E371E2F152291 |
| 40 | FC4D00CCAF34A830D40332BF134F34A830D4A967AA59EA66029980569815A61A6E069B81 |
| 41 | FA648D80AAF4E18CA0051B325F4AF4E18CA0F51C8E5EAA0361B1410A6371A15A0B65B140 |
| 42 | F07FA5932A55530D98F000258CC5A550F1983C19968AA693303C003C665695596B37C201 |
| 43 | FF003C1E099332592CA52D2A954C31E3319833660F0785555168B469C8B69A0CD0FF800200 |
| 44 | FA7AB258C502F98CD8FA050D98C5050270D8361C814149C49ABD4036637EA159CB654340 |
| 45 | AA4CB31FEAA3333000A54B30DE05A4B0F1E05A348F01E5A4B0F1E055334CE01AAB333201 |
| 46 | AA52A5932994B29554552D1A4CC994B29554FF07B0C66CC1E3C00000784F398CC9E7C201 |
| 47 | AA4B29532FF6183C669952A5954CC780F0005534968CC001E3C1989952E5B55CC784F201 |
| 48 | AF57A80BE9C4E24CD89C31A4D26AF282814052817D409C4E24CD963CE5B0D9AFA868140 |
| 49 | F061A94D2FF662A8CCA54B3C0785533001983C079A54A330019954692D4F3E199D533201 |
| 50 | FF660CC00A54B1A4B40F1E30DE0553326554AA3319954F01E0F1E15ACB65AB500E633000 |
| 51 | BB43AD110BB43AD110BB4392CEE443C2D1104433C12CEEBB43AD110443C2D31144BC6D311 |
| 52 | FA57BD540C94E0E4D836318E4D805283D540055782940364E318D8C931F1AD9FAA842941 |
| 53 | F052A5986F02D25878CC4CAA9FECC332A8000F2D1A478F02D2587833B355601CCB32AA00 |
| 54 | EE7711088D2691E0F011772EC882D6921CF0E10F12D68DD111DD101E0F6D369229122311 |
| 55 | FF2ABC0B4C334B30CC334C8F12C0F5280154AA00169E0961E19998666665A795AF86A801 |
| 56 | AF57A80BE9C4E24CD89C31A4D26AF2828140502817D409C4E24CD963CE5B2D8AFA828340 |
| 57 | AF57A70C6A02FA4D26502818D385F501B0D89C4E2BCA09336281419CCE6BEA193B628140 |
| 58 | FA7AB258CAF5018CD8057A8D98C5050270D8361C8141463362BD40C99CFE8159CB654340 |
| 59 | FF19A94D2992AB0C1E00661692C66550F1E0F01E2A8CC962B33201F09E6AACD962D33000 |
| 60 | F04B3FD32A561AA9983C2D0CCAA690799800F04B000CC5A1E2A9983C2D7315596F859A01 |
| 61 | A97E2699EA97E19460A901A6860567E2686059061A87E59062578159F9DA981A6865A980 |
| 62 | FC5300CB2FC533F14CCF4A8C0D430350C0D456062A5E6560615819659FE6B809AE066B80 |
| 63 | EE5DB7510115D88910E15A0B4F01E5A348F01E258B4F0E125F4AF011A277711EEA208910 |
| 64 | FF61AA92C0F19968CC9952B31E0692A8F000001E2A92CF06616ACD662D733E196D54F000 |
| 65 | CC662592CFF00294B4993330C78AA553C1E03C1E198CC0F781575469CB4CF995AAD40000 |
| 66 | A94D2992AFC67BCD80A932A98D40367831805632A992A03183CD8156CD698D5FC9843380 |
| 67 | FC54BCCB230328FD2A032B0314CCF4D300D4A97E2981865181A981A9FE6981965985A980 |
| 68 | CC7830DFECC780F0009952A5954662D25954662D1A4AA662D259543307CF201CCF84F001 |
| 69 | FC54B3D34A97E1946003548C134567E268600C2C8FCD4590625781F3ACF00D5A6865A980 |
| 70 | FA283E8A0C9318D938F52F82940C636318D8364E0D9380557BE8A139C9F1AD90A5042940 |
| 71 | F97CAB0A6F9032B158060314CD58F9032B158351A9813E3565180C1CA6567EC135E5580C0 |
| 72 | AF4E2BD389C5798CA0A04997CD8935024D40504E141386357A70A05FC9E82D96C505B340 |
| 73 | C964BD5EAC91B3D4143664829EA361B028149C4E28140634E17D4063CE57F419CCE68140 |
| 74 | F07830C78AA55264CC964B294B4CC663FC000F780F078555519ACC69CB56AB533E640000 |
| 75 | AA52A652CFF07B3078964CA9554C319BC000552D2652C00783307869B3697553CE63C200 |
| 76 | EE77349A4E10F3744411770B5A41E0F0884444221E0F04B5A1DD11BB2261EF0B4DA62311 |
| 77 | F0782A954964B33198C31E264CCA52D3FC000F7815554694B0CD983C9E59ACD5A2D40201 |

TABLE 10-continued

| Index | Midamble Sequence |
|---|---|
| 78 | FF782652C00781992CC366295543C6616954552D0CC78AA2D33078693343E0196337C201 |
| 79 | FC67A992A03679652AA94D3CD80564D031800318164D4FC1829AD5A9CD7CF81564D43380 |
| 80 | FA64A715E051B18CA00A1C9B0BEF56324D40FA1B270A0FA1B270A10AE35B3410AE31B140 |
| 81 | EB7205036EB723ADC8EB0D851C81472051C82714361AE271409C51276BF6251D89476050 |
| 82 | CF4D3012ACF32B00D4CF4D0FCD4304D300D465181A87E65679A9816518657819A985A980 |
| 83 | FA02A70C6FA7D2713836649415E361B140A0F50524CD80A051B2D939E357F40C6E368140 |
| 84 | ED76BB42412093B424472391D70B85C11D70E20EB89C41D71389C448DBD2291B72452290 |
| 85 | E1772D088E1772D0881E0892D76E1772D088D26EA1CEE2D111E3112D915E1112D911E110 |
| 86 | C964B1872C91B3198C361B0E58CC91B3198CAF57A80BEAF2828140502857F41AFA868340 |
| 87 | EE113B844BB3B91110E116879A4B43C2D0F01E69079A44B43AD0F111EEFBA45444451310 |
| 88 | EE70B85DCBB25AD088110F385DC445A2D08822168B44477439E111DD694B64588BC5E110 |
| 89 | CF4D33CCACF4D0C13465181959E651826860C04AB00D43F35302D56A1FDAB8195E01A980 |
| 90 | DD6EB485A884421CF0DD11349A477441E0F02D16889BA783C1DF112DE94884587BC62110 |
| 91 | ED5C04970ED5C04970E25B8756E1D24388901223BB48EED5C049701DA478A911DA478890 |
| 92 | AA52A5932FF7830D98994B29554331E03C0055529A53200780F19866CB56B55CC9E7C000 |
| 93 | EE5D87896DD440B4F0E12584576D23C08910112238568DD440B6F11EDA7BA88D2BC48B10 |
| 94 | FF2AB0CD2F02D330CCAA00258785A7819998334C83D4A3C4B0015466E656BE1961E6AA00 |
| 95 | F3533012AA6799A87E0C2C8FCD4590625580F32CB00D4A6061A981F3ACF00D5A6865A980 |
| 96 | E47235C50E47235C501B0D8A1AEE47235C50E40DB5DAE1B724A2511BF20A2511BF20A050 |
| 97 | BB5A2D1768843A1D10BB25AD08877439E1104425AD176773C21D10445A6D28988BC5E111 |
| 98 | F07FA94AAC366258CC0F0016954C366258CC964CB0C66A5553C00069B30F399A5D57C201 |
| 99 | FF4C8CCAAA5619A41E0033331545A1E259E0F04B0F0B4AA6619801F0CB4F2B4AAE659800 |
| 100 | C957B1940C957B1940C9578E4BE36283194036280E4BEC957B194036A871B4136A831B40 |
| 101 | A97E299E6A901A9818A97E16418567E2981865181A87E65679A9806518657819A985A981 |
| 102 | FC7E3CC189A4D254D4562B1654C30180FD80037E03018654D1AAD5A9AB6994DCF9870180 |
| 103 | FC01BF1F89A32A6934A92B158ACCF180C0600C79830186A4ADAAD459D369B4D3FE030180 |
| 104 | C97D319EAC902B18149C57A4D4063579B1403602B19EA367D3181463A864F419CA81B340 |
| 105 | F0782592CAA55331980F781A52C55550CD98C31E294B499333FC003C9E568B566B340201 |
| 106 | F9653E594066501994AC4F94CC0534FAB0C0061ABE594F91A8199553B054EC1ACB02B0C0 |
| 107 | FA57BD540C931B18D805283D540364E318D836318E4D8055782941C94E4E6D9FAA842940 |
| 108 | AA52A64D2F07FB0C66994B2A8B4C3663C000552D1992C0F000F39999CB6AAB4C3E67C200 |
| 109 | F550318D8F550318D80A2F8E526F550318D8C649BD4BE393642B41393642B4139B602940 |
| 110 | A94D2992AFC67BCD80A932A98D40367831805632A992A03183CD8156CD69AD4FC9843181 |
| 111 | BB5A2D1768843A1D10BB5A12C88773C21D10445A12D7677439E11044DA2D28988BC5E111 |
| 112 | FF4C83CD2C3528CCAAAA661687896781980000333C12C3C2D33155AAE656A7996F819800 |
| 113 | FA1B3D472FA1B0298C9C2824CBE9C281B14005648298CFA1B0298C63D79B3419CA85B340 |
| 114 | FC5480CACCF328C1345601AA5F86567A6860F3533CD4CC035300D45986566196AE05A980 |
| 115 | FA02BE9F49C31A713836648D86C5057940A0F5050281493361B2D939E37198D5FD068140 |
| 116 | F061B0DE0AA4CA6554A54B1A4B4FF660CC000F618F1E0554C99B555A4B65AB500E633201 |
| 117 | EB7205036EB723ADC82714361AE271409C50EB0D851C81472051C7272EBF6251D89436050 |
| 118 | AA55294B499332592CCC6630C78FF003C1E05A2D15554694B198CD3C9E4CF980FF840200 |
| 119 | FF4CBC12C551996878CE352B315469079980000333C12CAA66168783CAD7315596F859801 |
| 120 | F06629532C37FA59540F19A95323C0025954A54CBC198692A8F0015AB37C39896D54F000 |
| 121 | FA02BD414C964B198C057D3D414361B3198C9C31A4CD8AF57A8140634E64ED950A868340 |
| 122 | EE5DB490EE15A37510115D8B50E1E5A0891011220B4F0E15A37511EE2274AF11EDA48910 |
| 123 | CC61A652C9934B3078FF78154B4AA2D001E03C199A4CC694C8F3990F80695555AD57C000 |
| 124 | EE70B85DC442592C88DD690B444773C21D101170879DCBB25AD08822E97484588BC5E310 |
| 125 | ED5C3B5701223BB570125C04970ED2384970E25B874901D24074901DDBF8A91E2A438A91 |
| 126 | DD6EA1D0EDD1121CF0226E9E10E22111E0F0D269221102D691DF112DE95DD11D2E922311 |
| 127 | ED71049C4B85B91D6E120EBB43A47242E090ED71049C447242E091EDF104BC547A46E090 |
| 128 | F0782A954C31E264CCA52D3FC00964B331983C1E198CC0F781575569CB0CF995AAD40000 |
| 129 | ED713B43AB85BAE090120E849C4B85BAE090120EBB43A47242E291EDF1449C547A46E090 |
| 130 | EE6EAD10E116E92D0E111112CF0EE112D0F0E1692ED101E6911311E1E96EF111E6951310 |
| 131 | AC4FAB13EAC4F94CC053302B13E533014CC0AC302B0C0534FEB2C1534FEB2C1ACB02B0C0 |
| 132 | A954AA4AC9A4D19534FC01BF1F8CF180C060592C9654C6A35656D40CF9C32193FE030180 |
| 133 | A954AA4ACA6531654CFC01BF1F8F306030186532995346A35254D430E78C2613FE070380 |
| 134 | FC5333D2AA979A6980032CB3D2A560626980032C8C0D4A979E6B81FCD34C2D4568666980 |
| 135 | FA02B2592F5053198C9C31ABD5E933628140057D0D86CF5053198C634E540A193B668341 |
| 136 | FC7E2994C037E1654CCF18254D430181A8D4562B03018A92B3CC1965CD0FF819ACD70380 |
| 137 | CC4CA5986FF55295E0CC33258780055169E03C34998660F2D154003C4B59B99F0AD6A801 |
| 138 | FC67BF060A64AA98D403183F0605935298D45632959340C1F83180A9CD55B35F3E043180 |
| 139 | F57ABD414C61CB198C391C8E58C0A7A82814A05017D4093361B0D96CB664CD95FD068140 |
| 140 | FC7E00DF8A6531654CCF180C06095351A8D4562B2A4AC0C063CC1865CD66B353FE030380 |
| 141 | A9532A54C9A4A994D4FC063F018CF1F8C180562CAAA54C6535196D503F9FF21930600C180 |
| 142 | C94E3E8A0C94E3E8A0C649BD4BE39360294036318155EC94E3E8A039B642B4139B642940 |
| 143 | AA552592CCC663C1E0A52D264CCC31E3FC0055551A52C336603DE05AAD59ACD3C1E00201 |
| 144 | AF502BCBEAF50141409C49A70D86336270D8633618D266336672B950AFD4141AF5014140 |
| 145 | EE6E910EEE11692D0EE16912CF0EE111111011112ED101E692D0F0E16952EF0EE9151311 |
| 146 | FF61AA92C3307998B4A54CBC198692A8F000001E2A92CCC78198B55AB37C39996554F000 |
| 147 | FC79958B2FC061594C9A4A8C07E9A350C18003062A54CF061594D65B573F819A354C380 |
| 148 | CC4CBFD54CC33001549661A95E0961E169E03C3483CB43C4B3C0B46619D560166E66A801 |
| 149 | FF55265980F2D1A478C34B295E0333315400005519998F02D258783C4B56BE1CCB36AA00 |
| 150 | BB5DAD168B425AEC88445D92D684B259108888441E0F0873C1DF1177C421EF178BC22310 |
| 151 | BB5DAEC88B45A12D688743A1CF088441DD10445D910884B5A2D16878C3DE2F177C422111 |
| 152 | FC4D3CD2A0332830D4A967A9980A967A99800332BCD2AFC4D030D5569829B81569869B80 |
| 153 | FC01AA4ACF3061654C3067995343F60254D4A954BF1F8A6530301965B2CC0616AB570180 |
| 154 | FF6603C7899551A4B455332952C330030DE0F01E00198962D19B555ACB6A8CD3CF833000 |
| 155 | ED5C3896E1223B896EED23BB8890125C38890122387490ED5C07690EDA3F8A9112DC38890 |

TABLE 10-continued

| Index | Midamble Sequence |
|---|---|
| 156 | FF4CB0D4A55199A41E00330F0B4AA66259E0F04B331545A1E19801F0CB333555A9E59800 |
| 157 | EE08AD096DD1121CF0EE772D16822111E0F01E70911762D691DD101E8F51288D2E962310 |
| 158 | FC5333D2A032CB3D2A032C8C0D4FC530C0D4A979A6980560666981A9F9E6B81560666B80 |
| 159 | FC54B3D34F32CB00D456019946059799A980032B33D340C53300D4A9FE19661A6865A981 |
| 160 | C97D325F49C28270A03602B25F46357A70A0C67A8E414932F9B14139854E6156C505B140 |
| 161 | E169385A4B44392CF01E16B85A44B3C12CF0EE113B844BB3BD131111EEFBA45444451110 |
| 162 | CC4B3FD4AC34CBC15499619541E9666168003334800B4C34CFC354669E6ABE196E656800 |
| 163 | FC678307EA94D164D4FC1803180564D298D45632A992A03183CF8156CD698D5FC9843180 |
| 164 | A967AA59EA6601647EA96795860A66029980561815860591FA9981A9E7D5861A6E069980 |
| 165 | BB442D10EB43C2ECEE443B92CF04B4391110BB4412CF0B43C11311BBC412EF1B4BC11310 |
| 166 | FC182A4CAFC1815934A6353CC7EA63503180036795934FC185593559CAC3381A63503180 |
| 167 | FF4CBC12C551996878CC550F0B46600259E00F34800CCA561AA9983CAD7335496F859A00 |
| 168 | BB5A2ED68874421D104425AED68783BA1D10BB2591168873B9E110445A5136978C45E310 |
| 169 | F379A98B2A6533CC180C061654CA6533CC18C01FA552A95B5303813FE05AAD595B570180 |
| 170 | CC61A652CC3661A4CC66348CC78693330D98FF07AA8B4F0001695455D2C03E15A557C200 |
| 171 | F06629532F066168CC965530DFE96550F0000F19968CCF066168CC692ACF20096D54F201 |
| 172 | A967AA59EA6601647E561815860591FA9980A96795860A66029B81A967D5A61A6E069980 |
| 173 | FC7E158ACA92B00DF8CF18195349A4D0C0600C062994C59533CE193FE0656D56AB530180 |
| 174 | AF57ABCA09C31A7138A05017D4093361B0D8633198D3850D7D42A06CB664ED85F5028140 |
| 175 | BB442ED10BB3B91110B44392CF0B43C2D0F04B3C12CF04B43AD2F144BBEEF1044C411110 |
| 176 | CA653286A9F4F9813E351A8D594603027CC0CA1AB29949F30180C1CA9AF29959FB0580C0 |
| 177 | ED23BB48EE22438890ED23849701D5BB8890125C3B48E1D5BB8890125C44B71E2A478891 |
| 178 | EE5DB8568E125BB888223B8B4F02D43889101122385681E5A3BA89DD444B6F1D2BC08910 |
| 179 | C97D325F49C5798CA0C9028D9F49C28270A039050E4146C2FA4D4039FAF18156CD05B141 |
| 180 | ED093B5DAB82391C8E127684824475C2E170E20EB89C4B72412090E20EF89C5B7A452291 |
| 181 | A97E2A406A679A9818A97E159F859062981865181959E6A1F9A980651866A6195E05AB80 |
| 182 | EE5D84576E15A07968DD44089102D3C348F01E25B849611223BA892DBC34AF1DDC448910 |
| 183 | F97CB286AF9033299406030D594F9033299453299813E5356180C1ACD667EC153D6180C0 |
| 184 | F052B0CD2C34B3C0B4FF55330CC3333001545A079A586699E56BE1550059B9999662A800 |
| 185 | FA648D80AF5630E414FA1B0D9F40A63318145031A715E5F3664F4150CE672A0A0B61B140 |
| 186 | EE08B843CE170BB9DC445D92D684B2591088DD110B5A4D26908A4577C421EF178BC22110 |
| 187 | FA7D0D86CC66302814AF2818D38933617D40057D3246C39633D61450A8673396CB668140 |
| 188 | A954AA4AC9A32A6934FC7E00DF8CF180C060592C9654C6A4ADAAD40C867CE193FE030180 |
| 189 | FF2AB0CD2F02D330CC9919A941E961E2A80000550F12CF02D330CC66E6569E1969E6AA00 |
| 190 | CC61AA94A9934BFC1EC3662955496333C000331E154B4664B001E1C3E62975596B33C200 |
| 191 | A954A6934FC7E0C060A62CA54D4F3060FD80565499534037E33C60592CDAAD50C8670380 |
| 192 | ED5C3896E122387490ED23B8890ED23B88901223B896EED5C0749012DC78A9112DC38A90 |
| 193 | F9563293EF929B28C006298D4C0F929B28C00629B293E0656328C0F9D64D6C106D632AC0 |
| 194 | AA4B2A92CFF6180078A54C968CCF0663C198662D198B43307B31E169AAE5B543C004F201 |
| 195 | FA1B3D4729C2824CBE05648298C63579B140FA1B0298C9C281B141FA9B02B8D9CA85B140 |
| 196 | CF67B01809A32A54D49A4D1A8D4CF180FD8030678FD8065329AAD5654D656D5309830180 |
| 197 | CC61BFDE0994B154B49934AA8B4CC1E001E03C1983C0069332955469CCD6B553CE67C200 |
| 198 | CC61A5932AA52BC1FECC1E258CCAAA2D3C000331E1A4CC552D03C00CC1E65ACDAAAD7C001 |
| 199 | CA4FB293ECA4F8D4C0CA300D53ECA30328C035300D8CA4F8D4C135CFF2AC1CA30728C0 |
| 200 | EE70B75A41170889A444259DCF0BB25A20F0E1770B4441E7774A444BA261F11B4A21E110 |
| 201 | CC61BFC1E994B2A8B4C3663C00069331695466349554A331E001E069B356B54C3E67C001 |
| 202 | F5633D58C935024D40F51C8298C932F9B1400A1CBD58C6C2FE4F410AE302B8D6CD01B140 |
| 203 | FC54BCCB2A97E2981830328FD2A65181A980032B0314CA97E29819CFCD302D565985A980 |
| 204 | FF19BC078992AA58B40F6180198695299954AA331692CCCC000F3E15ACB2AACD3CF833000 |
| 205 | FC79B3D80A953194D403798C1805653268D4562C994D4038673F80A9ACE6AD4FC060C180 |
| 206 | ED5C3B48E122384970E25BB8890E25BB88901223BB48EED5C44B711DA478A901D2438890 |
| 207 | F052A5986F02D258783C349681E3C4B169E0FF5526598005519999333355601CCB32AA00 |
| 208 | F9563293E06298D4C00629B293EF9560D4C0F929B28C0F929B28C006D672AC10656728C1 |
| 209 | CC4B3FD4AC34C83CAA9961AA9E09666168003334800B43C333C35599E1EABE096E656A00 |
| 210 | CC5530D4A997FA59E0C352B3154690799800332AB0D4A6600259E03C2D73355967859A01 |
| 211 | EE70BB83CD26EB4844110F3B83C2D1134844442591168783B9E110BB5A5136987C45E311 |
| 212 | EE5D888EEEE2208910E15A0B4F01E5A348F01E25B490E1E5A348F111A277711EEA208B10 |
| 213 | DD69375A4D26E8B444883C220F0873B9E1102216B75A42D110B44577C3A22F178C45E110 |
| 214 | FF61AA92CF066168CC3307998B43C00259545534800785A333C39999D2B33E196D54F000 |
| 215 | EE08B843CB425AEC88DD6EB49A48743A211011773843C4B5A2EE89229174BA5783C62310 |
| 216 | EE70AEC96E1772D08822169DD0E2D111E110110F11168E1772D288DDE9622F12D911E110 |
| 217 | E170AD168E10F12D68EE08AEC88EE77110882D169E0F02D6921CF022EEDDD11229162310 |
| 218 | FC54B3CCAA97E26860032B0C134A97E268600C2C8FD2A59061AB81F3D3702D459865A980 |
| 219 | D86BB6050D86BB6050271409DAED86BB6050D86B89DAE271436051271476251279476050 |
| 220 | E1693B9BAB443AED10E116845BAB43C111101E1684444B4C3EED111EE97BA45B43C11110 |
| 221 | AF4E2BD38A04997CD89C5798CA0935024D40504E141385F49A80D863D7E72A16CD05B140 |
| 222 | F9652B13EF91AAB0C0061A94CC0F91AAB0C0061AAB13E06652B0C1F9E554CC106E56B0C0 |
| 223 | EE708443CDD16889A44425AED687743A20F0E177385DCD21134A454B2252E8978C41E110 |
| 224 | EE6907844EE6907844BB4392CEE443C2D1101116B85BAEE694784544C6D31144BC6D110 |
| 225 | EB75851D6EB0A050282713B604E276C361B0E47206DC81B72391C9281475E51D7940A250 |
| 226 | FF61A654A55348CC1E001E198B4AA4B331E0F066259545A330F001F0E6659555AB30F200 |
| 227 | EE08B7444E10F0B5A4E170B49A4EE7708844445D9DD104BDA61EF04BA5DE2F1442222110 |
| 228 | EE5DB8496E15A3B888112207968E15A3B888223B8B50E2D3C08911DD4474AF12DC48910 |
| 229 | AA7FA6598A5781A4785A079A4785500265989919AA800961E56BE169E1D6BE066E66A800 |
| 230 | BB5A2ED6888439DCF0BB2591168883C220F04B2212C88783BA1F114BDDED28878C45E110 |
| 231 | FC4D00CCAA967AA59E0332BF134561815860F34A830D4A66029B81F3CAC32D4A6E069980 |
| 232 | E46BB9050E46B86DAEE46BB90501B14390501B1406DAE1B9479250E4EBF92501B1439050 |
| 233 | EB723ADC8EB0D851C8271409C50276BB6050140DBADC81472051C9D8EBC9E51D81476050 |

TABLE 10-continued

| Index | Midamble Sequence |
|---|---|
| 234 | FC2B3CCB2A901965E6CF32B00D49A181A98003548314C567E29819CFB2F02D59A985A980 |
| 235 | AF57ABCA09C31A71389349A4CD8A02FA814050282BCA0634E271396CB664CD95FD068140 |
| 236 | E1772D176E108AD0881E08AD1761E772D088D26EA1D102DEEDE1112D9161F11D2915E110 |
| 237 | FC54830B2CF4D0FCD4FC2B0314C304D300D45601A99E665182578156FE69A189A985A980 |
| 238 | FA648146CF5633D58C3602B25F439050E414AF3194138A036280D963D7E70A16CD05B140 |
| 239 | FF19B3000A534A58B40F618F1E0554C99954AA3319954F01E0F3E15ACB25AB500E633000 |
| 240 | FF61B31E05534998B4A54CA59540F198F000001E331E0AA4B198B45AB365B54F0E60F201 |
| 241 | E472391C8D76B8A050E40D86DC8D71435C501B7206DC8286BF5E511B8DB93C928940A050 |
| 242 | EB0A3ADD6D813B61B0E40D86C36D7140A050147585028D813B61B01BF2791C9D7944A250 |
| 243 | FA4E3255EF549B19400531B255E0A363194005318D8A0F549B1940FACE0DAA10AB671B41 |
| 244 | FA57BD540055782940C94E0E4D8364E318D836318E4D8C931B18D805A87D741FAA842940 |
| 245 | F061A594AA54B30DE0FF19A64AAAA33330000F1E1A4B4A54B70FE100E659955AAB333000 |
| 246 | ED0EBB43AED0E849C4B82411D6EB8242E0901271049C4ED8EC49C547DBEE291B8A42E090 |
| 247 | AF57ABCA09C4E18D38A02FA814093361B0D8633198D3850A86BEA06CC9DB2D85F5028140 |
| 248 | EE08B843CD216B7444445D92D6878439DD10EE770783CD2690884544A26D36978BC22110 |
| 249 | E170B485AEE08B75BA1E0F0B5A4117708844B45A21CF0BB2222111B4DA61EF1BBA222310 |
| 250 | FA7AB2472C9633E814502F98D2663361414005050D98CC9633E814AF50670D963B654341 |
| 251 | FF660CC00A54B1A4B4F01E0F1E0AA33199545533265540F1E30DE15ACB65AB5006673000 |
| 252 | EE08B7444E10F0B5A4E170B49A4EE7708844445D9DD104BDA61EF14B25DE2F044A222110 |
| 253 | FF78001E0C3660F198994B1992CA55516954552D2A8B46933258CD331E732790F807C000 |
| 254 | FC5480CACF32C8314C3032B3D343F4AB00D4A97E2A5F8A606298196598596616A605A980 |
| 255 | C94E31926FA57828BE36318E4D805283D540C931B18D8FA2802940C9B1B1AD9FAA842B40 |
| 256 | A94D2A4CAA94D15934FC67BF06003183F06059351652A593569AD40C9FC3381F3E003180 |
| 257 | FF4C95466F04B168780F34A958600332A998CC55198003C2D259E13CAD25BE1CCD559680 |
| 258 | EB7205036D86B89C50EB723ADC8271409C5014723AC36276BB605114F2453C9D89436050 |
| 259 | EE70B745A1E088B5BABB5A220F04B221E110110F089A4E1F774A45BBDA222F14BA21E110 |
| 260 | FC7E00DF8A92B158AC9A4D19534CF180C0600C063CC1859536994D6AB5656D53FE030180 |
| 261 | BB442D10EBB4412CF04B3C110EE4B3C2ED10BB3BAD0F044442D2F14BC3D1111B4BC51110 |
| 262 | EE08BB9DCE10F0783CD216B49A4DD1108844445D910884B5A2D36978C3DE0F177C462110 |
| 263 | EE70AED68E17712C8822169DCF02D1121D101170911681E772D289D16E22F1D2911E110 |
| 264 | FA64BD58CFA1B0298C503197CD8504E280D836028E414367D318149CD7E4F419CA81B340 |
| 265 | F97CB286A067C8D46AAC5627CC05356180C006030D594F90332B94ACD667EC153D6180C0 |
| 266 | E170B49A4B425A1CF0EE7708844BB221DD101E708B5A44BA5DE0F111F777645442222110 |
| 267 | FF550CCCC996615400F02D0F12C961E169E00F2D30D2C691E297E000D5732CD66E66A800 |
| 268 | ED5C3B5701D2407490ED23849701D5BB88901223BB570E25B8769112DC44B71E2A478890 |
| 269 | CC78331E09655259549952998B4C37F8F0003307B31E0692AA5954662D598B53C804F201 |
| 270 | CC4B3FD4ACC4B000B49961AA9E0661E2A9E03C3303CAA3C333C1556999D6A0196E616800 |
| 271 | FC79958B2A95300C18CF60194D4653533D800379AA4B256533F01830E066AD59AB54C180 |
| 272 | EE70AEC9622169DD0EE1772D0882D111E110110F11168DD69222F0E1F76D2892D911E110 |
| 273 | EB75BAC28140A3AC28E40DB91C81B72391C8271389DB0D86C09DB128EB8A251D7944A050 |
| 274 | FF55295E0C34B265980055169E03C4B1999833331A4780F2D15400CC3325A79F0AD6AA01 |
| 275 | EE692ED0E1116910F0E16EAD110E16EAD1101116AED0EEE69512F11E116D3111E912D110 |
| 276 | CC4B30D32FF52BC154CC4B0F0CC002D3C154661E1A466550796800661E65B99AAF816A01 |
| 277 | FF5526598F02D258783333154003C4B169E00F2D1A478005519B99C3CB697E1CC332A800 |
| 278 | FC54A699EF3532558003549959E0C531A980032B19460F35325581FCAB26A610CD31AB81 |
| 279 | CF67B01809A32A54D49A4D1A8D4CF180FD8030678FD8065329AAD565CD256D5301870180 |
| 280 | ED0EBB43AED0E849C41271049C4ED0E849C4B82411D6EB8246E09147DBEE291B8A46E290 |
| 281 | DD443490ED243B7510DD3BB48F02D43889102231BB490E2D3C3771122C474AF1D23C48910 |
| 282 | EB0DBAC36D81409DAEEB0D851C8D814360501472051C8276BF6051EB8DC53C9D89476050 |
| 283 | F549BD526C650319400A363D526392FB1940F549828D8392FF1B410AB6428D9C6D031940 |
| 284 | DD4437510DD3B889102D3C0B4F02D43B48F0D2438B4F0D2BC74AF1223BF771122C408910 |
| 285 | F061B31FEA534A64AAA54B26554F01E330000F1E0CC005A4B19B55A5CB66754F09E73000 |
| 286 | FA57BE8A036318D938C94E0D93805283E8A00A2F82940C649B18D939B671AD9F5D042940 |
| 287 | FF2AB0CD2CC333C0B400550F12CCC333C0B4A507A6466961E2A8015AF859999969E2AAA00 |
| 288 | EE6EB85A4443B92CF01111385A4BB4412CF0E116BB8444B43911101EE93BA45B4BC51311 |
| 289 | C94E32538C9318D9383631B2538364E0D938F5503D540F52FC2B410AAFBD7410AD002940 |
| 290 | FC79AA54C301F994D4A92CBF018654A8C18003062A54CCF60194D456537F2199AB50C381 |
| 291 | F929BE4A6CA300D53E065601958354FB28C0F92981958CA3032AC1F929C1B59CAB0328C0 |
| 292 | F91ABE46AAC3014D3E066501994534FAB0C0F91A81994AC302B0C0F99AC1B95AC306B2C0 |
| 293 | E170AD096D26921CF0EE772EC8822111DD101E7092C962DE95E2F1117751289DD1122110 |
| 294 | CC663FC00C31E3C1E0964B294B499332A954663315554694B168B43C9E43FE033E640200 |
| 295 | CC7FA64AAC378258B43C079A54A33001995499553300692D0F3E069AD4F3E199D533001 |
| 296 | EE77045DCB45A12D68221137444783C21CF0E10F0783CBB22110892DE974BA477C462110 |
| 297 | FF61BC198AA4B168CC33078F000662D259545534968CC001E3C39999D2A5B55CCF84F000 |
| 298 | EB72051C8D86B89DAEEB72051C8271436050140DBAC86271476251EB72453C9271436050 |
| 299 | FA648146CF51C8298CC97D325F4C605318145031ABD385F49A80D963A858EA16CD01B140 |
| 300 | F07FB0C66C3663C0005A2A9A532693316954A555258CC6933569B550F804F398C3E67C000 |
| 301 | CA4FB293ECA4F8D4C0CA30328C0354FB28C035303293E35300D4C1354FF2AC1CAB0728C0 |
| 302 | FC79B3D80562C994D4A92CA68D403798C180030633D80A953194D45653668D5FC864C381 |
| 303 | EE08B843CBB2212D68226E8B5A4774421CF0E170BB9DCB45A110882D16C8A45783C62311 |
| 304 | AF57A7138AF2818D38A02FA4CD8A0501B0D86331940A063CE6BEA06CC9D7F406C3628140 |
| 305 | F9563E5580629BE55835300D4C0CA4F8D4C0F9298195806560195935CFF28C1CAB0728C0 |
| 306 | E15A3B976D243B7510E12584576D23C0891101E2584488D243F77111EDA7BA88D2BC48910 |
| 307 | EE6EB845A443B92D0EE1693B8444B3C111101111079A4BB442D0F0E1693BA454BBC51311 |
| 308 | EE0F2EC96DD16A20F0E108AD0882D6E9E1101170AEC962269622F11EF76D289D2911E110 |
| 309 | FF61BC1985534968CC9952A595433078F000001E3C198AA4B168CC662D65B55CCF80F201 |
| 310 | CA653286A9F4FA7CC0CA1AB2994604F980C0351AB286A603027CC135E532B959FB0580C0 |
| 311 | FF7833078331E001E0552D1992C994B2A8B4A555258CC6933169540F804F199C3667C201 |

TABLE 10-continued

| Index | Midamble Sequence |
|---|---|
| 312 | FC01B3C60A62CA54D4FC7E0C060A6531A8D45654995340C798FD8056AB66B350C8670180 |
| 313 | FC183CC7EA932A98D4A9329652AFC1803180036783180A932A98D556CD69AD4FC9843180 |
| 314 | FC7980C18A92C9594C301FB3D80654AA68D4A9532A54CFC063F01965B5196D530E00C380 |
| 315 | FA02BD5EA9C31A4D26C91B3198CAF2828140057D02814634E5B2D8C99B71B8DAFA828140 |
| 316 | FC79AA54C03799594C9A4AB3D80654A8C18003062A54CFC0615B4D65B573F819A354C180 |
| 317 | F04B3C12CAA662A9980F34BC12C5519AA998C3528F0B4997F998003C2D4F2B5668019A01 |
| 318 | E1693845AE169079A44B3C12D0E4B3C2D0F0EE6EBB84411117BA4544BBD1311BBC411110 |
| 319 | E16EB85BAB44412CEE1E11078444B3BAD110E16E87844B4442D111E1EE87A45B4C42D310 |
| 320 | F5503D4BEC6498E526C649B18D8F550029400A2F82940393631AD9C6C9F1AD9F55042940 |
| 321 | FC54B3D34032B33D34560199460A97E19460F32CB00D40C53300D459F9DAB81A6065AB80 |
| 322 | ED712E16E127111D6EED7111C9012712E090120E91C90ED0EAE290EDF151E9112F12E090 |
| 323 | EE6EAED10E116AD0F011112ED101E692D0F01E1692CF0116E91311E1E952EF1EE1151110 |
| 324 | F9653E46AAC4FAB0C0061ABE46A53302B0C0061A81994AC4FAB0C1F9E541B9453B06B0C0 |
| 325 | F07FB0D98C319BC000A5551A4CC9633169545A2A9A4CC69CCD6B550F0070F993C663C000 |
| 326 | FA4E3255E0A360E4BEFA4E0D8A00A363194005318D8A0F549B1B41FACE4D8A10AB671940 |
| 327 | FF662952C553303C7833001A4B4995530DE0F01E2A8CC5A4B003993CF819B5596AD33000 |
| 328 | AC562B1589F3027CC05329AB158604FA7CC0AC2994D589F4F982C053D654F5960B0580C0 |
| 329 | C94E324C6F5503D4BE36318D9380A2F82940C94E0D938F55002941C9CE4D939F5D042940 |
| 330 | AA4CA952CA534AA8CCCC7FB0DE0C307B300055332952C5A4B2A8CD338070FE13CF833200 |
| 331 | FA64ABD38F51CA80D8360298CA0397A9B140051B2BD380A63280D9C9DF18EA1C6855B140 |
| 332 | A94D2A4CAF3603CC7EA94D15934F36003180563295934 0C1F83381A9CD55B35F36043181 |
| 333 | F07FA94AA964CB0C66C366258CCA5553C0000F001695469330F399C3E665ACCA5D57C000 |
| 334 | EE70AD17622169E0EEEE0F2D08822691E110110F12C88DD6921F11EE8F6D08922E91E110 |
| 335 | F550318D8C649BD4BE0A2F8E526393602940F550318D8393602B41F5D071AD9393602940 |
| 336 | AC562B1589F3027CC0AC2994D589F4F980C05329AB158604FA7EC1535654F5960B0580C0 |
| 337 | EB75851D6D86C09DB0EB0A05028276C361B01B0DB9036281435C511BF2393C9D7944A050 |
| 338 | E15A38496DD44374EE1E25879682223B88910E15A07968DD4408911E1DA47969DDC448911 |
| 339 | FF6630DE00F1E0CC0055331A4B4A54B26554AA33258B45A4B1995400E64F3E1F09E33200 |
| 340 | FA64A715EFA1B270A0051B18CA0FA1B270A00A1C9B0BE0A631B341F5E364F410A631B140 |
| 341 | FF660CC00A54B1A4B4AA3319954F01E0F1E00F1E30DE05533265555ACB65AB500E633000 |
| 342 | FF00264CCA52D30C780F781A52C55550CD98CC662A954964B3C1E03C1E56AB566B340001 |
| 343 | C957B255EC9578D8A0C65031940392FB194036283255E36280D8A039AFF1B41C6D031B40 |
| 344 | CC66264CCAA553FC003C1E1A52C5A2D03DE0C31E2592CA52D3C3E133C659ACC55D540000 |
| 345 | FC79AA54C9A4AB3D8003062A54C653533D8003799594C654A8C181FC865594D9AB54C380 |
| 346 | FC79AA54C03062A54C9A4AB3D80653533D8003799594CFC0615B4D65CA8C3819A354C181 |
| 347 | AA552592CA52D264CCFF0030C078F078331986633168B4694B1555433E643FE13C9E40000 |
| 348 | EE70BB83CB45DAD0882216889A4783B9E110110F3B83C4B222D089DDE948BA587C41E110 |
| 349 | FC01B3C60A954A6934A62CA54D4F379B0180037E33C60562B66B3559D3656D50C0630380 |
| 350 | CC61B3078FF78001E0964CA58CCA5551695466349992C552D2A8B43C19CF3990F807C001 |
| 351 | EE708443CBB2591168E177385DCB4222D0882216B75A47743A20F02D914B44578C45E111 |
| 352 | DD443490EDD3BB48F0D243B75102D4388910223BB490E224434AF12D3C77711D2BC08B10 |
| 353 | FF4CB0D4A0F348CCAAAA66259E05A1E1980000330F0B4F04B33154AAE665BE15A9E19A00 |
| 354 | FF55265980F2D1A478F02D2587800551999833 3315400C34B297E13CCB56BE0CCB36A800 |
| 355 | DD693745ADD69089A42D110B5BA2D11348448843A20F0773C222F178BB9E31187C45E110 |
| 356 | C94E324C6C649B18D8FA578155EF5500294036318D938C649B18D805287EAA1F55042B41 |
| 357 | E177385DCB45D92C88D21134844873B9E1101E08B85DC4BA212E892DEEF4A4478441E110 |
| 358 | AA553FC00964B30C785A2D03DE066330CD98993333198A52D3C3E1694B4F27955D540000 |
| 359 | F061BFC669652A64AAA54B2A8CCC378330000F1E0019869AD59B55A54B6AACDC37833000 |
| 360 | E170AD168D216A1CF0EE08AEC88DD6EA21101E0F2D168CDE961EF111F72EE89229122110 |
| 361 | AA782A9E0A57F968009961998 78966625998661E198786919A59995587EA9E15A8056800 |
| 362 | FC54BCCB2032B0314CCF4D300D4CF4D300D45601965E6A97E2981965985A98165985A980 |
| 363 | AF57A70C69C4E2BCA0A05024CD86C3617D40505798CC663CE540A15FD05B2D8933628140 |
| 364 | BB5DAD168B425AEC8844222D1684B5A2EC88883BA1CF08743A231177C461CF178BC22111 |
| 365 | F9652B13EF91AAB0C0061AAB13E06652B0C0061A94CC0F91AAB0C0F9E554CC106E56B0C1 |
| 366 | A9532692AFC798C07EA92CA68D4FC060C180562C994D4030633F81A9ACE68D5FC860C380 |
| 367 | FC01A98B2A954BCDE6CF18254D49A4D30180037E1654C562B03219CF18656D59ACD70380 |
| 368 | FC01B3C60A954A6934A92B19534FC7E0C0600C798FD80592CDA8D559D3656D50C8630180 |
| 369 | EE77045DCB45A12D68221137444783C21CF0E10F0783CBB22110892DE974BA5774422310 |
| 370 | FA02BD5EAC91B3198C36648E472057D02814AF2828140634E1B0D963CE5B2D9AF2868140 |
| 371 | FC79BF0189A4AA68D4562C9594C301F8C18003063F018653526AD5A9D355B4CCFE04C180 |
| 372 | FC5480CACCF4D33D340354BF0AC304D0C134A6799641895602558159F9E9A196AE01AB80 |
| 373 | C97D318149C57A4CBEC97D3181463281B14036028E5EA63281B140C97D71A1563285B341 |
| 374 | EE77349A444221E0F0E10F374444B5A1DD1011770B5A4BB2221CF01E0F48A44B4DA62311 |
| 375 | FC54AA5F803549 59F8CF4D19460304D268600C2C96418F32CA98193FB565781C0B55AB80 |
| 376 | FC54BCD4C9A67A5580032B3CD4C65182558003548314C65679A980FCAB4334D9A185AB81 |
| 377 | EE7091096DD169DD0E110F2ED682269220F0E17712C88D2111E110E17752E89D2915E111 |
| 378 | FA64B25F4AF4E18CA005648D9F4504E270A00A1C8E4145F3624D40F59CF1A15A0365B340 |
| 379 | FF5530D2C55001A4780F2D0CCCCA57826598CC333C0B4666616BE13C4B40355961E6A800 |
| 380 | FF662655455330CC00F01E258B45A4B0F1E00F1E1A4B4A54B30FE1006659B55AAB333000 |
| 381 | AA52A652C964CA9554FF07B3078C319BC000552D2652C6933295540078732783CE67C201 |
| 382 | A954AA4ACF379BCC18562B2A4AC0C063CC189A32A6934C01FF0381654D66B353F6070380 |
| 383 | FC54BF0AC032B3F0AC9A67A68606518268600C2C8314CF3530334D6A9FDAB8195E01A980 |
| 384 | CC663C1E0C31E3FC009933294B4964B2A9546633168B4694B1555433168B4694B1555433168B4E13C9E40000 |
| 385 | FC01B3C60A954A6934A62CA54D4F379B0180037E33C60562B66B3559D3656D40C8670180 |
| 386 | F0553C154C34C8F0CC0F2ABC1543C330F0CC966625998A57F968016999E5B995A0056A00 |
| 387 | EE0F38422BB25AD0881170879DCBB25AD088DD168B5BA883C5E31122E974A4488BC5E310 |
| 388 | EE5D84488E15A38568E12587968EE223B888223BB75102D3C0B4F02DC3F4AF122C408B10 |
| 389 | CC5530D4A997FA59E03C2D0CCAA690799800CC550F0B46600259E03C2D7315596F859A01 |

TABLE 10-continued

| Index | Midamble Sequence |
|---|---|
| 390 | FA1B3240AF51C8E5EAAF31A70A0A0361B14005648D9F40A6331A15AF31E72A1A0B61B140 |
| 391 | AA4CBFD98A54B03C789652B0DE099550CC00554C801985A4B3C0786952CF3E166D573200 |
| 392 | A9533F1E6A92CBF018A95300C1856533F01865350C07E654A8C180653573F809AB54C381 |
| 393 | EB75BAC28D813B61B0140A3AC28276C361B01B0D86DC8286B8A051E4F246FC9D7940A050 |
| 394 | AC562B158AC2994D589F3027CC09F4F980C05329AB158535614F59604FE7EC160B0580C0 |
| 395 | FC533F14CCF4A8C0D4032CBF14C30350C0D4560615818651FA6981A9F9D5A199A6066B80 |
| 396 | FA02A70C6C91B2BCA0057D18D38C91B2BCA0F57AA4D26C663283410A855B2D9C6E328140 |
| 397 | F052BFD54A57815400C334B30CC961E199983C348CCCC691E265980FD2803555AF86AA00 |
| 398 | AF502BD409C4998CD8AF2F941409C36270D8633618CD8502FABF4163C9E72D9505014140 |
| 399 | F57AB198CF5050E58C0A7A8E58C0A053198C9349A8140933617D406CC9D7F406CB668341 |
| 400 | FF55330CC333300154A57825878691E169E00F2D0F12CC34B3C0B5558059B9999E62AA00 |
| 401 | FA02ABD5EC91B27138366498CC6057D140A0F5052814039635B2D939635B2D9F50528140 |
| 402 | EE70B85DCDD16B4844442592C8877439E110110F385DC226934844BBDA52E8988BC1E310 |
| 403 | EB0A361B0EB0A361B0E40DB5DAE1B720A050147589C4EEB0A361B11BF24A2511B720A250 |
| 404 | F91AAB0C0F91A94D3EF91AAB0C006652B0C0066514D3E06652B0C1F99AEB0C106E56B0C0 |
| 405 | CC4CBC14ACC333C0B4333303CB4CC333C0B49661AA9FE961E2A800699E55401969E2AA01 |
| 406 | FC54B3D34A97E194600C2C8FCD459062558003548C134567E66A61F32CF02D5A6865A980 |
| 407 | ED76B883A1209075C412768743AED09389C4B85C2DC90B85C6DE9147DC5209147DC52090 |
| 408 | FF6603C78AA331692CC3780CC00962D21995455332952C00667C279692D667553CF833000 |
| 409 | F061BFD98C3780CC005A34954CC692D26554A534AA8CC962D59B550F61C03993CF833000 |
| 410 | A979A6980A979A698056061947EA979A6980A9799947E560666B81568666B81560626981 |
| 411 | FC7980DE6A9531594CCF600C1806535268D4562CAA4B203063F219653566AD5CFE00C180 |
| 412 | EE692ED0EE16EAD1101116910F0E16EAD1101116AED0E11E116D311EEE9512F01E112D110 |
| 413 | EB13B9050EB1386DAEEB13B9050146C39050146C06DAE146C39051EB93F925014EC79050 |
| 414 | E1693B9BAB443AED101E69045BA4B4391110E169044444B3C2EF111EE97BA45B4BC11310 |
| 415 | EE113845AEE11079A4116E879A4EE11079A4B43C2ECEEB43C1131O4BC3D1311B4BC51110 |
| 416 | FF4CBC12CA561AA99800333C12C5A1E2A998332A8F0B4690799800CC554F2B596F819A01 |
| 417 | C964B1872FA02BD5EA9C4E24CD8AF2828140361B0E58C057D02A159C4E64ED9AFA868140 |
| 418 | A954A6934A62CA54D4FC01B3C60F379B0180562B269345953654D503FE73E610C8630180 |
| 419 | A97E2A5F89A18268605601AA5F86567A6860A67996418951F9A9805906566196AE05A981 |
| 420 | FA64B19EAFA1B31814051B0E414FA1B3181450319B0BE504E1B141AFCE64F4150CE5B140 |
| 421 | AA78265869961AA9E05507998789961AA9E0A57F9A466966656A005A8065B9996E616801 |
| 422 | E170B843CDD6EB7444B425AD168883BA21101E0F3843C2211374454BDA2D36977C462310 |
| 423 | E170AED76E10F2EC88D216A20EED269221101E0F11088E10F6EC892DE95DF11D2E962110 |
| 424 | EB723AC36140DBAC36140D851C8EB72051C8D86BB6050271476251D86BF6250279476051 |
| 425 | CC5530D4ACC550F0B4332A8F0B4CC550F0B49678265FE967819A016987D9A0096F859800 |
| 426 | FF07AA8B4C319A58CC5552801E0694C8F198CC1E1992CF00056B55664B732795AD53C000 |
| 427 | F9563E55835300D4C0F92981958354FB28C00629BE558CA4F8D6C006D641B59CAB0328C0 |
| 428 | FC5480CACA97E2A5F8F32C8314CA606298183032B3D346518194603FCAF02D56A605AB80 |
| 429 | AA4CBFD98A534BC0785A3483C78554C8019899550CC00962D4F3E169AD70FE066D573000 |
| 430 | FC01AA4AC9A32B3C60037E2A4AC654D33C60F379A994C954AB03810C8669B4D6AB530380 |
| 431 | AC4FAB13EAC302B0C053302B13E534FAB0C0AC4F94CC0534FAB2C153B054EC1ACB02B0C0 |
| 432 | FA57814A0C6498E4D8FA283E8A0C636318D83631B25380A2FBD54136CE4DB390AD002940 |
| 433 | FF782652CA55530D9800781992C5A550F198331E154B4693303C00CC1E6AAB596B33C201 |
| 434 | C964B1872C91B3198CFA7D3D414057D0281463319B126634E1B0D850A857F41AFA828141 |
| 435 | FA648146CFA1B3E86C0A1CBD58C0A630298C9C5798CA09C28272A16CAFE4F416C505B140 |
| 436 | CF4D2699ECFAD19460304D1959E304D26860C04AA55803F35255813FCADAB81C0355AB80 |
| 437 | FC54AA5F8303299460F353164183F35255800354959F8CF32AA68610CD329A19C0B5BA980 |
| 438 | CC66264CCFF002A9543C1E1A52C0F78168B4964B30C78A52D3C3E166B34CF99555540000 |
| 439 | EE70B85DC22168B4441170879DCDD16B4844BB5A12C88773C61D1144DA6D289883C1E110 |
| 440 | F9033E40CAC562B158067CBE40C5329AB158CA1A8D5949F4F982C035E54D79560B0580C0 |
| 441 | E1693B844B443AECEEE1693B8444B3C111101E16845BA4B3C11111E1E97BA454BBC11110 |
| 442 | AF4E2715EA03624CBEAF4E18CA0A0361B140503198CA05FC9DB141AFCE58EA1A0361B140 |
| 443 | CF4D3012ACF328FD2A30328FCD4304D300D49A67A55809A181AB819AE7E57809A185AB81 |
| 444 | F57ABD414C61CB198CA9349A4CD8A02FA81400A053D41439633198D6CB664ED95FD068140 |
| 445 | FA4E3D5260531BD5260531828D8FA4E028D8C957B1940362831B41C9D7F1B41362871B40 |
| 446 | F57ABD414C61CB198CA05017D4093361B0D8391C8E58C0A7AC2A156C3664ED95F5028140 |
| 447 | F379A994CF3061654C954AB018095350FD800C799654C0C0629F4D6ACACFF816AB530180 |
| 448 | ED713B43A120E849C4120EBB43AED71049C4B85BAE090B85BEE29147A46E29047A42E090 |
| 449 | FA7A81414C9633258C502FABD40633618CD8C91C8D98CFA053E81463C9A72D950D054340 |
| 450 | C964BE9F4C663028149C31ABCA0933617D403664815F439633D41563311D42A16CB668140 |
| 451 | C964A70C6F57AA80BEC91B27138F50528140361B18D380A0517D41C99B27339F58568140 |
| 452 | EE7087822DD168B5BA110F385DC226934844BB5A12C88883C5E311BBDA52E8888BC5E110 |
| 453 | CC61AA94AC366295549934BFC1E96333C000331E154B4C36629554664B403E196B37C200 |
| 454 | FF5530D2C00550F12C0F2D0CCCCCF02D330CC9966295E06666164E1699E55601969E2AA00 |
| 455 | FC79BF018562C9594C9A4AA68D4301F8C18003063F018A95315B4D65B526AD5CFE04C180 |
| 456 | D86BB6050D86B89DAE271409DAE271436050D86BB6050271436051D8EBF6251279476050 |
| 457 | EE0F3745AE1088B5BA1170889A41E7734844BB25A20F0B4225E311BB25E22F1B4A25E110 |
| 458 | FA7AABD4005052BD40C91CA70D83663270D8361C98CD8C96318CD805FAD4340FA8554340 |
| 459 | FC67AA534FC18159340C1F964D40C60298D4563280C6056CD3F261A6CAFCF81A63503180 |
| 460 | ED76BB424E271075C4472391D7048242DC901276848241D71389C4B8A3EE370B7A452290 |
| 461 | F052A95E0FF2AAA8003C349A478334C99998C34B1A478CC33199990FAD697E100D52A800 |
| 462 | DD443490ED23C374EE223B8B4F02D4388910DD440B4F0D23C08B11DDC44B6F0D2BC08B10 |
| 463 | EE0F38422EE0F079DCDD16B4844226934844445A12D76445A2D28977C3DE31188BC5E110 |
| 464 | FC01AA552A62CBCDE6037E158AC595303018CF1826934953530381CF9866B3495B570380 |
| 465 | F9563E4A6F9560195835300D53E3530328C0062981958F95601959CACFF2AC035B0728C0 |
| 466 | EB75B91C827138A050EB0A06DC8276C35C50147586DC8D813B5E51148A793C8D8EC0A050 |
| 467 | F061AA932C37826554A54B3FD98692D0CC000F61955323C78599555ACB40399962D33201 |

TABLE 10-continued

| Index | Midamble Sequence |
|---|---|
| 468 | FC4D00CCAA96795860F34ABCD2AA660299800332BF134A967D5A600CB5432D5A6E029980 |
| 469 | F97CAB0A6060314D58CA6527CC0CA6527CC0067C94CA6F9032B3593565582C13565580C0 |
| 470 | E25BB896EE2240756EE25B87490E224388901D24074901D5BB8891E2DBC7690E2A478890 |
| 471 | F052B3132F02D330CC0F2D0CCCCF02D330CC9661AA9FE961E2A800691E55601969E2AA01 |
| 472 | CA44FB293ECA30328C0CA4F8D4C0354FB28C035303293E354FB28C035304D6C1CAB032AC1 |
| 473 | A954A68CAA653254D4FC7E33C600C060FD805654994CA59531A8D5037E4C261F38670180 |
| 474 | F379A552AA653301800C799A92A59530FD80F306254D459534FF810C865A8D5A6D330180 |
| 475 | FC530C0D4FC530C0D4032CB3D2AFC530C0D4A9799947E560626B81560666B81568626980 |
| 476 | F0782592CA52D30C78FF00264CCAA55331983C1E168B4694B03DE133E61575566B300200 |
| 477 | FA64A715E056498D5EF56324D400A631B140051B18CA0FA1B270A0F5E364F410A635B340 |
| 478 | C97D319EA9C2824CBEC97D0E4149C281B14036028E41463579B140C9FD0E6159CA85B340 |
| 479 | FC54BCD4C03548314C9A67A558065679A980032B3CD4CFC2B0334C6598657819A981AB80 |
| 480 | FA1B3E86CC9028D9F4F51C8298CC60531814504E141386357A72A05FC9E82D96CD05B140 |
| 481 | F07FA5932F000258CCA55530D985A550F1983C19968AA3C6616954693343E0196B33C201 |
| 482 | ED0EBB43AB8242E090ED0E849C4475BAE09012713B43A475BEE291127144BC5B8A46E090 |
| 483 | FC5300CB2CF4A8C0D4A979AA5E69A6026980032CBF14CCF4A8C2D5568655A199AE066981 |
| 484 | FF529541ECC4B19878C34C9A466F05516800002D2A9E0CC4B19A783CB365B99F0D556800 |
| 485 | EE6E845BABB4411110E169079A44B3C2D0F01E16B845A4B3C2D0F111917BA45BBC411310 |
| 486 | DD692210EDD691DCF0DD16A20F02269220F02D111E0EE2D1121F112D6EDE311D2911E111 |
| 487 | E170AD168EE08AEC88E10F12D68EE77110882D169E0F0226E9DD102DE961CF1229162310 |
| 488 | F5633D58CC67A8E4140A1CBD58C39050E414A036280D8932F9B3415F49E82D96CD01B140 |
| 489 | F379A98B2954AB007EF3062994C9535301800C061654D6AB50FF81F38669B4C953530180 |
| 490 | CF6033D809A4A994D4CF1F8C1809A35268D46535194D4301FB3F8065CAE6AD530E00C180 |
| 491 | FC7E2A4AC301819534A6533CC186A350FD80037E158ACCF182693559D34321895B530380 |
| 492 | DD6EB485ADD11349A42D16889BA2D6908844884421CF077441E2F078BC5DF1187BC62110 |
| 493 | C9633E9EAC96301414C91CBE81436633E8146336140BE63362BD416349D43419CB654140 |
| 494 | E170AED76D216A20EE1E0F110882D691DD10E10F2EC88D2E922311E18F6EE89D2E922110 |
| 495 | EE5D84576E15A079681E25B849611223B888DD44089102D3C348F12DBC74AF1DDC448B10 |
| 496 | EE690445AEE693B9A41E11385BA1E1107844BB43910F0443C110F14BBBED311B4446D310 |
| 497 | CC7FA594A995530DE0C307A64AA962D3300033001A4B4995570FE03CF859B5596AD73000 |
| 498 | EB75851D6EB0A05028D86C09DB0276C361B01B0DB90361B72393C9289475E51D7140A050 |
| 499 | FA7D3198CC91B3D41450281B0D8634E17D40057D0E58C361B02814AF2864ED89CCE68341 |
| 500 | D86C3604ED76BB5C502713B604E281435C50D813B61B0286B8A25027EC763B1D7944A050 |
| 501 | EE5A04496EE5A3B968223C3750E223C088F0E15D878881E22078882DBBF4B11D2C434B10 |
| 502 | FA7D140A0C6631B0D8C91B18D38F50517D40057D2BCA0396324CD3969B273390A8568140 |
| 503 | C97D325F4C67A8E414632818CA06C2FA4D40C9028D9F4C605318156357E72A16CD05B140 |
| 504 | EB6C3AC4EE46BB90501413851B0E46BB90501413BAC4E1B1439050EBEC451B11B9479250 |
| 505 | FA6301472C97A8D814FA633E98C36050D81450362BD26632FE714150B6542D99CD027140 |
| 506 | E169385A4BB442ED101E16B85A4443BAED10E116879A4BB3B913111E6947BA5444451311 |
| 507 | A9533F1E6A92CBF0189A4A8C07E9A350C180562C80C18A92CBF01965B573F819AB54C380 |
| 508 | BB442ECEEBB44111104B3C12D0E4B3C2D0F0B443AD0F04B3C6D2F144BB91311BBC411110 |
| 509 | FC6780C60A93295934A94D2A534FC183F0600C1FBCD80594AA9AD559B5566D50CE003180 |
| 510 | FC7E00DF8A92B158AC9A4D19534CF180C0600C063CC18595369B4C6AB5656D53F6070180 |
| 511 | F052A95E0C34B1A4780F52969E03C4B25878CC4CA6598FFD55560133CCD9B9800D56A800 |

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for sending a middle pilot, comprising:
selecting a middle pilot sequence set;
creating a middle pilot subcarrier union;
mapping by a base station a middle pilot sequence in the middle pilot sequence set after modulation, through an OFDMA or OFDM symbol used for transmitting the middle pilot, onto a middle pilot subcarrier in a middle pilot subcarrier union corresponding to each transmission antenna, or, mapping by a base station a middle pilot sequence in the middle pilot sequence set, through an OFDMA or OFDM symbol used for transmitting the middle pilot, onto a middle pilot subcarrier in a middle pilot subcarrier union corresponding to each transmission antenna and then performing modulation on data at the subcarrier, wherein the step of creating a middle pilot subcarrier union comprises: setting a subcarrier in the OFDMA or OFDM symbol, the index of which meets the following condition, as a union of the middle pilot subcarriers, for transmitting the middle pilot sequence, of all wireless communication networking units:

$$\left[ N_{start} : 1 : N_{start} + f\left(\frac{N_{used} - 1}{2}\right) - 1, N_{start} + f\left(\frac{N_{used} - 1}{2}\right) + 1 : 1 : N_{start} + N_{used} - 1 \right]$$

the above formula represents that the index increases to $$N_{start} + f\left(\frac{N_{used} - 1}{2}\right) - 1$$

in the unit of 1 starting from $N_{start}$, and then increases to $N_{start} + N_{used} - 1$ in the unit of 1 starting from $$N_{start} + f\left(\frac{N_{used} - 1}{2}\right) + 1,$$

wherein both $N_{start}$ and $N_{used}$ are positive integers, wherein $N_{used}$ is the number of the subcarriers other than protection band subcarriers in an OFDMA or OFDM system, and $$f\left(\frac{N_{used}-1}{2}\right)$$

represents the integral value by flooring the $$\frac{N_{used}-1}{2}.$$

2. The method according to claim 1, wherein when $N_{used}$ is odd, $$f\left(\frac{N_{used}-1}{2}\right) = \frac{N_{used}-1}{2},$$

when $N_{used}$ is even, $$f\left(\frac{N_{used}-1}{2}\right)$$

is the minimum integer greater than $$\frac{N_{used}-1}{2}$$

or the maximum integer less than $$\frac{N_{used}-1}{2},$$

or the number obtained by rounding $$f\left(\frac{N_{used}-1}{2}\right).$$

3. The method according to claim 1, wherein the middle pilot sequence $b_n b_{n-1} \ldots b_0$ which have been modulated or not are successively mapped, in an order from the highest valid element $b_n$ to the lowest valid element $b_0$, onto middle pilot subcarriers ranked in ascending order corresponding to each transmission antenna, wherein $b_n$ is mapped onto a middle pilot subcarrier with the minimum index or onto a middle pilot subcarrier with the maximum index.

4. The method according to claim 1, wherein during the mapping, the middle pilot subcarrier, the index of which meets the following condition, in $N_{used}$ subcarriers is regarded as the middle pilot subcarrier used by a middle pilot symbol corresponding to a transmission antenna n:

$$\left[N_{start} + \text{offset} + n : \Delta : N_{start} + \text{offset} + n + \left(\frac{P}{2}-1\right)*\Delta,\right.$$

-continued $$\left. N_{start} + \text{offset} + \frac{N_{used}-1}{2} + n + 1 : \right.$$

$$\left. \Delta : N_{start} + \text{offset} + \frac{N_{used}-1}{2} + n + 1 + \left(\frac{P}{2}-1\right)*\Delta\right]$$

representing that it increase to $$N_{start} + \text{offset} + n + \left(\frac{P}{2}-1\right)*\Delta$$

by the interval of $\Delta$ starting from $N_{start}$+offset+n, and then increase to $$N_{start} + \text{offset} + \frac{N_{used}-1}{2} + n + 1 + \left(\frac{P}{2}-1\right)*\Delta$$

by the interval of $\Delta$ starting from $$N_{start} + \text{offset} + \frac{N_{used}-1}{2} + n + 1,$$

wherein $0 \leq n \leq N_{Tx}-1$, $\Delta$ is the interval between adjacent middle pilot subcarriers in each transmission antenna, $N_{Tx}$ is the number of transmission antennae, P is the number of middle pilot subcarriers used by each transmission antenna over the middle pilot symbol, offset is the number of specific offset subcarriers corresponding to the wireless communication networking unit and is an integer; and $N_{used}$ is the number of subcarriers other than the protection band subcarrier in the OFDMA or OFDM system;
wherein offset is determined by at least one of the following: the index of the wireless communication networking unit and a frequency division multiplexing factor.

5. The method according to claim 1, wherein
the middle pilot sequence set to which the binary middle pilot sequence corresponding to the wireless communication networking unit belongs is determined by at least one of the following factors: the number of transmission antennae corresponding to the wireless communication networking unit, system bandwidth, the number of subcarriers of the system, the number of discrete Fourier transform points, and the index of the wireless communication networking unit; and
the following factors determine the index of the binary middle pilot sequence in the middle pilot sequence set to which the binary middle pilot sequence belongs, with the binary middle pilot sequence being the one to be transmitted and corresponding to the wireless communication networking unit: the index of the wireless communication networking unit, the number of part or all of sequences contained in a predetermined sequence set to which the middle pilot sequence corresponding to the index of the wireless communication networking unit belongs.

6. The method according to claim 5, wherein
the index I of said middle pilot sequence to be transmitted in the middle pilot sequence set to which said middle pilot sequence belongs is one of the following:

$I = f(\text{BSID}, \text{CellID}, \text{MaxSeqNum})$, $I = f(\text{BSID}, \text{SegmentID}, \text{MaxSeqNum})$ I=f(CellID,MaxSeqNum)

I=f(SegmentID,MaxSeqNum)I=f(CellID,SegmentID, MaxSeqNum)

I=f(SectorID,SegmentID,MaxSeqNum)

I=f(CellID,SectorID,MaxSeqNum)

I=f(CellID,SectorID)

I=f(CellID,SegmentID)

wherein MaxSeqNum+1 is the number of part or all of sequences contained in the middle pilot sequence set to which the base station or cell or sector belongs.

7. The method according to claim 4, wherein after the modulation and the mapping are completed, the data at the subcarrier of an OFDMA symbol corresponding to n-th transmission antenna are:

$$P_{CellID,n}(k) = \begin{cases} 1 - 2q_{CellId}(m), & \text{if } k = m*\Delta + N_{start} + \text{offset} + n + \left\lfloor \frac{m*\Delta}{\frac{N_{used}-1}{2}} \right\rfloor \\ 0, & \text{otherwise} \end{cases}$$

wherein $$k = N_{start}, N_{start}+1, \ldots N_{start}+N_{used}+1, k+N_{start} \neq \frac{N_{used}-1}{2},$$

m=0, 1, . . . , P−1, $q_{CellID}$ is a middle pilot sequence with the index of CellID and corresponding to the wireless communication networking unit; Δ is the interval between adjacent middle pilots of each antenna, and offset is the offset of the specific subcarrier corresponding to the wireless communication networking unit.

8. The method according to claim 1, wherein the middle pilot sequence set is generated via at least one of the following operations:

selecting a natural number n for a middle pilot sequence set which contains S sequences, wherein n is the minimum natural number which meets $$2^n \geq \frac{m}{2}$$

or ($2^n \geq m$), and m is the length of each sequence in the middle pilot sequence set, and S is a natural number;

or generating n middle sequences $x_i(k)$, wherein $1 \leq i \leq n$ and $1 \leq k \leq 2^n$, the length of each middle sequence is $2^n$, wherein the i ($1 \leq i \leq n$)th middle sequence is $x_i=(1,1,\ldots 1,0,0,\ldots 0,\ldots 1,1,\ldots 1,0,0,\ldots 0)$, wherein the number of the consecutive 1s or consecutive 0s is $2^n/2^i$;

or generating S' permutation sequences of sequence [1, 2, . . . n] or S' different arrangements of sequence [1, 2, . . . n], wherein S'≥S and S is the number of sequences in said middle pilot sequence set;

or generating S' Golay complementary sequence pairs of $a_i$ and $b_i$ with the length of $2^n$, wherein $1 \leq i \leq S'$;

wherein, $$a_i = \sum_{l=1}^{n-1} x_{\pi_i(l)} x_{\pi_i(l+1)}, \ b_i = \sum_{l=1}^{n-1} x_{\pi_i(l)} x_{\pi_i(l+1)} + x_{\pi_i(1)}, \text{ and } \pi_i(l)$$

represents the l-th element of i-th sequence in S' permutation sequences;

or selecting M index sequences $I_j=[i_1^j, i_2^j, \ldots i_m^j]$, wherein $1 \leq j \leq M$, and any two elements in each index sequences are different and each element belongs to an interval [1, $2^n$];

or in the generated S' Golay complementary sequence pairs, selecting for each sequence $a_i$ and/or $b_i$ elements corresponding to index $I_j$ to construct a new sequence and totally construct S'M new sequences, wherein when n is the minimum natural number which meets $$2^n \geq \frac{m}{2},$$

the generated new sequence is $[a_i(I_j), b_i(I_j)]$ ($1 \leq i \leq S'$, $1 \leq j \leq M$), and when n is the minimum natural number which meets $2^n \geq m$, the generated new sequence is $a_i(I_j)$ or $b_i(I_j)$ ($1 \leq i \leq S'$, $1 \leq j \leq M$);

wherein $a_i(I_j)$ represents to select the elements with the index of $I_j$ in $a_i$ to generate a new sequence, and $[a_i(I_j), b_i(I_j)]$ represents to cascade the two new sequences $a_i(I_j)$ and $b_i(I_j)$ to form one sequence;

selecting, from said S'M new sequences, S sequences which meet a predetermined condition to construct a middle pilot sequence set, wherein said predetermined condition is: the maximum peak-to-average power ratios of said S sequences are all less than a first threshold value and the correlation coefficient between any two sequences is less than a second threshold value; and selecting a middle pilot sequence in the generated middle pilot sequence set.

9. The method according to claim 8, wherein the peak-to-average power ratio is obtained by:

mapping said S'M new sequences onto m subcarriers in $N_{FFT}$ carriers according to a specific mode, setting the remaining $N_{FFT}$-m carriers as zero, forming a sequence F of $N_{FFT}$, and then obtaining a sequence T by performing the discrete Fourier transform of $N_{FFT}$ points on sequence F, with the peak-to-average power ratio being:

$$PAPR = 10*\log 10\left(\frac{N_{FFT}*\max(T \otimes conj(T))}{\sum_{i=1}^{N_{FFT}}|T(i)|^2}\right)$$

wherein '⊗' represents that corresponding elements of the sequence multiply with each other, and conj(T) represents to take conjugation on each element of sequence T; said correlation coefficient between any two sequences is:

$$R_{kl}(\tau) = \frac{\sum_{i=1}^{N_{FFT}} T_k(i)*conj(T_l(mod(i+\tau, N_{FFT})))}{m},$$

$\tau = 0, 1, \ldots N_{FFT}-1$ wherein $T_k$ represents the k-th sequence obtained according to the above method.

10. The method according to claim 1, wherein the middle pilot sequence set is generated via at least one of the following operations:

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1,1,\ldots 1,0,0,\ldots 0,\ldots 1,1,\ldots 1,0,0,\ldots 0)$, wherein the number of the consecutive 1s or consecutive 0s is $2^n/2^i$;

generating S' permutation sequences $\pi_i$, i=1, 2, ... S' of sequence $[1, 2, \ldots n]$ or S' different arrangements $\pi_i$, i=1, 2, ... S' of $[1, 2, \ldots n]$, wherein $S' \geq S$ and S is the number of sequences in said middle pilot sequence set;

generating $A_l$ different binary Golay sequences $P_i$, i=1, 2, ... $A_l$, with the length of $2^N$, wherein $A_l \geq A$ and A is the number of middle pilot sequences in said middle pilot sequence set;

said $$P_i = \sum_{l=1}^{n-1} x_{\pi_i(l)} x_{\pi(l+1)} \sum_{l=1}^{n} c_l x_l + c, \ c_l$$

and c are any binary numbers (0 or 1); and inserting into each generated binary Golay sequence $P_i$ a binary sequence a with the length of $M-2^N$ to obtain a sequence Si with the length of M, wherein the j ($1 \leq j \leq M-2^N$)th element of binary sequence a is the (9*j)th element of sequence $S_i$, wherein $1 \leq j \leq M-2^N$;

wherein said binary sequence a meets: a is a sequence, which enables $S_i$ to have the maximum peak-to-average power ratio, in all $2^{M-2^N}$ binary sequences with the length of $M-2^N$.

11. The method according to claim 1, wherein other $N-N_{used}$ subcarriers in N subcarriers are set to be in idle state, wherein N is the number of subcarriers of the system or the number of discrete Fourier transform points.

12. The method according to claim 1, wherein said method further comprises performing a power/amplitude boosting operation on the modulated sequence.

13. The method according to claim 1, wherein said step of selecting a middle pilot sequence set comprises:

selecting a middle pilot sequence set from a plurality of preset middle pilot sequence sets according to a first preset factor, wherein said first preset factor includes at least one of the following: the number of transmission antennas of the wireless communication networking unit, system bandwidth used by the system, the number of subcarriers of the system, the number of discrete Fourier transform points of the system, and the index of the wireless communication networking unit; and selecting said middle pilot sequence to be transmitted from said selected middle pilot sequence set according to a second preset factor, wherein said second preset factor includes at least one of the following: the index of the wireless communication networking unit, and the number of part or all of sequences contained in a preset sequence set to which a middle pilot sequence corresponding to the wireless communication networking unit belongs;

wherein said wireless communication networking unit includes at least one of the following: a cell, a base station, a sector, and a segment.

14. The method according to claim 13, wherein the index I of said middle pilot sequence to be transmitted comprises one of the following:

$I=f(BSID,CellID,MaxSeqNum)$, $I=f(BSID,SegmentID,MaxSeqNum)$, $I=f(CellID,MaxSeqNum)$, $I=f(SegmentID,MaxSeqNum)$, $I=f(CellID,SectorID,MaxSeqNum)$, wherein MaxSeqNum+1 is the number of part or all of sequences contained in the middle pilot sequence set to which the wireless communication networking unit belongs, BSID is the index of a base station, and Cell ID or Segment ID is cell index or sector index.

15. The method according to claim 1, wherein the step of selecting a middle pilot sequence set comprises:

at least one of the following factors determining the middle pilot sequence set to which the middle pilot sequence to be transmitted and corresponding to the wireless communication networking unit belongs: the number of transmission antennae corresponding to the wireless communication networking unit, system bandwidth, the number of subcarriers of the system, the number of discrete Fourier transform points of the system; and the following factors determining the index of the middle pilot sequence in the middle pilot sequence set to which the middle pilot sequence belongs, with the middle pilot sequence being the one to be transmitted and corresponding to the wireless communication networking unit: the index of the wireless communication networking unit, and the number of part or all of sequences contained in a predetermined sequence set to which the middle pilot sequence corresponding to the wireless communication networking unit belongs;

wherein said wireless communication networking unit includes at least one of the following: a cell, a base station, a sector, and a segment.

16. The method according to claim 13, wherein the middle pilot sequence set is generated via the following operations:

choosing a natural number N and enabling N to be the maximum integer which meets $2^N \leq M$, wherein M is the length of the middle pilot sequence in the middle pilot sequence set;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i=(1,1,\ldots 1,0,0,\ldots 0,\ldots 1,1,\ldots 1,0,0,\ldots 0)$, wherein the number of the consecutive 1s or consecutive 0s is $2^n/2^i$;

generating S' permutation sequences $\pi_i$, i=1, 2, ... S', of sequence $[1, 2, \ldots n]$ or S' different arrangements $\pi_i$, i=1, 2, ... S', of $[1, 2, \ldots n]$, wherein $S' \geq S$ and S is the number of sequences in said middle pilot sequence set;

generating $A_l$ different binary Golay sequences $P_i$, i=1, 2, ... $A_l$, with the length of $2^N$, wherein $A_l \geq A$ and A is the number of middle pilot sequences in said middle pilot sequence set;

said $$P_i = \sum_{l=1}^{n-1} x_{\pi_i(l)} x_{\pi_i(l+1)} \sum_{l=1}^{n} c_l x_l + c, c_l$$

and c are any binary numbers (0 or 1); and inserting into each generated binary Golay sequence $P_i$ a binary sequence a with the length of $M-2^N$ to obtain a sequence $S_i$ with the length of M, wherein the j ($1 \leq j \leq M-2^N$)th element of binary sequence a is the (9*j)th element of sequence $S_i$, wherein $1 \leq j \leq M-2^N$;

wherein said binary sequence a meets: a is a sequence, which enables $S_i$ to have the maximum peak-to-average power ratio, in $2^{M-2^N}$ binary sequences with the length of $M-2^N$.

17. The method according to claim 13, wherein the middle pilot sequence set is generated via at least one of the following operations:

selecting, for a middle pilot sequence set which contains S sequences, a natural number n, wherein n is the minimum natural number which meets $$2^n \geq \frac{m}{2}$$

or ($2^n \geq m$), m is the length of each sequence in the middle pilot sequence set, and S is a natural number;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1,1, \ldots 1,0,0, \ldots 0, \ldots 1,1, \ldots 1,0,0, \ldots 0)$, wherein the number of the consecutive 1s or consecutive 0s is $2^n/2^i$;

generating S' permutation sequences of sequence [1, 2, ... n] or S' different arrangements of sequence [1, 2, ... n], wherein S' $\geq$ S and S is the number of sequences in said middle pilot sequence set;

generating S' Golay complementary sequence pairs of $a_i$ and $b_i$ with the length of $2^n$, wherein $1 \leq i \leq S'$;

wherein, $$a_i = \sum_{l=1}^{n} x_{\pi_i(l)} x_{\pi_i(l+1)}, b_i = \sum_{l=1}^{n} x_{\pi_i(l)} x_{\pi_i(l+1)} + x_{\pi_i(1)},$$

and $\pi_i(l)$ represents the l-th element of i-th sequence in S' permutation sequences;

selecting M index sequences $I_j = [i_1^j, i_2^j, \ldots i_m^j]$, wherein $1 \leq j \leq M$, and any two elements in each index sequence are different and each element belongs to an interval [1, $2^n$]; and in the generated S' Golay complementary sequence pairs, selecting, for each sequence $a_i$ and/or $b_i$, elements corresponding to index $I_j$ to construct a new sequence and totally construct S'M new sequences, wherein when n is the minimum natural number which meets $$2^n \geq \frac{m}{2},$$

the generated new sequence is $[a_i(I_j), b_i(I_j)]$ ($1 \leq i \leq j$, $1 \leq j \leq M$), and when n is the minimum natural number which meets $2^n \geq m$, the generated new sequence is $a_i(I_j)$ or $b_i(I_j)$ ($1 \leq i \leq S'$, $1 \leq j \leq M$);

wherein $a_i(I_j)$ represents to select elements with the index of $I_j$ in $a_i$ to generate a new sequence, and $[a_i(I_j), b_i(I_j)]$ represents to cascade the two new sequences $a_i(I_j)$ and $b_i(I_j)$ to form one sequence; and selecting, from said S'M new sequences, S sequences meeting a predetermined condition, to construct said middle pilot sequence set, wherein said predetermined condition is: the maximum peak-to-average power ratios of said S sequences are all less than a first threshold value and the correlation coefficient between any two sequences is less than a second threshold value.

18. The method according to claim 15, wherein the middle pilot sequence set is generated via the following operations:

choosing a natural number N and enabling N to be the maximum integer which meets $2^N \geq M$, wherein M is the length of the middle pilot sequence in the middle pilot sequence set;

generating n middle sequences $x_i(k)$, wherein $1 \leq i \leq n$ and $1 \leq k \leq 2^n$, and the length of each middle sequence is $2^n$, wherein the i ($1 \leq i \leq n$)th middle sequence is:

$x_i = (1,1, \ldots 1,0,0, \ldots 0, \ldots 1,1, \ldots 1,0,0, \ldots 0)$, wherein the number of the consecutive 1s or consecutive 0s is $2^n/2^i$;

generating S' permutation sequences $\pi_i$, i=1, 2, ... S', of sequence [1, 2, ... n] or S' different arrangements $\pi_i$, i=1, 2, ... S', of sequence [1, 2, ... n], wherein S' $\geq$ S and S is the number of sequences in said middle pilot sequence set;

generating $A_i$ different binary Golay sequences $P_i$, i=1, 2, ... $A_i$, with the length of $2^N$, wherein $A_i \geq A$ and A is the number of middle pilot sequences in said middle pilot sequence set;

said $$P_i = \sum_{l=1}^{n-1} P_i = \sum_{l=1}^{n-1} x_{\pi_i(l)} x_{\pi_i(l+1)} \sum_{l=1}^{n} c_l x_l + c, c_l$$

and c are any binary numbers (0 or 1); and inserting into each generated binary Golay sequence $P_i$ a binary sequence a with the length of $M-2^N$ to obtain a sequence Si with the length of M, wherein the j ($1 \leq j \leq M-2^N$)th element of binary sequence a is the (9*j)th element of sequence $S_i$, wherein $1 \leq j \leq M-2^N$;

wherein said binary sequence a meets: a is a sequence, which enables $S_i$ to have the maximum peak-to-average power ratio, in $2^{M-2^N}$ binary sequences with the length of $M-2^N$.

19. The method according to claim 15, wherein the middle pilot sequence set is generated via at least one of the following operations:

selecting, for a middle pilot sequence set which contains S sequences, a natural number n, wherein n is the minimum natural number which meets $$2^n \geq \frac{m}{2}$$

($2^n \geq m$), m is the length of each sequence in the middle pilot sequence set, and S is a natural number;

generating n middle sequences $x_i(k)$, wherein $1 \le i \le n$ and $1 \le k \le 2^n$, the length of each middle sequence is $2^n$, wherein the i ($1 \le i \le n$)th middle sequence is:
$x_i = (1,1,\ldots 1,0,0,\ldots 0,\ldots 1,1,\ldots 1,0,0,\ldots 0)$, wherein the number of the consecutive 1s or consecutive 0s is $2^n/2^i$;

generating S' permutation sequences of sequence $[1, 2, \ldots n]$ or S' different arrangements of sequence $[1, 2, \ldots n]$, wherein $S' \ge S$ and S is the number of sequences in said middle pilot sequence set;

generating S' Golay complementary sequence pairs of $a_i$ and $b_i$ with the length of $2^n$, wherein $1 \le i \le S'$;

wherein, $$a_i = \sum_{l=1}^{n} x_{\pi_i(l)} x_{\pi_i(l+1)}, \quad b_i = \sum_{l=1}^{n} x_{\pi_i(l)} x_{\pi(l+1)} + x_{\pi_i(1)},$$

and $\pi_i(l)$ represents the l-th element of i-th sequence in S' permutation sequences;

selecting M index sequences $I_j = [i_1^j, i_2^j, \ldots i_m^j]$, wherein $1 \le j \le M$, and any two elements in each index sequence are different and each element belongs to an interval $[1, 2^n]$; and in the generated S' Golay complementary sequence pairs, selecting, for each sequence $a_i$ and/or $b_i$, elements corresponding to index $I_j$ to construct a new sequence and totally construct S'M new sequences, wherein when n is the minimum natural number which meets $$2^n \ge \frac{m}{2},$$

the generated new sequence is $[a_i(I_j), b_i(I_j)]$ ($1 \le i \le j$, $1 \le j \le M$), and when n is the minimum natural number which meets $2^n \ge m$, the generated new sequence is $a_i(I_j)$ or $b_i(I_j)$ ($1 \le i \le S'$, $1 \le j \le M$);

wherein $a_i(I_j)$ represents to select elements with the index of $I_j$ in $a_i$ to generate a new sequence, and $[a_i(I_j), b_i(I_j)]$ represents to cascade the two new sequences $a_i(I_j)$ and $b_i(I_j)$ to form one sequence; and selecting, from said S'M new sequences, S sequences meeting a predetermined condition, to construct said middle pilot sequence set, wherein said predetermined condition is: the maximum peak-to-average power ratios of said S sequences are all less than a first threshold value and the correlation coefficient between any two sequences is less than a second threshold value.

* * * * *

UNITED STATES PATENT AND TRADEMARK OFFICE
CERTIFICATE OF CORRECTION

PATENT NO. : 8,761,128 B2
APPLICATION NO. : 13/382102
DATED : June 24, 2014
INVENTOR(S) : Zhu et al.

It is certified that error appears in the above-identified patent and that said Letters Patent is hereby corrected as shown below:

In the Specification:

Column 5, line 29 reads: "$k = N_{start}, N_{start} + 1, \ldots N_{start} + N_{used} + 1, k \neq N_{start} + \frac{N_{used} - 1}{2}$."

It should read: "$k = N_{start}, N_{start}\ 1, \cdots N_{start}^{+}\ N_{used}\ +1, k\ N_{start}\ \neq \frac{N_{used} - 1}{2} +$"

Column 5, lines 51-52 read: "…(1,1,…1,0,0,…0,…1,0,0,…0),…"
It should read: "…(1,1,…1,0,0,…0,…1,1,…1,0,0,…0),…"

Column 5, line 59 reads: "…or generating S" Golay complementary…"
It should read: "…or generating $S'$ Golay complementary…"

Column 6, line 1 reads: "$\pi_i(1)$ represents the $1$-th element…"
It should read: "$\pi_i(l)$ represents the $l$-$th$ element…"

Column 9, line 11 reads: "…$m$ in is the length of each sequence…"
It should read: "…$m$ is the length of each sequence…"

Column 9, line 31 reads: "…represents the 1th element…"
It should read: "…represents the $l$-$th$ element…"

Column 9, line 55 reads: "…newsequences. S sequences…"
It should read: "…new sequences, S sequences…"

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,761,128 B2

Column 10, line 26 reads: "$\pi_i(l)$ represents the $l$-th element…"

It should read: "$\pi_i(l)$ represents the $l$-th element…"

Column 13, line 58 reads: "…$\pi_i(l)$ represents the $l$th element…"

It should read: "…$\pi_i(l)$ represents the $l$-th element…"

Column 26, line 62 reads: "$I = \mathrm{mod}\left(\left\lfloor\dfrac{97}{2}\right\rfloor, 512\right) = 32$"

It should read: "$I = \mathrm{mod}\left(\left\lfloor\dfrac{97}{3}\right\rfloor, 512\right) = 32$"

Column 27, line 47 reads: "…the indexes of [-207:24:45,10:24:202] in order…"

It should read: "…the indexes of [-207:24:-15,10:24:202] in order…"

In the Claims:

Column 237, Claim 7, line 33 reads:

"$k = N_{start}, N_{start} + 1, \ldots N_{start} + N_{used} + 1, k + N_{start} \neq \dfrac{N_{used} - 1}{2}$,"

It should read:

"$k = N_{start}, N_{start} + 1, \cdots N_{start} + N_{used} + 1, k + N_{start} \neq \dfrac{N_{used} - 1}{2}$"

Column 238, Claim 9, lines 61-65 read: "$R_{kl}(\tau) = \dfrac{\sum_{i=1}^{N_{FFT}} T_k(i) * conj(T_l(mod(i + \tau, N_{FFT})))}{m}$, $\tau = 0, 1, \ldots N_{FFT} - 1$"

It should read: "$R_{kl}(\tau) = \dfrac{\sum_{i=1}^{N_{FFT}} T_k(i) * conj(T_l(mod(i + \tau, N_{FFT})))}{m}$, $\tau = 0, 1, \cdots N_{FFT} - 1$"

Column 242, Claim 17, line 1 reads: "[$a_i(I_j), b_i(I_j)$] ($1 \leq i \leq j$, $1 \leq j \leq M$),"

It should read: "$\left[a_i(I_j), b_i(I_j)\right] 1 \leq i \leq S, 1 \leq j \leq M$"

CERTIFICATE OF CORRECTION (continued)
U.S. Pat. No. 8,761,128 B2

Column 242, Claim 18, line 19 reads: "…integer which meets $2^N \geq M$,…"

It should read: "…integer which meets $2^N \leq M$,…"

Column 242, claim 18, line 41 reads: "$P_i = \sum_{l=1}^{n-1} P_i = \sum_{l=1}^{n-1} x_{\pi_i(l)} x_{\pi(l+1)} \sum_{l=1}^{n} c_l x_l + c, c_l$"

It should read: "$P_i = \sum_{l=1}^{n-1} x_{\pi_i(l)} x_{\pi(l+1)} \quad \sum_{l=1}^{n} c_l x_l \quad c \quad , c_l …$"

Column 244, Claim 19, line 9 reads: "[$a_i(I_j), b_i(I_j)$] ($1 \leq i \leq j$, $1 \leq j \leq M$),"

It should read: "$\left[ a_i(I_j), b_i(I_j) \right] 1 \leq i \leq S', 1 \leq j \leq M$,"

UNITED STATES PATENT AND TRADEMARK OFFICE
CERTIFICATE OF CORRECTION

PATENT NO. : 8,761,128 B2
APPLICATION NO. : 13/382102
DATED : June 24, 2014
INVENTOR(S) : Zhu et al.

It is certified that error appears in the above-identified patent and that said Letters Patent is hereby corrected as shown below:

In the Specification:

Column 5, line 29 reads: "$k = N_{start}, N_{start} + 1, \ldots N_{start} + N_{used} + 1, k \neq N_{start} + \frac{N_{used} - 1}{2}$,"

It should read: "$k = N_{start}, N_{start} + 1, \cdots N_{start} + N_{used} - 1, k \neq N_{start} + \frac{N_{used} - 1}{2}$"

Column 5, lines 51-52 read: "…(1,1,…1,0,0,…0,…1,0,0,…0),…"
It should read: "…(1,1,…1,0,0,…0,…1,1,…1,0,0,…0),…"

Column 5, line 59 reads: "…or generating S" Golay complementary…"
It should read: "…or generating $S'$ Golay complementary…"

Column 6, line 1 reads: "$\pi_i(1)$ represents the $1$-th element…"
It should read: "$\pi_i(l)$ represents the $l\text{-}th$ element…"

Column 9, line 11 reads: "…$m$ in is the length of each sequence…"
It should read: "…$m$ is the length of each sequence…"

Column 9, line 31 reads: "…represents the 1th element…"
It should read: "…represents the $l\text{-}th$ element…"

This certificate supersedes the Certificate of Correction issued September 9, 2014.

Column 9, line 55 reads: "…newsequences. S sequences…"

Signed and Sealed this
Sixteenth Day of December, 2014

Michelle K. Lee
*Deputy Director of the United States Patent and Trademark Office*

CERTIFICATE OF CORRECTION (continued)
U.S. Pat. No. 8,761,128 B2

It should read: "…new sequences, S sequences…"

Column 10, line 26 reads: "$\pi_i(l)$ represents the $l$-th element…"

It should read: "$\pi_i(l)$ represents the $l$-$th$ element…"

Column 13, line 58 reads: "…$\pi_i(l)$ represents the $l$th element…"

It should read: "…$\pi_i(l)$ represents the $l$-$th$ element…"

Column 26, line 62 reads: "$I = \mathrm{mod}\left(\left\lfloor\dfrac{97}{2}\right\rfloor, 512\right) = 32$"

It should read: "$I = \mathrm{mod}\left(\left\lfloor\dfrac{97}{3}\right\rfloor, 512\right) = 32$"

Column 27, line 47 reads: "…the indexes of [-207:24:45,10:24:202] in order…"

It should read: "…the indexes of [-207:24:-15,10:24:202] in order…"

In the Claims:

Column 237, Claim 7, line 33 reads:

"$k = N_{start}, N_{start} + 1, \ldots N_{start} + N_{used} + 1, k + N_{start} \neq \dfrac{N_{used} - 1}{2}$,"

It should read:

"$k = N_{start}, N_{start} + 1, \cdots N_{start} + N_{used} - 1, k \neq N_{start} + \dfrac{N_{used} - 1}{2}$"

Column 238, Claim 9, lines 61-65 read: "$R_{kl}(\tau) = \dfrac{\sum_{i=1}^{N_{FFT}} T_k(i) * \mathrm{conj}(T_l(\mathrm{mod}(i + \tau, N_{FFT})))}{m}$, $\tau = 0, 1, \ldots N_{FFT}\ 1$"

It should read: "$R_{kl}(\tau) = \dfrac{\sum_{i=1}^{N_{FFT}} T_k(i) * \mathrm{conj}\left(T_l\left(\mathrm{mod}(i + \tau, N_{FFT})\right)\right)}{m}$, $\tau = 0, 1, \cdots N_{FFT}\ 1$"

Column 242, Claim 17, line 1 reads: "[$a_i(I_j), b_i(I_j)$] ($1 \leq i \leq j$, $1 \leq j \leq M$),"

CERTIFICATE OF CORRECTION (continued)
U.S. Pat. No. 8,761,128 B2

It should read: "$\left[a_i(I_j), b_i(I_j)\right]_{1 \le i \le S', 1 \le j \le M}$„

Column 242, Claim 18, line 19 reads: "…integer which meets $2^N \ge M,$…"

It should read: "…integer which meets $2^N \le M,$…"

Column 242, claim 18, line 41 reads: "$P_i = \sum_{l=1}^{n-1} P_i = \sum_{l=1}^{n-1} x_{\pi_i(l)} x_{\pi(l+1)} \sum_{l=1}^{n} c_l x_l + c, c_l$"

It should read: "$P_i = \sum_{l=1}^{n-1} x_{\pi_i(l)} x_{\pi(l+1)} + \sum_{l=1}^{n} c_l x_l + c$, $c_l$…„

Column 244, Claim 19, line 9 reads: "[$a_i(I_j), b_i(I_j)$] ($1 \le i \le j$, $1 \le j \le M$),"

It should read: "$\left[a_i(I_j), b_i(I_j)\right]_{1 \le i \le S', 1 \le j \le M}$„